US012132599B2

(12) United States Patent
Mouhouche et al.

(10) Patent No.: US 12,132,599 B2
(45) **Date of Patent: *Oct. 29, 2024**

(54) NON-UNIFORM CONSTELLATIONS

(71) Applicant: SAMSUNG ELECTRONICS CO., LTD., Suwon-si (KR)

(72) Inventors: Belkacem Mouhouche, Stanwell (GB); Daniel Ansorregui Lobete, Staines Upon Thames (GB); Hong-Sil Jeong, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/201,897

(22) Filed: May 25, 2023

(65) Prior Publication Data

US 2023/0421427 A1 Dec. 28, 2023

Related U.S. Application Data

(63) Continuation of application No. 17/380,737, filed on Jul. 20, 2021, now Pat. No. 11,695,613, which is a (Continued)

(30) Foreign Application Priority Data

Jul. 8, 2013 (GB) ..................................... 1312243
Jul. 26, 2013 (GB) ..................................... 1313419
(Continued)

(51) Int. Cl.
*H04L 27/34* (2006.01)
*H04L 1/00* (2006.01)

(52) U.S. Cl.
CPC ........ *H04L 27/3483* (2013.01); *H04L 1/0063* (2013.01); *H04L 27/3405* (2013.01)

(58) Field of Classification Search
CPC ............... H04L 27/3483; H04L 1/0063; H04L 27/3405; H04L 1/0001; H04L 27/3422
See application file for complete search history.

(56) References Cited

U.S. PATENT DOCUMENTS 8,270,511 B2 9/2012 Barsoum et al.
9,130,814 B2 9/2015 Petrov
(Continued)

FOREIGN PATENT DOCUMENTS

CN 101345738 A 1/2009
CN 102244556 A 11/2011
(Continued)

OTHER PUBLICATIONS

Communication dated Jun. 28, 2023 issued by the India Patent Office in counterpart India Application No. 201627004230.
(Continued)

*Primary Examiner* — Christine Ng
(74) *Attorney, Agent, or Firm* — Sughrue Mion, PLLC

(57) ABSTRACT

A method for generating a non-uniform constellation is provided. The method comprises the step of performing a first process, the first process comprising the steps of: obtaining a first constellation defined by one or more parameter values; and generating a second constellation based on the first constellation using a second process. The second process comprises the steps of: obtaining a set of candidate constellations, wherein the set of candidate constellations comprises the first constellation and one or more modified constellations, wherein each modified constellation is obtained by modifying the parameter values defining the first constellation; determining the performance of each candidate constellation according to a predetermined performance measure; selecting the candidate constellation having the best performance as the second constellation.

4 Claims, 58 Drawing Sheets

Related U.S. Application Data continuation of application No. 16/678,536, filed on Nov. 8, 2019, now Pat. No. 11,165,623, which is a continuation of application No. 15/818,480, filed on Nov. 20, 2017, now Pat. No. 10,505,780, which is a continuation of application No. 14/910,948, filed as application No. PCT/KR2014/006125 on Jul. 8, 2014, now Pat. No. 9,866,423.

(30) Foreign Application Priority Data

| | | |
|---|---|---|
| Sep. 4, 2013 | (GB) | 1315740 |
| Oct. 30, 2013 | (GB) | 1319202 |
| Jan. 31, 2014 | (GB) | 1401711 |
| Jun. 6, 2014 | (GB) | 1410114 |
| Jun. 9, 2014 | (GB) | 1410222 |

(56) References Cited

U.S. PATENT DOCUMENTS

| | | | | |
|---|---|---|---|---|
| 9,526,195 | B2 | 12/2016 | Su | |
| 9,866,423 | B2 * | 1/2018 | Mouhouche | H04L 1/0063 |
| 10,505,780 | B2 * | 12/2019 | Mouhouche | H04L 1/0063 |
| 11,165,623 | B2 * | 11/2021 | Mouhouche | H04L 27/3405 |
| 11,695,613 | B2 * | 7/2023 | Mouhouche | H04L 1/0063 370/207 |
| 2003/0031149 | A1 | 2/2003 | Odenwalder et al. | |
| 2003/0120990 | A1 | 6/2003 | Elbwart et al. | |
| 2004/0066844 | A1 * | 4/2004 | Moon | H04L 27/3488 375/264 |
| 2007/0143654 | A1 * | 6/2007 | Joyce | H03M 13/1111 714/752 |
| 2008/0292010 | A1 | 11/2008 | Wernears | |
| 2009/0102852 | A1 * | 4/2009 | Eyvazkhani | H04L 1/007 345/589 |
| 2010/0257426 | A1 | 10/2010 | Yokokawa et al. | |
| 2010/0299572 | A1 | 11/2010 | Yokokawa et al. | |
| 2011/0110459 | A1 * | 5/2011 | Abraham | H04B 3/54 375/295 |
| 2011/0182387 | A1 | 7/2011 | Ahmed et al. | |
| 2012/0134423 | A1 * | 5/2012 | Zhou | H03M 13/255 375/E7.021 |
| 2012/0140612 | A1 | 6/2012 | Petrov et al. | |
| 2012/0189070 | A1 | 7/2012 | Kroeger | |
| 2013/0216001 | A1 * | 8/2013 | Petrov | H03M 13/036 375/299 |
| 2015/0030878 | A1 | 1/2015 | Zhi | |

FOREIGN PATENT DOCUMENTS

| | | | |
|---|---|---|---|
| CN | 102474313 | A | 5/2012 |
| CN | 102752261 | A | 10/2012 |
| CN | 103181085 | A | 6/2013 |
| CN | 103731243 | A | 4/2014 |
| DE | 199 00 140 | A | 7/1999 |
| EP | 2 134 051 | A1 | 12/2009 |
| EP | 2 153 561 | A1 | 2/2010 |
| EP | 2 166 722 | A1 | 3/2010 |
| EP | 2288048 | A1 | 2/2011 |
| EP | 2 992 656 | A1 | 3/2016 |
| EP | 3 017 574 | A1 | 5/2016 |
| GB | 2499050 | A | 8/2013 |
| JP | 2008-274417 | A | 11/2008 |
| KR | 10-2014-0142708 | A | 12/2014 |
| KR | 10-2015-0034668 | A | 4/2015 |
| KR | 10-2015-0040244 | A | 4/2015 |
| KR | 10-2016-0033716 | A | 3/2016 |
| KR | 10-2017-0052550 | A | 5/2017 |
| WO | 2008/151308 | A1 | 12/2008 |
| WO | 2010/078472 | A1 | 7/2010 |
| WO | 2011021382 | A2 | 2/2011 |
| WO | 2014/009191 | A1 | 1/2014 |
| WO | 2014/177559 | A1 | 11/2014 |
| WO | 2015/001121 | A1 | 1/2015 |
| WO | 2015/005657 | A1 | 1/2015 |
| WO | 2015/076629 | A1 | 5/2015 |
| WO | 2015/142076 | A1 | 9/2015 |

OTHER PUBLICATIONS

Communication dated Apr. 29, 2019, issued by the Korean Patent Office in counterpart Korean Application No. 10-2019-7002664.
Communication dated Feb. 2, 2021 issued by the State Intellectual Property Office of the P.R.China in application No. 201811552560.2.
Communication dated May 18, 2021 issued by the State Intellectual Property Office of the P.R.China in application No. 201910511669.X.
Communication issued Apr. 29, 2016 by the Intellectual Property Office of the United Kingdom in corresponding United Kingdom Application No. GB1410222.2.
Communication issued Apr. 5, 2017 by the Intellectual Property Office of the United Kingdom in corresponding United Kingdom Application No. GB1410222.2.
Communication issued Aug. 18, 2020, issued by the Korean Intellectual Property Office in counterpart Korean Patent Application No. 10-2019-7022643.
Communication issued Dec. 2, 2014 by the Intellectual Property Office of the United Kingdom in corresponding United Kingdom Application No. GB1410222.2.
Communication issued May 21, 2018, issued by the State Intellectual Property Office of the People's Republic of China in counterpart Chinese Patent Application No. 201480050068.9.
Communication issued Nov. 16, 2015 by the Intellectual Property Office of the United Kingdom in corresponding United Kingdom Application No. GB1410222.2.
Communication issued Oct. 13, 2016 by the Intellectual Property Office of the United Kingdom in corresponding United Kingdom Application No. GB1410222.2.
Communication issued Oct. 14, 2020, issued by the India Patent Office for Indian Patent Application No. 201627004230.
Communication issued Sep. 11, 2017 by the Intellectual Property Office of the United Kingdom in corresponding United Kingdom Application No. GB1410222.2.
Communication dated May 31, 2021 issued by the State Intellectual Property Office of the P.R.China in application No. 201910510777.5.
Search Report dated Nov. 27, 2014, issued by the International Searching Authority in counterpart International Application No. PCT/KR2014/006125 (PCT/ISA/210).
Stott, Jonathan, "CM and BICM limits for rectangular constellations", Research & Development White Paper, WHP 257, Aug. 2013, BBC. (95 pages total).
Written Opinion dated Nov. 27, 2014, issued by the International Searching Authority in counterpart International Application No. PCT/KR2014/006125 (PCT/ISA/210).

* cited by examiner

【Figure 1】
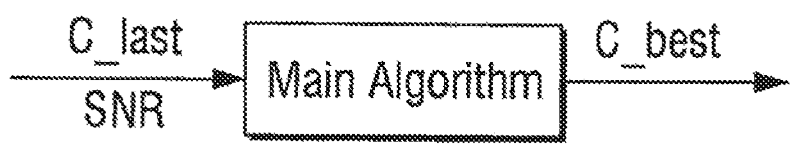

【Figure 2】
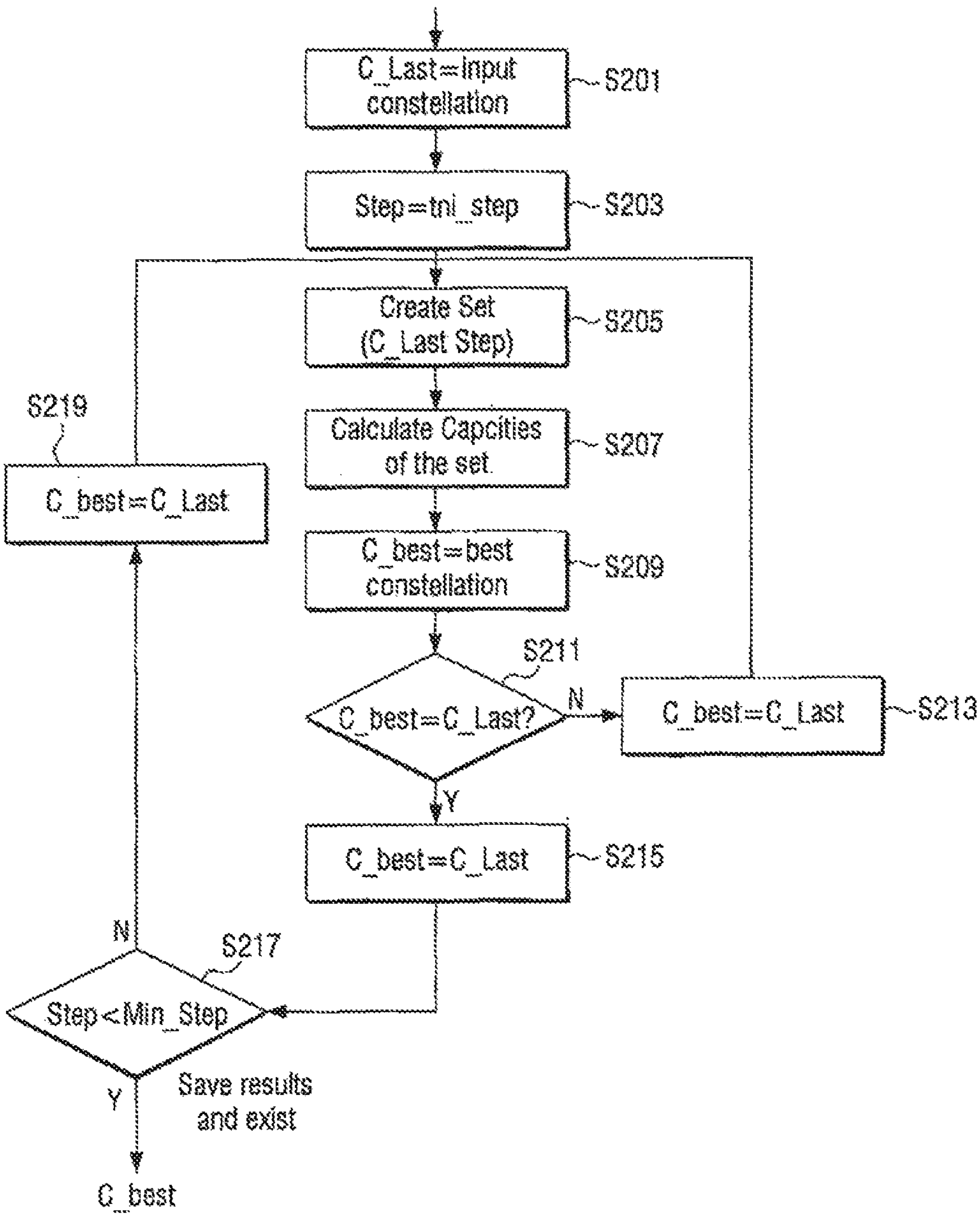

【Figure 3】
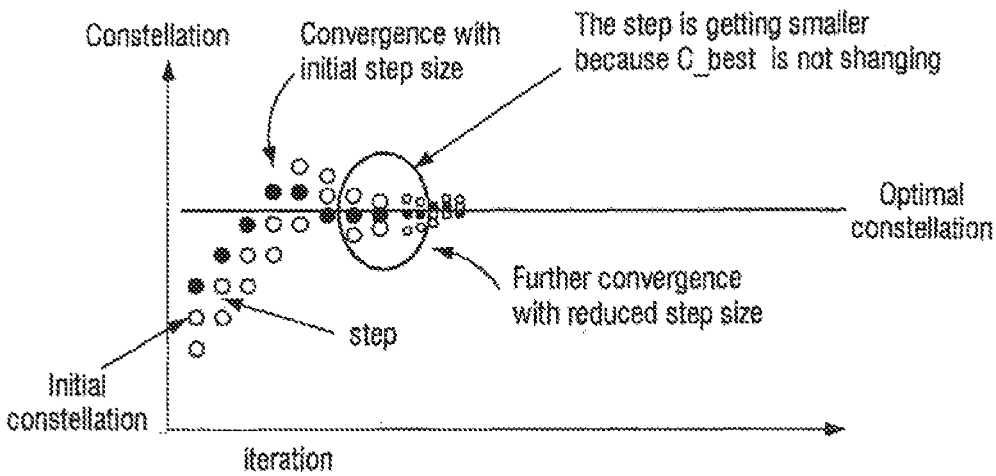
【Figure 4】
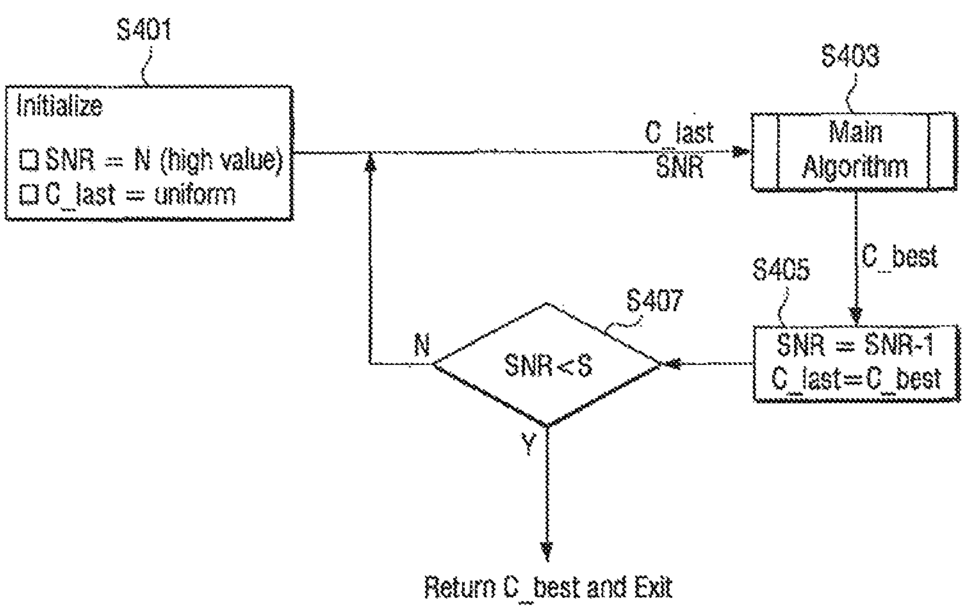

【Figure 5】
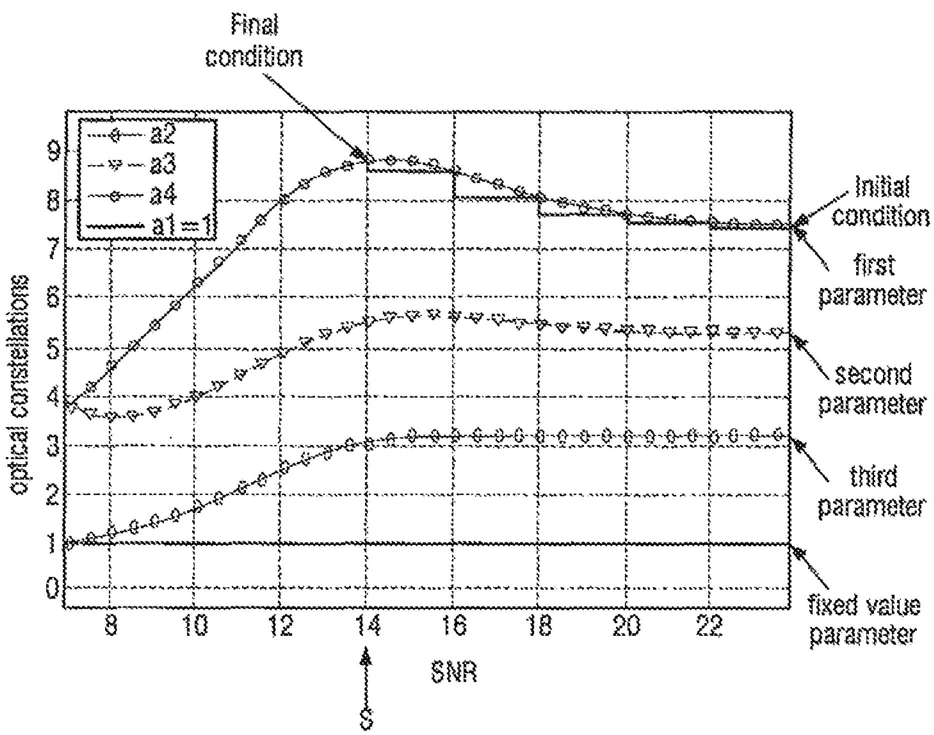

【Figure 6】
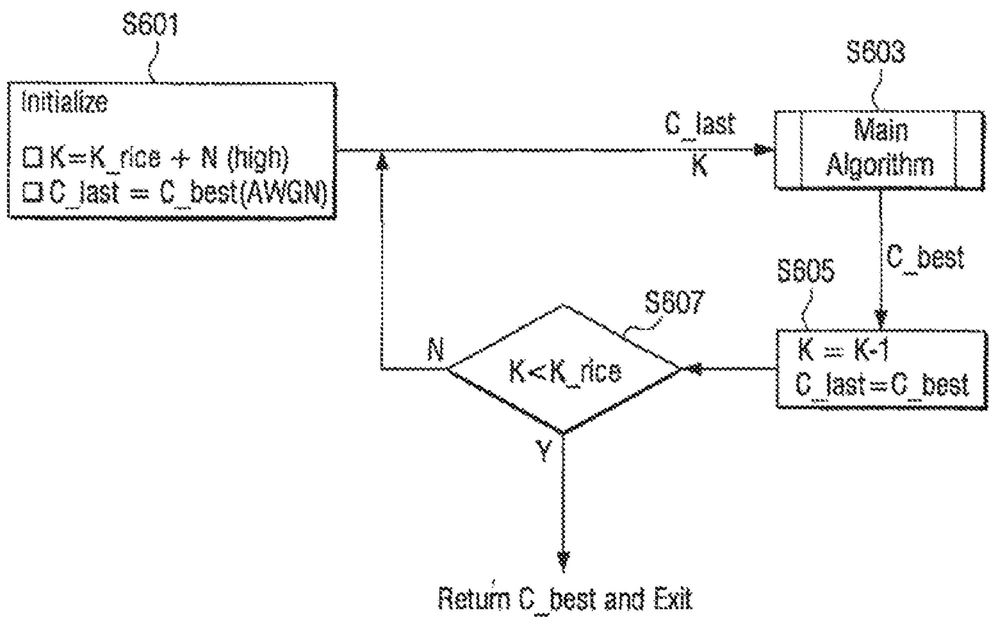

【Figure 7】
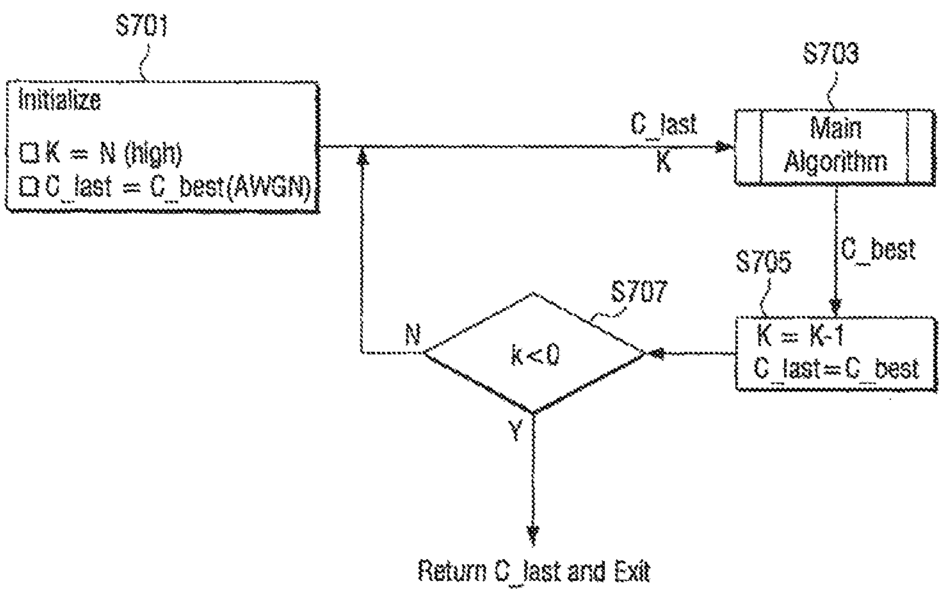

【Figure 8】
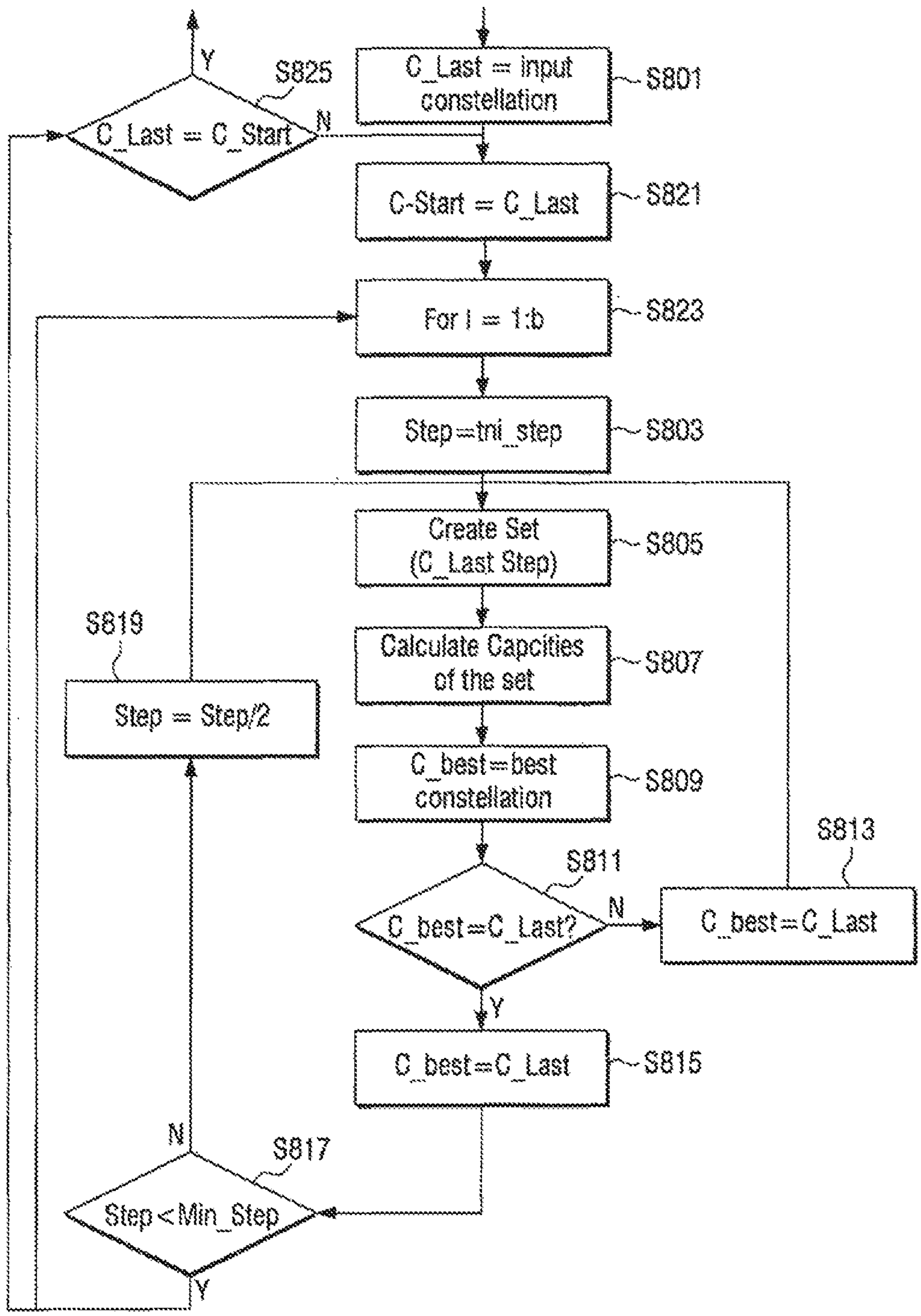

【Figure 9】
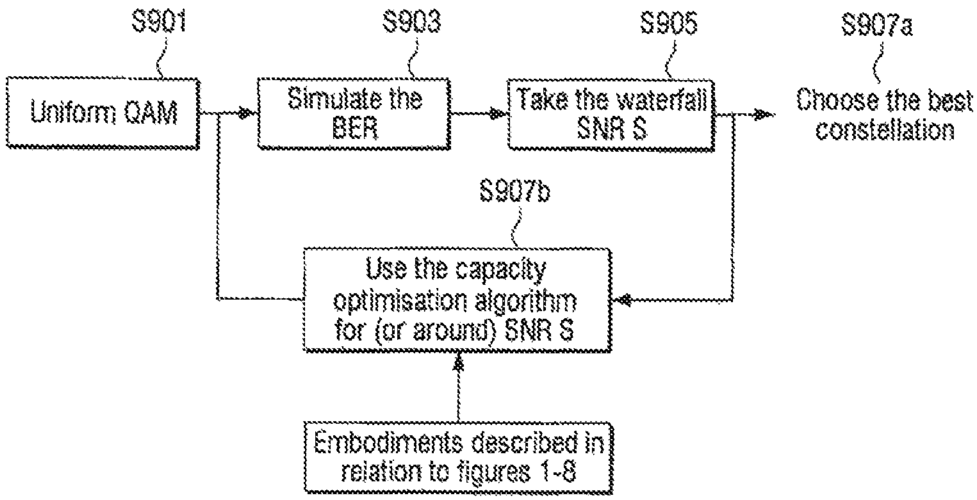
【Figure 10】
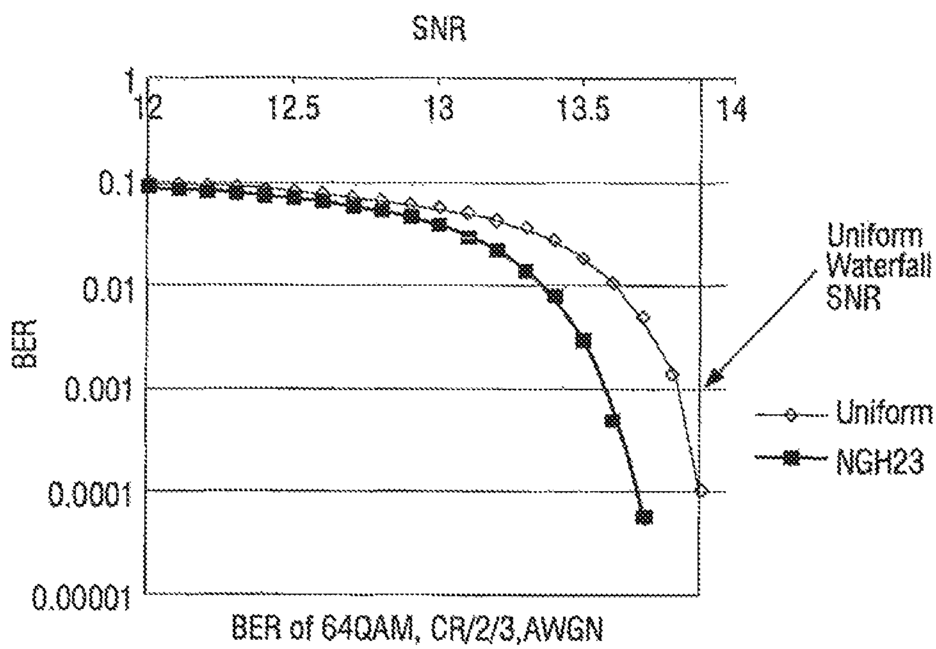

【Figure 11】
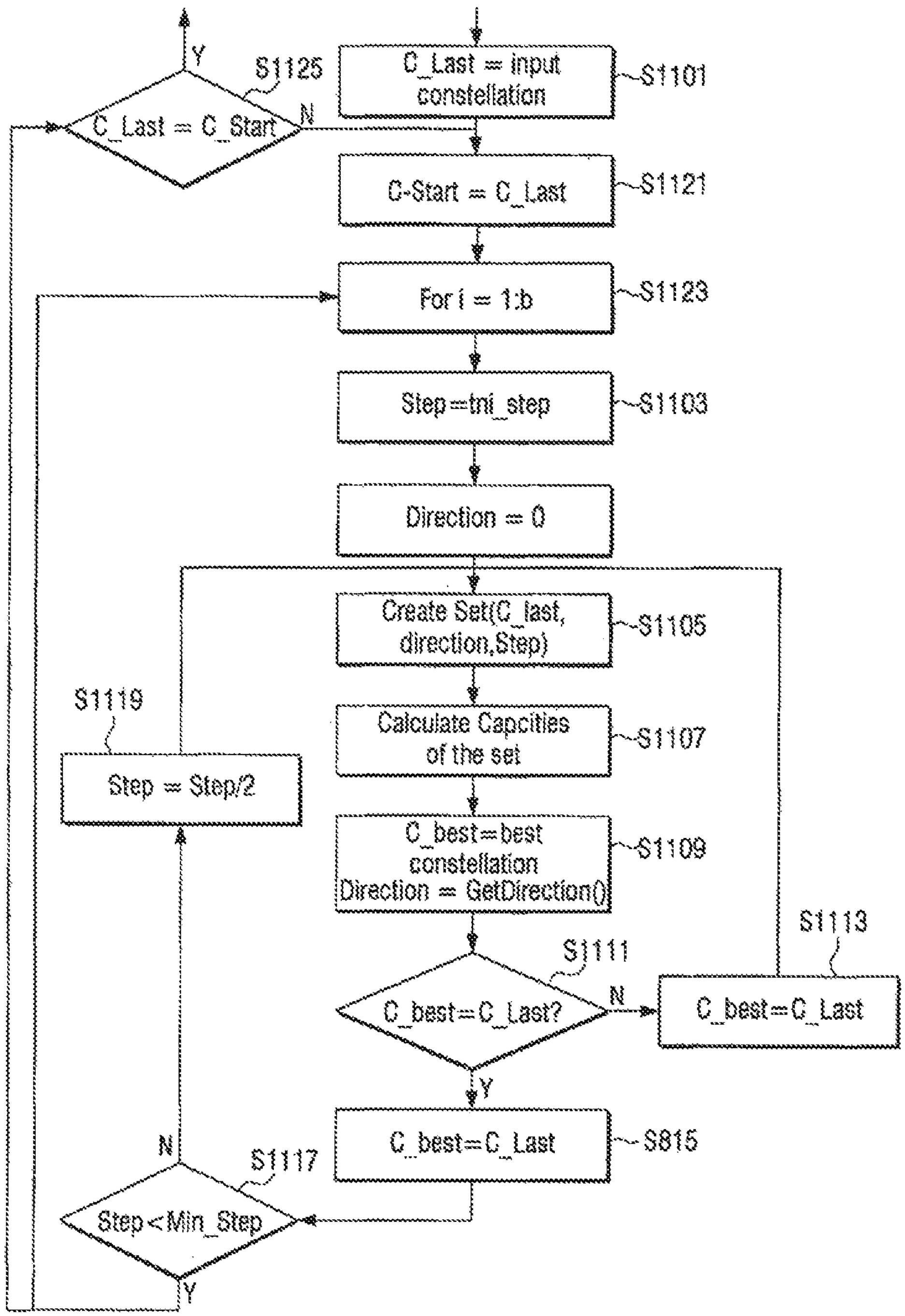

【Figure 12】
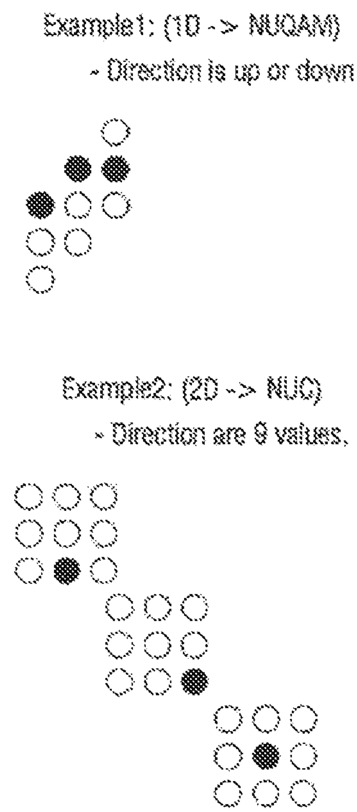

【Figure 13a】
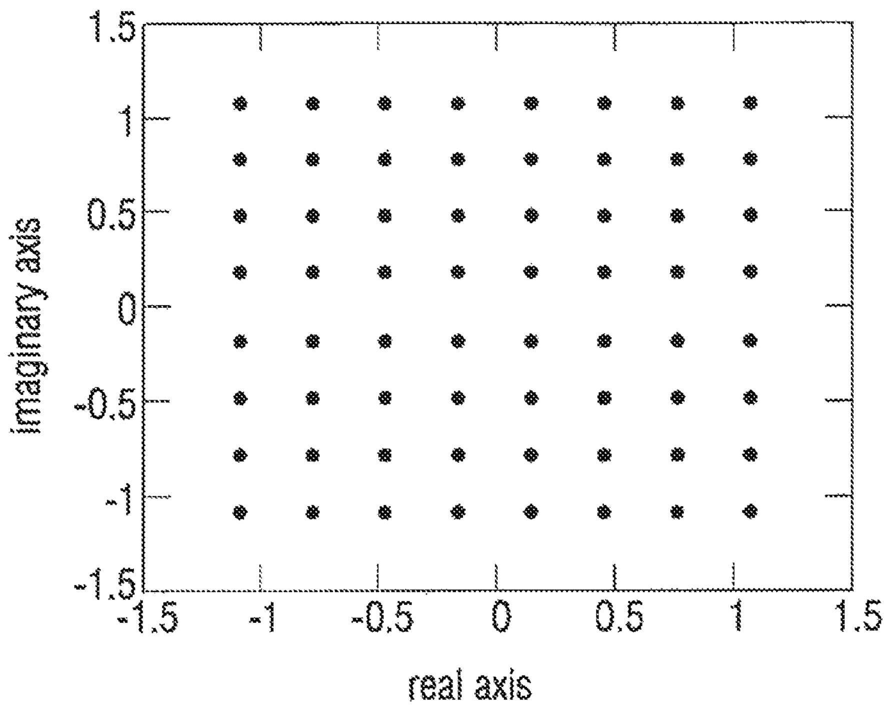

【Figure 13b】
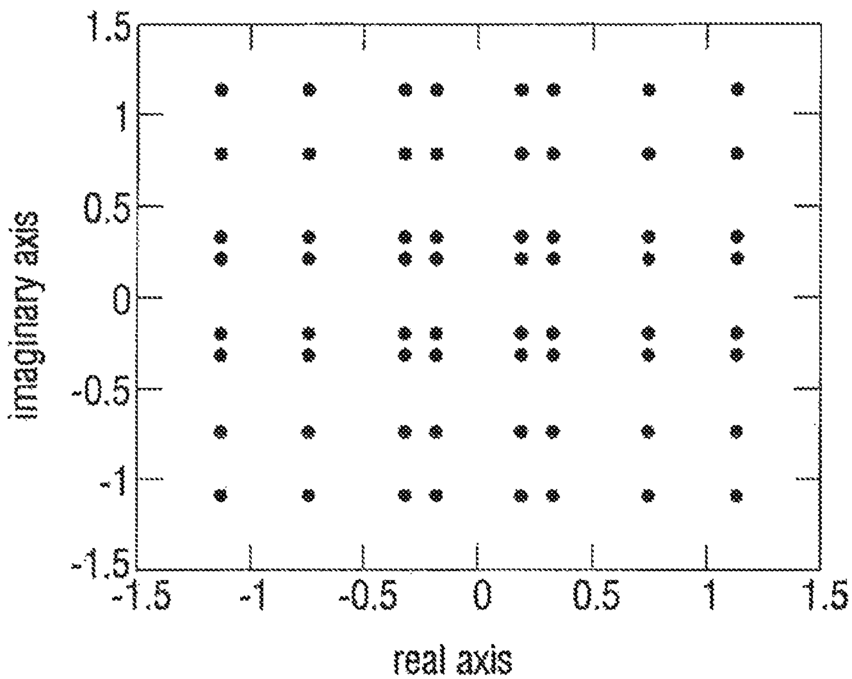

【Figure 13c】
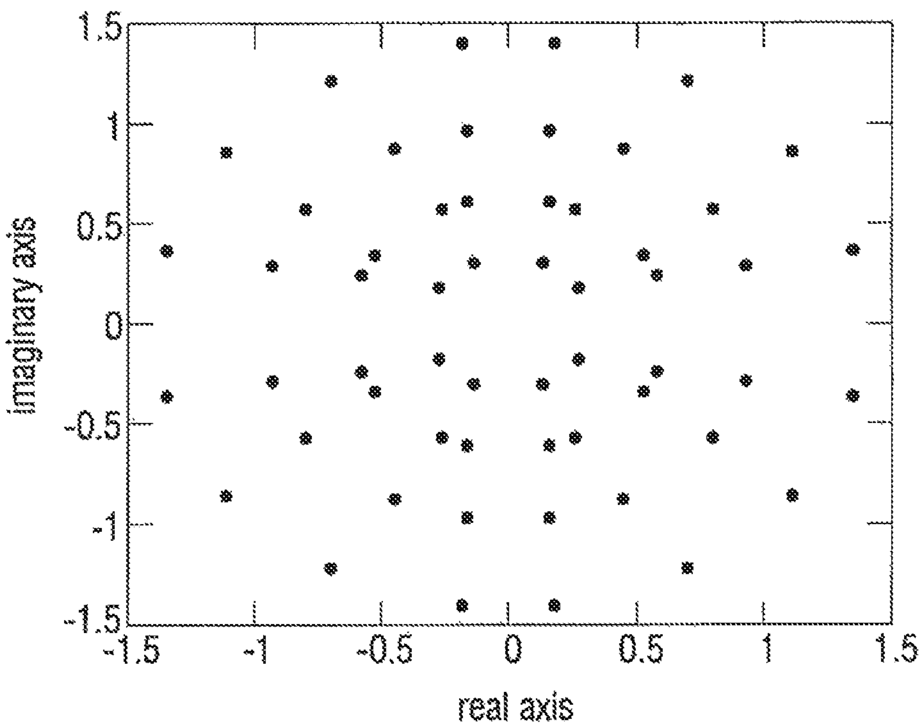

[Figure 14a]
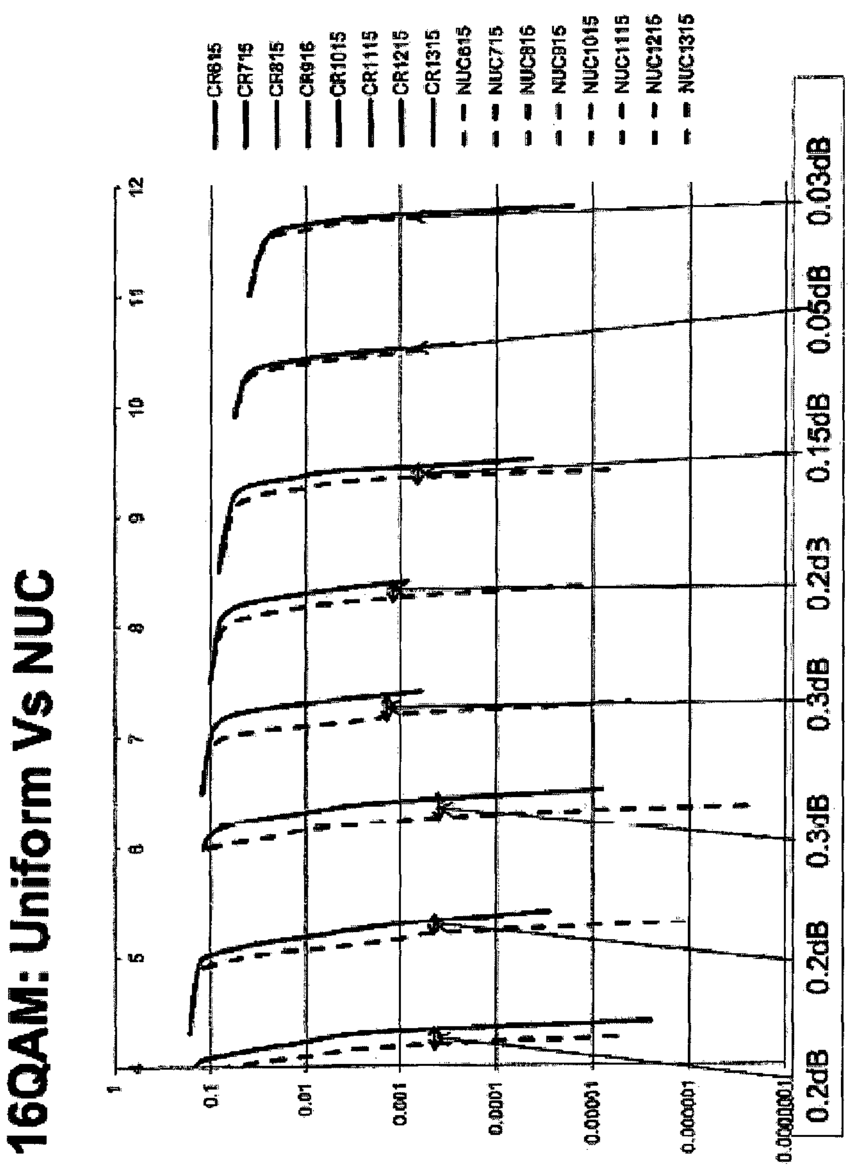

【Figure 14b】

16QAM: results - NUC gains

- 16QAM:

| CR | Uniform WF(dB) | NUC WF(dB) | Gain(dB) |
|---|---|---|---|
| 6/15 | 4.5 | 4.3 | 0.2 |
| 7/15 | 5.6 | 5.4 | 0.2 |
| 8/15 | 6.6 | 6.3 | 0.3 |
| 9/15 | 7.6 | 7.3 | 0.3 |
| 10/15 | 8.5 | 8.3 | 0.2 |
| 11/15 | 9.7 | 9.55 | 0.15 |
| 12/15 | 10.8 | 10.75 | 0.05 |
| 13/15 | 11.9 | 11.87 | 0.03 |

[Figure 15a]
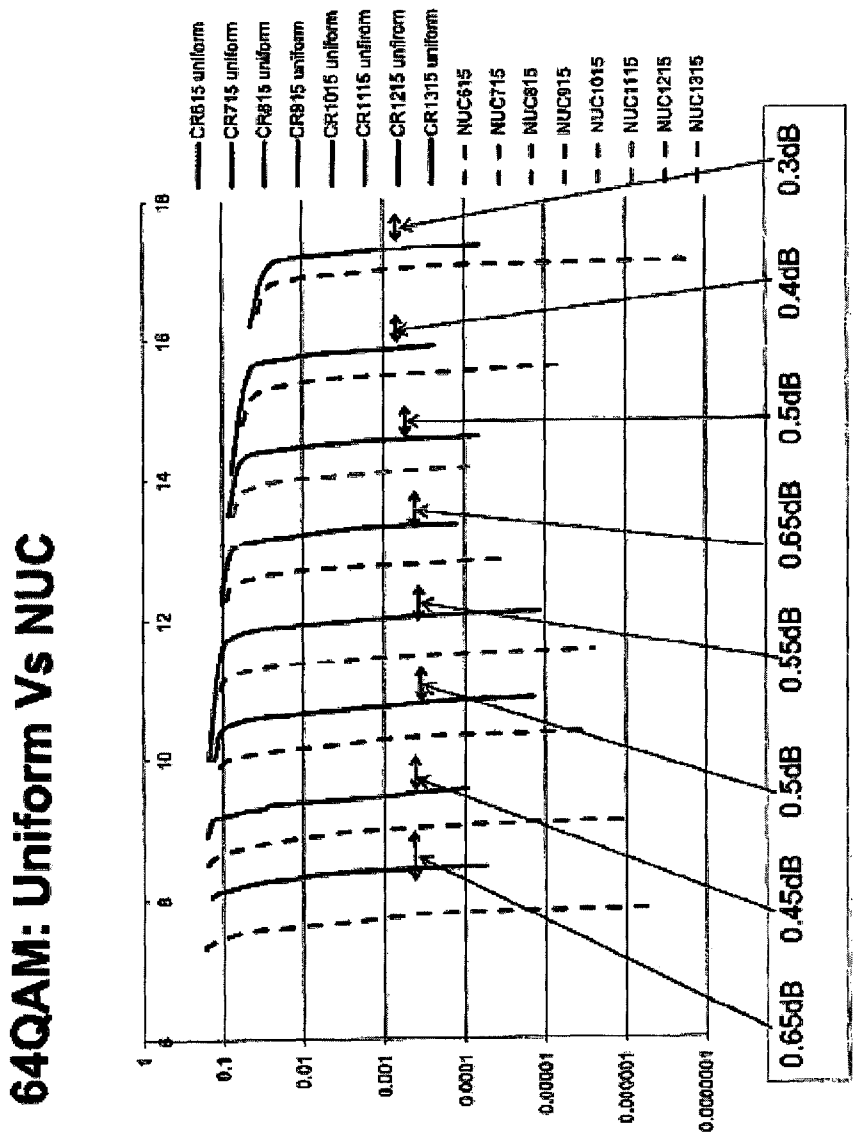

【Figure 15b】

64QAM: results - NUC gains

- 64QAM

| CR | Uniform WF (dB) | NUC(dB) | Gain (dB) |
|---|---|---|---|
| 6/15 | 8.5 | 7.85 | 0.65 |
| 7/15 | 9.6 | 9.15 | 0.45 |
| 8/15 | 10.9 | 10.4 | 0.5 |
| 9/15 | 12.15 | 11.6 | 0.55 |
| 10/15 | 13.45 | 12.8 | 0.65 |
| 11/15 | 14.65 | 14.15 | 0.5 |
| 12/15 | 16 | 15.6 | 0.4 |
| 13/15 | 17.4 | 17.1 | 0.3 |

[Figure 16a]
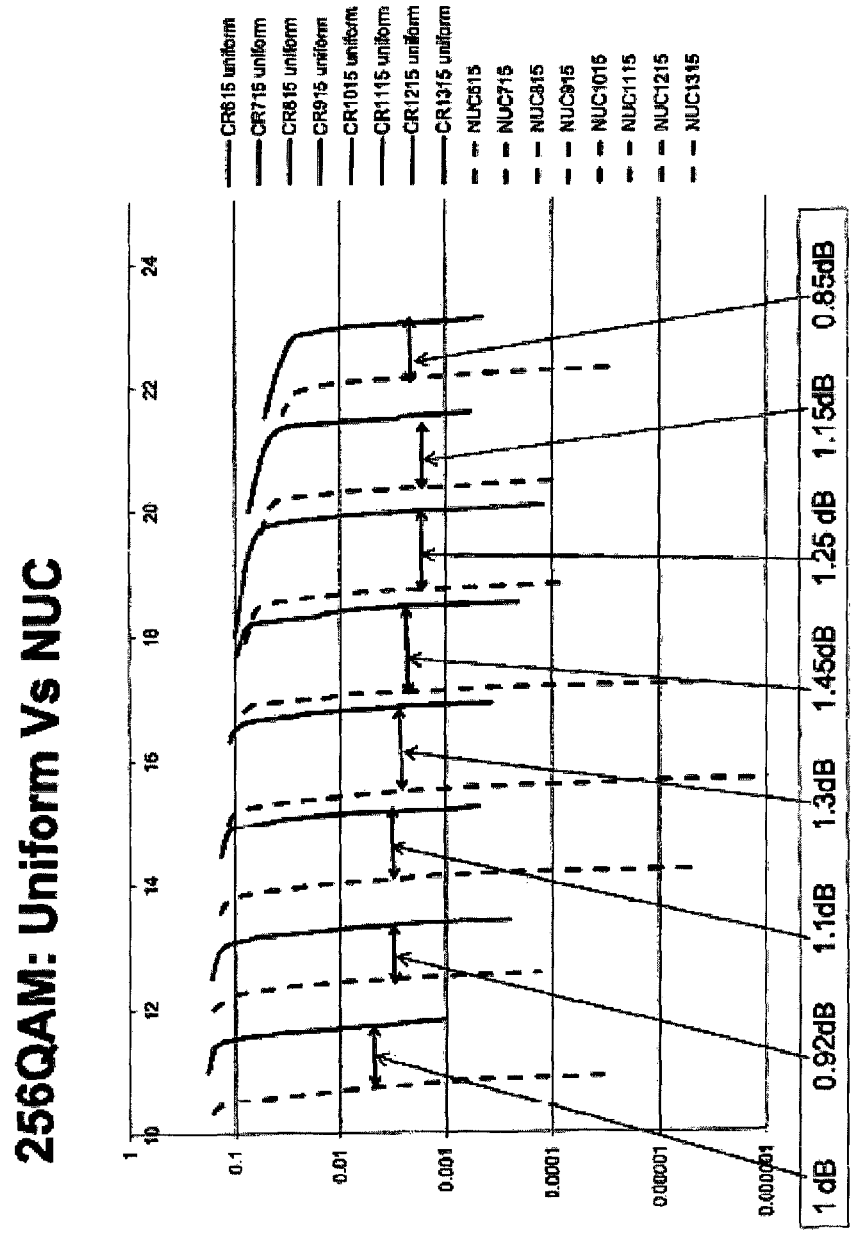

【Figure 16b】

256QAM: results - NUC gains

- 256QAM

| CR | Uniform WF(dB) | NUC WF(dB) | Gain (dB) |
|---|---|---|---|
| 6/15 | 11.95 | 10.95 | 1 |
| 7/15 | 13.6 | 12.68 | 0.92 |
| 8/15 | 15.35 | 14.25 | 1.1 |
| 9/15 | 17.05 | 15.75 | 1.3 |
| 10/15 | 18.7 | 17.25 | 1.45 |
| 11/15 | 20.1 | 18.85 | 1.25 |
| 12/15 | 21.7 | 20.55 | 1.15 |
| 13/15 | 23.25 | 22.4 | 0.85 |

[Figure 17a]
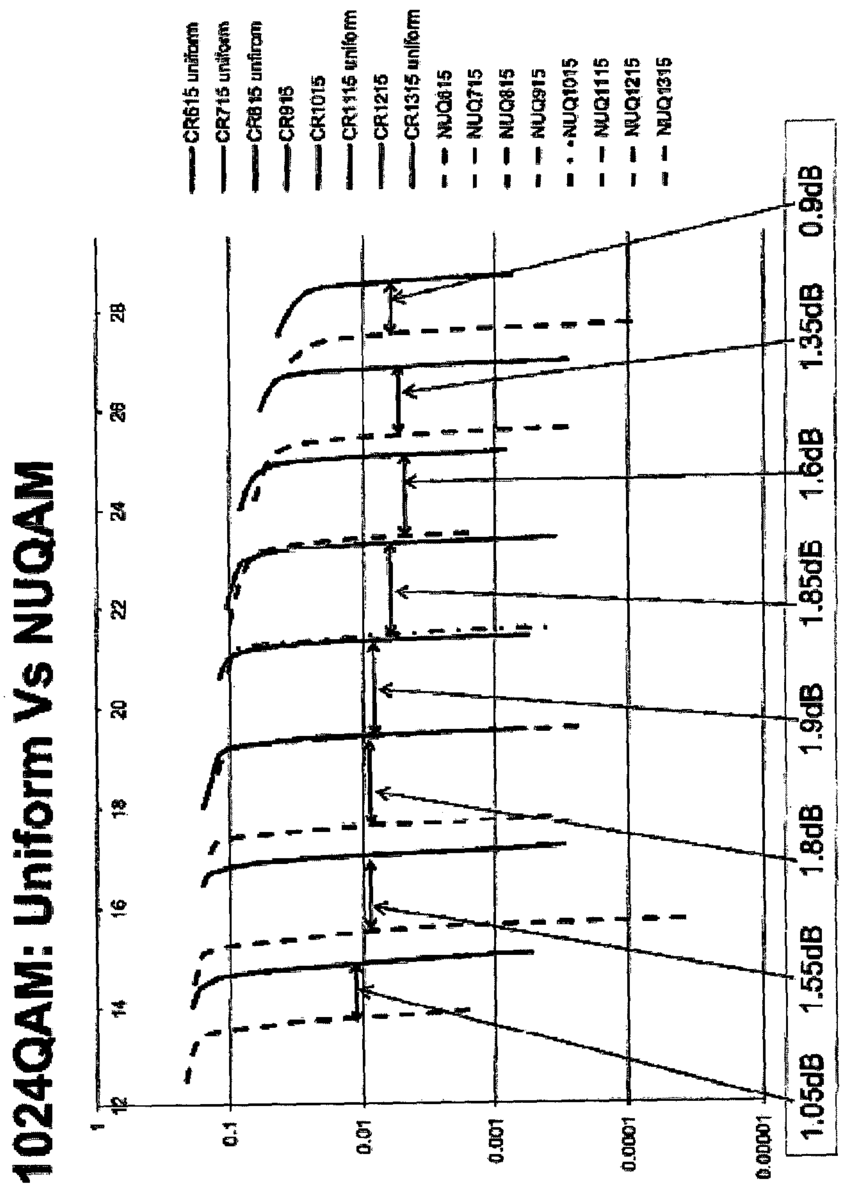

【Figure 17b】

1024QAM: results - NUQAM gains

- 1024QAM:

| CR | Uniform WF(dB) | NUQAM WF(dB) | Gain (dB) |
|---|---|---|---|
| 615 | 15.1 | 14.05 | 1.05 |
| 715 | 17.35 | 15.8 | 1.55 |
| 815 | 19.65 | 17.85 | 1.8 |
| 915 | 21.55 | 19.65 | 1.9 |
| 1015 | 23.55 | 21.7 | 1.85 |
| 1115 | 25.3 | 23.7 | 1.6 |
| 1215 | 27.1 | 25.75 | 1.35 |
| 1315 | 28.7 | 27.8 | 0.9 |

[Figure 18]
16QAM, CR6/15, NUC
A=[0.873+1.989i
0.461+0.758i
1.989+0.872i
0.758+0.461i]
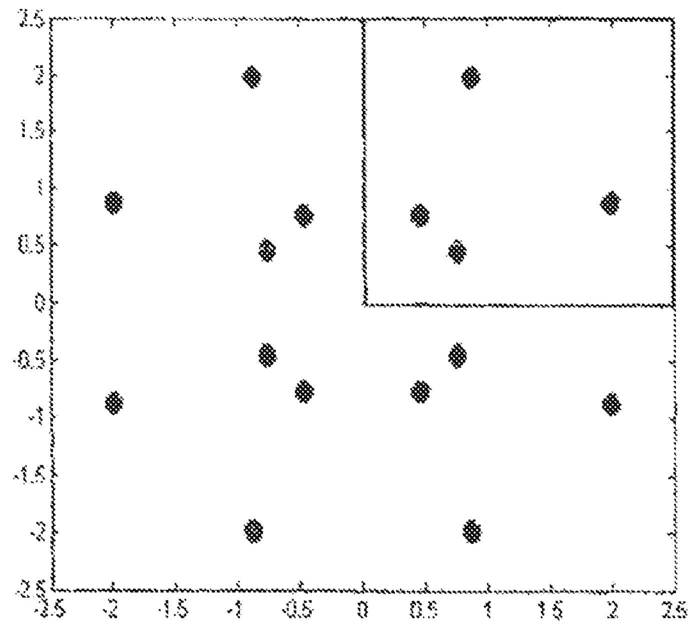
Only the first quadrant is shown, the complete constellations are given by: [A, A*,-A*,-A]

[Figure 19]
16QAM, CR7/15, NUC
A=[0.853+2.013i
0.444+0.752i
2.013+0.852i
0.752+0.444i ]
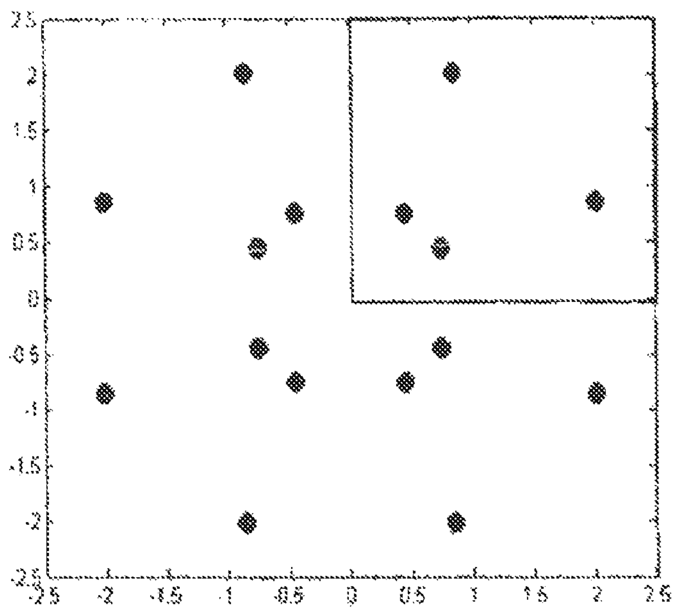
Only the first quadrant is shown, the complete constellations are given by: [A, A*,-A*,-A]

[Figure 20]
16QAM, CR8/15, NUC
A=[0.834+2.006i
0.436+0.765i
2.007+0.833i
0.765+0.436i ]
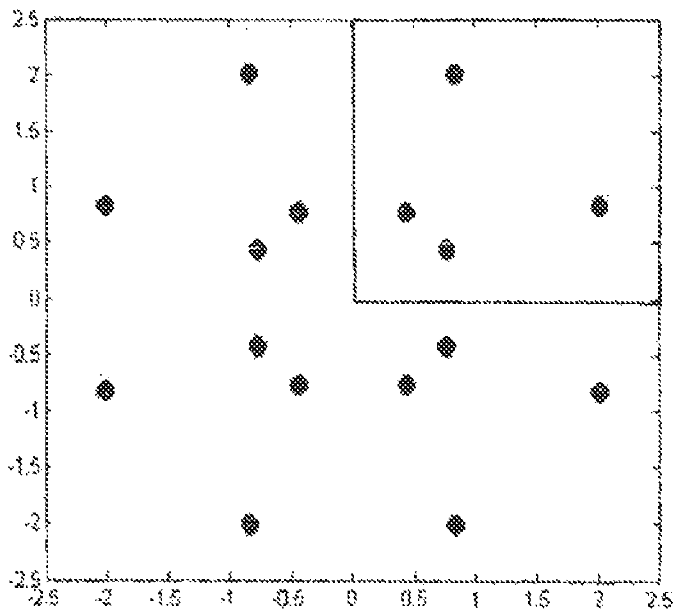
Only the first quadrant is shown, the complete constellations are given by: [A, A*,-A*,-A]

[Figure 21]
16QAM, CR9/15, NUC
A=[0.816+1.988i
0.426+0.79i
1.988+0.815i
0.788+0.426i ]
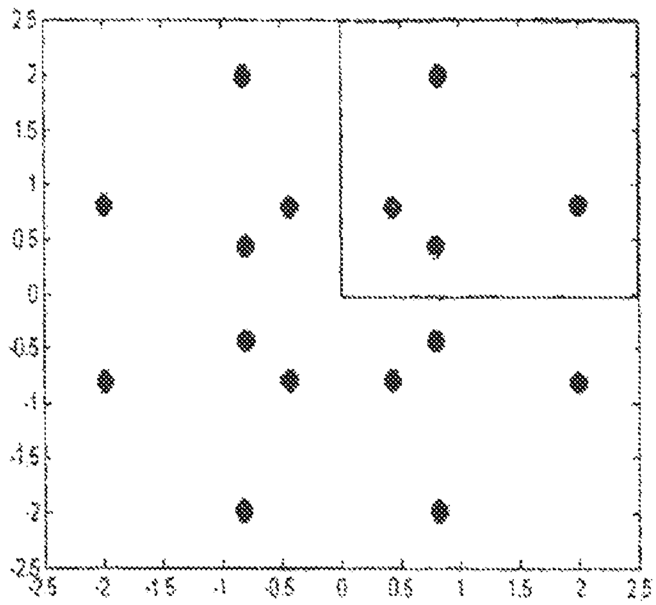
Only the first quadrant is shown, the complete constellations are given by: [A, A*,-A*,-A]

[Figure 22]
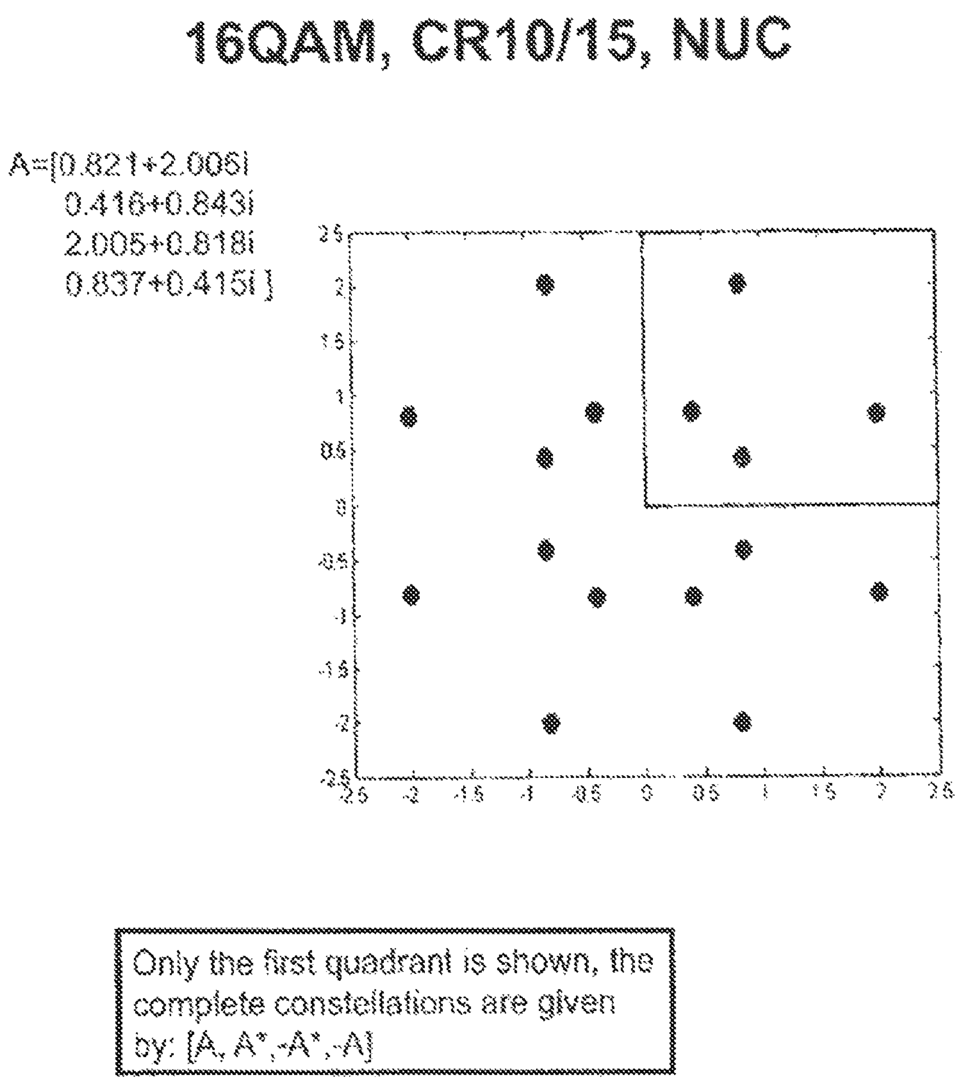

[Figure 23]
16QAM, CR11/15, NUC
A=[0.92+2.053i
0.433+1.064i
1.973+0.758i
0.743+0.374i ]
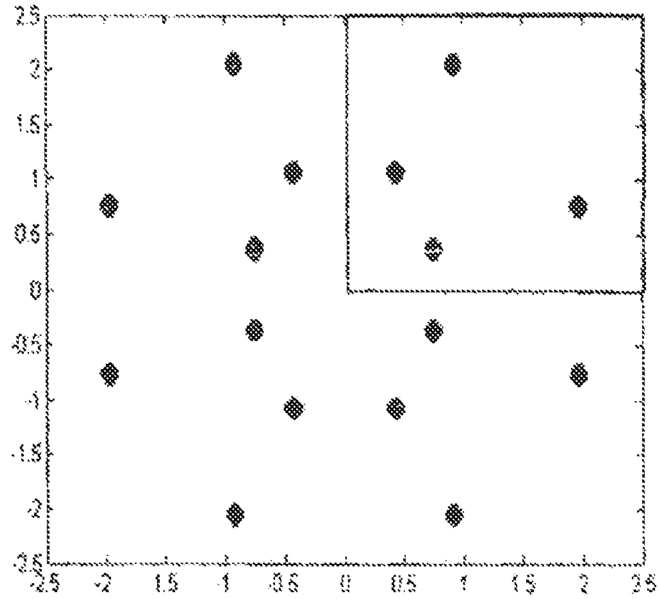
Only the first quadrant is shown, the complete constellations are given by: [A, A*,-A*,-A]

[Figure 24]
16QAM, CR12/15, NUC
A=[1.597+1.625i
0.479+1.597i
1.624+0.49i
0.49+0.479i ]
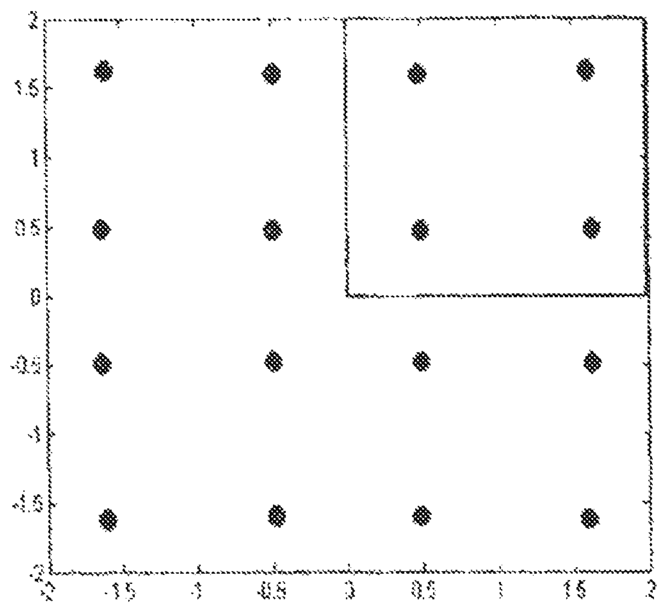
Only the first quadrant is shown, the complete constellations are given by: [A, A*,-A*,-A]

[Figure 25]
16QAM, CR13/15, NUC
A=[1.582+1.584i
0.492+1.582i
1.582+0.493i
0.492+0.492i ]
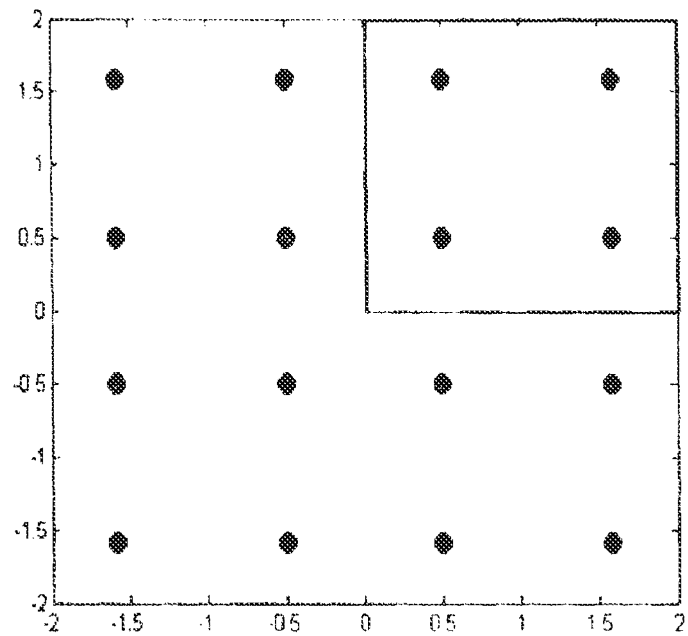
Only the first quadrant is shown, the complete constellations are given by: [A, A*,-A*,-A]

[Figure 26]
64QAM, CR6/15, NUC
A=[0.6840 + 0.3880i
0.3880 + 0.6800i
0.6970 + 0.3290i
0.3310 + 0.6900i
1.3130 + 0.7810i
0.7690 + 1.3130i
1.4780 + 0.3860i
0.3840 + 1.4700i
0.5230 + 0.3080i
0.3090 + 0.5170i
0.5190 + 0.2830i
0.2850 + 0.5110i
1.6560 + 1.0560i
1.0350 + 1.6560i
1.8840 + 0.4170i
0.4160 + 1.8820i]
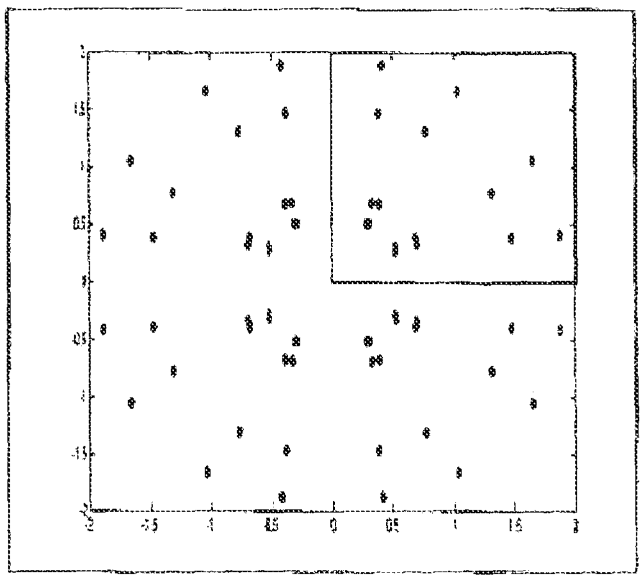
Only the first quadrant is shown, the complete constellations are given by: [A, A*,-A*,-A]

[Figure 27]
64QAM, CR7/15, NUC
A=[0.8040 + 0.4370i
0.4380 + 0.8040i
0.8470 + 0.3290i
0.3290 + 0.8470i
1.2990 + 0.7770i
0.7770 + 1.2990i
1.4630 + 0.3670i
0.3690 + 1.4620i
0.4610 + 0.2650i
0.2660 + 0.4610i
0.4600 + 0.2480i
0.2480 + 0.4610i
1.7880 + 1.1790i
1.1800 + 1.7880i
2.0800 + 0.4150i
0.4150 + 2.0810i]
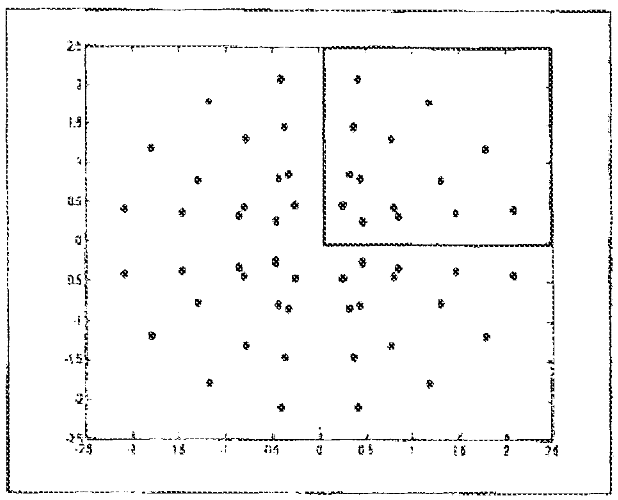
Only the first quadrant is shown, the complete constellations are given by: [A, A*,-A*,-A]

[Figure 28]
64QAM, CR8/15, NUC
A=[0.8540 + 0.4730i
0.4720 + 0.8540i
0.9300 + 0.2990i
0.2990 + 0.9290i
1.2690 + 0.7870i
0.7860 + 1.2700i
1.4470 + 0.3370i
0.3380 + 1.4480i
0.4300 + 0.2440i
0.2440 + 0.4300i
0.4310 + 0.2230i
0.2230 + 0.4310i
1.7930 + 1.2000i
1.2010 + 1.7940i
2.1150 + 0.4150i
0.4150 + 2.1150i]
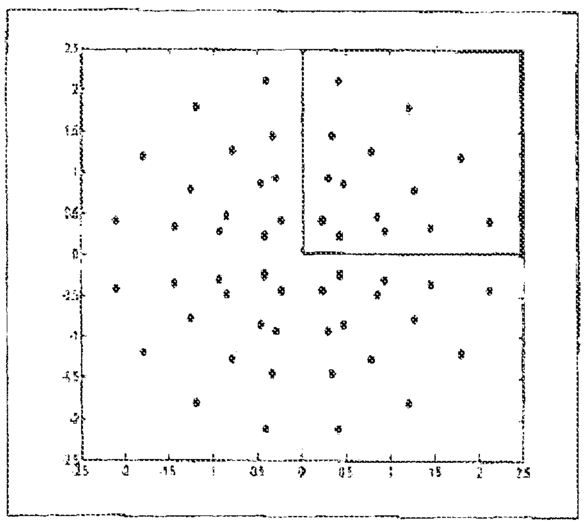
Only the first quadrant is shown, the complete constellations are given by: [A, A*,-A*,-A]

[Figure 29]
64QAM, CR9/15, NUC
A=[0.8730 + 0.5100i
0.5090 + 0.8730i
0.9780 + 0.2640i
0.2650 + 0.9780i
1.2510 + 0.8130i
0.8130 + 1.2510i
1.4530 + 0.3070i
0.3080 + 1.4540i
0.4320 + 0.2400i
0.2400 + 0.4320i
0.4340 + 0.2080i
0.2090 + 0.4330i
1.7870 + 1.1950i
1.1970 + 1.7870i
2.1090 + 0.4150i
0.4150 + 2.1090i]
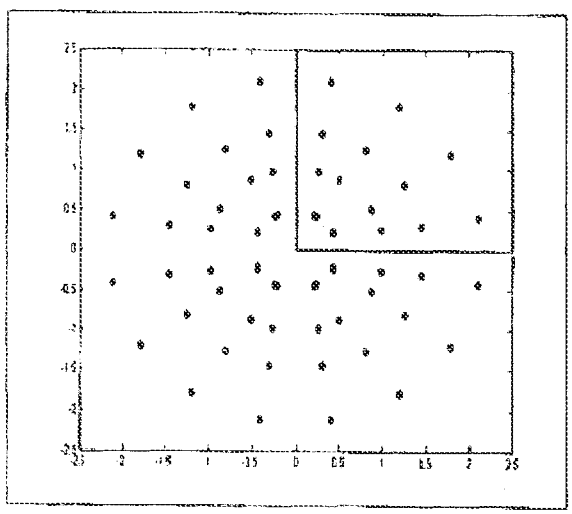
Only the first quadrant is shown, the complete constellations are given by: [A, A*,-A*,-A]

[Figure 30]
64QAM, CR10/15, NUC
A=[0.8830 + 0.5390i
0.5430 + 0.8830i
1.0040 + 0.2410i
0.2410 + 1.0050i
1.2520 + 0.8330i
0.8340 + 1.2510i
1.4710 + 0.2930i
0.2940 + 1.4710i
0.4430 + 0.2360i
0.2370 + 0.4460i
0.4510 + 0.1950i
0.1950 + 0.4560i
1.7800 + 1.1880i
1.1890 + 1.7800i
2.1000 + 0.4100i
0.4160 + 2.0990i]
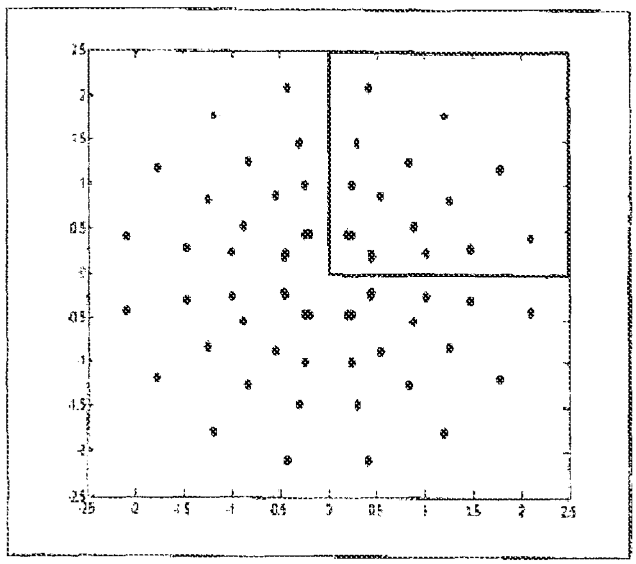
Only the first quadrant is shown, the complete constellations are given by: [A, A*,-A*,-A]

[Figure 31]
64QAM, CR11/15, NUC
A=[0.8700 + 0.4960i
0.6150 + 0.8760i
0.9660 + 0.1990i
0.2430 + 1.0910i
1.2820 + 0.7930i
0.8970 + 1.2290i
1.4790 + 0.2730i
0.3220 + 1.5100i
0.3700 + 0.2240i
0.2810 + 0.5760i
0.3250 + 0.1780i
0.1790 + 0.6220i
1.7760 + 1.1550i
1.1970 + 1.7490i
2.0820 + 0.4030i
0.4280 + 2.0880i]
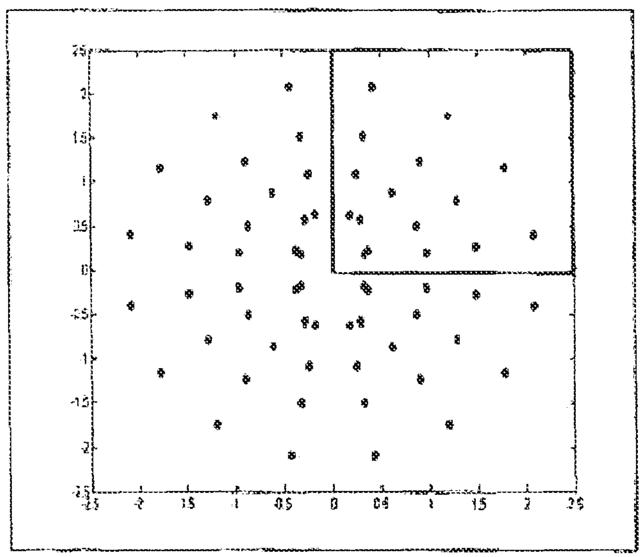
Only the first quadrant is shown, the complete constellations are given by: [A, A*,-A*,-A]

[Figure 32]
64QAM, CR12/15, NUC
A=[0.9350 + 0.4770i
0.6390 + 0.8420i
1.1490 + 0.1890i
0.2120 + 1.0360i
1.2930 + 0.8290i
0.8680 + 1.2220i
1.5790 + 0.3120i
0.3110 + 1.4640i
0.5610 + 0.2090i
0.4360 + 0.5560i
0.1910 + 0.1590i
0.1610 + 0.5710i
1.7150 + 1.2030i
1.1130 + 1.7330i
2.1100 + 0.4470i
0.3880 + 2.0190i]
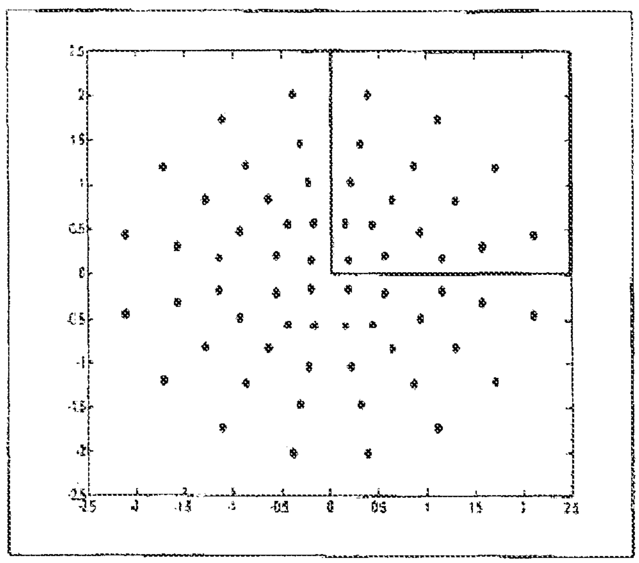
Only the first quadrant is shown, the complete constellations are given by: [A, A*,-A*,-A]

[Figure 33]
64QAM, CR13/15, NUC
A=[1.0320 + 0.4990i
0.6400 + 0.8250i
1.3380 + 0.2250i
0.2070 + 0.9440i
1.2180 + 0.9130i
0.7750 + 1.2350i
1.8520 + 0.2890i
0.2640 + 1.3850i
0.7020 + 0.1830i
0.5200 + 0.5020i
0.2130 + 0.1410i
0.1790 + 0.5110i
1.4560 + 1.4060i
0.9090 + 1.7550i
1.8670 + 0.8650i
0.3080 + 1.9180i]
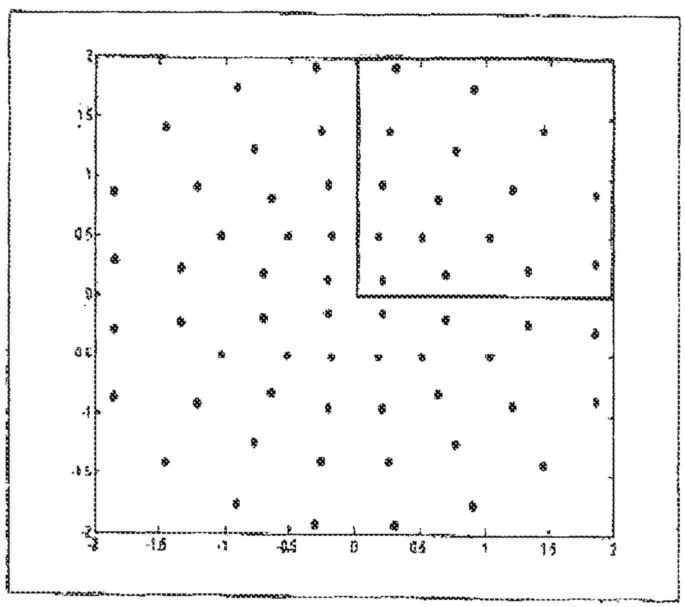
Only the first quadrant is shown, the complete constellations are given by: [A, A*,-A*,-A]

[Figure 34]
256QAM, CR6/15, NUC
A=[2.4340 + 1.6370i
2.8810 + 0.5690i
1.3960 + 0.8710i
1.6000 + 0.3670i
1.9560 + 1.3350i
2.3280 + 0.4590i
1.4280 + 0.9080i
1.6450 + 0.3700i
1.5940 + 2.4410i
0.5740 + 2.8620i
0.8630 + 1.3980i
0.3860 + 1.5880i
1.3210 + 1.9620i
0.4390 + 2.3250i
0.8970 + 1.4310i
0.3650 + 1.6340i
1.9870 + 1.3260i
2.3290 + 0.4720i
1.4300 + 0.9010i
1.6450 + 0.3700i
1.8890 + 1.2770i
2.2280 + 0.4330i
1.4630 + 0.9360i
1.6920 + 0.3720i
1.3020 + 1.9790i
0.4570 + 2.3220i
0.6980 + 1.4320i
0.3710 + 1.6320i
1.2820 + 1.8760i
0.4140 + 2.2240i
0.9300 + 1.4660i
0.3590 + 1.6800i
0.5000 + 0.2770i
0.5040 + 0.2470i
0.9700 + 0.5430i
1.0620 + 0.3240i
0.4970 + 0.2770i
0.4890 + 0.2470i
0.9720 + 0.5460i
1.0660 + 0.3240i
0.2760 + 0.4960i
0.2490 + 0.4910i
0.5340 + 0.9630i
0.3200 + 1.0550i
0.2740 + 0.4890i
0.2480 + 0.4930i
0.5410 + 0.9680i
0.3220 + 1.0620i
0.4970 + 0.2750i
0.5030 + 0.2460i
0.9730 + 0.5480i
1.0640 + 0.3230i
0.4910 + 0.2720i
0.4970 + 0.2430i
0.9780 + 0.5500i
1.0710 + 0.3240i
0.2770 + 0.4900i
0.2480 + 0.4910i
0.5410 + 0.9690i
0.3210 + 1.0650i
0.2730 + 0.4860i
0.2480 + 0.4840i
0.5450 + 0.9710i
0.3230 + 1.0700i]
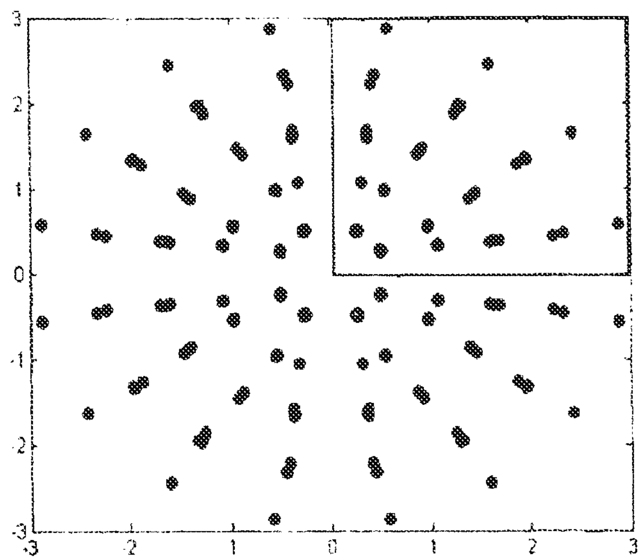
Only the first quadrant is shown, the complete constellations are given by: [A, A*,-A*,-A]

[Figure 35]
256QAM, CR7/15, NUC
A=[2.4840 + 1.7590i
2.9760 + 0.5740i
1.3530 + 0.8810i
1.5820 + 0.3270i
1.8040 + 1.4950i
2.3560 + 0.2440i
1.3770 + 0.9870i
1.5630 + 0.2890i
1.6480 + 2.5000i
0.6950 + 2.9400i
0.8660 + 1.3500i
0.3200 + 1.5620i
1.4630 + 1.8350i
0.2460 + 2.3720i
0.9560 + 1.3720i
0.2600 + 1.6350i
2.1430 + 1.1830i
2.3540 + 0.7210i
1.4210 + 0.8730i
1.8230 + 0.3810i
1.9670 + 1.2820i
2.2310 + 0.4370i
1.4430 + 0.9500i
1.7010 + 0.3500i
1.1260 + 2.1070i
0.6740 + 2.2980i
0.8590 + 1.4180i
0.3680 + 1.6040i
1.2440 + 1.8700i
0.4210 + 2.2220i
0.9430 + 1.4410i
0.3300 + 1.6750i
0.5020 + 0.2680i
0.5130 + 0.2230i
0.9870 + 0.5930i
1.1180 + 0.2770i
0.4970 + 0.2680i
0.5090 + 0.2240i
0.9810 + 0.6000i
1.1120 + 0.2730i
0.2640 + 0.4890i
0.2240 + 0.4900i
0.5890 + 0.9770i
0.2760 + 1.1830i
0.2830 + 0.4840i
0.2240 + 0.4810i
0.5940 + 0.9740i
0.2710 + 1.1030i
0.4980 + 0.2660i
0.5140 + 0.2220i
0.9920 + 0.5800i
1.1120 + 0.2800i
0.4930 + 0.2630i
0.5090 + 0.2200i
0.9820 + 0.5910i
1.1030 + 0.2770i
0.2660 + 0.4870i
0.2240 + 0.4920i
0.5830 + 0.9820i
0.2800 + 1.1030i
0.2600 + 0.4800i
0.2220 + 0.4850i
0.5880 + 0.9750i
0.2760 + 1.1000i]
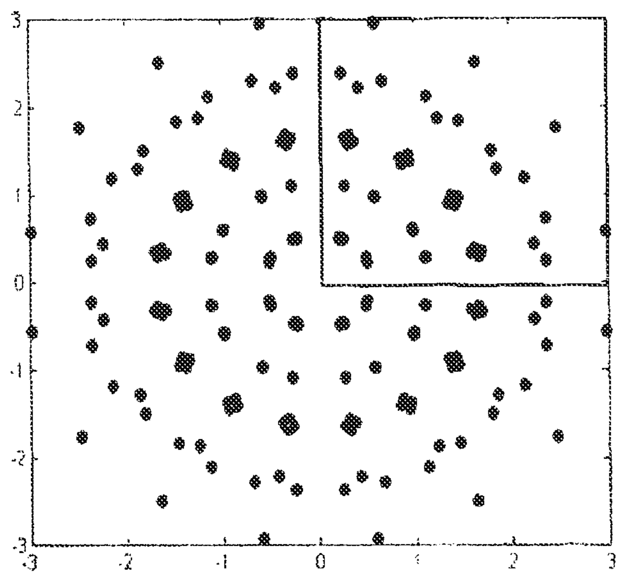
Only the first quadrant is shown, the complete constellations are given by: [A, A*,-A*,-A]

[Figure 36]
256QAM, CR8/15, NUC
A=[
1.8840 + 2.2380i
2.9290 + 0.3680i
1.2540 + 1.0580i
1.7540 + 0.2700i
1.6300 + 1.6320i
2.3920 + 0.2980i
1.3270 + 1.1600i
1.8990 + 0.2740i
1.2190 + 2.2010i
1.0370 + 2.8200i
0.7990 + 1.3380i
0.2270 + 1.4330i
1.2120 + 1.6520i
0.3470 + 2.9080i
0.6600 + 1.3850i
0.2220 + 1.4320i
2.4120 + 1.7250i
2.7210 + 1.0700i
1.3660 + 0.9590i
1.6840 + 0.5320i
1.9310 + 1.3670i
2.2300 + 0.8750i
1.4790 + 1.0380i
1.8180 + 0.6250i
0.8040 + 2.0270i
0.3350 + 2.1450i
0.7220 + 1.4300i
0.2450 + 1.5030i
0.8550 + 1.9180i
0.2750 + 2.2130i
0.7670 + 1.4640i
0.2400 + 1.5590i
0.6730 + 0.2270i
0.7450 + 0.1920i
0.9970 + 0.7000i
1.3150 + 0.2500i
0.6610 + 0.2780i
0.7480 + 0.1920i
0.9780 + 0.6900i
1.2850 + 0.2460i
0.2580 + 0.3450i
0.2130 + 0.3560i
0.5730 + 0.9330i
0.2300 + 0.9510i
0.2570 + 0.3420i
0.2130 + 0.3620i
0.5620 + 0.9260i
0.2260 + 0.9790i
0.6850 + 0.2790i
0.7540 + 0.1850i
1.0340 + 0.6740i
1.2800 + 0.3200i
0.6870 + 0.2790i
0.7550 + 0.1930i
1.0100 + 0.6590i
1.2470 + 0.3080i
0.2610 + 0.3540i
0.2130 + 0.3710i
0.5570 + 0.9180i
0.2340 + 0.9810i
0.2610 + 0.3560i
0.2130 + 0.3700i
0.5440 + 0.9110i
0.2300 + 0.8570i]
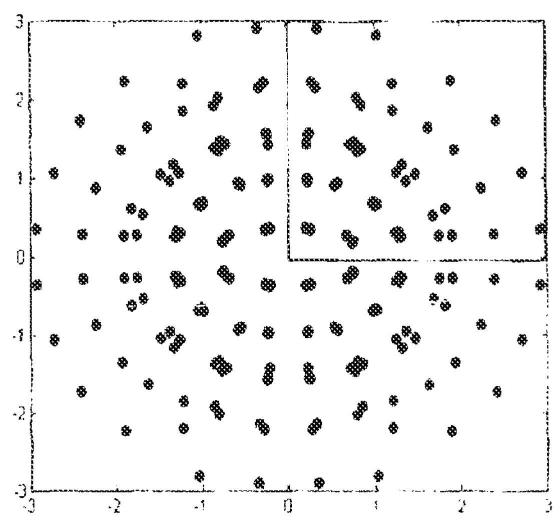
Only the first quadrant is shown, the complete constellations are given by: [A, A*,-A*,-A]

[Figure 37]
256QAM, CR9/15, NUC
A=[2.0250 + 2.0790i
2.8630 + 0.3330i
1.2290 + 1.0430i
1.7080 + 0.2270i
1.6570 + 1.5570i
2.3270 + 0.2680i
1.2940 + 1.1520i
1.3710 + 0.2280i
1.4270 + 2.3740i
0.9110 + 2.7520i
0.7830 + 1.3340i
0.2490 + 1.4830i
1.3650 + 1.7800i
0.2990 + 2.8780i
0.8780 + 1.3530i
0.2040 + 1.4980i
2.4180 + 1.5590i
2.6930 + 0.9780i
1.3950 + 0.8920i
1.6270 + 0.5330i
1.9350 + 1.2540i
2.1850 + 0.7990i
1.5210 + 0.9830i
1.7800 + 0.6170i
0.8890 + 2.0400i
0.5620 + 2.2050i
0.7310 + 1.5410i
0.3250 + 1.7010i
1.0690 + 1.8540i
0.2310 + 2.2840i
0.8250 + 1.6290i
0.2370 + 1.7420i
0.8310 + 0.2850i
0.7060 + 0.1700i
0.9720 + 0.7550i
1.7390 + 0.2160i
0.5470 + 0.2790i
0.7260 + 0.1730i
0.8390 + 0.7420i
1.2550 + 0.2050i
0.2220 + 0.2470i
0.1850 + 0.2400i
0.6080 + 1.0080i
0.2120 + 1.1040i
0.2200 + 0.2500i
0.1850 + 0.2450i
0.6020 + 0.9900i
0.2010 + 1.0970i
0.6720 + 0.3480i
0.7820 + 0.2110i
1.0050 + 0.8710i
1.2480 + 0.3260i
0.6810 + 0.3570i
0.7770 + 0.2100i
0.9530 + 0.6550i
1.1890 + 0.2970i
0.2870 + 0.4710i
0.1930 + 0.5000i
0.6150 + 0.8940i
0.2060 + 0.9390i
0.2880 + 0.4740i
0.1930 + 0.5040i
0.6110 + 0.8790i
0.2020 + 0.9340i]
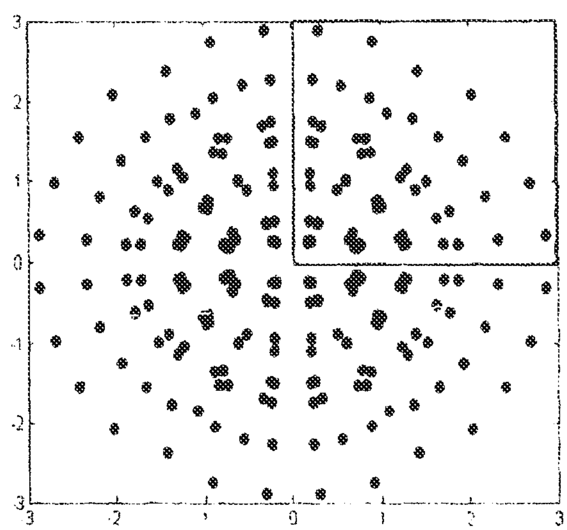
Only the first quadrant is shown, the complete constellations are given by: [A, A*,-A*,-A]

[Figure 38]
256QAM, CR10/15, NUC
A=[2.0690 + 1.8880i
2.7020 + 0.2840i
1.2180 + 1.0440i
1.5900 + 0.1870i
1.6650 + 1.4310i
2.1920 + 0.2340i
1.2590 + 1.1850i
1.7760 + 0.1980i
1.5310 + 2.3100i
0.9550 + 2.6960i
0.6780 + 1.4100i
0.3190 + 1.5200i
1.4660 + 1.7170i
0.3140 + 2.3500i
0.8800 + 1.3690i
0.1700 + 1.5470i
2.3850 + 1.3740i
2.5840 + 0.8500i
1.3880 + 0.8190i
1.5040 + 0.6150i
1.9060 + 1.1150i
2.1020 + 0.6890i
1.5620 + 0.9040i
1.7080 + 0.5700i
0.9760 + 2.0640i
0.6370 + 2.2440i
0.7390 + 1.7080i
0.4440 + 1.8340i
1.1940 + 1.7990i
0.2200 + 2.3280i
0.9550 + 1.6820i
0.1750 + 1.9040i
0.6330 + 0.1790i
0.7030 + 0.1250i
0.9550 + 0.8770i
1.2450 + 0.1660i
0.5390 + 0.1820i
0.7340 + 0.1370i
0.9110 + 0.9000i
1.1830 + 0.1530i
0.2250 + 0.2020i
0.1490 + 0.2160i
0.5950 + 1.1140i
0.2290 + 1.2170i
0.2200 + 0.2000i
0.1480 + 0.2200i
0.6350 + 1.0820i
0.1770 + 1.2210i
0.6440 + 0.4370i
0.7910 + 0.2910i
0.8490 + 0.6800i
1.1590 + 0.3970i
0.6520 + 0.4460i
0.8040 + 0.2850i
0.8680 + 0.6910i
1.1010 + 0.3580i
0.3410 + 0.5810i
0.1610 + 0.5940i
0.4670 + 0.8670i
0.1790 + 0.9270i
0.3470 + 0.5630i
0.1600 + 0.5940i
0.4830 + 0.8570i
0.1690 + 0.9270i]
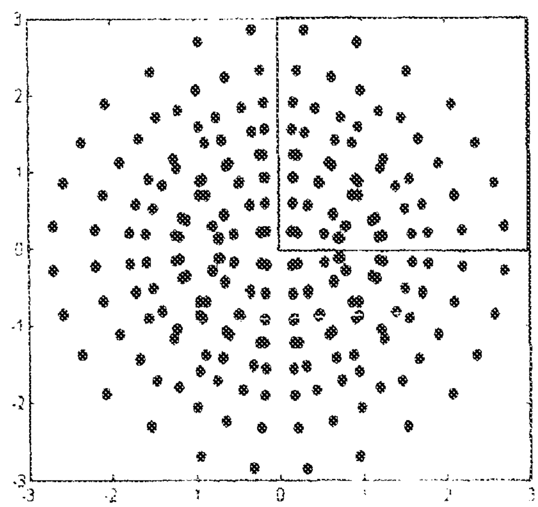
Only the first quadrant is shown, the complete constellations are given by: [A, A*,-A*,-A]

[Figure 39]
256QAM, CR11/15, NUC
A=[2.0510 + 1.8030i
2.6280 + 0.2710i
1.2330 + 1.0600i
1.5880 + 0.1900i
1.8630 + 1.4180i
2.1680 + 0.2260i
1.3020 + 1.2270i
1.8080 + 0.2020i
1.4730 + 2.2780i
0.8780 + 2.5300i
0.6190 + 1.4170i
0.3470 + 1.4950i
1.4980 + 1.7520i
0.2850 + 2.7410i
0.8820 + 1.3580i
0.1410 + 1.5370i
2.3270 + 1.3110i
2.5310 + 0.8090i
1.3980 + 0.8220i
1.4920 + 0.5310i
1.9130 + 1.0920i
2.0960 + 0.6580i
1.6210 + 0.9160i
1.7470 + 0.5600i
0.9710 + 2.0620i
0.6010 + 2.2120i
0.7200 + 1.7240i
0.4580 + 1.8270i
1.1850 + 1.7790i
0.1890 + 2.2720i
0.9530 + 1.5670i
0.1570 + 1.9810i
0.5570 + 0.1490i
0.8390 + 0.1200i
0.9950 + 0.9170i
1.2980 + 0.1550i
0.5510 + 0.1480i
0.8750 + 0.1190i
0.8770 + 0.9440i
1.2120 + 0.1380i
0.3140 + 0.1870i
0.1160 + 0.2010i
0.5520 + 1.1330i
0.2480 + 1.2000i
0.3130 + 0.1790i
0.1180 + 0.2000i
0.6590 + 1.0730i
0.1430 + 1.2100i
0.8520 + 0.4400i
0.8700 + 0.3350i
1.0260 + 0.7200i
1.1850 + 0.4630i
0.6680 + 0.4730i
0.8830 + 0.3350i
0.8260 + 0.7220i
1.1190 + 0.4070i
0.3930 + 0.5320i
0.1360 + 0.5600i
0.4470 + 0.8430i
0.1700 + 0.8870i
0.4020 + 0.5400i
0.1310 + 0.5590i
0.4990 + 0.8270i
0.1450 + 0.8890i]
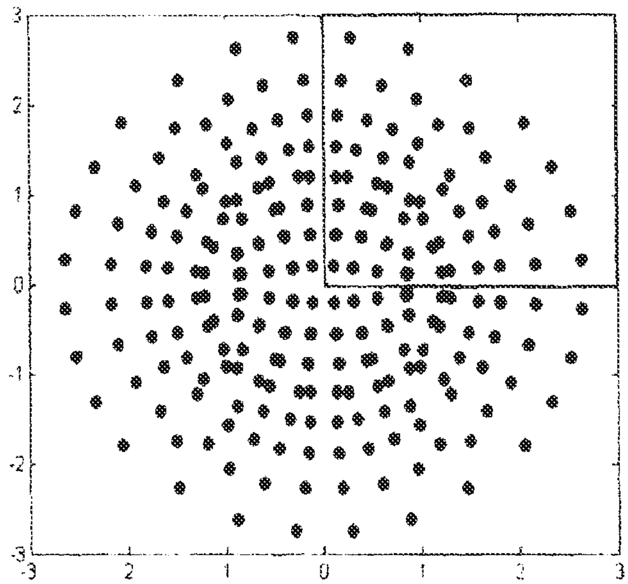
Only the first quadrant is shown, the complete constellations are given by: [A, A*,-A*,-A]

[Figure 40]
256QAM, CR12/15, NUC
A=[2.1080 + 1.5760i
2.5630 + 0.2350i
1.2940 + 1.0370i
1.5440 + 0.1830i
1.6980 + 1.4350i
2.1580 + 0.2090i
1.4270 + 1.2330i
1.8310 + 0.1760i
1.2720 + 2.2900i
0.7520 + 2.4970i
0.6860 + 1.4080i
0.4140 + 1.4940i
1.6720 + 1.9260i
0.2540 + 2.5880i
0.9650 + 1.2970i
0.1410 + 1.5440i
2.3310 + 1.1370i
2.4880 + 0.6990i
1.4430 + 0.7600i
1.5080 + 0.4650i
1.9180 + 1.0800i
2.0990 + 0.6280i
1.6790 + 0.8700i
1.7910 + 0.5250i
0.9850 + 1.9300i
0.5770 + 2.1180i
0.7980 + 1.6870i
0.4860 + 1.7840i
1.3040 + 1.7590i
0.1900 + 2.1780i
1.0930 + 1.5180i
0.1850 + 1.8370i
0.4670 + 0.1900
0.6860 + 0.1110i
1.1150 + 0.8960i
1.2980 + 0.1540i
0.3780 + 0.0950i
0.8820 + 0.1050i
0.9270 + 0.8960i
1.1030 + 0.1250i
0.2680 + 0.3390i
0.1090 + 0.3990i
0.5810 + 1.1630i
0.3410 + 1.2400i
0.1870 + 0.1370i
0.0780 + 0.1650i
0.7820 + 1.0490i
0.1150 + 1.2680i
0.5710 + 0.3890i
0.7130 + 0.2810i
1.1820 + 0.5780i
1.2350 + 0.4370i
0.7080 + 0.5370i
0.8500 + 0.3380i
0.8690 + 0.8750i
1.0330 + 0.3920i
0.3850 + 0.5520i
0.1610 + 0.6330i
0.4750 + 0.9280i
0.2740 + 0.9830i
0.4880 + 0.6470i
0.1240 + 0.7340i
0.5920 + 0.8330i
0.1220 + 0.9750i]
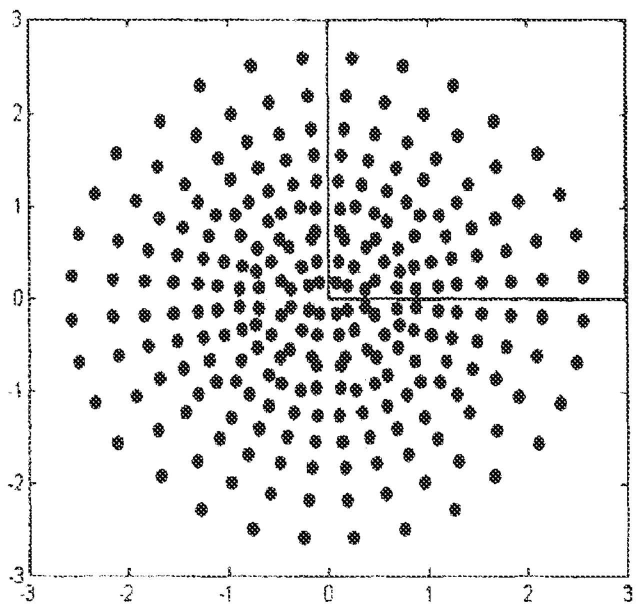
Only the first quadrant is shown, the complete constellations are given by: [A, A*,-A*,-A]

[Figure 41]
256QAM, CR13/15, NUC
A=[1.9370 + 1.6040i
2.5090 + 0.2250i
1.4630 + 1.0470i
1.5720 + 0.1520i
1.5480 + 1.4540i
2.1480 + 0.1770i
1.2460 + 1.2730i
1.8440 + 0.1570i
1.1550 + 2.2090i
0.6760 + 2.3830i
0.5820 + 1.3850i
0.3950 + 1.4450i
1.5510 + 1.9000i
0.2260 + 2.4360i
0.9400 + 1.2910i
0.1330 + 1.4760i
2.2070 + 1.0420i
2.4590 + 0.7020i
1.5430 + 0.7370i
1.5570 + 0.4470i
1.8510 + 1.1830i
2.1420 + 0.5410i
1.8320 + 0.8290i
1.8370 + 0.4750i
0.8820 + 1.9540i
0.5200 + 2.0380i
0.7290 + 1.6630i
0.4390 + 1.7300i
1.2220 + 1.7560i
0.1700 + 2.0730i
1.0060 + 1.5500i
0.1490 + 1.7810i
0.4560 + 0.2370i
0.6790 + 0.1010i
1.2370 + 0.9140i
1.3390 + 0.1490i
0.3720 + 0.0880i
0.9190 + 0.1050i
1.0380 + 0.9610i
1.1240 + 0.1290i
0.2810 + 0.3620i
0.1090 + 0.4230i
0.5900 + 1.1390i
0.3550 + 1.1910i
0.2000 + 0.1300i
0.0710 + 0.1550i
0.8220 + 1.0500i
0.1200 + 1.2150i
0.5720 + 0.3920i
0.7120 + 0.2710i
1.2820 + 0.6740i
1.3020 + 0.4280i
0.7850 + 0.5420i
0.8860 + 0.3400i
0.9780 + 0.6810i
1.0780 + 0.3990i
0.4360 + 0.5850i
0.2440 + 0.6800i
0.5000 + 0.9000i
0.3160 + 0.9280i
0.6390 + 0.6620i
0.0890 + 0.7370i
0.7270 + 0.8370i
0.1120 + 0.9560i]
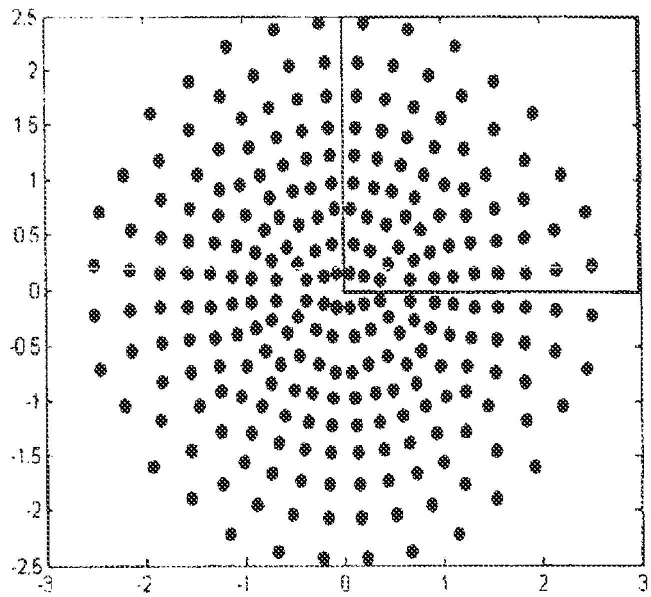
Only the first quadrant is shown, the complete constellations are given by: [A, A*,-A*,-A]

[Figure 42]
1024QAM, CR6/15, NUC
A=[3.28
1.35
0.78
0.28
0.76
0.27
2.09
1.5
0.76
0.27
2.2
1.5
2.65
1.35
0.78
0.28 ]
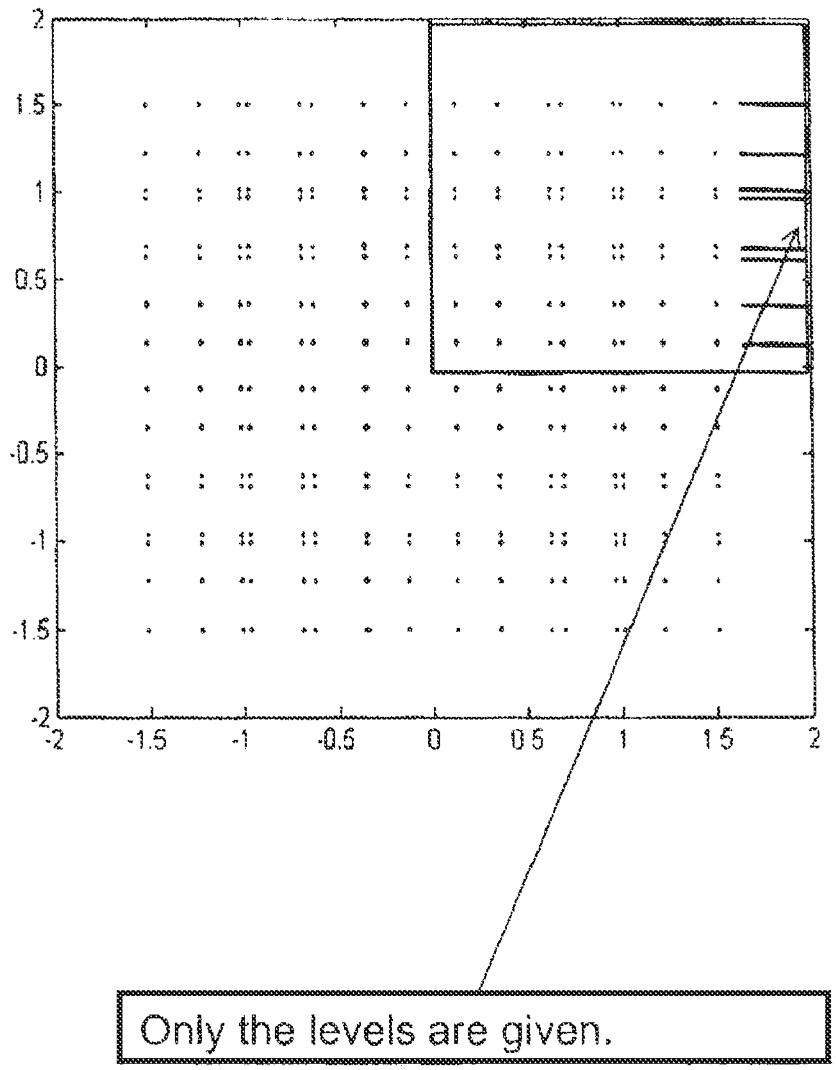

[Figure 43]
1024QAM, CR7/15, NUC
A=[3.39
1.33
0.8
0.26
0.75
0.26
2.05
1.52
0.76
0.26
2.19
1.48
2.73
1.31
0.8
0.26 ]
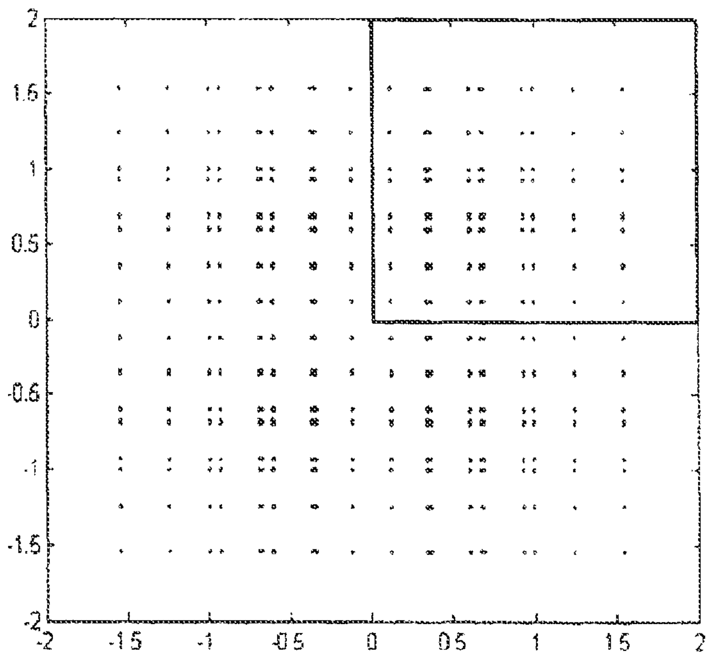
Only the levels are given.

[Figure 44]
1024QAM, CR8/15, NUC
A=[3.38
1.29
0.85
0.23
0.72
0.28
2.06
1.63
0.72
0.28
2.23
1.57
2.75
1.29
0.85
0.23 ]
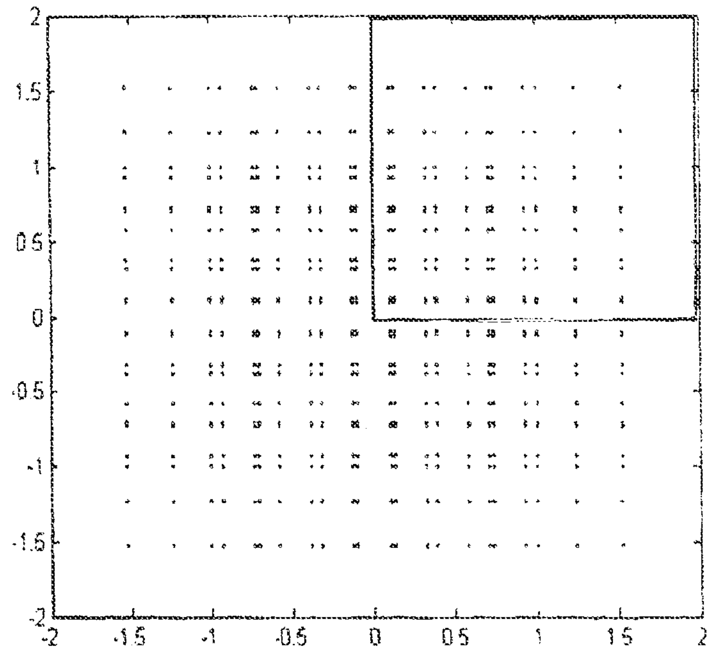
Only the levels are given.

[Figure 45]
1024QAM, CR9/15, NUC
A=[3.29
1.28
0.94
0.15
0.68
0.37
2.06
1.7
0.68
0.37
2.29
1.62
2.73
1.29
0.94
0.15 ]
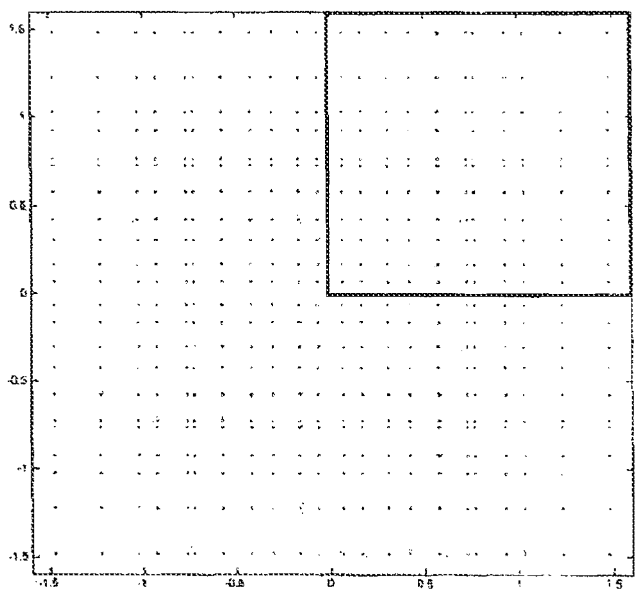
Only the levels are given.

[Figure 46]
1024QAM, CR10/15, NUC
A=[3.21
1.26
0.97
0.13
0.68
0.4
2.04
1.74
0.68
0.4
2.35
1.59
2.73
1.31
0.96
0.13 ]
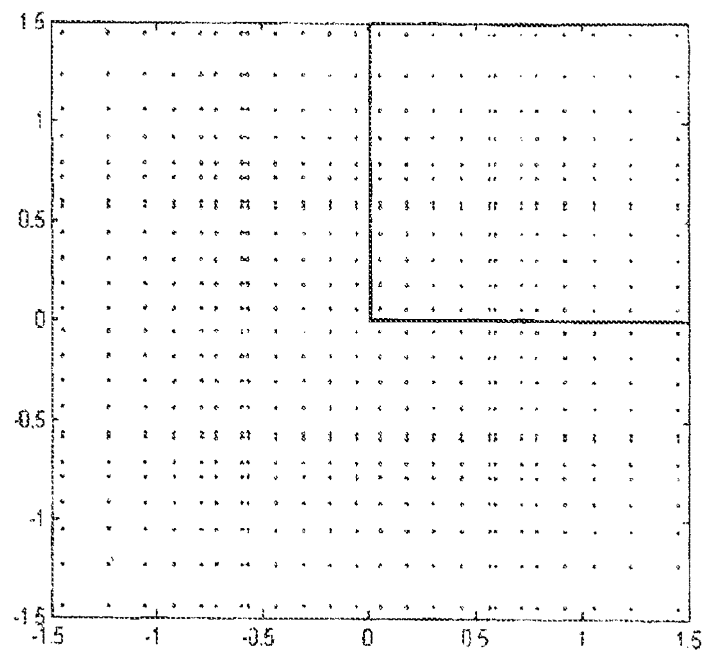
Only the levels are given.

[Figure 47]
1024QAM, CR11/15, NUC
A=[3.14
1.22 1
0.13
0.65
0.4
2.07
1.81
0.68
0.39
2.37
1.59
2.72
1.37
0.92
0.13 ]
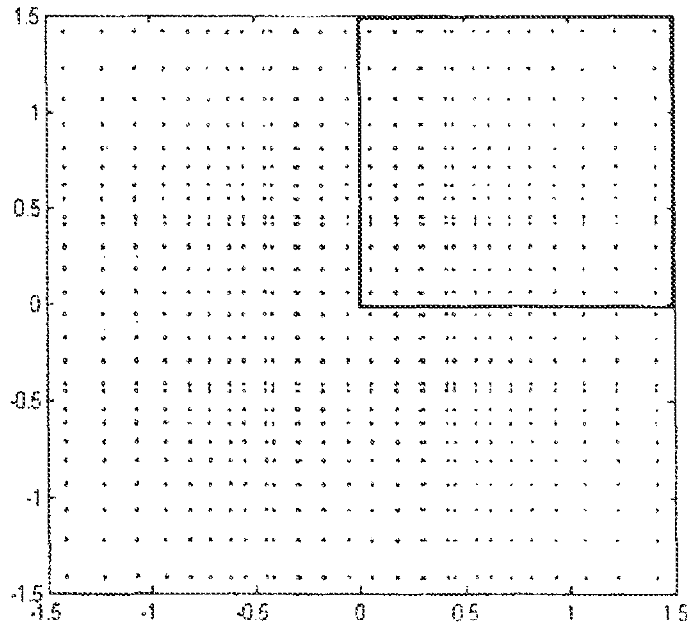
Only the levels are given.

[Figure 48]
1024QAM, CR12/15, NUC
A=[3.01
1.24
1.07
0.08
0.62
0.46
2.09
1.84
0.75
0.34
2.36
1.62
2.66
1.42
0.91
0.19 ]
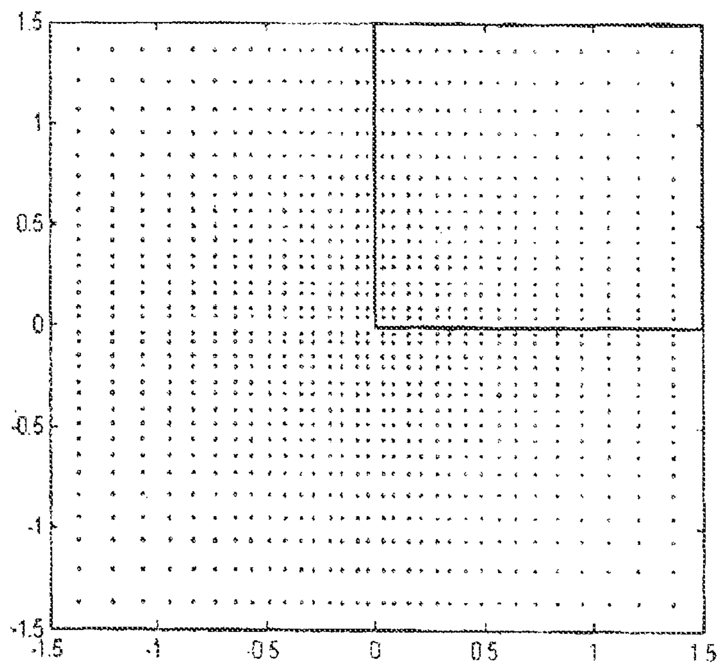
Only the levels are given.

[Figure 49]
1024QAM, CR13/15, NUC
A=[2.88
1.27
1.1
0.07
0.62
0.48
2.08
1.85
0.77
0.34
2.32
1.64
2.58
1.45
0.93
0.2 ]
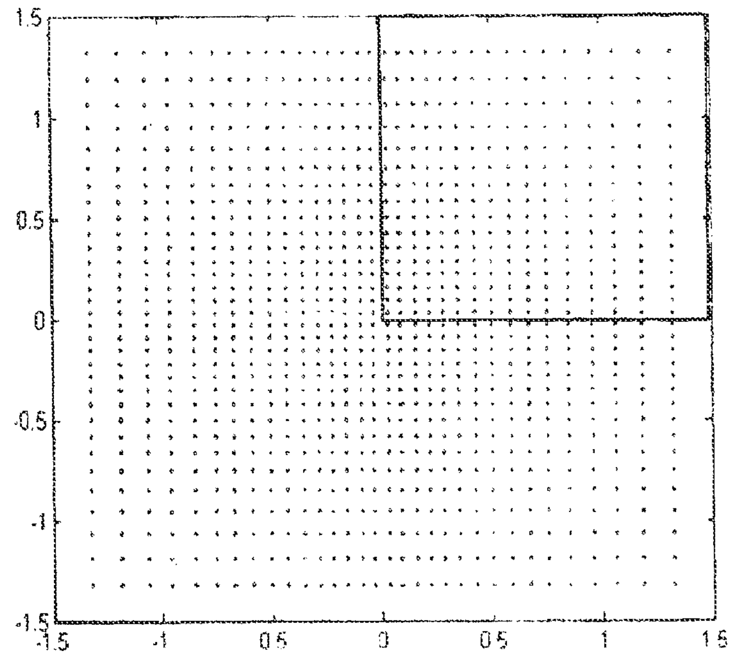
Only the levels are given.

【Figure 50】
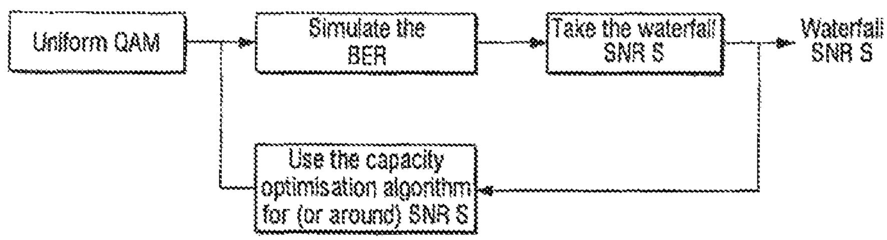
【Figure 51】
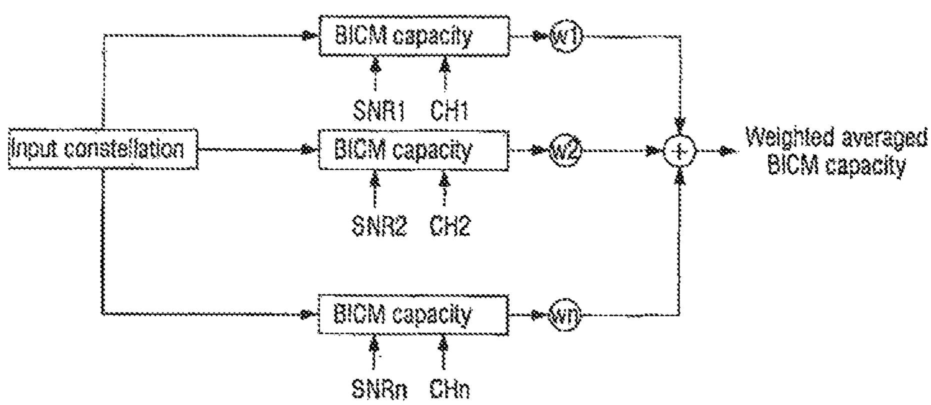

【Figure 52】
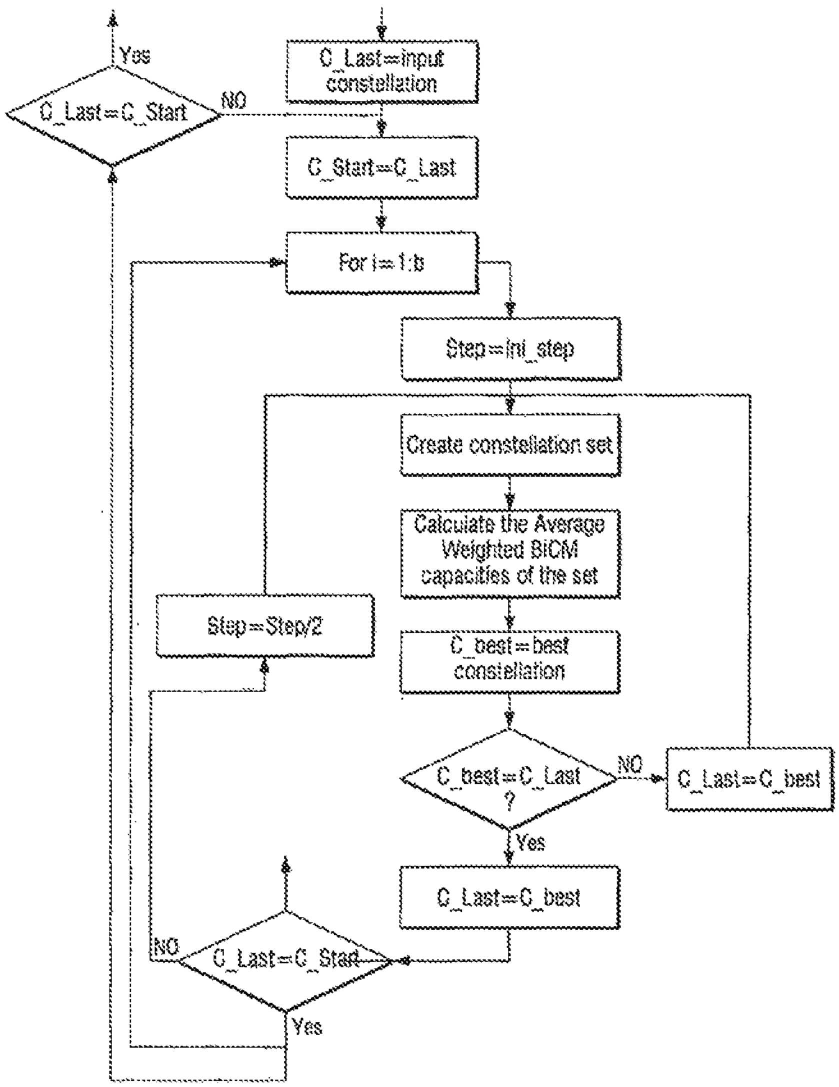

【Figure 53a】
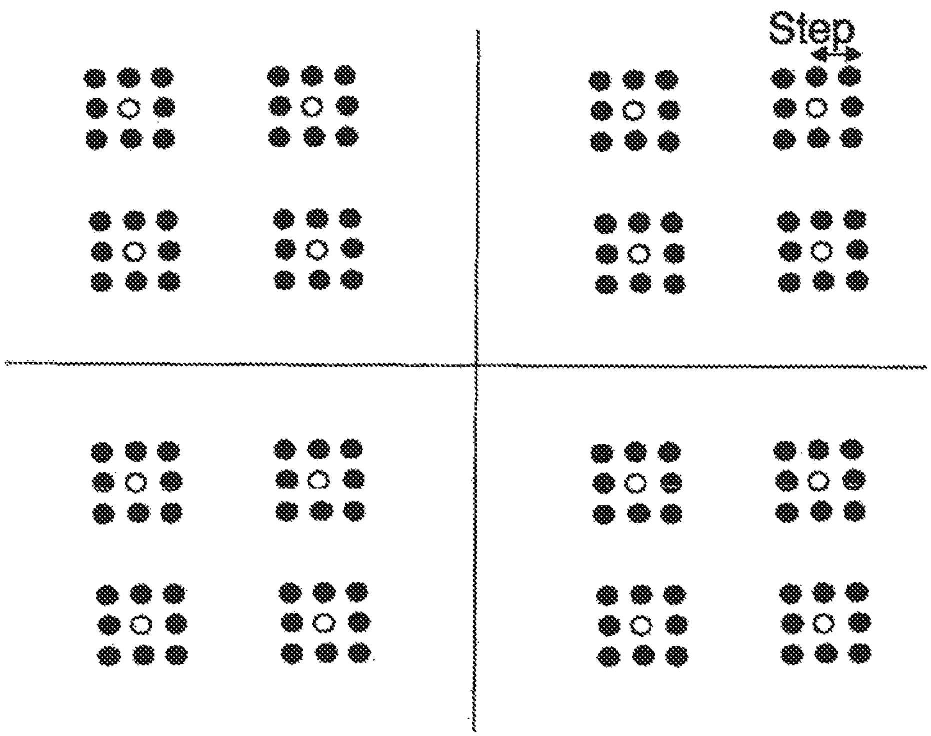

【Figure 53b】
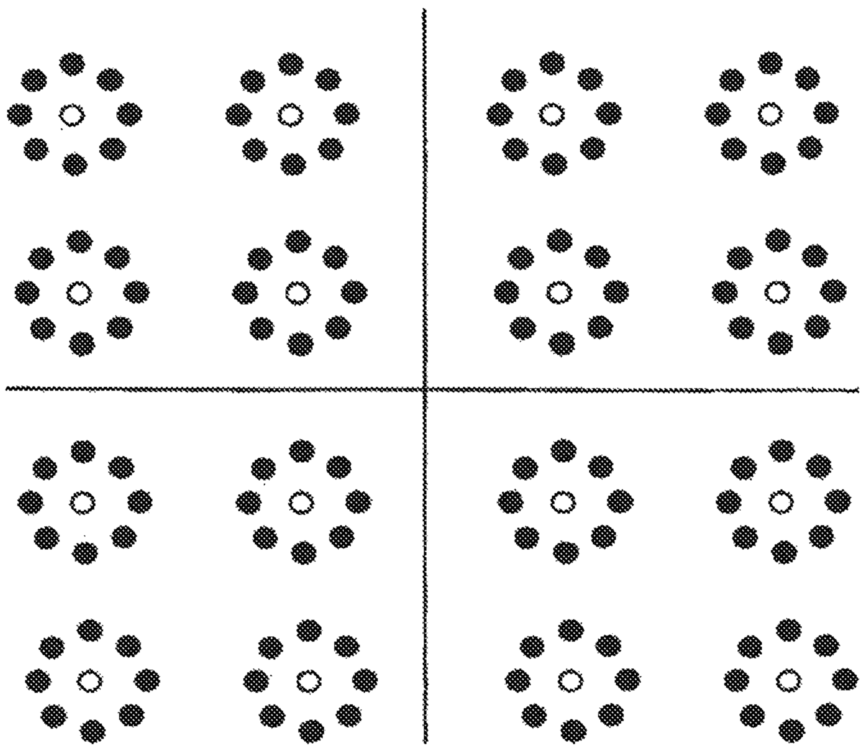
【Figure 54】
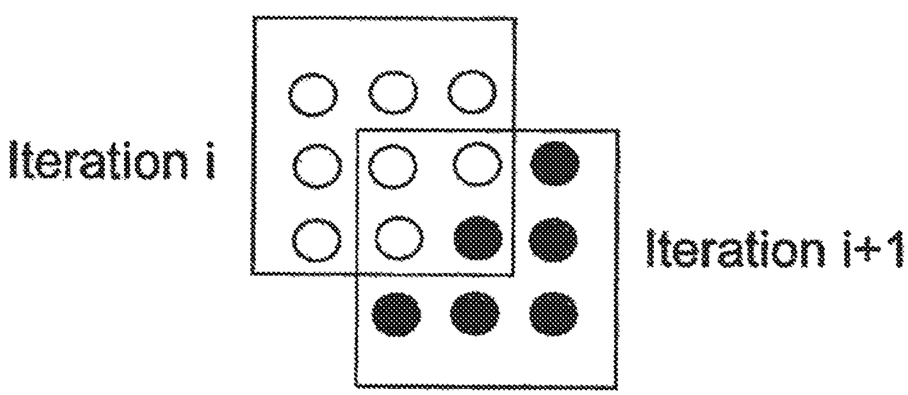

[Figure 55]
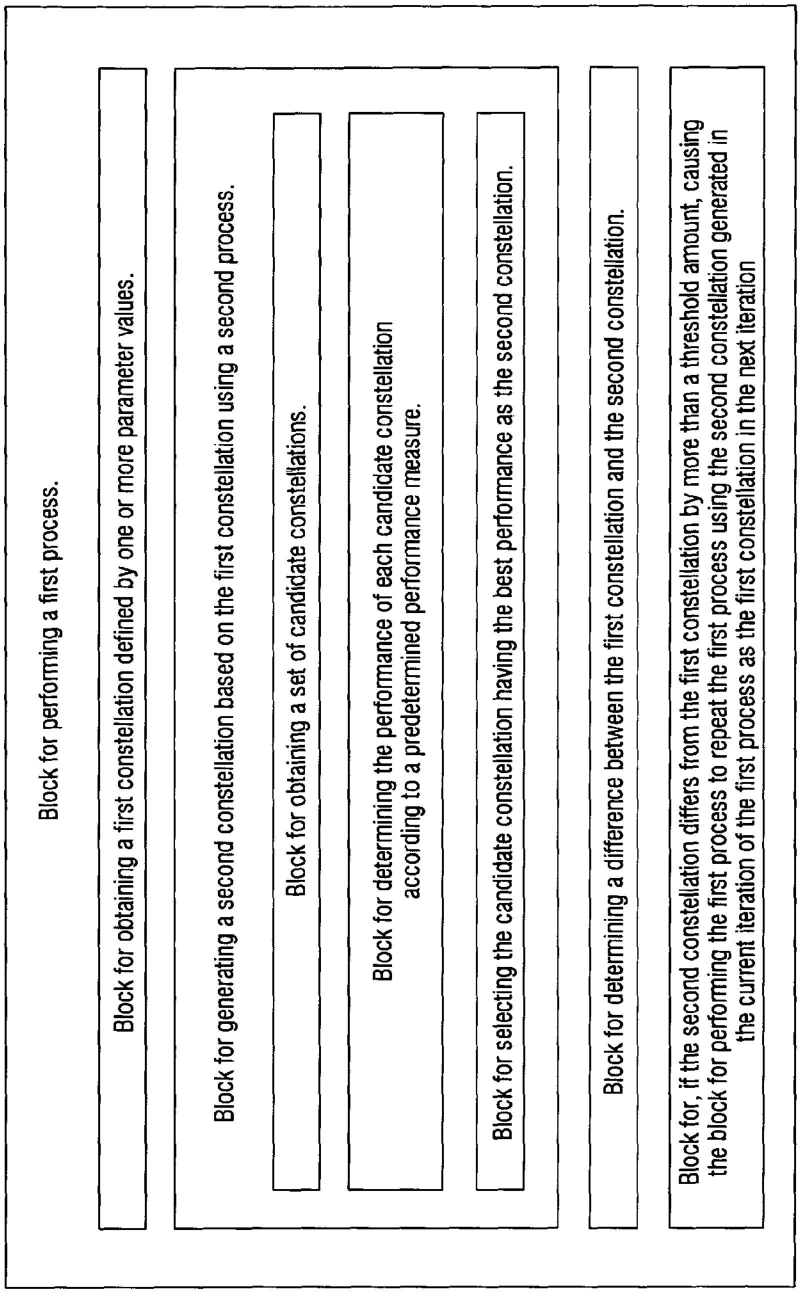

NON-UNIFORM CONSTELLATIONS

CROSS-REFERENCE TO RELATED PATENT APPLICATIONS

This is a Continuation of U.S. application Ser. No. 17/380,737 filed Jul. 20, 2021, which is a Continuation of U.S. application Ser. No. 16/678,536, filed Nov. 8, 2019, which is a continuation of U.S. application Ser. No. 15/818,480, filed Nov. 20, 2017, which issued as U.S. Pat. No. 10,505,780 on Dec. 10, 2019, which is a continuation of U.S. Application No. of Ser. No. 14/910,948 filed Feb. 8, 2016, which issued as U.S. Pat. No. 9,866,423 on Jan. 9, 2018, and which is a National Stage Entry of PCT Application No. PCT/KR2014/006125, filed on Jul. 8, 2014, which claims priority from United Kingdom Patent Application 1312243.7 filed on Jul. 8, 2013; United Kingdom Patent Application 1313419.2 filed on Jul. 26, 2013; United Kingdom Patent Application 1315740.9 filed on Sep. 4, 2013; United Kingdom Patent Application 1319202.6 filed on Oct. 30, 2013; United Kingdom Patent Application 1401711.5 filed on Jan. 31, 2014; United Kingdom Patent Application 1410114.1 filed on Jun. 6, 2014; and United Kingdom Patent Application 1410222.2 filed on Jun. 9, 2014. The entire disclosures of all the prior applications are considered part of the disclosure of the accompanying application and are hereby incorporated by reference in their entirety.

TECHNICAL FIELD

The present invention relates generally to methods, apparatus and systems for designing non-uniform constellations for signal transmission. More particularly, although not exclusively, the present invention relates to methods, apparatus and systems for designing non-uniform constellations that maximise performance, for example with respect to capacity and Signal to Noise Ratio (SNR) gain compared to uniform constellations, and for designing high-order non-uniform constellations.

BACKGROUND ART

In digital modulation schemes, data symbols are transmitted by modulating the amplitude and/or phase of a carrier wave having a certain frequency. For example, a data symbol typically represents an M-bit fragment of data, resulting in $N=2^M$ possible symbols. The set of N possible symbols are mapped to a set of N respective fixed complex numbers, which are referred to as constellation points and may be represented in the complex plane in the form of a constellation diagram. In order to transmit a given symbol, a complex carrier wave is multiplied by the value of the constellation point corresponding to the symbol, thereby modulating the amplitude and phase of the carrier by amounts corresponding respectively to the amplitude and phase of the constellation point.

Various constellations designs are used in various modulation schemes, including N-Quadrature Amplitude Modulation (QAM) in which the constellation comprises a square lattice of N regularly-spaced constellation points, and N-Phase Shift Keying (PSK) in which the constellation comprises a circular lattice of N regularly-spaced constellation points. Various other constellation designs are also known.

In order to measure the performance of a given constellation or between different constellations, various metrics may be used.

For example, capacity is a measure of the maximum rate of information that can be reliably transmitted over a communications channel. The maximum theoretical capacity of a channel is given by a well-known formula derived by Shannon. The Coded Modulation (CM) capacity is the maximum capacity achievable using a fixed non-uniform constellation without any coding constraints. The Bit Interleaved Coded Modulation (BICM) capacity is the maximum capacity achievable using a certain binary Forward Error Correction (FEC) scheme and fixed non-uniform constellation.

In addition, when comparing two systems, the difference in Signal-to-Nose Ratio (SNR) required achieving the same Bit Error Rate (BER) may be referred to as the SNR gain.

In contrast to uniform constellations, a non-uniform constellation is a constellation in which the constellation points are not regularly spaced. One advantage of using a non-uniform constellation is that performance may be increased, for example for SNR values below a certain value. For example, the BICM capacity may be increased by using a non-uniform constellation, when compared to an equivalent uniform constellation. Using a non-uniform constellation may also achieve a SNR gain over an equivalent uniform constellation.

A constellation may be characterised by one or more parameters, for example specifying the spacing between constellation points. Since constellation points of a uniform constellation are regularly spaced, the number of parameters needed to characterise a uniform constellation is typically equal to 1. For example, for a QAM type constellation, the constellation is characterised by the (constant) lattice spacing. For a PSK type constellation, the constellation is characterised by the (constant) distance of each constellation point from the origin. On the other hand, since the spacing between constellation points in a non-uniform constellation varies, the number of parameters needed to characterise a non-uniform constellation is relatively high. The number of parameters increases as the order of the constellation (i.e. the number of constellation points) increases.

One problem with designing a non-uniform constellation is that a relatively high number of parameters need to be searched to find the optimum constellation. This problem is increased in the case of constellations of higher order. In the case of high-order constellations (e.g. constellations comprising more than 1024 constellation points), an exhaustive search across all parameters may be unfeasible.

Therefore, what is desired is a technique for designing non-uniform constellations, and in particular, for designing non-uniform constellations for optimising performance (e.g. capacity and SNR performance). What is also desired is a technique for designing non uniform constellations using an algorithm having a relatively low complexity and relatively high computational efficiency.

DISCLOSURE

Technical Problem

It is an aim of certain exemplary embodiments of the present invention to address, solve and/or mitigate, at least partly, at least one of the problems and/or disadvantages associated with the related art, for example at least one of the problems and/or disadvantages described above. It is an aim of certain exemplary embodiments of the present invention to provide at least one advantage over the related art, for example at least one of the advantages described below.

Technical Solution

The present invention is defined in the independent claims. Advantageous features are defined in the dependent claims.

In accordance with an aspect of the present invention, there is provided a method for generating a non-uniform constellation. The method comprises the step of performing a first process, the first process comprising the steps of: obtaining a first constellation defined by one or more parameter values; and generating a second constellation based on the first constellation using a second process. The second process comprises the steps of: obtaining a set of candidate constellations, wherein the set of candidate constellations comprises the first constellation and one or more modified constellations, wherein each modified constellation is obtained by modifying the parameter values defining the first constellation; determining the performance of each candidate constellation according to a predetermined performance measure; selecting the candidate constellation having the best performance as the second constellation. The first process further comprises the steps of: determining a difference between the first constellation and the second constellation; and if the second constellation differs from the first constellation by more than a threshold amount, repeating the first process using the second constellation generated in the current iteration of the first process as the first constellation in the next iteration.

Also, the first constellation used in the first iteration of the first process may comprise a uniform constellation.

Also, the first and second constellations may comprise constellations subject to one or more geometric constraints.

Also, the first and second constellations Also, comprise four quadrants, and the geometric constraints may comprise a constraint that the constellation is symmetric about the four quadrants.

Also, wherein the geometric constraints may comprise a constrain that: constellation points are arranged in first and second lines, the first lines being perpendicular to the second lines, the number of first lines is the same as the number of second lines, the same number of constellation points are arranged in each first line, and the same number of constellation points are arranged in each second line.

Also, at least one parameter value may comprise a fixed value.

Also, the first process may comprise the further step of: if the second constellation does not differ from the first constellation by more than the threshold amount, outputting the second constellation as a third constellation.

Also, the step of modifying the parameter values may comprise modifying one or more parameter values by at least a certain step size.

Also, the step of modifying the parameter values may comprises changing one or more parameter values by integer multiples of the step size. Also, the first process may comprise the further steps of: if the second constellation does not differ from the first constellation by more than the threshold amount, determining whether the step size is less than a threshold step size and, if the step size is less than the threshold step size, outputting the second constellation as a third constellation; and, if the step size is greater than or equal to the threshold step size, decreasing the step size and repeating the first process using the second constellation as the first constellation.

Also, the parameters values may comprise two or more parameter values, the step of modifying the parameter values may comprise modifying a subset of the parameter values while keeping the other parameter values fixed, and the method may comprise the step of repeating the first process one or more times, such that a different subset of the parameter values is modified in each iteration of the first process, and wherein the third constellation output in an iteration is used as the first constellation in the next iteration.

Also, the modified constellations of the set of candidate constellations in an iteration of the first process may be exclusive of the constellations of the set of candidate constellations in a previous iteration.

Also, the predetermined performance measure may comprise a performance achieved using a certain candidate constellation and using a defined transmission system, wherein the defined transmission system is defined by a set of one or more system parameter values.

Also, the predetermined performance measure may comprise a weighted sum of two or more component performance measures, wherein each component performance measure comprises a performance achieved using a certain candidate constellation and using a respective defined transmission system, wherein each defined transmission system is defined by a respective set of one or more system parameter values.

Also, when determining the performance of a certain candidate constellation, if any of the component performance measures may be lower than a certain threshold, then that candidate constellation is excluded from the set of candidate constellations.

Also, the parameter value associated with a certain parameter of each defined transmission system may comprise a value falling within a certain range.

Also, the system parameter values may comprise a value indicating a channel type.

Also, the system parameter values may comprise a SNR value.

In accordance with another aspect of the present invention, there is provided a method for generating a non-uniform constellation. The method performs a third process, the third process comprising the steps of: obtaining a third constellation, determining a SNR value as the lowest SNR at which a BER is lower than a threshold value, wherein the BER is a BER achieved using the third constellation and using a certain defined transmission system, obtaining a fourth constellation having the best performance within the defined transmission system at the determined SNR value according to a predetermined performance measure; and repeating the third process using the fourth constellation as the third constellation, until the determined SNR value is minimised, wherein the system parameter values defining the certain defined transmission system comprise the minimised SNR value as a SNR value.

Also, the predetermined performance measure may comprise a channel capacity.

Also, the modified constellations may be obtained by displacing one or more constellation points of the first constellation by at least a certain step size.

Also, the displacement may comprise displacement by an integer multiple of the step size in a radial direction.

Also, the displacement may comprise displacement by an integer multiple of the step size in one or both of first and second orthogonal directions.

In accordance with another aspect of the present invention, there is provided a method for generating a non-uniform constellation. The method comprises the step of performing a fourth process, the fourth process comprising the steps of: generating a third constellation by performing a method according to the preceding aspect, wherein the predetermined performance measure comprises a performance achieved using a certain candidate constellation and using a defined transmission system, wherein the defined transmission system is defined by a set of one or more system parameter values; modifying a system parameter value; determining whether the modified system parameter value satisfies a predetermined condition; and if the modified system parameter value does not satisfy the predetermined condition, repeating the fourth process using the third constellation as the first constellation.

Also, the system parameter values may comprise a Signal-to-Noise Ratio (SNR) value.

Also, the SNR value may be initialised to a value above a predetermined threshold, and the step of modifying the system parameter value may comprise reducing the SNR value.

Also, the step of reducing the SNR value may comprise reducing the SNR value by a fixed amount.

Also, the predetermined condition may comprise a condition that the SNR value is less than a threshold SNR value.

Also, the system parameter values may comprise a Ricean factor for a Ricean fading channel of the defined transmission system, and the SNR value may comprise a fixed value.

Also, wherein the Ricean factor may be initialised to a value above a predetermined threshold, and the step of modifying the system parameter value may comprise reducing the Ricean factor.

Also, the step of reducing the Ricean factor may comprise reducing the Ricean factor by a fixed amount.

Also, the predetermined condition may comprise a condition that the Ricean factor is less than a threshold Ricean factor. Also, the threshold Ricean factor may be equal to zero.

Also, the first constellation used in the first iteration of the first process may comprise a constellation that achieves optimum performance in an Additive White Gaussian Noise (AWGN) channel having the fixed SNR parameter value.

Also, the fourth process may comprise the further step of: if the modified system parameter value satisfies the predetermined condition, outputting the third constellation as a fourth constellation.

In accordance with another aspect of the present invention, there is provided a method for generating a non-uniform constellation. The method comprises the step of performing a first process, the first process comprising the steps of: obtaining a first constellation; determining a Signal-to-Noise Ratio (SNR) value as the lowest SNR at which a Bit Error Rate (BER) is lower than a threshold value, wherein the BER is a BER achieved using the first constellation and using a defined transmission system, wherein the defined transmission system is defined by a set of one or more system parameter values; and obtaining a second constellation having the best performance within the defined transmission system at the determined SNR value according to a predetermined performance measure.

Also, the step of obtaining the second constellation may comprise retrieving a predetermined constellation from a memory.

Also, the step of obtaining the second constellation may comprise obtaining a constellation by performing a method according to above method.

Also, the first process may comprise the further step of repeating the first process using the second constellation as the first constellation. Also, first process may be repeated a certain number of times.

Also, the first process may be repeated until the determined SNR value is minimised.

Also, the first constellation used in the first iteration of the first process may comprise a uniform constellation.

Also, wherein the step of determining a SNR value may comprise performing a simulation of the defined transmission system.

In accordance with another aspect of the present invention, there is provided a method for obtaining a non-uniform constellation, the method comprising the steps of: obtaining a first constellation defined by one or more parameters; obtaining a set of candidate constellations by modifying the values of one or more of the parameters of the first constellation; computing the capacities of each candidate constellation; selecting, based on the computed capacities, the best candidate from the set of candidate constellations as a second constellation; determining whether the second constellation differs from the first constellation by more than a threshold amount; and if the second constellation differs from the first constellation by more than the threshold amount, repeating the preceding steps using the second constellation as the first constellation.

In accordance with another aspect of the present invention, there is provided a method for transmitting data, the method comprising the steps of: mapping data to one or more constellation points of a non-uniform constellation; and transmitting a signal according to the constellation points to which the data are mapped.

In accordance with another aspect of the present invention, there is provided a method for receiving data, the method comprising the steps of: receiving a signal; determining one or more constellation points of a non-uniform constellation corresponding to the received signal; and de-mapping data from the constellation points corresponding to the received signal.

In accordance with another aspect of the present invention, there is provided an apparatus for transmitting data, the apparatus comprising: a mapper for mapping data to one or more constellation points of a non-uniform constellation; and a transmitter for transmitting a signal according to the constellation points to which the data are mapped.

In accordance with another aspect of the present invention, there is provided an apparatus for receiving data, the apparatus comprising: a receiver for receiving a signal; a constellation point determining unit for determining one or more constellation points of a non-uniform constellation corresponding to the received signal; and a de-mapper for de-mapping data from the constellation points corresponding to the received signal.

In certain exemplary embodiments according to any of the above aspects, the non-uniform constellation comprises a constellation according to any one of FIGS. 18-49 or Tables 2-22, or a rotation and/or scaling, and/or other transformation thereof.

In accordance with another aspect of the present invention, there is provided a system comprising: an apparatus for transmitting data according to any embodiment, aspect or claim disclosed herein; and an apparatus for receiving data according to any embodiment, aspect or claim disclosed herein.

In accordance with another aspect of the present invention, there is provided a non-uniform constellation comprising a constellation according to any one of FIGS. 18-49 or Tables 2-22, or a rotation and/or scaling, and/or other transformation thereof.

In accordance with another aspect of the present invention, there is provided an apparatus or system configured for implementing a method or algorithm according to any embodiment, aspect or claim disclosed herein.

In accordance with another aspect of the present invention, there is provided a machine-readable storage medium storing a data structure defining a non-uniform constellation in accordance with any embodiment, aspect or claim disclosed herein.

Another aspect of the present invention provides a computer program comprising instructions arranged, when executed, to implement a method, system and/or apparatus in accordance with any embodiment, aspect or claim disclosed herein. A further aspect provides machine-readable storage storing such a program.

Other aspects, advantages, and salient features of the invention will become apparent to those skilled in the art from the following detailed description, which, taken in conjunction with the annexed drawings, disclose exemplary embodiments of the invention.

DESCRIPTION OF DRAWINGS

The above and other aspects, and features and advantages of certain exemplary embodiments and aspects of the present invention will be more apparent from the following detailed description when taken in conjunction with the accompanying drawings, in which:

FIG. 1 is a schematic diagram of a first algorithm according to an embodiment of the present invention;

FIG. 2 is a flowchart illustrating the steps of the first algorithm;

FIG. 3 illustrates the convergence of C_last with respect to one of the parameters as the first algorithm of FIGS. 1 and 2 is performed;

FIG. 4 illustrates a second algorithm according to an embodiment of the present invention for determining an optimal constellation at a given SNR value S in an AWGN channel;

FIG. 5 illustrates the convergence of the constellation C_best as the second algorithm of FIG. 4 is performed;

FIG. 6 illustrates a third algorithm according to an embodiment of the present invention for determining the optimal constellation at a given SNR value S in a Rician fading channel for a desired Rician factor K_rice;

FIG. 7 illustrates a fourth algorithm according to an embodiment of the present invention for determining the optimal constellation at a given SNR value S in a Rayleigh fading channel;

FIG. 8 illustrates a fifth algorithm according to an embodiment of the present invention for determining an optimal constellation;

FIG. 9 illustrates a process for obtaining an optimal constellation for a specific system;

FIG. 10 illustrates an exemplary BER versus SNR plot for 64-QAM using a Low-Density Parity-Check, LDPC, coding rate (CR) of 2/3 from DVB-T2 in an AWGN channel;

FIG. 11 illustrates a sixth algorithm according to an embodiment of the present invention for determining an optimal constellation;

FIG. 12 further illustrates the sixth algorithm illustrated in FIG. 11;

FIG. 13*a* illustrates a uniform constellation (64-QAM), FIG. 13*b* illustrates a non-uniform constellation (64-QAM) characterised by 3 parameters, and FIG. 13*c* illustrates a non-uniform constellation (64-QAM) characterised by 16 parameters;

FIG. 14*a* illustrates a set of BER curves obtained using a non-uniform 16-QAM constellation using respective code rates of 6/15, 7/15, 8/15, 9/15, 10/15, 11/15, 12/15 and 13/15, and a set of BER curves obtained using a corresponding uniform 16-QAM constellation using the same code rates;

FIG. 14*b* is a table indicating, for various code rates, the SNR values at the waterfall zone for the uniform and non-uniform constellations used to obtain the BER curves illustrated in FIG. 14*a*, and the resulting SNR gain;

FIGS. 15*a*-17*b* illustrate BER curves and tables, similar to those illustrated in FIGS. 14*a* and 14*b*, for 64-QAM, 256-QAM and 1024-QAM;

FIGS. 18-25 illustrate exemplary non-uniform 16-QAM constellations obtained by applying the algorithms illustrated in FIGS. 1-12, using code rates of 6/15, 7/15, 8/15, 9/15, 10/15, 11/15, 12/15 and 13/15, respectively;

FIGS. 26-33 illustrate exemplary non-uniform 64-QAM constellations obtained by applying the algorithms illustrated in FIGS. 1-12, using code rates of 6/15, 7/15, 8/15, 9/15, 10/15, 11/15, 12/15 and 13/15, respectively;

FIGS. 34-41 illustrate exemplary non-uniform 256-QAM constellations obtained by applying the algorithms illustrated in FIGS. 1-12, using code rates of 6/15, 7/15, 8/15, 9/15, 11/15, 12/15 and 13/15, respectively;

FIGS. 42-49 illustrate exemplary non-uniform 1024-QAM constellations obtained by applying the algorithms illustrated in FIGS. 1-12, using code rates of 6/15, 7/15, 8/15, 9/15, 11/15, 12/15 and 13/15, respectively;

FIG. 50 illustrates a process for obtaining the waterfall SNR for a certain channel type according to certain exemplary embodiments;

FIG. 51 schematically illustrates a process for obtaining a weighted performance measure function for an input constellation based on different transmission scenarios according to certain exemplary embodiments;

FIG. 52 illustrates a process for obtaining an optimum constellation according to certain exemplary embodiments;

FIGS. 53*a* and 53*b* illustrate alternative schemes for generating a candidate constellation from a previous constellation according to certain exemplary embodiments;

FIG. 54 illustrates a technique for reducing complexity in certain exemplary embodiments;

FIG. 55 illustrates an apparatus for implementing an algorithm according to an exemplary embodiment; and the Annexes to the Description illustrate results obtained from various embodiments of the present invention.

MODE FOR INVENTION

The following description of exemplary embodiments of the present invention, with reference to the accompanying drawings, is provided to assist in a comprehensive understanding of the present invention, as defined by the claims. The description includes various specific details to assist in that understanding but these are to be regarded as merely exemplary. Accordingly, those of ordinary skill in the art will recognize that various changes and modifications of the embodiments described herein can be made without departing from the scope of the invention.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the present invention.

The terms and words used herein are not limited to the bibliographical or standard meanings, but, are merely used by the inventors to enable a clear and consistent understanding of the invention.

Throughout the description and claims of this specification, the words "comprise", "contain" and "include", and variations thereof, for example "comprising", "containing" and "including", means "including but not limited to", and is not intended to (and does not) exclude other features, elements, components, integers, steps, processes, functions, characteristics, and the like.

Throughout the description and claims of this specification, the singular form, for example "a", "an" and "the", encompasses the plural unless the context otherwise requires. For example, reference to "an object" includes reference to one or more of such objects.

Throughout the description and claims of this specification, language in the general form of "X for Y" (where Y is some action, process, function, activity or step and X is some means for carrying out that action, process, function, activity or step) encompasses means X adapted, configured or arranged specifically, but not necessarily exclusively, to do Y.

Features, elements, components, integers, steps, processes, functions, characteristics, and the like, described in conjunction with a particular aspect, embodiment, example or claim of the present invention are to be understood to be applicable to any other aspect, embodiment, example or claim described herein unless incompatible therewith.

Embodiments of the present invention may be implemented in the form of any suitable method, system and/or apparatus for use in digital broadcasting, for example in the form of a mobile/portable terminal (e.g. mobile telephone), hand-held device, personal computer, digital television and/or digital radio broadcast transmitter and/or receiver apparatus, set-top-box, etc. Any such system and/or apparatus may be compatible with any suitable existing or future digital broadcast system and/or standard, for example one or more of the digital broadcasting systems and/or standards referred to herein.

A non-uniform constellation according to embodiments of the present invention may be generated or obtained using any suitable method or algorithm comprising steps for generating or obtaining such a non-uniform constellation. A non-uniform constellation according to embodiments of the present invention may be generated or obtained by any suitably arranged apparatus or system comprising means for generating or obtaining such a non-uniform constellation. The methods or algorithms described herein may be implemented in any suitably arranged apparatus or system comprising means for carrying out the method or algorithm steps.

Certain embodiments of the present invention provide an algorithm for obtaining a non-uniform constellation. A non-uniform constellation obtained in certain embodiments of the present invention may provide a higher capacity than an equivalent uniform constellation (e.g. a uniform constellation of the same order). Certain embodiments of the present invention may obtain an optimised non-uniform constellation using an algorithm with relatively low complexity and relatively high computational efficiency. For example, an algorithm in certain embodiments of the present invention may obtain an optimised non-uniform constellation much faster that an algorithm using a brute force method that searches all (or a high proportion of) possible candidate constellations. Certain embodiments of the present invention provide an algorithm for obtaining optimised non-uniform constellations suitable for very high-order constellation (e.g. comprising more than 1024 constellation points).

Various embodiments are described below in which Non-Uniform (NU) Quadrature Amplitude Modulation (QAM) constellations are obtained. However, the skilled person will appreciate that the present invention is not limited to QAM constellations, but may be applied to other types of constellation.

As mentioned above, a constellation may be characterised by a number of parameters, for example specifying the spacings between constellation points, or specifying the position of each positive real level (the complete constellations may be obtained from these parameters because the constellations are the same for real and imaginary axis and the same for positive and negative values). In order to obtain an optimum constellation, a brute force approach may be taken in which combinations of values for each of the parameters are searched with a certain step size up to a certain maximum value. Each combination of values for each parameter corresponds to a distinct constellation. The constellation having the best performance is selected.

However, in certain embodiments, the number of parameters may be reduced by imposing one or more certain geometric and/or symmetry constraints on the constellations. For example, a first constraint may be that the constellations are symmetric among the four quadrants of the constellation. In addition, the constellations may be constrained in that the constellation points are arranged in a QAM type lattice in which, within each quadrant, (i) constellation points are arranged in horizontal and vertical lines, (ii) the number of horizontal lines is the same as the number of vertical lines, (iii) the same number of constellation points are arranged in each horizontal line, and (iv) the same number of constellation points are arranged in each vertical line. In another example, the constellation may be constrained to be a circular constellation (e.g. a constellation having circular symmetry). Furthermore, constellations having the same relative arrangement, differing only in size, may be regarded as equivalent. In this, case one of the parameters may be set to a fixed value. The skilled person will appreciate that the present invention is not limited to the above examples, and that one or more additional or alternative constraints may be used.

In certain embodiments, a NU-QAM constellation may comprise a constellation conforming to one or more geometric and/or symmetry constraints, for example one or more, or all, of the above constrains, or a rotation and/or scaling thereof. An NU N-QAM constellation may comprise a NU-QAM constellation comprising N constellation points.

By applying the constraints described above, the number of parameters may be reduced, for example to 1, 3, 7, 15, 31 and 63 parameters for constellations comprising 16, 64, 256, 1024, 4096 and 16384 constellation points, respectively. The number of parameters in a reduced set of parameters may be denoted by b. For example b=1 for 16-QAM (in which there are 16 positions that are symmetric on the real/imaginary and positive/negative axes). Thus there are only 2 points to define. Since the total power of the constellation is typically normalized to one then fixing one parameter will fix the other. Thus b=1 for square 16QAM.

In certain embodiments of the present invention, combinations of values for each of the b parameter are searched with a step size d up to a maximum value A. Thus, the number of search iterations is equal to $(A/d)^b$.

A first exemplary algorithm according to certain embodiments of the present invention for obtaining an optimum non-uniform constellation for a given SNR will now be described. The algorithm uses an iterative scheme to gradually modify an initial constellation until the constellation converges. For example, the initial constellation may be a uniform constellation, the constellation may be modified by changing the values of the parameters between iterations, and convergence occurs when the values of all the parameters change by less than a threshold amount between iterations. An optimum constellation may be defined as the constellation having the best performance according to any suitable measure. For example, the measure may comprise CM capacity or BICM capacity. In the following example a NU 64-QAM constellation is obtained, in which the (reduced) number of variable parameters, b, is equal to 3.

FIG. 1 is a schematic diagram of the first algorithm and FIG. 2 is a flowchart illustrating the steps of the first algorithm. In the algorithm, the following variables are used. The parameter C_last denotes a particular constellation, corresponding to a particular set of values of the b parameters. The parameter C_last is initialised with a certain initial constellation, for example a uniform constellation. The parameter SNR denotes a Signal-to-Noise Ratio. The SNR parameter is set to a desired value equal to the SNR for which an optimum constellation is desired. The parameter C_best denotes a constellation that maximises performance, for example maximises the CM capacity or BICM capacity, for a given SNR. The parameter d denotes a first step size used in the algorithm. The parameter d (or Step) is initialised to a suitable value that may be determined theoretically and/or experimentally. The parameter Min_Step denotes a minimum allowed value for d, and is set to a fixed value.

In a first step 201, C_last is initialised to an input constellation. In a next step 203, step d is initialised to a value Ini_step. In a next step 205, a set of candidate constellations is obtained. The set of candidate constellations comprise the constellation C_last and one or more modified constellations, where each modified constellation is obtained by modifying one or more of the parameter values defining C_last using any suitable scheme. In the illustrated example, the set of candidate constellations are created based on C_last and step size d, denoted by function CreateSet(C_Last, d). For example, for each constellation point, three derived constellations are generated [C_last, C_last+d, C_last−d]. Specifically, a set of constellations is derived such that the values of the b parameters in C_last are each set to one of n new values varying around the current parameter value. For example, three new values (n=3) may be used, comprising (i) the current parameter value, (ii) a value d greater than the current parameter value, and (iii) a value d less than the current parameter value. For example, if there are two constellation levels to be defined then the number of combinations to be tested are 3×3 (corresponding to three positions for each level). All combinations of the new parameter values are used to generate the set of constellation. Thus, the set of constellations comprises a total of $n^b$ constellations. Although three new values for each parameter are used in the embodiment described above, any suitable number of new values may be used in other embodiment. The set of new values may include the old value, or may not include the old value.

In certain embodiments, three values of each level are chosen so that the total number of possibilities to be tested is $3^b$ where b is the number of levels (parameters) to be optimised. In the case of very high-order constellations, for example above 1K, $3^b$ may be very high. In this case, all the levels may be fixed except one, for which three possibilities are tested, C_last, C_last+d and C_last−d until convergence is achieved. The same operation may then be repeated for the other levels. The cost of this operation is multiplicative and not exponential (for example, if it is supposed that each level converges in one iteration then the cost will be 3*b instead $3^b$.)

In a next step 207, the performance of each constellation in the set of derived (candidate) constellations is calculated or determined using any suitable performance measure (e.g. capacity). In a next step 209 the candidate constellation having the best performance (e.g. the candidate constellation that maximises the capacity) is assigned to C_best. In a next step 211, it is determined whether C_best differs from C_last by more than a threshold amount. For example, in the illustrated example, the threshold amount is equal to zero, so that it is determined whether C_best=C_last. That is, it is determined whether there is any difference between constellation C_best and constellation C_last (e.g. within a certain resolution). The difference may comprise any suitable measure of difference, for example including a difference based on geometry (e.g. differences in the locations of the constellation points of the constellations) and/or a performance measure (e.g. a difference in a certain performance measure between the constellations). If it is determined in step 211 that C_best≠C_last, then in a next step 213, C_last takes the value C_best (i.e. so that the value of C_Last in the next iteration is equal to the value of C_Best in the current iteration) and the method returns to step 205 in which a set of candidate constellations are created based on C_last and step, CreateSet(C_Last, d). On the other hand, if it is determined in step 211 that C_best=C_Last, then, in a next step 215, C_last takes the value C_best and the method moves to a next step 217.

In step 217, it is determined whether d<Min_Step. If it is determined in step 217 that d≥Min_Step then the method moves to a next step 219 in which the step size d is reduced. For example, d is divided by a certain factor (e.g. 2). Following step 219, the method returns to step 205 in which a set of candidate constellations are created based on C_last and step, CreateSet(C_Last, d). On the other hand, If it is determined in step 217 that d<Min_Step then the value of C_best is saved and the algorithm ends.

FIG. 3 illustrates the convergence of C_last with respect to one of the parameters as the first algorithm of FIGS. 1 and 2 is performed. Initially, the value of the parameter converges to a certain value. When the value of the parameter has converged within a certain resolution, the step size d is reduced and the value of the parameter converges further, until the step size d has reached the minimum step size.

In the example shown in FIG. 3, for each iteration, three new parameter values are tried, as represented by the vertical columns of circles. The best new parameter for each iteration is indicated in FIG. 3 as a filled circle. The best parameter value in one iteration is used as the new parameter value for the next iteration. Thus, in the example illustrated in FIG. 3, in which three new parameter values are tried (comprising the current parameter and parameters an amount d above and below the current parameter), the filled circle of one iteration corresponds to the middle of the three circles arranged in a column for the next iteration.

In certain embodiments, Steps 217 and 219 of the algorithm illustrated in FIG. 2 may be omitted so that steps 205, 207, 209, 211, 213 and 215 are performed using the initial step size. In this case, when it is determined in Step 215 that C_best=C_last, the step size is not reduced, but rather the value of C_best is saved and the algorithm ends. By omitting Steps 217 and 219, the algorithm may potentially complete more quickly. However, in this case the output constellation C_best may differ from the true optimum constellation more than the output constellation C_best obtained in the algorithm illustrated in FIG. 2 where the step size d is decreased. This may be seen in FIG. 3, where it can be seen that the best parameter value in the final iteration lies closer to the optimal value (indicated by the horizontal line) than the best parameter value at the stage of convergence with the initial step size.

The first algorithm described above determines the optimum constellation based on a certain performance measure (e.g. capacity). In the following, various algorithms for determining an optimum constellation for a defined transmission system defined by a set of one or more system parameter values, where the constellation is optimised for a certain desired value of a system parameter (e.g. a certain SNR value or certain Ricean factor). In these embodiments, a system parameter value is set to an initial value (e.g. a relatively high value) and an optimum constellation is generated using an algorithm described above (e.g. the algorithm illustrated in FIG. 2), wherein the performance measure is based on a defined transmission system having the set system parameter value. The system parameter value is then reset to a modified value (e.g. by reducing the value by a certain step size) and the algorithm is re-run. The other system parameter values may remain fixed. This process is repeated until the system parameter value reaches a certain desired value.

For example, FIG. 4 illustrates a second algorithm for determining the optimal constellation at a given SNR value S in an AWGN channel. In a first step 401, the algorithm is initialised by setting a SNR parameter to a high value N, where N is large. For example, the initial SNR value may be set to a SNR value above which a non-uniform constellation provides no better performance than an equivalent uniform constellation. This value may be determined, for example, theoretically and/or experimentally. In step 401, the parameter C_last is also initialised to a certain constellation, for example a uniform constellation.

In a next step 403 the first algorithm described above is run using the initialised constellation C_last as the input constellation and using the initialised SNR ratio. By applying the first algorithm, the constellation C_last will converge to an optimal constellation C_best for the specific input value of SNR. The output of step 403 is C_best obtained using the first algorithm. In a next step 405 the SNR value is reduced by a certain amount, for example one unit or step size. In step 405, C_last takes the value of C_best (i.e. so that the value of C_Last in the next iteration is equal to the value of C_Best in the current iteration). In a next step 407 it is determined whether SNR<S. If it is determined in step 407 that SNR≥S then the method returns to step 403, in which the first algorithm is run with the new values of C_last and SNR. On the other hand, if it is determined in step 407 that SNR<S, then the value of C_best is saved and the algorithm ends. By applying the second algorithm, the resulting constellation C_best is the optimal constellation for the desired SNR value S.

FIG. 5 illustrates the convergence of the constellation C_best as the second algorithm of FIG. 4 is performed. Each of the three curves represents the variation in the value of a respective one of the three variable parameters. The solid constant line represents the fixed value of a fixed parameter. As shown in FIG. 5, at the start of the second algorithm, starting from the right-hand side of FIG. 5, the SNR value is high and the constellation is a uniform constellation, as defined by the values of the parameters on the right-hand side of FIG. 5, labelled "Initial condition". At each iteration, the optimal constellation is obtained for the specific SNR value (indicated in FIG. 5 by the markers). The SNR is then reduced and the optimal constellation is obtained for the new SNR (this process being indicated for one of the parameters by the stepped line in FIG. 5). As shown in FIG. 5, the values of the parameters corresponding to the optimal constellation vary smoothly with varying SNR values. The iterations are repeated until the SNR value reaches the desired SNR value S.

By running the second algorithm illustrated in FIG. 4, an optimal constellation is derived from each of a set of SNR values. These constellations may be stored in association with the corresponding SNR values, for example in a look-up table.

FIG. 6 illustrates a third algorithm for determining the optimal constellation at a given SNR value S in a Rician fading channel for a desired Rician factor K_rice. The Rician channel is given by:

$$\sqrt{\frac{K}{K+1}} + \sqrt{\frac{1}{K+1}}\,h$$

where K is the Rician factor and h is Rayleigh distributed (centred and normalised). Initially, the third algorithm applies the second algorithm described above to obtain the optimal constellation C_best at a SNR value S for an AWGN channel, C_best(AWGN). In a first step 601, parameter C_last is initialised to C_best(AWGN). In step 601 the Rician factor K is initialised to a high value, which may be determined theoretically and/or experimentally. For example, K may be initialised to a value K_rice+N, where N is large.

In a next step 603, the first algorithm described above is run using the initialised constellation C_last as the input constellation and using the initialised Rician factor K to obtain an optimal constellation C_best. In a next step 605, the Rician factor K is reduced by a certain amount, for example by one unit. In step 605, C_last takes the value of C_best (i.e. so that the value of C_Last in the next iteration is equal to the value of C_Best in the current iteration). In a next step 607 it is determined whether K<K_rice. If it is determined in step 607 that K≥K_rice then the method returns to step 603, in which the first algorithm is run with the new values of C_last and K. On the other hand, if it is determined in step 607 that K<K_rice, then the value of C_best is saved and the algorithm ends. By applying the second algorithm, the resulting constellation C_best is the optimal constellation for the desired Rician factor K_rice.

FIG. 7 illustrates a fourth algorithm for determining the optimal constellation at a given SNR value S in a Rayleigh fading channel. A Rayleigh fading channel is a special case of Rician fading with the Rician factor K=0. Accordingly, the fourth algorithm is the same as the third algorithm described above, except that K_rice is set to zero.

Table 1 below compares the number of capacity calculation function calls for obtaining optimal constellations for various constellation sizes (16-QAM, 64-QAM and 256-QAM) using an exhaustive search, a restricted exhaustive search and an algorithm according to an embodiment of the present invention. The values in Table 1 are based on a step size d of and maximum value for the parameters of 10. Table 1 also indicates the factor difference between using a restricted exhaustive search and a search using an algorithm according to an embodiment of the present invention. As can be seen, the algorithm according to an embodiment of the present invention is significantly more efficient, for example by a factor of $1.15\times10^{10}$ for 256-QAM.

TABLE 1

| | Exhaustive search | Restricted exhaustive search | Algorithm according to the present invention | Gain versus restricted |
|---|---|---|---|---|
| 16QAM | 800 | 800 | 21 | 38 |
| 64QAM | 5.1e9 | 1.9e8 | 1701 | 117577 |
| 256QAM | 2.1e21 | 2.5e15 | 216513 | 1.15e10 |

In Table 1, the difference between exhaustive search and restrictive exhaustive search is the following. It is assumed in the following that there are 4 levels (parameters) between 0 and 10. In the exhaustive search each of the 4 parameters is searched over the whole range [0-10] with a certain granularity. In the case of restricted exhaustive search, the range in which each level will fall is fixed. For example level1 (first parameter) will be in the range [0-2.5] level2 in the range [2.5-5], level3 in the range [5-7.5], level4 in the range [7.5-10]. By doing so, the number of possibilities is reduced.

FIG. 8 illustrates a fifth algorithm for determining an optimal constellation. This algorithm corresponds closely to the algorithm illustrated in FIG. 2, but is modified to increase overall efficiency. This algorithm comprises an inner loop that comprises steps (steps 803-819) corresponding to steps 203-219 of FIG. 2. However, step 805 for creating a set of candidate constellations is modified from the corresponding step 205 of FIG. 2. Specifically, in the algorithm of FIG. 8, rather than modify each of the b parameters and trying all combinations of the new parameters as in the algorithm of FIG. 2, only one parameter is modified at a time. For example, within one iteration of the inner loop 803-819, only one parameter (parameter i) is modified to produce a set of candidate constellation. The capacities of these constellations are calculated and the best constellation selected, as in FIG. 2.

In the algorithm of FIG. 8, the value of i is varied from 1 to b using an outer loop (steps 821-825). The algorithm of FIG. 8 is initialised in step 801, corresponding to step 201 of FIG. 2. It can be seen that, by using the algorithm of FIG. 8, rather than the algorithm of FIG. 2, the total number of candidate constellation tried (i.e. the total number of capacity calculations) is significantly reduced. However, in simulations, the optimal constellation obtained using the algorithm of FIG. 8 is very close to the optimal constellation obtained using the algorithm of FIG. 2, which in turn is very close to the true optimal constellation obtained using an exhaustive search. The improvement in computational efficiency using algorithms according to embodiments of the present invention, including the algorithms described above, when compared to an exhaustive search, increases as the constellation order increases.

As with the algorithm illustrated in FIG. 2, in certain embodiments, Steps 817 and 819 of the algorithm illustrated in FIG. 8 may be omitted.

Using the techniques described above, optimal constellations may be obtained for particular parameters, for example SNR, Rician factor etc. These optimum constellations are obtained independently of any particular system implementation, for example independent of a particular coding scheme. In the following, various embodiments are described for obtaining an optimal constellation for a specific transmission system.

A transmission system may comprise a number of processes which may affect the optimal constellation, for example FEC encoding, bit interleaving, demultiplexing bits to cells, mapping cells to constellations, cell interleaving, constellation rotation, I/Q component interleaving, inter-frame convolution and inter-frame block interleaving, and MISO precoding. A QAM mapper is used in the Bit Interleaved Coded Modulation (BICM) chain to map bits to symbols. The QAM mapper may use a uniform constellation to map bits to cells (for example as done in DVB-T2). However, an increase in capacity may be achieved by using a fixed non-uniform constellation. A non-fixed non-uniform constellation (e.g. QAM) may be used to further increase capacity. The BICM capacity depends on the bit to cell mapping used. Optimisations are desirable in the LDPC design, the QAM mapping and the mapping of bits to cells.

In certain techniques, different constellations are generated using a certain step size. The Bit Error Rate (BER), the Block Error Rate and/or the Packet Error Rate corresponding to the constellations are obtained and the best constellation is selected based on one or more of the aforementioned error rates.

In certain embodiments of the present invention, the process illustrated in FIG. 9 may be carried out to obtain an optimal constellation for a specific system. In a first step 901, a uniform constellation (e.g. uniform QAM) is selected. In a next step 903, BER values for the selected uniform constellation are obtained over a range of SNR values (e.g. using simulation or by obtaining the BER values theoretically or experimentally). These values may be obtained based on a specific system, for example using a particular coding scheme (e.g. LDPC code with a certain parity check matrix) with a certain coding rate and a certain bit interleaver and cell interleaver. FIG. 10 illustrates an exemplary plot for 64-QAM using an LDPC coding rate (CR) of 2/3 from DVB-T2 in an AWGN channel.

In a next step 905, the SNR at which the BER falls below a threshold value (e.g. 0.001) is determined. The threshold value may be selected such that the resulting SNR falls within a "waterfall zone" of the BER curve (i.e. the zone at which the BER falls relatively rapidly with increasing SNR). The determined SNR value may be denoted S and referred to as a "waterfall" SNR.

In a next step, the optimal constellation may be obtained for the SNR value S determined in step 905.

For example, in some embodiments, in step 907*a*, the optimal constellation may be selected from the optimal constellations obtained when performing the algorithms described above in relation to FIGS. 1-8 (and stored in a look-up table). Specifically, the optimal constellation previously determined for the SNR value S may be retrieved from the look-up table.

Alternatively, an iterative process may be performed to obtain an optimal (non-uniform) constellation, as follows. Specifically, following step 905, the method moves to step 907*b* in which the algorithms described above in relation to FIGS. 1-8 are used to obtain an optimal constellation for the SNR value S (or for a value close to S). Following step 907*b*, the method returns to step 903, in which BER values are obtained over a range of SNR. In this iteration, the BER values are obtained for the optimal constellation obtained in step 907*b* (rather than for the initial uniform constellation as in the first iteration). In a similar manner as previously described, the SNR value at which the BER falls below a threshold value (using the new set of BER values for the optimal constellation) is determined in step 905, and a new optimal constellation for the newly determined SNR value is obtain in step 907*b*. The previously described steps 903, 905, 907 may be repeated a certain number of time (for example a predetermined number of times). Alternatively, the algorithm may terminate when the waterfall SNR stops decreasing between iterations, and instead starts increasing.

FIGS. 11 and 12 illustrate a sixth algorithm for determining an optimal constellation. This algorithm corresponds closely to the algorithm illustrated in FIG. 8, but is modified to improve performance. In particular, this algorithm introduces the concept of a direction of convergence of a parameter value. For example, within the inner loop of the algorithm, the direction is initialised to 0. When creating a set of candidate constellations, the candidate set depends on the direction parameter. When the best constellation is selected in step 1109, the direction of convergence of the value of parameter i is obtained. For example, if the parameter value is converging upwards then the direction parameter may be set to +1, if the parameter is converging downwards then the direction parameter may be set to −1, and if the parameter does not change then the direction parameter may be set to 0. As illustrated in FIG. 12, the number of candidate constellations may be reduced when the parameter value is converging upwards or downwards.

In an exemplary embodiment marked "Example 1" of FIG. 12, in a first iteration all the 3 points are computed, and the upper one is the best one. In a second iteration only the top one is computed, and the upper is the best one. In a third iteration only the one is computed, the middle is the best one. Instead of 9 points, we needed only 5.

Further, in an exemplary embodiment marked "Example 2" of FIG. 12, in a first iteration all the 9 points are computed, and the bottom one is the best one. In a second iteration only the 3 bottom ones is computed, and the corner is the best one. In a third iteration only the 5 borders are computed, and the middle is the best one. Instead of 9*3=27 points, we needed only 9+3+5=17.

As described above, an optimum constellation may be obtained for a particular system implementation, and/or for certain system parameter values. For example, an optimum constellation (e.g. a constellation that optimises the BICM capacity) may be obtained for a certain propagation channel type (e.g. AWGN, Rayleigh or Typical Urban, TU6, channel) and for a certain SNR. However, in some cases, data may be transmitted in different scenarios. For example, data may be transmitted through different types of channels and may be received with different SNRs. Furthermore, it may be desirable or required that a data transmission system uses the same constellation, regardless of the scenario (e.g. channel type or SNR), for example in order to reduce system complexity. In some cases, a transmission system may use a certain constellation for many different scenarios (e.g. channel types and SNRs).

FIGS. 50-53 illustrate an algorithm for obtaining a constellation that is optimised (e.g. achieves the best capacity) with respect to two or more different scenarios (e.g. different channel types and/or SNR values). The algorithm comprises a number of different parts. First, the waterfall SNR for each channel type (e.g. propagation channel type) is obtained using an algorithm similar to the algorithm illustrated in FIG. 9. A weighted performance measure function (e.g. weighted capacity) for an input constellation is defined, based on different scenarios (e.g. different channel types and SNR values). Then, an algorithm similar to the algorithms illustrated in FIG. 2, 8 or 11 is applied to determine an optimum constellation, where the performance measure used is based on the weighted performance measure.

FIG. 50 illustrates a process for obtaining the waterfall SNR for each channel type. Each channel type is treated separately in order to obtain its waterfall SNR. In particular, the process illustrated in FIG. 50 is repeated for each channel type to obtain a respective waterfall SNR for that channel type. The process illustrated in FIG. 50 operates in substantially the same manner as the algorithm illustrated in FIG. 9, and therefore a detailed description will be omitted for conciseness. However, rather than outputting an optimal constellation, as in the algorithm illustrated in FIG. 9, the process illustrated in FIG. 50 instead outputs the waterfall SNR determined in the final iteration of the process. The process illustrated in FIG. 50 (including BER simulation and capacity optimisation steps) is performed based on a certain channel type, and the output waterfall SNR is determined as the waterfall SNR associated with that channel type.

FIG. 51 schematically illustrates a process for obtaining a weighted performance measure function for an input constellation based on different transmission scenarios. In this example, the weighted performance measure is a weighted capacity, and the different scenarios comprise different channel types and associated waterfall SNR values. As illustrated in FIG. 51, a candidate constellation is provided as an input. For each channel type and associated waterfall SNR, the BICM capacity for the input constellation based on the channel type and waterfall SNR is obtained. Each obtained BICM capacity is then multiplied by a respective weight and the weighted BICM capacities are added together to obtain an output weighted average BICM capacity. The weights may be selected according to any suitable criteria. For example, a relatively common or important channel type may be associated with a relatively large weight.

FIG. 52 illustrates a process for obtaining an optimum constellation. The process illustrated in FIG. 52 operates in substantially the same manner as the algorithm illustrated in FIG. 2, 8 or 11, and therefore a detailed description will be omitted for conciseness. However, when determining the performance of a candidate performance in the process illustrated in FIG. 52, the performance is determined based on the weighted performance measure described above in relation to FIG. 51.

In the process illustrated in FIG. 52, in some situation, a certain constellation may achieve the best performance with respect to the weighted performance measure, even though the performance of that constellation with respect to the BICM capacity based on an individual channel and SNR may be relatively low. In certain embodiments, to ensure that a constellation obtained using the algorithm is able to achieve at least a certain level of performance for one or more, or all, transmission scenarios, an additional criterion may be applied when testing each candidate constellation to obtain the constellation C_best. Specifically, any candidate constellation that does not achieve at least a threshold performance with respect to one or more certain individual scenarios, or all scenarios, is ignored and cannot be selected as C_best, even if that constellation achieves the best performance with respect to the weighted performance measure.

In the process illustrated in FIG. 52, the set of candidate constellations may be derived using any suitable method, for example the method described above in relation to FIG. 9 based on a step size d. FIGS. 53*a* and 53*b* illustrate alternative schemes for generating a candidate constellation from a previous constellation, C_last, that may be used in certain embodiments. In FIGS. 53*a* and 53*b*, the open circles represent the constellation points of a previous constellation, C_last. For each constellation point of the previous constellation, a respective set of N modified constellation points are defined, indicated in FIGS. 53*a* and 53*b* as filled circles. Each set of modified constellation points forms a pattern of constellation points located relatively close to the respective constellation point of the previous constellation.

For example, as illustrated in FIG. 53*a*, each set of modified constellation points may form a square or rectangular lattice of N=8 constellation points surrounding a respective constellation point of the previous constellation. The lattice spacing is equal to d. Alternatively, as illustrated in FIG. 53*b*, each set of modified constellation points may form a ring of N=8 constellation points surrounding a respective constellation point of the previous constellation. The radius of the ring is equal to d.

A candidate constellation may be obtained by selecting, for each constellation point in the previous constellation, either the constellation point of the previous constellation itself or one of the constellation points of a respective set of modified constellation points.

In the examples described above, a weighted performance measure is defined based on different transmission scenarios. For example, in the case illustrated in FIG. 51, each transmission scenario comprises a different channel type and an associated waterfall SNR value. Accordingly, a constellation optimised for a range of channel types and associated SNR values may be obtained. In an alternative embodiment, an optimal constellation may be obtained for different transmission scenarios, in the case where each transmission scenario comprises the same channel type, but involves different SNR values (e.g. a set of SNR values S1, S1+d, S1+2d, S1+3d, . . . , S2, where d is a step size). That is, an optimal constellation may be obtained for a fixed channel type that is intended to be used over a range of SNR values. In this case, the algorithm described above in relation to FIGS. 50-53 may be used, except that when determining the weighted performance measure as illustrated in FIG. 51, instead of determining individual BICM capacities based on respective channel types and associated waterfall SNR values, the individual BICM capacities are determined based on the fixed channel type and respective SNR values S1, S1+d, S1+2d, S1+3d, . . . , S2.

In the algorithms described above, a technique may be applied to reduce the overall complexity. In particular, when a set of candidate constellations is generated and the performance of the candidate constellations are tested, those candidate constellations that have been previously tested (i.e. in one or more previous iteration) are not re-tested. That is, in a current iteration, only those candidate constellations that have not been tested in previous iterations are tested.

For example, as described above, a first set of candidate constellations, A, is generated in an iteration, and the best performing candidate constellation, a ($a \in A$), is selected from this set. In the next iteration, a second set of candidate constellations, B, is generated based on the previously selected constellation a ($a \in B$). In this next iteration, the best performing candidate constellation b ($b \in B$) from set B needs to be determined.

Typically, there will be at least some overlap between the two sets of candidate constellations A and B, such that one or more candidate constellations belong to both sets A and B (i.e. $A \cap B \neq \emptyset$), including constellation a. Since it is known that constellation a has the best performance of all the constellations in set A, then it is also known that constellation a has the best performance of all the constellations belonging to the overlap between sets A and B (i.e. $A \cap B$).

Accordingly, when testing the constellations in set B to determine the best performing constellation, b, it is not necessary to re-test those constellations belonging to the overlap between sets A and B (i.e. it is not necessary to re-test those constellations in the set $A \cdot B$). Instead, rather than testing all constellations in set B, only those constellations belonging to the smaller set of constellations $B^*$, comprising constellations belonging to set B but excluding any constellations that also belong to set A (i.e. $B^* = B \setminus A$) are tested. Then, the best performing constellation from the set formed from the union of $B^*$ and the previous best performing constellation, a (i.e. the best performing constellation from the set $B^* \cup a$) is selected as the best performing constellation, b, of set B.

An example of the above principle in relation to the example shown in FIG. 53*a* is illustrated in FIG. 54. In the example of FIG. 54, at iteration i, it was found that the constellation point indicated as a black circle is the best performing. At iteration i+1, there is no need to test the common subset (including the white circles and the black circle), because it was already tested before and gave an inferior performance. That is, at iteration i+1, only the dark grey circles need to be tested. Accordingly, in the illustrated example, a reduction in complexity of 44% (=4/9) is achieved.

FIG. 55 illustrates an apparatus for implementing an algorithm according to an exemplary embodiment, for example one or more of the embodiments described above. The apparatus is configured for generating a non-uniform constellation. The apparatus comprises a block for performing a first process. The block for performing the first process comprises: a block for obtaining a first constellation defined by one or more parameter values; and a block for generating a second constellation based on the first constellation using a second process. The block for generating the second constellation based on the first constellation using the second process comprises: a block for obtaining a set of candidate constellations, wherein the set of candidate constellations comprises the first constellation and one or more modified constellations, wherein each modified constellation is obtained by modifying the parameter values defining the first constellation; a block for determining the performance of each candidate constellation according to a predetermined performance measure; and a block for selecting the candidate constellation having the best performance as the second constellation. The block for performing the first process further comprises a block for determining a difference between the first constellation and the second constellation; and a block for, if the second constellation differs from the first constellation by more than a threshold amount, causing the block for performing the first process to repeat the first process using the second constellation generated in the current iteration of the first process as the first constellation in the next iteration.

The skilled person will appreciate that the functions of any two or more blocks illustrated in FIG. 55 may be performed by a single block, and that the functions of any block illustrated in FIG. 55 may be performed by two or more blocks. A block may be implemented in any suitable form, for example hardware, software, firmware, or any suitable combination of hardware, software and firmware.

A constellation obtained by a method according to exemplary embodiments of the present invention may be used in a digital broadcasting system to transmit data from a transmitter side to a receiver side. In certain exemplary embodiments, the system comprises a transmitter arranged to obtain data (e.g. a data stream), perform any required encoding and/or other processing of the data, modulate a signal using the data according to a modulation scheme corresponding to the constellation, and transmit the modulated signal. The system further comprises a receiver configured to receive a modulated signal, demodulate the signal according to a demodulation scheme corresponding to the constellation (or a similar or corresponding constellation), and perform any necessary decoding and/or other processing to recover the original data. Certain embodiments may comprise a transmitter side apparatus only, a receiver side apparatus only, or a system comprising both a transmitter side apparatus and a receiver side apparatus.

FIG. 13*a* illustrates a uniform constellation (64-QAM), FIG. 13*b* illustrates a non-uniform constellation (64-QAM) characterised by 3 parameters, and FIG. 13*c* illustrates a non-uniform constellation (64-QAM) characterised by 16 parameters. As illustrated in FIG. 13*c*, in some embodiments, the constellation points are not constrained to lie on a square lattice.

The number of parameters depends on the number of constraints, as can be seen by comparing the non-uniform constellations illustrated in FIGS. 13*b* and 13*c*.

The Annexes to this description include various tables comprising data obtained using certain embodiments of the present invention. Annex 1a covers square constellations and Annex 2a covers non-square constellations. Each Annex covers four constellation sizes, 16, 64, 256 and 1024.

The first column in each table is the optimal SNR for which the values are optimal. In the case of the tables indicated NU-QAM (square), the tables contain the optimal normalized levels/parameters (L1, L2, L3 . . . ). There are different numbers of levels for each order of constellation.

In the case of the tables indicated NUC (non-square), the tables contain the raw point values (a1, a2, a3 . . . ) in the first quadrant (the other 3 quadrants can be derived by symmetry). The values in these tables are complex (A+Bi) since the constellation is two dimensional.

The Annexes to the Figures illustrate results obtained from various embodiments of the present invention.

Various results obtained by applying the algorithms described above will now be described. For example, results obtained for NU-QAM constellations of different sizes (specifically NU 16-QAM, NU 64-QAM, NU 256-QAM and NU 1024-QAM), and using different code rates (specifically 6/15, 7/15, 8/15, 9/15, 10/15, 11/15, 12/15 and 13/15), are described. These results show that non-uniform constellations provide a significant gain over corresponding uniform constellations. The values of the set of constellation points for various exemplary constellations obtained by applying the algorithms described above are also described.

FIG. 14*a* illustrates a set of BER curves obtained using a NU 16-QAM constellation, NUC, using respective code rates, CRs (specifically the code rates mentioned above), and a set of BER curves obtained using a corresponding (uniform) 16-QAM constellation using the same code rates. The solid curves are the BER curves for the NU 16-QAM constellation and the dotted curves are the BER curves for the corresponding uniform 16-QAM constellation. FIG. 14*a* also indicates the SNR gain (at the waterfall, WF, zone) obtained using the NU 16-QAM constellation with respect to the corresponding 16-QAM constellation for each code rate.

FIG. 14*b* is a table indicating, for each code rate, the SNR values at the waterfall zone (e.g. the waterfall SNR values) for the uniform and non-uniform constellations used to obtain the BER curves illustrated in FIG. 14*a*, and the resulting SNR gain (obtained as a difference between the SNR values). As indicated, a SNR gain of up to 0.3 dB (e.g. for code rates of 8/15 and 9/15) may be obtained.

FIGS. 15*a* and 15*b* illustrate a set of BER curves and SNR gain values, similar to FIGS. 14*a* and 14*b*, using a NU 64-QAM constellation and a corresponding (uniform) 64-QAM constellation, and using the code rates mentioned above.

FIGS. 16*a* and 16*b* illustrate a set of BER curves and SNR gain values, similar to FIGS. 14*a* and 14*b*, using a NU 256-QAM constellation and a corresponding (uniform) 256-QAM constellation, and using the code rates mentioned above.

FIGS. 17*a* and 17*b* illustrate a set of BER curves and SNR gain values, similar to FIGS. 14*a* and 14*b*, using a NU 1024-QAM constellation and a corresponding (uniform) 1024-QAM constellation, and using the code rates mentioned above.

FIG. 18 illustrates an exemplary NU 16-QAM constellation obtained by applying the algorithms described above using a code rate of 6/15. The positions of the individual constellation points are indicated in the constellation diagram on the right-hand side of FIG. 18. The values of the constellation points of the top-right quadrant are indicated on the left—hand side of FIG. 18. The values of the constellation points of the other quadrants may be deduced by symmetry. In particular, for each constellation point A in the top-right quadrant, there is a corresponding constellation point in each of the three other quadrants (bottom-right, bottom-left and top-left), given, respectively, by A*, −A* and −A, where * denotes complex conjugation.

FIGS. 19-25 illustrate exemplary NU 16-QAM constellations obtained by applying the algorithms described above using code rates of 7/15, 8/15, 9/15, 10/15, 11/15, 12/15 and 13/15, respectively. As with FIG. 18, the complete set of constellation points are indicated in the constellation diagram on the right-hand side of the Figures, and the values of the constellation points of the top-right quadrant are indicated on the left-hand side of the Figures. As with FIG. 18, the values of the constellation points in the other three quadrants may be similarly deduced by symmetry.

In alternative embodiments, the constellations illustrated in FIGS. 18-25 may comprise constellation points given in Tables 2-6 in Annex 7.

FIGS. 26-33 illustrate exemplary NU 64-QAM constellations obtained by applying the algorithms described above using code rates of 6/15, 7/15, 8/15, 9/15, 10/15, 11/15, 12/15 and 13/15, respectively. As with FIG. 18, the complete set of constellation points are indicated in the constellation diagram on the right-hand side of the Figures, and the values of the constellation points of the top-right quadrant are indicated on the left-hand side of the Figures. As with FIG. 18, the values of the constellation points in the other three quadrants may be similarly deduced by symmetry.

In alternative embodiments, the constellations illustrated in FIGS. 26-33 may comprise constellation points given in Tables 7-11 in Annex 7.

FIGS. 34-41 illustrate exemplary NU 256-QAM constellations obtained by applying the algorithms described above using code rates of 6/15, 7/15, 8/15, 9/15, 10/15, 11/15, 12/15 and 13/15, respectively. As with FIG. 18, the complete set of constellation points are indicated in the constellation diagram on the right-hand side of the Figures, and the values of the constellation points of the top-right quadrant are indicated on the left-hand side of the Figures. As with FIG. 18, the values of the constellation points in the other three quadrants may be similarly deduced by symmetry.

In alternative embodiments, the constellations illustrated in FIGS. 34-41 may comprise constellation points given in Tables 12-16 in Annex 7.

FIGS. 42-49 illustrate exemplary NU 1024-QAM constellations obtained by applying the algorithms described above using code rates of 6/15, 7/15, 8/15, 9/15, 10/15, 11/15, 12/15 and 13/15, respectively. As with FIG. 18, the complete set of constellation points are indicated in the constellation diagram on the right-hand side of the Figures. The values of the constellation points of the top-right quadrant are indicated on the left-hand side of the Figures. In FIGS. 42-49, in contrast to FIGS. 18-41, rather than giving the values of the constellation points explicitly, a set of levels of the constellation point are given instead, from which the actual values of the constellation points may be deduced. Specifically, given a set of m levels $A=[A_1, A_2, \ldots, A_m]$, a set of $m^2$ constellation point values C+Dj may be deduced, wherein C and D each comprise a value selected from the set, A, of levels. The complete set of constellation points in the top-right quadrant is obtained by considering all possible pairs of values C and D. As with FIG. 18, the values of the constellation points in the other three quadrants may be similarly deduced by symmetry.

In alternative embodiments, the constellations illustrated in FIGS. 42-49 may comprise constellation points given in Tables 17-21 in Annex 7.

The skilled person will appreciate that, in certain embodiments, the constellations indicated in FIGS. 18-49 may be rotated and/or scaled (where the scaling factor applied to the real and imaginary axis may be the same or different) and/or have any other transformation applied thereto. The constellations indicated in FIGS. 18-49 may be regarded as constellations, which indicate the relative positions of the constellation points, and from which other constellations may be derived through rotation and/or scaling and/or any other suitable transformation.

Tables 2-6 in Annex 7 indicate the values of the constellation points of exemplary normalised NU 16-QAM constellations obtained by applying the algorithms described above using coding rates of 5/15, 7/15, 9/15, 11/15, and 13/15, and fora single SNR value.

Tables 7-11 in Annex 7 indicate the values of the constellation points of exemplary normalised NU 64-QAM constellations obtained by applying the algorithms described above using coding rates of 5/15, 7/15, 9/15, 11/15, and 13/15, and for one SNR, in a similar manner to Tables 2-6.

Tables 12-16 in Annex 7 indicate the values of the constellation points of exemplary normalised NU 256-QAM constellations obtained by applying the algorithms described above using coding rates of 5/15, 7/15, 9/15, 11/15, and 13/15, and for one SNR, in a similar manner to Tables 2-11.

Tables 17-21 in Annex 7 indicate the values of the constellation points of exemplary normalised NU 1024-QAM constellations obtained by applying the algorithms described above using coding rates of 5/15, 7/15, 9/15, 11/15 and 13/15, and for one SNR. In tables 17-21, in contrast to Tables 2-16, rather than giving the values of the constellation points explicitly, a set of levels of the constellation point are given instead, from which the actual values of the constellation points may be deduced, as described above.

The skilled person will appreciate that the present invention is not limited to the specific constellations indicated in FIGS. 18-49 and Tables 2-22. For example, in certain embodiments, constellations of different orders and/or constellation comprising different arrangements or relative positions of constellation points may be used. In some embodiments, a constellation similar to one of the constellations indicated in FIGS. 18-49 and/or Tables 2-22 may be used. For example, a constellation having constellation point values differing by no more than a certain threshold amount (or tolerance or error) from the values indicated in FIGS. 18-49 and/or Tables 2-22 may be used. The threshold amount may be expressed, for example, as a relative amount (e.g. 0.1%, 1%, 5% etc.), as an absolute amount (e.g. 0.001, 0.01, 0.1 etc.), or in any other suitable way. In certain embodiments, a constellation point may be rounded using any suitable rounding operator. For example, a constellation point given by A1=0.775121+0.254211 j may be rounded to A2=0.775+0.254j. The non-rounded or the rounded value may be stored in a table.

In certain exemplary embodiments, the transmitter and the receiver may use constellations that are not exactly the same. For example, the transmitter and the receiver may user respective constellations in which one or more constellation points differ by no more than a certain threshold amount. For example, the receiver may use a constellation comprising one or more rounded constellation points (e.g. A2) to de-map the constellation value, while the transmitter may use a constellation comprising the non-rounded constellation points (e.g. A1).

Annexes 1b and 2b include alternative data to the data included in Annexes 1a and 2a. Annex 1b covers square constellations and Annex 2b covers non-square constellations. Each Annex covers four constellation sizes, 16, 64, 256 and 1024. The tables in Annex 2b contain the 2D constellation points for a range of SNR values. Different labelling (i.e. mappings between bits and constellation points) can be used. For each constellation, there exist (log 2(points)−2)!*2^(log 2(points)−2) possible labellings that lead to an optimal capacity value. The Annex 2b tables only show one possible, exemplary, labelling. However, the skilled person can reorder the points of a given constellation/SNR, obtaining a different labelling but maintaining the same performance.

The Annexes to this description include various LDPC parity bit accumulator tables that may be used in certain embodiments of the present invention. Specifically, Annex 3 contains parity bit accumulator tables used to generate the Parity Check Matrix for each coding rate. A table is provided for each LDPC length, specifically 64 k or 16 k. For example, tables in Annex 3 were used in obtaining the results illustrated in FIGS. 14-49. When applying the algorithms described above, the waterfall zone and waterfall SNR depends on the LDPC matrix used. In the tables of Annex 3, each row represents one of the Quasi-Cyclic Low-Density Parity-Check, QC LDPC, columns generators.

Annex 4 indicates the values of the constellation points of further exemplary 16-QAM, 64-QAM, 256-QAM and 1024-QAM constellations obtained by applying an algorithm according to an exemplary embodiment of the present invention, for example one or more of the algorithms described above, using coding rates of 7/15, 9/15, 11/15 and 13/15. The 16-QAM, 64-QAM and 256-QAM constellations are NUC constellations, where constellation points are given for the first quadrant only. The constellation points for the other three quadrants may be deduced by symmetry, as described above in relation to FIGS. 18-41. The 1024-QAM constellation is an NU-QAM (rectangular) constellation, where the constellation points are defined by a set of levels, as described above in relation to FIGS. 42-49.

Annex 5 indicates the values of the constellation points of further exemplary 16-QAM, 64-QAM and 256-QAM constellations obtained by applying an algorithm according to an exemplary embodiment of the present invention, for example one or more of the algorithms described above. In certain exemplary embodiments, these constellations may be used for coding rates of 3/10 or below.

Annex 6 indicates the values of the constellation points of further exemplary 16-QAM, 64-QAM, 256-QAM and 1024-QAM constellations obtained by applying an algorithm according to an exemplary embodiment of the present invention, for example one or more of the algorithms described above, using coding rates of 5/15 (for 64-QAM and 256-QAM only), 7/15, 9/15, 11/15 and 13/15. The 16-QAM, 64-QAM, 256-QAM constellations, and the second 1024-QAM constellation, are NUC constellations, where constellation points are given for the first quadrant only. The constellation points for the other three quadrants may be deduced by symmetry, as described above in relation to FIGS. 18-41. The first 1024-QAM constellation is an NU-QAM (rectangular) constellation, where the constellation points are defined by a set of levels, as described above in relation to FIGS. 42-49.

In cases where the constellations are indicated in terms of a set of levels, the actual constellation points may be constructed from the indicated levels. For example, Annex 6 gives a "1K-QAM (1 dimension)" constellation in terms of a set of levels. Table 22 in Annex 8 gives the values of the constellation points in the first quadrant for the "1K-QAM (1 dimension)" constellation, which may be constructed from the set of levels given in Annex 6. The constellation points for the other three quadrants may be deduced by symmetry. One example of the construction of a set of constellation points from a set of levels is given in Annex 9.

The constellation points coordinates included in the present disclosure may be rounded off to the nearest whole number at any decimal point. For example, a constellation point coordinate may be rounded off in the fifth decimal place after the decimal point.

It will be appreciated that embodiments of the present invention can be realized in the form of hardware, software or a combination of hardware and software. Any such software may be stored in the form of volatile or non-volatile storage, for example a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are embodiments of machine-readable storage that are suitable for storing a program or programs comprising instructions that, when executed, implement certain embodiments of the present invention. Accordingly, certain embodiments provide a program comprising code for implementing a method, apparatus or system as claimed in any one of the claims of this specification, and a machine-readable storage storing such a program. Still further, such programs may be conveyed electronically via any medium, for example a communication signal carried over a wired or wireless connection, and embodiments suitably encompass the same.

While the invention has been shown and described with reference to certain embodiments thereof, it will be understood by those skilled in the art that various changes in form and detail may be made therein without departing from the scope of the invention, as defined by the appended claims.

Annex to the Description—Annex 1a

| 16NUQAM | | |
|---|---|---|
| SNR | L1 | L2 |
| 4 | 1 | 2.839885 |
| 4.1 | 1 | 2.893707 |
| 4.2 | 1 | 2.947556 |
| 4.3 | 1 | 2.999997 |
| 4.4 | 1 | 3.051775 |
| 4.5 | 1 | 3.102185 |
| 4.6 | 1 | 3.15186 |
| 4.7 | 1 | 3.199446 |
| 4.8 | 1 | 3.246374 |
| 4.9 | 1 | 3.291983 |
| 5 | 1 | 3.336053 |
| 5.1 | 1 | 3.378123 |
| 5.2 | 1 | 3.418789 |
| 5.3 | 1 | 3.457634 |
| 5.4 | 1 | 3.494374 |
| 5.5 | 1 | 3.529293 |
| 5.6 | 1 | 3.562092 |
| 5.7 | 1 | 3.592767 |
| 5.8 | 1 | 3.62144 |
| 5.9 | 1 | 3.647331 |
| 6 | 1 | 3.671139 |
| 6.1 | 1 | 3.692771 |
| 6.2 | 1 | 3.711765 |
| 6.3 | 1 | 3.727773 |
| 6.4 | 1 | 3.741562 |
| 6.5 | 1 | 3.753443 |
| 6.6 | 1 | 3.762235 |
| 6.7 | 1 | 3.768439 |
| 6.8 | 1 | 3.77272 |
| 6.9 | 1 | 3.774647 |
| 7 | 1 | 3.773951 |
| 7.1 | 1 | 3.77135 |
| 7.2 | 1 | 3.767057 |
| 7.3 | 1 | 3.760857 |
| 7.4 | 1 | 3.752584 |
| 7.5 | 1 | 3.743116 |
| 7.6 | 1 | 3.732592 |
| 7.7 | 1 | 3.720692 |
| 7.8 | 1 | 3.707042 |
| 7.9 | 1 | 3.69362 |
| 8 | 1 | 3.678595 |
| 8.1 | 1 | 3.663756 |
| 8.2 | 1 | 3.647761 |
| 8.3 | 1 | 3.631964 |
| 8.4 | 1 | 3.615282 |
| 8.5 | 1 | 3.598823 |
| 8.6 | 1 | 3.582573 |
| 8.7 | 1 | 3.565892 |
| 8.8 | 1 | 3.55006 |
| 8.9 | 1 | 3.5338 |
| 9 | 1 | 3.517746 |
| 9.1 | 1 | 3.502524 |
| 9.2 | 1 | 3.487487 |
| 9.3 | 1 | 3.472631 |
| 9.4 | 1 | 3.45797 |
| 9.5 | 1 | 3.443485 |
| 9.6 | 1 | 3.430061 |
| 9.7 | 1 | 3.41677 |
| 9.8 | 1 | 3.403622 |
| 9.9 | 1 | 3.391227 |
| 10 | 1 | 3.378963 |
| 10.1 | 1 | 3.367421 |
| 10.2 | 1 | 3.355998 |
| 10.3 | 1 | 3.345294 |
| 10.4 | 1 | 3.334305 |
| 10.5 | 1 | 3.324627 |
| 10.6 | 1 | 3.314486 |
| 10.7 | 1 | 3.304843 |
| 10.8 | 1 | 3.295784 |
| 10.9 | 1 | 3.287364 |
| 11 | 1 | 3.278865 |
| 11.1 | 1 | 3.270628 |
| 11.2 | 1 | 3.262403 |

-continued

| 16NUQAM | | |
|---|---|---|
| SNR | L1 | L2 |
| 11.3 | 1 | 3.254759 |
| 11.4 | 1 | 3.247699 |
| 11.5 | 1 | 3.240646 |
| 11.6 | 1 | 3.233605 |
| 11.7 | 1 | 3.227272 |
| 11.8 | 1 | 3.220939 |
| 11.9 | 1 | 3.214612 |
| 12 | 1 | 3.208285 |
| 12.1 | 1 | 3.202533 |
| 12.2 | 1 | 3.197353 |
| 12.3 | 1 | 3.191598 |
| 12.4 | 1 | 3.186426 |
| 12.5 | 1 | 3.181815 |
| 12.6 | 1 | 3.176644 |
| 12.7 | 1 | 3.172139 |
| 12.8 | 1 | 3.167631 |
| 12.9 | 1 | 3.163111 |
| 13 | 1 | 3.158592 |
| 13.1 | 1 | 3.154649 |
| 13.2 | 1 | 3.150688 |
| 13.3 | 1 | 3.146739 |
| 13.4 | 1 | 3.142772 |
| 13.5 | 1 | 3.138807 |
| 13.6 | 1 | 3.135416 |
| 13.7 | 1 | 3.132018 |
| 13.8 | 1 | 3.128616 |
| 13.9 | 1 | 3.125221 |
| 14 | 1 | 3.122455 |
| 14.1 | 1 | 3.119049 |
| 14.2 | 1 | 3.116279 |
| 14.3 | 1 | 3.113504 |
| 14.4 | 1 | 3.110719 |
| 14.5 | 1 | 3.107929 |
| 14.6 | 1 | 3.104898 |

-continued

| 16NUQAM | | |
|---|---|---|
| SNR | L1 | L2 |
| 14.7 | 1 | 3.102507 |
| 14.8 | 1 | 3.10012 |
| 14.9 | 1 | 3.097736 |
| 15 | 1 | 3.095345 |

| 64NUQAM | | | | |
|---|---|---|---|---|
| SNR | L1 | L2 | L3 | L4 |
| 4 | 1 | 1 | 2.839885 | 2.839885 |
| 5 | 1 | 1 | 3.333799 | 3.333799 |
| 6 | 1 | 1 | 3.673272 | 3.673272 |
| 7 | 1 | 1 | 3.772273 | 3.786417 |
| 8 | 1 | 1.191385 | 3.567779 | 4.620412 |
| 9 | 1 | 1.420475 | 3.669097 | 5.36928 |
| 10 | 1 | 1.712789 | 3.997906 | 6.241096 |
| 11 | 1 | 2.079134 | 4.429257 | 7.139089 |
| 12 | 1 | 2.511934 | 4.87267 | 7.976119 |
| 13 | 1 | 2.764698 | 5.145644 | 8.394934 |
| 14 | 1 | 3.017794 | 5.480702 | 8.804139 |
| 15 | 1 | 3.047482 | 5.480719 | 8.655799 |
| 16 | 1 | 3.106828 | 5.510392 | 8.537099 |
| 17 | 1 | 3.046101 | 5.351575 | 8.118142 |
| 18 | 1 | 3.016799 | 5.229677 | 7.806698 |
| 19 | 1 | 3.072838 | 5.257719 | 7.750716 |
| 20 | 1 | 3.072822 | 5.257695 | 7.666657 |
| 21 | 1 | 3.016336 | 5.114428 | 7.403244 |
| 22 | 1 | 3.016351 | 5.114446 | 7.348773 |
| 23 | 1 | 3.016337 | 5.087177 | 7.267007 |
| 24 | 1 | 3.016341 | 5.087182 | 7.239767 |

| 256 NUQAM | | | | | | | | |
|---|---|---|---|---|---|---|---|---|
| SNR | L1 | L2 | L3 | L4 | L5 | L6 | L7 | L8 |
| 7 | 1 | 1 | 1 | 1 | 3.759495 | 3.759495 | 3.759495 | 3.759495 |
| 8 | 1 | 0.865981 | 0.752579 | 0.865981 | 3 | 4.422682 | 3 | 2.69072 |
| 9 | 1 | 0.823528 | 0.686273 | 0.823528 | 2.823528 | 4.401956 | 2.823528 | 2.558823 |
| 10 | 1 | 1.12848 | 1.578161 | 1.385441 | 3.91221 | 3.869383 | 4.661674 | 6.803007 |
| 11 | 1 | 1.023423 | 1.843092 | 1.772836 | 3.997663 | 4.231856 | 5.730687 | 7.651065 |
| 12 | 1 | 0.974163 | 2.188638 | 2.188638 | 4.281664 | 4.669262 | 6.555574 | 8.622762 |
| 13 | 1 | 0.971184 | 2.556198 | 2.613837 | 4.659952 | 5.2075 | 7.39771 | 9.818462 |
| 14 | 1 | 0.969417 | 2.773689 | 2.865438 | 4.853198 | 5.495397 | 7.850127 | 10.54125 |
| 15 | 1 | 1 | 2.954397 | 3.117258 | 5.169379 | 5.885988 | 8.361555 | 11.26058 |
| 16 | 1 | 1 | 2.954403 | 3.182412 | 5.169383 | 5.98372 | 8.361572 | 11.22802 |
| 17 | 1 | 1.13937 | 3.125436 | 3.508715 | 5.49478 | 6.574918 | 8.944254 | 11.90593 |
| 18 | 1 | 1.299621 | 3.209728 | 3.883887 | 5.793994 | 7.292119 | 9.614208 | 12.61046 |
| 19 | 1 | 2.014496 | 3.995172 | 5.444447 | 7.521745 | 9.695663 | 12.4493 | 16.02418 |
| 20 | 1 | 2.63841 | 4.672306 | 6.593206 | 8.909592 | 11.45195 | 14.5593 | 18.45759 |
| 21 | 1 | 2.916187 | 4.952133 | 7.107824 | 9.503049 | 12.25757 | 15.43123 | 19.26359 |
| 22 | 1 | 2.916143 | 4.952058 | 7.10773 | 9.502917 | 12.13763 | 15.13162 | 18.66453 |
| 23 | 1 | 3.035904 | 5.071823 | 7.227493 | 9.562818 | 12.13764 | 14.952 | 18.24539 |
| 24 | 1 | 3.035928 | 5.131725 | 7.347292 | 9.682613 | 12.1377 | 14.83232 | 17.88619 |
| 25 | 1 | 3.095825 | 5.25153 | 7.407236 | 9.682704 | 12.1378 | 14.77255 | 17.7067 |
| 26 | 1 | 3.095796 | 5.251469 | 7.407143 | 9.682587 | 12.07779 | 14.59274 | 17.34722 |
| 27 | 1 | 3.095806 | 5.251487 | 7.467059 | 9.68263 | 12.01797 | 14.47305 | 17.10778 |

| 1024 NUQAM | | | | | | | | | |
|---|---|---|---|---|---|---|---|---|---|
| SNR | L1 | L2 | L3 | L4 | L5 | L6 | L7 | L8 | L9 |
| 11 | 1 | 1 | 1.027778 | 1.027778 | 1.833333 | 1.833333 | 1.777778 | 1.777778 | 3.972222 |
| 12 | 1 | 1 | 1 | 1 | 2.25 | 2.25 | 2.25 | 2.25 | 4.375 |
| 13 | 1 | 1 | 0.966667 | 0.966667 | 2.5 | 2.5 | 2.533333 | 2.533333 | 4.6 |
| 14 | 1 | 1 | 0.964286 | 0.964286 | 2.714286 | 2.714286 | 2.785714 | 2.785714 | 4.821429 |
| 15 | 1 | 1 | 1 | 1 | 2.923077 | 2.923077 | 3.038462 | 3.038462 | 5.115385 |
| 16 | 1 | 1 | 1 | 1 | 2.884615 | 2.923077 | 3.076923 | 3.076923 | 5.115385 |
| 17 | 1 | 1 | 1.04 | 1.04 | 3 | 3.04 | 3.32 | 3.28 | 5.32 |
| 18 | 1 | 1 | 1.217391 | 1.217391 | 3.130435 | 3.130435 | 3.695652 | 3.695652 | 5.608696 |
| 19 | 1 | 1 | 1.55 | 1.55 | 3.5 | 3.5 | 4.5 | 4.5 | 6.45 |
| 20 | 1 | 1 | 2.466667 | 2.466667 | 4.533333 | 4.533333 | 6.266667 | 6.266667 | 8.533333 |
| 21 | 1 | 1 | 2.785714 | 2.785714 | 4.857143 | 4.857143 | 6.857143 | 6.928571 | 9.142857 |
| 22 | 1 | 1 | 3.076923 | 3.076923 | 5.230769 | 5.230769 | 7.384615 | 7.461538 | 9.692308 |
| 23 | 1 | 1 | 3.076923 | 3.076923 | 5.153846 | 5.230769 | 7.307692 | 7.538462 | 9.538462 |
| 24 | 1 | 1 | 3 | 3.076923 | 5 | 5.230769 | 7.076923 | 7.692308 | 9.384615 |
| 25 | 1 | 1.166667 | 3.083333 | 3.333333 | 5.166667 | 5.75 | 7.416667 | 8.5 | 10.08333 |
| 26 | 1 | 2.375 | 4.25 | 5.75 | 7.75 | 9.375 | 11.375 | 13.375 | 15.5 |
| 27 | 1 | 2.857143 | 4.857143 | 6.857143 | 8.857143 | 10.85714 | 13 | 15.28571 | 17.71429 |
| 28 | 1 | 2.857143 | 4.857143 | 6.857143 | 8.857143 | 11 | 13.28571 | 15.71429 | 18.14286 |
| 29 | 1 | 2.857143 | 4.857143 | 6.857143 | 8.857143 | 11 | 13.28571 | 15.71429 | 18.14286 |
| 30 | 1 | 2.857143 | 4.857143 | 6.857143 | 8.857143 | 11 | 13.28571 | 15.71429 | 18.14286 |
| 31 | 1 | 3 | 4.857143 | 6.857143 | 8.857143 | 11 | 13.28571 | 15.71429 | 18.14286 |

| SNR | L10 | L11 | L12 | L13 | L14 | L15 | L16 |
|---|---|---|---|---|---|---|---|
| 11 | 4.111111 | 4.277778 | 4.138889 | 5.916667 | 5.805556 | 6.5 | 8.638889 |
| 12 | 4.5 | 4.75 | 4.59375 | 6.875 | 6.78125 | 7.4375 | 9.8125 |
| 13 | 4.633333 | 5.033333 | 4.966667 | 7.1 | 7.333333 | 8.466667 | 10.7 |
| 14 | 4.821429 | 5.357143 | 5.357143 | 7.464286 | 7.857143 | 9.464286 | 11.71429 |
| 15 | 5.076923 | 5.692308 | 5.769231 | 7.923077 | 8.423077 | 10.34615 | 12.80769 |
| 16 | 5.038462 | 5.692308 | 5.846154 | 7.884615 | 8.423077 | 10.5 | 13.03846 |
| 17 | 5.24 | 6.04 | 6.28 | 8.24 | 8.84 | 11.04 | 13.68 |
| 18 | 5.608696 | 6.826087 | 7.086957 | 8.956522 | 9.695652 | 11.95652 | 14.69565 |
| 19 | 6.45 | 8.1 | 8.4 | 10.35 | 11.35 | 13.75 | 16.75 |
| 20 | 8.6 | 10.8 | 11.33333 | 13.73333 | 15.26667 | 18.2 | 21.93333 |
| 21 | 9.357143 | 11.57143 | 12.35714 | 14.64286 | 16.64286 | 19.5 | 23.21429 |
| 22 | 10.07692 | 12.23077 | 13.38462 | 15.69231 | 18.07692 | 21 | 24.69231 |
| 23 | 10.23077 | 12.15385 | 13.69231 | 15.76923 | 18.15385 | 20.92308 | 24.38462 |
| 24 | 10.53846 | 12.23077 | 13.92308 | 15.92308 | 18.23077 | 20.92308 | 24.15385 |
| 25 | 11.58333 | 13.33333 | 15.25 | 17.33333 | 19.75 | 22.41667 | 25.58333 |
| 26 | 17.75 | 20.25 | 23 | 26.125 | 29.5 | 33.25 | 37.625 |
| 27 | 20.42857 | 23.28571 | 26.42857 | 29.71429 | 33.42857 | 37.42857 | 42 |
| 28 | 20.71429 | 23.42857 | 26.42857 | 29.71429 | 33.14286 | 36.85714 | 41.14286 |
| 29 | 20.71429 | 23.42857 | 26.42857 | 29.57143 | 32.85714 | 36.28571 | 40.14286 |
| 30 | 20.71429 | 23.42857 | 26.14286 | 29 | 32 | 35.14286 | 38.71429 |
| 31 | 20.71429 | 23.42857 | 26.14286 | 28.85714 | 31.71429 | 34.71429 | 38 |

Annex to the Description—Annex 2a

| 16 NUC | | | | |
|---|---|---|---|---|
| | Normalized values | | | |
| SNR | a1 | a2 | a3 | a4 |
| 4 | 0.531 + 1.193i | 0.284 + 0.462i | 1.193 + 0.530i | 0.462 + 0.284i |
| 4.1 | 0.529 + 1.195i | 0.282 + 0.460i | 1.195 + 0.529i | 0.460 + 0.282i |
| 4.2 | 0.528 + 1.197i | 0.280 + 0.458i | 1.197 + 0.527i | 0.458 + 0.280i |
| 4.3 | 0.526 + 1.199i | 0.278 + 0.457i | 1.199 + 0.526i | 0.457 + 0.278i |
| 4.4 | 0.525 + 1.201i | 0.276 + 0.455i | 1.201 + 0.524i | 0.455 + 0.276i |
| 4.5 | 0.523 + 1.202i | 0.275 + 0.454i | 1.202 + 0.523i | 0.454 + 0.275i |
| 4.6 | 0.522 + 1.203i | 0.274 + 0.453i | 1.203 + 0.522i | 0.454 + 0.274i |
| 4.7 | 0.521 + 1.204i | 0.272 + 0.453i | 1.204 + 0.520i | 0.453 + 0.272i |
| 4.8 | 0.519 + 1.205i | 0.271 + 0.452i | 1.205 + 0.519i | 0.452 + 0.271i |
| 4.9 | 0.518 + 1.206i | 0.270 + 0.452i | 1.206 + 0.518i | 0.452 + 0.270i |
| 5 | 0.517 + 1.207i | 0.269 + 0.451i | 1.207 + 0.516i | 0.451 + 0.269i |
| 5.1 | 0.516 + 1.208i | 0.269 + 0.451i | 1.208 + 0.515i | 0.451 + 0.269i |
| 5.2 | 0.514 + 1.208i | 0.268 + 0.451i | 1.208 + 0.514i | 0.452 + 0.268i |
| 5.3 | 0.513 + 1.209i | 0.267 + 0.452i | 1.209 + 0.513i | 0.452 + 0.267i |
| 5.4 | 0.512 + 1.209i | 0.267 + 0.452i | 1.209 + 0.512i | 0.452 + 0.267i |
| 5.5 | 0.511 + 1.210i | 0.266 + 0.452i | 1.210 + 0.511i | 0.452 + 0.266i |
| 5.6 | 0.510 + 1.210i | 0.266 + 0.453i | 1.210 + 0.510i | 0.453 + 0.266i |
| 5.7 | 0.509 + 1.210i | 0.265 + 0.454i | 1.210 + 0.509i | 0.454 + 0.265i |
| 5.8 | 0.509 + 1.210i | 0.265 + 0.455i | 1.210 + 0.508i | 0.455 + 0.265i |
| 5.9 | 0.508 + 1.210i | 0.265 + 0.456i | 1.210 + 0.507i | 0.455 + 0.265i |
| 6 | 0.507 + 1.211i | 0.264 + 0.457i | 1.211 + 0.506i | 0.457 + 0.264i |
| 6.1 | 0.506 + 1.211i | 0.264 + 0.458i | 1.211 + 0.505i | 0.458 + 0.264i |
| 6.2 | 0.505 + 1.211i | 0.263 + 0.459i | 1.211 + 0.505i | 0.459 + 0.263i |
| 6.3 | 0.504 + 1.210i | 0.263 + 0.460i | 1.210 + 0.504i | 0.460 + 0.264i |
| 6.4 | 0.503 + 1.210i | 0.263 + 0.461i | 1.211 + 0.502i | 0.461 + 0.263i |
| 6.5 | 0.503 + 1.210i | 0.262 + 0.463i | 1.210 + 0.501i | 0.463 + 0.262i |
| 6.6 | 0.502 + 1.210i | 0.263 + 0.465i | 1.210 + 0.501i | 0.464 + 0.263i |
| 6.7 | 0.501 + 1.210i | 0.262 + 0.466i | 1.210 + 0.500i | 0.466 + 0.262i |
| 6.8 | 0.500 + 1.210i | 0.262 + 0.468i | 1.210 + 0.499i | 0.467 + 0.262i |
| 6.9 | 0.499 + 1.209i | 0.261 + 0.469i | 1.209 + 0.498i | 0.469 + 0.261i |
| 7 | 0.498 + 1.209i | 0.261 + 0.472i | 1.209 + 0.498i | 0.471 + 0.261i |
| 7.1 | 0.498 + 1.209i | 0.261 + 0.474i | 1.209 + 0.497i | 0.473 + 0.261i |
| 7.2 | 0.497 + 1.208i | 0.259 + 0.475i | 1.208 + 0.497i | 0.475 + 0.259i |
| 7.3 | 0.496 + 1.208i | 0.259 + 0.478i | 1.208 + 0.496i | 0.477 + 0.259i |
| 7.4 | 0.496 + 1.207i | 0.259 + 0.480i | 1.207 + 0.495i | 0.479 + 0.259i |
| 7.5 | 0.495 + 1.207i | 0.258 + 0.481i | 1.207 + 0.495i | 0.482 + 0.258i |
| 7.6 | 0.495 + 1.206i | 0.257 + 0.484i | 1.206 + 0.494i | 0.483 + 0.257i |
| 7.7 | 0.494 + 1.206i | 0.256 + 0.486i | 1.206 + 0.494i | 0.486 + 0.256i |

-continued

| 16 NUC | | | | |
|---|---|---|---|---|
| | Normalized values | | | |
| SNR | a1 | a2 | a3 | a4 |
| 7.8 | 0.494 + 1.205i | 0.255 + 0.489i | 1.205 + 0.493i | 0.488 + 0.255i |
| 7.9 | 0.493 + 1.205i | 0.254 + 0.492i | 1.205 + 0.493i | 0.490 + 0.254i |
| 8 | 0.493 + 1.204i | 0.253 + 0.494i | 1.204 + 0.492i | 0.493 + 0.253i |
| 8.1 | 0.492 + 1.203i | 0.252 + 0.497i | 1.203 + 0.492i | 0.495 + 0.252i |
| 8.2 | 0.492 + 1.203i | 0.251 + 0.499i | 1.203 + 0.491i | 0.497 + 0.251i |
| 8.3 | 0.492 + 1.202i | 0.250 + 0.502i | 1.202 + 0.491i | 0.500 + 0.250i |
| 8.4 | 0.492 + 1.202i | 0.249 + 0.505i | 1.201 + 0.490i | 0.501 + 0.249i |
| 8.5 | 0.491 + 1.201i | 0.248 + 0.506i | 1.201 + 0.491i | 0.505 + 0.248i |
| 8.6 | 0.491 + 1.200i | 0.247 + 0.509i | 1.200 + 0.490i | 0.508 + 0.247i |
| 8.7 | 0.491 + 1.200i | 0.246 + 0.512i | 1.199 + 0.490i | 0.509 + 0.245i |
| 8.8 | 0.490 + 1.199i | 0.244 + 0.514i | 1.198 + 0.490i | 0.513 + 0.244i |
| 8.9 | 0.492 + 1.198i | 0.244 + 0.519i | 1.197 + 0.489i | 0.513 + 0.242i |
| 9 | 0.493 + 1.198i | 0.243 + 0.524i | 1.196 + 0.487i | 0.512 + 0.241i |
| 9.1 | 0.494 + 1.198i | 0.243 + 0.530i | 1.194 + 0.486i | 0.511 + 0.239i |
| 9.2 | 0.519 + 1.206i | 0.252 + 0.583i | 1.180 + 0.463i | 0.464 + 0.228i |
| 9.3 | 0.526 + 1.207i | 0.253 + 0.597i | 1.174 + 0.457i | 0.455 + 0.226i |
| 9.4 | 0.531 + 1.207i | 0.254 + 0.608i | 1.170 + 0.453i | 0.449 + 0.223i |
| 9.5 | 0.537 + 1.208i | 0.254 + 0.618i | 1.166 + 0.450i | 0.442 + 0.222i |
| 9.6 | 0.542 + 1.209i | 0.255 + 0.626i | 1.162 + 0.446i | 0.437 + 0.220i |
| 9.7 | 0.547 + 1.209i | 0.256 + 0.635i | 1.157 + 0.443i | 0.432 + 0.219i |
| 9.8 | 0.553 + 1.209i | 0.256 + 0.643i | 1.153 + 0.439i | 0.428 + 0.218i |
| 9.9 | 0.558 + 1.210i | 0.257 + 0.650i | 1.149 + 0.437i | 0.424 + 0.218i |
| 10 | 0.565 + 1.209i | 0.257 + 0.657i | 1.144 + 0.433i | 0.419 + 0.218i |
| 10.1 | 0.573 + 1.209i | 0.257 + 0.665i | 1.139 + 0.430i | 0.415 + 0.217i |
| 10.2 | 0.585 + 1.206i | 0.258 + 0.674i | 1.134 + 0.425i | 0.410 + 0.218i |
| 10.3 | 0.604 + 1.201i | 0.257 + 0.686i | 1.127 + 0.419i | 0.402 + 0.218i |
| 10.4 | 0.948 + 0.968i | 0.283 + 0.948i | 0.968 + 0.291i | 0.291 + 0.283i |
| 10.5 | 0.949 + 0.966i | 0.285 + 0.949i | 0.965 + 0.291i | 0.291 + 0.285i |
| 10.6 | 0.952 + 0.963i | 0.287 + 0.952i | 0.963 + 0.291i | 0.291 + 0.287i |
| 10.7 | 0.952 + 0.963i | 0.287 + 0.952i | 0.962 + 0.292i | 0.292 + 0.287i |
| 10.8 | 0.953 + 0.962i | 0.288 + 0.953i | 0.961 + 0.292i | 0.292 + 0.288i |
| 10.9 | 0.954 + 0.959i | 0.290 + 0.954i | 0.959 + 0.292i | 0.292 + 0.290i |
| 11 | 0.955 + 0.958i | 0.291 + 0.955i | 0.958 + 0.292i | 0.293 + 0.291i |
| 11.1 | 0.955 + 0.958i | 0.292 + 0.955i | 0.958 + 0.293i | 0.293 + 0.292i |
| 11.2 | 0.955 + 0.957i | 0.293 + 0.955i | 0.957 + 0.293i | 0.293 + 0.293i |
| 11.3 | 0.955 + 0.957i | 0.294 + 0.955i | 0.956 + 0.294i | 0.294 + 0.294i |
| 11.4 | 0.955 + 0.957i | 0.294 + 0.955i | 0.956 + 0.294i | 0.294 + 0.294i |

-continued

| 16 NUC | | | | |
|---|---|---|---|---|
| | Normalized values | | | |
| SNR | a1 | a2 | a3 | a4 |
| 11.5 | 0.955 + 0.957i | 0.295 + 0.955i | 0.956 + 0.295i | 0.295 + 0.295i |
| 11.6 | 0.955 + 0.956i | 0.296 + 0.955i | 0.955 + 0.296i | 0.296 + 0.296i |
| 11.7 | 0.954 + 0.956i | 0.296 + 0.954i | 0.956 + 0.296i | 0.296 + 0.296i |
| 11.8 | 0.955 + 0.955i | 0.297 + 0.955i | 0.955 + 0.297i | 0.297 + 0.297i |
| 11.9 | 0.955 + 0.956i | 0.297 + 0.955i | 0.955 + 0.297i | 0.297 + 0.297i |
| 12 | 0.954 + 0.955i | 0.297 + 0.955i | 0.955 + 0.298i | 0.298 + 0.298i |
| 12.1 | 0.954 + 0.955i | 0.298 + 0.954i | 0.954 + 0.299i | 0.298 + 0.298i |
| 12.2 | 0.954 + 0.955i | 0.298 + 0.954i | 0.955 + 0.299i | 0.299 + 0.298i |
| 12.3 | 0.954 + 0.955i | 0.299 + 0.954i | 0.954 + 0.299i | 0.299 + 0.299i |
| 12.4 | 0.954 + 0.955i | 0.299 + 0.954i | 0.954 + 0.300i | 0.299 + 0.299i |
| 12.5 | 0.954 + 0.954i | 0.300 + 0.954i | 0.954 + 0.300i | 0.300 + 0.300i |
| 12.6 | 0.954 + 0.955i | 0.300 + 0.954i | 0.954 + 0.301i | 0.300 + 0.300i |
| 12.7 | 0.954 + 0.954i | 0.301 + 0.954i | 0.954 + 0.301i | 0.301 + 0.301i |
| 12.8 | 0.953 + 0.954i | 0.301 + 0.954i | 0.954 + 0.302i | 0.301 + 0.301i |
| 12.9 | 0.953 + 0.954i | 0.301 + 0.953i | 0.953 + 0.302i | 0.301 + 0.301i |
| 13 | 0.953 + 0.954i | 0.302 + 0.953i | 0.953 + 0.302i | 0.302 + 0.302i |
| 13.1 | 0.953 + 0.954i | 0.302 + 0.953i | 0.953 + 0.303i | 0.302 + 0.302i |
| 13.2 | 0.953 + 0.954i | 0.303 + 0.953i | 0.953 + 0.303i | 0.303 + 0.303i |
| 13.3 | 0.953 + 0.953i | 0.303 + 0.953i | 0.953 + 0.304i | 0.303 + 0.303i |
| 13.4 | 0.953 + 0.953i | 0.303 + 0.953i | 0.953 + 0.304i | 0.303 + 0.303i |
| 13.5 | 0.952 + 0.953i | 0.304 + 0.953i | 0.953 + 0.304i | 0.304 + 0.304i |
| 13.6 | 0.952 + 0.953i | 0.304 + 0.953i | 0.953 + 0.304i | 0.304 + 0.304i |
| 13.7 | 0.952 + 0.953i | 0.304 + 0.953i | 0.952 + 0.305i | 0.304 + 0.304i |
| 13.8 | 0.952 + 0.953i | 0.304 + 0.953i | 0.953 + 0.305i | 0.304 + 0.304i |
| 13.9 | 0.952 + 0.953i | 0.305 + 0.953i | 0.953 + 0.305i | 0.305 + 0.305i |
| 14 | 0.952 + 0.952i | 0.305 + 0.952i | 0.953 + 0.305i | 0.305 + 0.305i |
| 14.1 | 0.952 + 0.952i | 0.305 + 0.952i | 0.953 + 0.306i | 0.306 + 0.305i |
| 14.2 | 0.952 + 0.952i | 0.305 + 0.952i | 0.953 + 0.306i | 0.306 + 0.305i |
| 14.3 | 0.951 + 0.952i | 0.306 + 0.952i | 0.953 + 0.306i | 0.306 + 0.306i |
| 14.4 | 0.951 + 0.952i | 0.306 + 0.952i | 0.953 + 0.306i | 0.306 + 0.306i |
| 14.5 | 0.951 + 0.952i | 0.306 + 0.952i | 0.952 + 0.307i | 0.307 + 0.306i |
| 14.6 | 0.951 + 0.952i | 0.306 + 0.952i | 0.952 + 0.307i | 0.307 + 0.306i |
| 14.7 | 0.951 + 0.952i | 0.307 + 0.952i | 0.953 + 0.307i | 0.307 + 0.307i |
| 14.8 | 0.951 + 0.952i | 0.307 + 0.952i | 0.952 + 0.307i | 0.307 + 0.307i |
| 14.9 | 0.951 + 0.951i | 0.307 + 0.952i | 0.952 + 0.307i | 0.307 + 0.307i |
| 15 | 0.951 + 0.951i | 0.308 + 0.952i | 0.952 + 0.308i | 0.308 + 0.307i |

| 64 NUC | | | | | | | | |
|---|---|---|---|---|---|---|---|---|
| | Normalized values | | | | | | | |
| SNR | a1 | a2 | a3 | a4 | a5 | a6 | a7 | a8 |
| 7 | 0.467 + 0.274i | 0.274 + 0.465i | 0.456 + 0.247i | 0.248 + 0.452i | 1.125 + 0.640i | 0.633 + 1.125i | 1.265 + 0.359i | 0.361 + 1.265i |
| 7.1 | 0.473 + 0.277i | 0.277 + 0.471i | 0.464 + 0.247i | 0.250 + 0.458i | 1.106 + 0.638i | 0.625 + 1.105i | 1.245 + 0.347i | 0.348 + 1.242i |
| 7.2 | 0.482 + 0.281i | 0.281 + 0.479i | 0.477 + 0.248i | 0.251 + 0.467i | 1.077 + 0.629i | 0.609 + 1.077i | 1.213 + 0.333i | 0.334 + 1.208i |
| 7.3 | 0.489 + 0.283i | 0.283 + 0.485i | 0.487 + 0.248i | 0.252 + 0.473i | 1.057 + 0.624i | 0.597 + 1.057i | 1.193 + 0.322i | 0.323 + 1.184i |
| 7.4 | 0.495 + 0.286i | 0.285 + 0.489i | 0.498 + 0.247i | 0.252 + 0.479i | 1.041 + 0.621i | 0.586 + 1.040i | 1.175 + 0.315i | 0.315 + 1.164i |
| 7.5 | 0.500 + 0.287i | 0.286 + 0.493i | 0.507 + 0.247i | 0.253 + 0.485i | 1.027 + 0.617i | 0.579 + 1.027i | 1.161 + 0.308i | 0.308 + 1.148i |
| 7.6 | 0.505 + 0.289i | 0.287 + 0.497i | 0.513 + 0.247i | 0.252 + 0.492i | 1.016 + 0.612i | 0.576 + 1.016i | 1.148 + 0.304i | 0.301 + 1.134i |
| 7.7 | 0.508 + 0.290i | 0.289 + 0.502i | 0.517 + 0.247i | 0.251 + 0.501i | 1.006 + 0.602i | 0.577 + 1.006i | 1.135 + 0.299i | 0.296 + 1.124i |
| 7.8 | 0.512 + 0.291i | 0.291 + 0.507i | 0.521 + 0.247i | 0.250 + 0.510i | 0.997 + 0.596i | 0.577 + 0.997i | 1.124 + 0.294i | 0.292 + 1.115i |
| 7.9 | 0.515 + 0.292i | 0.292 + 0.512i | 0.525 + 0.248i | 0.249 + 0.519i | 0.988 + 0.588i | 0.579 + 0.988i | 1.113 + 0.291i | 0.289 + 1.107i |
| 8 | 0.519 + 0.294i | 0.293 + 0.517i | 0.530 + 0.247i | 0.248 + 0.526i | 0.981 + 0.584i | 0.577 + 0.981i | 1.104 + 0.288i | 0.286 + 1.099i |
| 8.1 | 0.523 + 0.295i | 0.295 + 0.522i | 0.535 + 0.247i | 0.247 + 0.533i | 0.974 + 0.580i | 0.575 + 0.974i | 1.095 + 0.284i | 0.284 + 1.092i |
| 8.2 | 0.527 + 0.296i | 0.296 + 0.526i | 0.541 + 0.246i | 0.246 + 0.540i | 0.967 + 0.576i | 0.573 + 0.967i | 1.087 + 0.282i | 0.282 + 1.084i |
| 8.3 | 0.532 + 0.297i | 0.297 + 0.531i | 0.547 + 0.245i | 0.245 + 0.546i | 0.961 + 0.573i | 0.570 + 0.961i | 1.081 + 0.279i | 0.279 + 1.078i |
| 8.4 | 0.536 + 0.299i | 0.299 + 0.535i | 0.553 + 0.244i | 0.244 + 0.553i | 0.955 + 0.570i | 0.568 + 0.955i | 1.074 + 0.277i | 0.277 + 1.072i |
| 8.5 | 0.541 + 0.300i | 0.300 + 0.541i | 0.559 + 0.243i | 0.244 + 0.559i | 0.950 + 0.566i | 0.565 + 0.950i | 1.068 + 0.275i | 0.275 + 1.067i |
| 8.6 | 0.545 + 0.302i | 0.302 + 0.545i | 0.566 + 0.242i | 0.242 + 0.566i | 0.945 + 0.564i | 0.563 + 0.945i | 1.062 + 0.273i | 0.273 + 1.062i |
| 8.7 | 0.550 + 0.303i | 0.303 + 0.550i | 0.572 + 0.241i | 0.241 + 0.572i | 0.940 + 0.561i | 0.561 + 0.940i | 1.058 + 0.271i | 0.271 + 1.057i |
| 8.8 | 0.554 + 0.305i | 0.305 + 0.554i | 0.578 + 0.239i | 0.240 + 0.578i | 0.936 + 0.559i | 0.559 + 0.936i | 1.053 + 0.268i | 0.269 + 1.052i |
| 8.9 | 0.559 + 0.306i | 0.306 + 0.559i | 0.584 + 0.238i | 0.238 + 0.584i | 0.932 + 0.556i | 0.557 + 0.932i | 1.048 + 0.267i | 0.267 + 1.048i |
| 9 | 0.563 + 0.307i | 0.307 + 0.563i | 0.590 + 0.236i | 0.237 + 0.590i | 0.929 + 0.554i | 0.554 + 0.929i | 1.045 + 0.265i | 0.265 + 1.045i |
| 9.1 | 0.567 + 0.309i | 0.309 + 0.566i | 0.596 + 0.235i | 0.235 + 0.596i | 0.925 + 0.553i | 0.553 + 0.925i | 1.041 + 0.263i | 0.264 + 1.041i |
| 9.2 | 0.571 + 0.310i | 0.311 + 0.571i | 0.601 + 0.234i | 0.234 + 0.601i | 0.922 + 0.552i | 0.552 + 0.922i | 1.039 + 0.261i | 0.262 + 1.038i |
| 9.3 | 0.574 + 0.313i | 0.312 + 0.574i | 0.607 + 0.232i | 0.232 + 0.607i | 0.919 + 0.550i | 0.550 + 0.919i | 1.035 + 0.259i | 0.260 + 1.035i |
| 9.4 | 0.578 + 0.314i | 0.314 + 0.578i | 0.612 + 0.230i | 0.230 + 0.612i | 0.916 + 0.550i | 0.550 + 0.916i | 1.033 + 0.257i | 0.258 + 1.033i |
| 9.5 | 0.581 + 0.316i | 0.316 + 0.581i | 0.617 + 0.229i | 0.229 + 0.617i | 0.913 + 0.549i | 0.549 + 0.913i | 1.030 + 0.255i | 0.256 + 1.030i |
| 9.6 | 0.584 + 0.317i | 0.317 + 0.584i | 0.622 + 0.226i | 0.227 + 0.622i | 0.911 + 0.548i | 0.549 + 0.911i | 1.028 + 0.253i | 0.254 + 1.028i |

-continued

| 64 NUC | | | | | | | | |
|---|---|---|---|---|---|---|---|---|
| 9.7 | 0.587 + 0.319i | 0.319 + 0.587i | 0.627 + 0.225i | 0.225 + 0.627i | 0.908 + 0.549i | 0.549 + 0.908i | 1.026 + 0.251i | 0.252 + 1.026i |
| 9.8 | 0.589 + 0.321i | 0.321 + 0.589i | 0.631 + 0.222i | 0.223 + 0.631i | 0.906 + 0.549i | 0.549 + 0.906i | 1.025 + 0.249i | 0.251 + 1.025i |
| 9.9 | 0.592 + 0.323i | 0.322 + 0.592i | 0.636 + 0.221i | 0.221 + 0.635i | 0.904 + 0.550i | 0.549 + 0.904i | 1.024 + 0.247i | 0.248 + 1.024i |
| 10 | 0.594 + 0.325i | 0.324 + 0.594i | 0.640 + 0.219i | 0.219 + 0.639i | 0.902 + 0.550i | 0.549 + 0.902i | 1.023 + 0.245i | 0.246 + 1.023i |
| 10.1 | 0.596 + 0.327i | 0.326 + 0.596i | 0.644 + 0.216i | 0.217 + 0.643i | 0.900 + 0.551i | 0.551 + 0.900i | 1.022 + 0.243i | 0.245 + 1.022i |
| 10.2 | 0.598 + 0.329i | 0.328 + 0.598i | 0.647 + 0.215i | 0.215 + 0.647i | 0.898 + 0.552i | 0.552 + 0.898i | 1.021 + 0.241i | 0.242 + 1.021i |
| 10.3 | 0.600 + 0.331i | 0.330 + 0.600i | 0.651 + 0.213i | 0.213 + 0.651i | 0.896 + 0.553i | 0.552 + 0.896i | 1.020 + 0.240i | 0.240 + 1.020i |
| 10.4 | 0.601 + 0.333i | 0.332 + 0.601i | 0.655 + 0.211i | 0.211 + 0.654i | 0.894 + 0.554i | 0.554 + 0.894i | 1.019 + 0.237i | 0.238 + 1.020i |
| 10.5 | 0.603 + 0.335i | 0.334 + 0.603i | 0.658 + 0.208i | 0.208 + 0.658i | 0.892 + 0.556i | 0.555 + 0.893i | 1.019 + 0.235i | 0.236 + 1.020i |
| 10.6 | 0.604 + 0.337i | 0.337 + 0.604i | 0.661 + 0.206i | 0.206 + 0.661i | 0.891 + 0.557i | 0.556 + 0.891i | 1.019 + 0.233i | 0.234 + 1.019i |
| 10.7 | 0.605 + 0.339i | 0.339 + 0.605i | 0.664 + 0.204i | 0.204 + 0.664i | 0.890 + 0.558i | 0.558 + 0.890i | 1.018 + 0.232i | 0.232 + 1.019i |
| 10.8 | 0.606 + 0.341i | 0.341 + 0.606i | 0.667 + 0.202i | 0.202 + 0.668i | 0.888 + 0.559i | 0.560 + 0.888i | 1.018 + 0.229i | 0.231 + 1.019i |
| 10.9 | 0.608 + 0.344i | 0.343 + 0.608i | 0.670 + 0.200i | 0.200 + 0.670i | 0.886 + 0.561i | 0.561 + 0.887i | 1.018 + 0.227i | 0.229 + 1.019i |
| 11 | 0.608 + 0.346i | 0.345 + 0.608i | 0.673 + 0.198i | 0.198 + 0.673i | 0.885 + 0.563i | 0.563 + 0.886i | 1.019 + 0.226i | 0.226 + 1.019i |
| 11.1 | 0.610 + 0.348i | 0.347 + 0.610i | 0.676 + 0.196i | 0.196 + 0.676i | 0.884 + 0.564i | 0.564 + 0.884i | 1.018 + 0.224i | 0.224 + 1.020i |
| 11.2 | 0.610 + 0.350i | 0.349 + 0.610i | 0.678 + 0.193i | 0.193 + 0.678i | 0.882 + 0.566i | 0.566 + 0.883i | 1.019 + 0.222i | 0.223 + 1.020i |
| 11.3 | 0.611 + 0.352i | 0.352 + 0.611i | 0.681 + 0.191i | 0.191 + 0.681i | 0.882 + 0.567i | 0.567 + 0.882i | 1.020 + 0.220i | 0.221 + 1.020i |
| 11.4 | 0.612 + 0.354i | 0.354 + 0.612i | 0.683 + 0.190i | 0.190 + 0.683i | 0.881 + 0.569i | 0.569 + 0.881i | 1.020 + 0.219i | 0.220 + 1.021i |
| 11.5 | 0.613 + 0.356i | 0.356 + 0.613i | 0.685 + 0.188i | 0.188 + 0.685i | 0.880 + 0.570i | 0.570 + 0.880i | 1.020 + 0.217i | 0.219 + 1.021i |
| 11.6 | 0.613 + 0.358i | 0.358 + 0.613i | 0.687 + 0.186i | 0.186 + 0.687i | 0.879 + 0.571i | 0.571 + 0.879i | 1.021 + 0.216i | 0.216 + 1.022i |
| 11.7 | 0.614 + 0.360i | 0.360 + 0.614i | 0.689 + 0.184i | 0.184 + 0.689i | 0.878 + 0.573i | 0.573 + 0.879i | 1.021 + 0.214i | 0.215 + 1.022i |
| 11.8 | 0.614 + 0.362i | 0.362 + 0.614i | 0.691 + 0.183i | 0.183 + 0.690i | 0.878 + 0.574i | 0.574 + 0.878i | 1.022 + 0.213i | 0.214 + 1.022i |
| 11.9 | 0.615 + 0.364i | 0.364 + 0.615i | 0.693 + 0.181i | 0.181 + 0.692i | 0.878 + 0.576i | 0.575 + 0.878i | 1.023 + 0.212i | 0.213 + 1.023i |
| 12 | 0.616 + 0.366i | 0.365 + 0.616i | 0.694 + 0.180i | 0.179 + 0.694i | 0.877 + 0.577i | 0.576 + 0.877i | 1.023 + 0.211i | 0.212 + 1.024i |
| 12.1 | 0.616 + 0.368i | 0.367 + 0.616i | 0.695 + 0.178i | 0.178 + 0.695i | 0.876 + 0.577i | 0.577 + 0.877i | 1.024 + 0.210i | 0.211 + 1.025i |
| 12.2 | 0.617 + 0.370i | 0.369 + 0.617i | 0.697 + 0.177i | 0.176 + 0.697i | 0.876 + 0.579i | 0.578 + 0.877i | 1.025 + 0.209i | 0.210 + 1.026i |
| 12.3 | 0.617 + 0.371i | 0.371 + 0.617i | 0.698 + 0.175i | 0.175 + 0.698i | 0.876 + 0.580i | 0.579 + 0.876i | 1.026 + 0.208i | 0.209 + 1.026i |
| 13.8 | 0.609 + 0.348i | 0.423 + 0.614i | 0.674 + 0.145i | 0.173 + 0.753i | 0.894 + 0.556i | 0.623 + 0.860i | 1.031 + 0.192i | 0.222 + 1.050i |
| 13.9 | 0.609 + 0.347i | 0.426 + 0.613i | 0.674 + 0.143i | 0.173 + 0.755i | 0.894 + 0.555i | 0.624 + 0.859i | 1.031 + 0.191i | 0.222 + 1.051i |
| 14 | 0.609 + 0.347i | 0.427 + 0.613i | 0.674 + 0.142i | 0.172 + 0.757i | 0.895 + 0.555i | 0.625 + 0.859i | 1.032 + 0.191i | 0.224 + 1.052i |
| 14.1 | 0.608 + 0.347i | 0.428 + 0.613i | 0.674 + 0.140i | 0.171 + 0.760i | 0.896 + 0.555i | 0.626 + 0.859i | 1.033 + 0.191i | 0.224 + 1.054i |
| 14.2 | 0.608 + 0.347i | 0.430 + 0.612i | 0.675 + 0.139i | 0.170 + 0.762i | 0.896 + 0.554i | 0.627 + 0.859i | 1.033 + 0.191i | 0.225 + 1.055i |
| 14.3 | 0.607 + 0.344i | 0.431 + 0.611i | 0.678 + 0.138i | 0.168 + 0.764i | 0.896 + 0.555i | 0.627 + 0.858i | 1.035 + 0.191i | 0.226 + 1.056i |
| 14.4 | 0.607 + 0.340i | 0.432 + 0.609i | 0.686 + 0.136i | 0.166 + 0.765i | 0.896 + 0.555i | 0.627 + 0.857i | 1.038 + 0.193i | 0.227 + 1.056i |
| 14.5 | 0.615 + 0.327i | 0.433 + 0.599i | 0.727 + 0.135i | 0.158 + 0.752i | 0.897 + 0.564i | 0.618 + 0.851i | 1.058 + 0.203i | 0.223 + 1.044i |
| 14.6 | 0.622 + 0.322i | 0.434 + 0.594i | 0.748 + 0.135i | 0.154 + 0.743i | 0.897 + 0.569i | 0.614 + 0.850i | 1.068 + 0.208i | 0.221 + 1.037i |
| 14.7 | 0.628 + 0.321i | 0.436 + 0.590i | 0.763 + 0.135i | 0.152 + 0.737i | 0.898 + 0.572i | 0.611 + 0.848i | 1.076 + 0.212i | 0.220 + 1.031i |
| 14.8 | 0.630 + 0.320i | 0.437 + 0.589i | 0.770 + 0.134i | 0.151 + 0.735i | 0.898 + 0.573i | 0.610 + 0.848i | 1.079 + 0.213i | 0.220 + 1.030i |
| 14.9 | 0.634 + 0.320i | 0.439 + 0.587i | 0.778 + 0.134i | 0.150 + 0.731i | 0.898 + 0.574i | 0.609 + 0.848i | 1.084 + 0.214i | 0.219 + 1.027i |
| 15 | 0.637 + 0.322i | 0.440 + 0.586i | 0.783 + 0.133i | 0.149 + 0.729i | 0.899 + 0.576i | 0.607 + 0.849i | 1.087 + 0.216i | 0.218 + 1.026i |
| 15.1 | 0.640 + 0.323i | 0.441 + 0.586i | 0.787 + 0.133i | 0.149 + 0.727i | 0.899 + 0.576i | 0.607 + 0.849i | 1.090 + 0.216i | 0.218 + 1.025i |
| 15.2 | 0.643 + 0.324i | 0.442 + 0.585i | 0.791 + 0.133i | 0.149 + 0.725i | 0.899 + 0.576i | 0.606 + 0.849i | 1.093 + 0.217i | 0.218 + 1.023i |
| 15.3 | 0.645 + 0.326i | 0.443 + 0.586i | 0.794 + 0.133i | 0.148 + 0.725i | 0.900 + 0.577i | 0.605 + 0.850i | 1.095 + 0.218i | 0.217 + 1.023 |
| 15.4 | 0.648 + 0.328i | 0.444 + 0.586i | 0.797 + 0.132i | 0.148 + 0.724i | 0.900 + 0.577i | 0.605 + 0.851i | 1.098 + 0.218i | 0.717 + 1.022 |
| 15.5 | 0.650 + 0.330i | 0.445 + 0.586i | 0.799 + 0.132i | 0.148 + 0.723i | 0.901 + 0.578i | 0.605 + 0.851i | 1.100 + 0.218i | 0.217 + 1.021i |
| 15.6 | 0.652 + 0.333i | 0.446 + 0.587i | 0.801 + 0.132i | 0.148 + 0.722i | 0.902 + 0.578i | 0.605 + 0.852i | 1.101 + 0.218i | 0.217 + 1.021i |
| 15.7 | 0.654 + 0.334i | 0.447 + 0.588i | 0.802 + 0.131i | 0.148 + 0.722i | 0.902 + 0.577i | 0.605 + 0.853 | 1.103 + 0.217i | 0.216 + 1.021i |
| 15.8 | 0.656 + 0.337i | 0.448 + 0.588i | 0.804 + 0.131i | 0.148 + 0.721i | 0.904 + 0.577i | 0.605 + 0.854i | 1.105 + 0.215i | 0.216 + 1.020 |
| 15.9 | 0.659 + 0.339i | 0.449 + 0.589i | 0.806 + 0.131i | 0.148 + 0.720i | 0.906 + 0.577i | 0.605 + 0.854i | 1.108 + 0.213i | 0.216 + 1.019 |
| 16 | 0.697 + 0.332i | 0.450 + 0.568i | 0.882 + 0.139i | 0.143 + 0.674i | 0.892 + 0.600i | 0.568 + 0.844i | 1.225 + 0.212i | 0.196 + 0.977i |
| 16.1 | 0.700 + 0.333i | 0.450 + 0.569i | 0.887 + 0.139i | 0.144 + 0.673i | 0.891 + 0.602i | 0.566 + 0.846 | 1.231 + 0.212i | 0.195 + 0.976i |
| 16.2 | 0.702 + 0.334i | 0.451 + 0.569i | 0.892 + 0.141i | 0.144 + 0.671i | 0.889 + 0.605i | 0.564 + 0.847i | 1.238 + 0.212i | 0.194 + 0.975i |
| 16.3 | 0.705 + 0.335i | 0.451 + 0.570i | 0.898 + 0.142i | 0.144 + 0.670i | 0.887 + 0.607i | 0.562 + 0.848 | 1.245 + 0.212i | 0.194 + 0.974i |
| 16.4 | 0.706 + 0.336i | 0.451 + 0.571i | 0.903 + 0.144i | 0.144 + 0.669i | 0.884 + 0.609i | 0.561 + 0.849i | 1.251 + 0.212i | 0.193 + 0.974i |
| 16.5 | 0.708 + 0.338i | 0.452 + 0.572i | 0.906 + 0.145i | 0.145 + 0.669i | 0.883 + 0.612i | 0.560 + 0.851i | 1.255 + 0.211i | 0.192 + 0.973i |
| 16.6 | 0.711 + 0.340i | 0.452 + 0.572i | 0.911 + 0.147i | 0.145 + 0.667i | 0.880 + 0.615i | 0.557 + 0.853i | 1.262 + 0.211i | 0.191 + 0.973i |
| 16.7 | 0.712 + 0.341i | 0.452 + 0.573i | 0.915 + 0.149i | 0.145 + 0.667i | 0.877 + 0.618i | 0.555 + 0.855i | 1.267 + 0.210i | 0.190 + 0.974i |
| 16.8 | 0.715 + 0.343i | 0.452 + 0.575i | 0.920 + 0.151i | 0.145 + 0.666i | 0.873 + 0.622i | 0.554 + 0.857i | 1.274 + 0.209i | 0.190 + 0.973i |
| 16.9 | 0.716 + 0.344i | 0.451 + 0.576i | 0.925 + 0.153i | 0.145 + 0.666i | 0.868 + 0.626i | 0.552 + 0.860i | 1.280 + 0.207i | 0.189 + 0.974i |
| 17 | 0.720 + 0.347i | 0.450 + 0.577i | 0.932 + 0.156i | 0.145 + 0.664i | 0.862 + 0.633i | 0.548 + 0.863i | 1.290 + 0.205i | 0.187 + 0.973i |
| 17.1 | 0.724 + 0.350i | 0.449 + 0.579i | 0.939 + 0.158i | 0.145 + 0.662i | 0.855 + 0.641i | 0.544 + 0.866i | 1.299 + 0.203i | 0.185 + 0.972i |
| 17.2 | 0.726 + 0.353i | 0.449 + 0.581i | 0.941 + 0.159i | 0.145 + 0.662i | 0.850 + 0.646i | 0.541 + 0.870i | 1.303 + 0.201i | 0.184 + 0.972i |
| 17.3 | 0.728 + 0.357i | 0.449 + 0.583i | 0.943 + 0.160i | 0.146 + 0.663i | 0.847 + 0.651i | 0.539 + 0.873i | 1.305 + 0.201i | 0.183 + 0.973i |
| 17.4 | 0.732 + 0.362i | 0.448 + 0.585i | 0.945 + 0.161i | 0.145 + 0.661i | 0.841 + 0.661i | 0.535 + 0.877i | 1.309 + 0.199i | 0.182 + 0.972i |
| 17.5 | 0.734 + 0.366i | 0.448 + 0.587i | 0.945 + 0.161i | 0.146 + 0.662i | 0.838 + 0.666i | 0.534 + 0.880i | 1.309 + 0.199i | 0.181 + 0.973i |
| 17.6 | 0.738 + 0.372i | 0.448 + 0.589i | 0.945 + 0.161i | 0.146 + 0.661i | 0.833 + 0.675i | 0.529 + 0.884i | 1.310 + 0.198i | 0.179 + 0.973i |
| 17.7 | 0.740 + 0.376i | 0.448 + 0.592i | 0.945 + 0.160i | 0.147 + 0.662i | 0.831 + 0.681i | 0.527 + 0.888i | 1.308 + 0.197i | 0.178 + 0.973i |
| 17.8 | 0.743 + 0.381i | 0.448 + 0.594i | 0.944 + 0.160i | 0.147 + 0.663i | 0.827 + 0.688i | 0.524 + 0.891i | 1.308 + 0.197i | 0.177 + 0.974i |
| 17.9 | 0.743 + 0.383i | 0.449 + 0.596i | 0.944 + 0.160i | 0.148 + 0.663i | 0.826 + 0.691i | 0.523 + 0.894i | 1.307 + 0.196i | 0.176 + 0.975i |
| 18 | 0.744 + 0.386i | 0.449 + 0.598i | 0.943 + 0.160i | 0.148 + 0.664i | 0.824 + 0.695i | 0.522 + 0.897i | 1.305 + 0.196i | 0.176 + 0.976i |
| 18.1 | 0.745 + 0.389i | 0.450 + 0.601i | 0.941 + 0.160i | 0.148 + 0.666i | 0.823 + 0.699i | 0.521 + 0.900i | 1.303 + 0.195i | 0.175 + 0.976i |
| 18.2 | 0.746 + 0.391i | 0.450 + 0.603i | 0.940 + 0.159i | 0.148 + 0.667i | 0.821 + 0.703i | 0.520 + 0.903i | 1.300 + 0.195i | 0.174 + 0.978i |
| 18.3 | 0.747 + 0.393i | 0.451 + 0.605i | 0.939 + 0.159i | 0.149 + 0.669i | 0.820 + 0.706i | 0.518 + 0.905i | 1.299 + 0.194i | 0.174 + 0.979i |
| 18.4 | 0.747 + 0.396i | 0.452 + 0.608i | 0.937 + 0.158i | 0.149 + 0.671i | 0.819 + 0.709i | 0.517 + 0.908i | 1.296 + 0.194i | 0.173 + 0.981i |
| 18.5 | 0.747 + 0.397i | 0.452 + 0.610i | 0.936 + 0.158i | 0.150 + 0.673i | 0.817 + 0.710i | 0.517 + 0.910i | 1.294 + 0.193i | 0.173 + 0.983i |
| 18.6 | 0.747 + 0.399i | 0.453 + 0.612i | 0.934 + 0.158i | 0.150 + 0.675i | 0.818 + 0.712i | 0.517 + 0.912i | 1.291 + 0.193i | 0.173 + 0.984i |
| 18.7 | 0.748 + 0.400i | 0.454 + 0.614i | 0.933 + 0.158i | 0.151 + 0.676i | 0.817 + 0.714i | 0.516 + 0.915i | 1.289 + 0.192i | 0.173 + 0.985i |

-continued

| 64 NUC | | | | | | | | |
|---|---|---|---|---|---|---|---|---|
| 18.8 | 0.748 + 0.402i | 0.454 + 0.617i | 0.931 + 0.158i | 0.151 + 0.679i | 0.816 + 0.717i | 0.515 + 0.917i | 1.287 + 0.192i | 0.173 + 0.987i |
| 18.9 | 0.747 + 0.403i | 0.455 + 0.618i | 0.931 + 0.158i | 0.152 + 0.680i | 0.816 + 0.718i | 0.515 + 0.919i | 1.286 + 0.191i | 0.172 + 0.988i |
| 19 | 0.747 + 0.404i | 0.456 + 0.621i | 0.929 + 0.157i | 0.152 + 0.682i | 0.817 + 0.719i | 0.515 + 0.921i | 1.282 + 0.191i | 0.172 + 0.990i |
| 19.1 | 0.748 + 0.406i | 0.457 + 0.623i | 0.928 + 0.157i | 0.152 + 0.684i | 0.817 + 0.721i | 0.515 + 0.923i | 1.281 + 0.190i | 0.172 + 0.991i |
| 19.2 | 0.747 + 0.408i | 0.458 + 0.624i | 0.927 + 0.157i | 0.153 + 0.686i | 0.818 + 0.723i | 0.515 + 0.924i | 1.278 + 0.189i | 0.172 + 0.993i |
| 19.3 | 0.748 + 0.408i | 0.459 + 0.626i | 0.926 + 0.157i | 0.153 + 0.687i | 0.819 + 0.723i | 0.515 + 0.926i | 1.277 + 0.188i | 0.172 + 0.994i |
| 19.4 | 0.748 + 0.410i | 0.461 + 0.627i | 0.924 + 0.157i | 0.154 + 0.689i | 0.820 + 0.726i | 0.514 + 0.927i | 1.275 + 0.187i | 0.172 + 0.996i |
| 19.5 | 0.747 + 0.411i | 0.462 + 0.629i | 0.924 + 0.157i | 0.154 + 0.691i | 0.821 + 0.727i | 0.514 + 0.928i | 1.273 + 0.187i | 0.172 + 0.998i |
| 19.6 | 0.747 + 0.413i | 0.463 + 0.630i | 0.922 + 0.157i | 0.155 + 0.693i | 0.822 + 0.729i | 0.514 + 0.930i | 1.271 + 0.185i | 0.172 + 0.999i |
| 19.7 | 0.748 + 0.414i | 0.465 + 0.631i | 0.922 + 0.157i | 0.156 + 0.694i | 0.823 + 0.731i | 0.513 + 0.930i | 1.270 + 0.185i | 0.171 + 1.000i |
| 19.8 | 0.747 + 0.415i | 0.467 + 0.633i | 0.920 + 0.157i | 0.157 + 0.696i | 0.824 + 0.732i | 0.512 + 0.932i | 1.268 + 0.183i | 0.171 + 1.002i |
| 19.9 | 0.747 + 0.417i | 0.468 + 0.634i | 0.918 + 0.157i | 0.157 + 0.699i | 0.826 + 0.734i | 0.511 + 0.933i | 1.265 + 0.182i | 0.171 + 1.005i |
| 20 | 0.747 + 0.418i | 0.469 + 0.635i | 0.917 + 0.157i | 0.157 + 0.701i | 0.826 + 0.736i | 0.511 + 0.934i | 1.263 + 0.182i | 0.171 + 1.007i |

| | Normalized values | | | | | | | |
|---|---|---|---|---|---|---|---|---|
| SNR | a9 | a10 | a11 | a12 | a13 | a14 | a15 | a16 |
| 7 | 0.461 + 0.272i | 0.272 + 0.460i | 0.449 + 0.245i | 0.247 + 0.446i | 1.140 + 0.647i | 0.638 + 1.137i | 1.287 + 0.360i | 0.361 + 1.285i |
| 7.1 | 0.455 + 0.269i | 0.269 + 0.453i | 0.445 + 0.241i | 0.244 + 0.438i | 1.153 + 0.672i | 0.655 + 1.150i | 1.311 + 0.354i | 0.354 + 1.308i |
| 7.2 | 0.445 + 0.264i | 0.264 + 0.441i | 0.435 + 0.236i | 0.240 + 0.425i | 1.175 + 0.703i | 0.678 + 1.171i | 1.343 + 0.349i | 0.351 + 1.342i |
| 7.3 | 0.436 + 0.259i | 0.259 + 0.432i | 0.429 + 0.232i | 0.236 + 0.416i | 1.192 + 0.732i | 0.691 + 1.184i | 1.363 + 0.343i | 0.346 + 1.362i |
| 7.4 | 0.428 + 0.254i | 0.254 + 0.422i | 0.424 + 0.228i | 0.233 + 0.406i | 1.208 + 0.758i | 0.701 + 1.195i | 1.379 + 0.338i | 0.341 + 1.377i |
| 7.5 | 0.422 + 0.249i | 0.249 + 0.415i | 0.419 + 0.224i | 0.230 + 0.400i | 1.220 + 0.778i | 0.711 + 1.205i | 1.391 + 0.332i | 0.335 + 1.387i |
| 7.6 | 0.416 + 0.245i | 0.245 + 0.407i | 0.414 + 0.221i | 0.226 + 0.394i | 1.229 + 0.790i | 0.724 + 1.216i | 1.400 + 0.326i | 0.329 + 1.396i |
| 7.7 | 0.408 + 0.240i | 0.241 + 0.401i | 0.406 + 0.218i | 0.222 + 0.391i | 1.235 + 0.792i | 0.745 + 1.227i | 1.407 + 0.322i | 0.324 + 1.404i |
| 7.8 | 0.401 + 0.236i | 0.237 + 0.395i | 0.398 + 0.215i | 0.218 + 0.388i | 1.242 + 0.796i | 0.761 + 1.237i | 1.413 + 0.318i | 0.318 + 1.410i |
| 7.9 | 0.394 + 0.232i | 0.233 + 0.389i | 0.391 + 0.213i | 0.215 + 0.385i | 1.247 + 0.795i | 0.779 + 1.247i | 1.418 + 0.314i | 0.313 + 1.417i |
| 8 | 0.388 + 0.228i | 0.229 + 0.384i | 0.386 + 0.210i | 0.211 + 0.380i | 1.252 + 0.800i | 0.788 + 1.252i | 1.423 + 0.310i | 0.310 + 1.423i |
| 8.1 | 0.382 + 0.224i | 0.225 + 0.379i | 0.379 + 0.207i | 0.208 + 0.376i | 1.256 + 0.805i | 0.796 + 1.256i | 1.430 + 0.307i | 0.307 + 1.430i |
| 8.2 | 0.375 + 0.220i | 0.220 + 0.373i | 0.374 + 0.204i | 0.205 + 0.371i | 1.260 + 0.809i | 0.803 + 1.260i | 1.435 + 0.304i | 0.304 + 1.435i |
| 8.3 | 0.370 + 0.217i | 0.217 + 0.368i | 0.368 + 0.201i | 0.201 + 0.366i | 1.263 + 0.813i | 0.809 + 1.263i | 1.440 + 0.302i | 0.302 + 1.441i |
| 8.4 | 0.364 + 0.213i | 0.213 + 0.363i | 0.362 + 0.198i | 0.199 + 0.362i | 1.265 + 0.817i | 0.815 + 1.265i | 1.445 + 0.300i | 0.301 + 1.446i |
| 8.5 | 0.359 + 0.209i | 0.210 + 0.358i | 0.357 + 0.194i | 0.195 + 0.356i | 1.267 + 0.820i | 0.819 + 1.266i | 1.450 + 0.299i | 0.300 + 1.451i |
| 8.6 | 0.353 + 0.206i | 0.206 + 0.353i | 0.352 + 0.192i | 0.192 + 0.352i | 1.268 + 0.824i | 0.823 + 1.268i | 1.455 + 0.298i | 0.299 + 1.456i |
| 8.7 | 0.348 + 0.202i | 0.203 + 0.348i | 0.347 + 0.189i | 0.189 + 0.347i | 1.269 + 0.827i | 0.826 + 1.269i | 1.459 + 0.297i | 0.297 + 1.460i |
| 8.8 | 0.343 + 0.199i | 0.200 + 0.343i | 0.342 + 0.186i | 0.186 + 0.342i | 1.269 + 0.829i | 0.829 + 1.269i | 1.463 + 0.297i | 0.297 + 1.465i |
| 8.9 | 0.339 + 0.196i | 0.196 + 0.339i | 0.338 + 0.183i | 0.183 + 0.339i | 1.270 + 0.831i | 0.832 + 1.269i | 1.467 + 0.296i | 0.296 + 1.469i |
| 9 | 0.334 + 0.194i | 0.194 + 0.334i | 0.334 + 0.181i | 0.181 + 0.334i | 1.270 + 0.833i | 0.834 + 1.270i | 1.471 + 0.295i | 0.296 + 1.472i |
| 9.1 | 0.331 + 0.191i | 0.191 + 0.330i | 0.330 + 0.178i | 0.178 + 0.330i | 1.270 + 0.836i | 0.836 + 1.269i | 1.474 + 0.295i | 0.296 + 1.475i |
| 9.2 | 0.327 + 0.188i | 0.189 + 0.327i | 0.327 + 0.176i | 0.176 + 0.327i | 1.269 + 0.837i | 0.838 + 1.269i | 1.477 + 0.295i | 0.295 + 1.477i |
| 9.3 | 0.323 + 0.186i | 0.186 + 0.323i | 0.323 + 0.174i | 0.174 + 0.323i | 1.269 + 0.839i | 0.840 + 1.268i | 1.479 + 0.294i | 0.295 + 1.480i |
| 9.4 | 0.320 + 0.184i | 0.184 + 0.321i | 0.320 + 0.171i | 0.171 + 0.321i | 1.269 + 0.840i | 0.841 + 1.269i | 1.481 + 0.294i | 0.295 + 1.482i |
| 9.5 | 0.318 + 0.182i | 0.182 + 0.318i | 0.318 + 0.169i | 0.170 + 0.318i | 1.269 + 0.841i | 0.842 + 1.269i | 1.483 + 0.294i | 0.294 + 1.484i |
| 9.6 | 0.315 + 0.180i | 0.180 + 0.315i | 0.315 + 0.168i | 0.168 + 0.316i | 1.268 + 0.842i | 0.843 + 1.267i | 1.485 + 0.293i | 0.294 + 1.485i |
| 9.7 | 0.313 + 0.179i | 0.179 + 0.313i | 0.313 + 0.166i | 0.166 + 0.313i | 1.267 + 0.843i | 0.843 + 1.267i | 1.486 + 0.293i | 0.293 + 1.486i |
| 9.8 | 0.311 + 0.177i | 0.177 + 0.311i | 0.311 + 0.164i | 0.164 + 0.311i | 1.266 + 0.844i | 0.844 + 1.267i | 1.487 + 0.293i | 0.293 + 1.487i |
| 9.9 | 0.309 + 0.176i | 0.176 + 0.308i | 0.310 + 0.163i | 0.163 + 0.309i | 1.266 + 0.844i | 0.845 + 1.266i | 1.488 + 0.293i | 0.293 + 1.488i |
| 10 | 0.307 + 0.175i | 0.175 + 0.307i | 0.308 + 0.162i | 0.162 + 0.307i | 1.265 + 0.845i | 0.845 + 1.266i | 1.489 + 0.293i | 0.293 + 1.489i |
| 10.1 | 0.306 + 0.173i | 0.174 + 0.306i | 0.307 + 0.160i | 0.161 + 0.307i | 1.265 + 0.845i | 0.845 + 1.265i | 1.489 + 0.293i | 0.293 + 1.489i |
| 10.2 | 0.304 + 0.173i | 0.173 + 0.304i | 0.305 + 0.159i | 0.159 + 0.305i | 1.264 + 0.845i | 0.846 + 1.264i | 1.489 + 0.292i | 0.292 + 1.489i |
| 10.3 | 0.304 + 0.172i | 0.172 + 0.304i | 0.304 + 0.158i | 0.158 + 0.304i | 1.263 + 0.845i | 0.846 + 1.264i | 1.489 + 0.292i | 0.292 + 1.490i |
| 10.4 | 0.303 + 0.172i | 0.172 + 0.303i | 0.304 + 0.157i | 0.157 + 0.304i | 1.263 + 0.845i | 0.846 + 1.263i | 1.490 + 0.292i | 0.292 + 1.490i |
| 10.5 | 0.303 + 0.171i | 0.171 + 0.302i | 0.304 + 0.156i | 0.156 + 0.303i | 1.262 + 0.845i | 0.846 + 1.263i | 1.489 + 0.292i | 0.292 + 1.489i |
| 10.6 | 0.302 + 0.170i | 0.170 + 0.302i | 0.303 + 0.155i | 0.155 + 0.303i | 1.262 + 0.845i | 0.846 + 1.262i | 1.489 + 0.292i | 0.292 + 1.489i |
| 10.7 | 0.301 + 0.170i | 0.170 + 0.302i | 0.302 + 0.154i | 0.154 + 0.303i | 1.261 + 0.845i | 0.845 + 1.261i | 1.489 + 0.291i | 0.292 + 1.489i |
| 10.8 | 0.301 + 0.170i | 0.170 + 0.302i | 0.302 + 0.153i | 0.153 + 0.303i | 1.261 + 0.844i | 0.846 + 1.261i | 1.488 + 0.291i | 0.292 + 1.488i |
| 10.9 | 0.302 + 0.169i | 0.169 + 0.301i | 0.302 + 0.152i | 0.152 + 0.302i | 1.260 + 0.843i | 0.845 + 1.260i | 1.488 + 0.291i | 0.292 + 1.488i |
| 11 | 0.302 + 0.170i | 0.170 + 0.301i | 0.302 + 0.151i | 0.151 + 0.302i | 1.260 + 0.843i | 0.845 + 1.260i | 1.486 + 0.291i | 0.292 + 1.487i |
| 11.1 | 0.302 + 0.169i | 0.169 + 0.302i | 0.302 + 0.151i | 0.151 + 0.302i | 1.259 + 0.843i | 0.844 + 1.259i | 1.486 + 0.291i | 0.292 + 1.487i |
| 11.2 | 0.302 + 0.169i | 0.169 + 0.302i | 0.303 + 0.150i | 0.150 + 0.302i | 1.258 + 0.842i | 0.844 + 1.258i | 1.485 + 0.291i | 0.292 + 1.486i |
| 11.3 | 0.302 + 0.169i | 0.169 + 0.302i | 0.303 + 0.149i | 0.149 + 0.302i | 1.257 + 0.842i | 0.843 + 1.258i | 1.485 + 0.292i | 0.292 + 1.485i |
| 11.4 | 0.302 + 0.169i | 0.169 + 0.302i | 0.304 + 0.148i | 0.148 + 0.304i | 1.257 + 0.841i | 0.843 + 1.257i | 1.484 + 0.292i | 0.292 + 1.484i |
| 11.5 | 0.303 + 0.169i | 0.169 + 0.303i | 0.304 + 0.148i | 0.148 + 0.304i | 1.256 + 0.841i | 0.842 + 1.257i | 1.483 + 0.292i | 0.292 + 1.483i |
| 11.6 | 0.304 + 0.169i | 0.169 + 0.304i | 0.305 + 0.146i | 0.147 + 0.304i | 1.256 + 0.840i | 0.841 + 1.256i | 1.482 + 0.292i | 0.292 + 1.482i |
| 11.7 | 0.304 + 0.169i | 0.169 + 0.303i | 0.306 + 0.146i | 0.146 + 0.305i | 1.255 + 0.839i | 0.840 + 1.255i | 1.481 + 0.292i | 0.292 + 1.482i |
| 11.8 | 0.305 + 0.169i | 0.169 + 0.304i | 0.307 + 0.145i | 0.145 + 0.305i | 1.254 + 0.839i | 0.840 + 1.255i | 1.480 + 0.291i | 0.291 + 1.480i |
| 11.9 | 0.306 + 0.168i | 0.168 + 0.305i | 0.308 + 0.144i | 0.145 + 0.306i | 1.254 + 0.838i | 0.839 + 1.254i | 1.479 + 0.291i | 0.291 + 1.479i |
| 12 | 0.307 + 0.168i | 0.168 + 0.305i | 0.309 + 0.143i | 0.143 + 0.307i | 1.253 + 0.837i | 0.839 + 1.254i | 1.478 + 0.291i | 0.291 + 1.478i |
| 12.1 | 0.307 + 0.168i | 0.168 + 0.306i | 0.309 + 0.142i | 0.142 + 0.308i | 1.252 + 0.836i | 0.838 + 1.252i | 1.477 + 0.291i | 0.292 + 1.478i |
| 12.2 | 0.308 + 0.168i | 0.168 + 0.307i | 0.311 + 0.142i | 0.142 + 0.309i | 1.251 + 0.836i | 0.837 + 1.251i | 1.477 + 0.292i | 0.292 + 1.477i |
| 12.3 | 0.309 + 0.168i | 0.168 + 0.308i | 0.311 + 0.141i | 0.141 + 0.311i | 1.250 + 0.836i | 0.836 + 1.251i | 1.475 + 0.292i | 0.291 + 1.475i |
| 13.8 | 0.256 + 0.154i | 0.187 + 0.392i | 0.241 + 0.126i | 0.128 + 0.423i | 1.246 + 0.810i | 0.839 + 1.226i | 1.459 + 0.282i | 0.299 + 1.461i |
| 13.9 | 0.256 + 0.154i | 0.189 + 0.395i | 0.238 + 0.126i | 0.127 + 0.426i | 1.244 + 0.809i | 0.838 + 1.225i | 1.458 + 0.282i | 0.299 + 1.460i |
| 14 | 0.256 + 0.154i | 0.191 + 0.398i | 0.235 + 0.125i | 0.126 + 0.429i | 1.244 + 0.808i | 0.838 + 1.224i | 1.457 + 0.282i | 0.299 + 1.459i |
| 14.1 | 0.257 + 0.156i | 0.194 + 0.400i | 0.231 + 0.125i | 0.126 + 0.432i | 1.242 + 0.808i | 0.838 + 1.223i | 1.456 + 0.282i | 0.299 + 1.459i |
| 14.2 | 0.259 + 0.157i | 0.196 + 0.402i | 0.227 + 0.124i | 0.125 + 0.435i | 1.241 + 0.807i | 0.836 + 1.222i | 1.455 + 0.282i | 0.299 + 1.459i |

-continued

| 64 NUC | | | | | | | | |
|---|---|---|---|---|---|---|---|---|
| 14.3 | 0.264 + 0.159i | 0.201 + 0.405i | 0.219 + 0.124i | 0.124 + 0.436i | 1.239 + 0.807i | 0.835 + 1.221i | 1.453 + 0.282i | 0.298 + 1.458i |
| 14.4 | 0.275 + 0.161i | 0.209 + 0.408i | 0.207 + 0.123i | 0.122 + 0.435i | 1.236 + 0.808i | 0.832 + 1.220i | 1.453 + 0.283i | 0.297 + 1.457i |
| 14.5 | 0.320 + 0.160i | 0.241 + 0.403i | 0.175 + 0.118i | 0.118 + 0.418i | 1.230 + 0.818i | 0.818 + 1.216i | 1.463 + 0.290i | 0.291 + 1.444i |
| 14.6 | 0.339 + 0.158i | 0.258 + 0.400i | 0.162 + 0.116i | 0.117 + 0.411i | 1.225 + 0.823i | 0.810 + 1.214i | 1.466 + 0.294i | 0.287 + 1.436i |
| 14.7 | 0.352 + 0.155i | 0.270 + 0.397i | 0.154 + 0.115i | 0.115 + 0.406i | 1.221 + 0.827i | 0.804 + 1.213i | 1.470 + 0.297i | 0.284 + 1.429i |
| 14.8 | 0.359 + 0.154i | 0.276 + 0.396i | 0.149 + 0.114i | 0.115 + 0.405i | 1.218 + 0.828i | 0.800 + 1.212i | 1.470 + 0.298i | 0.282 + 1.426i |
| 14.9 | 0.366 + 0.152i | 0.282 + 0.394i | 0.146 + 0.113i | 0.114 + 0.403i | 1.215 + 0.830i | 0.796 + 1.211i | 1.471 + 0.300i | 0.281 + 1.423i |
| 15 | 0.371 + 0.151i | 0.286 + 0.393i | 0.143 + 0.112i | 0.114 + 0.402i | 1.213 + 0.831i | 0.793 + 1.210i | 1.472 + 0.301i | 0.279 + 1.420i |
| 15.1 | 0.375 + 0.149i | 0.290 + 0.391i | 0.140 + 0.112i | 0.113 + 0.400i | 1.210 + 0.832i | 0.790 + 1.209i | 1.472 + 0.303i | 0.278 + 1.418i |
| 15.2 | 0.379 + 0.149i | 0.294 + 0.390i | 0.138 + 0.112i | 0.113 + 0.400i | 1.207 + 0.833i | 0.788 + 1.209i | 1.473 + 0.304i | 0.276 + 1.415i |
| 15.3 | 0.382 + 0.148i | 0.296 + 0.390i | 0.137 + 0.111i | 0.113 + 0.400i | 1.204 + 0.835i | 0.785 + 1.209i | 1.472 + 0.305i | 0.275 + 1.414i |
| 15.4 | 0.386 + 0.147i | 0.299 + 0.389i | 0.135 + 0.111i | 0.112 + 0.399i | 1.202 + 0.835i | 0.782 + 1.208i | 1.473 + 0.308i | 0.274 + 1.411i |
| 15.5 | 0.388 + 0.146i | 0.302 + 0.388i | 0.135 + 0.111i | 0.112 + 0.399i | 1.199 + 0.837i | 0.779 + 1.208i | 1.472 + 0.310i | 0.272 + 1.409i |
| 15.6 | 0.391 + 0.146i | 0.304 + 0.388i | 0.133 + 0.111i | 0.112 + 0.398i | 1.196 + 0.839i | 0.776 + 1.208i | 1.471 + 0.312i | 0.271 + 1.408i |
| 15.7 | 0.393 + 0.145i | 0.306 + 0.388i | 0.132 + 0.111i | 0.112 + 0.399i | 1.192 + 0.841i | 0.773 + 1.208i | 1.470 + 0.315i | 0.270 + 1.407i |
| 15.8 | 0.396 + 0.145i | 0.308 + 0.387i | 0.132 + 0.111i | 0.112 + 0.399i | 1.187 + 0.846i | 0.768 + 1.210i | 1.469 + 0.323i | 0.267 + 1.404i |
| 15.9 | 0.398 + 0.144i | 0.311 + 0.386i | 0.131 + 0.111i | 0.112 + 0.398i | 1.180 + 0.852i | 0.762 + 1.211i | 1.466 + 0.334i | 0.264 + 1.402i |
| 16 | 0.444 + 0.132i | 0.340 + 0.360i | 0.137 + 0.101i | 0.120 + 0.366i | 1.071 + 0.959i | 0.676 + 1.224i | 1.400 + 0.583i | 0.232 + 1.365i |
| 16.1 | 0.448 + 0.132i | 0.343 + 0.359i | 0.138 + 0.102i | 0.121 + 0.365i | 1.066 + 0.963i | 0.672 + 1.225i | 1.393 + 0.589i | 0.230 + 1.363i |
| 16.2 | 0.452 + 0.131i | 0.345 + 0.358i | 0.139 + 0.101i | 0.122 + 0.364i | 1.059 + 0.966i | 0.667 + 1.225i | 1.384 + 0.597i | 0.229 + 1.361i |
| 16.3 | 0.457 + 0.130i | 0.347 + 0.358i | 0.140 + 0.100i | 0.122 + 0.363i | 1.054 + 0.969i | 0.664 + 1.225i | 1.377 + 0.601i | 0.227 + 1.359i |
| 16.4 | 0.460 + 0.130i | 0.349 + 0.357i | 0.141 + 0.100i | 0.123 + 0.363i | 1.049 + 0.971i | 0.659 + 1.226i | 1.369 + 0.606i | 0.225 + 1.357i |
| 16.5 | 0.464 + 0.130i | 0.350 + 0.357i | 0.142 + 0.100i | 0.123 + 0.362i | 1.045 + 0.973i | 0.656 + 1.227i | 1.363 + 0.608i | 0.224 + 1.355i |
| 16.6 | 0.469 + 0.130i | 0.353 + 0.356i | 0.143 + 0.100i | 0.124 + 0.362i | 1.040 + 0.976i | 0.652 + 1.227i | 1.354 + 0.611i | 0.223 + 1.354i |
| 16.7 | 0.472 + 0.129i | 0.354 + 0.356i | 0.144 + 0.100i | 0.124 + 0.361i | 1.036 + 0.978i | 0.649 + 1.228i | 1.347 + 0.612i | 0.221 + 1.353i |
| 16.8 | 0.477 + 0.129i | 0.357 + 0.355i | 0.145 + 0.100i | 0.124 + 0.361i | 1.032 + 0.980i | 0.646 + 1.229i | 1.337 + 0.612i | 0.220 + 1.351i |
| 16.9 | 0.480 + 0.129i | 0.358 + 0.355i | 0.146 + 0.100i | 0.124 + 0.361i | 1.028 + 0.982i | 0.644 + 1.230i | 1.328 + 0.612i | 0.219 + 1.350i |
| 17 | 0.487 + 0.129i | 0.361 + 0.353i | 0.148 + 0.099i | 0.125 + 0.360i | 1.025 + 0.984i | 0.640 + 1.230i | 1.316 + 0.610i | 0.217 + 1.348i |
| 17.1 | 0.493 + 0.128i | 0.365 + 0.352i | 0.149 + 0.099i | 0.126 + 0.359i | 1.022 + 0.986i | 0.638 + 1.231i | 1.303 + 0.607i | 0.216 + 1.346i |
| 17.2 | 0.496 + 0.128i | 0.367 + 0.352i | 0.150 + 0.100i | 0.126 + 0.359i | 1.019 + 0.988i | 0.636 + 1.233i | 1.294 + 0.604i | 0.215 + 1.345i |
| 17.3 | 0.499 + 0.128i | 0.369 + 0.352i | 0.151 + 0.100i | 0.126 + 0.360i | 1.016 + 0.990i | 0.634 + 1.233i | 1.287 + 0.602i | 0.215 + 1.344i |
| 17.4 | 0.504 + 0.129i | 0.372 + 0.351i | 0.152 + 0.100i | 0.127 + 0.359i | 1.015 + 0.993i | 0.632 + 1.236i | 1.275 + 0.598i | 0.213 + 1.342i |
| 17.5 | 0.507 + 0.129i | 0.374 + 0.351i | 0.153 + 0.101i | 0.128 + 0.361i | 1.014 + 0.995i | 0.630 + 1.236i | 1.268 + 0.595i | 0.213 + 1.341i |
| 17.6 | 0.510 + 0.130i | 0.377 + 0.351i | 0.154 + 0.102i | 0.128 + 0.362i | 1.013 + 0.998i | 0.629 + 1.238i | 1.258 + 0.592i | 0.212 + 1.339i |
| 17.7 | 0.513 + 0.130i | 0.379 + 0.351i | 0.155 + 0.103i | 0.129 + 0.363i | 1.012 + 0.999i | 0.628 + 1.239i | 1.252 + 0.589i | 0.211 + 1.339i |
| 17.8 | 0.516 + 0.131i | 0.382 + 0.351i | 0.156 + 0.104i | 0.129 + 0.364i | 1.011 + 1.002i | 0.627 + 1.240i | 1.244 + 0.587i | 0.211 + 1.338i |
| 17.9 | 0.518 + 0.131i | 0.383 + 0.351i | 0.156 + 0.105i | 0.129 + 0.365i | 1.010 + 1.003i | 0.625 + 1.241i | 1.238 + 0.585i | 0.210 + 1.338i |
| 18 | 0.519 + 0.131i | 0.384 + 0.352i | 0.157 + 0.106i | 0.129 + 0.368i | 1.008 + 1.004i | 0.624 + 1.243i | 1.233 + 0.583i | 0.209 + 1.337i |
| 18.1 | 0.521 + 0.131i | 0.386 + 0.354i | 0.157 + 0.107i | 0.129 + 0.369i | 1.007 + 1.006i | 0.624 + 1.244i | 1.228 + 0.581i | 0.209 + 1.336i |
| 18.2 | 0.522 + 0.132i | 0.387 + 0.354i | 0.158 + 0.108i | 0.129 + 0.371i | 1.005 + 1.008i | 0.622 + 1.246i | 1.223 + 0.579i | 0.209 + 1.336i |
| 18.3 | 0.523 + 0.132i | 0.389 + 0.355i | 0.158 + 0.110i | 0.130 + 0.374i | 1.004 + 1.009i | 0.621 + 1.246i | 1.218 + 0.576i | 0.208 + 1.336i |
| 18.4 | 0.524 + 0.132i | 0.390 + 0.356i | 0.158 + 0.111i | 0.130 + 0.376i | 1.002 + 1.011i | 0.620 + 1.247i | 1.214 + 0.575i | 0.208 + 1.336i |
| 18.5 | 0.525 + 0.132i | 0.390 + 0.357i | 0.158 + 0.113i | 0.130 + 0.379i | 0.999 + 1.012i | 0.618 + 1.248i | 1.210 + 0.572i | 0.207 + 1.337i |
| 18.6 | 0.525 + 0.132i | 0.391 + 0.358i | 0.158 + 0.114i | 0.130 + 0.381i | 0.997 + 1.014i | 0.616 + 1.250i | 1.207 + 0.571i | 0.206 + 1.337i |
| 18.7 | 0.526 + 0.132i | 0.392 + 0.359i | 0.159 + 0.115i | 0.130 + 0.383i | 0.993 + 1.017i | 0.614 + 1.251i | 1.203 + 0.569i | 0.206 + 1.337i |
| 18.8 | 0.527 + 0.133i | 0.392 + 0.360i | 0.159 + 0.116i | 0.130 + 0.385i | 0.989 + 1.019i | 0.612 + 1.253i | 1.198 + 0.567i | 0.204 + 1.337i |
| 18.9 | 0.529 + 0.133i | 0.393 + 0.360i | 0.159 + 0.117i | 0.130 + 0.388i | 0.985 + 1.021i | 0.608 + 1.255i | 1.196 + 0.565i | 0.204 + 1.337i |
| 19 | 0.528 + 0.133i | 0.394 + 0.362i | 0.159 + 0.119i | 0.131 + 0.390i | 0.980 + 1.025i | 0.605 + 1.257i | 1.193 + 0.563i | 0.203 + 1.338i |
| 19.1 | 0.529 + 0.133i | 0.395 + 0.363i | 0.160 + 0.119i | 0.131 + 0.392i | 0.976 + 1.028i | 0.602 + 1.259i | 1.190 + 0.561i | 0.201 + 1.338i |
| 19.2 | 0.530 + 0.134i | 0.395 + 0.364i | 0.160 + 0.121i | 0.131 + 0.394i | 0.970 + 1.033i | 0.597 + 1.260i | 1.187 + 0.558i | 0.200 + 1.339i |
| 19.3 | 0.531 + 0.134i | 0.396 + 0.365i | 0.160 + 0.122i | 0.131 + 0.396i | 0.962 + 1.037i | 0.592 + 1.263i | 1.184 + 0.556i | 0.198 + 1.339i |
| 19.4 | 0.532 + 0.134i | 0.396 + 0.365i | 0.160 + 0.122i | 0.131 + 0.398i | 0.956 + 1.042i | 0.587 + 1.264i | 1.182 + 0.553i | 0.196 + 1.340i |
| 19.5 | 0.534 + 0.134i | 0.397 + 0.365i | 0.160 + 0.123i | 0.131 + 0.399i | 0.949 + 1.046i | 0.583 + 1.265i | 1.179 + 0.551i | 0.194 + 1.341i |
| 19.6 | 0.534 + 0.134i | 0.397 + 0.366i | 0.161 + 0.125i | 0.131 + 0.403i | 0.942 + 1.051i | 0.578 + 1.267i | 1.177 + 0.548i | 0.193 + 1.342i |
| 19.7 | 0.535 + 0.135i | 0.398 + 0.367i | 0.161 + 0.125i | 0.132 + 0.404i | 0.935 + 1.057i | 0.572 + 1.267i | 1.174 + 0.545i | 0.191 + 1.342i |
| 19.8 | 0.535 + 0.135i | 0.398 + 0.368i | 0.161 + 0.126i | 0.132 + 0.406i | 0.930 + 1.060i | 0.569 + 1.269i | 1.171 + 0.541i | 0.191 + 1.344i |
| 19.9 | 0.536 + 0.135i | 0.399 + 0.368i | 0.161 + 0.128i | 0.132 + 0.408i | 0.923 + 1.064i | 0.564 + 1.270i | 1.168 + 0.539i | 0.189 + 1.345i |
| 20 | 0.537 + 0.135i | 0.399 + 0.368i | 0.161 + 0.128i | 0.132 + 0.410i | 0.919 + 1.066i | 0.562 + 1.270i | 1.165 + 0.536i | 0.188 + 1.346i |

| 256NUC | | | | | | | | |
|---|---|---|---|---|---|---|---|---|
| | Normalized values | | | | | | | |
| SNR | a1 | a2 | a3 | a4 | a5 | a6 | a7 | a8 |
| 10 | 1.467 + 0.993i | 1.751 + 0.343i | 0.887 + 0.534i | 1.003 + 0.243i | 1.216 + 0.823i | 1.435 + 0.289i | 0.903 + 0.552i | 1.025 + 0.246i |
| 10.1 | 1.468 + 0.993i | 1.753 + 0.345i | 0.883 + 0.533i | 1.000 + 0.241i | 1.215 + 0.823i | 1.435 + 0.289i | 0.900 + 0.552i | 1.023 + 0.244i |
| 10.2 | 1.472 + 0.994i | 1.754 + 0.345i | 0.879 + 0.533i | 0.997 + 0.240i | 1.214 + 0.823i | 1.434 + 0.287i | 0.897 + 0.552i | 1.021 + 0.243i |
| 10.3 | 1.475 + 0.995i | 1.757 + 0.346i | 0.876 + 0.533i | 0.994 + 0.238i | 1.213 + 0.822i | 1.434 + 0.287i | 0.894 + 0.552i | 1.019 + 0.241i |
| 10.4 | 1.477 + 0.996i | 1.759 + 0.346i | 0.873 + 0.533i | 0.992 + 0.236i | 1.211 + 0.822i | 1.434 + 0.286i | 0.891 + 0.553i | 1.017 + 0.239i |
| 10.5 | 1.481 + 0.997i | 1.760 + 0.347i | 0.870 + 0.532i | 0.990 + 0.235i | 1.209 + 0.821i | 1.433 + 0.286i | 0.889 + 0.553i | 1.015 + 0.237i |
| 10.6 | 1.484 + 0.999i | 1.762 + 0.347i | 0.867 + 0.532i | 0.988 + 0.233i | 1.208 + 0.821i | 1.432 + 0.285i | 0.886 + 0.554i | 1.014 + 0.235i |
| 10.7 | 1.486 + 1.001i | 1.764 + 0.348i | 0.864 + 0.533i | 0.986 + 0.231i | 1.206 + 0.821i | 1.431 + 0.284i | 0.883 + 0.555i | 1.013 + 0.233i |
| 10.8 | 1.488 + 1.002i | 1.765 + 0.349i | 0.862 + 0.533i | 0.985 + 0.229i | 1.204 + 0.820i | 1.431 + 0.284i | 0.881 + 0.555i | 1.012 + 0.231i |

-continued

| 256NUC | | | | | | | | |
|---|---|---|---|---|---|---|---|---|
| 10.9 | 1.491 + 1.003i | 1.767 + 0.349i | 0.859 + 0.533i | 0.983 + 0.227i | 1.202 + 0.819i | 1.429 + 0.283i | 0.879 + 0.556i | 1.011 + 0.229i |
| 11 | 1.494 + 1.005i | 1.768 + 0.349i | 0.857 + 0.535i | 0.982 + 0.225i | 1.200 + 0.819i | 1.429 + 0.282i | 0.876 + 0.557i | 1.010 + 0.227i |
| 11.1 | 1.495 + 1.006i | 1.770 + 0.350i | 0.855 + 0.534i | 0.981 + 0.223i | 1.198 + 0.819i | 1.428 + 0.280i | 0.874 + 0.558i | 1.009 + 0.225i |
| 11.2 | 1.497 + 1.007i | 1.771 + 0.350i | 0.853 + 0.536i | 0.980 + 0.221i | 1.195 + 0.820i | 1.427 + 0.277i | 0.873 + 0.560i | 1.009 + 0.222i |
| 11.3 | 1.498 + 1.009i | 1.772 + 0.351i | 0.850 + 0.536i | 0.979 + 0.219i | 1.187 + 0.826i | 1.427 + 0.268i | 0.869 + 0.562i | 1.009 + 0.218i |
| 11.4 | 1.499 + 1.012i | 1.775 + 0.353i | 0.848 + 0.537i | 0.978 + 0.218i | 1.174 + 0.838i | 1.428 + 0.250i | 0.865 + 0.566i | 1.009 + 0.213i |
| 11.5 | 1.501 + 1.016i | 1.778 + 0.354i | 0.846 + 0.536i | 0.976 + 0.216i | 1.162 + 0.850i | 1.429 + 0.233i | 0.862 + 0.569i | 1.009 + 0.208i |
| 11.6 | 1.503 + 1.020i | 1.782 + 0.355i | 0.843 + 0.535i | 0.975 + 0.214i | 1.152 + 0.859i | 1.430 + 0.220i | 0.859 + 0.572i | 1.009 + 0.204i |
| 11.7 | 1.504 + 1.023i | 1.785 + 0.356i | 0.841 + 0.536i | 0.973 + 0.213i | 1.144 + 0.867i | 1.431 + 0.209i | 0.856 + 0.574i | 1.008 + 0.200i |
| 11.8 | 1.505 + 1.028i | 1.789 + 0.357i | 0.839 + 0.535i | 0.971 + 0.211i | 1.137 + 0.872i | 1.432 + 0.199i | 0.853 + 0.576i | 1.008 + 0.196i |
| 11.9 | 1.506 + 1.032i | 1.792 + 0.357i | 0.837 + 0.534i | 0.969 + 0.210i | 1.131 + 0.878i | 1.432 + 0.191i | 0.851 + 0.578i | 1.008 + 0.193i |
| 12 | 1.507 + 1.035i | 1.795 + 0.357i | 0.834 + 0.534i | 0.968 + 0.208i | 1.126 + 0.883i | 1.432 + 0.183i | 0.848 + 0.579i | 1.008 + 0.190i |
| 12.1 | 1.507 + 1.040i | 1.798 + 0.358i | 0.833 + 0.534i | 0.966 + 0.206i | 1.121 + 0.888i | 1.433 + 0.176i | 0.846 + 0.581i | 1.008 + 0.187i |
| 12.2 | 1.507 + 1.043i | 1.800 + 0.358i | 0.831 + 0.534i | 0.965 + 0.205i | 1.117 + 0.892i | 1.434 + 0.171i | 0.844 + 0.581i | 1.008 + 0.185i |
| 12.3 | 1.507 + 1.047i | 1.803 + 0.357i | 0.829 + 0.534i | 0.965 + 0.204i | 1.113 + 0.896i | 1.434 + 0.165i | 0.843 + 0.583i | 1.008 + 0.183i |
| 12.4 | 1.506 + 1.052i | 1.805 + 0.358i | 0.827 + 0.534i | 0.964 + 0.202i | 1.109 + 0.900i | 1.436 + 0.160i | 0.841 + 0.584i | 1.009 + 0.180i |
| 12.5 | 1.505 + 1.057i | 1.808 + 0.355i | 0.825 + 0.535i | 0.963 + 0.201i | 1.105 + 0.903i | 1.434 + 0.156i | 0.840 + 0.585i | 1.009 + 0.179i |
| 12.6 | 1.502 + 1.063i | 1.810 + 0.352i | 0.825 + 0.536i | 0.963 + 0.200i | 1.101 + 0.906i | 1.434 + 0.152i | 0.839 + 0.587i | 1.011 + 0.177i |
| 12.7 | 1.499 + 1.070i | 1.812 + 0.349i | 0.823 + 0.536i | 0.963 + 0.199i | 1.098 + 0.910i | 1.434 + 0.148i | 0.838 + 0.588i | 1.012 + 0.176i |
| 12.8 | 1.342 + 1.283i | 1.791 + 0.241i | 0.814 + 0.553i | 0.982 + 0.199i | 1.083 + 0.931i | 1.409 + 0.158i | 0.855 + 0.616i | 1.047 + 0.187i |
| 12.9 | 1.333 + 1.290i | 1.791 + 0.243i | 0.810 + 0.560i | 0.986 + 0.198i | 1.077 + 0.937i | 1.413 + 0.155i | 0.850 + 0.622i | 1.051 + 0.185i |
| 13 | 1.323 + 1.296i | 1.791 + 0.245i | 0.804 + 0.567i | 0.991 + 0.196i | 1.070 + 0.944i | 1.418 + 0.151i | 0.844 + 0.628i | 1.056 + 0.183i |
| 13.1 | 1.316 + 1.299i | 1.791 + 0.246i | 0.800 + 0.571i | 0.994 + 0.194i | 1.065 + 0.947i | 1.421 + 0.149i | 0.840 + 0.632i | 1.060 + 0.181i |
| 13.2 | 1.308 + 1.303i | 1.791 + 0.249i | 0.795 + 0.576i | 0.999 + 0.192i | 1.060 + 0.951i | 1.424 + 0.146i | 0.835 + 0.637i | 1.065 + 0.178i |
| 13.3 | 1.304 + 1.304i | 1.790 + 0.249i | 0.792 + 0.579i | 1.001 + 0.189i | 1.058 + 0.952i | 1.425 + 0.144i | 0.833 + 0.639i | 1.067 + 0.176i |
| 13.4 | 1.298 + 1.307i | 1.789 + 0.250i | 0.788 + 0.583i | 1.004 + 0.187i | 1.054 + 0.955i | 1.426 + 0.142i | 0.829 + 0.642i | 1.072 + 0.174i |
| 13.5 | 1.290 + 1.310i | 1.788 + 0.251i | 0.784 + 0.587i | 1.008 + 0.184i | 1.050 + 0.958i | 1.427 + 0.140i | 0.825 + 0.646i | 1.076 + 0.172i |
| 13.6 | 1.285 + 1.312i | 1.787 + 0.251i | 0.781 + 0.589i | 1.011 + 0.182i | 1.047 + 0.959i | 1.428 + 0.139i | 0.822 + 0.648i | 1.080 + 0.170i |
| 13.7 | 1.151 + 1.337i | 1.759 + 0.218i | 0.766 + 0.621i | 1.040 + 0.173i | 0.999 + 0.966i | 1.434 + 0.173i | 0.811 + 0.676i | 1.122 + 0.179i |
| 13.8 | 1.147 + 1.339i | 1.759 + 0.218i | 0.763 + 0.623i | 1.042 + 0.171i | 0.996 + 0.969i | 1.435 + 0.172i | 0.808 + 0.679i | 1.124 + 0.176i |
| 13.9 | 1.142 + 1.340i | 1.759 + 0.219i | 0.761 + 0.627i | 1.046 + 0.169i | 0.991 + 0.972i | 1.436 + 0.173i | 0.806 + 0.684i | 1.129 + 0.174i |
| 14 | 1.139 + 1.341i | 1.760 + 0.220i | 0.759 + 0.629i | 1.048 + 0.168i | 0.988 + 0.975i | 1.436 + 0.172i | 0.803 + 0.687i | 1.132 + 0.171i |
| 14.1 | 1.137 + 1.343i | 1.760 + 0.221i | 0.757 + 0.631i | 1.050 + 0.166i | 0.985 + 0.977i | 1.437 + 0.172i | 0.801 + 0.690i | 1.135 + 0.169i |
| 14.2 | 1.134 + 1.344i | 1.759 + 0.221i | 0.755 + 0.635i | 1.052 + 0.164i | 0.982 + 0.979i | 1.437 + 0.172i | 0.799 + 0.694i | 1.138 + 0.166i |
| 14.3 | 1.132 + 1.345i | 1.760 + 0.221i | 0.753 + 0.636i | 1.054 + 0.162i | 0.979 + 0.981i | 1.437 + 0.173i | 0.797 + 0.697i | 1.141 + 0.165i |
| 14.4 | 1.130 + 1.345i | 1.760 + 0.222i | 0.752 + 0.639i | 1.056 + 0.161i | 0.976 + 0.982i | 1.438 + 0.174i | 0.795 + 0.701i | 1.144 + 0.162i |
| 14.5 | 1.128 + 1.346i | 1.759 + 0.222i | 0.750 + 0.640i | 1.057 + 0.159i | 0.974 + 0.984i | 1.438 + 0.174i | 0.794 + 0.704i | 1.146 + 0.160i |
| 14.6 | 1.127 + 1.346i | 1.759 + 0.222i | 0.749 + 0.643i | 1.059 + 0.158i | 0.971 + 0.985i | 1.438 + 0.175i | 0.792 + 0.707i | 1.149 + 0.159i |
| 14.7 | 1.125 + 1.347i | 1.759 + 0.222i | 0.747 + 0.646i | 1.061 + 0.156i | 0.968 + 0.987i | 1.438 + 0.175i | 0.790 + 0.711i | 1.151 + 0.157i |
| 14.8 | 1.124 + 1.347i | 1.759 + 0.222i | 0.746 + 0.648i | 1.063 + 0.155i | 0.966 + 0.988i | 1.439 + 0.177i | 0.789 + 0.714i | 1.154 + 0.155i |
| 14.9 | 1.123 + 1.346i | 1.759 + 0.223i | 0.745 + 0.649i | 1.064 + 0.153i | 0.964 + 0.989i | 1.439 + 0.177i | 0.788 + 0.716i | 1.156 + 0.154i |
| 15 | 1.123 + 1.346i | 1.758 + 0.222i | 0.744 + 0.651i | 1.065 + 0.152i | 0.961 + 0.990i | 1.439 + 0.178i | 0.787 + 0.720i | 1.158 + 0.153i |
| 15.1 | 1.124 + 1.344i | 1.758 + 0.222i | 0.743 + 0.653i | 1.066 + 0.151i | 0.959 + 0.991i | 1.439 + 0.178i | 0.786 + 0.723i | 1.159 + 0.151i |
| 15.2 | 1.125 + 1.342i | 1.757 + 0.222i | 0.742 + 0.655i | 1.067 + 0.149i | 0.958 + 0.991i | 1.439 + 0.179i | 0.785 + 0.726i | 1.161 + 0.150i |
| 15.3 | 1.126 + 1.340i | 1.757 + 0.222i | 0.740 + 0.657i | 1.068 + 0.147i | 0.956 + 0.992i | 1.438 + 0.179i | 0.784 + 0.728i | 1.162 + 0.148i |
| 15.4 | 1.128 + 1.336i | 1.756 + 0.222i | 0.739 + 0.659i | 1.069 + 0.146i | 0.954 + 0.992i | 1.438 + 0.180i | 0.783 + 0.732i | 1.163 + 0.147i |
| 15.5 | 0.543 + 0.298i | 0.585 + 0.123i | 0.303 + 0.160i | 0.321 + 0.107i | 0.539 + 0.309i | 0.585 + 0.120i | 0.303 + 0.162i | 0.320 + 0.108i |
| 15.6 | 0.543 + 0.297i | 0.587 + 0.123i | 0.311 + 0.160i | 0.331 + 0.105i | 0.539 + 0.308i | 0.587 + 0.119i | 0.311 + 0.163i | 0.330 + 0.106i |
| 15.7 | 0.543 + 0.297i | 0.589 + 0.123i | 0.318 + 0.162i | 0.340 + 0.103i | 0.539 + 0.309i | 0.589 + 0.118i | 0.318 + 0.164i | 0.339 + 0.104i |
| 15.8 | 0.543 + 0.297i | 0.590 + 0.122i | 0.323 + 0.162i | 0.346 + 0.101i | 0.539 + 0.308i | 0.590 + 0.117i | 0.323 + 0.165i | 0.346 + 0.102i |
| 15.9 | 0.543 + 0.297i | 0.591 + 0.122i | 0.328 + 0.164i | 0.353 + 0.100i | 0.538 + 0.308i | 0.591 + 0.116i | 0.328 + 0.166i | 0.352 + 0.101i |
| 16 | 0.542 + 0.297i | 0.591 + 0.121i | 0.332 + 0.165i | 0.358 + 0.099i | 0.537 + 0.309i | 0.592 + 0.115i | 0.332 + 0.168i | 0.358 + 0.100i |
| 16.1 | 0.542 + 0.297i | 0.592 + 0.121i | 0.336 + 0.167i | 0.363 + 0.098i | 0.536 + 0.309i | 0.593 + 0.114i | 0.336 + 0.169i | 0.363 + 0.099i |
| 16.2 | 0.542 + 0.297i | 0.593 + 0.121i | 0.340 + 0.169i | 0.368 + 0.097i | 0.536 + 0.311i | 0.595 + 0.114i | 0.340 + 0.171i | 0.368 + 0.098i |
| 16.3 | 0.541 + 0.298i | 0.594 + 0.121i | 0.343 + 0.171i | 0.373 + 0.096i | 0.534 + 0.311i | 0.595 + 0.113i | 0.343 + 0.173i | 0.373 + 0.096i |
| 16.4 | 0.540 + 0.299i | 0.594 + 0.121i | 0.346 + 0.174i | 0.376 + 0.096i | 0.533 + 0.313i | 0.595 + 0.112i | 0.346 + 0.176i | 0.377 + 0.096i |
| 16.5 | 0.540 + 0.299i | 0.594 + 0.121i | 0.350 + 0.176i | 0.381 + 0.095i | 0.532 + 0.315i | 0.597 + 0.111i | 0.350 + 0.178i | 0.381 + 0.095i |
| 16.6 | 0.538 + 0.301i | 0.595 + 0.122i | 0.353 + 0.179i | 0.385 + 0.094i | 0.530 + 0.317i | 0.597 + 0.110i | 0.353 + 0.182i | 0.386 + 0.094i |
| 16.7 | 0.538 + 0.301i | 0.596 + 0.122i | 0.356 + 0.182i | 0.389 + 0.094i | 0.528 + 0.319i | 0.599 + 0.109i | 0.356 + 0.184i | 0.389 + 0.094i |
| 16.8 | 0.537 + 0.303i | 0.597 + 0.123i | 0.359 + 0.186i | 0.393 + 0.094i | 0.527 + 0.322i | 0.600 + 0.108i | 0.359 + 0.189i | 0.394 + 0.093i |
| 16.9 | 0.535 + 0.305i | 0.596 + 0.123i | 0.362 + 0.190i | 0.396 + 0.094i | 0.525 + 0.325i | 0.600 + 0.108i | 0.362 + 0.192i | 0.397 + 0.093i |
| 17 | 0.534 + 0.306i | 0.597 + 0.123i | 0.364 + 0.193i | 0.400 + 0.093i | 0.523 + 0.327i | 0.600 + 0.106i | 0.364 + 0.196i | 0.401 + 0.092i |
| 17.1 | 0.534 + 0.307i | 0.596 + 0.124i | 0.366 + 0.197i | 0.402 + 0.093i | 0.521 + 0.350i | 0.600 + 0.106i | 0.366 + 0.200i | 0.403 + 0.091i |
| 17.2 | 0.533 + 0.307i | 0.596 + 0.124i | 0.368 + 0.200i | 0.403 + 0.093i | 0.519 + 0.331i | 0.600 + 0.104i | 0.367 + 0.203i | 0.404 + 0.091i |
| 17.3 | 0.532 + 0.306i | 0.595 + 0.124i | 0.368 + 0.201i | 0.404 + 0.092i | 0.519 + 0.332i | 0.600 + 0.103i | 0.367 + 0.205i | 0.405 + 0.091i |
| 17.4 | 0.532 + 0.306i | 0.595 + 0.124i | 0.369 + 0.203i | 0.405 + 0.091i | 0.517 + 0.333i | 0.600 + 0.102i | 0.368 + 0.208i | 0.406 + 0.090i |
| 17.5 | 0.532 + 0.306i | 0.595 + 0.124i | 0.370 + 0.206i | 0.406 + 0.091i | 0.517 + 0.334i | 0.600 + 0.101i | 0.369 + 0.210i | 0.407 + 0.089i |
| 17.6 | 0.532 + 0.306i | 0.595 + 0.124i | 0.370 + 0.206i | 0.406 + 0.091i | 0.516 + 0.335i | 0.600 + 0.100i | 0.369 + 0.211i | 0.408 + 0.089i |
| 17.7 | 0.532 + 0.305i | 0.594 + 0.124i | 0.370 + 0.208i | 0.406 + 0.090i | 0.515 + 0.335i | 0.600 + 0.099i | 0.369 + 0.213i | 0.407 + 0.088i |
| 17.8 | 0.531 + 0.304i | 0.593 + 0.124i | 0.369 + 0.208i | 0.405 + 0.090i | 0.514 + 0.335i | 0.599 + 0.098i | 0.368 + 0.213i | 0.406 + 0.087i |
| 17.9 | 0.429 + 0.284i | 0.456 + 0.099i | 0.247 + 0.251i | 0.269 + 0.085i | 0.427 + 0.296i | 0.456 + 0.095i | 0.248 + 0.256i | 0.268 + 0.085i |
| 18 | 0.428 + 0.283i | 0.456 + 0.100i | 0.248 + 0.251i | 0.269 + 0.084i | 0.426 + 0.296i | 0.456 + 0.095i | 0.248 + 0.255i | 0.269 + 0.084i |
| 18.1 | 0.427 + 0.283i | 0.456 + 0.100i | 0.249 + 0.250i | 0.271 + 0.084i | 0.426 + 0.296i | 0.457 + 0.095i | 0.249 + 0.255i | 0.271 + 0.084i |
| 18.2 | 0.428 + 0.282i | 0.458 + 0.100i | 0.250 + 0.249i | 0.273 + 0.084i | 0.426 + 0.296i | 0.458 + 0.095i | 0.250 + 0.254i | 0.273 + 0.084i |
| 18.3 | 0.428 + 0.281i | 0.459 + 0.100i | 0.252 + 0.248i | 0.274 + 0.084i | 0.426 + 0.296i | 0.460 + 0.094i | 0.252 + 0.252i | 0.274 + 0.083i |
| 18.4 | 0.428 + 0.281i | 0.459 + 0.100i | 0.253 + 0.248i | 0.274 + 0.083i | 0.426 + 0.296i | 0.460 + 0.093i | 0.253 + 0.253i | 0.274 + 0.083i |
| 18.5 | 0.424 + 0.279i | 0.447 + 0.101i | 0.249 + 0.255i | 0.266 + 0.085i | 0.417 + 0.304i | 0.448 + 0.093i | 0.247 + 0.270i | 0.266 + 0.085i |

-continued

| | 256NUC | | | | | | | |
|---|---|---|---|---|---|---|---|---|
| 18.6 | 0.424 + 0.278i | 0.447 + 0.101i | 0.250 + 0.254i | 0.267 + 0.085i | 0.417 + 0.305i | 0.449 + 0.092i | 0.248 + 0.270i | 0.267 + 0.084i |
| 18.7 | 0.422 + 0.277i | 0.450 + 0.102i | 0.251 + 0.247i | 0.271 + 0.084i | 0.412 + 0.307i | 0.451 + 0.091i | 0.248 + 0.265i | 0.271 + 0.083i |
| 18.8 | 0.423 + 0.277i | 0.451 + 0.103i | 0.252 + 0.247i | 0.273 + 0.084i | 0.413 + 0.308i | 0.453 + 0.090i | 0.250 + 0.266i | 0.273 + 0.082i |
| 18.9 | 0.424 + 0.276i | 0.452 + 0.104i | 0.254 + 0.246i | 0.274 + 0.084i | 0.413 + 0.310i | 0.454 + 0.089i | 0.251 + 0.267i | 0.274 + 0.081i |
| 19 | 0.425 + 0.275i | 0.452 + 0.104i | 0.254 + 0.246i | 0.274 + 0.084i | 0.413 + 0.311i | 0.454 + 0.088i | 0.251 + 0.267i | 0.274 + 0.081i |
| 19.1 | 0.425 + 0.275i | 0.452 + 0.105i | 0.254 + 0.246i | 0.274 + 0.085i | 0.412 + 0.312i | 0.455 + 0.088i | 0.251 + 0.268i | 0.274 + 0.080i |
| 19.2 | 1.299 + 1.010i | 1.580 + 0.150i | 0.754 + 0.645i | 0.955 + 0.116i | 1.026 + 0.886i | 1.306 + 0.133i | 0.828 + 0.758i | 1.092 + 0.119i |
| 19.3 | 1.298 + 1.007i | 1.580 + 0.150i | 0.754 + 0.645i | 0.954 + 0.115i | 1.027 + 0.886i | 1.308 + 0.133i | 0.833 + 0.759i | 1.096 + 0.119i |
| 19.4 | 1.297 + 1.005i | 1.581 + 0.150i | 0.756 + 0.646i | 0.954 + 0.115i | 1.028 + 0.886i | 1.310 + 0.133i | 0.836 + 0.759i | 1.099 + 0.118i |
| 19.5 | 1.297 + 1.002i | 1.581 + 0.150i | 0.757 + 0.646i | 0.953 + 0.113i | 1.030 + 0.886i | 1.313 + 0.133i | 0.841 + 0.760i | 1.103 + 0.118i |
| 19.6 | 1.297 + 1.000i | 1.580 + 0.149i | 0.757 + 0.647i | 0.953 + 0.113i | 1.032 + 0.886i | 1.313 + 0.133i | 0.845 + 0.760i | 1.105 + 0.117i |
| 19.7 | 1.296 + 0.997i | 1.580 + 0.149i | 0.758 + 0.648i | 0.953 + 0.113i | 1.033 + 0.886i | 1.314 + 0.132i | 0.850 + 0.761i | 1.107 + 0.117i |
| 19.8 | 1.297 + 0.995i | 1.579 + 0.149i | 0.759 + 0.649i | 0.953 + 0.113i | 1.036 + 0.886i | 1.316 + 0.132i | 0.854 + 0.761i | 1.110 + 0.117i |
| 19.9 | 1.297 + 0.993i | 1.579 + 0.148i | 0.759 + 0.650i | 0.953 + 0.112i | 1.037 + 0.886i | 1.317 + 0.132i | 0.858 + 0.761i | 1.112 + 0.116i |
| 20 | 1.297 + 0.990i | 1.579 + 0.148i | 0.760 + 0.651i | 0.954 + 0.112i | 1.039 + 0.886i | 1.319 + 0.133i | 0.862 + 0.762i | 1.114 + 0.116i |
| 20.1 | 1.297 + 0.988i | 1.578 + 0.147i | 0.761 + 0.652i | 0.955 + 0.112i | 1.040 + 0.888i | 1.319 + 0.132i | 0.866 + 0.762i | 1.116 + 0.116i |
| 20.2 | 1.298 + 0.986i | 1.579 + 0.147i | 0.761 + 0.653i | 0.956 + 0.112i | 1.042 + 0.888i | 1.321 + 0.132i | 0.870 + 0.763i | 1.118 + 0.116i |
| 20.3 | 1.298 + 0.984i | 1.578 + 0.146i | 0.762 + 0.655i | 0.957 + 0.112i | 1.043 + 0.889i | 1.322 + 0.132i | 0.874 + 0.764i | 1.121 + 0.116i |
| 20.4 | 1.299 + 0.982i | 1.577 + 0.146i | 0.763 + 0.656i | 0.958 + 0.112i | 1.045 + 0.891i | 1.323 + 0.132i | 0.877 + 0.764i | 1.122 + 0.116i |
| 20.5 | 1.291 + 0.967i | 1.571 + 0.144i | 0.790 + 0.634i | 0.945 + 0.100i | 1.039 + 0.877i | 1.321 + 0.128i | 0.872 + 0.753i | 1.120 + 0.108i |
| 20.6 | 1.290 + 0.965i | 1.569 + 0.144i | 0.792 + 0.635i | 0.945 + 0.100i | 1.039 + 0.878i | 1.321 + 0.128i | 0.873 + 0.755i | 1.121 + 0.108i |
| 20.7 | 1.289 + 0.962i | 1.568 + 0.143i | 0.795 + 0.634i | 0.946 + 0.099i | 1.038 + 0.879i | 1.321 + 0.128i | 0.874 + 0.756i | 1.122 + 0.107i |
| 20.8 | 1.271 + 0.972i | 1.582 + 0.150i | 0.834 + 0.630i | 0.953 + 0.098i | 0.995 + 0.902i | 1.334 + 0.118i | 0.810 + 0.782i | 1.130 + 0.102i |
| 20.9 | 1.268 + 0.972i | 1.581 + 0.150i | 0.838 + 0.631i | 0.954 + 0.097i | 0.993 + 0.904i | 1.335 + 0.117i | 0.808 + 0.785i | 1.131 + 0.102i |
| 21 | 1.266 + 0.970i | 1.579 + 0.150i | 0.841 + 0.632i | 0.956 + 0.097i | 0.991 + 0.905i | 1.335 + 0.117i | 0.806 + 0.787i | 1.133 + 0.102i |
| 21.1 | 1.265 + 0.969i | 1.578 + 0.149i | 0.846 + 0.633i | 0.957 + 0.097i | 0.990 + 0.905i | 1.335 + 0.116i | 0.804 + 0.788i | 1.133 + 0.101i |
| 21.2 | 1.262 + 0.971i | 1.577 + 0.149i | 0.853 + 0.634i | 0.959 + 0.097i | 0.985 + 0.903i | 1.335 + 0.115i | 0.797 + 0.789i | 1.134 + 0.101i |
| 21.3 | 1.259 + 0.972i | 1.575 + 0.148i | 0.857 + 0.636i | 0.961 + 0.097i | 0.983 + 0.903i | 1.335 + 0.115i | 0.795 + 0.790i | 1.135 + 0.101i |
| 21.4 | 1.256 + 0.974i | 1.574 + 0.147i | 0.862 + 0.637i | 0.962 + 0.096i | 0.980 + 0.903i | 1.335 + 0.115i | 0.791 + 0.792i | 1.137 + 0.100i |
| 21.5 | 1.253 + 0.974i | 1.572 + 0.147i | 0.866 + 0.638i | 0.963 + 0.096i | 0.980 + 0.903i | 1.335 + 0.114i | 0.790 + 0.793i | 1.137 + 0.100i |
| 21.6 | 1.250 + 0.975i | 1.570 + 0.146i | 0.870 + 0.640i | 0.964 + 0.096i | 0.978 + 0.903i | 1.334 + 0.114i | 0.788 + 0.794i | 1.138 + 0.100i |
| 21.7 | 1.248 + 0.975i | 1.568 + 0.145i | 0.874 + 0.641i | 0.965 + 0.096i | 0.977 + 0.902i | 1.334 + 0.113i | 0.788 + 0.795i | 1.138 + 0.099i |
| 21.8 | 1.244 + 0.975i | 1.566 + 0.145i | 0.878 + 0.642i | 0.966 + 0.096i | 0.976 + 0.902i | 1.333 + 0.112i | 0.786 + 0.796i | 1.139 + 0.099i |
| 21.9 | 1.240 + 0.977i | 1.564 + 0.143i | 0.883 + 0.643i | 0.967 + 0.095i | 0.975 + 0.902i | 1.333 + 0.112i | 0.786 + 0.796i | 1.139 + 0.099i |
| 22 | 1.235 + 0.978i | 1.562 + 0.143i | 0.886 + 0.644i | 0.969 + 0.095i | 0.973 + 0.902i | 1.333 + 0.111i | 0.785 + 0.797i | 1.140 + 0.098i |
| 22.1 | 1.231 + 0.979i | 1.561 + 0.142i | 0.890 + 0.645i | 0.970 + 0.095i | 0.972 + 0.902i | 1.332 + 0.111i | 0.785 + 0.798i | 1.140 + 0.098i |
| 22.2 | 1.227 + 0.980i | 1.559 + 0.141i | 0.895 + 0.646i | 0.971 + 0.095i | 0.972 + 0.902i | 1.332 + 0.111i | 0.785 + 0.798i | 1.141 + 0.098i |
| 22.3 | 1.221 + 0.982i | 1.557 + 0.140i | 0.899 + 0.648i | 0.973 + 0.095i | 0.969 + 0.903i | 1.331 + 0.110i | 0.783 + 0.798i | 1.142 + 0.098i |
| 22.4 | 1.201 + 0.994i | 1.556 + 0.140i | 0.907 + 0.649i | 0.975 + 0.094i | 0.959 + 0.901i | 1.332 + 0.110i | 0.773 + 0.789i | 1.143 + 0.097i |
| 22.5 | 1.194 + 0.996i | 1.555 + 0.139i | 0.910 + 0.650i | 0.976 + 0.094i | 0.956 + 0.902i | 1.332 + 0.109i | 0.771 + 0.789i | 1.144 + 0.097i |
| 22.6 | 0.333 + 0.340i | 0.329 + 0.201i | 0.199 + 0.343i | 0.195 + 0.204i | 0.337 + 0.486i | 0.327 + 0.066i | 0.200 + 0.488i | 0.192 + 0.068i |
| 22.7 | 0.334 + 0.341i | 0.330 + 0.202i | 0.199 + 0.344i | 0.195 + 0.204i | 0.338 + 0.487i | 0.327 + 0.066i | 0.201 + 0.490i | 0.192 + 0.068i |
| 22.8 | 0.335 + 0.342i | 0.330 + 0.202i | 0.199 + 0.345i | 0.196 + 0.205i | 0.339 + 0.488i | 0.329 + 0.067i | 0.202 + 0.490i | 0.194 + 0.068i |
| 22.9 | 0.336 + 0.343i | 0.332 + 0.203i | 0.200 + 0.346i | 0.197 + 0.205i | 0.340 + 0.489i | 0.331 + 0.067i | 0.202 + 0.492i | 0.194 + 0.068i |
| 23 | 0.337 + 0.343i | 0.333 + 0.203i | 0.201 + 0.346i | 0.197 + 0.205i | 0.342 + 0.490i | 0.331 + 0.067i | 0.203 + 0.492i | 0.195 + 0.068i |
| 23.1 | 0.338 + 0.344i | 0.334 + 0.203i | 0.202 + 0.347i | 0.198 + 0.206i | 0.343 + 0.491i | 0.333 + 0.067i | 0.204 + 0.493i | 0.196 + 0.068i |
| 23.2 | 0.339 + 0.345i | 0.336 + 0.204i | 0.203 + 0.347i | 0.199 + 0.206i | 0.344 + 0.492i | 0.334 + 0.067i | 0.204 + 0.493i | 0.197 + 0.068i |
| 23.3 | 0.339 + 0.346i | 0.336 + 0.204i | 0.203 + 0.347i | 0.200 + 0.206i | 0.344 + 0.493i | 0.336 + 0.067i | 0.204 + 0.494i | 0.198 + 0.068i |
| 23.4 | 0.346 + 0.344i | 0.343 + 0.204i | 0.207 + 0.342i | 0.204 + 0.204i | 0.349 + 0.488i | 0.343 + 0.067i | 0.207 + 0.486i | 0.203 + 0.067i |
| 23.5 | 0.346 + 0.345i | 0.344 + 0.204i | 0.207 + 0.343i | 0.204 + 0.204i | 0.349 + 0.489i | 0.344 + 0.067i | 0.207 + 0.487i | 0.204 + 0.068i |
| 23.6 | 0.347 + 0.346i | 0.344 + 0.205i | 0.207 + 0.345i | 0.205 + 0.205i | 0.351 + 0.490i | 0.344 + 0.068i | 0.208 + 0.488i | 0.204 + 0.068i |
| 23.7 | 0.347 + 0.347i | 0.344 + 0.206i | 0.207 + 0.346i | 0.205 + 0.206i | 0.351 + 0.491i | 0.344 + 0.068i | 0.208 + 0.490i | 0.204 + 0.068i |
| 23.8 | 0.348 + 0.348i | 0.345 + 0.206i | 0.208 + 0.346i | 0.206 + 0.206i | 0.352 + 0.492i | 0.345 + 0.068i | 0.208 + 0.490i | 0.204 + 0.068i |
| 23.9 | 0.348 + 0.349i | 0.345 + 0.208i | 0.208 + 0.348i | 0.205 + 0.208i | 0.354 + 0.493i | 0.345 + 0.069i | 0.209 + 0.493i | 0.204 + 0.069i |
| 24 | 0.349 + 0.349i | 0.346 + 0.208i | 0.208 + 0.349i | 0.206 + 0.208i | 0.354 + 0.494i | 0.346 + 0.069i | 0.209 + 0.493i | 0.205 + 0.069i |
| 24.1 | 0.350 + 0.350i | 0.347 + 0.208i | 0.209 + 0.349i | 0.207 + 0.208i | 0.355 + 0.495i | 0.347 + 0.069i | 0.210 + 0.493i | 0.205 + 0.069i |
| 24.2 | 0.350 + 0.351i | 0.347 + 0.209i | 0.209 + 0.349i | 0.207 + 0.208i | 0.356 + 0.496i | 0.347 + 0.069i | 0.210 + 0.493i | 0.206 + 0.069i |
| 24.3 | 0.351 + 0.351i | 0.348 + 0.209i | 0.210 + 0.349i | 0.207 + 0.208i | 0.357 + 0.497i | 0.348 + 0.069i | 0.212 + 0.493i | 0.207 + 0.069i |
| 24.4 | 0.352 + 0.352i | 0.349 + 0.209i | 0.210 + 0.349i | 0.208 + 0.208i | 0.358 + 0.497i | 0.349 + 0.069i | 0.212 + 0.493i | 0.207 + 0.069i |
| 24.5 | 0.352 + 0.352i | 0.349 + 0.209i | 0.210 + 0.350i | 0.208 + 0.209i | 0.359 + 0.498i | 0.351 + 0.069i | 0.213 + 0.493i | 0.209 + 0.069i |
| 24.6 | 0.353 + 0.353i | 0.349 + 0.210i | 0.210 + 0.351i | 0.208 + 0.209i | 0.360 + 0.498i | 0.351 + 0.069i | 0.214 + 0.494i | 0.209 + 0.069i |
| 24.7 | 0.353 + 0.354i | 0.349 + 0.210i | 0.210 + 0.351i | 0.208 + 0.209i | 0.361 + 0.499i | 0.351 + 0.069i | 0.214 + 0.494i | 0.209 + 0.069i |
| 24.8 | 0.353 + 0.354i | 0.350 + 0.210i | 0.210 + 0.351i | 0.209 + 0.210i | 0.361 + 0.499i | 0.353 + 0.069i | 0.214 + 0.494i | 0.210 + 0.069i |
| 24.9 | 0.354 + 0.354i | 0.350 + 0.211i | 0.210 + 0.351i | 0.209 + 0.210i | 0.362 + 0.500i | 0.354 + 0.070i | 0.215 + 0.494i | 0.210 + 0.069i |
| 25 | 0.354 + 0.355i | 0.351 + 0.211i | 0.210 + 0.350i | 0.210 + 0.209i | 0.363 + 0.500i | 0.355 + 0.070i | 0.215 + 0.494i | 0.211 + 0.069i |

| | Normalized values | | | | | | | |
|---|---|---|---|---|---|---|---|---|
| SNR | a9 | a10 | a11 | a12 | a13 | a14 | a15 | a16 |
| 10 | 0.969 + 1.486i | 0.340 + 1.742i | 0.532 + 0.884i | 0.243 + 0.996i | 0.802 + 1.214i | 0.275 + 1.422i | 0.547 + 0.902i | 0.243 + 1.017i |
| 10.1 | 0.970 + 1.487i | 0.341 + 1.743i | 0.531 + 0.881i | 0.241 + 0.993i | 0.804 + 1.214i | 0.275 + 1.424i | 0.546 + 0.899i | 0.241 + 1.015i |
| 10.2 | 0.971 + 1.488i | 0.342 + 1.744i | 0.530 + 0.878i | 0.239 + 0.990i | 0.805 + 1.213i | 0.274 + 1.425i | 0.547 + 0.897i | 0.240 + 1.013i |
| 10.3 | 0.972 + 1.489i | 0.343 + 1.746i | 0.529 + 0.875i | 0.237 + 0.988i | 0.807 + 1.213i | 0.273 + 1.426i | 0.546 + 0.894i | 0.238 + 1.011i |
| 10.4 | 0.973 + 1.490i | 0.345 + 1.747i | 0.529 + 0.872i | 0.235 + 0.985i | 0.807 + 1.211i | 0.273 + 1.427i | 0.547 + 0.891i | 0.236 + 1.009i |
| 10.5 | 0.974 + 1.492i | 0.346 + 1.748i | 0.529 + 0.870i | 0.233 + 0.983i | 0.808 + 1.210i | 0.273 + 1.427i | 0.547 + 0.889i | 0.234 + 1.008i |
| 10.6 | 0.975 + 1.493i | 0.347 + 1.750i | 0.529 + 0.867i | 0.231 + 0.981i | 0.809 + 1.209i | 0.271 + 1.427i | 0.548 + 0.886i | 0.231 + 1.007i |

-continued

| | 256NUC | | | | | | | |
|---|---|---|---|---|---|---|---|---|
| 10.7 | 0.975 + 1.495i | 0.349 + 1.752i | 0.529 + 0.865i | 0.230 + 0.979i | 0.809 + 1.208i | 0.271 + 1.427i | 0.548 + 0.885i | 0.230 + 1.005i |
| 10.8 | 0.977 + 1.496i | 0.350 + 1.754i | 0.529 + 0.862i | 0.228 + 0.977i | 0.810 + 1.207i | 0.270 + 1.427i | 0.549 + 0.882i | 0.228 + 1.004i |
| 10.9 | 0.978 + 1.497i | 0.352 + 1.755i | 0.529 + 0.860i | 0.226 + 0.976i | 0.810 + 1.205i | 0.270 + 1.428i | 0.549 + 0.880i | 0.226 + 1.003i |
| 11 | 0.978 + 1.498i | 0.352 + 1.756i | 0.530 + 0.858i | 0.225 + 0.975i | 0.811 + 1.204i | 0.269 + 1.427i | 0.550 + 0.878i | 0.224 + 1.003i |
| 11.1 | 0.979 + 1.499i | 0.354 + 1.758i | 0.531 + 0.856i | 0.223 + 0.974i | 0.812 + 1.202i | 0.268 + 1.427i | 0.552 + 0.876i | 0.222 + 1.002i |
| 11.2 | 0.980 + 1.500i | 0.355 + 1.759i | 0.531 + 0.853i | 0.221 + 0.973i | 0.814 + 1.199i | 0.264 + 1.426i | 0.553 + 0.874i | 0.220 + 1.001i |
| 11.3 | 0.980 + 1.501i | 0.356 + 1.760i | 0.531 + 0.852i | 0.219 + 0.971i | 0.820 + 1.193i | 0.257 + 1.427i | 0.556 + 0.871i | 0.216 + 1.001i |
| 11.4 | 0.982 + 1.504i | 0.356 + 1.762i | 0.532 + 0.849i | 0.217 + 0.970i | 0.832 + 1.182i | 0.242 + 1.428i | 0.559 + 0.867i | 0.211 + 1.001i |
| 11.5 | 0.984 + 1.506i | 0.357 + 1.765i | 0.531 + 0.847i | 0.215 + 0.967i | 0.843 + 1.171i | 0.227 + 1.430i | 0.563 + 0.862i | 0.205 + 1.000i |
| 11.6 | 0.986 + 1.509i | 0.357 + 1.768i | 0.531 + 0.843i | 0.213 + 0.965i | 0.852 + 1.163i | 0.214 + 1.432i | 0.566 + 0.859i | 0.201 + 1.000i |
| 11.7 | 0.990 + 1.511i | 0.358 + 1.772i | 0.530 + 0.841i | 0.211 + 0.963i | 0.859 + 1.156i | 0.204 + 1.434i | 0.569 + 0.856i | 0.196 + 1.000i |
| 11.8 | 0.992 + 1.512i | 0.358 + 1.775i | 0.530 + 0.838i | 0.209 + 0.962i | 0.865 + 1.149i | 0.196 + 1.435i | 0.571 + 0.853i | 0.193 + 0.999i |
| 11.9 | 0.995 + 1.514i | 0.359 + 1.777i | 0.530 + 0.836i | 0.208 + 0.960i | 0.870 + 1.144i | 0.188 + 1.435i | 0.573 + 0.850i | 0.190 + 0.998i |
| 12 | 0.998 + 1.515i | 0.360 + 1.780i | 0.530 + 0.834i | 0.206 + 0.958i | 0.875 + 1.139i | 0.181 + 1.437i | 0.574 + 0.848i | 0.187 + 0.998i |
| 12.1 | 1.000 + 1.516i | 0.361 + 1.782i | 0.529 + 0.832i | 0.204 + 0.957i | 0.878 + 1.135i | 0.176 + 1.439i | 0.576 + 0.845i | 0.184 + 0.998i |
| 12.2 | 1.002 + 1.517i | 0.361 + 1.785i | 0.530 + 0.830i | 0.203 + 0.956i | 0.882 + 1.130i | 0.170 + 1.440i | 0.577 + 0.843i | 0.181 + 0.998i |
| 12.3 | 1.003 + 1.517i | 0.362 + 1.786i | 0.529 + 0.828i | 0.201 + 0.955i | 0.884 + 1.127i | 0.166 + 1.440i | 0.578 + 0.841i | 0.179 + 0.997i |
| 12.4 | 1.004 + 1.518i | 0.362 + 1.787i | 0.529 + 0.826i | 0.199 + 0.954i | 0.886 + 1.124i | 0.161 + 1.442i | 0.579 + 0.840i | 0.177 + 0.997i |
| 12.5 | 1.004 + 1.520i | 0.362 + 1.788i | 0.529 + 0.825i | 0.198 + 0.953i | 0.889 + 1.121i | 0.158 + 1.442i | 0.580 + 0.837i | 0.174 + 0.996i |
| 12.6 | 1.003 + 1.520i | 0.362 + 1.789i | 0.529 + 0.823i | 0.196 + 0.952i | 0.889 + 1.119i | 0.154 + 1.443i | 0.581 + 0.836i | 0.172 + 0.996i |
| 12.7 | 1.002 + 1.521i | 0.362 + 1.789i | 0.529 + 0.822i | 0.195 + 0.951i | 0.890 + 1.117i | 0.151 + 1.443i | 0.582 + 0.835i | 0.170 + 0.995i |
| 12.8 | 0.863 + 1.544i | 0.312 + 1.752i | 0.524 + 0.813i | 0.186 + 0.927i | 0.829 + 1.112i | 0.154 + 1.397i | 0.578 + 0.837i | 0.168 + 0.964i |
| 12.9 | 0.856 + 1.547i | 0.308 + 1.751i | 0.519 + 0.813i | 0.184 + 0.924i | 0.826 + 1.113i | 0.151 + 1.395i | 0.573 + 0.838i | 0.166 + 0.962i |
| 13 | 0.850 + 1.551i | 0.304 + 1.749i | 0.513 + 0.813i | 0.181 + 0.921i | 0.821 + 1.114i | 0.148 + 1.391i | 0.567 + 0.838i | 0.164 + 0.959i |
| 13.1 | 0.847 + 1.553i | 0.303 + 1.748i | 0.510 + 0.813i | 0.179 + 0.920i | 0.820 + 1.113i | 0.144 + 1.391i | 0.564 + 0.838i | 0.161 + 0.958i |
| 13.2 | 0.842 + 1.555i | 0.301 + 1.748i | 0.506 + 0.812i | 0.177 + 0.918i | 0.817 + 1.113i | 0.141 + 1.391i | 0.559 + 0.838i | 0.159 + 0.956i |
| 13.3 | 0.841 + 1.556i | 0.302 + 1.747i | 0.506 + 0.812i | 0.176 + 0.917i | 0.818 + 1.111i | 0.138 + 1.394i | 0.558 + 0.837i | 0.158 + 0.955i |
| 13.4 | 0.837 + 1.556i | 0.304 + 1.747i | 0.502 + 0.811i | 0.173 + 0.916i | 0.818 + 1.110i | 0.135 + 1.399i | 0.555 + 0.836i | 0.156 + 0.953i |
| 13.5 | 0.833 + 1.555i | 0.306 + 1.747i | 0.501 + 0.810i | 0.172 + 0.915i | 0.816 + 1.109i | 0.133 + 1.406i | 0.553 + 0.835i | 0.154 + 0.951i |
| 13.6 | 0.831 + 1.552i | 0.314 + 1.748i | 0.500 + 0.809i | 0.170 + 0.914i | 0.817 + 1.108i | 0.131 + 1.421i | 0.551 + 0.833i | 0.152 + 0.948i |
| 13.7 | 0.735 + 1.301i | 0.633 + 1.698i | 0.480 + 0.811i | 0.145 + 0.870i | 0.729 + 1.116i | 0.215 + 1.767i | 0.515 + 0.832i | 0.143 + 0.870i |
| 13.8 | 0.735 + 1.305i | 0.631 + 1.697i | 0.480 + 0.809i | 0.143 + 0.869i | 0.729 + 1.115i | 0.214 + 1.765i | 0.515 + 0.832i | 0.141 + 0.869i |
| 13.9 | 0.733 + 1.308i | 0.630 + 1.697i | 0.480 + 0.808i | 0.142 + 0.866i | 0.728 + 1.116i | 0.213 + 1.761i | 0.515 + 0.832i | 0.139 + 0.866i |
| 14 | 0.733 + 1.311i | 0.628 + 1.696i | 0.480 + 0.807i | 0.140 + 0.865i | 0.727 + 1.115i | 0.212 + 1.758i | 0.515 + 0.832i | 0.138 + 0.865i |
| 14.1 | 0.733 + 1.315i | 0.626 + 1.696i | 0.480 + 0.806i | 0.139 + 0.864i | 0.727 + 1.114i | 0.211 + 1.754i | 0.516 + 0.832i | 0.136 + 0.863i |
| 14.2 | 0.732 + 1.318i | 0.625 + 1.696i | 0.480 + 0.806i | 0.137 + 0.862i | 0.727 + 1.115i | 0.210 + 1.750i | 0.516 + 0.832i | 0.135 + 0.861i |
| 14.3 | 0.732 + 1.322i | 0.623 + 1.694i | 0.480 + 0.804i | 0.136 + 0.861i | 0.728 + 1.113i | 0.208 + 1.747i | 0.517 + 0.832i | 0.133 + 0.860i |
| 14.4 | 0.732 + 1.325i | 0.622 + 1.694i | 0.481 + 0.804i | 0.135 + 0.859i | 0.728 + 1.113i | 0.208 + 1.744i | 0.517 + 0.832i | 0.132 + 0.858i |
| 14.5 | 0.733 + 1.330i | 0.619 + 1.694i | 0.481 + 0.803i | 0.134 + 0.858i | 0.729 + 1.112i | 0.206 + 1.740i | 0.518 + 0.832i | 0.131 + 0.857i |
| 14.6 | 0.734 + 1.334i | 0.618 + 1.694i | 0.481 + 0.803i | 0.132 + 0.857i | 0.729 + 1.111i | 0.205 + 1.736i | 0.519 + 0.833i | 0.129 + 0.856i |
| 14.7 | 0.733 + 1.338i | 0.615 + 1.693i | 0.482 + 0.802i | 0.132 + 0.855i | 0.729 + 1.111i | 0.204 + 1.732i | 0.520 + 0.832i | 0.129 + 0.853i |
| 14.8 | 0.734 + 1.341i | 0.613 + 1.693i | 0.482 + 0.801i | 0.130 + 0.854i | 0.730 + 1.111i | 0.202 + 1.727i | 0.520 + 0.833i | 0.127 + 0.852i |
| 14.9 | 0.735 + 1.346i | 0.609 + 1.692i | 0.482 + 0.800i | 0.130 + 0.853i | 0.731 + 1.110i | 0.201 + 1.723i | 0.521 + 0.832i | 0.126 + 0.851i |
| 15 | 0.736 + 1.351i | 0.605 + 1.693i | 0.483 + 0.800i | 0.129 + 0.852i | 0.732 + 1.109i | 0.199 + 1.719i | 0.522 + 0.833i | 0.125 + 0.850i |
| 15.1 | 0.738 + 1.356i | 0.600 + 1.692i | 0.483 + 0.799i | 0.128 + 0.851i | 0.733 + 1.108i | 0.197 + 1.715i | 0.523 + 0.832i | 0.124 + 0.849i |
| 15.2 | 0.740 + 1.361i | 0.596 + 1.692i | 0.483 + 0.798i | 0.127 + 0.850i | 0.734 + 1.108i | 0.195 + 1.711i | 0.524 + 0.832i | 0.123 + 0.848i |
| 15.3 | 0.743 + 1.367i | 0.590 + 1.692i | 0.484 + 0.797i | 0.127 + 0.849i | 0.736 + 1.107i | 0.193 + 1.705i | 0.525 + 0.832i | 0.123 + 0.847i |
| 15.4 | 0.747 + 1.375i | 0.582 + 1.693i | 0.484 + 0.796i | 0.127 + 0.847i | 0.737 + 1.108i | 0.190 + 1.700i | 0.526 + 0.832i | 0.122 + 0.845i |
| 15.5 | 0.626 + 0.351i | 0.700 + 0.142i | 0.155 + 0.120i | 0.149 + 0.104i | 0.614 + 0.372i | 0.704 + 0.125i | 0.154 + 0.121i | 0.149 + 0.104i |
| 15.6 | 0.633 + 0.354i | 0.709 + 0.144i | 0.151 + 0.117i | 0.145 + 0.102i | 0.618 + 0.377i | 0.713 + 0.123i | 0.150 + 0.119i | 0.145 + 0.102i |
| 15.7 | 0.638 + 0.357i | 0.716 + 0.146i | 0.148 + 0.115i | 0.142 + 0.100i | 0.621 + 0.381i | 0.721 + 0.123i | 0.148 + 0.116i | 0.142 + 0.100i |
| 15.8 | 0.643 + 0.358i | 0.723 + 0.148i | 0.146 + 0.114i | 0.139 + 0.099i | 0.624 + 0.385i | 0.728 + 0.122i | 0.145 + 0.115i | 0.139 + 0.099i |
| 15.9 | 0.647 + 0.361i | 0.728 + 0.150i | 0.144 + 0.112i | 0.137 + 0.098i | 0.628 + 0.388i | 0.734 + 0.121i | 0.143 + 0.114i | 0.137 + 0.098i |
| 16 | 0.651 + 0.363i | 0.733 + 0.152i | 0.143 + 0.111i | 0.136 + 0.097i | 0.630 + 0.393i | 0.739 + 0.120i | 0.142 + 0.112i | 0.136 + 0.097i |
| 16.1 | 0.654 + 0.364i | 0.737 + 0.154i | 0.142 + 0.111i | 0.134 + 0.096i | 0.631 + 0.396i | 0.743 + 0.119i | 0.141 + 0.111i | 0.134 + 0.096i |
| 16.2 | 0.657 + 0.366i | 0.740 + 0.155i | 0.142 + 0.110i | 0.134 + 0.094i | 0.633 + 0.400i | 0.747 + 0.118i | 0.140 + 0.111i | 0.133 + 0.094i |
| 16.3 | 0.660 + 0.368i | 0.742 + 0.158i | 0.141 + 0.109i | 0.133 + 0.094i | 0.634 + 0.404i | 0.750 + 0.117i | 0.140 + 0.110i | 0.133 + 0.094i |
| 16.4 | 0.662 + 0.369i | 0.744 + 0.160i | 0.142 + 0.109i | 0.133 + 0.093i | 0.634 + 0.407i | 0.752 + 0.116i | 0.140 + 0.110i | 0.133 + 0.093i |
| 16.5 | 0.665 + 0.370i | 0.746 + 0.162i | 0.143 + 0.108i | 0.134 + 0.092i | 0.635 + 0.411i | 0.755 + 0.115i | 0.141 + 0.109i | 0.133 + 0.092i |
| 16.6 | 0.666 + 0.371i | 0.748 + 0.164i | 0.144 + 0.107i | 0.135 + 0.091i | 0.635 + 0.415i | 0.757 + 0.113i | 0.143 + 0.108i | 0.135 + 0.091i |
| 16.7 | 0.668 + 0.372i | 0.750 + 0.167i | 0.145 + 0.107i | 0.136 + 0.090i | 0.635 + 0.419i | 0.759 + 0.113i | 0.143 + 0.107i | 0.135 + 0.089i |
| 16.8 | 0.670 + 0.374i | 0.750 + 0.169i | 0.147 + 0.106i | 0.138 + 0.089i | 0.634 + 0.424i | 0.760 + 0.111i | 0.146 + 0.106i | 0.138 + 0.089i |
| 16.9 | 0.671 + 0.375i | 0.751 + 0.172i | 0.149 + 0.105i | 0.140 + 0.088i | 0.634 + 0.428i | 0.761 + 0.111i | 0.147 + 0.105i | 0.140 + 0.087i |
| 17 | 0.673 + 0.375i | 0.751 + 0.174i | 0.151 + 0.105i | 0.141 + 0.087i | 0.634 + 0.431i | 0.762 + 0.109i | 0.150 + 0.105i | 0.142 + 0.086i |
| 17.1 | 0.673 + 0.376i | 0.751 + 0.176i | 0.152 + 0.104i | 0.143 + 0.086i | 0.633 + 0.435i | 0.762 + 0.108i | 0.150 + 0.104i | 0.144 + 0.086i |
| 17.2 | 0.675 + 0.375i | 0.752 + 0.178i | 0.152 + 0.104i | 0.144 + 0.086i | 0.633 + 0.438i | 0.763 + 0.106i | 0.151 + 0.104i | 0.145 + 0.085i |
| 17.3 | 0.678 + 0.374i | 0.753 + 0.180i | 0.153 + 0.104i | 0.144 + 0.085i | 0.633 + 0.440i | 0.764 + 0.105i | 0.152 + 0.104i | 0.145 + 0.084i |
| 17.4 | 0.679 + 0.374i | 0.753 + 0.181i | 0.153 + 0.104i | 0.144 + 0.084i | 0.633 + 0.442i | 0.765 + 0.103i | 0.152 + 0.104i | 0.145 + 0.084i |
| 17.5 | 0.681 + 0.373i | 0.753 + 0.183i | 0.153 + 0.104i | 0.144 + 0.084i | 0.634 + 0.444i | 0.766 + 0.102i | 0.152 + 0.104i | 0.145 + 0.084i |
| 17.6 | 0.683 + 0.372i | 0.754 + 0.184i | 0.153 + 0.105i | 0.143 + 0.084i | 0.634 + 0.446i | 0.767 + 0.101i | 0.152 + 0.105i | 0.145 + 0.084i |
| 17.7 | 0.684 + 0.371i | 0.754 + 0.186i | 0.152 + 0.105i | 0.142 + 0.084i | 0.634 + 0.447i | 0.768 + 0.099i | 0.152 + 0.105i | 0.145 + 0.083i |
| 17.8 | 0.685 + 0.370i | 0.754 + 0.187i | 0.152 + 0.106i | 0.141 + 0.084i | 0.633 + 0.449i | 0.767 + 0.098i | 0.152 + 0.106i | 0.144 + 0.083i |
| 17.9 | 0.596 + 0.319i | 0.631 + 0.129i | 0.093 + 0.241i | 0.093 + 0.083i | 0.582 + 0.355i | 0.633 + 0.101i | 0.093 + 0.243i | 0.093 + 0.083i |
| 18 | 0.598 + 0.318i | 0.632 + 0.130i | 0.092 + 0.239i | 0.092 + 0.082i | 0.582 + 0.357i | 0.634 + 0.100i | 0.092 + 0.242i | 0.092 + 0.082i |
| 18.1 | 0.599 + 0.318i | 0.633 + 0.132i | 0.092 + 0.239i | 0.092 + 0.082i | 0.582 + 0.359i | 0.635 + 0.099i | 0.092 + 0.241i | 0.092 + 0.082i |
| 18.2 | 0.601 + 0.317i | 0.635 + 0.133i | 0.092 + 0.236i | 0.092 + 0.081i | 0.583 + 0.360i | 0.637 + 0.098i | 0.092 + 0.239i | 0.092 + 0.081i |
| 18.3 | 0.604 + 0.316i | 0.637 + 0.135i | 0.092 + 0.236i | 0.092 + 0.081i | 0.585 + 0.362i | 0.640 + 0.097i | 0.092 + 0.238i | 0.092 + 0.081i |

-continued

| 256NUC | | | | | | | | |
|---|---|---|---|---|---|---|---|---|
| 18.4 | 0.605 + 0.316i | 0.638 + 0.135i | 0.092 + 0.236i | 0.092 + 0.081i | 0.585 + 0.363i | 0.641 + 0.095i | 0.092 + 0.238i | 0.092 + 0.081i |
| 18.5 | 0.595 + 0.311i | 0.625 + 0.134i | 0.088 + 0.241i | 0.090 + 0.082i | 0.575 + 0.363i | 0.628 + 0.093i | 0.088 + 0.254i | 0.089 + 0.082i |
| 18.6 | 0.596 + 0.310i | 0.625 + 0.135i | 0.088 + 0.240i | 0.090 + 0.082i | 0.575 + 0.365i | 0.629 + 0.092i | 0.087 + 0.253i | 0.089 + 0.082i |
| 18.7 | 0.591 + 0.312i | 0.623 + 0.140i | 0.088 + 0.230i | 0.091 + 0.079i | 0.567 + 0.371i | 0.629 + 0.091i | 0.088 + 0.243i | 0.091 + 0.080i |
| 18.8 | 0.593 + 0.312i | 0.625 + 0.143i | 0.088 + 0.229i | 0.091 + 0.079i | 0.567 + 0.375i | 0.631 + 0.089i | 0.088 + 0.243i | 0.091 + 0.079i |
| 18.9 | 0.594 + 0.312i | 0.626 + 0.145i | 0.088 + 0.229i | 0.091 + 0.079i | 0.568 + 0.378i | 0.632 + 0.088i | 0.088 + 0.243i | 0.091 + 0.079i |
| 19 | 0.595 + 0.311i | 0.627 + 0.148i | 0.088 + 0.229i | 0.091 + 0.079i | 0.568 + 0.380i | 0.633 + 0.086i | 0.088 + 0.243i | 0.091 + 0.078i |
| 19.1 | 0.596 + 0.311i | 0.627 + 0.149i | 0.088 + 0.229i | 0.091 + 0.079i | 0.567 + 0.381i | 0.634 + 0.085i | 0.087 + 0.244i | 0.091 + 0.078i |
| 19.2 | 0.788 + 1.453i | 0.470 + 1.586i | 0.394 + 0.861i | 0.227 + 0.909i | 0.998 + 1.199i | 0.155 + 1.639i | 0.554 + 0.823i | 0.086 + 0.933i |
| 19.3 | 0.785 + 1.450i | 0.469 + 1.582i | 0.394 + 0.861i | 0.229 + 0.909i | 1.001 + 1.199i | 0.155 + 1.634i | 0.553 + 0.821i | 0.085 + 0.934i |
| 19.4 | 0.784 + 1.447i | 0.469 + 1.579i | 0.393 + 0.861i | 0.230 + 0.909i | 1.002 + 1.199i | 0.155 + 1.631i | 0.553 + 0.819i | 0.085 + 0.934i |
| 19.5 | 0.783 + 1.443i | 0.469 + 1.575i | 0.392 + 0.861i | 0.231 + 0.909i | 1.004 + 1.199i | 0.155 + 1.628i | 0.552 + 0.816i | 0.085 + 0.935i |
| 19.6 | 0.782 + 1.440i | 0.470 + 1.571i | 0.391 + 0.861i | 0.232 + 0.910i | 1.006 + 1.198i | 0.155 + 1.626i | 0.551 + 0.815i | 0.084 + 0.935i |
| 19.7 | 0.781 + 1.436i | 0.470 + 1.568i | 0.391 + 0.861i | 0.232 + 0.910i | 1.008 + 1.197i | 0.156 + 1.623i | 0.550 + 0.812i | 0.084 + 0.936i |
| 19.8 | 0.781 + 1.432i | 0.470 + 1.565i | 0.391 + 0.861i | 0.233 + 0.910i | 1.009 + 1.196i | 0.156 + 1.619i | 0.548 + 0.810i | 0.084 + 0.937i |
| 19.9 | 0.781 + 1.429i | 0.470 + 1.561i | 0.390 + 0.861i | 0.234 + 0.910i | 1.011 + 1.195i | 0.156 + 1.617i | 0.548 + 0.809i | 0.083 + 0.937i |
| 20 | 0.781 + 1.425i | 0.470 + 1.558i | 0.390 + 0.861i | 0.235 + 0.911i | 1.013 + 1.193i | 0.156 + 1.614i | 0.547 + 0.807i | 0.083 + 0.937i |
| 20.1 | 0.781 + 1.422i | 0.470 + 1.554i | 0.390 + 0.861i | 0.235 + 0.910i | 1.015 + 1.192i | 0.156 + 1.611i | 0.546 + 0.806i | 0.083 + 0.938i |
| 20.2 | 0.780 + 1.418i | 0.471 + 1.550i | 0.390 + 0.860i | 0.236 + 0.910i | 1.016 + 1.191i | 0.156 + 1.607i | 0.545 + 0.804i | 0.083 + 0.937i |
| 20.3 | 0.779 + 1.415i | 0.470 + 1.547i | 0.390 + 0.861i | 0.236 + 0.909i | 1.016 + 1.190i | 0.156 + 1.604i | 0.545 + 0.802i | 0.083 + 0.937i |
| 20.4 | 0.779 + 1.411i | 0.471 + 1.543i | 0.390 + 0.860i | 0.237 + 0.909i | 1.017 + 1.189i | 0.157 + 1.601i | 0.544 + 0.801i | 0.083 + 0.936i |
| 20.5 | 0.779 + 1.404i | 0.467 + 1.531i | 0.418 + 0.861i | 0.253 + 0.914i | 1.022 + 1.180i | 0.156 + 1.588i | 0.588 + 0.795i | 0.086 + 0.945i |
| 20.6 | 0.779 + 1.402i | 0.466 + 1.528i | 0.420 + 0.862i | 0.253 + 0.914i | 1.023 + 1.179i | 0.155 + 1.584i | 0.591 + 0.794i | 0.086 + 0.945i |
| 20.7 | 0.778 + 1.399i | 0.466 + 1.525i | 0.421 + 0.862i | 0.254 + 0.915i | 1.024 + 1.178i | 0.156 + 1.580i | 0.593 + 0.792i | 0.086 + 0.945i |
| 20.8 | 0.751 + 1.414i | 0.441 + 1.525i | 0.414 + 0.856i | 0.248 + 0.902i | 1.002 + 1.190i | 0.145 + 1.565i | 0.597 + 0.798i | 0.084 + 0.929i |
| 20.9 | 0.748 + 1.412i | 0.439 + 1.522i | 0.414 + 0.856i | 0.248 + 0.902i | 1.001 + 1.190i | 0.145 + 1.561i | 0.596 + 0.797i | 0.084 + 0.927i |
| 21 | 0.747 + 1.410i | 0.438 + 1.519i | 0.415 + 0.856i | 0.248 + 0.901i | 1.000 + 1.188i | 0.144 + 1.558i | 0.596 + 0.797i | 0.084 + 0.927i |
| 21.1 | 0.745 + 1.408i | 0.436 + 1.516i | 0.415 + 0.856i | 0.248 + 0.901i | 0.999 + 1.187i | 0.144 + 1.554i | 0.596 + 0.797i | 0.084 + 0.926i |
| 21.2 | 0.744 + 1.404i | 0.435 + 1.513i | 0.413 + 0.856i | 0.247 + 0.900i | 0.996 + 1.184i | 0.144 + 1.551i | 0.593 + 0.797i | 0.084 + 0.925i |
| 21.3 | 0.742 + 1.401i | 0.433 + 1.510i | 0.414 + 0.856i | 0.247 + 0.900i | 0.994 + 1.182i | 0.143 + 1.547i | 0.592 + 0.797i | 0.084 + 0.923i |
| 21.4 | 0.740 + 1.399i | 0.432 + 1.508i | 0.413 + 0.856i | 0.247 + 0.899i | 0.992 + 1.181i | 0.143 + 1.543i | 0.591 + 0.797i | 0.084 + 0.922i |
| 21.5 | 0.738 + 1.396i | 0.430 + 1.504i | 0.414 + 0.856i | 0.247 + 0.899i | 0.991 + 1.179i | 0.142 + 1.540i | 0.591 + 0.797i | 0.083 + 0.922i |
| 21.6 | 0.736 + 1.393i | 0.429 + 1.501i | 0.413 + 0.856i | 0.247 + 0.899i | 0.989 + 1.178i | 0.143 + 1.537i | 0.590 + 0.797i | 0.083 + 0.921i |
| 21.7 | 0.735 + 1.390i | 0.428 + 1.499i | 0.413 + 0.857i | 0.247 + 0.899i | 0.988 + 1.176i | 0.142 + 1.533i | 0.589 + 0.797i | 0.083 + 0.921i |
| 21.8 | 0.733 + 1.388i | 0.427 + 1.496i | 0.413 + 0.857i | 0.246 + 0.899i | 0.986 + 1.174i | 0.142 + 1.531i | 0.589 + 0.797i | 0.083 + 0.920i |
| 21.9 | 0.731 + 1.384i | 0.426 + 1.493i | 0.413 + 0.858i | 0.247 + 0.899i | 0.984 + 1.174i | 0.142 + 1.528i | 0.590 + 0.796i | 0.083 + 0.921i |
| 22 | 0.729 + 1.382i | 0.425 + 1.490i | 0.414 + 0.858i | 0.247 + 0.899i | 0.982 + 1.172i | 0.142 + 1.524i | 0.590 + 0.796i | 0.083 + 0.920i |
| 22.1 | 0.728 + 1.379i | 0.424 + 1.488i | 0.414 + 0.858i | 0.247 + 0.899i | 0.980 + 1.171i | 0.142 + 1.522i | 0.590 + 0.796i | 0.083 + 0.920i |
| 22.2 | 0.726 + 1.376i | 0.423 + 1.484i | 0.414 + 0.858i | 0.247 + 0.898i | 0.978 + 1.171i | 0.141 + 1.517i | 0.590 + 0.796i | 0.083 + 0.918i |
| 22.3 | 0.723 + 1.373i | 0.422 + 1.481i | 0.414 + 0.859i | 0.247 + 0.898i | 0.974 + 1.171i | 0.141 + 1.515i | 0.590 + 0.795i | 0.083 + 0.919i |
| 22.4 | 0.718 + 1.370i | 0.419 + 1.477i | 0.410 + 0.859i | 0.245 + 0.896i | 0.962 + 1.178i | 0.140 + 1.510i | 0.583 + 0.800i | 0.082 + 0.915i |
| 22.5 | 0.716 + 1.367i | 0.419 + 1.475i | 0.411 + 0.859i | 0.245 + 0.896i | 0.959 + 1.179i | 0.140 + 1.507i | 0.582 + 0.801i | 0.082 + 0.916i |
| 22.6 | 0.473 + 0.337i | 0.470 + 0.198i | 0.065 + 0.344i | 0.065 + 0.206i | 0.478 + 0.484i | 0.468 + 0.065i | 0.066 + 0.489i | 0.063 + 0.069i |
| 22.7 | 0.474 + 0.338i | 0.471 + 0.199i | 0.065 + 0.345i | 0.064 + 0.206i | 0.479 + 0.485i | 0.469 + 0.065i | 0.066 + 0.490i | 0.063 + 0.069i |
| 22.8 | 0.474 + 0.339i | 0.472 + 0.199i | 0.065 + 0.346i | 0.065 + 0.207i | 0.480 + 0.487i | 0.470 + 0.065i | 0.066 + 0.490i | 0.064 + 0.069i |
| 22.9 | 0.476 + 0.341i | 0.474 + 0.200i | 0.066 + 0.346i | 0.065 + 0.207i | 0.481 + 0.489i | 0.473 + 0.066i | 0.066 + 0.492i | 0.064 + 0.069i |
| 23 | 0.477 + 0.341i | 0.476 + 0.200i | 0.066 + 0.347i | 0.065 + 0.207i | 0.483 + 0.490i | 0.474 + 0.066i | 0.067 + 0.492i | 0.064 + 0.069i |
| 23.1 | 0.478 + 0.342i | 0.477 + 0.201i | 0.067 + 0.347i | 0.066 + 0.208i | 0.484 + 0.491i | 0.476 + 0.066i | 0.067 + 0.492i | 0.065 + 0.069i |
| 23.2 | 0.479 + 0.344i | 0.478 + 0.202i | 0.067 + 0.347i | 0.066 + 0.208i | 0.485 + 0.492i | 0.477 + 0.066i | 0.067 + 0.492i | 0.065 + 0.069i |
| 23.3 | 0.479 + 0.344i | 0.479 + 0.203i | 0.067 + 0.347i | 0.066 + 0.207i | 0.486 + 0.493i | 0.479 + 0.067i | 0.067 + 0.492i | 0.066 + 0.069i |
| 23.4 | 0.489 + 0.347i | 0.487 + 0.206i | 0.069 + 0.342i | 0.067 + 0.204i | 0.495 + 0.493i | 0.487 + 0.069i | 0.068 + 0.484i | 0.067 + 0.068i |
| 23.5 | 0.489 + 0.348i | 0.488 + 0.207i | 0.069 + 0.343i | 0.067 + 0.204i | 0.496 + 0.494i | 0.488 + 0.069i | 0.068 + 0.486i | 0.068 + 0.068i |
| 23.6 | 0.490 + 0.349i | 0.488 + 0.207i | 0.069 + 0.344i | 0.067 + 0.205i | 0.497 + 0.496i | 0.488 + 0.069i | 0.068 + 0.487i | 0.068 + 0.068i |
| 23.7 | 0.491 + 0.350i | 0.489 + 0.208i | 0.069 + 0.345i | 0.067 + 0.206i | 0.498 + 0.497i | 0.489 + 0.069i | 0.068 + 0.489i | 0.068 + 0.069i |
| 23.8 | 0.492 + 0.350i | 0.490 + 0.208i | 0.069 + 0.346i | 0.067 + 0.206i | 0.499 + 0.498i | 0.490 + 0.069i | 0.068 + 0.490i | 0.068 + 0.069i |
| 23.9 | 0.492 + 0.352i | 0.490 + 0.209i | 0.069 + 0.348i | 0.067 + 0.208i | 0.501 + 0.499i | 0.490 + 0.070i | 0.069 + 0.493i | 0.068 + 0.069i |
| 24 | 0.493 + 0.352i | 0.490 + 0.209i | 0.069 + 0.349i | 0.067 + 0.208i | 0.502 + 0.500i | 0.491 + 0.070i | 0.069 + 0.493i | 0.068 + 0.069i |
| 24.1 | 0.493 + 0.353i | 0.490 + 0.210i | 0.070 + 0.349i | 0.068 + 0.208i | 0.503 + 0.501i | 0.492 + 0.070i | 0.069 + 0.494i | 0.068 + 0.070i |
| 24.2 | 0.493 + 0.354i | 0.490 + 0.210i | 0.070 + 0.349i | 0.068 + 0.208i | 0.504 + 0.502i | 0.492 + 0.070i | 0.069 + 0.494i | 0.069 + 0.069i |
| 24.3 | 0.495 + 0.356i | 0.491 + 0.212i | 0.070 + 0.350i | 0.068 + 0.209i | 0.505 + 0.505i | 0.494 + 0.070i | 0.070 + 0.494i | 0.069 + 0.070i |
| 24.4 | 0.495 + 0.357i | 0.492 + 0.212i | 0.070 + 0.350i | 0.068 + 0.209i | 0.506 + 0.506i | 0.495 + 0.070i | 0.070 + 0.495i | 0.069 + 0.070i |
| 24.5 | 0.496 + 0.358i | 0.492 + 0.213i | 0.070 + 0.351i | 0.068 + 0.209i | 0.507 + 0.508i | 0.496 + 0.070i | 0.070 + 0.496i | 0.070 + 0.070i |
| 24.6 | 0.497 + 0.359i | 0.492 + 0.213i | 0.070 + 0.352i | 0.068 + 0.210i | 0.509 + 0.509i | 0.497 + 0.071i | 0.071 + 0.497i | 0.070 + 0.070i |
| 24.7 | 0.497 + 0.359i | 0.492 + 0.213i | 0.070 + 0.353i | 0.068 + 0.210i | 0.509 + 0.509i | 0.498 + 0.071i | 0.071 + 0.498i | 0.070 + 0.070i |
| 24.8 | 0.498 + 0.360i | 0.493 + 0.214i | 0.070 + 0.353i | 0.069 + 0.210i | 0.510 + 0.510i | 0.499 + 0.071i | 0.071 + 0.498i | 0.070 + 0.070i |
| 24.9 | 0.498 + 0.360i | 0.493 + 0.214i | 0.070 + 0.354i | 0.069 + 0.210i | 0.511 + 0.511i | 0.501 + 0.071i | 0.071 + 0.500i | 0.070 + 0.070i |
| 25 | 0.499 + 0.360i | 0.494 + 0.214i | 0.070 + 0.355i | 0.069 + 0.211i | 0.512 + 0.511i | 0.502 + 0.071i | 0.071 + 0.501i | 0.071 + 0.070i |
| SNR | a17 | a18 | a19 | a20 | a21 | a22 | a23 | a24 |
| 10 | 1.215 + 0.820i | 1.435 + 0.288i | 0.903 + 0.548i | 1.025 + 0.244i | 1.151 + 0.775i | 1.360 + 0.272i | 0.917 + 0.564i | 1.047 + 0.245i |
| 10.1 | 1.214 + 0.820i | 1.435 + 0.287i | 0.899 + 0.548i | 1.023 + 0.242i | 1.151 + 0.776i | 1.362 + 0.270i | 0.914 + 0.565i | 1.046 + 0.243i |
| 10.2 | 1.214 + 0.820i | 1.434 + 0.287i | 0.896 + 0.548i | 1.020 + 0.241i | 1.151 + 0.778i | 1.363 + 0.269i | 0.912 + 0.566i | 1.044 + 0.242i |
| 10.3 | 1.213 + 0.819i | 1.434 + 0.287i | 0.894 + 0.549i | 1.018 + 0.239i | 1.150 + 0.779i | 1.364 + 0.268i | 0.910 + 0.566i | 1.043 + 0.240i |
| 10.4 | 1.212 + 0.819i | 1.434 + 0.287i | 0.891 + 0.549i | 1.017 + 0.237i | 1.149 + 0.780i | 1.365 + 0.268i | 0.908 + 0.568i | 1.042 + 0.238i |
| 10.5 | 1.211 + 0.819i | 1.433 + 0.287i | 0.889 + 0.550i | 1.015 + 0.235i | 1.149 + 0.781i | 1.365 + 0.267i | 0.906 + 0.569i | 1.041 + 0.236i |
| 10.6 | 1.210 + 0.818i | 1.432 + 0.287i | 0.886 + 0.550i | 1.014 + 0.234i | 1.149 + 0.781i | 1.366 + 0.266i | 0.905 + 0.570i | 1.041 + 0.235i |

-continued

256NUC

| | | | | | | | | |
|---|---|---|---|---|---|---|---|---|
| 10.7 | 1.209 + 0.817i | 1.431 + 0.287i | 0.884 + 0.551i | 1.013 + 0.232i | 1.148 + 0.782i | 1.366 + 0.266i | 0.903 + 0.571i | 1.040 + 0.233i |
| 10.8 | 1.208 + 0.816i | 1.431 + 0.288i | 0.882 + 0.552i | 1.012 + 0.230i | 1.148 + 0.783i | 1.367 + 0.266i | 0.901 + 0.572i | 1.040 + 0.231i |
| 10.9 | 1.207 + 0.815i | 1.431 + 0.288i | 0.880 + 0.552i | 1.010 + 0.228i | 1.147 + 0.783i | 1.367 + 0.266i | 0.899 + 0.573i | 1.039 + 0.230i |
| 11 | 1.207 + 0.814i | 1.429 + 0.290i | 0.878 + 0.553i | 1.010 + 0.227i | 1.147 + 0.784i | 1.367 + 0.266i | 0.898 + 0.574i | 1.038 + 0.228i |
| 11.1 | 1.207 + 0.812i | 1.428 + 0.291i | 0.876 + 0.553i | 1.009 + 0.225i | 1.147 + 0.784i | 1.368 + 0.266i | 0.896 + 0.575i | 1.038 + 0.226i |
| 11.2 | 1.208 + 0.809i | 1.428 + 0.295i | 0.874 + 0.553i | 1.008 + 0.224i | 1.147 + 0.784i | 1.368 + 0.266i | 0.895 + 0.576i | 1.038 + 0.225i |
| 11.3 | 1.214 + 0.803i | 1.427 + 0.304i | 0.873 + 0.553i | 1.006 + 0.224i | 1.146 + 0.784i | 1.368 + 0.266i | 0.893 + 0.577i | 1.038 + 0.223i |
| 11.4 | 1.225 + 0.791i | 1.426 + 0.321i | 0.873 + 0.550i | 1.005 + 0.226i | 1.145 + 0.784i | 1.368 + 0.266i | 0.892 + 0.578i | 1.037 + 0.222i |
| 11.5 | 1.237 + 0.779i | 1.426 + 0.338i | 0.873 + 0.547i | 1.002 + 0.229i | 1.144 + 0.785i | 1.367 + 0.265i | 0.890 + 0.578i | 1.037 + 0.221i |
| 11.6 | 1.246 + 0.769i | 1.425 + 0.352i | 0.872 + 0.544i | 1.000 + 0.229i | 1.143 + 0.785i | 1.367 + 0.264i | 0.889 + 0.578i | 1.036 + 0.219i |
| 11.7 | 1.254 + 0.761i | 1.425 + 0.363i | 0.872 + 0.542i | 0.998 + 0.230i | 1.142 + 0.784i | 1.366 + 0.263i | 0.887 + 0.578i | 1.035 + 0.219i |
| 11.8 | 1.261 + 0.754i | 1.425 + 0.373i | 0.871 + 0.540i | 0.997 + 0.231i | 1.141 + 0.784i | 1.365 + 0.262i | 0.886 + 0.578i | 1.035 + 0.217i |
| 11.9 | 1.267 + 0.747i | 1.425 + 0.383i | 0.870 + 0.538i | 0.995 + 0.231i | 1.140 + 0.783i | 1.364 + 0.262i | 0.885 + 0.578i | 1.034 + 0.216i |
| 12 | 1.272 + 0.742i | 1.425 + 0.391i | 0.869 + 0.537i | 0.993 + 0.231i | 1.139 + 0.782i | 1.363 + 0.262i | 0.883 + 0.578i | 1.034 + 0.215i |
| 12.1 | 1.277 + 0.737i | 1.425 + 0.399i | 0.869 + 0.535i | 0.992 + 0.231i | 1.138 + 0.782i | 1.362 + 0.262i | 0.882 + 0.577i | 1.033 + 0.214i |
| 12.2 | 1.281 + 0.732i | 1.425 + 0.406i | 0.868 + 0.534i | 0.991 + 0.231i | 1.138 + 0.781i | 1.362 + 0.262i | 0.881 + 0.577i | 1.033 + 0.214i |
| 12.3 | 1.286 + 0.729i | 1.426 + 0.413i | 0.867 + 0.533i | 0.990 + 0.231i | 1.137 + 0.781i | 1.361 + 0.262i | 0.880 + 0.577i | 1.033 + 0.213i |
| 12.4 | 1.289 + 0.725i | 1.426 + 0.420i | 0.866 + 0.533i | 0.990 + 0.232i | 1.136 + 0.781i | 1.360 + 0.263i | 0.879 + 0.578i | 1.033 + 0.213i |
| 12.5 | 1.294 + 0.722i | 1.428 + 0.425i | 0.866 + 0.532i | 0.989 + 0.231i | 1.137 + 0.780i | 1.359 + 0.263i | 0.879 + 0.577i | 1.034 + 0.213i |
| 12.6 | 1.299 + 0.721i | 1.430 + 0.432i | 0.865 + 0.531i | 0.988 + 0.281i | 1.136 + 0.780i | 1.358 + 0.265i | 0.878 + 0.578i | 1.034 + 0.212i |
| 12.7 | 1.304 + 0.720i | 1.432 + 0.439i | 0.865 + 0.531i | 0.988 + 0.232i | 1.136 + 0.780i | 1.358 + 0.266i | 0.878 + 0.578i | 1.035 + 0.213i |
| 12.8 | 1.525 + 0.847i | 1.492 + 0.474i | 0.843 + 0.539i | 0.990 + 0.243i | 1.174 + 0.800i | 1.353 + 0.353i | 0.891 + 0.593i | 1.052 + 0.250i |
| 12.9 | 1.527 + 0.854i | 1.488 + 0.482i | 0.840 + 0.544i | 0.993 + 0.248i | 1.171 + 0.804i | 1.352 + 0.366i | 0.889 + 0.598i | 1.054 + 0.256i |
| 13 | 1.528 + 0.863i | 1.483 + 0.491i | 0.837 + 0.550i | 0.997 + 0.254i | 1.167 + 0.807i | 1.350 + 0.382i | 0.885 + 0.603i | 1.057 + 0.264i |
| 13.1 | 1.529 + 0.869i | 1.481 + 0.498i | 0.835 + 0.551i | 0.999 + 0.258i | 1.165 + 0.808i | 1.349 + 0.394i | 0.884 + 0.605i | 1.059 + 0.269i |
| 13.2 | 1.529 + 0.877i | 1.478 + 0.506i | 0.832 + 0.555i | 1.002 + 0.264i | 1.161 + 0.811i | 1.347 + 0.407i | 0.881 + 0.608i | 1.061 + 0.277i |
| 13.3 | 1.532 + 0.881i | 1.478 + 0.509i | 0.830 + 0.556i | 1.002 + 0.266i | 1.161 + 0.810i | 1.345 + 0.415i | 0.881 + 0.608i | 1.062 + 0.281i |
| 13.4 | 1.532 + 0.886i | 1.477 + 0.514i | 0.828 + 0.558i | 1.004 + 0.271i | 1.159 + 0.811i | 1.343 + 0.424i | 0.879 + 0.610i | 1.064 + 0.289i |
| 13.5 | 1.533 + 0.893i | 1.478 + 0.520i | 0.826 + 0.560i | 1.006 + 0.276i | 1.158 + 0.812i | 1.341 + 0.435i | 0.878 + 0.611i | 1.066 + 0.296i |
| 13.6 | 1.533 + 0.898i | 1.480 + 0.524i | 0.825 + 0.560i | 1.006 + 0.279i | 1.157 + 0.811i | 1.338 + 0.442i | 0.877 + 0.611i | 1.067 + 0.302i |
| 13.7 | 1.459 + 1.021i | 1.628 + 0.627i | 0.817 + 0.576i | 1.009 + 0.293i | 1.160 + 0.818i | 1.348 + 0.506i | 0.882 + 0.621i | 1.086 + 0.345i |
| 13.8 | 1.458 + 1.024i | 1.629 + 0.630i | 0.817 + 0.577i | 1.010 + 0.298i | 1.160 + 0.818i | 1.346 + 0.511i | 0.883 + 0.622i | 1.087 + 0.351i |
| 13.9 | 1.456 + 1.029i | 1.631 + 0.634i | 0.817 + 0.577i | 1.011 + 0.303i | 1.160 + 0.820i | 1.344 + 0.516i | 0.883 + 0.623i | 1.089 + 0.357i |
| 14 | 1.454 + 1.032i | 1.631 + 0.637i | 0.818 + 0.577i | 1.011 + 0.308i | 1.160 + 0.821i | 1.343 + 0.519i | 0.884 + 0.623i | 1.090 + 0.363i |
| 14.1 | 1.452 + 1.034i | 1.632 + 0.640i | 0.819 + 0.577i | 1.012 + 0.312i | 1.159 + 0.821i | 1.342 + 0.522i | 0.885 + 0.623i | 1.091 + 0.367i |
| 14.2 | 1.451 + 1.035i | 1.634 + 0.641i | 0.820 + 0.577i | 1.012 + 0.317i | 1.160 + 0.821i | 1.341 + 0.524i | 0.887 + 0.624i | 1.092 + 0.372i |
| 14.3 | 1.449 + 1.036i | 1.635 + 0.643i | 0.821 + 0.576i | 1.012 + 0.320i | 1.160 + 0.821i | 1.340 + 0.526i | 0.889 + 0.624i | 1.092 + 0.376i |
| 14.4 | 1.447 + 1.038i | 1.635 + 0.645i | 0.823 + 0.576i | 1.012 + 0.324i | 1.160 + 0.822i | 1.339 + 0.528i | 0.890 + 0.624i | 1.093 + 0.380i |
| 14.5 | 1.446 + 1.039i | 1.637 + 0.646i | 0.824 + 0.576i | 1.012 + 0.327i | 1.160 + 0.822i | 1.338 + 0.529i | 0.892 + 0.625i | 1.093 + 0.384i |
| 14.6 | 1.444 + 1.039i | 1.637 + 0.647i | 0.825 + 0.575i | 1.012 + 0.331i | 1.160 + 0.822i | 1.337 + 0.531i | 0.895 + 0.625i | 1.093 + 0.388i |
| 14.7 | 1.441 + 1.040i | 1.637 + 0.649i | 0.828 + 0.575i | 1.012 + 0.334i | 1.160 + 0.822i | 1.337 + 0.532i | 0.897 + 0.625i | 1.094 + 0.390i |
| 14.8 | 1.440 + 1.040i | 1.638 + 0.650i | 0.829 + 0.574i | 1.011 + 0.336i | 1.160 + 0.822i | 1.336 + 0.532i | 0.900 + 0.625i | 1.094 + 0.393i |
| 14.9 | 1.438 + 1.039i | 1.638 + 0.650i | 0.832 + 0.573i | 1.011 + 0.339i | 1.161 + 0.821i | 1.336 + 0.533i | 0.903 + 0.624i | 1.094 + 0.395i |
| 15 | 1.436 + 1.038i | 1.639 + 0.651i | 0.833 + 0.572i | 1.011 + 0.341i | 1.161 + 0.821i | 1.336 + 0.533i | 0.905 + 0.624i | 1.094 + 0.397i |
| 15.1 | 1.435 + 1.037i | 1.638 + 0.651i | 0.836 + 0.571i | 1.010 + 0.343i | 1.161 + 0.820i | 1.336 + 0.533i | 0.908 + 0.624i | 1.095 + 0.400i |
| 15.2 | 1.433 + 1.035i | 1.639 + 0.651i | 0.838 + 0.570i | 1.010 + 0.345i | 1.161 + 0.818i | 1.336 + 0.531i | 0.912 + 0.624i | 1.094 + 0.400i |
| 15.3 | 1.432 + 1.032i | 1.638 + 0.650i | 0.840 + 0.569i | 1.009 + 0.346i | 1.161 + 0.817i | 1.336 + 0.530i | 0.916 + 0.624i | 1.094 + 0.402i |
| 15.4 | 1.431 + 1.029i | 1.638 + 0.649i | 0.843 + 0.568i | 1.008 + 0.348i | 1.162 + 0.816i | 1.335 + 0.529i | 0.919 + 0.623i | 1.094 + 0.403i |
| 15.5 | 0.386 + 0.558i | 0.177 + 0.685i | 0.215 + 0.383i | 0.134 + 0.431i | 0.402 + 0.536i | 0.140 + 0.698i | 0.217 + 0.380i | 0.131 + 0.430i |
| 15.6 | 0.385 + 0.554i | 0.177 + 0.680i | 0.220 + 0.382i | 0.136 + 0.431i | 0.402 + 0.532i | 0.139 + 0.693i | 0.222 + 0.378i | 0.131 + 0.430i |
| 15.7 | 0.384 + 0.550i | 0.176 + 0.675i | 0.223 + 0.379i | 0.136 + 0.431i | 0.402 + 0.528i | 0.138 + 0.687i | 0.226 + 0.376i | 0.132 + 0.430i |
| 15.8 | 0.384 + 0.546i | 0.176 + 0.671i | 0.227 + 0.378i | 0.137 + 0.431i | 0.402 + 0.524i | 0.137 + 0.683i | 0.230 + 0.375i | 0.132 + 0.431i |
| 15.9 | 0.383 + 0.543i | 0.176 + 0.666i | 0.231 + 0.377i | 0.138 + 0.432i | 0.402 + 0.521i | 0.136 + 0.679i | 0.234 + 0.373i | 0.132 + 0.432i |
| 16 | 0.382 + 0.540i | 0.176 + 0.662i | 0.234 + 0.376i | 0.138 + 0.433i | 0.403 + 0.518i | 0.135 + 0.675i | 0.236 + 0.372i | 0.132 + 0.434i |
| 16.1 | 0.381 + 0.537i | 0.175 + 0.659i | 0.236 + 0.376i | 0.138 + 0.434i | 0.402 + 0.515i | 0.133 + 0.672i | 0.240 + 0.371i | 0.131 + 0.435i |
| 16.2 | 0.380 + 0.535i | 0.175 + 0.655i | 0.239 + 0.375i | 0.138 + 0.436i | 0.402 + 0.512i | 0.132 + 0.668i | 0.243 + 0.371i | 0.131 + 0.438i |
| 16.3 | 0.378 + 0.533i | 0.175 + 0.652i | 0.241 + 0.375i | 0.138 + 0.438i | 0.401 + 0.509i | 0.130 + 0.665i | 0.245 + 0.370i | 0.129 + 0.440i |
| 16.4 | 0.377 + 0.531i | 0.174 + 0.649i | 0.243 + 0.376i | 0.137 + 0.441i | 0.400 + 0.507i | 0.128 + 0.662i | 0.247 + 0.371i | 0.128 + 0.443i |
| 16.5 | 0.375 + 0.528i | 0.173 + 0.645i | 0.245 + 0.376i | 0.136 + 0.443i | 0.399 + 0.505i | 0.126 + 0.658i | 0.250 + 0.370i | 0.126 + 0.445i |
| 16.6 | 0.372 + 0.527i | 0.171 + 0.641i | 0.247 + 0.377i | 0.135 + 0.445i | 0.397 + 0.503i | 0.124 + 0.654i | 0.251 + 0.372i | 0.124 + 0.448i |
| 16.7 | 0.369 + 0.525i | 0.170 + 0.638i | 0.248 + 0.378i | 0.133 + 0.448i | 0.396 + 0.501i | 0.122 + 0.650i | 0.253 + 0.372i | 0.121 + 0.451i |
| 16.8 | 0.366 + 0.524i | 0.167 + 0.634i | 0.249 + 0.380i | 0.130 + 0.450i | 0.393 + 0.500i | 0.120 + 0.646i | 0.254 + 0.374i | 0.118 + 0.454i |
| 16.9 | 0.363 + 0.523i | 0.166 + 0.631i | 0.250 + 0.381i | 0.128 + 0.452i | 0.391 + 0.498i | 0.118 + 0.643i | 0.255 + 0.374i | 0.116 + 0.456i |
| 17 | 0.360 + 0.522i | 0.165 + 0.629i | 0.251 + 0.382i | 0.127 + 0.455i | 0.390 + 0.497i | 0.116 + 0.641i | 0.257 + 0.375i | 0.113 + 0.459i |
| 17.1 | 0.358 + 0.523i | 0.164 + 0.627i | 0.251 + 0.384i | 0.125 + 0.458i | 0.388 + 0.497i | 0.113 + 0.640i | 0.257 + 0.376i | 0.111 + 0.461i |
| 17.2 | 0.356 + 0.523i | 0.164 + 0.627i | 0.252 + 0.386i | 0.124 + 0.460i | 0.388 + 0.496i | 0.111 + 0.639i | 0.259 + 0.378i | 0.109 + 0.464i |
| 17.3 | 0.355 + 0.522i | 0.164 + 0.625i | 0.252 + 0.386i | 0.123 + 0.462i | 0.389 + 0.495i | 0.110 + 0.639i | 0.260 + 0.378i | 0.108 + 0.466i |
| 17.4 | 0.354 + 0.523i | 0.164 + 0.624i | 0.253 + 0.387i | 0.123 + 0.464i | 0.389 + 0.494i | 0.108 + 0.638i | 0.262 + 0.378i | 0.106 + 0.468i |
| 17.5 | 0.353 + 0.523i | 0.165 + 0.624i | 0.254 + 0.388i | 0.122 + 0.466i | 0.390 + 0.493i | 0.107 + 0.639i | 0.263 + 0.378i | 0.105 + 0.471i |
| 17.6 | 0.352 + 0.523i | 0.167 + 0.624i | 0.255 + 0.388i | 0.122 + 0.469i | 0.391 + 0.492i | 0.106 + 0.639i | 0.264 + 0.379i | 0.103 + 0.473i |
| 17.7 | 0.352 + 0.524i | 0.168 + 0.624i | 0.256 + 0.390i | 0.122 + 0.471i | 0.392 + 0.491i | 0.104 + 0.640i | 0.265 + 0.379i | 0.102 + 0.475i |
| 17.8 | 0.351 + 0.524i | 0.170 + 0.626i | 0.257 + 0.391i | 0.122 + 0.474i | 0.393 + 0.490i | 0.103 + 0.642i | 0.266 + 0.380i | 0.101 + 0.480i |
| 17.9 | 0.369 + 0.509i | 0.292 + 0.877i | 0.205 + 0.468i | 0.152 + 0.672i | 0.383 + 0.475i | 0.131 + 1.023i | 0.200 + 0.453i | 0.102 + 0.678i |
| 18 | 0.366 + 0.503i | 0.293 + 0.900i | 0.204 + 0.468i | 0.151 + 0.671i | 0.382 + 0.471i | 0.133 + 1.030i | 0.200 + 0.453i | 0.101 + 0.677i |
| 18.1 | 0.365 + 0.501i | 0.294 + 0.918i | 0.204 + 0.468i | 0.152 + 0.668i | 0.381 + 0.469i | 0.134 + 1.036i | 0.199 + 0.453i | 0.100 + 0.674i |
| 18.2 | 0.364 + 0.498i | 0.296 + 0.936i | 0.204 + 0.468i | 0.152 + 0.663i | 0.380 + 0.468i | 0.135 + 1.042i | 0.199 + 0.452i | 0.100 + 0.670i |
| 18.3 | 0.363 + 0.497i | 0.297 + 0.950i | 0.204 + 0.467i | 0.152 + 0.659i | 0.380 + 0.466i | 0.135 + 1.046i | 0.199 + 0.452i | 0.099 + 0.666i |

-continued

| | | | | | | | | |
|---|---|---|---|---|---|---|---|---|
| 256NUC | | | | | | | | |
| 18.4 | 0.363 + 0.497i | 0.298 + 0.956i | 0.206 + 0.468i | 0.153 + 0.657i | 0.381 + 0.465i | 0.135 + 1.048i | 0.201 + 0.451i | 0.098 + 0.664i |
| 18.5 | 0.355 + 0.546i | 0.300 + 0.741i | 0.198 + 0.492i | 0.141 + 0.683i | 0.380 + 0.476i | 0.146 + 1.059i | 0.214 + 0.438i | 0.079 + 0.837i |
| 18.6 | 0.352 + 0.549i | 0.296 + 0.736i | 0.197 + 0.493i | 0.139 + 0.683i | 0.379 + 0.475i | 0.147 + 1.065i | 0.215 + 0.436i | 0.078 + 0.849i |
| 18.7 | 0.335 + 0.547i | 0.270 + 0.713i | 0.179 + 0.492i | 0.118 + 0.672i | 0.367 + 0.472i | 0.203 + 1.081i | 0.205 + 0.428i | 0.080 + 1.034i |
| 18.8 | 0.333 + 0.549i | 0.267 + 0.710i | 0.179 + 0.492i | 0.118 + 0.669i | 0.367 + 0.473i | 0.205 + 1.085i | 0.206 + 0.427i | 0.080 + 1.047i |
| 18.9 | 0.332 + 0.550i | 0.267 + 0.707i | 0.180 + 0.492i | 0.118 + 0.667i | 0.367 + 0.473i | 0.208 + 1.087i | 0.208 + 0.427i | 0.079 + 1.051i |
| 19 | 0.332 + 0.552i | 0.265 + 0.706i | 0.180 + 0.492i | 0.118 + 0.666i | 0.367 + 0.473i | 0.212 + 1.090i | 0.209 + 0.427i | 0.077 + 1.055i |
| 19.1 | 0.331 + 0.554i | 0.265 + 0.705i | 0.180 + 0.494i | 0.119 + 0.666i | 0.367 + 0.473i | 0.215 + 1.092i | 0.210 + 0.427i | 0.076 + 1.059i |
| 19.2 | 1.434 + 0.733i | 1.534 + 0.451i | 0.844 + 0.499i | 0.905 + 0.321i | 1.167 + 0.655i | 1.267 + 0.393i | 0.992 + 0.563i | 1.062 + 0.349i |
| 19.3 | 1.435 + 0.732i | 1.535 + 0.450i | 0.846 + 0.497i | 0.906 + 0.319i | 1.168 + 0.654i | 1.269 + 0.393i | 0.994 + 0.561i | 1.065 + 0.348i |
| 19.4 | 1.435 + 0.730i | 1.535 + 0.449i | 0.849 + 0.495i | 0.908 + 0.317i | 1.169 + 0.653i | 1.271 + 0.393i | 0.997 + 0.561i | 1.069 + 0.347i |
| 19.5 | 1.436 + 0.728i | 1.534 + 0.448i | 0.851 + 0.494i | 0.909 + 0.315i | 1.171 + 0.653i | 1.272 + 0.393i | 0.999 + 0.560i | 1.071 + 0.346i |
| 19.6 | 1.436 + 0.727i | 1.534 + 0.446i | 0.852 + 0.493i | 0.910 + 0.314i | 1.173 + 0.652i | 1.273 + 0.393i | 1.001 + 0.560i | 1.073 + 0.345i |
| 19.7 | 1.436 + 0.725i | 1.534 + 0.445i | 0.854 + 0.492i | 0.911 + 0.312i | 1.174 + 0.652i | 1.275 + 0.392i | 1.002 + 0.559i | 1.076 + 0.344i |
| 19.8 | 1.437 + 0.723i | 1.534 + 0.443i | 0.855 + 0.491i | 0.912 + 0.312i | 1.175 + 0.652i | 1.276 + 0.392i | 1.003 + 0.559i | 1.078 + 0.344i |
| 19.9 | 1.438 + 0.720i | 1.533 + 0.441i | 0.856 + 0.490i | 0.913 + 0.311i | 1.176 + 0.651i | 1.276 + 0.392i | 1.005 + 0.559i | 1.080 + 0.343i |
| 20 | 1.438 + 0.718i | 1.534 + 0.440i | 0.858 + 0.489i | 0.914 + 0.310i | 1.177 + 0.652i | 1.278 + 0.393i | 1.006 + 0.558i | 1.082 + 0.343i |
| 20.1 | 1.439 + 0.716i | 1.533 + 0.438i | 0.859 + 0.489i | 0.915 + 0.309i | 1.179 + 0.652i | 1.279 + 0.392i | 1.008 + 0.558i | 1.084 + 0.343i |
| 20.2 | 1.439 + 0.714i | 1.533 + 0.436i | 0.861 + 0.488i | 0.916 + 0.309i | 1.180 + 0.652i | 1.280 + 0.392i | 1.010 + 0.558i | 1.087 + 0.342i |
| 20.3 | 1.440 + 0.712i | 1.533 + 0.434i | 0.863 + 0.488i | 0.918 + 0.309i | 1.182 + 0.653i | 1.281 + 0.392i | 1.012 + 0.559i | 1.088 + 0.342i |
| 20.4 | 1.440 + 0.710i | 1.533 + 0.432i | 0.865 + 0.488i | 0.919 + 0.309i | 1.182 + 0.654i | 1.282 + 0.393i | 1.013 + 0.559i | 1.090 + 0.342i |
| 20.5 | 1.429 + 0.699i | 1.530 + 0.429i | 0.882 + 0.466i | 0.922 + 0.286i | 1.175 + 0.647i | 1.284 + 0.385i | 1.026 + 0.533i | 1.095 + 0.322i |
| 20.6 | 1.427 + 0.696i | 1.529 + 0.428i | 0.883 + 0.465i | 0.923 + 0.285i | 1.174 + 0.649i | 1.285 + 0.384i | 1.028 + 0.532i | 1.096 + 0.321i |
| 20.7 | 1.424 + 0.693i | 1.529 + 0.426i | 0.885 + 0.464i | 0.925 + 0.284i | 1.172 + 0.651i | 1.285 + 0.384i | 1.030 + 0.531i | 1.098 + 0.320i |
| 20.8 | 1.361 + 0.673i | 1.539 + 0.453i | 0.913 + 0.465i | 0.939 + 0.282i | 1.117 + 0.703i | 1.314 + 0.355i | 1.084 + 0.512i | 1.118 + 0.307i |
| 20.9 | 1.360 + 0.671i | 1.538 + 0.453i | 0.916 + 0.466i | 0.940 + 0.282i | 1.115 + 0.706i | 1.316 + 0.354i | 1.088 + 0.513i | 1.119 + 0.306i |
| 21 | 1.358 + 0.669i | 1.537 + 0.453i | 0.918 + 0.465i | 0.942 + 0.282i | 1.115 + 0.708i | 1.317 + 0.353i | 1.091 + 0.512i | 1.121 + 0.305i |
| 21.1 | 1.357 + 0.667i | 1.536 + 0.453i | 0.921 + 0.464i | 0.943 + 0.282i | 1.115 + 0.710i | 1.318 + 0.351i | 1.095 + 0.512i | 1.122 + 0.304i |
| 21.2 | 1.358 + 0.666i | 1.535 + 0.452i | 0.925 + 0.463i | 0.946 + 0.281i | 1.118 + 0.712i | 1.320 + 0.350i | 1.100 + 0.512i | 1.124 + 0.303i |
| 21.3 | 1.359 + 0.665i | 1.535 + 0.450i | 0.927 + 0.463i | 0.948 + 0.281i | 1.119 + 0.714i | 1.321 + 0.349i | 1.103 + 0.512i | 1.126 + 0.302i |
| 21.4 | 1.359 + 0.662i | 1.534 + 0.449i | 0.930 + 0.462i | 0.950 + 0.280i | 1.121 + 0.716i | 1.322 + 0.348i | 1.107 + 0.512i | 1.128 + 0.301i |
| 21.5 | 1.359 + 0.661i | 1.533 + 0.448i | 0.932 + 0.462i | 0.951 + 0.281i | 1.123 + 0.717i | 1.322 + 0.346i | 1.109 + 0.512i | 1.128 + 0.300i |
| 21.6 | 1.360 + 0.658i | 1.532 + 0.447i | 0.934 + 0.461i | 0.953 + 0.280i | 1.125 + 0.718i | 1.323 + 0.345i | 1.112 + 0.511i | 1.130 + 0.300i |
| 21.7 | 1.360 + 0.656i | 1.531 + 0.445i | 0.936 + 0.461i | 0.954 + 0.280i | 1.126 + 0.719i | 1.323 + 0.344i | 1.114 + 0.511i | 1.130 + 0.299i |
| 21.8 | 1.360 + 0.655i | 1.530 + 0.444i | 0.938 + 0.461i | 0.955 + 0.280i | 1.129 + 0.720i | 1.324 + 0.342i | 1.117 + 0.511i | 1.131 + 0.298i |
| 21.9 | 1.362 + 0.653i | 1.529 + 0.442i | 0.940 + 0.460i | 0.956 + 0.279i | 1.132 + 0.721i | 1.324 + 0.341i | 1.119 + 0.511i | 1.132 + 0.297i |
| 22 | 1.362 + 0.651i | 1.528 + 0.441i | 0.942 + 0.460i | 0.958 + 0.280i | 1.133 + 0.722i | 1.325 + 0.340i | 1.122 + 0.511i | 1.133 + 0.297i |
| 22.1 | 1.363 + 0.650i | 1.526 + 0.440i | 0.944 + 0.460i | 0.958 + 0.279i | 1.136 + 0.723i | 1.325 + 0.339i | 1.124 + 0.510i | 1.134 + 0.296i |
| 22.2 | 1.363 + 0.648i | 1.526 + 0.438i | 0.946 + 0.460i | 0.961 + 0.279i | 1.139 + 0.724i | 1.326 + 0.338i | 1.126 + 0.511i | 1.135 + 0.296i |
| 22.3 | 1.365 + 0.645i | 1.524 + 0.435i | 0.949 + 0.460i | 0.962 + 0.279i | 1.142 + 0.725i | 1.326 + 0.336i | 1.129 + 0.511i | 1.136 + 0.295i |
| 22.4 | 1.368 + 0.646i | 1.525 + 0.435i | 0.957 + 0.457i | 0.965 + 0.277i | 1.148 + 0.733i | 1.328 + 0.335i | 1.136 + 0.514i | 1.139 + 0.295i |
| 22.5 | 1.368 + 0.645i | 1.523 + 0.435i | 0.959 + 0.457i | 0.967 + 0.277i | 1.149 + 0.735i | 1.328 + 0.334i | 1.138 + 0.514i | 1.140 + 0.295i |
| 22.6 | 0.351 + 0.807i | 0.365 + 0.993i | 0.209 + 0.808i | 0.220 + 0.992i | 0.342 + 0.641i | 0.124 + 1.432i | 0.203 + 0.641i | 0.251 + 1.203i |
| 22.7 | 0.352 + 0.808i | 0.366 + 0.993i | 0.210 + 0.808i | 0.220 + 0.992i | 0.343 + 0.642i | 0.124 + 1.427i | 0.204 + 0.642i | 0.251 + 1.203i |
| 22.8 | 0.354 + 0.810i | 0.367 + 0.994i | 0.211 + 0.809i | 0.221 + 0.991i | 0.344 + 0.643i | 0.123 + 1.425i | 0.204 + 0.643i | 0.251 + 1.201i |
| 22.9 | 0.355 + 0.811i | 0.368 + 0.995i | 0.212 + 0.810i | 0.221 + 0.991i | 0.345 + 0.644i | 0.122 + 1.421i | 0.205 + 0.644i | 0.251 + 1.200i |
| 23 | 0.356 + 0.812i | 0.369 + 0.995i | 0.212 + 0.809i | 0.221 + 0.990i | 0.347 + 0.645i | 0.122 + 1.418i | 0.206 + 0.645i | 0.251 + 1.198i |
| 23.1 | 0.356 + 0.812i | 0.370 + 0.995i | 0.213 + 0.810i | 0.222 + 0.990i | 0.348 + 0.647i | 0.121 + 1.414i | 0.207 + 0.645i | 0.251 + 1.197i |
| 23.2 | 0.357 + 0.813i | 0.371 + 0.996i | 0.213 + 0.811i | 0.222 + 0.990i | 0.349 + 0.648i | 0.120 + 1.412i | 0.207 + 0.646i | 0.252 + 1.195i |
| 23.3 | 0.358 + 0.814i | 0.371 + 0.996i | 0.213 + 0.810i | 0.222 + 0.989i | 0.349 + 0.649i | 0.120 + 1.409i | 0.207 + 0.646i | 0.252 + 1.193i |
| 23.4 | 0.357 + 0.791i | 0.363 + 0.957i | 0.209 + 0.790i | 0.213 + 0.954i | 0.352 + 0.636i | 0.110 + 1.460i | 0.207 + 0.634i | 0.238 + 1.125i |
| 23.5 | 0.359 + 0.792i | 0.364 + 0.958i | 0.210 + 0.791i | 0.215 + 0.954i | 0.353 + 0.638i | 0.110 + 1.456i | 0.207 + 0.635i | 0.237 + 1.124i |
| 23.6 | 0.360 + 0.793i | 0.365 + 0.959i | 0.210 + 0.791i | 0.215 + 0.953i | 0.354 + 0.638i | 0.109 + 1.454i | 0.208 + 0.636i | 0.238 + 1.123i |
| 23.7 | 0.361 + 0.795i | 0.366 + 0.960i | 0.212 + 0.792i | 0.216 + 0.953i | 0.355 + 0.640i | 0.108 + 1.450i | 0.209 + 0.638i | 0.237 + 1.123i |
| 23.8 | 0.362 + 0.795i | 0.367 + 0.961i | 0.213 + 0.792i | 0.217 + 0.953i | 0.356 + 0.640i | 0.108 + 1.447i | 0.210 + 0.638i | 0.237 + 1.122i |
| 23.9 | 0.365 + 0.797i | 0.369 + 0.963i | 0.214 + 0.793i | 0.217 + 0.953i | 0.358 + 0.642i | 0.107 + 1.443i | 0.211 + 0.640i | 0.238 + 1.122i |
| 24 | 0.365 + 0.798i | 0.370 + 0.964i | 0.215 + 0.793i | 0.218 + 0.953i | 0.359 + 0.643i | 0.107 + 1.440i | 0.212 + 0.640i | 0.238 + 1.123i |
| 24.1 | 0.367 + 0.799i | 0.372 + 0.965i | 0.216 + 0.793i | 0.219 + 0.952i | 0.361 + 0.644i | 0.106 + 1.436i | 0.213 + 0.640i | 0.238 + 1.121i |
| 24.2 | 0.368 + 0.800i | 0.372 + 0.966i | 0.216 + 0.792i | 0.219 + 0.951i | 0.361 + 0.645i | 0.106 + 1.434i | 0.213 + 0.640i | 0.238 + 1.122i |
| 24.3 | 0.371 + 0.802i | 0.379 + 0.968i | 0.219 + 0.790i | 0.223 + 0.946i | 0.363 + 0.645i | 0.103 + 1.436i | 0.215 + 0.639i | 0.234 + 1.111i |
| 24.4 | 0.372 + 0.802i | 0.380 + 0.968i | 0.219 + 0.789i | 0.223 + 0.945i | 0.364 + 0.646i | 0.103 + 1.433i | 0.216 + 0.639i | 0.233 + 1.109i |
| 24.5 | 0.374 + 0.803i | 0.382 + 0.969i | 0.220 + 0.789i | 0.225 + 0.944i | 0.366 + 0.647i | 0.102 + 1.429i | 0.217 + 0.639i | 0.234 + 1.108i |
| 24.6 | 0.375 + 0.803i | 0.383 + 0.970i | 0.220 + 0.789i | 0.226 + 0.944i | 0.367 + 0.647i | 0.101 + 1.427i | 0.218 + 0.639i | 0.234 + 1.107i |
| 24.7 | 0.376 + 0.803i | 0.384 + 0.969i | 0.222 + 0.789i | 0.226 + 0.943i | 0.368 + 0.548i | 0.101 + 1.424i | 0.218 + 0.639i | 0.234 + 1.107i |
| 24.8 | 0.376 + 0.804i | 0.385 + 0.970i | 0.222 + 0.788i | 0.226 + 0.943i | 0.368 + 0.648i | 0.101 + 1.421i | 0.218 + 0.639i | 0.235 + 1.106i |
| 24.9 | 0.378 + 0.805i | 0.386 + 0.971i | 0.223 + 0.787i | 0.228 + 0.942i | 0.370 + 0.649i | 0.101 + 1.418i | 0.220 + 0.638i | 0.235 + 1.106i |
| 25 | 0.378 + 0.806i | 0.386 + 0.972i | 0.223 + 0.787i | 0.228 + 0.942i | 0.370 + 0.550i | 0.100 + 1.416i | 0.220 + 0.638i | 0.236 + 1.106i |
| SNR | a25 | a26 | a27 | a28 | a29 | a30 | a31 | a32 |
| 10 | 0.796 + 1.221i | 0.280 + 1.419i | 0.549 + 0.902i | 0.245 + 1.018i | 0.759 + 1.153i | 0.263 + 1.347i | 0.561 + 0.916i | 0.245 + 1.039i |
| 10.1 | 0.797 + 1.221i | 0.280 + 1.421i | 0.548 + 0.899i | 0.244 + 1.015i | 0.762 + 1.153i | 0.262 + 1.351i | 0.561 + 0.914i | 0.243 + 1.038i |
| 10.2 | 0.798 + 1.220i | 0.280 + 1.422i | 0.548 + 0.897i | 0.241 + 1.014i | 0.765 + 1.153i | 0.260 + 1.353i | 0.563 + 0.912i | 0.241 + 1.037i |
| 10.3 | 0.799 + 1.219i | 0.279 + 1.423i | 0.548 + 0.894i | 0.240 + 1.012i | 0.767 + 1.154i | 0.260 + 1.356i | 0.563 + 0.910i | 0.239 + 1.036i |
| 10.4 | 0.799 + 1.219i | 0.279 + 1.424i | 0.548 + 0.892i | 0.238 + 1.010i | 0.768 + 1.153i | 0.259 + 1.358i | 0.564 + 0.909i | 0.237 + 1.035i |
| 10.5 | 0.800 + 1.218i | 0.279 + 1.425i | 0.548 + 0.889i | 0.236 + 1.008i | 0.770 + 1.153i | 0.258 + 1.360i | 0.566 + 0.907i | 0.235 + 1.034i |
| 10.6 | 0.800 + 1.217i | 0.279 + 1.425i | 0.549 + 0.887i | 0.235 + 1.007i | 0.771 + 1.152i | 0.257 + 1.361i | 0.567 + 0.905i | 0.233 + 1.033i |

-continued

| 256NUC | | | | | | | | |
|---|---|---|---|---|---|---|---|---|
| 10.7 | 0.800 + 1.217i | 0.279 + 1.425i | 0.549 + 0.885i | 0.233 + 1.005i | 0.772 + 1.152i | 0.256 + 1.362i | 0.567 + 0.904i | 0.231 + 1.032i |
| 10.8 | 0.800 + 1.216i | 0.280 + 1.426i | 0.549 + 0.883i | 0.231 + 1.004i | 0.773 + 1.152i | 0.255 + 1.363i | 0.568 + 0.902i | 0.230 + 1.032i |
| 10.9 | 0.800 + 1.215i | 0.280 + 1.426i | 0.549 + 0.881i | 0.229 + 1.003i | 0.774 + 1.151i | 0.255 + 1.364i | 0.570 + 0.901i | 0.228 + 1.032i |
| 11 | 0.799 + 1.215i | 0.280 + 1.425i | 0.550 + 0.879i | 0.228 + 1.002i | 0.774 + 1.151i | 0.254 + 1.365i | 0.571 + 0.900i | 0.226 + 1.031i |
| 11.1 | 0.798 + 1.214i | 0.282 + 1.425i | 0.551 + 0.877i | 0.226 + 1.001i | 0.775 + 1.151i | 0.254 + 1.366i | 0.572 + 0.898i | 0.225 + 1.031i |
| 11.2 | 0.796 + 1.215i | 0.285 + 1.424i | 0.551 + 0.876i | 0.225 + 1.000i | 0.776 + 1.150i | 0.253 + 1.366i | 0.574 + 0.896i | 0.223 + 1.030i |
| 11.3 | 0.788 + 1.220i | 0.293 + 1.423i | 0.549 + 0.875i | 0.225 + 0.998i | 0.775 + 1.150i | 0.253 + 1.366i | 0.574 + 0.895i | 0.221 + 1.030i |
| 11.4 | 0.774 + 1.230i | 0.309 + 1.420i | 0.546 + 0.874i | 0.226 + 0.997i | 0.774 + 1.150i | 0.253 + 1.366i | 0.575 + 0.894i | 0.220 + 1.029i |
| 11.5 | 0.759 + 1.240i | 0.327 + 1.417i | 0.542 + 0.874i | 0.227 + 0.994i | 0.773 + 1.149i | 0.253 + 1.365i | 0.575 + 0.892i | 0.217 + 1.028i |
| 11.6 | 0.748 + 1.248i | 0.341 + 1.414i | 0.540 + 0.873i | 0.228 + 0.992i | 0.772 + 1.147i | 0.254 + 1.363i | 0.575 + 0.890i | 0.216 + 1.027i |
| 11.7 | 0.738 + 1.255i | 0.353 + 1.413i | 0.537 + 0.872i | 0.228 + 0.990i | 0.771 + 1.146i | 0.254 + 1.363i | 0.575 + 0.889i | 0.214 + 1.026i |
| 11.8 | 0.731 + 1.261i | 0.363 + 1.412i | 0.535 + 0.871i | 0.228 + 0.987i | 0.770 + 1.145i | 0.254 + 1.362i | 0.576 + 0.887i | 0.212 + 1.025i |
| 11.9 | 0.724 + 1.265i | 0.372 + 1.411i | 0.534 + 0.870i | 0.228 + 0.985i | 0.770 + 1.144i | 0.254 + 1.361i | 0.576 + 0.885i | 0.211 + 1.024i |
| 12 | 0.718 + 1.269i | 0.379 + 1.410i | 0.532 + 0.869i | 0.228 + 0.984i | 0.768 + 1.143i | 0.255 + 1.360i | 0.576 + 0.884i | 0.210 + 1.023i |
| 12.1 | 0.712 + 1.272i | 0.386 + 1.408i | 0.530 + 0.868i | 0.227 + 0.983i | 0.767 + 1.142i | 0.255 + 1.359i | 0.576 + 0.883i | 0.208 + 1.022i |
| 12.2 | 0.708 + 1.275i | 0.392 + 1.407i | 0.529 + 0.867i | 0.227 + 0.982i | 0.766 + 1.141i | 0.256 + 1.359i | 0.576 + 0.882i | 0.207 + 1.022i |
| 12.3 | 0.703 + 1.277i | 0.397 + 1.406i | 0.527 + 0.866i | 0.227 + 0.980i | 0.765 + 1.140i | 0.255 + 1.358i | 0.576 + 0.880i | 0.205 + 1.021i |
| 12.4 | 0.698 + 1.278i | 0.401 + 1.404i | 0.526 + 0.865i | 0.226 + 0.979i | 0.763 + 1.139i | 0.256 + 1.356i | 0.575 + 0.879i | 0.204 + 1.021i |
| 12.5 | 0.694 + 1.280i | 0.404 + 1.402i | 0.526 + 0.864i | 0.225 + 0.978i | 0.761 + 1.139i | 0.256 + 1.355i | 0.575 + 0.878i | 0.203 + 1.020i |
| 12.6 | 0.689 + 1.281i | 0.408 + 1.401i | 0.524 + 0.863i | 0.225 + 0.977i | 0.759 + 1.138i | 0.256 + 1.354i | 0.574 + 0.877i | 0.202 + 1.020i |
| 12.7 | 0.685 + 1.282i | 0.410 + 1.398i | 0.523 + 0.863i | 0.224 + 0.976i | 0.757 + 1.138i | 0.256 + 1.352i | 0.574 + 0.877i | 0.201 + 1.019i |
| 12.8 | 0.647 + 1.276i | 0.350 + 1.362i | 0.510 + 0.848i | 0.209 + 0.953i | 0.703 + 1.142i | 0.232 + 1.319i | 0.559 + 0.873i | 0.192 + 0.991i |
| 12.9 | 0.639 + 1.277i | 0.348 + 1.359i | 0.505 + 0.849i | 0.207 + 0.950i | 0.697 + 1.144i | 0.230 + 1.317i | 0.553 + 0.874i | 0.189 + 0.989i |
| 13 | 0.633 + 1.278i | 0.347 + 1.357i | 0.499 + 0.848i | 0.204 + 0.947i | 0.690 + 1.146i | 0.229 + 1.314i | 0.547 + 0.875i | 0.187 + 0.986i |
| 13.1 | 0.628 + 1.278i | 0.348 + 1.356i | 0.496 + 0.848i | 0.202 + 0.945i | 0.687 + 1.146i | 0.228 + 1.313i | 0.543 + 0.875i | 0.185 + 0.985i |
| 13.2 | 0.622 + 1.278i | 0.349 + 1.354i | 0.492 + 0.848i | 0.200 + 0.943i | 0.681 + 1.147i | 0.228 + 1.311i | 0.538 + 0.876i | 0.184 + 0.984i |
| 13.3 | 0.619 + 1.278i | 0.351 + 1.351i | 0.490 + 0.848i | 0.199 + 0.943i | 0.679 + 1.147i | 0.228 + 1.310i | 0.536 + 0.876i | 0.182 + 0.984i |
| 13.4 | 0.614 + 1.276i | 0.352 + 1.347i | 0.487 + 0.849i | 0.198 + 0.943i | 0.676 + 1.146i | 0.227 + 1.309i | 0.533 + 0.876i | 0.181 + 0.983i |
| 13.5 | 0.609 + 1.273i | 0.352 + 1.341i | 0.484 + 0.849i | 0.196 + 0.944i | 0.673 + 1.146i | 0.227 + 1.308i | 0.530 + 0.876i | 0.179 + 0.983i |
| 13.6 | 0.604 + 1.268i | 0.351 + 1.333i | 0.482 + 0.849i | 0.194 + 0.946i | 0.670 + 1.144i | 0.227 + 1.307i | 0.528 + 0.875i | 0.177 + 0.984i |
| 13.7 | 0.511 + 1.212i | 0.216 + 1.304i | 0.444 + 0.858i | 0.151 + 0.949i | 0.542 + 1.145i | 0.172 + 1.344i | 0.472 + 0.873i | 0.148 + 0.948i |
| 13.8 | 0.506 + 1.213i | 0.213 + 1.302i | 0.443 + 0.858i | 0.150 + 0.948i | 0.538 + 1.146i | 0.171 + 1.342i | 0.470 + 0.874i | 0.147 + 0.946i |
| 13.9 | 0.500 + 1.215i | 0.210 + 1.299i | 0.441 + 0.858i | 0.149 + 0.945i | 0.531 + 1.148i | 0.170 + 1.338i | 0.468 + 0.874i | 0.147 + 0.943i |
| 14 | 0.496 + 1.215i | 0.208 + 1.296i | 0.439 + 0.858i | 0.148 + 0.943i | 0.527 + 1.149i | 0.168 + 1.336i | 0.466 + 0.875i | 0.145 + 0.941i |
| 14.1 | 0.491 + 1.216i | 0.206 + 1.294i | 0.438 + 0.858i | 0.148 + 0.942i | 0.522 + 1.150i | 0.168 + 1.334i | 0.464 + 0.876i | 0.145 + 0.939i |
| 14.2 | 0.486 + 1.217i | 0.202 + 1.291i | 0.436 + 0.859i | 0.147 + 0.940i | 0.516 + 1.152i | 0.166 + 1.332i | 0.462 + 0.878i | 0.145 + 0.937i |
| 14.3 | 0.483 + 1.218i | 0.201 + 1.289i | 0.434 + 0.859i | 0.147 + 0.939i | 0.514 + 1.152i | 0.165 + 1.330i | 0.461 + 0.880i | 0.144 + 0.937i |
| 14.4 | 0.478 + 1.218i | 0.198 + 1.286i | 0.432 + 0.860i | 0.147 + 0.937i | 0.508 + 1.155i | 0.164 + 1.327i | 0.458 + 0.881i | 0.144 + 0.934i |
| 14.5 | 0.475 + 1.219i | 0.196 + 1.283i | 0.431 + 0.860i | 0.147 + 0.937i | 0.505 + 1.155i | 0.163 + 1.325i | 0.457 + 0.883i | 0.144 + 0.933i |
| 14.6 | 0.471 + 1.220i | 0.194 + 1.281i | 0.429 + 0.861i | 0.146 + 0.935i | 0.501 + 1.157i | 0.162 + 1.323i | 0.455 + 0.884i | 0.144 + 0.932i |
| 14.7 | 0.467 + 1.220i | 0.192 + 1.278i | 0.427 + 0.862i | 0.146 + 0.935i | 0.497 + 1.158i | 0.161 + 1.321i | 0.453 + 0.886i | 0.144 + 0.930i |
| 14.8 | 0.464 + 1.221i | 0.190 + 1.276i | 0.425 + 0.863i | 0.146 + 0.934i | 0.495 + 1.159i | 0.160 + 1.319i | 0.452 + 0.888i | 0.144 + 0.930i |
| 14.9 | 0.462 + 1.221i | 0.189 + 1.273i | 0.424 + 0.863i | 0.146 + 0.934i | 0.493 + 1.159i | 0.159 + 1.317i | 0.450 + 0.889i | 0.144 + 0.929i |
| 15 | 0.459 + 1.222i | 0.187 + 1.271i | 0.422 + 0.865i | 0.147 + 0.933i | 0.491 + 1.160i | 0.158 + 1.315i | 0.449 + 0.892i | 0.144 + 0.929i |
| 15.1 | 0.458 + 1.223i | 0.186 + 1.269i | 0.421 + 0.866i | 0.146 + 0.934i | 0.490 + 1.160i | 0.157 + 1.313i | 0.447 + 0.893i | 0.144 + 0.929i |
| 15.2 | 0.456 + 1.224i | 0.186 + 1.267i | 0.419 + 0.867i | 0.147 + 0.934i | 0.489 + 1.161i | 0.156 + 1.311i | 0.446 + 0.896i | 0.144 + 0.929i |
| 15.3 | 0.455 + 1.225i | 0.184 + 1.264i | 0.418 + 0.868i | 0.148 + 0.934i | 0.489 + 1.161i | 0.155 + 1.309i | 0.445 + 0.898i | 0.145 + 0.950i |
| 15.4 | 0.453 + 1.226i | 0.184 + 1.262i | 0.416 + 0.870i | 0.148 + 0.935i | 0.490 + 1.162i | 0.154 + 1.307i | 0.444 + 0.901i | 0.145 + 0.930i |
| 15.5 | 0.419 + 0.597i | 0.183 + 0.717i | 0.156 + 0.355i | 0.108 + 0.396i | 0.445 + 0.573i | 0.138 + 0.729i | 0.155 + 0.355i | 0.106 + 0.395i |
| 15.6 | 0.419 + 0.597i | 0.183 + 0.715i | 0.155 + 0.350i | 0.106 + 0.392i | 0.448 + 0.573i | 0.137 + 0.727i | 0.153 + 0.349i | 0.105 + 0.390i |
| 15.7 | 0.421 + 0.597i | 0.183 + 0.711i | 0.153 + 0.344i | 0.106 + 0.387i | 0.452 + 0.572i | 0.135 + 0.724i | 0.152 + 0.343i | 0.104 + 0.386i |
| 15.8 | 0.421 + 0.598i | 0.183 + 0.710i | 0.151 + 0.340i | 0.104 + 0.384i | 0.456 + 0.573i | 0.134 + 0.722i | 0.150 + 0.339i | 0.103 + 0.383i |
| 15.9 | 0.422 + 0.599i | 0.185 + 0.709i | 0.150 + 0.335i | 0.104 + 0.380i | 0.459 + 0.574i | 0.133 + 0.721i | 0.148 + 0.334i | 0.102 + 0.380i |
| 16 | 0.423 + 0.601i | 0.185 + 0.708i | 0.148 + 0.331i | 0.102 + 0.377i | 0.462 + 0.574i | 0.131 + 0.720i | 0.146 + 0.330i | 0.100 + 0.377i |
| 16.1 | 0.424 + 0.603i | 0.187 + 0.708i | 0.147 + 0.327i | 0.101 + 0.373i | 0.466 + 0.575i | 0.130 + 0.720i | 0.145 + 0.326i | 0.099 + 0.373i |
| 16.2 | 0.424 + 0.606i | 0.188 + 0.710i | 0.145 + 0.322i | 0.100 + 0.369i | 0.468 + 0.577i | 0.128 + 0.722i | 0.143 + 0.321i | 0.098 + 0.369i |
| 16.3 | 0.424 + 0.609i | 0.190 + 0.711i | 0.143 + 0.317i | 0.098 + 0.364i | 0.471 + 0.578i | 0.127 + 0.724i | 0.140 + 0.316i | 0.096 + 0.365i |
| 16.4 | 0.424 + 0.612i | 0.192 + 0.714i | 0.141 + 0.314i | 0.096 + 0.360i | 0.474 + 0.580i | 0.126 + 0.727i | 0.138 + 0.312i | 0.094 + 0.360i |
| 16.5 | 0.423 + 0.616i | 0.194 + 0.716i | 0.139 + 0.308i | 0.095 + 0.353i | 0.477 + 0.582i | 0.124 + 0.729i | 0.136 + 0.306i | 0.093 + 0.354i |
| 16.6 | 0.423 + 0.621i | 0.196 + 0.720i | 0.136 + 0.301i | 0.093 + 0.345i | 0.479 + 0.585i | 0.122 + 0.734i | 0.134 + 0.301i | 0.091 + 0.345i |
| 16.7 | 0.422 + 0.625i | 0.199 + 0.723i | 0.135 + 0.296i | 0.091 + 0.338i | 0.482 + 0.587i | 0.121 + 0.738i | 0.133 + 0.296i | 0.090 + 0.338i |
| 16.8 | 0.420 + 0.632i | 0.201 + 0.729i | 0.132 + 0.290i | 0.089 + 0.327i | 0.483 + 0.590i | 0.119 + 0.744i | 0.130 + 0.289i | 0.088 + 0.328i |
| 16.9 | 0.418 + 0.637i | 0.204 + 0.733i | 0.130 + 0.284i | 0.088 + 0.319i | 0.484 + 0.593i | 0.117 + 0.749i | 0.128 + 0.284i | 0.087 + 0.320i |
| 17 | 0.417 + 0.642i | 0.207 + 0.737i | 0.128 + 0.280i | 0.087 + 0.313i | 0.486 + 0.595i | 0.115 + 0.755i | 0.127 + 0.279i | 0.086 + 0.313i |
| 17.1 | 0.415 + 0.648i | 0.210 + 0.741i | 0.126 + 0.276i | 0.086 + 0.307i | 0.488 + 0.597i | 0.113 + 0.761i | 0.125 + 0.276i | 0.085 + 0.307i |
| 17.2 | 0.414 + 0.652i | 0.213 + 0.745i | 0.125 + 0.274i | 0.085 + 0.303i | 0.490 + 0.598i | 0.111 + 0.765i | 0.125 + 0.274i | 0.084 + 0.303i |
| 17.3 | 0.412 + 0.656i | 0.215 + 0.747i | 0.125 + 0.273i | 0.084 + 0.301i | 0.493 + 0.599i | 0.109 + 0.769i | 0.124 + 0.272i | 0.083 + 0.301i |
| 17.4 | 0.411 + 0.659i | 0.218 + 0.748i | 0.124 + 0.271i | 0.083 + 0.300i | 0.495 + 0.600i | 0.108 + 0.772i | 0.124 + 0.271i | 0.082 + 0.300i |
| 17.5 | 0.410 + 0.662i | 0.220 + 0.751i | 0.124 + 0.271i | 0.083 + 0.299i | 0.497 + 0.600i | 0.106 + 0.775i | 0.123 + 0.271i | 0.082 + 0.299i |
| 17.6 | 0.410 + 0.664i | 0.223 + 0.752i | 0.124 + 0.271i | 0.082 + 0.298i | 0.499 + 0.600i | 0.104 + 0.778i | 0.123 + 0.271i | 0.081 + 0.298i |
| 17.7 | 0.410 + 0.667i | 0.226 + 0.754i | 0.123 + 0.271i | 0.082 + 0.299i | 0.502 + 0.600i | 0.103 + 0.781i | 0.123 + 0.271i | 0.080 + 0.299i |
| 17.8 | 0.410 + 0.669i | 0.230 + 0.756i | 0.123 + 0.273i | 0.081 + 0.300i | 0.504 + 0.599i | 0.101 + 0.785i | 0.123 + 0.273i | 0.079 + 0.301i |
| 17.9 | 0.455 + 0.604i | 0.316 + 0.819i | 0.098 + 0.434i | 0.137 + 0.693i | 0.502 + 0.536i | 0.105 + 0.940i | 0.092 + 0.433i | 0.087 + 0.705i |
| 18 | 0.452 + 0.604i | 0.318 + 0.818i | 0.096 + 0.433i | 0.143 + 0.698i | 0.501 + 0.535i | 0.100 + 0.940i | 0.090 + 0.432i | 0.088 + 0.709i |
| 18.1 | 0.451 + 0.606i | 0.317 + 0.818i | 0.095 + 0.430i | 0.149 + 0.702i | 0.502 + 0.534i | 0.095 + 0.939i | 0.088 + 0.430i | 0.089 + 0.713i |
| 18.2 | 0.450 + 0.607i | 0.316 + 0.819i | 0.092 + 0.426i | 0.155 + 0.705i | 0.503 + 0.534i | 0.092 + 0.936i | 0.087 + 0.426i | 0.089 + 0.717i |
| 18.3 | 0.449 + 0.609i | 0.315 + 0.819i | 0.091 + 0.422i | 0.159 + 0.707i | 0.505 + 0.533i | 0.090 + 0.933i | 0.085 + 0.422i | 0.090 + 0.720i |

-continued

| 256NUC | | | | | | | | |
|---|---|---|---|---|---|---|---|---|
| 18.4 | 0.449 + 0.609i | 0.315 + 0.819i | 0.089 + 0.421i | 0.164 + 0.708i | 0.507 + 0.532i | 0.089 + 0.931i | 0.084 + 0.422i | 0.089 + 0.722i |
| 18.5 | 0.462 + 0.616i | 0.339 + 0.797i | 0.085 + 0.474i | 0.098 + 0.677i | 0.514 + 0.527i | 0.190 + 0.976i | 0.083 + 0.423i | 0.082 + 0.841i |
| 18.6 | 0.461 + 0.619i | 0.339 + 0.798i | 0.084 + 0.474i | 0.094 + 0.677i | 0.515 + 0.527i | 0.198 + 0.978i | 0.082 + 0.421i | 0.082 + 0.851i |
| 18.7 | 0.446 + 0.620i | 0.314 + 0.739i | 0.078 + 0.460i | 0.083 + 0.708i | 0.504 + 0.527i | 0.224 + 0.931i | 0.080 + 0.406i | 0.081 + 0.894i |
| 18.8 | 0.445 + 0.623i | 0.312 + 0.789i | 0.077 + 0.457i | 0.081 + 0.708i | 0.504 + 0.528i | 0.221 + 0.929i | 0.080 + 0.403i | 0.080 + 0.896i |
| 18.9 | 0.445 + 0.626i | 0.311 + 0.789i | 0.076 + 0.456i | 0.080 + 0.708i | 0.505 + 0.529i | 0.222 + 0.929i | 0.079 + 0.402i | 0.079 + 0.896i |
| 19 | 0.445 + 0.629i | 0.311 + 0.791i | 0.075 + 0.455i | 0.080 + 0.708i | 0.506 + 0.529i | 0.224 + 0.930i | 0.078 + 0.402i | 0.078 + 0.897i |
| 19.1 | 0.445 + 0.632i | 0.312 + 0.791i | 0.075 + 0.456i | 0.079 + 0.709i | 0.506 + 0.529i | 0.224 + 0.930i | 0.078 + 0.402i | 0.077 + 0.897i |
| 19.2 | 0.578 + 1.246i | 0.351 + 1.324i | 0.459 + 1.047i | 0.283 + 1.100i | 0.766 + 1.097i | 0.116 + 1.359i | 0.631 + 0.955i | 0.096 + 1.129i |
| 19.3 | 0.578 + 1.244i | 0.350 + 1.323i | 0.461 + 1.046i | 0.285 + 1.099i | 0.768 + 1.096i | 0.116 + 1.357i | 0.632 + 0.952i | 0.096 + 1.129i |
| 19.4 | 0.579 + 1.242i | 0.351 + 1.322i | 0.461 + 1.046i | 0.285 + 1.099i | 0.771 + 1.094i | 0.116 + 1.356i | 0.633 + 0.950i | 0.096 + 1.129i |
| 19.5 | 0.581 + 1.240i | 0.351 + 1.320i | 0.463 + 1.045i | 0.286 + 1.099i | 0.772 + 1.091i | 0.116 + 1.355i | 0.635 + 0.947i | 0.096 + 1.129i |
| 19.6 | 0.582 + 1.238i | 0.351 + 1.319i | 0.465 + 1.045i | 0.286 + 1.099i | 0.774 + 1.090i | 0.116 + 1.354i | 0.636 + 0.945i | 0.096 + 1.130i |
| 19.7 | 0.583 + 1.236i | 0.351 + 1.318i | 0.466 + 1.045i | 0.287 + 1.100i | 0.776 + 1.088i | 0.116 + 1.353i | 0.637 + 0.943i | 0.096 + 1.130i |
| 19.8 | 0.584 + 1.235i | 0.352 + 1.316i | 0.467 + 1.044i | 0.287 + 1.099i | 0.779 + 1.086i | 0.116 + 1.352i | 0.639 + 0.940i | 0.097 + 1.130i |
| 19.9 | 0.585 + 1.233i | 0.352 + 1.315i | 0.468 + 1.044i | 0.288 + 1.099i | 0.781 + 1.085i | 0.116 + 1.351i | 0.640 + 0.939i | 0.097 + 1.130i |
| 20 | 0.586 + 1.231i | 0.352 + 1.314i | 0.470 + 1.043i | 0.288 + 1.099i | 0.783 + 1.083i | 0.116 + 1.350i | 0.642 + 0.937i | 0.097 + 1.130i |
| 20.1 | 0.587 + 1.230i | 0.352 + 1.312i | 0.471 + 1.042i | 0.289 + 1.099i | 0.784 + 1.082i | 0.116 + 1.349i | 0.643 + 0.935i | 0.098 + 1.130i |
| 20.2 | 0.587 + 1.228i | 0.352 + 1.311i | 0.472 + 1.041i | 0.289 + 1.098i | 0.786 + 1.080i | 0.116 + 1.347i | 0.644 + 0.933i | 0.098 + 1.129i |
| 20.3 | 0.587 + 1.226i | 0.352 + 1.309i | 0.473 + 1.040i | 0.289 + 1.098i | 0.787 + 1.078i | 0.116 + 1.345i | 0.646 + 0.931i | 0.098 + 1.128i |
| 20.4 | 0.588 + 1.224i | 0.352 + 1.307i | 0.473 + 1.039i | 0.289 + 1.097i | 0.788 + 1.077i | 0.116 + 1.344i | 0.647 + 0.930i | 0.098 + 1.128i |
| 20.5 | 0.591 + 1.218i | 0.354 + 1.298i | 0.488 + 1.033i | 0.297 + 1.093i | 0.797 + 1.076i | 0.116 + 1.335i | 0.667 + 0.929i | 0.101 + 1.125i |
| 20.6 | 0.591 + 1.218i | 0.353 + 1.296i | 0.488 + 1.032i | 0.297 + 1.092i | 0.798 + 1.077i | 0.115 + 1.333i | 0.669 + 0.929i | 0.101 + 1.124i |
| 20.7 | 0.591 + 1.217i | 0.353 + 1.294i | 0.490 + 1.031i | 0.298 + 1.092i | 0.799 + 1.076i | 0.116 + 1.331i | 0.670 + 0.928i | 0.101 + 1.124i |
| 20.8 | 0.564 + 1.228i | 0.336 + 1.287i | 0.469 + 1.032i | 0.286 + 1.082i | 0.771 + 1.102i | 0.110 + 1.317i | 0.640 + 0.955i | 0.097 + 1.109i |
| 20.9 | 0.563 + 1.227i | 0.335 + 1.286i | 0.468 + 1.032i | 0.285 + 1.080i | 0.770 + 1.102i | 0.110 + 1.314i | 0.639 + 0.956i | 0.096 + 1.107i |
| 21 | 0.562 + 1.227i | 0.334 + 1.284i | 0.468 + 1.032i | 0.285 + 1.080i | 0.770 + 1.103i | 0.109 + 1.313i | 0.638 + 0.957i | 0.096 + 1.107i |
| 21.1 | 0.560 + 1.226i | 0.333 + 1.282i | 0.467 + 1.032i | 0.284 + 1.079i | 0.770 + 1.103i | 0.109 + 1.310i | 0.638 + 0.958i | 0.096 + 1.105i |
| 21.2 | 0.559 + 1.225i | 0.332 + 1.281i | 0.464 + 1.032i | 0.282 + 1.079i | 0.768 + 1.102i | 0.108 + 1.308i | 0.635 + 0.958i | 0.096 + 1.104i |
| 21.3 | 0.558 + 1.224i | 0.330 + 1.279i | 0.463 + 1.032i | 0.281 + 1.078i | 0.767 + 1.101i | 0.108 + 1.306i | 0.634 + 0.959i | 0.095 + 1.103i |
| 21.4 | 0.557 + 1.224i | 0.330 + 1.279i | 0.462 + 1.032i | 0.281 + 1.078i | 0.767 + 1.100i | 0.108 + 1.304i | 0.632 + 0.960i | 0.096 + 1.102i |
| 21.5 | 0.556 + 1.223i | 0.329 + 1.277i | 0.461 + 1.032i | 0.280 + 1.077i | 0.766 + 1.100i | 0.107 + 1.302i | 0.632 + 0.961i | 0.095 + 1.100i |
| 21.6 | 0.555 + 1.222i | 0.328 + 1.275i | 0.460 + 1.032i | 0.279 + 1.077i | 0.766 + 1.099i | 0.107 + 1.301i | 0.631 + 0.961i | 0.094 + 1.100i |
| 21.7 | 0.554 + 1.221i | 0.327 + 1.275i | 0.460 + 1.033i | 0.278 + 1.077i | 0.766 + 1.099i | 0.107 + 1.299i | 0.630 + 0.961i | 0.094 + 1.099i |
| 21.8 | 0.554 + 1.219i | 0.327 + 1.273i | 0.459 + 1.032i | 0.278 + 1.076i | 0.765 + 1.098i | 0.107 + 1.297i | 0.630 + 0.961i | 0.095 + 1.099i |
| 21.9 | 0.553 + 1.218i | 0.326 + 1.272i | 0.459 + 1.032i | 0.278 + 1.077i | 0.765 + 1.096i | 0.106 + 1.297i | 0.629 + 0.961i | 0.094 + 1.099i |
| 22 | 0.552 + 1.218i | 0.325 + 1.271i | 0.457 + 1.032i | 0.277 + 1.076i | 0.764 + 1.096i | 0.106 + 1.294i | 0.628 + 0.962i | 0.094 + 1.097i |
| 22.1 | 0.552 + 1.217i | 0.325 + 1.270i | 0.457 + 1.032i | 0.276 + 1.076i | 0.764 + 1.095i | 0.106 + 1.293i | 0.627 + 0.962i | 0.094 + 1.097i |
| 22.2 | 0.551 + 1.215i | 0.325 + 1.268i | 0.456 + 1.032i | 0.275 + 1.074i | 0.764 + 1.094i | 0.106 + 1.290i | 0.627 + 0.962i | 0.094 + 1.095i |
| 22.3 | 0.549 + 1.213i | 0.324 + 1.266i | 0.455 + 1.031i | 0.274 + 1.074i | 0.763 + 1.092i | 0.106 + 1.289i | 0.626 + 0.961i | 0.094 + 1.095i |
| 22.4 | 0.547 + 1.211i | 0.322 + 1.264i | 0.452 + 1.031i | 0.272 + 1.073i | 0.758 + 1.089i | 0.105 + 1.285i | 0.624 + 0.961i | 0.092 + 1.092i |
| 22.5 | 0.546 + 1.210i | 0.322 + 1.263i | 0.451 + 1.031i | 0.272 + 1.073i | 0.757 + 1.088i | 0.105 + 1.284i | 0.623 + 0.961i | 0.092 + 1.092i |
| 22.6 | 0.498 + 0.806i | 0.516 + 0.997i | 0.069 + 0.807i | 0.073 + 0.985i | 0.485 + 0.638i | 0.375 + 1.444i | 0.068 + 0.642i | 0.079 + 1.179i |
| 22.7 | 0.499 + 0.807i | 0.518 + 0.997i | 0.070 + 0.807i | 0.073 + 0.984i | 0.487 + 0.639i | 0.374 + 1.441i | 0.068 + 0.643i | 0.079 + 1.176i |
| 22.8 | 0.501 + 0.809i | 0.520 + 0.998i | 0.070 + 0.807i | 0.074 + 0.983i | 0.488 + 0.641i | 0.371 + 1.439i | 0.068 + 0.643i | 0.079 + 1.175i |
| 22.9 | 0.502 + 0.809i | 0.521 + 0.998i | 0.070 + 0.808i | 0.074 + 0.982i | 0.489 + 0.642i | 0.369 + 1.436i | 0.068 + 0.644i | 0.079 + 1.173i |
| 23 | 0.504 + 0.811i | 0.523 + 0.999i | 0.070 + 0.806i | 0.074 + 0.981i | 0.491 + 0.644i | 0.367 + 1.433i | 0.068 + 0.644i | 0.079 + 1.171i |
| 23.1 | 0.506 + 0.812i | 0.525 + 0.999i | 0.071 + 0.806i | 0.074 + 0.980i | 0.493 + 0.645i | 0.366 + 1.430i | 0.069 + 0.644i | 0.079 + 1.169i |
| 23.2 | 0.507 + 0.813i | 0.527 + 0.999i | 0.070 + 0.807i | 0.074 + 0.980i | 0.494 + 0.647i | 0.364 + 1.427i | 0.069 + 0.645i | 0.080 + 1.169i |
| 23.3 | 0.508 + 0.814i | 0.528 + 0.999i | 0.070 + 0.807i | 0.074 + 0.980i | 0.495 + 0.648i | 0.362 + 1.423i | 0.069 + 0.645i | 0.080 + 1.168i |
| 23.4 | 0.510 + 0.806i | 0.512 + 0.990i | 0.067 + 0.801i | 0.069 + 0.989i | 0.501 + 0.644i | 0.296 + 1.353i | 0.068 + 0.636i | 0.088 + 1.206i |
| 23.5 | 0.512 + 0.807i | 0.514 + 0.990i | 0.068 + 0.802i | 0.070 + 0.988i | 0.503 + 0.646i | 0.295 + 1.350i | 0.068 + 0.637i | 0.088 + 1.204i |
| 23.6 | 0.514 + 0.808i | 0.515 + 0.990i | 0.068 + 0.803i | 0.070 + 0.989i | 0.505 + 0.647i | 0.294 + 1.349i | 0.069 + 0.639i | 0.088 + 1.203i |
| 23.7 | 0.516 + 0.810i | 0.517 + 0.990i | 0.069 + 0.804i | 0.070 + 0.989i | 0.506 + 0.649i | 0.293 + 1.346i | 0.069 + 0.641i | 0.088 + 1.202i |
| 23.8 | 0.517 + 0.811i | 0.519 + 0.991i | 0.069 + 0.806i | 0.071 + 0.989i | 0.507 + 0.649i | 0.293 + 1.346i | 0.069 + 0.642i | 0.087 + 1.200i |
| 23.9 | 0.519 + 0.813i | 0.521 + 0.992i | 0.070 + 0.807i | 0.072 + 0.990i | 0.509 + 0.651i | 0.292 + 1.344i | 0.070 + 0.644i | 0.087 + 1.198i |
| 24 | 0.521 + 0.814i | 0.523 + 0.992i | 0.070 + 0.808i | 0.072 + 0.991i | 0.510 + 0.652i | 0.292 + 1.343i | 0.070 + 0.644i | 0.087 + 1.198i |
| 24.1 | 0.522 + 0.815i | 0.525 + 0.993i | 0.070 + 0.809i | 0.073 + 0.990i | 0.512 + 0.654i | 0.292 + 1.341i | 0.070 + 0.646i | 0.087 + 1.196i |
| 24.2 | 0.524 + 0.817i | 0.527 + 0.994i | 0.070 + 0.809i | 0.073 + 0.990i | 0.514 + 0.655i | 0.292 + 1.341i | 0.070 + 0.646i | 0.087 + 1.196i |
| 24.3 | 0.527 + 0.823i | 0.538 + 1.005i | 0.071 + 0.808i | 0.073 + 0.986i | 0.516 + 0.659i | 0.273 + 1.327i | 0.071 + 0.645i | 0.087 + 1.193i |
| 24.4 | 0.529 + 0.824i | 0.541 + 1.006i | 0.071 + 0.807i | 0.073 + 0.984i | 0.518 + 0.661i | 0.271 + 1.324i | 0.071 + 0.645i | 0.086 + 1.191i |
| 24.5 | 0.531 + 0.826i | 0.543 + 1.007i | 0.072 + 0.808i | 0.073 + 0.984i | 0.519 + 0.663i | 0.269 + 1.321i | 0.071 + 0.646i | 0.086 + 1.190i |
| 24.6 | 0.532 + 0.827i | 0.544 + 1.008i | 0.072 + 0.809i | 0.073 + 0.985i | 0.520 + 0.664i | 0.269 + 1.320i | 0.072 + 0.647i | 0.086 + 1.189i |
| 24.7 | 0.534 + 0.828i | 0.545 + 1.008i | 0.073 + 0.811i | 0.074 + 0.986i | 0.523 + 0.664i | 0.268 + 1.318i | 0.072 + 0.650i | 0.086 + 1.188i |
| 24.8 | 0.534 + 0.829i | 0.546 + 1.009i | 0.073 + 0.811i | 0.074 + 0.986i | 0.523 + 0.665i | 0.268 + 1.317i | 0.072 + 0.650i | 0.086 + 1.187i |
| 24.9 | 0.536 + 0.830i | 0.548 + 1.009i | 0.074 + 0.812i | 0.075 + 0.987i | 0.524 + 0.667i | 0.268 + 1.315i | 0.073 + 0.651i | 0.086 + 1.186i |
| 25 | 0.536 + 0.831i | 0.548 + 1.010i | 0.074 + 0.814i | 0.075 + 0.988i | 0.525 + 0.667i | 0.269 + 1.315i | 0.073 + 0.653i | 0.087 + 1.186i |

| SNR | a33 | a34 | a35 | a36 | a37 | a38 | a39 | a40 |
|---|---|---|---|---|---|---|---|---|
| 10 | 0.317 + 0.178i | 0.317 + 0.164i | 0.576 + 0.312i | 0.611 + 0.218i | 0.319 + 0.179i | 0.316 + 0.165i | 0.582 + 0.315i | 0.620 + 0.219i |
| 10.1 | 0.315 + 0.176i | 0.316 + 0.162i | 0.579 + 0.314i | 0.616 + 0.217i | 0.316 + 0.178i | 0.315 + 0.163i | 0.584 + 0.317i | 0.624 + 0.217i |
| 10.2 | 0.314 + 0.175i | 0.315 + 0.161i | 0.582 + 0.316i | 0.621 + 0.215i | 0.315 + 0.176i | 0.313 + 0.162i | 0.586 + 0.319i | 0.628 + 0.215i |
| 10.3 | 0.313 + 0.174i | 0.314 + 0.160i | 0.584 + 0.319i | 0.625 + 0.213i | 0.313 + 0.175i | 0.311 + 0.160i | 0.588 + 0.321i | 0.632 + 0.213i |
| 10.4 | 0.311 + 0.173i | 0.313 + 0.158i | 0.586 + 0.321i | 0.630 + 0.211i | 0.311 + 0.174i | 0.310 + 0.158i | 0.590 + 0.323i | 0.636 + 0.211i |
| 10.5 | 0.310 + 0.173i | 0.312 + 0.157i | 0.588 + 0.323i | 0.634 + 0.209i | 0.310 + 0.173i | 0.310 + 0.157i | 0.591 + 0.325i | 0.639 + 0.209i |
| 10.6 | 0.309 + 0.172i | 0.311 + 0.156i | 0.589 + 0.325i | 0.638 + 0.207i | 0.309 + 0.172i | 0.309 + 0.156i | 0.592 + 0.327i | 0.643 + 0.207i |

-continued

| 256NUC | | | | | | | | |
|---|---|---|---|---|---|---|---|---|
| 10.7 | 0.309 + 0.171i | 0.311 + 0.155i | 0.591 + 0.327i | 0.641 + 0.205i | 0.308 + 0.171i | 0.308 + 0.155i | 0.594 + 0.329i | 0.646 + 0.205i |
| 10.8 | 0.308 + 0.171i | 0.311 + 0.153i | 0.593 + 0.329i | 0.645 + 0.203i | 0.307 + 0.171i | 0.307 + 0.153i | 0.595 + 0.331i | 0.649 + 0.203i |
| 10.9 | 0.307 + 0.170i | 0.309 + 0.153i | 0.594 + 0.331i | 0.649 + 0.201i | 0.306 + 0.170i | 0.306 + 0.153i | 0.596 + 0.333i | 0.652 + 0.201i |
| 11 | 0.307 + 0.170i | 0.309 + 0.152i | 0.595 + 0.333i | 0.652 + 0.199i | 0.305 + 0.170i | 0.306 + 0.152i | 0.597 + 0.335i | 0.654 + 0.199i |
| 11.1 | 0.307 + 0.169i | 0.309 + 0.151i | 0.596 + 0.335i | 0.655 + 0.197i | 0.304 + 0.169i | 0.306 + 0.151i | 0.597 + 0.337i | 0.657 + 0.197i |
| 11.2 | 0.307 + 0.169i | 0.309 + 0.150i | 0.598 + 0.337i | 0.658 + 0.195i | 0.304 + 0.169i | 0.306 + 0.150i | 0.598 + 0.339i | 0.660 + 0.195i |
| 11.3 | 0.306 + 0.169i | 0.309 + 0.149i | 0.598 + 0.339i | 0.661 + 0.193i | 0.304 + 0.169i | 0.305 + 0.149i | 0.599 + 0.342i | 0.662 + 0.193i |
| 11.4 | 0.306 + 0.169i | 0.309 + 0.148i | 0.599 + 0.342i | 0.663 + 0.191i | 0.304 + 0.168i | 0.305 + 0.148i | 0.599 + 0.344i | 0.664 + 0.191i |
| 11.5 | 0.306 + 0.168i | 0.309 + 0.147i | 0.600 + 0.343i | 0.665 + 0.189i | 0.303 + 0.168i | 0.305 + 0.147i | 0.600 + 0.346i | 0.666 + 0.188i |
| 11.6 | 0.306 + 0.168i | 0.309 + 0.146i | 0.600 + 0.345i | 0.666 + 0.187i | 0.303 + 0.167i | 0.305 + 0.146i | 0.599 + 0.347i | 0.667 + 0.186i |
| 11.7 | 0.305 + 0.167i | 0.308 + 0.145i | 0.600 + 0.346i | 0.668 + 0.185i | 0.302 + 0.167i | 0.305 + 0.145i | 0.599 + 0.350i | 0.668 + 0.184i |
| 11.8 | 0.305 + 0.167i | 0.308 + 0.144i | 0.600 + 0.347i | 0.670 + 0.184i | 0.302 + 0.166i | 0.304 + 0.144i | 0.599 + 0.351i | 0.670 + 0.182i |
| 11.9 | 0.304 + 0.167i | 0.308 + 0.144i | 0.600 + 0.349i | 0.671 + 0.182i | 0.301 + 0.166i | 0.304 + 0.144i | 0.599 + 0.353i | 0.671 + 0.180i |
| 12 | 0.304 + 0.166i | 0.308 + 0.142i | 0.600 + 0.351i | 0.672 + 0.180i | 0.301 + 0.166i | 0.305 + 0.142i | 0.599 + 0.354i | 0.671 + 0.178i |
| 12.1 | 0.304 + 0.166i | 0.308 + 0.142i | 0.601 + 0.352i | 0.673 + 0.178i | 0.301 + 0.165i | 0.305 + 0.142i | 0.598 + 0.356i | 0.672 + 0.176i |
| 12.2 | 0.304 + 0.165i | 0.308 + 0.141i | 0.600 + 0.353i | 0.674 + 0.177i | 0.301 + 0.165i | 0.305 + 0.141i | 0.598 + 0.357i | 0.673 + 0.174i |
| 12.3 | 0.304 + 0.165i | 0.308 + 0.140i | 0.601 + 0.355i | 0.676 + 0.175i | 0.301 + 0.165i | 0.305 + 0.140i | 0.598 + 0.359i | 0.674 + 0.173i |
| 12.4 | 0.304 + 0.165i | 0.310 + 0.139i | 0.601 + 0.356i | 0.677 + 0.173i | 0.301 + 0.165i | 0.306 + 0.139i | 0.598 + 0.361i | 0.675 + 0.171i |
| 12.5 | 0.305 + 0.164i | 0.310 + 0.138i | 0.601 + 0.358i | 0.678 + 0.172i | 0.301 + 0.164i | 0.307 + 0.138i | 0.598 + 0.362i | 0.675 + 0.169i |
| 12.6 | 0.305 + 0.164i | 0.311 + 0.137i | 0.601 + 0.359i | 0.679 + 0.170i | 0.302 + 0.164i | 0.309 + 0.137i | 0.597 + 0.363i | 0.676 + 0.167i |
| 12.7 | 0.305 + 0.163i | 0.312 + 0.136i | 0.601 + 0.361i | 0.680 + 0.169i | 0.302 + 0.163i | 0.310 + 0.136i | 0.597 + 0.365i | 0.677 + 0.166i |
| 12.8 | 0.326 + 0.161i | 0.336 + 0.132i | 0.606 + 0.366i | 0.700 + 0.168i | 0.322 + 0.161i | 0.333 + 0.132i | 0.600 + 0.368i | 0.694 + 0.166i |
| 12.9 | 0.337 + 0.163i | 0.350 + 0.131i | 0.605 + 0.372i | 0.706 + 0.168i | 0.333 + 0.162i | 0.348 + 0.130i | 0.600 + 0.373i | 0.701 + 0.165i |
| 13 | 0.348 + 0.164i | 0.365 + 0.129i | 0.605 + 0.378i | 0.713 + 0.168i | 0.345 + 0.163i | 0.363 + 0.129i | 0.599 + 0.379i | 0.708 + 0.165i |
| 13.1 | 0.354 + 0.164i | 0.373 + 0.128i | 0.605 + 0.381i | 0.718 + 0.167i | 0.351 + 0.164i | 0.371 + 0.127i | 0.599 + 0.382i | 0.711 + 0.164i |
| 13.2 | 0.362 + 0.165i | 0.384 + 0.126i | 0.605 + 0.386i | 0.724 + 0.166i | 0.359 + 0.165i | 0.382 + 0.126i | 0.598 + 0.386i | 0.718 + 0.162i |
| 13.3 | 0.365 + 0.165i | 0.388 + 0.125i | 0.604 + 0.388i | 0.727 + 0.165i | 0.362 + 0.165i | 0.386 + 0.125i | 0.597 + 0.388i | 0.720 + 0.161i |
| 13.4 | 0.371 + 0.167i | 0.396 + 0.124i | 0.603 + 0.391i | 0.733 + 0.164i | 0.369 + 0.166i | 0.394 + 0.124i | 0.596 + 0.391i | 0.726 + 0.160i |
| 13.5 | 0.375 + 0.167i | 0.401 + 0.123i | 0.603 + 0.393i | 0.738 + 0.162i | 0.373 + 0.167i | 0.400 + 0.123i | 0.595 + 0.393i | 0.730 + 0.158i |
| 13.6 | 0.378 + 0.167i | 0.405 + 0.122i | 0.602 + 0.396i | 0.742 + 0.161i | 0.376 + 0.167i | 0.403 + 0.122i | 0.594 + 0.394i | 0.732 + 0.157i |
| 13.7 | 0.400 + 0.165i | 0.435 + 0.119i | 0.604 + 0.407i | 0.769 + 0.159i | 0.399 + 0.164i | 0.433 + 0.119i | 0.596 + 0.405i | 0.755 + 0.159i |
| 13.8 | 0.402 + 0.165i | 0.437 + 0.118i | 0.604 + 0.409i | 0.773 + 0.158i | 0.400 + 0.165i | 0.436 + 0.118i | 0.595 + 0.407i | 0.758 + 0.157i |
| 13.9 | 0.403 + 0.165i | 0.440 + 0.117i | 0.603 + 0.412i | 0.777 + 0.156i | 0.403 + 0.165i | 0.440 + 0.117i | 0.593 + 0.409i | 0.762 + 0.155i |
| 14 | 0.405 + 0.166i | 0.442 + 0.117i | 0.602 + 0.414i | 0.781 + 0.155i | 0.405 + 0.166i | 0.442 + 0.117i | 0.592 + 0.410i | 0.765 + 0.153i |
| 14.1 | 0.406 + 0.166i | 0.444 + 0.117i | 0.601 + 0.416i | 0.784 + 0.153i | 0.406 + 0.166i | 0.444 + 0.117i | 0.591 + 0.411i | 0.768 + 0.151i |
| 14.2 | 0.407 + 0.166i | 0.446 + 0.116i | 0.600 + 0.418i | 0.788 + 0.152i | 0.408 + 0.166i | 0.448 + 0.116i | 0.589 + 0.413i | 0.771 + 0.150i |
| 14.3 | 0.408 + 0.166i | 0.448 + 0.115i | 0.599 + 0.421i | 0.790 + 0.150i | 0.409 + 0.167i | 0.449 + 0.115i | 0.588 + 0.415i | 0.772 + 0.148i |
| 14.4 | 0.409 + 0.166i | 0.450 + 0.115i | 0.598 + 0.422i | 0.794 + 0.149i | 0.411 + 0.168i | 0.452 + 0.115i | 0.586 + 0.416i | 0.775 + 0.147i |
| 14.5 | 0.410 + 0.167i | 0.452 + 0.115i | 0.598 + 0.425i | 0.796 + 0.148i | 0.412 + 0.168i | 0.455 + 0.115i | 0.585 + 0.418i | 0.777 + 0.145i |
| 14.6 | 0.411 + 0.167i | 0.454 + 0.114i | 0.597 + 0.427i | 0.799 + 0.147i | 0.414 + 0.169i | 0.457 + 0.115i | 0.584 + 0.419i | 0.779 + 0.144i |
| 14.7 | 0.412 + 0.168i | 0.456 + 0.114i | 0.596 + 0.429i | 0.802 + 0.145i | 0.415 + 0.169i | 0.460 + 0.114i | 0.583 + 0.421i | 0.781 + 0.142i |
| 14.8 | 0.413 + 0.168i | 0.458 + 0.113i | 0.595 + 0.432i | 0.804 + 0.144i | 0.416 + 0.170i | 0.463 + 0.114i | 0.581 + 0.422i | 0.783 + 0.141i |
| 14.9 | 0.413 + 0.168i | 0.459 + 0.113i | 0.595 + 0.434i | 0.806 + 0.144i | 0.418 + 0.171i | 0.465 + 0.113i | 0.580 + 0.424i | 0.784 + 0.139i |
| 15 | 0.414 + 0.168i | 0.461 + 0.112i | 0.594 + 0.437i | 0.808 + 0.142i | 0.419 + 0.172i | 0.468 + 0.113i | 0.579 + 0.425i | 0.785 + 0.137i |
| 15.1 | 0.414 + 0.168i | 0.463 + 0.112i | 0.594 + 0.439i | 0.811 + 0.141i | 0.420 + 0.172i | 0.471 + 0.113i | 0.578 + 0.427i | 0.787 + 0.136i |
| 15.2 | 0.415 + 0.168i | 0.465 + 0.111i | 0.593 + 0.441i | 0.812 + 0.139i | 0.422 + 0.173i | 0.474 + 0.112i | 0.576 + 0.428i | 0.788 + 0.134i |
| 15.3 | 0.415 + 0.168i | 0.467 + 0.110i | 0.593 + 0.444i | 0.814 + 0.139i | 0.422 + 0.174i | 0.477 + 0.112i | 0.575 + 0.430i | 0.789 + 0.133i |
| 15.4 | 0.415 + 0.167i | 0.468 + 0.110i | 0.593 + 0.447i | 0.816 + 0.138i | 0.423 + 0.174i | 0.479 + 0.112i | 0.574 + 0.432i | 0.790 + 0.132i |
| 15.5 | 0.963 + 0.512i | 1.064 + 0.265i | 1.210 + 0.626i | 1.313 + 0.378i | 0.878 + 0.629i | 1.094 + 0.136i | 1.074 + 0.831i | 1.354 + 0.140i |
| 15.6 | 0.969 + 0.514i | 1.071 + 0.273i | 1.210 + 0.630i | 1.314 + 0.383i | 0.878 + 0.638i | 1.103 + 0.133i | 1.070 + 0.837i | 1.358 + 0.139i |
| 15.7 | 0.975 + 0.516i | 1.076 + 0.280i | 1.210 + 0.633i | 1.316 + 0.387i | 0.878 + 0.647i | 1.111 + 0.131i | 1.067 + 0.843i | 1.361 + 0.138i |
| 15.8 | 0.980 + 0.518i | 1.081 + 0.287i | 1.210 + 0.636i | 1.317 + 0.390i | 0.878 + 0.654i | 1.117 + 0.128i | 1.064 + 0.848i | 1.365 + 0.138i |
| 15.9 | 0.984 + 0.519i | 1.083 + 0.291i | 1.210 + 0.637i | 1.317 + 0.391i | 0.878 + 0.660i | 1.122 + 0.126i | 1.062 + 0.850i | 1.366 + 0.137i |
| 16 | 0.988 + 0.520i | 1.086 + 0.295i | 1.210 + 0.639i | 1.318 + 0.393i | 0.879 + 0.667i | 1.125 + 0.124i | 1.061 + 0.853i | 1.367 + 0.136i |
| 16.1 | 0.991 + 0.521i | 1.088 + 0.299i | 1.210 + 0.640i | 1.317 + 0.393i | 0.880 + 0.672i | 1.129 + 0.122i | 1.060 + 0.855i | 1.367 + 0.136i |
| 16.2 | 0.993 + 0.521i | 1.089 + 0.302i | 1.209 + 0.639i | 1.317 + 0.394i | 0.880 + 0.676i | 1.130 + 0.121i | 1.059 + 0.855i | 1.367 + 0.136i |
| 16.3 | 0.995 + 0.521i | 1.090 + 0.304i | 1.209 + 0.639i | 1.316 + 0.393i | 0.880 + 0.679i | 1.131 + 0.119i | 1.059 + 0.855i | 1.366 + 0.135i |
| 16.4 | 0.997 + 0.521i | 1.091 + 0.306i | 1.209 + 0.638i | 1.315 + 0.392i | 0.881 + 0.683i | 1.132 + 0.118i | 1.059 + 0.856i | 1.364 + 0.134i |
| 16.5 | 0.998 + 0.521i | 1.091 + 0.308i | 1.208 + 0.638i | 1.314 + 0.393i | 0.880 + 0.685i | 1.133 + 0.116i | 1.059 + 0.855i | 1.364 + 0.134i |
| 16.6 | 0.999 + 0.521i | 1.090 + 0.309i | 1.207 + 0.636i | 1.313 + 0.392i | 0.880 + 0.688i | 1.133 + 0.115i | 1.059 + 0.855i | 1.363 + 0.133i |
| 16.7 | 1.000 + 0.521i | 1.090 + 0.311i | 1.206 + 0.635i | 1.311 + 0.391i | 0.880 + 0.690i | 1.133 + 0.113i | 1.059 + 0.854i | 1.362 + 0.133i |
| 16.8 | 0.999 + 0.520i | 1.089 + 0.312i | 1.205 + 0.634i | 1.309 + 0.390i | 0.880 + 0.692i | 1.131 + 0.113i | 1.059 + 0.853i | 1.359 + 0.133i |
| 16.9 | 1.000 + 0.520i | 1.088 + 0.313i | 1.204 + 0.633i | 1.307 + 0.389i | 0.880 + 0.694i | 1.130 + 0.112i | 1.059 + 0.851i | 1.356 + 0.132i |
| 17 | 0.999 + 0.520i | 1.087 + 0.313i | 1.203 + 0.632i | 1.306 + 0.388i | 0.880 + 0.695i | 1.129 + 0.111i | 1.060 + 0.850i | 1.355 + 0.131i |
| 17.1 | 0.999 + 0.518i | 1.086 + 0.313i | 1.202 + 0.629i | 1.304 + 0.386i | 0.880 + 0.695i | 1.128 + 0.110i | 1.060 + 0.848i | 1.353 + 0.131i |
| 17.2 | 1.000 + 0.517i | 1.086 + 0.314i | 1.202 + 0.629i | 1.303 + 0.386i | 0.880 + 0.697i | 1.128 + 0.109i | 1.060 + 0.847i | 1.352 + 0.130i |
| 17.3 | 1.001 + 0.517i | 1.087 + 0.315i | 1.201 + 0.629i | 1.303 + 0.386i | 0.881 + 0.697i | 1.128 + 0.108i | 1.060 + 0.846i | 1.352 + 0.130i |
| 17.4 | 1.002 + 0.517i | 1.087 + 0.315i | 1.201 + 0.627i | 1.303 + 0.385i | 0.881 + 0.697i | 1.128 + 0.108i | 1.060 + 0.846i | 1.351 + 0.130i |
| 17.5 | 1.002 + 0.517i | 1.087 + 0.315i | 1.201 + 0.627i | 1.303 + 0.384i | 0.882 + 0.698i | 1.129 + 0.108i | 1.061 + 0.845i | 1.351 + 0.130i |
| 17.6 | 1.003 + 0.517i | 1.087 + 0.316i | 1.201 + 0.627i | 1.302 + 0.384i | 0.882 + 0.699i | 1.129 + 0.108i | 1.062 + 0.845i | 1.350 + 0.130i |
| 17.7 | 1.004 + 0.516i | 1.088 + 0.316i | 1.202 + 0.626i | 1.302 + 0.383i | 0.884 + 0.699i | 1.129 + 0.107i | 1.063 + 0.843i | 1.350 + 0.129i |
| 17.8 | 1.005 + 0.516i | 1.088 + 0.316i | 1.202 + 0.626i | 1.302 + 0.383i | 0.885 + 0.699i | 1.130 + 0.107i | 1.063 + 0.843i | 1.351 + 0.129i |
| 17.9 | 0.961 + 0.424i | 0.998 + 0.239i | 1.214 + 0.479i | 1.201 + 0.287i | 0.919 + 0.571i | 1.013 + 0.094i | 1.141 + 0.690i | 1.225 + 0.110i |
| 18 | 0.961 + 0.422i | 0.998 + 0.241i | 1.213 + 0.479i | 1.200 + 0.288i | 0.918 + 0.573i | 1.013 + 0.093i | 1.138 + 0.690i | 1.224 + 0.109i |
| 18.1 | 0.961 + 0.423i | 0.998 + 0.244i | 1.211 + 0.480i | 1.199 + 0.290i | 0.916 + 0.576i | 1.013 + 0.092i | 1.136 + 0.691i | 1.223 + 0.108i |
| 18.2 | 0.961 + 0.423i | 0.998 + 0.245i | 1.210 + 0.481i | 1.200 + 0.290i | 0.915 + 0.577i | 1.014 + 0.091i | 1.133 + 0.691i | 1.224 + 0.108i |
| 18.3 | 0.962 + 0.422i | 0.999 + 0.247i | 1.208 + 0.482i | 1.201 + 0.291i | 0.914 + 0.580i | 1.015 + 0.089i | 1.131 + 0.692i | 1.224 + 0.108i |

-continued

| 256NUC | | | | | | | | |
|---|---|---|---|---|---|---|---|---|
| 18.4 | 0.963 + 0.422i | 1.000 + 0.247i | 1.208 + 0.482i | 1.201 + 0.290i | 0.915 + 0.581i | 1.016 + 0.089i | 1.131 + 0.693i | 1.224 + 0.107i |
| 18.5 | 0.959 + 0.410i | 0.991 + 0.239i | 1.211 + 0.463i | 1.191 + 0.278i | 0.924 + 0.563i | 1.002 + 0.087i | 1.142 + 0.672i | 1.212 + 0.102i |
| 18.6 | 0.959 + 0.409i | 0.989 + 0.239i | 1.209 + 0.463i | 1.189 + 0.277i | 0.922 + 0.563i | 1.001 + 0.085i | 1.140 + 0.671i | 1.211 + 0.101i |
| 18.7 | 0.949 + 0.412i | 0.981 + 0.243i | 1.199 + 0.463i | 1.179 + 0.278i | 0.911 + 0.566i | 0.993 + 0.086i | 1.131 + 0.668i | 1.199 + 0.102i |
| 18.8 | 0.948 + 0.412i | 0.980 + 0.245i | 1.197 + 0.463i | 1.178 + 0.279i | 0.910 + 0.568i | 0.993 + 0.085i | 1.129 + 0.669i | 1.198 + 0.102i |
| 18.9 | 0.949 + 0.411i | 0.980 + 0.246i | 1.196 + 0.463i | 1.178 + 0.279i | 0.910 + 0.569i | 0.992 + 0.084i | 1.128 + 0.669i | 1.197 + 0.101i |
| 19 | 0.949 + 0.412i | 0.980 + 0.246i | 1.195 + 0.463i | 1.177 + 0.278i | 0.910 + 0.570i | 0.992 + 0.083i | 1.127 + 0.669i | 1.196 + 0.100i |
| 19.1 | 0.949 + 0.412i | 0.979 + 0.247i | 1.195 + 0.463i | 1.177 + 0.278i | 0.911 + 0.571i | 0.992 + 0.083i | 1.127 + 0.669i | 1.195 + 0.099i |
| 19.2 | 0.336 + 0.091i | 0.505 + 0.073i | 0.617 + 0.560i | 0.786 + 0.094i | 0.331 + 0.090i | 0.531 + 0.072i | 0.528 + 0.570i | 0.729 + 0.083i |
| 19.3 | 0.336 + 0.092i | 0.505 + 0.073i | 0.621 + 0.559i | 0.787 + 0.094i | 0.331 + 0.090i | 0.531 + 0.072i | 0.528 + 0.568i | 0.727 + 0.082i |
| 19.4 | 0.336 + 0.092i | 0.504 + 0.073i | 0.625 + 0.559i | 0.788 + 0.093i | 0.331 + 0.090i | 0.532 + 0.071i | 0.527 + 0.568i | 0.725 + 0.082i |
| 19.5 | 0.337 + 0.093i | 0.504 + 0.073i | 0.630 + 0.558i | 0.789 + 0.093i | 0.331 + 0.090i | 0.533 + 0.071i | 0.527 + 0.566i | 0.724 + 0.081i |
| 19.6 | 0.337 + 0.093i | 0.503 + 0.073i | 0.632 + 0.559i | 0.790 + 0.093i | 0.330 + 0.090i | 0.534 + 0.071i | 0.527 + 0.565i | 0.723 + 0.081i |
| 19.7 | 0.337 + 0.093i | 0.503 + 0.073i | 0.636 + 0.559i | 0.791 + 0.093i | 0.331 + 0.090i | 0.535 + 0.071i | 0.526 + 0.565i | 0.721 + 0.081i |
| 19.8 | 0.338 + 0.093i | 0.502 + 0.073i | 0.638 + 0.560i | 0.793 + 0.093i | 0.331 + 0.089i | 0.536 + 0.071i | 0.527 + 0.564i | 0.720 + 0.080i |
| 19.9 | 0.339 + 0.094i | 0.502 + 0.073i | 0.641 + 0.560i | 0.795 + 0.093i | 0.330 + 0.089i | 0.538 + 0.070i | 0.527 + 0.563i | 0.719 + 0.079i |
| 20 | 0.339 + 0.094i | 0.501 + 0.073i | 0.643 + 0.560i | 0.797 + 0.093i | 0.330 + 0.089i | 0.539 + 0.070i | 0.526 + 0.562i | 0.718 + 0.079i |
| 20.1 | 0.340 + 0.095i | 0.501 + 0.073i | 0.645 + 0.561i | 0.800 + 0.093i | 0.330 + 0.088i | 0.541 + 0.070i | 0.527 + 0.561i | 0.718 + 0.079i |
| 20.2 | 0.341 + 0.095i | 0.500 + 0.073i | 0.647 + 0.561i | 0.802 + 0.094i | 0.330 + 0.087i | 0.543 + 0.070i | 0.527 + 0.561i | 0.717 + 0.078i |
| 20.3 | 0.342 + 0.095i | 0.500 + 0.073i | 0.649 + 0.562i | 0.806 + 0.094i | 0.329 + 0.086i | 0.547 + 0.069i | 0.528 + 0.560i | 0.718 + 0.078i |
| 20.4 | 0.342 + 0.097i | 0.498 + 0.073i | 0.651 + 0.562i | 0.809 + 0.095i | 0.328 + 0.084i | 0.549 + 0.069i | 0.529 + 0.560i | 0.717 + 0.078i |
| 20.5 | 0.288 + 0.115i | 0.423 + 0.069i | 0.680 + 0.548i | 0.793 + 0.094i | 0.236 + 0.059i | 0.537 + 0.064i | 0.565 + 0.550i | 0.675 + 0.076i |
| 20.6 | 0.286 + 0.116i | 0.420 + 0.068i | 0.682 + 0.548i | 0.794 + 0.094i | 0.231 + 0.058i | 0.540 + 0.064i | 0.567 + 0.550i | 0.675 + 0.077i |
| 20.7 | 0.283 + 0.118i | 0.417 + 0.067i | 0.685 + 0.548i | 0.796 + 0.094i | 0.227 + 0.058i | 0.541 + 0.064i | 0.570 + 0.550i | 0.674 + 0.077i |
| 20.8 | 0.282 + 0.120i | 0.415 + 0.066i | 0.708 + 0.550i | 0.804 + 0.094i | 0.220 + 0.056i | 0.550 + 0.064i | 0.593 + 0.560i | 0.680 + 0.077i |
| 20.9 | 0.281 + 0.122i | 0.416 + 0.065i | 0.711 + 0.552i | 0.806 + 0.095i | 0.220 + 0.055i | 0.552 + 0.064i | 0.595 + 0.561i | 0.681 + 0.077i |
| 21 | 0.281 + 0.124i | 0.415 + 0.065i | 0.713 + 0.554i | 0.808 + 0.095i | 0.219 + 0.055i | 0.554 + 0.065i | 0.597 + 0.562i | 0.682 + 0.077i |
| 21.1 | 0.280 + 0.126i | 0.415 + 0.065i | 0.716 + 0.556i | 0.809 + 0.094i | 0.219 + 0.055i | 0.555 + 0.065i | 0.600 + 0.563i | 0.683 + 0.077i |
| 21.2 | 0.280 + 0.128i | 0.415 + 0.064i | 0.720 + 0.557i | 0.811 + 0.094i | 0.218 + 0.054i | 0.557 + 0.065i | 0.605 + 0.565i | 0.684 + 0.078i |
| 21.3 | 0.280 + 0.130i | 0.415 + 0.064i | 0.724 + 0.559i | 0.814 + 0.094i | 0.218 + 0.054i | 0.558 + 0.065i | 0.607 + 0.567i | 0.685 + 0.078i |
| 21.4 | 0.280 + 0.132i | 0.415 + 0.063i | 0.727 + 0.561i | 0.815 + 0.094i | 0.219 + 0.054i | 0.559 + 0.065i | 0.610 + 0.569i | 0.686 + 0.078i |
| 21.5 | 0.280 + 0.133i | 0.416 + 0.064i | 0.729 + 0.564i | 0.816 + 0.094i | 0.220 + 0.054i | 0.561 + 0.065i | 0.612 + 0.570i | 0.687 + 0.078i |
| 21.6 | 0.280 + 0.135i | 0.416 + 0.064i | 0.733 + 0.565i | 0.818 + 0.094i | 0.221 + 0.054i | 0.562 + 0.065i | 0.615 + 0.572i | 0.689 + 0.078i |
| 21.7 | 0.280 + 0.137i | 0.417 + 0.063i | 0.735 + 0.567i | 0.819 + 0.094i | 0.222 + 0.054i | 0.563 + 0.065i | 0.617 + 0.572i | 0.689 + 0.078i |
| 21.8 | 0.280 + 0.138i | 0.417 + 0.063i | 0.738 + 0.559i | 0.820 + 0.093i | 0.223 + 0.054i | 0.564 + 0.065i | 0.619 + 0.573i | 0.690 + 0.079i |
| 21.9 | 0.280 + 0.140i | 0.417 + 0.063i | 0.741 + 0.570i | 0.821 + 0.093i | 0.223 + 0.054i | 0.564 + 0.065i | 0.621 + 0.574i | 0.690 + 0.079i |
| 22 | 0.280 + 0.142i | 0.418 + 0.063i | 0.744 + 0.572i | 0.823 + 0.093i | 0.225 + 0.054i | 0.565 + 0.065i | 0.622 + 0.575i | 0.692 + 0.079i |
| 22.1 | 0.280 + 0.143i | 0.418 + 0.062i | 0.747 + 0.573i | 0.824 + 0.093i | 0.226 + 0.054i | 0.566 + 0.065i | 0.625 + 0.577i | 0.692 + 0.079i |
| 22.2 | 0.281 + 0.144i | 0.419 + 0.063i | 0.751 + 0.575i | 0.826 + 0.093i | 0.227 + 0.054i | 0.568 + 0.065i | 0.627 + 0.578i | 0.694 + 0.080i |
| 22.3 | 0.282 + 0.146i | 0.420 + 0.063i | 0.754 + 0.575i | 0.828 + 0.093i | 0.229 + 0.055i | 0.569 + 0.065i | 0.631 + 0.579i | 0.696 + 0.080i |
| 22.4 | 0.283 + 0.147i | 0.421 + 0.063i | 0.767 + 0.567i | 0.830 + 0.092i | 0.231 + 0.055i | 0.570 + 0.065i | 0.644 + 0.596i | 0.697 + 0.080i |
| 22.5 | 0.283 + 0.148i | 0.422 + 0.063i | 0.770 + 0.567i | 0.832 + 0.092i | 0.232 + 0.055i | 0.571 + 0.066i | 0.646 + 0.598i | 0.698 + 0.081i |
| 22.6 | 0.776 + 0.335i | 0.782 + 0.192i | 0.937 + 0.338i | 0.965 + 0.205i | 0.791 + 0.484i | 0.796 + 0.063i | 0.980 + 0.473i | 0.993 + 0.068i |
| 22.7 | 0.776 + 0.336i | 0.783 + 0.193i | 0.937 + 0.340i | 0.965 + 0.205i | 0.792 + 0.485i | 0.797 + 0.063i | 0.981 + 0.475i | 0.993 + 0.068i |
| 22.8 | 0.777 + 0.337i | 0.783 + 0.194i | 0.938 + 0.341i | 0.964 + 0.206i | 0.794 + 0.486i | 0.798 + 0.063i | 0.982 + 0.476i | 0.993 + 0.069i |
| 22.9 | 0.778 + 0.339i | 0.784 + 0.195i | 0.939 + 0.341i | 0.964 + 0.206i | 0.795 + 0.487i | 0.799 + 0.063i | 0.982 + 0.477i | 0.993 + 0.069i |
| 23 | 0.779 + 0.339i | 0.785 + 0.196i | 0.939 + 0.342i | 0.965 + 0.207i | 0.796 + 0.488i | 0.801 + 0.064i | 0.982 + 0.479i | 0.994 + 0.069i |
| 23.1 | 0.779 + 0.341i | 0.786 + 0.198i | 0.940 + 0.344i | 0.964 + 0.208i | 0.797 + 0.490i | 0.801 + 0.064i | 0.983 + 0.480i | 0.994 + 0.070i |
| 23.2 | 0.780 + 0.343i | 0.786 + 0.198i | 0.939 + 0.345i | 0.963 + 0.208i | 0.798 + 0.492i | 0.802 + 0.064i | 0.983 + 0.481i | 0.995 + 0.070i |
| 23.3 | 0.780 + 0.344i | 0.787 + 0.199i | 0.940 + 0.346i | 0.963 + 0.208i | 0.799 + 0.492i | 0.803 + 0.065i | 0.983 + 0.482i | 0.995 + 0.070i |
| 23.4 | 0.796 + 0.363i | 0.790 + 0.212i | 0.967 + 0.380i | 0.949 + 0.220i | 0.818 + 0.517i | 0.798 + 0.069i | 1.015 + 0.537i | 0.978 + 0.070i |
| 23.5 | 0.798 + 0.366i | 0.789 + 0.214i | 0.969 + 0.382i | 0.947 + 0.222i | 0.820 + 0.520i | 0.799 + 0.069i | 1.018 + 0.541i | 0.977 + 0.071i |
| 23.6 | 0.798 + 0.367i | 0.790 + 0.215i | 0.970 + 0.383i | 0.947 + 0.222i | 0.822 + 0.522i | 0.800 + 0.069i | 1.020 + 0.543i | 0.978 + 0.071i |
| 23.7 | 0.799 + 0.368i | 0.790 + 0.216i | 0.971 + 0.384i | 0.947 + 0.224i | 0.823 + 0.522i | 0.801 + 0.070i | 1.020 + 0.545i | 0.978 + 0.072i |
| 23.8 | 0.800 + 0.370i | 0.790 + 0.217i | 0.972 + 0.386i | 0.946 + 0.225i | 0.825 + 0.525i | 0.801 + 0.070i | 1.021 + 0.547i | 0.978 + 0.072i |
| 23.9 | 0.800 + 0.370i | 0.789 + 0.217i | 0.972 + 0.386i | 0.945 + 0.225i | 0.826 + 0.526i | 0.802 + 0.071i | 1.021 + 0.549i | 0.978 + 0.072i |
| 24 | 0.801 + 0.371i | 0.789 + 0.217i | 0.972 + 0.387i | 0.945 + 0.226i | 0.827 + 0.526i | 0.803 + 0.071i | 1.021 + 0.550i | 0.979 + 0.072i |
| 24.1 | 0.801 + 0.372i | 0.788 + 0.218i | 0.972 + 0.388i | 0.945 + 0.226i | 0.828 + 0.528i | 0.803 + 0.071i | 1.022 + 0.550i | 0.979 + 0.073i |
| 24.2 | 0.802 + 0.372i | 0.788 + 0.218i | 0.973 + 0.388i | 0.944 + 0.226i | 0.828 + 0.528i | 0.803 + 0.071i | 1.022 + 0.550i | 0.979 + 0.073i |
| 24.3 | 0.800 + 0.374i | 0.787 + 0.220i | 0.969 + 0.385i | 0.941 + 0.226i | 0.827 + 0.530i | 0.803 + 0.072i | 1.017 + 0.544i | 0.978 + 0.073i |
| 24.4 | 0.801 + 0.376i | 0.786 + 0.221i | 0.970 + 0.387i | 0.940 + 0.227i | 0.829 + 0.532i | 0.805 + 0.073i | 1.017 + 0.546i | 0.979 + 0.073i |
| 24.5 | 0.801 + 0.377i | 0.786 + 0.222i | 0.970 + 0.387i | 0.941 + 0.228i | 0.830 + 0.533i | 0.806 + 0.073i | 1.018 + 0.547i | 0.980 + 0.074i |
| 24.6 | 0.803 + 0.377i | 0.786 + 0.222i | 0.971 + 0.388i | 0.941 + 0.228i | 0.830 + 0.534i | 0.808 + 0.073i | 1.018 + 0.548i | 0.981 + 0.074i |
| 24.7 | 0.803 + 0.378i | 0.786 + 0.223i | 0.972 + 0.389i | 0.941 + 0.229i | 0.832 + 0.535i | 0.808 + 0.073i | 1.019 + 0.550i | 0.982 + 0.074i |
| 24.8 | 0.804 + 0.379i | 0.787 + 0.223i | 0.973 + 0.390i | 0.941 + 0.229i | 0.833 + 0.536i | 0.810 + 0.074i | 1.019 + 0.551i | 0.983 + 0.075i |
| 24.9 | 0.804 + 0.379i | 0.787 + 0.224i | 0.973 + 0.390i | 0.941 + 0.230i | 0.834 + 0.537i | 0.811 + 0.074i | 1.019 + 0.552i | 0.984 + 0.076i |
| 25 | 0.806 + 0.381i | 0.787 + 0.225i | 0.973 + 0.391i | 0.941 + 0.231i | 0.835 + 0.538i | 0.814 + 0.074i | 1.020 + 0.552i | 0.985 + 0.076i |

| SNR | a41 | a42 | a43 | a44 | a45 | a46 | a47 | a48 |
|---|---|---|---|---|---|---|---|---|
| 10 | 0.179 + 0.316i | 0.165 + 0.315i | 0.310 + 0.571i | 0.216 + 0.609i | 0.179 + 0.315i | 0.166 + 0.318i | 0.314 + 0.576i | 0.219 + 0.615i |
| 10.1 | 0.178 + 0.315i | 0.164 + 0.313i | 0.311 + 0.574i | 0.215 + 0.613i | 0.178 + 0.312i | 0.164 + 0.316i | 0.316 + 0.579i | 0.217 + 0.619i |
| 10.2 | 0.176 + 0.313i | 0.162 + 0.311i | 0.313 + 0.577i | 0.213 + 0.618i | 0.176 + 0.310i | 0.162 + 0.313i | 0.317 + 0.581i | 0.214 + 0.624i |
| 10.3 | 0.174 + 0.311i | 0.161 + 0.309i | 0.315 + 0.579i | 0.211 + 0.622i | 0.174 + 0.308i | 0.161 + 0.311i | 0.319 + 0.584i | 0.213 + 0.628i |
| 10.4 | 0.174 + 0.310i | 0.160 + 0.308i | 0.316 + 0.581i | 0.208 + 0.627i | 0.173 + 0.306i | 0.160 + 0.310i | 0.321 + 0.585i | 0.210 + 0.632i |
| 10.5 | 0.173 + 0.308i | 0.158 + 0.306i | 0.318 + 0.583i | 0.206 + 0.631i | 0.173 + 0.305i | 0.158 + 0.308i | 0.322 + 0.587i | 0.208 + 0.636i |
| 10.6 | 0.172 + 0.307i | 0.157 + 0.304i | 0.320 + 0.585i | 0.204 + 0.634i | 0.171 + 0.303i | 0.157 + 0.306i | 0.324 + 0.589i | 0.206 + 0.639i |

-continued

| 256NUC | | | | | | | | |
|---|---|---|---|---|---|---|---|---|
| 10.7 | 0.171 + 0.306i | 0.156 + 0.304i | 0.322 + 0.586i | 0.203 + 0.637i | 0.171 + 0.302i | 0.156 + 0.305i | 0.326 + 0.590i | 0.204 + 0.642i |
| 10.8 | 0.171 + 0.305i | 0.155 + 0.303i | 0.324 + 0.588i | 0.201 + 0.641i | 0.170 + 0.301i | 0.155 + 0.304i | 0.328 + 0.591i | 0.202 + 0.646i |
| 10.9 | 0.170 + 0.304i | 0.153 + 0.302i | 0.326 + 0.590i | 0.198 + 0.644i | 0.169 + 0.300i | 0.153 + 0.303i | 0.330 + 0.593i | 0.199 + 0.649i |
| 11 | 0.169 + 0.304i | 0.153 + 0.301i | 0.328 + 0.591i | 0.196 + 0.647i | 0.168 + 0.300i | 0.152 + 0.303i | 0.332 + 0.594i | 0.198 + 0.652i |
| 11.1 | 0.169 + 0.304i | 0.152 + 0.301i | 0.330 + 0.591i | 0.195 + 0.650i | 0.168 + 0.299i | 0.152 + 0.302i | 0.334 + 0.595i | 0.196 + 0.655i |
| 11.2 | 0.168 + 0.303i | 0.151 + 0.301i | 0.333 + 0.593i | 0.193 + 0.653i | 0.168 + 0.299i | 0.150 + 0.301i | 0.336 + 0.596i | 0.193 + 0.657i |
| 11.3 | 0.168 + 0.303i | 0.150 + 0.300i | 0.334 + 0.594i | 0.191 + 0.656i | 0.167 + 0.299i | 0.150 + 0.301i | 0.339 + 0.596i | 0.191 + 0.660i |
| 11.4 | 0.167 + 0.302i | 0.148 + 0.299i | 0.336 + 0.594i | 0.189 + 0.658i | 0.166 + 0.298i | 0.148 + 0.300i | 0.340 + 0.597i | 0.189 + 0.662i |
| 11.5 | 0.167 + 0.302i | 0.148 + 0.299i | 0.338 + 0.595i | 0.187 + 0.660i | 0.166 + 0.297i | 0.148 + 0.300i | 0.342 + 0.596i | 0.187 + 0.663i |
| 11.6 | 0.167 + 0.301i | 0.147 + 0.299i | 0.340 + 0.595i | 0.186 + 0.661i | 0.165 + 0.297i | 0.147 + 0.299i | 0.344 + 0.597i | 0.185 + 0.665i |
| 11.7 | 0.166 + 0.301i | 0.146 + 0.298i | 0.342 + 0.595i | 0.184 + 0.662i | 0.165 + 0.296i | 0.146 + 0.299i | 0.346 + 0.596i | 0.183 + 0.665i |
| 11.8 | 0.166 + 0.301i | 0.145 + 0.299i | 0.344 + 0.595i | 0.182 + 0.664i | 0.165 + 0.296i | 0.145 + 0.299i | 0.348 + 0.596i | 0.181 + 0.667i |
| 11.9 | 0.165 + 0.301i | 0.144 + 0.298i | 0.345 + 0.595i | 0.180 + 0.665i | 0.164 + 0.296i | 0.144 + 0.298i | 0.350 + 0.596i | 0.179 + 0.668i |
| 12 | 0.164 + 0.300i | 0.143 + 0.298i | 0.347 + 0.595i | 0.178 + 0.666i | 0.163 + 0.296i | 0.143 + 0.298i | 0.351 + 0.596i | 0.177 + 0.669i |
| 12.1 | 0.164 + 0.300i | 0.142 + 0.298i | 0.349 + 0.595i | 0.177 + 0.667i | 0.163 + 0.295i | 0.142 + 0.298i | 0.353 + 0.596i | 0.175 + 0.670i |
| 12.2 | 0.163 + 0.300i | 0.141 + 0.298i | 0.350 + 0.595i | 0.175 + 0.669i | 0.162 + 0.295i | 0.141 + 0.298i | 0.354 + 0.595i | 0.173 + 0.670i |
| 12.3 | 0.163 + 0.299i | 0.140 + 0.298i | 0.352 + 0.595i | 0.174 + 0.669i | 0.162 + 0.296i | 0.140 + 0.299i | 0.356 + 0.595i | 0.172 + 0.671i |
| 12.4 | 0.162 + 0.299i | 0.139 + 0.299i | 0.353 + 0.595i | 0.172 + 0.670i | 0.161 + 0.296i | 0.139 + 0.299i | 0.358 + 0.595i | 0.170 + 0.671i |
| 12.5 | 0.162 + 0.299i | 0.138 + 0.298i | 0.356 + 0.595i | 0.171 + 0.671i | 0.161 + 0.295i | 0.138 + 0.299i | 0.359 + 0.594i | 0.168 + 0.671i |
| 12.6 | 0.161 + 0.298i | 0.137 + 0.298i | 0.357 + 0.595i | 0.169 + 0.671i | 0.160 + 0.295i | 0.137 + 0.299i | 0.360 + 0.594i | 0.166 + 0.671i |
| 12.7 | 0.161 + 0.298i | 0.136 + 0.298i | 0.358 + 0.595i | 0.168 + 0.671i | 0.160 + 0.295i | 0.136 + 0.299i | 0.361 + 0.593i | 0.165 + 0.671i |
| 12.8 | 0.160 + 0.279i | 0.137 + 0.280i | 0.357 + 0.584i | 0.166 + 0.652i | 0.158 + 0.274i | 0.136 + 0.280i | 0.356 + 0.583i | 0.163 + 0.652i |
| 12.9 | 0.158 + 0.271i | 0.135 + 0.271i | 0.352 + 0.583i | 0.163 + 0.647i | 0.156 + 0.266i | 0.135 + 0.272i | 0.352 + 0.582i | 0.160 + 0.647i |
| 13 | 0.155 + 0.262i | 0.134 + 0.261i | 0.348 + 0.582i | 0.159 + 0.643i | 0.155 + 0.259i | 0.133 + 0.263i | 0.347 + 0.579i | 0.156 + 0.642i |
| 13.1 | 0.154 + 0.258i | 0.133 + 0.256i | 0.346 + 0.581i | 0.158 + 0.641i | 0.153 + 0.255i | 0.132 + 0.258i | 0.344 + 0.578i | 0.155 + 0.639i |
| 13.2 | 0.153 + 0.253i | 0.132 + 0.250i | 0.342 + 0.579i | 0.155 + 0.637i | 0.152 + 0.249i | 0.130 + 0.252i | 0.341 + 0.576i | 0.152 + 0.635i |
| 13.3 | 0.152 + 0.250i | 0.130 + 0.248i | 0.342 + 0.579i | 0.153 + 0.636i | 0.152 + 0.247i | 0.130 + 0.250i | 0.340 + 0.575i | 0.150 + 0.633i |
| 13.4 | 0.152 + 0.245i | 0.130 + 0.242i | 0.341 + 0.578i | 0.151 + 0.633i | 0.151 + 0.243i | 0.128 + 0.245i | 0.338 + 0.573i | 0.148 + 0.630i |
| 13.5 | 0.151 + 0.242i | 0.129 + 0.239i | 0.339 + 0.576i | 0.149 + 0.632i | 0.150 + 0.240i | 0.128 + 0.242i | 0.336 + 0.572i | 0.146 + 0.628i |
| 13.6 | 0.150 + 0.240i | 0.128 + 0.236i | 0.340 + 0.576i | 0.147 + 0.631i | 0.150 + 0.237i | 0.127 + 0.240i | 0.336 + 0.571i | 0.144 + 0.626i |
| 13.7 | 0.155 + 0.220i | 0.131 + 0.224i | 0.336 + 0.563i | 0.144 + 0.598i | 0.154 + 0.217i | 0.130 + 0.226i | 0.331 + 0.562i | 0.142 + 0.597i |
| 13.8 | 0.155 + 0.218i | 0.130 + 0.222i | 0.337 + 0.563i | 0.143 + 0.596i | 0.154 + 0.215i | 0.129 + 0.225i | 0.332 + 0.561i | 0.141 + 0.596i |
| 13.9 | 0.155 + 0.216i | 0.129 + 0.220i | 0.338 + 0.562i | 0.142 + 0.594i | 0.154 + 0.213i | 0.129 + 0.223i | 0.333 + 0.559i | 0.140 + 0.593i |
| 14 | 0.155 + 0.213i | 0.129 + 0.218i | 0.339 + 0.562i | 0.141 + 0.593i | 0.155 + 0.211i | 0.129 + 0.221i | 0.334 + 0.559i | 0.139 + 0.592i |
| 14.1 | 0.154 + 0.212i | 0.129 + 0.217i | 0.341 + 0.561i | 0.140 + 0.591i | 0.154 + 0.209i | 0.129 + 0.221i | 0.335 + 0.558i | 0.138 + 0.591i |
| 14.2 | 0.155 + 0.209i | 0.128 + 0.216i | 0.342 + 0.561i | 0.139 + 0.590i | 0.154 + 0.207i | 0.128 + 0.219i | 0.336 + 0.557i | 0.137 + 0.589i |
| 14.3 | 0.155 + 0.207i | 0.128 + 0.214i | 0.344 + 0.561i | 0.138 + 0.589i | 0.154 + 0.205i | 0.128 + 0.217i | 0.338 + 0.556i | 0.136 + 0.588i |
| 14.4 | 0.156 + 0.204i | 0.128 + 0.212i | 0.345 + 0.560i | 0.138 + 0.588i | 0.155 + 0.203i | 0.128 + 0.216i | 0.339 + 0.556i | 0.135 + 0.586i |
| 14.5 | 0.156 + 0.202i | 0.127 + 0.211i | 0.347 + 0.560i | 0.136 + 0.586i | 0.155 + 0.201i | 0.127 + 0.214i | 0.340 + 0.555i | 0.134 + 0.585i |
| 14.6 | 0.156 + 0.199i | 0.127 + 0.209i | 0.349 + 0.561i | 0.136 + 0.585i | 0.155 + 0.198i | 0.127 + 0.213i | 0.341 + 0.555i | 0.133 + 0.583i |
| 14.7 | 0.156 + 0.197i | 0.127 + 0.207i | 0.351 + 0.560i | 0.135 + 0.584i | 0.156 + 0.196i | 0.127 + 0.211i | 0.343 + 0.554i | 0.132 + 0.582i |
| 14.8 | 0.156 + 0.194i | 0.127 + 0.205i | 0.352 + 0.560i | 0.134 + 0.583i | 0.156 + 0.194i | 0.127 + 0.210i | 0.344 + 0.554i | 0.132 + 0.581i |
| 14.9 | 0.157 + 0.192i | 0.127 + 0.204i | 0.354 + 0.561i | 0.133 + 0.582i | 0.156 + 0.192i | 0.127 + 0.209i | 0.345 + 0.554i | 0.130 + 0.580i |
| 15 | 0.157 + 0.189i | 0.127 + 0.201i | 0.355 + 0.561i | 0.132 + 0.582i | 0.157 + 0.190i | 0.127 + 0.207i | 0.346 + 0.553i | 0.130 + 0.579i |
| 15.1 | 0.157 + 0.186i | 0.127 + 0.199i | 0.357 + 0.562i | 0.131 + 0.581i | 0.157 + 0.187i | 0.127 + 0.205i | 0.348 + 0.553i | 0.128 + 0.578i |
| 15.2 | 0.158 + 0.182i | 0.127 + 0.196i | 0.358 + 0.563i | 0.130 + 0.581i | 0.157 + 0.184i | 0.127 + 0.204i | 0.349 + 0.553i | 0.128 + 0.577i |
| 15.3 | 0.158 + 0.178i | 0.126 + 0.193i | 0.360 + 0.564i | 0.129 + 0.581i | 0.157 + 0.181i | 0.127 + 0.202i | 0.350 + 0.553i | 0.127 + 0.576i |
| 15.4 | 0.158 + 0.175i | 0.126 + 0.190i | 0.362 + 0.565i | 0.129 + 0.581i | 0.157 + 0.178i | 0.127 + 0.199i | 0.352 + 0.554i | 0.126 + 0.577i |
| 15.5 | 0.833 + 0.453i | 0.921 + 0.201i | 1.518 + 0.797i | 1.643 + 0.482i | 0.787 + 0.530i | 0.934 + 0.127i | 1.324 + 1.073i | 1.689 + 0.157i |
| 15.6 | 0.835 + 0.454i | 0.924 + 0.205i | 1.514 + 0.803i | 1.640 + 0.487i | 0.786 + 0.535i | 0.939 + 0.125i | 1.318 + 1.078i | 1.692 + 0.160i |
| 15.7 | 0.838 + 0.455i | 0.926 + 0.210i | 1.511 + 0.807i | 1.638 + 0.490i | 0.785 + 0.541i | 0.942 + 0.123i | 1.312 + 1.082i | 1.694 + 0.162i |
| 15.8 | 0.839 + 0.456i | 0.929 + 0.214i | 1.507 + 0.810i | 1.636 + 0.494i | 0.783 + 0.544i | 0.946 + 0.122i | 1.307 + 1.086i | 1.696 + 0.163i |
| 15.9 | 0.841 + 0.456i | 0.930 + 0.217i | 1.504 + 0.811i | 1.633 + 0.495i | 0.782 + 0.548i | 0.948 + 0.121i | 1.305 + 1.087i | 1.696 + 0.164i |
| 16 | 0.843 + 0.456i | 0.931 + 0.221i | 1.502 + 0.812i | 1.632 + 0.496i | 0.782 + 0.552i | 0.949 + 0.119i | 1.301 + 1.089i | 1.695 + 0.165i |
| 16.1 | 0.843 + 0.456i | 0.931 + 0.224i | 1.500 + 0.811i | 1.629 + 0.495i | 0.780 + 0.554i | 0.951 + 0.118i | 1.300 + 1.089i | 1.694 + 0.165i |
| 16.2 | 0.844 + 0.456i | 0.932 + 0.226i | 1.498 + 0.810i | 1.627 + 0.495i | 0.779 + 0.557i | 0.952 + 0.117i | 1.299 + 1.088i | 1.692 + 0.165i |
| 16.3 | 0.845 + 0.456i | 0.932 + 0.228i | 1.496 + 0.807i | 1.624 + 0.494i | 0.778 + 0.560i | 0.952 + 0.116i | 1.298 + 1.086i | 1.689 + 0.165i |
| 16.4 | 0.845 + 0.455i | 0.931 + 0.231i | 1.494 + 0.805i | 1.621 + 0.492i | 0.776 + 0.562i | 0.952 + 0.114i | 1.297 + 1.083i | 1.687 + 0.164i |
| 16.5 | 0.846 + 0.455i | 0.931 + 0.233i | 1.492 + 0.803i | 1.619 + 0.491i | 0.775 + 0.564i | 0.953 + 0.113i | 1.296 + 1.082i | 1.685 + 0.164i |
| 16.6 | 0.845 + 0.454i | 0.930 + 0.235i | 1.490 + 0.799i | 1.616 + 0.489i | 0.772 + 0.566i | 0.953 + 0.112i | 1.296 + 1.078i | 1.681 + 0.163i |
| 16.7 | 0.845 + 0.454i | 0.929 + 0.237i | 1.488 + 0.797i | 1.612 + 0.488i | 0.771 + 0.568i | 0.952 + 0.111i | 1.295 + 1.075i | 1.679 + 0.163i |
| 16.8 | 0.845 + 0.454i | 0.928 + 0.239i | 1.486 + 0.793i | 1.608 + 0.485i | 0.768 + 0.571i | 0.952 + 0.109i | 1.295 + 1.072i | 1.674 + 0.162i |
| 16.9 | 0.844 + 0.453i | 0.926 + 0.241i | 1.483 + 0.790i | 1.605 + 0.483i | 0.766 + 0.573i | 0.951 + 0.108i | 1.295 + 1.068i | 1.670 + 0.162i |
| 17 | 0.844 + 0.452i | 0.925 + 0.242i | 1.482 + 0.786i | 1.602 + 0.481i | 0.765 + 0.573i | 0.951 + 0.107i | 1.294 + 1.065i | 1.667 + 0.161i |
| 17.1 | 0.844 + 0.451i | 0.923 + 0.243i | 1.479 + 0.782i | 1.599 + 0.478i | 0.763 + 0.575i | 0.950 + 0.106i | 1.295 + 1.060i | 1.663 + 0.160i |
| 17.2 | 0.845 + 0.449i | 0.923 + 0.245i | 1.478 + 0.780i | 1.597 + 0.476i | 0.762 + 0.575i | 0.949 + 0.104i | 1.293 + 1.057i | 1.661 + 0.159i |
| 17.3 | 0.845 + 0.449i | 0.922 + 0.246i | 1.476 + 0.778i | 1.594 + 0.476i | 0.761 + 0.576i | 0.949 + 0.103i | 1.292 + 1.055i | 1.659 + 0.159i |
| 17.4 | 0.846 + 0.447i | 0.921 + 0.247i | 1.474 + 0.776i | 1.593 + 0.475i | 0.761 + 0.577i | 0.949 + 0.102i | 1.291 + 1.053i | 1.657 + 0.159i |
| 17.5 | 0.846 + 0.446i | 0.921 + 0.248i | 1.472 + 0.775i | 1.590 + 0.474i | 0.760 + 0.578i | 0.950 + 0.101i | 1.290 + 1.051i | 1.655 + 0.159i |
| 17.6 | 0.846 + 0.445i | 0.921 + 0.249i | 1.471 + 0.773i | 1.588 + 0.473i | 0.759 + 0.578i | 0.950 + 0.100i | 1.289 + 1.050i | 1.653 + 0.159i |
| 17.7 | 0.847 + 0.444i | 0.920 + 0.249i | 1.470 + 0.771i | 1.586 + 0.471i | 0.759 + 0.578i | 0.949 + 0.099i | 1.289 + 1.048i | 1.651 + 0.159i |
| 17.8 | 0.848 + 0.442i | 0.920 + 0.250i | 1.468 + 0.770i | 1.585 + 0.471i | 0.759 + 0.578i | 0.949 + 0.098i | 1.288 + 1.046i | 1.650 + 0.159i |
| 17.9 | 0.778 + 0.374i | 0.814 + 0.175i | 1.512 + 0.510i | 1.724 + 0.230i | 0.746 + 0.459i | 0.823 + 0.098i | 1.426 + 0.822i | 1.464 + 0.121i |
| 18 | 0.778 + 0.373i | 0.814 + 0.177i | 1.509 + 0.509i | 1.721 + 0.230i | 0.744 + 0.462i | 0.824 + 0.097i | 1.422 + 0.819i | 1.462 + 0.122i |
| 18.1 | 0.778 + 0.373i | 0.814 + 0.179i | 1.506 + 0.508i | 1.718 + 0.230i | 0.743 + 0.465i | 0.825 + 0.095i | 1.419 + 0.817i | 1.460 + 0.122i |
| 18.2 | 0.779 + 0.372i | 0.814 + 0.180i | 1.503 + 0.508i | 1.716 + 0.232i | 0.743 + 0.467i | 0.826 + 0.095i | 1.414 + 0.815i | 1.460 + 0.123i |
| 18.3 | 0.781 + 0.371i | 0.816 + 0.183i | 1.499 + 0.508i | 1.712 + 0.234i | 0.742 + 0.470i | 0.827 + 0.093i | 1.411 + 0.814i | 1.459 + 0.123i |

-continued

| 256NUC | | | | | | | | |
|---|---|---|---|---|---|---|---|---|
| 18.4 | 0.782 + 0.370i | 0.817 + 0.185i | 1.498 + 0.507i | 1.711 + 0.235i | 0.743 + 0.471i | 0.828 + 0.092i | 1.409 + 0.814i | 1.459 + 0.123i |
| 18.5 | 0.775 + 0.361i | 0.803 + 0.179i | 1.498 + 0.487i | 1.707 + 0.216i | 0.741 + 0.457i | 0.814 + 0.091i | 1.418 + 0.790i | 1.448 + 0.120i |
| 18.6 | 0.775 + 0.360i | 0.803 + 0.181i | 1.494 + 0.484i | 1.703 + 0.215i | 0.740 + 0.460i | 0.814 + 0.089i | 1.416 + 0.786i | 1.445 + 0.120i |
| 18.7 | 0.767 + 0.362i | 0.798 + 0.187i | 1.484 + 0.477i | 1.691 + 0.211i | 0.730 + 0.466i | 0.811 + 0.088i | 1.409 + 0.775i | 1.433 + 0.119i |
| 18.8 | 0.768 + 0.362i | 0.799 + 0.190i | 1.481 + 0.475i | 1.686 + 0.209i | 0.729 + 0.470i | 0.811 + 0.086i | 1.406 + 0.772i | 1.429 + 0.119i |
| 18.9 | 0.769 + 0.362i | 0.799 + 0.192i | 1.479 + 0.473i | 1.684 + 0.209i | 0.729 + 0.472i | 0.812 + 0.085i | 1.404 + 0.770i | 1.428 + 0.119i |
| 19 | 0.769 + 0.362i | 0.799 + 0.194i | 1.476 + 0.471i | 1.682 + 0.208i | 0.728 + 0.474i | 0.812 + 0.084i | 1.401 + 0.768i | 1.427 + 0.119i |
| 19.1 | 0.769 + 0.361i | 0.799 + 0.196i | 1.475 + 0.470i | 1.679 + 0.208i | 0.729 + 0.476i | 0.812 + 0.083i | 1.399 + 0.766i | 1.425 + 0.119i |
| 19.2 | 0.191 + 0.115i | 0.069 + 0.122i | 0.339 + 0.693i | 0.166 + 0.735i | 0.189 + 0.109i | 0.069 + 0.120i | 0.409 + 0.648i | 0.084 + 0.745i |
| 19.3 | 0.192 + 0.115i | 0.069 + 0.121i | 0.338 + 0.693i | 0.169 + 0.736i | 0.190 + 0.108i | 0.069 + 0.119i | 0.412 + 0.647i | 0.083 + 0.746i |
| 19.4 | 0.193 + 0.116i | 0.069 + 0.121i | 0.335 + 0.694i | 0.169 + 0.736i | 0.191 + 0.109i | 0.068 + 0.118i | 0.414 + 0.647i | 0.082 + 0.746i |
| 19.5 | 0.194 + 0.116i | 0.068 + 0.121i | 0.333 + 0.694i | 0.171 + 0.736i | 0.191 + 0.109i | 0.068 + 0.118i | 0.416 + 0.646i | 0.080 + 0.747i |
| 19.6 | 0.195 + 0.116i | 0.068 + 0.121i | 0.332 + 0.695i | 0.172 + 0.737i | 0.192 + 0.108i | 0.068 + 0.116i | 0.418 + 0.646i | 0.079 + 0.748i |
| 19.7 | 0.196 + 0.117i | 0.068 + 0.120i | 0.330 + 0.695i | 0.173 + 0.737i | 0.193 + 0.108i | 0.068 + 0.115i | 0.420 + 0.646i | 0.077 + 0.749i |
| 19.8 | 0.197 + 0.118i | 0.068 + 0.120i | 0.328 + 0.696i | 0.174 + 0.737i | 0.193 + 0.107i | 0.068 + 0.114i | 0.421 + 0.646i | 0.076 + 0.749i |
| 19.9 | 0.197 + 0.118i | 0.068 + 0.120i | 0.327 + 0.696i | 0.175 + 0.736i | 0.194 + 0.107i | 0.068 + 0.113i | 0.423 + 0.646i | 0.075 + 0.750i |
| 20 | 0.197 + 0.118i | 0.068 + 0.120i | 0.326 + 0.696i | 0.176 + 0.736i | 0.194 + 0.106i | 0.068 + 0.112i | 0.424 + 0.645i | 0.075 + 0.750i |
| 20.1 | 0.198 + 0.120i | 0.068 + 0.121i | 0.325 + 0.696i | 0.177 + 0.736i | 0.195 + 0.106i | 0.068 + 0.111i | 0.426 + 0.644i | 0.073 + 0.751i |
| 20.2 | 0.199 + 0.121i | 0.068 + 0.122i | 0.324 + 0.696i | 0.178 + 0.736i | 0.196 + 0.105i | 0.068 + 0.109i | 0.427 + 0.644i | 0.072 + 0.750i |
| 20.3 | 0.199 + 0.123i | 0.068 + 0.124i | 0.323 + 0.696i | 0.179 + 0.735i | 0.196 + 0.103i | 0.068 + 0.107i | 0.429 + 0.644i | 0.072 + 0.750i |
| 20.4 | 0.199 + 0.127i | 0.068 + 0.131i | 0.323 + 0.695i | 0.180 + 0.734i | 0.195 + 0.100i | 0.067 + 0.103i | 0.431 + 0.643i | 0.070 + 0.750i |
| 20.5 | 0.164 + 0.204i | 0.067 + 0.240i | 0.360 + 0.710i | 0.207 + 0.758i | 0.117 + 0.084i | 0.048 + 0.100i | 0.476 + 0.642i | 0.071 + 0.775i |
| 20.6 | 0.164 + 0.207i | 0.067 + 0.244i | 0.362 + 0.712i | 0.209 + 0.759i | 0.114 + 0.084i | 0.048 + 0.101i | 0.479 + 0.642i | 0.070 + 0.776i |
| 20.7 | 0.163 + 0.211i | 0.067 + 0.248i | 0.363 + 0.713i | 0.211 + 0.760i | 0.112 + 0.084i | 0.047 + 0.102i | 0.481 + 0.642i | 0.071 + 0.777i |
| 20.8 | 0.166 + 0.217i | 0.071 + 0.255i | 0.367 + 0.709i | 0.213 + 0.748i | 0.106 + 0.084i | 0.046 + 0.109i | 0.496 + 0.642i | 0.071 + 0.761i |
| 20.9 | 0.168 + 0.217i | 0.071 + 0.257i | 0.367 + 0.708i | 0.214 + 0.747i | 0.107 + 0.084i | 0.045 + 0.109i | 0.496 + 0.642i | 0.071 + 0.760i |
| 21 | 0.168 + 0.219i | 0.071 + 0.257i | 0.367 + 0.708i | 0.216 + 0.747i | 0.107 + 0.084i | 0.045 + 0.109i | 0.497 + 0.642i | 0.072 + 0.760i |
| 21.1 | 0.169 + 0.220i | 0.070 + 0.258i | 0.367 + 0.708i | 0.216 + 0.746i | 0.108 + 0.083i | 0.045 + 0.108i | 0.499 + 0.641i | 0.072 + 0.760i |
| 21.2 | 0.169 + 0.221i | 0.071 + 0.260i | 0.366 + 0.707i | 0.217 + 0.745i | 0.108 + 0.082i | 0.044 + 0.109i | 0.500 + 0.642i | 0.072 + 0.758i |
| 21.3 | 0.170 + 0.222i | 0.071 + 0.260i | 0.366 + 0.707i | 0.217 + 0.744i | 0.108 + 0.082i | 0.044 + 0.108i | 0.500 + 0.642i | 0.073 + 0.758i |
| 21.4 | 0.169 + 0.222i | 0.070 + 0.261i | 0.366 + 0.707i | 0.218 + 0.743i | 0.110 + 0.083i | 0.044 + 0.107i | 0.502 + 0.642i | 0.073 + 0.757i |
| 21.5 | 0.170 + 0.222i | 0.070 + 0.261i | 0.366 + 0.707i | 0.218 + 0.744i | 0.112 + 0.083i | 0.044 + 0.105i | 0.502 + 0.642i | 0.073 + 0.757i |
| 21.6 | 0.170 + 0.222i | 0.069 + 0.262i | 0.366 + 0.707i | 0.218 + 0.743i | 0.113 + 0.082i | 0.044 + 0.104i | 0.503 + 0.643i | 0.073 + 0.756i |
| 21.7 | 0.170 + 0.223i | 0.069 + 0.262i | 0.365 + 0.707i | 0.219 + 0.743i | 0.114 + 0.082i | 0.044 + 0.103i | 0.503 + 0.644i | 0.073 + 0.757i |
| 21.8 | 0.171 + 0.223i | 0.069 + 0.263i | 0.366 + 0.707i | 0.219 + 0.743i | 0.116 + 0.082i | 0.043 + 0.102i | 0.504 + 0.644i | 0.074 + 0.757i |
| 21.9 | 0.171 + 0.224i | 0.068 + 0.263i | 0.366 + 0.708i | 0.219 + 0.743i | 0.116 + 0.082i | 0.043 + 0.101i | 0.505 + 0.645i | 0.074 + 0.757i |
| 22 | 0.171 + 0.224i | 0.068 + 0.263i | 0.366 + 0.708i | 0.220 + 0.742i | 0.118 + 0.082i | 0.043 + 0.100i | 0.505 + 0.645i | 0.074 + 0.757i |
| 22.1 | 0.171 + 0.224i | 0.067 + 0.263i | 0.366 + 0.708i | 0.220 + 0.743i | 0.119 + 0.082i | 0.043 + 0.099i | 0.506 + 0.646i | 0.074 + 0.757i |
| 22.2 | 0.172 + 0.224i | 0.068 + 0.263i | 0.367 + 0.708i | 0.220 + 0.741i | 0.121 + 0.081i | 0.043 + 0.098i | 0.507 + 0.647i | 0.074 + 0.756i |
| 22.3 | 0.173 + 0.224i | 0.067 + 0.263i | 0.367 + 0.708i | 0.221 + 0.741i | 0.122 + 0.081i | 0.043 + 0.098i | 0.508 + 0.648i | 0.074 + 0.756i |
| 22.4 | 0.174 + 0.224i | 0.068 + 0.262i | 0.366 + 0.706i | 0.220 + 0.738i | 0.124 + 0.081i | 0.044 + 0.097i | 0.510 + 0.651i | 0.074 + 0.753i |
| 22.5 | 0.174 + 0.224i | 0.067 + 0.262i | 0.366 + 0.706i | 0.220 + 0.739i | 0.125 + 0.081i | 0.044 + 0.096i | 0.510 + 0.652i | 0.074 + 0.753i |
| 22.6 | 0.621 + 0.336i | 0.620 + 0.195i | 1.470 + 0.117i | 1.145 + 0.263i | 0.629 + 0.484i | 0.621 + 0.063i | 1.377 + 0.326i | 1.206 + 0.094i |
| 22.7 | 0.622 + 0.337i | 0.621 + 0.196i | 1.466 + 0.116i | 1.144 + 0.264i | 0.630 + 0.485i | 0.622 + 0.063i | 1.375 + 0.325i | 1.205 + 0.095i |
| 22.8 | 0.623 + 0.338i | 0.622 + 0.196i | 1.461 + 0.116i | 1.145 + 0.265i | 0.632 + 0.486i | 0.624 + 0.063i | 1.375 + 0.325i | 1.202 + 0.094i |
| 22.9 | 0.624 + 0.339i | 0.624 + 0.198i | 1.458 + 0.116i | 1.144 + 0.266i | 0.633 + 0.487i | 0.626 + 0.064i | 1.373 + 0.325i | 1.201 + 0.094i |
| 23 | 0.625 + 0.340i | 0.625 + 0.198i | 1.454 + 0.115i | 1.144 + 0.267i | 0.634 + 0.489i | 0.627 + 0.064i | 1.372 + 0.325i | 1.200 + 0.094i |
| 23.1 | 0.625 + 0.342i | 0.626 + 0.200i | 1.451 + 0.114i | 1.142 + 0.267i | 0.635 + 0.490i | 0.629 + 0.065i | 1.370 + 0.323i | 1.198 + 0.094i |
| 23.2 | 0.627 + 0.343i | 0.627 + 0.201i | 1.449 + 0.114i | 1.140 + 0.268i | 0.636 + 0.492i | 0.630 + 0.065i | 1.366 + 0.321i | 1.198 + 0.095i |
| 23.3 | 0.627 + 0.344i | 0.628 + 0.201i | 1.447 + 0.113i | 1.139 + 0.268i | 0.637 + 0.493i | 0.632 + 0.066i | 1.365 + 0.320i | 1.197 + 0.095i |
| 23.4 | 0.639 + 0.354i | 0.636 + 0.209i | 1.466 + 0.109i | 1.111 + 0.236i | 0.650 + 0.503i | 0.636 + 0.069i | 1.326 + 0.255i | 1.193 + 0.086i |
| 23.5 | 0.640 + 0.355i | 0.636 + 0.210i | 1.462 + 0.108i | 1.109 + 0.234i | 0.651 + 0.505i | 0.638 + 0.069i | 1.324 + 0.254i | 1.191 + 0.085i |
| 23.6 | 0.640 + 0.355i | 0.637 + 0.210i | 1.459 + 0.107i | 1.109 + 0.235i | 0.653 + 0.505i | 0.638 + 0.069i | 1.324 + 0.254i | 1.191 + 0.086i |
| 23.7 | 0.641 + 0.357i | 0.637 + 0.211i | 1.455 + 0.106i | 1.109 + 0.235i | 0.654 + 0.507i | 0.639 + 0.069i | 1.323 + 0.254i | 1.190 + 0.086i |
| 23.8 | 0.642 + 0.358i | 0.637 + 0.212i | 1.452 + 0.105i | 1.109 + 0.235i | 0.655 + 0.508i | 0.640 + 0.070i | 1.321 + 0.255i | 1.188 + 0.086i |
| 23.9 | 0.642 + 0.359i | 0.638 + 0.213i | 1.447 + 0.105i | 1.107 + 0.235i | 0.657 + 0.509i | 0.640 + 0.070i | 1.319 + 0.255i | 1.187 + 0.086i |
| 24 | 0.643 + 0.359i | 0.637 + 0.213i | 1.444 + 0.104i | 1.106 + 0.236i | 0.658 + 0.510i | 0.641 + 0.070i | 1.318 + 0.255i | 1.186 + 0.086i |
| 24.1 | 0.643 + 0.360i | 0.638 + 0.213i | 1.441 + 0.103i | 1.107 + 0.236i | 0.659 + 0.511i | 0.642 + 0.070i | 1.318 + 0.255i | 1.186 + 0.086i |
| 24.2 | 0.644 + 0.361i | 0.637 + 0.214i | 1.437 + 0.103i | 1.106 + 0.236i | 0.660 + 0.512i | 0.642 + 0.070i | 1.316 + 0.256i | 1.185 + 0.086i |
| 24.3 | 0.644 + 0.365i | 0.637 + 0.216i | 1.433 + 0.103i | 1.102 + 0.235i | 0.661 + 0.518i | 0.643 + 0.071i | 1.311 + 0.254i | 1.182 + 0.085i |
| 24.4 | 0.645 + 0.366i | 0.637 + 0.217i | 1.431 + 0.102i | 1.102 + 0.235i | 0.662 + 0.520i | 0.645 + 0.071i | 1.310 + 0.254i | 1.182 + 0.085i |
| 24.5 | 0.645 + 0.367i | 0.637 + 0.218i | 1.427 + 0.101i | 1.102 + 0.236i | 0.663 + 0.521i | 0.646 + 0.072i | 1.310 + 0.255i | 1.181 + 0.085i |
| 24.6 | 0.646 + 0.367i | 0.638 + 0.218i | 1.425 + 0.101i | 1.102 + 0.236i | 0.664 + 0.522i | 0.647 + 0.072i | 1.310 + 0.255i | 1.181 + 0.085i |
| 24.7 | 0.646 + 0.367i | 0.638 + 0.218i | 1.423 + 0.101i | 1.102 + 0.236i | 0.666 + 0.523i | 0.648 + 0.072i | 1.309 + 0.256i | 1.181 + 0.085i |
| 24.8 | 0.647 + 0.368i | 0.638 + 0.218i | 1.420 + 0.100i | 1.103 + 0.237i | 0.667 + 0.523i | 0.650 + 0.072i | 1.309 + 0.257i | 1.181 + 0.085i |
| 24.9 | 0.648 + 0.370i | 0.638 + 0.220i | 1.417 + 0.099i | 1.103 + 0.237i | 0.668 + 0.525i | 0.651 + 0.073i | 1.308 + 0.257i | 1.180 + 0.086i |
| 25 | 0.649 + 0.370i | 0.639 + 0.220i | 1.415 + 0.099i | 1.103 + 0.238i | 0.669 + 0.525i | 0.654 + 0.073i | 1.307 + 0.257i | 1.180 + 0.086i |

| SNR | a49 | a50 | a51 | a52 | a53 | a54 | a55 | a56 |
|---|---|---|---|---|---|---|---|---|
| 10 | 0.318 + 0.178i | 0.319 + 0.164i | 0.581 + 0.316i | 0.618 + 0.218i | 0.318 + 0.178i | 0.318 + 0.163i | 0.589 + 0.319i | 0.627 + 0.219i |
| 10.1 | 0.316 + 0.177i | 0.318 + 0.162i | 0.583 + 0.318i | 0.622 + 0.216i | 0.315 + 0.176i | 0.315 + 0.152i | 0.590 + 0.321i | 0.631 + 0.217i |
| 10.2 | 0.314 + 0.176i | 0.316 + 0.161i | 0.585 + 0.320i | 0.627 + 0.214i | 0.313 + 0.174i | 0.314 + 0.160i | 0.592 + 0.323i | 0.635 + 0.216i |
| 10.3 | 0.312 + 0.174i | 0.315 + 0.159i | 0.587 + 0.322i | 0.630 + 0.213i | 0.310 + 0.173i | 0.312 + 0.158i | 0.593 + 0.325i | 0.638 + 0.213i |
| 10.4 | 0.311 + 0.173i | 0.313 + 0.158i | 0.589 + 0.324i | 0.634 + 0.211i | 0.308 + 0.172i | 0.310 + 0.157i | 0.595 + 0.327i | 0.641 + 0.211i |
| 10.5 | 0.309 + 0.173i | 0.312 + 0.157i | 0.590 + 0.326i | 0.637 + 0.209i | 0.306 + 0.171i | 0.309 + 0.155i | 0.596 + 0.329i | 0.644 + 0.209i |
| 10.6 | 0.308 + 0.171i | 0.311 + 0.155i | 0.592 + 0.328i | 0.641 + 0.207i | 0.306 + 0.170i | 0.308 + 0.154i | 0.597 + 0.330i | 0.647 + 0.207i |

-continued

| 256NUC | | | | | | | | |
|---|---|---|---|---|---|---|---|---|
| 10.7 | 0.308 + 0.171i | 0.311 + 0.154i | 0.594 + 0.330i | 0.645 + 0.204i | 0.304 + 0.169i | 0.307 + 0.153i | 0.598 + 0.332i | 0.650 + 0.206i |
| 10.8 | 0.306 + 0.170i | 0.310 + 0.153i | 0.595 + 0.332i | 0.648 + 0.203i | 0.303 + 0.168i | 0.306 + 0.152i | 0.599 + 0.334i | 0.652 + 0.203i |
| 10.9 | 0.306 + 0.169i | 0.309 + 0.152i | 0.596 + 0.334i | 0.651 + 0.200i | 0.302 + 0.168i | 0.305 + 0.150i | 0.600 + 0.336i | 0.655 + 0.201i |
| 11 | 0.305 + 0.169i | 0.309 + 0.151i | 0.597 + 0.336i | 0.653 + 0.198i | 0.301 + 0.167i | 0.305 + 0.149i | 0.600 + 0.338i | 0.657 + 0.199i |
| 11.1 | 0.304 + 0.169i | 0.308 + 0.150i | 0.598 + 0.338i | 0.655 + 0.196i | 0.301 + 0.167i | 0.304 + 0.148i | 0.601 + 0.339i | 0.659 + 0.197i |
| 11.2 | 0.304 + 0.168i | 0.309 + 0.149i | 0.599 + 0.340i | 0.658 + 0.195i | 0.301 + 0.166i | 0.304 + 0.147i | 0.601 + 0.341i | 0.661 + 0.195i |
| 11.3 | 0.304 + 0.168i | 0.308 + 0.148i | 0.500 + 0.342i | 0.661 + 0.192i | 0.300 + 0.166i | 0.304 + 0.147i | 0.602 + 0.343i | 0.663 + 0.193i |
| 11.4 | 0.304 + 0.167i | 0.308 + 0.147i | 0.600 + 0.343i | 0.663 + 0.191i | 0.300 + 0.166i | 0.304 + 0.145i | 0.602 + 0.345i | 0.665 + 0.191i |
| 11.5 | 0.303 + 0.167i | 0.308 + 0.146i | 0.601 + 0.345i | 0.664 + 0.189i | 0.299 + 0.165i | 0.304 + 0.145i | 0.602 + 0.346i | 0.666 + 0.189i |
| 11.6 | 0.303 + 0.157i | 0.308 + 0.145i | 0.601 + 0.346i | 0.666 + 0.187i | 0.299 + 0.164i | 0.304 + 0.143i | 0.602 + 0.347i | 0.667 + 0.187i |
| 11.7 | 0.302 + 0.166i | 0.308 + 0.144i | 0.602 + 0.347i | 0.667 + 0.185i | 0.299 + 0.164i | 0.304 + 0.143i | 0.602 + 0.348i | 0.668 + 0.185i |
| 11.8 | 0.302 + 0.155i | 0.307 + 0.143i | 0.602 + 0.348i | 0.668 + 0.184i | 0.298 + 0.163i | 0.303 + 0.142i | 0.601 + 0.349i | 0.669 + 0.184i |
| 11.9 | 0.301 + 0.155i | 0.307 + 0.142i | 0.603 + 0.350i | 0.669 + 0.182i | 0.298 + 0.163i | 0.303 + 0.141i | 0.601 + 0.351i | 0.669 + 0.182i |
| 12 | 0.302 + 0.165i | 0.308 + 0.142i | 0.602 + 0.351i | 0.670 + 0.181i | 0.297 + 0.162i | 0.304 + 0.140i | 0.600 + 0.352i | 0.669 + 0.180i |
| 12.1 | 0.302 + 0.154i | 0.308 + 0.140i | 0.602 + 0.352i | 0.671 + 0.179i | 0.298 + 0.162i | 0.305 + 0.135i | 0.600 + 0.353i | 0.670 + 0.178i |
| 12.2 | 0.301 + 0.164i | 0.309 + 0.140i | 0.603 + 0.353i | 0.672 + 0.178i | 0.298 + 0.162i | 0.304 + 0.138i | 0.600 + 0.354i | 0.670 + 0.176i |
| 12.3 | 0.301 + 0.163i | 0.308 + 0.139i | 0.603 + 0.354i | 0.672 + 0.176i | 0.298 + 0.162i | 0.305 + 0.137i | 0.599 + 0.355i | 0.670 + 0.175i |
| 12.4 | 0.302 + 0.163i | 0.310 + 0.138i | 0.603 + 0.355i | 0.674 + 0.174i | 0.298 + 0.161i | 0.306 + 0.136i | 0.599 + 0.356i | 0.670 + 0.173i |
| 12.5 | 0.302 + 0.163i | 0.311 + 0.137i | 0.603 + 0.356i | 0.674 + 0.173i | 0.298 + 0.161i | 0.307 + 0.136i | 0.599 + 0.358i | 0.671 + 0.172i |
| 12.6 | 0.303 + 0.162i | 0.312 + 0.136i | 0.603 + 0.358i | 0.676 + 0.172i | 0.300 + 0.160i | 0.309 + 0.135i | 0.598 + 0.359i | 0.671 + 0.170i |
| 12.7 | 0.303 + 0.162i | 0.313 + 0.135i | 0.604 + 0.359i | 0.677 + 0.170i | 0.300 + 0.160i | 0.310 + 0.134i | 0.598 + 0.350i | 0.671 + 0.169i |
| 12.8 | 0.325 + 0.160i | 0.337 + 0.132i | 0.610 + 0.364i | 0.695 + 0.173i | 0.322 + 0.158i | 0.335 + 0.130i | 0.603 + 0.362i | 0.687 + 0.171i |
| 12.9 | 0.335 + 0.161i | 0.351 + 0.130i | 0.610 + 0.370i | 0.701 + 0.174i | 0.332 + 0.159i | 0.349 + 0.129i | 0.603 + 0.368i | 0.693 + 0.172i |
| 13 | 0.347 + 0.162i | 0.367 + 0.128i | 0.611 + 0.375i | 0.707 + 0.176i | 0.345 + 0.161i | 0.365 + 0.127i | 0.604 + 0.373i | 0.699 + 0.173i |
| 13.1 | 0.353 + 0.163i | 0.375 + 0.127i | 0.611 + 0.378i | 0.711 + 0.176i | 0.351 + 0.161i | 0.373 + 0.125i | 0.603 + 0.375i | 0.702 + 0.173i |
| 13.2 | 0.362 + 0.164i | 0.386 + 0.125i | 0.612 + 0.382i | 0.717 + 0.177i | 0.360 + 0.162i | 0.384 + 0.124i | 0.603 + 0.379i | 0.708 + 0.174i |
| 13.3 | 0.365 + 0.164i | 0.390 + 0.125i | 0.612 + 0.384i | 0.719 + 0.177i | 0.363 + 0.163i | 0.388 + 0.124i | 0.602 + 0.380i | 0.709 + 0.174i |
| 13.4 | 0.372 + 0.165i | 0.398 + 0.124i | 0.612 + 0.386i | 0.724 + 0.178i | 0.370 + 0.164i | 0.396 + 0.122i | 0.602 + 0.382i | 0.713 + 0.174i |
| 13.5 | 0.376 + 0.166i | 0.404 + 0.123i | 0.612 + 0.388i | 0.727 + 0.178i | 0.375 + 0.165i | 0.402 + 0.122i | 0.602 + 0.384i | 0.716 + 0.175i |
| 13.6 | 0.379 + 0.167i | 0.408 + 0.122i | 0.612 + 0.390i | 0.730 + 0.178i | 0.377 + 0.165i | 0.406 + 0.121i | 0.602 + 0.385i | 0.719 + 0.174i |
| 13.7 | 0.402 + 0.165i | 0.438 + 0.120i | 0.620 + 0.398i | 0.755 + 0.186i | 0.401 + 0.164i | 0.436 + 0.118i | 0.610 + 0.393i | 0.740 + 0.184i |
| 13.8 | 0.403 + 0.165i | 0.441 + 0.119i | 0.620 + 0.399i | 0.757 + 0.187i | 0.403 + 0.164i | 0.439 + 0.118i | 0.609 + 0.394i | 0.741 + 0.184i |
| 13.9 | 0.406 + 0.165i | 0.444 + 0.118i | 0.620 + 0.400i | 0.761 + 0.188i | 0.406 + 0.164i | 0.443 + 0.117i | 0.609 + 0.394i | 0.744 + 0.185i |
| 14 | 0.408 + 0.167i | 0.447 + 0.118i | 0.620 + 0.402i | 0.763 + 0.189i | 0.408 + 0.165i | 0.445 + 0.117i | 0.608 + 0.395i | 0.745 + 0.185i |
| 14.1 | 0.409 + 0.156i | 0.448 + 0.118i | 0.621 + 0.403i | 0.765 + 0.190i | 0.409 + 0.166i | 0.448 + 0.117i | 0.608 + 0.395i | 0.746 + 0.185i |
| 14.2 | 0.410 + 0.167i | 0.452 + 0.118i | 0.621 + 0.404i | 0.767 + 0.192i | 0.412 + 0.166i | 0.451 + 0.117i | 0.607 + 0.396i | 0.749 + 0.185i |
| 14.3 | 0.412 + 0.168i | 0.453 + 0.117i | 0.621 + 0.405i | 0.769 + 0.192i | 0.413 + 0.168i | 0.454 + 0.116i | 0.607 + 0.396i | 0.749 + 0.185i |
| 14.4 | 0.413 + 0.168i | 0.456 + 0.117i | 0.622 + 0.406i | 0.771 + 0.194i | 0.415 + 0.169i | 0.457 + 0.116i | 0.606 + 0.397i | 0.751 + 0.186i |
| 14.5 | 0.414 + 0.169i | 0.458 + 0.117i | 0.622 + 0.407i | 0.773 + 0.195i | 0.416 + 0.169i | 0.460 + 0.116i | 0.606 + 0.397i | 0.752 + 0.186i |
| 14.6 | 0.416 + 0.169i | 0.460 + 0.117i | 0.622 + 0.408i | 0.775 + 0.196i | 0.418 + 0.171i | 0.463 + 0.116i | 0.605 + 0.397i | 0.753 + 0.187i |
| 14.7 | 0.417 + 0.171i | 0.463 + 0.117i | 0.623 + 0.409i | 0.777 + 0.198i | 0.420 + 0.172i | 0.465 + 0.116i | 0.605 + 0.398i | 0.754 + 0.187i |
| 14.8 | 0.417 + 0.171i | 0.464 + 0.117i | 0.623 + 0.410i | 0.778 + 0.199i | 0.421 + 0.173i | 0.468 + 0.117i | 0.604 + 0.398i | 0.755 + 0.188i |
| 14.9 | 0.419 + 0.172i | 0.467 + 0.117i | 0.624 + 0.411i | 0.780 + 0.201i | 0.423 + 0.174i | 0.471 + 0.116i | 0.603 + 0.399i | 0.756 + 0.189i |
| 15 | 0.419 + 0.172i | 0.468 + 0.117i | 0.625 + 0.412i | 0.781 + 0.202i | 0.424 + 0.175i | 0.474 + 0.116i | 0.603 + 0.399i | 0.757 + 0.189i |
| 15.1 | 0.420 + 0.174i | 0.471 + 0.117i | 0.626 + 0.412i | 0.783 + 0.204i | 0.426 + 0.177i | 0.477 + 0.116i | 0.603 + 0.399i | 0.757 + 0.190i |
| 15.2 | 0.422 + 0.175i | 0.473 + 0.117i | 0.626 + 0.413i | 0.784 + 0.206i | 0.427 + 0.179i | 0.480 + 0.117i | 0.602 + 0.399i | 0.758 + 0.191i |
| 15.3 | 0.422 + 0.175i | 0.475 + 0.118i | 0.628 + 0.414i | 0.785 + 0.208i | 0.428 + 0.181i | 0.483 + 0.118i | 0.602 + 0.399i | 0.758 + 0.192i |
| 15.4 | 0.422 + 0.177i | 0.477 + 0.118i | 0.628 + 0.415i | 0.787 + 0.210i | 0.429 + 0.183i | 0.486 + 0.118i | 0.601 + 0.399i | 0.759 + 0.193i |
| 15.5 | 0.558 + 0.914i | 0.311 + 1.023i | 0.660 + 1.169i | 0.409 + 1.283i | 0.697 + 0.817i | 0.137 + 1.062i | 0.877 + 1.026i | 0.141 + 1.341i |
| 15.6 | 0.554 + 0.918i | 0.309 + 1.020i | 0.654 + 1.169i | 0.404 + 1.281i | 0.697 + 0.820i | 0.135 + 1.059i | 0.872 + 1.029i | 0.139 + 1.336i |
| 15.7 | 0.550 + 0.921i | 0.309 + 1.019i | 0.648 + 1.170i | 0.400 + 1.278i | 0.697 + 0.823i | 0.133 + 1.056i | 0.868 + 1.032i | 0.138 + 1.331i |
| 15.8 | 0.546 + 0.925i | 0.307 + 1.017i | 0.642 + 1.171i | 0.396 + 1.276i | 0.698 + 0.825i | 0.131 + 1.054i | 0.864 + 1.035i | 0.136 + 1.327i |
| 15.9 | 0.545 + 0.928i | 0.308 + 1.017i | 0.640 + 1.171i | 0.394 + 1.274i | 0.701 + 0.828i | 0.128 + 1.054i | 0.862 + 1.036i | 0.136 + 1.324i |
| 16 | 0.542 + 0.932i | 0.308 + 1.016i | 0.636 + 1.172i | 0.391 + 1.273i | 0.702 + 0.830i | 0.126 + 1.053i | 0.860 + 1.038i | 0.134 + 1.321i |
| 16.1 | 0.542 + 0.936i | 0.309 + 1.017i | 0.635 + 1.173i | 0.390 + 1.272i | 0.705 + 0.833i | 0.125 + 1.055i | 0.860 + 1.039i | 0.133 + 1.320i |
| 16.2 | 0.541 + 0.939i | 0.310 + 1.019i | 0.633 + 1.173i | 0.389 + 1.272i | 0.707 + 0.835i | 0.123 + 1.057i | 0.859 + 1.039i | 0.133 + 1.318i |
| 16.3 | 0.540 + 0.943i | 0.312 + 1.021i | 0.632 + 1.174i | 0.389 + 1.272i | 0.710 + 0.837i | 0.122 + 1.059i | 0.859 + 1.039i | 0.133 + 1.319i |
| 16.4 | 0.540 + 0.947i | 0.314 + 1.025i | 0.632 + 1.174i | 0.388 + 1.272i | 0.712 + 0.840i | 0.121 + 1.063i | 0.859 + 1.039i | 0.133 + 1.319i |
| 16.5 | 0.540 + 0.951i | 0.316 + 1.028i | 0.632 + 1.175i | 0.388 + 1.273i | 0.714 + 0.842i | 0.119 + 1.066i | 0.860 + 1.039i | 0.133 + 1.319i |
| 16.6 | 0.540 + 0.955i | 0.318 + 1.033i | 0.633 + 1.175i | 0.389 + 1.274i | 0.716 + 0.844i | 0.118 + 1.072i | 0.861 + 1.038i | 0.133 + 1.321i |
| 16.7 | 0.541 + 0.959i | 0.320 + 1.038i | 0.634 + 1.176i | 0.390 + 1.275i | 0.718 + 0.846i | 0.118 + 1.077i | 0.862 + 1.038i | 0.133 + 1.323i |
| 16.8 | 0.542 + 0.964i | 0.322 + 1.043i | 0.636 + 1.177i | 0.391 + 1.277i | 0.720 + 0.848i | 0.117 + 1.083i | 0.863 + 1.038i | 0.134 + 1.326i |
| 16.9 | 0.542 + 0.968i | 0.324 + 1.049i | 0.637 + 1.178i | 0.393 + 1.278i | 0.722 + 0.851i | 0.116 + 1.089i | 0.863 + 1.037i | 0.134 + 1.329i |
| 17 | 0.544 + 0.970i | 0.326 + 1.053i | 0.639 + 1.177i | 0.394 + 1.279i | 0.724 + 0.851i | 0.116 + 1.094i | 0.865 + 1.036i | 0.135 + 1.331i |
| 17.1 | 0.545 + 0.973i | 0.329 + 1.057i | 0.641 + 1.177i | 0.397 + 1.281i | 0.726 + 0.852i | 0.116 + 1.100i | 0.867 + 1.035i | 0.136 + 1.334i |
| 17.2 | 0.546 + 0.975i | 0.330 + 1.060i | 0.642 + 1.177i | 0.397 + 1.281i | 0.727 + 0.853i | 0.116 + 1.103i | 0.867 + 1.034i | 0.136 + 1.335i |
| 17.3 | 0.547 + 0.977i | 0.332 + 1.062i | 0.643 + 1.177i | 0.398 + 1.282i | 0.729 + 0.853i | 0.116 + 1.106i | 0.868 + 1.033i | 0.137 + 1.337i |
| 17.4 | 0.548 + 0.978i | 0.333 + 1.065i | 0.644 + 1.177i | 0.399 + 1.282i | 0.729 + 0.853i | 0.116 + 1.109i | 0.868 + 1.033i | 0.137 + 1.338i |
| 17.5 | 0.549 + 0.979i | 0.335 + 1.066i | 0.645 + 1.177i | 0.400 + 1.282i | 0.731 + 0.854i | 0.116 + 1.111i | 0.869 + 1.033i | 0.137 + 1.338i |
| 17.6 | 0.550 + 0.980i | 0.336 + 1.067i | 0.646 + 1.177i | 0.400 + 1.282i | 0.732 + 0.854i | 0.116 + 1.112i | 0.870 + 1.032i | 0.138 + 1.338i |
| 17.7 | 0.551 + 0.980i | 0.337 + 1.069i | 0.647 + 1.176i | 0.402 + 1.282i | 0.734 + 0.854i | 0.116 + 1.114i | 0.871 + 1.031i | 0.138 + 1.339i |
| 17.8 | 0.553 + 0.981i | 0.339 + 1.069i | 0.648 + 1.176i | 0.402 + 1.282i | 0.736 + 0.855i | 0.116 + 1.115i | 0.872 + 1.030i | 0.138 + 1.339i |
| 17.9 | 0.695 + 0.875i | 0.474 + 0.985i | 0.806 + 1.066i | 0.573 + 1.188i | 0.824 + 0.738i | 0.149 + 1.238i | 1.003 + 0.892i | 0.376 + 1.293i |
| 18 | 0.694 + 0.877i | 0.474 + 0.988i | 0.805 + 1.065i | 0.572 + 1.187i | 0.823 + 0.738i | 0.143 + 1.248i | 1.001 + 0.891i | 0.374 + 1.296i |
| 18.1 | 0.692 + 0.879i | 0.474 + 0.991i | 0.803 + 1.064i | 0.572 + 1.188i | 0.822 + 0.739i | 0.140 + 1.253i | 0.999 + 0.892i | 0.374 + 1.299i |
| 18.2 | 0.690 + 0.881i | 0.474 + 0.994i | 0.801 + 1.064i | 0.573 + 1.189i | 0.819 + 0.740i | 0.137 + 1.257i | 0.995 + 0.891i | 0.374 + 1.304i |
| 18.3 | 0.687 + 0.882i | 0.474 + 0.996i | 0.800 + 1.063i | 0.573 + 1.189i | 0.817 + 0.741i | 0.135 + 1.261i | 0.993 + 0.891i | 0.374 + 1.307i |

-continued

| 256NUC | | | | | | | | |
|---|---|---|---|---|---|---|---|---|
| 18.4 | 0.687 + 0.883i | 0.475 + 0.997i | 0.799 + 1.064i | 0.573 + 1.189i | 0.818 + 0.742i | 0.133 + 1.262i | 0.992 + 0.892i | 0.374 + 1.308i |
| 18.5 | 0.708 + 0.863i | 0.520 + 0.984i | 0.830 + 1.048i | 0.600 + 1.180i | 0.835 + 0.724i | 0.127 + 1.276i | 1.011 + 0.873i | 0.383 + 1.285i |
| 18.6 | 0.709 + 0.864i | 0.525 + 0.987i | 0.833 + 1.048i | 0.603 + 1.181i | 0.835 + 0.724i | 0.127 + 1.279i | 1.011 + 0.870i | 0.385 + 1.286i |
| 18.7 | 0.707 + 0.865i | 0.531 + 0.988i | 0.835 + 1.044i | 0.609 + 1.177i | 0.825 + 0.724i | 0.137 + 1.321i | 1.007 + 0.866i | 0.395 + 1.292i |
| 18.8 | 0.704 + 0.867i | 0.528 + 0.991i | 0.832 + 1.044i | 0.609 + 1.177i | 0.823 + 0.726i | 0.137 + 1.329i | 1.004 + 0.867i | 0.396 + 1.294i |
| 18.9 | 0.704 + 0.868i | 0.528 + 0.993i | 0.832 + 1.044i | 0.609 + 1.178i | 0.823 + 0.727i | 0.138 + 1.331i | 1.003 + 0.867i | 0.397 + 1.295i |
| 19 | 0.704 + 0.869i | 0.529 + 0.996i | 0.832 + 1.044i | 0.612 + 1.179i | 0.823 + 0.728i | 0.139 + 1.333i | 1.002 + 0.866i | 0.400 + 1.298i |
| 19.1 | 0.704 + 0.870i | 0.529 + 0.997i | 0.832 + 1.044i | 0.612 + 1.179i | 0.824 + 0.729i | 0.139 + 1.335i | 1.003 + 0.866i | 0.400 + 1.299i |
| 19.2 | 0.392 + 0.267i | 0.525 + 0.207i | 0.644 + 0.439i | 0.720 + 0.283i | 0.405 + 0.293i | 0.534 + 0.209i | 0.497 + 0.440i | 0.675 + 0.247i |
| 19.3 | 0.391 + 0.267i | 0.525 + 0.207i | 0.650 + 0.439i | 0.721 + 0.283i | 0.405 + 0.294i | 0.534 + 0.210i | 0.496 + 0.440i | 0.675 + 0.246i |
| 19.4 | 0.390 + 0.267i | 0.524 + 0.208i | 0.656 + 0.439i | 0.722 + 0.283i | 0.405 + 0.296i | 0.535 + 0.212i | 0.494 + 0.441i | 0.674 + 0.246i |
| 19.5 | 0.390 + 0.266i | 0.524 + 0.209i | 0.661 + 0.438i | 0.724 + 0.283i | 0.406 + 0.297i | 0.536 + 0.213i | 0.494 + 0.441i | 0.674 + 0.245i |
| 19.6 | 0.389 + 0.266i | 0.524 + 0.210i | 0.665 + 0.438i | 0.724 + 0.284i | 0.406 + 0.298i | 0.536 + 0.214i | 0.493 + 0.441i | 0.674 + 0.245i |
| 19.7 | 0.389 + 0.267i | 0.523 + 0.210i | 0.669 + 0.439i | 0.725 + 0.284i | 0.406 + 0.299i | 0.537 + 0.215i | 0.492 + 0.442i | 0.674 + 0.245i |
| 19.8 | 0.389 + 0.266i | 0.524 + 0.211i | 0.673 + 0.438i | 0.727 + 0.284i | 0.407 + 0.301i | 0.538 + 0.217i | 0.491 + 0.442i | 0.674 + 0.244i |
| 19.9 | 0.388 + 0.266i | 0.523 + 0.212i | 0.676 + 0.438i | 0.728 + 0.284i | 0.407 + 0.302i | 0.538 + 0.217i | 0.491 + 0.442i | 0.674 + 0.244i |
| 20 | 0.388 + 0.265i | 0.523 + 0.212i | 0.679 + 0.438i | 0.730 + 0.284i | 0.407 + 0.302i | 0.539 + 0.218i | 0.490 + 0.442i | 0.674 + 0.244i |
| 20.1 | 0.388 + 0.264i | 0.523 + 0.211i | 0.682 + 0.438i | 0.732 + 0.284i | 0.408 + 0.304i | 0.541 + 0.219i | 0.491 + 0.441i | 0.675 + 0.244i |
| 20.2 | 0.388 + 0.263i | 0.523 + 0.212i | 0.685 + 0.438i | 0.735 + 0.284i | 0.409 + 0.305i | 0.542 + 0.220i | 0.491 + 0.441i | 0.675 + 0.243i |
| 20.3 | 0.388 + 0.262i | 0.522 + 0.211i | 0.688 + 0.438i | 0.737 + 0.285i | 0.410 + 0.306i | 0.543 + 0.220i | 0.491 + 0.440i | 0.676 + 0.243i |
| 20.4 | 0.388 + 0.260i | 0.521 + 0.210i | 0.691 + 0.438i | 0.740 + 0.285i | 0.411 + 0.308i | 0.545 + 0.221i | 0.492 + 0.439i | 0.676 + 0.243i |
| 20.5 | 0.351 + 0.240i | 0.439 + 0.174i | 0.721 + 0.415i | 0.754 + 0.268i | 0.430 + 0.328i | 0.519 + 0.207i | 0.529 + 0.415i | 0.633 + 0.240i |
| 20.6 | 0.349 + 0.238i | 0.436 + 0.172i | 0.723 + 0.415i | 0.756 + 0.267i | 0.432 + 0.329i | 0.520 + 0.207i | 0.532 + 0.413i | 0.632 + 0.240i |
| 20.7 | 0.348 + 0.237i | 0.433 + 0.170i | 0.726 + 0.414i | 0.759 + 0.266i | 0.435 + 0.329i | 0.521 + 0.206i | 0.535 + 0.412i | 0.632 + 0.239i |
| 20.8 | 0.348 + 0.232i | 0.431 + 0.164i | 0.744 + 0.413i | 0.772 + 0.267i | 0.448 + 0.327i | 0.527 + 0.205i | 0.555 + 0.410i | 0.639 + 0.240i |
| 20.9 | 0.349 + 0.231i | 0.432 + 0.162i | 0.746 + 0.413i | 0.775 + 0.267i | 0.451 + 0.327i | 0.529 + 0.205i | 0.559 + 0.409i | 0.641 + 0.241i |
| 21 | 0.348 + 0.231i | 0.431 + 0.162i | 0.748 + 0.414i | 0.777 + 0.267i | 0.454 + 0.328i | 0.530 + 0.205i | 0.562 + 0.409i | 0.643 + 0.241i |
| 21.1 | 0.349 + 0.231i | 0.432 + 0.161i | 0.750 + 0.414i | 0.779 + 0.266i | 0.456 + 0.328i | 0.531 + 0.205i | 0.566 + 0.409i | 0.644 + 0.241i |
| 21.2 | 0.349 + 0.231i | 0.432 + 0.161i | 0.754 + 0.414i | 0.782 + 0.266i | 0.460 + 0.328i | 0.533 + 0.204i | 0.571 + 0.409i | 0.647 + 0.241i |
| 21.3 | 0.349 + 0.232i | 0.432 + 0.161i | 0.756 + 0.415i | 0.785 + 0.266i | 0.462 + 0.329i | 0.535 + 0.205i | 0.574 + 0.410i | 0.648 + 0.241i |
| 21.4 | 0.349 + 0.232i | 0.433 + 0.161i | 0.759 + 0.415i | 0.787 + 0.266i | 0.464 + 0.329i | 0.535 + 0.205i | 0.577 + 0.410i | 0.649 + 0.242i |
| 21.5 | 0.350 + 0.233i | 0.433 + 0.161i | 0.761 + 0.416i | 0.789 + 0.266i | 0.466 + 0.330i | 0.537 + 0.205i | 0.580 + 0.411i | 0.651 + 0.242i |
| 21.6 | 0.350 + 0.234i | 0.434 + 0.162i | 0.764 + 0.416i | 0.791 + 0.266i | 0.469 + 0.331i | 0.539 + 0.206i | 0.584 + 0.412i | 0.653 + 0.243i |
| 21.7 | 0.350 + 0.235i | 0.435 + 0.162i | 0.765 + 0.417i | 0.793 + 0.266i | 0.470 + 0.331i | 0.539 + 0.207i | 0.586 + 0.412i | 0.654 + 0.244i |
| 21.8 | 0.350 + 0.236i | 0.436 + 0.163i | 0.768 + 0.418i | 0.794 + 0.266i | 0.473 + 0.332i | 0.541 + 0.207i | 0.589 + 0.413i | 0.656 + 0.244i |
| 21.9 | 0.350 + 0.237i | 0.436 + 0.164i | 0.770 + 0.418i | 0.796 + 0.266i | 0.474 + 0.333i | 0.541 + 0.208i | 0.591 + 0.414i | 0.658 + 0.245i |
| 22 | 0.351 + 0.238i | 0.437 + 0.165i | 0.772 + 0.419i | 0.799 + 0.265i | 0.476 + 0.333i | 0.543 + 0.208i | 0.594 + 0.414i | 0.659 + 0.245i |
| 22.1 | 0.351 + 0.239i | 0.437 + 0.165i | 0.774 + 0.420i | 0.799 + 0.265i | 0.478 + 0.334i | 0.544 + 0.209i | 0.596 + 0.416i | 0.660 + 0.246i |
| 22.2 | 0.352 + 0.240i | 0.439 + 0.165i | 0.776 + 0.420i | 0.802 + 0.266i | 0.480 + 0.334i | 0.546 + 0.209i | 0.599 + 0.417i | 0.663 + 0.246i |
| 22.3 | 0.353 + 0.242i | 0.440 + 0.167i | 0.779 + 0.420i | 0.804 + 0.265i | 0.482 + 0.335i | 0.547 + 0.209i | 0.601 + 0.418i | 0.664 + 0.247i |
| 22.4 | 0.355 + 0.243i | 0.441 + 0.168i | 0.782 + 0.418i | 0.807 + 0.264i | 0.487 + 0.336i | 0.549 + 0.211i | 0.606 + 0.422i | 0.667 + 0.247i |
| 22.5 | 0.355 + 0.244i | 0.442 + 0.169i | 0.784 + 0.419i | 0.809 + 0.264i | 0.488 + 0.337i | 0.551 + 0.211i | 0.608 + 0.424i | 0.668 + 0.248i |
| 22.6 | 0.831 + 0.794i | 0.733 + 1.147i | 1.016 + 0.827i | 0.923 + 1.022i | 0.822 + 0.633i | 0.695 + 1.379i | 1.035 + 0.634i | 0.980 + 1.252i |
| 22.7 | 0.832 + 0.796i | 0.732 + 1.149i | 1.016 + 0.829i | 0.922 + 1.024i | 0.824 + 0.634i | 0.691 + 1.379i | 1.036 + 0.636i | 0.978 + 1.252i |
| 22.8 | 0.834 + 0.797i | 0.730 + 1.151i | 1.017 + 0.829i | 0.922 + 1.024i | 0.826 + 0.635i | 0.687 + 1.379i | 1.036 + 0.637i | 0.975 + 1.251i |
| 22.9 | 0.835 + 0.799i | 0.728 + 1.152i | 1.018 + 0.830i | 0.922 + 1.025i | 0.828 + 0.637i | 0.683 + 1.379i | 1.037 + 0.638i | 0.971 + 1.252i |
| 23 | 0.837 + 0.801i | 0.727 + 1.153i | 1.020 + 0.831i | 0.922 + 1.026i | 0.829 + 0.638i | 0.679 + 1.378i | 1.037 + 0.639i | 0.969 + 1.251i |
| 23.1 | 0.838 + 0.802i | 0.727 + 1.155i | 1.021 + 0.831i | 0.924 + 1.026i | 0.831 + 0.639i | 0.675 + 1.378i | 1.039 + 0.640i | 0.967 + 1.250i |
| 23.2 | 0.840 + 0.804i | 0.726 + 1.156i | 1.022 + 0.832i | 0.924 + 1.027i | 0.832 + 0.642i | 0.671 + 1.377i | 1.039 + 0.641i | 0.965 + 1.251i |
| 23.3 | 0.840 + 0.806i | 0.726 + 1.159i | 1.023 + 0.832i | 0.926 + 1.027i | 0.835 + 0.643i | 0.667 + 1.378i | 1.040 + 0.642i | 0.964 + 1.250i |
| 23.4 | 0.849 + 0.851i | 0.677 + 1.176i | 1.021 + 0.937i | 0.898 + 1.110i | 0.845 + 0.677i | 0.572 + 1.393i | 1.052 + 0.721i | 0.850 + 1.347i |
| 23.5 | 0.851 + 0.855i | 0.676 + 1.177i | 1.023 + 0.944i | 0.897 + 1.114i | 0.846 + 0.681i | 0.568 + 1.391i | 1.049 + 0.727i | 0.844 + 1.350i |
| 23.6 | 0.854 + 0.858i | 0.672 + 1.176i | 1.026 + 0.949i | 0.894 + 1.115i | 0.848 + 0.683i | 0.565 + 1.389i | 1.049 + 0.729i | 0.838 + 1.348i |
| 23.7 | 0.855 + 0.860i | 0.671 + 1.177i | 1.027 + 0.952i | 0.894 + 1.117i | 0.848 + 0.684i | 0.561 + 1.388i | 1.048 + 0.731i | 0.833 + 1.349i |
| 23.8 | 0.857 + 0.863i | 0.668 + 1.177i | 1.030 + 0.956i | 0.892 + 1.119i | 0.850 + 0.686i | 0.559 + 1.387i | 1.047 + 0.735i | 0.830 + 1.349i |
| 23.9 | 0.859 + 0.864i | 0.667 + 1.178i | 1.031 + 0.958i | 0.892 + 1.120i | 0.851 + 0.687i | 0.556 + 1.386i | 1.047 + 0.736i | 0.826 + 1.348i |
| 24 | 0.860 + 0.866i | 0.666 + 1.178i | 1.032 + 0.959i | 0.893 + 1.120i | 0.852 + 0.689i | 0.555 + 1.384i | 1.046 + 0.737i | 0.824 + 1.347i |
| 24.1 | 0.863 + 0.868i | 0.665 + 1.178i | 1.035 + 0.961i | 0.893 + 1.120i | 0.853 + 0.690i | 0.553 + 1.382i | 1.046 + 0.738i | 0.824 + 1.345i |
| 24.2 | 0.864 + 0.869i | 0.664 + 1.180i | 1.037 + 0.960i | 0.895 + 1.118i | 0.854 + 0.690i | 0.552 + 1.382i | 1.047 + 0.737i | 0.826 + 1.341i |
| 24.3 | 0.865 + 0.868i | 0.648 + 1.212i | 1.049 + 0.926i | 0.938 + 1.097i | 0.853 + 0.693i | 0.516 + 1.397i | 1.046 + 0.724i | 0.859 + 1.299i |
| 24.4 | 0.868 + 0.871i | 0.645 + 1.215i | 1.053 + 0.926i | 0.943 + 1.097i | 0.854 + 0.695i | 0.510 + 1.397i | 1.047 + 0.725i | 0.857 + 1.293i |
| 24.5 | 0.868 + 0.873i | 0.642 + 1.217i | 1.053 + 0.927i | 0.944 + 1.096i | 0.855 + 0.697i | 0.506 + 1.396i | 1.046 + 0.726i | 0.855 + 1.290i |
| 24.6 | 0.869 + 0.875i | 0.639 + 1.217i | 1.055 + 0.927i | 0.944 + 1.096i | 0.855 + 0.698i | 0.503 + 1.395i | 1.046 + 0.728i | 0.852 + 1.287i |
| 24.7 | 0.870 + 0.876i | 0.638 + 1.217i | 1.055 + 0.928i | 0.945 + 1.096i | 0.857 + 0.700i | 0.501 + 1.393i | 1.046 + 0.729i | 0.850 + 1.285i |
| 24.8 | 0.872 + 0.877i | 0.637 + 1.217i | 1.057 + 0.930i | 0.945 + 1.095i | 0.857 + 0.701i | 0.499 + 1.391i | 1.045 + 0.731i | 0.848 + 1.283i |
| 24.9 | 0.872 + 0.879i | 0.636 + 1.217i | 1.057 + 0.930i | 0.946 + 1.096i | 0.858 + 0.702i | 0.498 + 1.390i | 1.046 + 0.732i | 0.846 + 1.280i |
| 25 | 0.873 + 0.879i | 0.636 + 1.217i | 1.058 + 0.931i | 0.945 + 1.095i | 0.858 + 0.703i | 0.497 + 1.388i | 1.045 + 0.732i | 0.845 + 1.278i |

| SNR | a57 | a58 | a59 | a60 | a61 | a62 | a63 | a64 |
|---|---|---|---|---|---|---|---|---|
| 10 | 0.181 + 0.316i | 0.165 + 0.316i | 0.315 + 0.577i | 0.218 + 0.619i | 0.180 + 0.316i | 0.165 + 0.316i | 0.320 + 0.582i | 0.220 + 0.623i |
| 10.1 | 0.179 + 0.313i | 0.164 + 0.314i | 0.317 + 0.580i | 0.216 + 0.623i | 0.178 + 0.313i | 0.163 + 0.313i | 0.321 + 0.584i | 0.218 + 0.627i |
| 10.2 | 0.178 + 0.311i | 0.162 + 0.311i | 0.318 + 0.582i | 0.214 + 0.627i | 0.176 + 0.310i | 0.162 + 0.310i | 0.323 + 0.586i | 0.216 + 0.631i |
| 10.3 | 0.176 + 0.309i | 0.161 + 0.310i | 0.320 + 0.584i | 0.212 + 0.631i | 0.174 + 0.308i | 0.160 + 0.307i | 0.324 + 0.588i | 0.214 + 0.635i |
| 10.4 | 0.175 + 0.307i | 0.159 + 0.308i | 0.321 + 0.586i | 0.209 + 0.634i | 0.173 + 0.306i | 0.158 + 0.305i | 0.326 + 0.589i | 0.211 + 0.638i |
| 10.5 | 0.174 + 0.306i | 0.158 + 0.306i | 0.323 + 0.588i | 0.208 + 0.638i | 0.172 + 0.304i | 0.157 + 0.303i | 0.327 + 0.591i | 0.209 + 0.642i |
| 10.6 | 0.173 + 0.304i | 0.157 + 0.305i | 0.325 + 0.589i | 0.206 + 0.541i | 0.171 + 0.303i | 0.156 + 0.301i | 0.328 + 0.592i | 0.207 + 0.645i |

-continued

| | 256NUC | | | | | | | |
|---|---|---|---|---|---|---|---|---|
| 10.7 | 0.172 + 0.303i | 0.155 + 0.304i | 0.327 + 0.591i | 0.203 + 0.645i | 0.170 + 0.301i | 0.155 + 0.300i | 0.330 + 0.593i | 0.205 + 0.648i |
| 10.8 | 0.171 + 0.302i | 0.155 + 0.303i | 0.328 + 0.592i | 0.201 + 0.648i | 0.169 + 0.300i | 0.153 + 0.298i | 0.331 + 0.594i | 0.203 + 0.651i |
| 10.9 | 0.171 + 0.301i | 0.153 + 0.302i | 0.330 + 0.594i | 0.199 + 0.651i | 0.168 + 0.299i | 0.152 + 0.298i | 0.333 + 0.595i | 0.201 + 0.654i |
| 11 | 0.170 + 0.301i | 0.152 + 0.301i | 0.332 + 0.595i | 0.197 + 0.654i | 0.168 + 0.298i | 0.151 + 0.297i | 0.334 + 0.596i | 0.198 + 0.657i |
| 11.1 | 0.169 + 0.301i | 0.151 + 0.301i | 0.334 + 0.595i | 0.195 + 0.656i | 0.167 + 0.298i | 0.150 + 0.296i | 0.336 + 0.596i | 0.196 + 0.659i |
| 11.2 | 0.169 + 0.300i | 0.150 + 0.301i | 0.336 + 0.596i | 0.193 + 0.658i | 0.166 + 0.297i | 0.149 + 0.296i | 0.338 + 0.597i | 0.194 + 0.661i |
| 11.3 | 0.169 + 0.300i | 0.149 + 0.300i | 0.337 + 0.597i | 0.191 + 0.661i | 0.166 + 0.296i | 0.148 + 0.295i | 0.340 + 0.598i | 0.192 + 0.664i |
| 11.4 | 0.168 + 0.299i | 0.148 + 0.299i | 0.339 + 0.598i | 0.189 + 0.662i | 0.165 + 0.296i | 0.147 + 0.294i | 0.341 + 0.598i | 0.190 + 0.655i |
| 11.5 | 0.167 + 0.299i | 0.147 + 0.299i | 0.340 + 0.598i | 0.188 + 0.664i | 0.164 + 0.295i | 0.146 + 0.294i | 0.343 + 0.598i | 0.188 + 0.666i |
| 11.6 | 0.167 + 0.298i | 0.146 + 0.299i | 0.341 + 0.598i | 0.186 + 0.665i | 0.164 + 0.294i | 0.145 + 0.293i | 0.344 + 0.598i | 0.186 + 0.668i |
| 11.7 | 0.167 + 0.298i | 0.146 + 0.298i | 0.342 + 0.599i | 0.184 + 0.666i | 0.163 + 0.294i | 0.144 + 0.293i | 0.345 + 0.597i | 0.184 + 0.668i |
| 11.8 | 0.166 + 0.298i | 0.144 + 0.299i | 0.344 + 0.598i | 0.183 + 0.667i | 0.163 + 0.294i | 0.143 + 0.293i | 0.347 + 0.597i | 0.182 + 0.669i |
| 11.9 | 0.166 + 0.298i | 0.144 + 0.298i | 0.345 + 0.598i | 0.182 + 0.668i | 0.162 + 0.293i | 0.142 + 0.293i | 0.348 + 0.597i | 0.181 + 0.670i |
| 12 | 0.166 + 0.297i | 0.143 + 0.299i | 0.346 + 0.599i | 0.180 + 0.669i | 0.161 + 0.293i | 0.141 + 0.293i | 0.349 + 0.597i | 0.179 + 0.670i |
| 12.1 | 0.165 + 0.297i | 0.142 + 0.298i | 0.347 + 0.599i | 0.178 + 0.670i | 0.161 + 0.293i | 0.140 + 0.293i | 0.351 + 0.596i | 0.177 + 0.671i |
| 12.2 | 0.165 + 0.298i | 0.141 + 0.299i | 0.349 + 0.598i | 0.177 + 0.670i | 0.160 + 0.293i | 0.140 + 0.293i | 0.352 + 0.596i | 0.176 + 0.671i |
| 12.3 | 0.164 + 0.298i | 0.140 + 0.299i | 0.350 + 0.598i | 0.176 + 0.671i | 0.160 + 0.293i | 0.139 + 0.294i | 0.354 + 0.596i | 0.174 + 0.671i |
| 12.4 | 0.163 + 0.297i | 0.139 + 0.299i | 0.351 + 0.598i | 0.174 + 0.671i | 0.160 + 0.293i | 0.138 + 0.294i | 0.355 + 0.595i | 0.172 + 0.671i |
| 12.5 | 0.163 + 0.297i | 0.138 + 0.300i | 0.353 + 0.598i | 0.173 + 0.672i | 0.159 + 0.293i | 0.137 + 0.295i | 0.356 + 0.594i | 0.171 + 0.671i |
| 12.6 | 0.163 + 0.296i | 0.137 + 0.300i | 0.354 + 0.598i | 0.171 + 0.671i | 0.158 + 0.292i | 0.136 + 0.295i | 0.357 + 0.594i | 0.169 + 0.670i |
| 12.7 | 0.162 + 0.296i | 0.136 + 0.299i | 0.355 + 0.598i | 0.170 + 0.671i | 0.158 + 0.292i | 0.135 + 0.295i | 0.358 + 0.593i | 0.168 + 0.669i |
| 12.8 | 0.161 + 0.277i | 0.137 + 0.282i | 0.353 + 0.587i | 0.168 + 0.653i | 0.157 + 0.273i | 0.135 + 0.277i | 0.353 + 0.584i | 0.165 + 0.652i |
| 12.9 | 0.159 + 0.270i | 0.135 + 0.272i | 0.349 + 0.585i | 0.165 + 0.648i | 0.155 + 0.266i | 0.134 + 0.268i | 0.348 + 0.582i | 0.162 + 0.646i |
| 13 | 0.156 + 0.262i | 0.134 + 0.264i | 0.344 + 0.583i | 0.161 + 0.643i | 0.153 + 0.258i | 0.133 + 0.259i | 0.343 + 0.579i | 0.159 + 0.641i |
| 13.1 | 0.155 + 0.258i | 0.132 + 0.259i | 0.341 + 0.582i | 0.159 + 0.640i | 0.152 + 0.255i | 0.132 + 0.255i | 0.340 + 0.578i | 0.156 + 0.637i |
| 13.2 | 0.154 + 0.253i | 0.131 + 0.253i | 0.337 + 0.580i | 0.156 + 0.636i | 0.152 + 0.250i | 0.130 + 0.249i | 0.336 + 0.575i | 0.153 + 0.632i |
| 13.3 | 0.153 + 0.250i | 0.130 + 0.251i | 0.337 + 0.579i | 0.155 + 0.635i | 0.151 + 0.248i | 0.130 + 0.248i | 0.335 + 0.574i | 0.152 + 0.630i |
| 13.4 | 0.152 + 0.247i | 0.129 + 0.246i | 0.335 + 0.577i | 0.153 + 0.631i | 0.150 + 0.245i | 0.128 + 0.244i | 0.332 + 0.572i | 0.150 + 0.626i |
| 13.5 | 0.152 + 0.244i | 0.128 + 0.243i | 0.333 + 0.576i | 0.151 + 0.628i | 0.150 + 0.242i | 0.128 + 0.241i | 0.330 + 0.570i | 0.147 + 0.623i |
| 13.6 | 0.151 + 0.242i | 0.127 + 0.241i | 0.333 + 0.574i | 0.149 + 0.625i | 0.150 + 0.241i | 0.127 + 0.239i | 0.330 + 0.568i | 0.146 + 0.620i |
| 13.7 | 0.155 + 0.222i | 0.130 + 0.228i | 0.328 + 0.558i | 0.146 + 0.591i | 0.155 + 0.221i | 0.130 + 0.226i | 0.325 + 0.556i | 0.144 + 0.589i |
| 13.8 | 0.155 + 0.220i | 0.129 + 0.227i | 0.328 + 0.557i | 0.145 + 0.588i | 0.155 + 0.219i | 0.129 + 0.224i | 0.325 + 0.554i | 0.143 + 0.586i |
| 13.9 | 0.155 + 0.218i | 0.129 + 0.225i | 0.329 + 0.555i | 0.144 + 0.586i | 0.155 + 0.218i | 0.129 + 0.224i | 0.325 + 0.552i | 0.142 + 0.583i |
| 14 | 0.156 + 0.217i | 0.129 + 0.225i | 0.329 + 0.554i | 0.144 + 0.583i | 0.156 + 0.217i | 0.129 + 0.223i | 0.326 + 0.551i | 0.141 + 0.581i |
| 14.1 | 0.156 + 0.215i | 0.128 + 0.224i | 0.331 + 0.554i | 0.142 + 0.581i | 0.156 + 0.216i | 0.129 + 0.223i | 0.326 + 0.550i | 0.140 + 0.579i |
| 14.2 | 0.156 + 0.214i | 0.128 + 0.224i | 0.331 + 0.552i | 0.142 + 0.579i | 0.156 + 0.215i | 0.128 + 0.222i | 0.327 + 0.549i | 0.139 + 0.577i |
| 14.3 | 0.157 + 0.213i | 0.128 + 0.223i | 0.332 + 0.552i | 0.141 + 0.577i | 0.157 + 0.214i | 0.128 + 0.222i | 0.327 + 0.547i | 0.138 + 0.575i |
| 14.4 | 0.157 + 0.211i | 0.128 + 0.222i | 0.332 + 0.550i | 0.140 + 0.574i | 0.157 + 0.213i | 0.128 + 0.222i | 0.327 + 0.546i | 0.138 + 0.572i |
| 14.5 | 0.158 + 0.210i | 0.128 + 0.222i | 0.333 + 0.550i | 0.139 + 0.573i | 0.158 + 0.211i | 0.128 + 0.222i | 0.328 + 0.544i | 0.137 + 0.570i |
| 14.6 | 0.159 + 0.208i | 0.128 + 0.222i | 0.333 + 0.549i | 0.139 + 0.570i | 0.159 + 0.210i | 0.128 + 0.223i | 0.328 + 0.543i | 0.136 + 0.567i |
| 14.7 | 0.160 + 0.208i | 0.128 + 0.222i | 0.334 + 0.548i | 0.138 + 0.568i | 0.160 + 0.210i | 0.128 + 0.223i | 0.329 + 0.542i | 0.135 + 0.565i |
| 14.8 | 0.160 + 0.206i | 0.128 + 0.222i | 0.335 + 0.547i | 0.137 + 0.565i | 0.160 + 0.209i | 0.128 + 0.223i | 0.329 + 0.541i | 0.135 + 0.562i |
| 14.9 | 0.162 + 0.205i | 0.128 + 0.222i | 0.335 + 0.546i | 0.136 + 0.563i | 0.162 + 0.208i | 0.128 + 0.224i | 0.329 + 0.539i | 0.134 + 0.560i |
| 15 | 0.162 + 0.204i | 0.128 + 0.222i | 0.335 + 0.546i | 0.136 + 0.561i | 0.163 + 0.208i | 0.128 + 0.225i | 0.329 + 0.537i | 0.133 + 0.557i |
| 15.1 | 0.163 + 0.204i | 0.128 + 0.222i | 0.335 + 0.545i | 0.134 + 0.558i | 0.163 + 0.208i | 0.128 + 0.226i | 0.329 + 0.536i | 0.133 + 0.555i |
| 15.2 | 0.165 + 0.203i | 0.128 + 0.223i | 0.336 + 0.544i | 0.134 + 0.555i | 0.165 + 0.208i | 0.128 + 0.227i | 0.329 + 0.534i | 0.132 + 0.552i |
| 15.3 | 0.166 + 0.202i | 0.129 + 0.224i | 0.336 + 0.543i | 0.133 + 0.553i | 0.166 + 0.208i | 0.129 + 0.229i | 0.328 + 0.533i | 0.132 + 0.549i |
| 15.4 | 0.168 + 0.203i | 0.129 + 0.226i | 0.336 + 0.542i | 0.133 + 0.550i | 0.168 + 0.209i | 0.129 + 0.231i | 0.329 + 0.531i | 0.131 + 0.547i |
| 15.5 | 0.525 + 0.807i | 0.275 + 0.934i | 0.812 + 1.473i | 0.500 + 1.612i | 0.618 + 0.735i | 0.138 + 0.964i | 1.080 + 1.290i | 0.173 + 1.674i |
| 15.6 | 0.520 + 0.808i | 0.274 + 0.929i | 0.803 + 1.473i | 0.493 + 1.609i | 0.617 + 0.734i | 0.136 + 0.959i | 1.072 + 1.294i | 0.170 + 1.667i |
| 15.7 | 0.516 + 0.808i | 0.273 + 0.924i | 0.796 + 1.474i | 0.487 + 1.607i | 0.616 + 0.733i | 0.133 + 0.954i | 1.065 + 1.297i | 0.167 + 1.661i |
| 15.8 | 0.512 + 0.809i | 0.272 + 0.921i | 0.788 + 1.473i | 0.483 + 1.604i | 0.615 + 0.733i | 0.131 + 0.951i | 1.059 + 1.301i | 0.165 + 1.657i |
| 15.9 | 0.509 + 0.810i | 0.273 + 0.918i | 0.784 + 1.472i | 0.479 + 1.602i | 0.615 + 0.733i | 0.129 + 0.948i | 1.056 + 1.302i | 0.164 + 1.653i |
| 16 | 0.506 + 0.811i | 0.274 + 0.915i | 0.780 + 1.473i | 0.474 + 1.600i | 0.615 + 0.732i | 0.127 + 0.945i | 1.052 + 1.304i | 0.162 + 1.648i |
| 16.1 | 0.503 + 0.811i | 0.275 + 0.913i | 0.777 + 1.472i | 0.473 + 1.597i | 0.615 + 0.731i | 0.126 + 0.943i | 1.050 + 1.304i | 0.162 + 1.646i |
| 16.2 | 0.500 + 0.812i | 0.275 + 0.911i | 0.776 + 1.470i | 0.472 + 1.596i | 0.615 + 0.731i | 0.123 + 0.942i | 1.049 + 1.303i | 0.161 + 1.643i |
| 16.3 | 0.498 + 0.813i | 0.277 + 0.910i | 0.776 + 1.469i | 0.473 + 1.595i | 0.615 + 0.730i | 0.122 + 0.942i | 1.048 + 1.301i | 0.161 + 1.643i |
| 16.4 | 0.495 + 0.815i | 0.277 + 0.909i | 0.775 + 1.467i | 0.472 + 1.593i | 0.615 + 0.729i | 0.120 + 0.941i | 1.048 + 1.300i | 0.161 + 1.642i |
| 16.5 | 0.493 + 0.815i | 0.278 + 0.908i | 0.775 + 1.466i | 0.472 + 1.592i | 0.615 + 0.729i | 0.118 + 0.940i | 1.048 + 1.298i | 0.161 + 1.641i |
| 16.6 | 0.490 + 0.816i | 0.279 + 0.908i | 0.776 + 1.464i | 0.474 + 1.591i | 0.614 + 0.728i | 0.117 + 0.941i | 1.049 + 1.296i | 0.162 + 1.641i |
| 16.7 | 0.488 + 0.817i | 0.279 + 0.907i | 0.777 + 1.462i | 0.475 + 1.589i | 0.614 + 0.728i | 0.116 + 0.940i | 1.050 + 1.293i | 0.162 + 1.641i |
| 16.8 | 0.485 + 0.819i | 0.280 + 0.908i | 0.779 + 1.461i | 0.476 + 1.588i | 0.613 + 0.729i | 0.114 + 0.941i | 1.050 + 1.290i | 0.163 + 1.642i |
| 16.9 | 0.483 + 0.820i | 0.280 + 0.908i | 0.781 + 1.460i | 0.479 + 1.587i | 0.613 + 0.729i | 0.112 + 0.942i | 1.052 + 1.287i | 0.164 + 1.643i |
| 17 | 0.481 + 0.821i | 0.281 + 0.908i | 0.783 + 1.457i | 0.481 + 1.586i | 0.613 + 0.727i | 0.111 + 0.943i | 1.053 + 1.284i | 0.164 + 1.644i |
| 17.1 | 0.480 + 0.823i | 0.283 + 0.910i | 0.786 + 1.455i | 0.484 + 1.585i | 0.614 + 0.727i | 0.110 + 0.946i | 1.055 + 1.280i | 0.166 + 1.645i |
| 17.2 | 0.478 + 0.824i | 0.284 + 0.910i | 0.785 + 1.453i | 0.484 + 1.583i | 0.614 + 0.726i | 0.108 + 0.947i | 1.055 + 1.279i | 0.166 + 1.644i |
| 17.3 | 0.478 + 0.824i | 0.285 + 0.910i | 0.786 + 1.452i | 0.485 + 1.581i | 0.615 + 0.725i | 0.107 + 0.948i | 1.055 + 1.276i | 0.166 + 1.644i |
| 17.4 | 0.476 + 0.825i | 0.286 + 0.910i | 0.787 + 1.450i | 0.486 + 1.579i | 0.616 + 0.724i | 0.106 + 0.948i | 1.055 + 1.274i | 0.166 + 1.643i |
| 17.5 | 0.476 + 0.826i | 0.287 + 0.910i | 0.786 + 1.449i | 0.485 + 1.577i | 0.617 + 0.724i | 0.106 + 0.949i | 1.055 + 1.272i | 0.166 + 1.641i |
| 17.6 | 0.476 + 0.826i | 0.289 + 0.909i | 0.786 + 1.447i | 0.486 + 1.575i | 0.618 + 0.722i | 0.105 + 0.950i | 1.054 + 1.271i | 0.166 + 1.640i |
| 17.7 | 0.476 + 0.826i | 0.291 + 0.910i | 0.786 + 1.445i | 0.486 + 1.573i | 0.620 + 0.721i | 0.104 + 0.950i | 1.055 + 1.269i | 0.165 + 1.639i |
| 17.8 | 0.477 + 0.826i | 0.293 + 0.910i | 0.786 + 1.443i | 0.486 + 1.571i | 0.621 + 0.720i | 0.103 + 0.952i | 1.054 + 1.267i | 0.165 + 1.637i |
| 17.9 | 0.583 + 0.730i | 0.461 + 0.875i | 0.988 + 1.303i | 0.717 + 1.470i | 0.664 + 0.626i | 0.117 + 1.522i | 1.234 + 1.091i | 0.407 + 1.607i |
| 18 | 0.578 + 0.730i | 0.461 + 0.865i | 0.990 + 1.299i | 0.720 + 1.463i | 0.662 + 0.626i | 0.122 + 1.539i | 1.233 + 1.087i | 0.419 + 1.602i |
| 18.1 | 0.574 + 0.732i | 0.459 + 0.860i | 0.988 + 1.296i | 0.721 + 1.459i | 0.661 + 0.625i | 0.124 + 1.546i | 1.231 + 1.084i | 0.424 + 1.601i |
| 18.2 | 0.570 + 0.733i | 0.457 + 0.855i | 0.988 + 1.292i | 0.723 + 1.456i | 0.660 + 0.625i | 0.126 + 1.552i | 1.228 + 1.082i | 0.427 + 1.600i |
| 18.3 | 0.566 + 0.734i | 0.454 + 0.851i | 0.987 + 1.290i | 0.724 + 1.454i | 0.659 + 0.524i | 0.127 + 1.555i | 1.225 + 1.080i | 0.430 + 1.600i |

-continued

| 256NUC | | | | | | | | |
|---|---|---|---|---|---|---|---|---|
| 18.4 | 0.565 + 0.735i | 0.454 + 0.849i | 0.986 + 1.289i | 0.723 + 1.452i | 0.659 + 0.623i | 0.127 + 1.555i | 1.224 + 1.078i | 0.430 + 1.598i |
| 18.5 | 0.595 + 0.730i | 0.463 + 0.891i | 1.007 + 1.278i | 0.738 + 1.438i | 0.673 + 0.611i | 0.138 + 1.564i | 1.242 + 1.058i | 0.444 + 1.571i |
| 18.6 | 0.593 + 0.732i | 0.464 + 0.890i | 1.009 + 1.275i | 0.740 + 1.436i | 0.672 + 0.511i | 0.139 + 1.565i | 1.242 + 1.054i | 0.446 + 1.569i |
| 18.7 | 0.577 + 0.733i | 0.466 + 0.873i | 1.016 + 1.265i | 0.752 + 1.427i | 0.659 + 0.612i | 0.151 + 1.600i | 1.243 + 1.042i | 0.465 + 1.568i |
| 18.8 | 0.574 + 0.737i | 0.463 + 0.875i | 1.016 + 1.261i | 0.754 + 1.424i | 0.658 + 0.614i | 0.153 + 1.606i | 1.241 + 1.039i | 0.468 + 1.567i |
| 18.9 | 0.573 + 0.739i | 0.463 + 0.875i | 1.016 + 1.260i | 0.754 + 1.423i | 0.658 + 0.614i | 0.153 + 1.606i | 1.239 + 1.037i | 0.468 + 1.566i |
| 19 | 0.572 + 0.740i | 0.462 + 0.876i | 1.016 + 1.257i | 0.756 + 1.421i | 0.658 + 0.614i | 0.154 + 1.607i | 1.238 + 1.034i | 0.470 + 1.566i |
| 19.1 | 0.572 + 0.742i | 0.462 + 0.877i | 1.015 + 1.256i | 0.756 + 1.420i | 0.659 + 0.615i | 0.154 + 1.606i | 1.237 + 1.033i | 0.470 + 1.565i |
| 19.2 | 0.235 + 0.324i | 0.081 + 0.342i | 0.267 + 0.515i | 0.105 + 0.544i | 0.242 + 0.330i | 0.077 + 0.341i | 0.305 + 0.503i | 0.085 + 0.547i |
| 19.3 | 0.234 + 0.324i | 0.080 + 0.342i | 0.267 + 0.515i | 0.106 + 0.544i | 0.243 + 0.330i | 0.077 + 0.341i | 0.306 + 0.503i | 0.085 + 0.548i |
| 19.4 | 0.234 + 0.324i | 0.080 + 0.341i | 0.266 + 0.516i | 0.106 + 0.544i | 0.243 + 0.330i | 0.077 + 0.341i | 0.307 + 0.503i | 0.084 + 0.547i |
| 19.5 | 0.234 + 0.323i | 0.080 + 0.341i | 0.265 + 0.517i | 0.107 + 0.544i | 0.243 + 0.330i | 0.076 + 0.341i | 0.307 + 0.502i | 0.082 + 0.547i |
| 19.6 | 0.234 + 0.323i | 0.080 + 0.340i | 0.264 + 0.518i | 0.107 + 0.544i | 0.242 + 0.330i | 0.076 + 0.340i | 0.307 + 0.502i | 0.082 + 0.547i |
| 19.7 | 0.234 + 0.322i | 0.080 + 0.339i | 0.263 + 0.518i | 0.107 + 0.544i | 0.242 + 0.330i | 0.076 + 0.340i | 0.308 + 0.502i | 0.081 + 0.547i |
| 19.8 | 0.234 + 0.321i | 0.080 + 0.338i | 0.262 + 0.519i | 0.107 + 0.544i | 0.242 + 0.330i | 0.076 + 0.340i | 0.309 + 0.502i | 0.080 + 0.547i |
| 19.9 | 0.233 + 0.320i | 0.080 + 0.338i | 0.262 + 0.519i | 0.108 + 0.543i | 0.242 + 0.330i | 0.076 + 0.340i | 0.310 + 0.501i | 0.079 + 0.546i |
| 20 | 0.233 + 0.320i | 0.080 + 0.337i | 0.262 + 0.520i | 0.109 + 0.544i | 0.242 + 0.330i | 0.076 + 0.340i | 0.311 + 0.501i | 0.079 + 0.547i |
| 20.1 | 0.233 + 0.319i | 0.080 + 0.336i | 0.261 + 0.520i | 0.110 + 0.544i | 0.243 + 0.330i | 0.075 + 0.340i | 0.312 + 0.500i | 0.078 + 0.546i |
| 20.2 | 0.233 + 0.318i | 0.081 + 0.336i | 0.262 + 0.520i | 0.111 + 0.543i | 0.243 + 0.330i | 0.075 + 0.341i | 0.314 + 0.500i | 0.077 + 0.546i |
| 20.3 | 0.234 + 0.317i | 0.081 + 0.334i | 0.262 + 0.521i | 0.112 + 0.543i | 0.245 + 0.331i | 0.076 + 0.342i | 0.315 + 0.499i | 0.076 + 0.545i |
| 20.4 | 0.234 + 0.315i | 0.081 + 0.332i | 0.262 + 0.522i | 0.116 + 0.546i | 0.246 + 0.333i | 0.076 + 0.347i | 0.317 + 0.498i | 0.075 + 0.544i |
| 20.5 | 0.235 + 0.337i | 0.097 + 0.384i | 0.289 + 0.566i | 0.165 + 0.600i | 0.294 + 0.394i | 0.076 + 0.445i | 0.359 + 0.510i | 0.075 + 0.594i |
| 20.6 | 0.236 + 0.338i | 0.099 + 0.387i | 0.291 + 0.568i | 0.168 + 0.602i | 0.299 + 0.396i | 0.076 + 0.449i | 0.362 + 0.510i | 0.075 + 0.597i |
| 20.7 | 0.237 + 0.340i | 0.101 + 0.391i | 0.291 + 0.569i | 0.171 + 0.602i | 0.304 + 0.398i | 0.075 + 0.453i | 0.366 + 0.510i | 0.074 + 0.599i |
| 20.8 | 0.246 + 0.344i | 0.115 + 0.396i | 0.299 + 0.563i | 0.183 + 0.591i | 0.334 + 0.398i | 0.069 + 0.456i | 0.391 + 0.507i | 0.074 + 0.596i |
| 20.9 | 0.248 + 0.345i | 0.119 + 0.397i | 0.299 + 0.562i | 0.184 + 0.588i | 0.341 + 0.398i | 0.067 + 0.457i | 0.395 + 0.507i | 0.074 + 0.596i |
| 21 | 0.249 + 0.346i | 0.121 + 0.398i | 0.299 + 0.561i | 0.186 + 0.587i | 0.347 + 0.399i | 0.065 + 0.458i | 0.399 + 0.507i | 0.073 + 0.597i |
| 21.1 | 0.250 + 0.348i | 0.124 + 0.399i | 0.300 + 0.561i | 0.188 + 0.586i | 0.351 + 0.400i | 0.064 + 0.459i | 0.402 + 0.507i | 0.073 + 0.597i |
| 21.2 | 0.253 + 0.349i | 0.127 + 0.400i | 0.300 + 0.560i | 0.189 + 0.584i | 0.359 + 0.400i | 0.062 + 0.459i | 0.408 + 0.507i | 0.072 + 0.597i |
| 21.3 | 0.254 + 0.350i | 0.130 + 0.401i | 0.300 + 0.559i | 0.190 + 0.583i | 0.363 + 0.401i | 0.061 + 0.459i | 0.411 + 0.508i | 0.071 + 0.598i |
| 21.4 | 0.255 + 0.351i | 0.132 + 0.402i | 0.301 + 0.559i | 0.191 + 0.582i | 0.367 + 0.402i | 0.060 + 0.460i | 0.415 + 0.508i | 0.071 + 0.598i |
| 21.5 | 0.256 + 0.352i | 0.134 + 0.403i | 0.301 + 0.559i | 0.192 + 0.581i | 0.369 + 0.403i | 0.060 + 0.460i | 0.417 + 0.509i | 0.071 + 0.599i |
| 21.6 | 0.258 + 0.353i | 0.136 + 0.404i | 0.302 + 0.559i | 0.192 + 0.580i | 0.373 + 0.403i | 0.059 + 0.460i | 0.421 + 0.510i | 0.070 + 0.598i |
| 21.7 | 0.259 + 0.354i | 0.138 + 0.405i | 0.302 + 0.559i | 0.193 + 0.580i | 0.375 + 0.404i | 0.058 + 0.460i | 0.423 + 0.511i | 0.070 + 0.599i |
| 21.8 | 0.260 + 0.355i | 0.140 + 0.406i | 0.303 + 0.559i | 0.193 + 0.579i | 0.379 + 0.405i | 0.057 + 0.460i | 0.426 + 0.512i | 0.070 + 0.600i |
| 21.9 | 0.261 + 0.356i | 0.142 + 0.407i | 0.303 + 0.559i | 0.193 + 0.579i | 0.380 + 0.406i | 0.057 + 0.460i | 0.428 + 0.513i | 0.070 + 0.600i |
| 22 | 0.263 + 0.358i | 0.144 + 0.408i | 0.304 + 0.559i | 0.194 + 0.579i | 0.384 + 0.407i | 0.057 + 0.460i | 0.431 + 0.514i | 0.070 + 0.600i |
| 22.1 | 0.264 + 0.358i | 0.145 + 0.408i | 0.304 + 0.559i | 0.194 + 0.579i | 0.386 + 0.408i | 0.056 + 0.460i | 0.433 + 0.515i | 0.070 + 0.601i |
| 22.2 | 0.265 + 0.359i | 0.147 + 0.409i | 0.306 + 0.559i | 0.195 + 0.578i | 0.388 + 0.408i | 0.056 + 0.459i | 0.437 + 0.516i | 0.069 + 0.601i |
| 22.3 | 0.266 + 0.361i | 0.149 + 0.409i | 0.307 + 0.559i | 0.195 + 0.578i | 0.390 + 0.409i | 0.056 + 0.459i | 0.439 + 0.517i | 0.069 + 0.601i |
| 22.4 | 0.270 + 0.363i | 0.151 + 0.409i | 0.310 + 0.558i | 0.196 + 0.575i | 0.396 + 0.410i | 0.055 + 0.457i | 0.451 + 0.519i | 0.069 + 0.599i |
| 22.5 | 0.271 + 0.363i | 0.153 + 0.410i | 0.311 + 0.558i | 0.196 + 0.575i | 0.397 + 0.411i | 0.055 + 0.456i | 0.453 + 0.520i | 0.069 + 0.599i |
| 22.6 | 0.657 + 0.796i | 0.681 + 0.968i | 1.439 + 0.592i | 1.279 + 0.792i | 0.641 + 0.636i | 0.502 + 1.245i | 1.219 + 0.516i | 1.198 + 1.044i |
| 22.7 | 0.658 + 0.797i | 0.682 + 0.968i | 1.438 + 0.590i | 1.278 + 0.790i | 0.644 + 0.637i | 0.501 + 1.243i | 1.219 + 0.516i | 1.197 + 1.043i |
| 22.8 | 0.661 + 0.798i | 0.685 + 0.969i | 1.434 + 0.589i | 1.277 + 0.789i | 0.645 + 0.638i | 0.499 + 1.242i | 1.217 + 0.515i | 1.195 + 1.042i |
| 22.9 | 0.662 + 0.798i | 0.687 + 0.969i | 1.432 + 0.587i | 1.276 + 0.787i | 0.647 + 0.639i | 0.497 + 1.241i | 1.216 + 0.514i | 1.194 + 1.041i |
| 23 | 0.664 + 0.799i | 0.688 + 0.970i | 1.429 + 0.586i | 1.276 + 0.785i | 0.649 + 0.641i | 0.496 + 1.240i | 1.215 + 0.514i | 1.193 + 1.040i |
| 23.1 | 0.666 + 0.800i | 0.691 + 0.971i | 1.428 + 0.582i | 1.276 + 0.782i | 0.651 + 0.642i | 0.495 + 1.238i | 1.215 + 0.512i | 1.194 + 1.037i |
| 23.2 | 0.667 + 0.802i | 0.693 + 0.972i | 1.426 + 0.578i | 1.276 + 0.780i | 0.652 + 0.643i | 0.494 + 1.236i | 1.214 + 0.511i | 1.194 + 1.035i |
| 23.3 | 0.668 + 0.804i | 0.695 + 0.975i | 1.423 + 0.575i | 1.275 + 0.777i | 0.654 + 0.646i | 0.493 + 1.234i | 1.212 + 0.509i | 1.195 + 1.032i |
| 23.4 | 0.671 + 0.817i | 0.682 + 0.991i | 1.456 + 0.466i | 1.312 + 0.665i | 0.663 + 0.656i | 0.453 + 1.213i | 1.225 + 0.445i | 1.275 + 0.887i |
| 23.5 | 0.673 + 0.819i | 0.684 + 0.993i | 1.452 + 0.465i | 1.306 + 0.660i | 0.665 + 0.658i | 0.451 + 1.211i | 1.223 + 0.441i | 1.274 + 0.881i |
| 23.6 | 0.676 + 0.819i | 0.685 + 0.993i | 1.449 + 0.466i | 1.302 + 0.657i | 0.667 + 0.659i | 0.449 + 1.210i | 1.222 + 0.439i | 1.273 + 0.876i |
| 23.7 | 0.677 + 0.821i | 0.687 + 0.994i | 1.445 + 0.467i | 1.297 + 0.655i | 0.668 + 0.660i | 0.448 + 1.207i | 1.221 + 0.438i | 1.272 + 0.872i |
| 23.8 | 0.679 + 0.822i | 0.689 + 0.995i | 1.441 + 0.466i | 1.294 + 0.653i | 0.670 + 0.661i | 0.447 + 1.207i | 1.219 + 0.437i | 1.270 + 0.869i |
| 23.9 | 0.681 + 0.823i | 0.691 + 0.996i | 1.437 + 0.466i | 1.290 + 0.651i | 0.671 + 0.662i | 0.447 + 1.206i | 1.217 + 0.436i | 1.269 + 0.866i |
| 24 | 0.683 + 0.824i | 0.693 + 0.997i | 1.434 + 0.466i | 1.288 + 0.649i | 0.672 + 0.663i | 0.446 + 1.205i | 1.215 + 0.435i | 1.267 + 0.862i |
| 24.1 | 0.685 + 0.826i | 0.695 + 0.998i | 1.431 + 0.465i | 1.285 + 0.646i | 0.674 + 0.665i | 0.446 + 1.203i | 1.214 + 0.434i | 1.268 + 0.858i |
| 24.2 | 0.688 + 0.828i | 0.697 + 1.000i | 1.429 + 0.465i | 1.283 + 0.645i | 0.676 + 0.666i | 0.445 + 1.203i | 1.212 + 0.433i | 1.267 + 0.856i |
| 24.3 | 0.690 + 0.844i | 0.717 + 1.030i | 1.424 + 0.461i | 1.279 + 0.637i | 0.678 + 0.676i | 0.433 + 1.204i | 1.207 + 0.430i | 1.281 + 0.845i |
| 24.4 | 0.693 + 0.847i | 0.720 + 1.034i | 1.421 + 0.460i | 1.277 + 0.634i | 0.680 + 0.678i | 0.431 + 1.202i | 1.205 + 0.429i | 1.282 + 0.840i |
| 24.5 | 0.694 + 0.849i | 0.722 + 1.037i | 1.418 + 0.461i | 1.274 + 0.634i | 0.681 + 0.680i | 0.430 + 1.201i | 1.204 + 0.429i | 1.280 + 0.839i |
| 24.6 | 0.695 + 0.850i | 0.722 + 1.038i | 1.415 + 0.462i | 1.271 + 0.633i | 0.682 + 0.681i | 0.428 + 1.199i | 1.203 + 0.428i | 1.279 + 0.836i |
| 24.7 | 0.697 + 0.852i | 0.724 + 1.039i | 1.413 + 0.462i | 1.269 + 0.631i | 0.684 + 0.682i | 0.428 + 1.197i | 1.202 + 0.428i | 1.277 + 0.833i |
| 24.8 | 0.698 + 0.853i | 0.725 + 1.040i | 1.410 + 0.462i | 1.266 + 0.631i | 0.684 + 0.683i | 0.429 + 1.196i | 1.201 + 0.428i | 1.276 + 0.831i |
| 24.9 | 0.699 + 0.854i | 0.726 + 1.040i | 1.407 + 0.463i | 1.265 + 0.630i | 0.686 + 0.684i | 0.428 + 1.196i | 1.199 + 0.428i | 1.274 + 0.829i |
| 25 | 0.700 + 0.855i | 0.726 + 1.041i | 1.405 + 0.463i | 1.262 + 0.629i | 0.686 + 0.685i | 0.428 + 1.195i | 1.198 + 0.427i | 1.273 + 0.827i |

Annex to the Description—Annex 1b

| 16NUQAM | | |
|---|---|---|
| SNR | L1 | L2 |
| 4 | 1 | 2.839885 |
| 4.1 | 1 | 2.893707 |
| 4.2 | 1 | 2.947556 |
| 4.3 | 1 | 2.999997 |
| 4.4 | 1 | 3.051775 |
| 4.5 | 1 | 3.102185 |
| 4.6 | 1 | 3.15186 |
| 4.7 | 1 | 3.199446 |
| 4.8 | 1 | 3.246374 |
| 4.9 | 1 | 3.291983 |
| 5 | 1 | 3.336053 |
| 5.1 | 1 | 3.378123 |
| 5.2 | 1 | 3.418789 |
| 5.3 | 1 | 3.457634 |
| 5.4 | 1 | 3.494374 |
| 5.5 | 1 | 3.529293 |
| 5.6 | 1 | 3.562092 |
| 5.7 | 1 | 3.592767 |
| 5.8 | 1 | 3.62144 |
| 5.9 | 1 | 3.647331 |
| 6 | 1 | 3.671139 |
| 6.1 | 1 | 3.692771 |
| 6.2 | 1 | 3.711765 |
| 6.3 | 1 | 3.727773 |
| 6.4 | 1 | 3.741562 |
| 6.5 | 1 | 3.753443 |
| 6.6 | 1 | 3.762235 |
| 6.7 | 1 | 3.768439 |
| 6.8 | 1 | 3.77272 |
| 6.9 | 1 | 3.774647 |
| 7 | 1 | 3.773951 |
| 7.1 | 1 | 3.77135 |
| 7.2 | 1 | 3.767057 |
| 7.3 | 1 | 3.760857 |
| 7.4 | 1 | 3.752584 |
| 7.5 | 1 | 3.743116 |
| 7.6 | 1 | 3.732592 |
| 7.7 | 1 | 3.720692 |
| 7.8 | 1 | 3.707042 |
| 7.9 | 1 | 3.69362 |
| 8 | 1 | 3.678595 |
| 8.1 | 1 | 3.663756 |
| 8.2 | 1 | 3.647761 |
| 8.3 | 1 | 3.631964 |
| 8.4 | 1 | 3.615282 |
| 8.5 | 1 | 3.598823 |
| 8.6 | 1 | 3.582573 |
| 8.7 | 1 | 3.565892 |
| 8.8 | 1 | 3.55006 |
| 8.9 | 1 | 3.5338 |
| 9 | 1 | 3.517746 |
| 9.1 | 1 | 3.502524 |
| 9.2 | 1 | 3.487487 |
| 9.3 | 1 | 3.472631 |
| 9.4 | 1 | 3.45797 |
| 9.5 | 1 | 3.443485 |
| 9.6 | 1 | 3.430061 |
| 9.7 | 1 | 3.41677 |
| 9.8 | 1 | 3.403622 |
| 9.9 | 1 | 3.391227 |
| 10 | 1 | 3.378963 |
| 10.1 | 1 | 3.367421 |
| 10.2 | 1 | 3.355998 |
| 10.3 | 1 | 3.345294 |
| 10.4 | 1 | 3.334305 |
| 10.5 | 1 | 3.324627 |
| 10.6 | 1 | 3.314486 |
| 10.7 | 1 | 3.304843 |
| 10.8 | 1 | 3.295784 |
| 10.9 | 1 | 3.287364 |
| 11 | 1 | 3.278865 |
| 11.1 | 1 | 3.270628 |
| 11.2 | 1 | 3.262403 |

-continued

| 16NUQAM | | |
|---|---|---|
| SNR | L1 | L2 |
| 11.3 | 1 | 3.254759 |
| 11.4 | 1 | 3.247699 |
| 11.5 | 1 | 3.240646 |
| 11.6 | 1 | 3.233605 |
| 11.7 | 1 | 3.227272 |
| 11.8 | 1 | 3.220939 |
| 11.9 | 1 | 3.214612 |
| 12 | 1 | 3.208285 |
| 12.1 | 1 | 3.202533 |
| 12.2 | 1 | 3.197353 |
| 12.3 | 1 | 3.191598 |
| 12.4 | 1 | 3.186426 |
| 12.5 | 1 | 3.181815 |
| 12.6 | 1 | 3.176644 |
| 12.7 | 1 | 3.172139 |
| 12.8 | 1 | 3.167631 |
| 12.9 | 1 | 3.163111 |
| 13 | 1 | 3.158592 |
| 13.1 | 1 | 3.154649 |
| 13.2 | 1 | 3.150688 |
| 13.3 | 1 | 3.146739 |
| 13.4 | 1 | 3.142772 |
| 13.5 | 1 | 3.138807 |
| 13.6 | 1 | 3.135416 |
| 13.7 | 1 | 3.132018 |
| 13.8 | 1 | 3.128616 |
| 13.9 | 1 | 3.125221 |
| 14 | 1 | 3.122455 |
| 14.1 | 1 | 3.119049 |
| 14.2 | 1 | 3.116279 |
| 14.3 | 1 | 3.113504 |
| 14.4 | 1 | 3.110719 |
| 14.5 | 1 | 3.107929 |
| 14.6 | 1 | 3.104898 |
| 14.7 | 1 | 3.102507 |
| 14.8 | 1 | 3.10012 |
| 14.9 | 1 | 3.097736 |
| 15 | 1 | 3.095345 |

| 64NUQAM | | | | |
|---|---|---|---|---|
| SNR | l1 | l2 | l3 | l4 |
| 4 | 1 | 1 | 2.839885 | 2.839885 |
| 5 | 1 | 1 | 3.333799 | 3.333799 |
| 6 | 1 | 1 | 3.673272 | 3.673272 |
| 7 | 1 | 1 | 3.772273 | 3.786417 |
| 8 | 1 | 1.191385 | 3.567779 | 4.620412 |
| 9 | 1 | 1.420475 | 3.669097 | 5.36928 |
| 10 | 1 | 1.712789 | 3.997906 | 6.241096 |
| 11 | 1 | 2.079134 | 4.429257 | 7.139089 |
| 12 | 1 | 2.511934 | 4.87267 | 7.976119 |
| 13 | 1 | 2.764698 | 5.145644 | 8.394934 |
| 14 | 1 | 3.017794 | 5.480702 | 8.804139 |
| 15 | 1 | 3.047482 | 5.480719 | 8.655799 |
| 16 | 1 | 3.106828 | 5.510392 | 8.537099 |
| 17 | 1 | 3.046101 | 5.351575 | 8.118142 |
| 18 | 1 | 3.016799 | 5.229677 | 7.806698 |
| 19 | 1 | 3.072838 | 5.257719 | 7.750716 |
| 20 | 1 | 3.072822 | 5.257695 | 7.666657 |
| 21 | 1 | 3.016336 | 5.114428 | 7.403244 |
| 22 | 1 | 3.016351 | 5.114446 | 7.348773 |
| 23 | 1 | 3.016337 | 5.087177 | 7.267007 |
| 24 | 1 | 3.016341 | 5.087182 | 7.239767 |

| 256 NUQAM | | | | | | | | |
|---|---|---|---|---|---|---|---|---|
| SNR | l1 | l2 | l3 | l4 | l5 | l6 | l7 | l8 |
| 7 | 1 | 1 | 1 | 1 | 3.759495 | 3.759495 | 3.759495 | 3.759495 |
| 8 | 1 | 0.865981 | 0.752579 | 0.865981 | 3 | 4.422682 | 3 | 2.69072 |
| 9 | 1 | 0.823528 | 0.686273 | 0.823528 | 2.823528 | 4.401956 | 2.823528 | 2.558823 |
| 10 | 1 | 1.12848 | 1.578161 | 1.385441 | 3.91221 | 3.869383 | 4.661674 | 6.803007 |
| 11 | 1 | 1.023423 | 1.843092 | 1.772836 | 3.997663 | 4.231856 | 5.730687 | 7.651065 |
| 12 | 1 | 0.974163 | 2.188638 | 2.188638 | 4.281664 | 4.669262 | 6.555574 | 8.622762 |
| 13 | 1 | 0.971184 | 2.556198 | 2.613837 | 4.659952 | 5.2075 | 7.39771 | 9.818462 |
| 14 | 1 | 0.969417 | 2.773689 | 2.865438 | 4.853198 | 5.495397 | 7.850127 | 10.54125 |
| 15 | 1 | 1 | 2.954397 | 3.117258 | 5.169379 | 5.885988 | 8.361555 | 11.26058 |
| 16 | 1 | 1 | 2.954403 | 3.182412 | 5.169383 | 5.98372 | 8.361572 | 11.22802 |
| 17 | 1 | 1.13937 | 3.125436 | 3.508715 | 5.49478 | 6.574918 | 8.944254 | 11.90593 |
| 18 | 1 | 1.299621 | 3.209728 | 3.883887 | 5.793994 | 7.292119 | 9.614208 | 12.61046 |
| 19 | 1 | 2.014496 | 3.995172 | 5.444447 | 7.521745 | 9.695663 | 12.4493 | 16.02418 |
| 20 | 1 | 2.63841 | 4.672306 | 6.593206 | 8.909592 | 11.45195 | 14.5593 | 18.45759 |
| 21 | 1 | 2.916187 | 4.952133 | 7.107824 | 9.503049 | 12.25757 | 15.43123 | 19.26359 |
| 22 | 1 | 2.916143 | 4.952058 | 7.10773 | 9.502917 | 12.13763 | 15.13162 | 18.66453 |
| 23 | 1 | 3.035904 | 5.071823 | 7.227493 | 9.562818 | 12.13764 | 14.952 | 18.24539 |
| 24 | 1 | 3.035928 | 5.131725 | 7.347292 | 9.682613 | 12.1377 | 14.83232 | 17.88619 |
| 25 | 1 | 3.095825 | 5.25153 | 7.407236 | 9.682704 | 12.1378 | 14.77255 | 17.7067 |
| 26 | 1 | 3.095796 | 5.251469 | 7.407143 | 9.682587 | 12.07779 | 14.59274 | 17.34722 |
| 27 | 1 | 3.095806 | 5.251487 | 7.467059 | 9.68263 | 12.01797 | 14.47305 | 17.10778 |

| 1024 NUQAM | | | | | | | | | |
|---|---|---|---|---|---|---|---|---|---|
| SNR | l1 | l2 | l3 | l4 | l5 | l6 | l7 | l8 | l9 |
| 11 | 1 | 1 | 1.027778 | 1.027778 | 1.833333 | 1.833333 | 1.777778 | 1.777778 | 3.972222 |
| 12 | 1 | 1 | 1 | 1 | 2.25 | 2.25 | 2.25 | 2.25 | 4.375 |
| 13 | 1 | 1 | 0.966667 | 0.966667 | 2.5 | 2.5 | 2.533333 | 2.533333 | 4.6 |
| 14 | 1 | 1 | 0.964286 | 0.964286 | 2.714286 | 2.714286 | 2.785714 | 2.785714 | 4.821429 |
| 15 | 1 | 1 | 1 | 1 | 2.923077 | 2.923077 | 3.038462 | 3.038462 | 5.115385 |
| 16 | 1 | 1 | 1 | 1 | 2.884615 | 2.923077 | 3.076923 | 3.076923 | 5.115385 |
| 17 | 1 | 1 | 1.04 | 1.04 | 3 | 3.04 | 3.32 | 3.28 | 5.32 |
| 18 | 1 | 1 | 1.217391 | 1.217391 | 3.130435 | 3.130435 | 3.695652 | 3.695652 | 5.608696 |
| 19 | 1 | 1 | 1.55 | 1.55 | 3.5 | 3.5 | 4.5 | 4.5 | 6.45 |
| 20 | 1 | 1 | 2.466667 | 2.466667 | 4.533333 | 4.533333 | 6.266667 | 6.266667 | 8.533333 |
| 21 | 1 | 1 | 2.785714 | 2.785714 | 4.857143 | 4.857143 | 6.857143 | 6.928571 | 9.142857 |
| 22 | 1 | 1 | 3.076923 | 3.076923 | 5.230769 | 5.230769 | 7.384615 | 7.461538 | 9.692308 |
| 23 | 1 | 1 | 3.076923 | 3.076923 | 5.153846 | 5.230769 | 7.307692 | 7.538462 | 9.538462 |
| 24 | 1 | 1 | 3 | 3.076923 | 5 | 5.230769 | 7.076923 | 7.692308 | 9.384615 |
| 25 | 1 | 1.166667 | 3.083333 | 3.333333 | 5.166667 | 5.75 | 7.416667 | 8.5 | 10.08333 |
| 26 | 1 | 2.375 | 4.25 | 5.75 | 7.75 | 9.375 | 11.375 | 13.375 | 15.5 |
| 27 | 1 | 2.857143 | 4.857143 | 6.857143 | 8.857143 | 10.85714 | 13 | 15.28571 | 17.71429 |
| 28 | 1 | 2.857143 | 4.857143 | 6.857143 | 8.857143 | 11 | 13.28571 | 15.71429 | 18.14286 |
| 29 | 1 | 2.857143 | 4.857143 | 6.857143 | 8.857143 | 11 | 13.28571 | 15.71429 | 18.14286 |
| 30 | 1 | 2.857143 | 4.857143 | 6.857143 | 8.857143 | 11 | 13.28571 | 15.71429 | 18.14286 |
| 31 | 1 | 3 | 4.857143 | 6.857143 | 8.857143 | 11 | 13.28571 | 15.71429 | 18.14286 |

| SNR | l10 | l11 | l12 | l13 | l14 | l15 | l16 |
|---|---|---|---|---|---|---|---|
| 11 | 4.111111 | 4.277778 | 4.138889 | 5.916667 | 5.805556 | 6.5 | 8.638889 |
| 12 | 4.5 | 4.75 | 4.59375 | 6.875 | 6.78125 | 7.4375 | 9.8125 |
| 13 | 4.633333 | 5.033333 | 4.966667 | 7.1 | 7.333333 | 8.466667 | 10.7 |
| 14 | 4.821429 | 5.357143 | 5.357143 | 7.464286 | 7.857143 | 9.464286 | 11.71429 |
| 15 | 5.076923 | 5.692308 | 5.769231 | 7.923077 | 8.423077 | 10.34615 | 12.80769 |
| 16 | 5.038462 | 5.692308 | 5.846154 | 7.884615 | 8.423077 | 10.5 | 13.03846 |
| 17 | 5.24 | 6.04 | 6.28 | 8.24 | 8.84 | 11.04 | 13.68 |
| 18 | 5.608696 | 6.826087 | 7.086957 | 8.956522 | 9.695652 | 11.95652 | 14.69565 |
| 19 | 6.45 | 8.1 | 8.4 | 10.35 | 11.35 | 13.75 | 16.75 |
| 20 | 8.6 | 10.8 | 11.33333 | 13.73333 | 15.26667 | 18.2 | 21.93333 |
| 21 | 9.357143 | 11.57143 | 12.35714 | 14.64286 | 16.64286 | 19.5 | 23.21429 |
| 22 | 10.07692 | 12.23077 | 13.38462 | 15.69231 | 18.07692 | 21 | 24.69231 |
| 23 | 10.23077 | 12.15385 | 13.69231 | 15.76923 | 18.15385 | 20.92308 | 24.38462 |
| 24 | 10.53846 | 12.23077 | 13.92308 | 15.92308 | 18.23077 | 20.92308 | 24.15385 |
| 25 | 11.58333 | 13.33333 | 15.25 | 17.33333 | 19.75 | 22.41667 | 25.58333 |
| 26 | 17.75 | 20.25 | 23 | 26.125 | 29.5 | 33.25 | 37.625 |
| 27 | 20.42857 | 23.28571 | 26.42857 | 29.71429 | 33.42857 | 37.42857 | 42 |
| 28 | 20.71429 | 23.42857 | 26.42857 | 29.71429 | 33.14286 | 36.85714 | 41.14286 |
| 29 | 20.71429 | 23.42857 | 26.42857 | 29.57143 | 32.85714 | 36.28571 | 40.14286 |
| 30 | 20.71429 | 23.42857 | 26.14286 | 29 | 32 | 35.14286 | 38.71429 |
| 31 | 20.71429 | 23.42857 | 26.14286 | 28.85714 | 31.71429 | 34.71429 | 38 |

Annex to the Description—Annex 2b

| 16 NUC | | | | |
|---|---|---|---|---|
| | Normalized values | | | |
| SNR | a1 | a2 | a3 | a4 |
| 4 | 0.531 + 1.193i | 0.284 + 0.462i | 1.193 + 0.530i | 0.462 + 0.284i |
| 4.1 | 0.529 + 1.195i | 0.282 + 0.460i | 1.195 + 0.529i | 0.460 + 0.282i |
| 4.2 | 0.528 + 1.197i | 0.280 + 0.458i | 1.197 + 0.527i | 0.458 + 0.280i |
| 4.3 | 0.526 + 1.199i | 0.278 + 0.457i | 1.199 + 0.526i | 0.457 + 0.278i |
| 4.4 | 0.525 + 1.201i | 0.276 + 0.455i | 1.201 + 0.524i | 0.455 + 0.276i |
| 4.5 | 0.523 + 1.202i | 0.275 + 0.454i | 1.202 + 0.523i | 0.454 + 0.275i |
| 4.6 | 0.522 + 1.203i | 0.274 + 0.453i | 1.203 + 0.522i | 0.454 + 0.274i |
| 4.7 | 0.521 + 1.204i | 0.272 + 0.453i | 1.204 + 0.520i | 0.453 + 0.272i |
| 4.8 | 0.519 + 1.205i | 0.271 + 0.452i | 1.205 + 0.519i | 0.452 + 0.271i |
| 4.9 | 0.518 + 1.206i | 0.270 + 0.452i | 1.206 + 0.518i | 0.452 + 0.270i |
| 5 | 0.517 + 1.207i | 0.269 + 0.451i | 1.207 + 0.516i | 0.451 + 0.269i |
| 5.1 | 0.516 + 1.208i | 0.269 + 0.451i | 1.208 + 0.515i | 0.451 + 0.269i |
| 5.2 | 0.514 + 1.208i | 0.268 + 0.451i | 1.208 + 0.514i | 0.452 + 0.268i |
| 5.3 | 0.513 + 1.209i | 0.267 + 0.452i | 1.209 + 0.513i | 0.452 + 0.267i |
| 5.4 | 0.512 + 1.209i | 0.267 + 0.452i | 1.209 + 0.512i | 0.452 + 0.267i |
| 5.5 | 0.511 + 1.210i | 0.266 + 0.452i | 1.210 + 0.511i | 0.452 + 0.266i |
| 5.6 | 0.510 + 1.210i | 0.266 + 0.453i | 1.210 + 0.510i | 0.453 + 0.266i |
| 5.7 | 0.509 + 1.210i | 0.265 + 0.454i | 1.210 + 0.509i | 0.454 + 0.265i |
| 5.8 | 0.509 + 1.210i | 0.265 + 0.455i | 1.210 + 0.508i | 0.455 + 0.265i |
| 5.9 | 0.508 + 1.210i | 0.265 + 0.456i | 1.210 + 0.507i | 0.455 + 0.265i |
| 6 | 0.507 + 1.211i | 0.264 + 0.457i | 1.211 + 0.506i | 0.457 + 0.264i |
| 6.1 | 0.506 + 1.211i | 0.264 + 0.458i | 1.211 + 0.505i | 0.458 + 0.264i |
| 6.2 | 0.505 + 1.211i | 0.263 + 0.459i | 1.211 + 0.505i | 0.459 + 0.263i |
| 6.3 | 0.504 + 1.210i | 0.263 + 0.460i | 1.210 + 0.504i | 0.460 + 0.264i |
| 6.4 | 0.503 + 1.210i | 0.263 + 0.461i | 1.211 + 0.502i | 0.461 + 0.263i |
| 6.5 | 0.503 + 1.210i | 0.262 + 0.463i | 1.210 + 0.501i | 0.463 + 0.262i |
| 6.6 | 0.502 + 1.210i | 0.263 + 0.465i | 1.210 + 0.501i | 0.464 + 0.263i |
| 6.7 | 0.501 + 1.210i | 0.262 + 0.466i | 1.210 + 0.500i | 0.466 + 0.262i |
| 6.8 | 0.500 + 1.210i | 0.262 + 0.468i | 1.210 + 0.499i | 0.467 + 0.262i |
| 6.9 | 0.499 + 1.209i | 0.261 + 0.469i | 1.209 + 0.498i | 0.469 + 0.261i |
| 7 | 0.498 + 1.209i | 0.261 + 0.472i | 1.209 + 0.498i | 0.471 + 0.261i |
| 7.1 | 0.498 + 1.209i | 0.261 + 0.474i | 1.209 + 0.497i | 0.473 + 0.261i |
| 7.2 | 0.497 + 1.208i | 0.259 + 0.475i | 1.208 + 0.497i | 0.475 + 0.259i |
| 7.3 | 0.496 + 1.208i | 0.259 + 0.478i | 1.208 + 0.496i | 0.477 + 0.259i |
| 7.4 | 0.496 + 1.207i | 0.259 + 0.480i | 1.207 + 0.495i | 0.479 + 0.259i |
| 7.5 | 0.495 + 1.207i | 0.258 + 0.481i | 1.207 + 0.495i | 0.482 + 0.258i |
| 7.6 | 0.495 + 1.206i | 0.257 + 0.484i | 1.206 + 0.494i | 0.483 + 0.257i |
| 7.7 | 0.494 + 1.206i | 0.256 + 0.486i | 1.206 + 0.494i | 0.486 + 0.256i |
| 7.8 | 0.494 + 1.205i | 0.255 + 0.489i | 1.205 + 0.493i | 0.488 + 0.255i |
| 7.9 | 0.493 + 1.205i | 0.254 + 0.492i | 1.205 + 0.493i | 0.490 + 0.254i |
| 8 | 0.493 + 1.204i | 0.253 + 0.494i | 1.204 + 0.492i | 0.493 + 0.253i |
| 8.1 | 0.492 + 1.203i | 0.252 + 0.497i | 1.203 + 0.492i | 0.495 + 0.252i |
| 8.2 | 0.492 + 1.203i | 0.251 + 0.499i | 1.203 + 0.491i | 0.497 + 0.251i |
| 8.3 | 0.492 + 1.202i | 0.250 + 0.502i | 1.202 + 0.491i | 0.500 + 0.250i |
| 8.4 | 0.492 + 1.202i | 0.249 + 0.505i | 1.201 + 0.490i | 0.501 + 0.249i |
| 8.5 | 0.491 + 1.201i | 0.248 + 0.506i | 1.201 + 0.491i | 0.505 + 0.248i |
| 8.6 | 0.491 + 1.200i | 0.247 + 0.509i | 1.200 + 0.490i | 0.508 + 0.247i |
| 8.7 | 0.491 + 1.200i | 0.246 + 0.512i | 1.199 + 0.490i | 0.509 + 0.245i |
| 8.8 | 0.490 + 1.199i | 0.244 + 0.514i | 1.198 + 0.490i | 0.513 + 0.244i |
| 8.9 | 0.492 + 1.198i | 0.244 + 0.519i | 1.197 + 0.489i | 0.513 + 0.242i |
| 9 | 0.493 + 1.198i | 0.243 + 0.524i | 1.196 + 0.487i | 0.512 + 0.241i |
| 9.1 | 0.494 + 1.198i | 0.243 + 0.530i | 1.194 + 0.486i | 0.511 + 0.239i |
| 9.2 | 0.519 + 1.206i | 0.252 + 0.583i | 1.180 + 0.463i | 0.464 + 0.228i |
| 9.3 | 0.526 + 1.207i | 0.253 + 0.597i | 1.174 + 0.457i | 0.455 + 0.226i |
| 9.4 | 0.531 + 1.207i | 0.254 + 0.608i | 1.170 + 0.453i | 0.449 + 0.223i |

-continued

| 16 NUC | | | | |
|---|---|---|---|---|
| | Normalized values | | | |
| SNR | a1 | a2 | a3 | a4 |
| 9.5 | 0.537 + 1.208i | 0.254 + 0.618i | 1.166 + 0.450i | 0.442 + 0.222i |
| 9.6 | 0.542 + 1.209i | 0.255 + 0.626i | 1.162 + 0.446i | 0.437 + 0.220i |
| 9.7 | 0.547 + 1.209i | 0.256 + 0.635i | 1.157 + 0.443i | 0.432 + 0.219i |
| 9.8 | 0.553 + 1.209i | 0.256 + 0.643i | 1.153 + 0.439i | 0.428 + 0.218i |
| 9.9 | 0.558 + 1.210i | 0.257 + 0.650i | 1.149 + 0.437i | 0.424 + 0.218i |
| 10 | 0.565 + 1.209i | 0.257 + 0.657i | 1.144 + 0.433i | 0.419 + 0.218i |
| 10.1 | 0.573 + 1.209i | 0.257 + 0.665i | 1.139 + 0.430i | 0.415 + 0.217i |
| 10.2 | 0.585 + 1.206i | 0.258 + 0.674i | 1.134 + 0.425i | 0.410 + 0.218i |
| 10.3 | 0.604 + 1.201i | 0.257 + 0.686i | 1.127 + 0.419i | 0.402 + 0.218i |
| 10.4 | 0.948 + 0.968i | 0.283 + 0.948i | 0.968 + 0.291i | 0.291 + 0.283i |
| 10.5 | 0.949 + 0.966i | 0.285 + 0.949i | 0.965 + 0.291i | 0.291 + 0.285i |
| 10.6 | 0.952 + 0.963i | 0.287 + 0.952i | 0.963 + 0.291i | 0.291 + 0.287i |
| 10.7 | 0.952 + 0.963i | 0.287 + 0.952i | 0.962 + 0.292i | 0.292 + 0.287i |
| 10.8 | 0.953 + 0.962i | 0.288 + 0.953i | 0.961 + 0.292i | 0.292 + 0.288i |
| 10.9 | 0.954 + 0.959i | 0.290 + 0.954i | 0.959 + 0.292i | 0.292 + 0.290i |
| 11 | 0.955 + 0.958i | 0.291 + 0.955i | 0.958 + 0.292i | 0.293 + 0.291i |
| 11.1 | 0.955 + 0.958i | 0.292 + 0.955i | 0.958 + 0.293i | 0.293 + 0.292i |
| 11.2 | 0.955 + 0.957i | 0.293 + 0.955i | 0.957 + 0.293i | 0.293 + 0.293i |
| 11.3 | 0.955 + 0.957i | 0.294 + 0.955i | 0.956 + 0.294i | 0.294 + 0.294i |
| 11.4 | 0.955 + 0.957i | 0.294 + 0.955i | 0.956 + 0.294i | 0.294 + 0.294i |
| 11.5 | 0.955 + 0.957i | 0.295 + 0.955i | 0.956 + 0.295i | 0.295 + 0.295i |
| 11.6 | 0.955 + 0.956i | 0.296 + 0.955i | 0.955 + 0.296i | 0.296 + 0.296i |
| 11.7 | 0.954 + 0.956i | 0.296 + 0.954i | 0.956 + 0.296i | 0.296 + 0.296i |
| 11.8 | 0.955 + 0.955i | 0.297 + 0.955i | 0.955 + 0.297i | 0.297 + 0.297i |
| 11.9 | 0.955 + 0.956i | 0.297 + 0.955i | 0.955 + 0.297i | 0.297 + 0.297i |
| 12 | 0.954 + 0.955i | 0.297 + 0.955i | 0.955 + 0.298i | 0.298 + 0.298i |
| 12.1 | 0.954 + 0.955i | 0.298 + 0.954i | 0.954 + 0.299i | 0.298 + 0.298i |
| 12.2 | 0.954 + 0.955i | 0.298 + 0.954i | 0.955 + 0.299i | 0.299 + 0.298i |
| 12.3 | 0.954 + 0.955i | 0.299 + 0.954i | 0.954 + 0.299i | 0.299 + 0.299i |
| 12.4 | 0.954 + 0.955i | 0.299 + 0.954i | 0.954 + 0.300i | 0.299 + 0.299i |
| 12.5 | 0.954 + 0.954i | 0.300 + 0.954i | 0.954 + 0.300i | 0.300 + 0.300i |
| 12.6 | 0.954 + 0.955i | 0.300 + 0.954i | 0.954 + 0.301i | 0.300 + 0.300i |
| 12.7 | 0.954 + 0.954i | 0.301 + 0.954i | 0.954 + 0.301i | 0.301 + 0.301i |
| 12.8 | 0.953 + 0.954i | 0.301 + 0.954i | 0.954 + 0.302i | 0.301 + 0.301i |
| 12.9 | 0.953 + 0.954i | 0.301 + 0.953i | 0.953 + 0.302i | 0.301 + 0.301i |
| 13 | 0.953 + 0.954i | 0.302 + 0.953i | 0.953 + 0.302i | 0.302 + 0.302i |
| 13.1 | 0.953 + 0.954i | 0.302 + 0.953i | 0.953 + 0.303i | 0.302 + 0.302i |
| 13.2 | 0.953 + 0.954i | 0.303 + 0.953i | 0.953 + 0.303i | 0.303 + 0.303i |
| 13.3 | 0.953 + 0.953i | 0.303 + 0.953i | 0.953 + 0.304i | 0.303 + 0.303i |
| 13.4 | 0.953 + 0.953i | 0.303 + 0.953i | 0.953 + 0.304i | 0.303 + 0.303i |
| 13.5 | 0.952 + 0.953i | 0.304 + 0.953i | 0.953 + 0.304i | 0.304 + 0.304i |
| 13.6 | 0.952 + 0.953i | 0.304 + 0.953i | 0.953 + 0.304i | 0.304 + 0.304i |
| 13.7 | 0.952 + 0.953i | 0.304 + 0.953i | 0.952 + 0.305i | 0.304 + 0.304i |
| 13.8 | 0.952 + 0.953i | 0.304 + 0.953i | 0.953 + 0.305i | 0.304 + 0.304i |
| 13.9 | 0.952 + 0.953i | 0.305 + 0.953i | 0.953 + 0.305i | 0.305 + 0.305i |
| 14 | 0.952 + 0.952i | 0.305 + 0.952i | 0.953 + 0.305i | 0.305 + 0.305i |
| 14.1 | 0.952 + 0.952i | 0.305 + 0.952i | 0.953 + 0.306i | 0.306 + 0.305i |
| 14.2 | 0.952 + 0.952i | 0.305 + 0.952i | 0.953 + 0.306i | 0.306 + 0.305i |
| 14.3 | 0.951 + 0.952i | 0.306 + 0.952i | 0.953 + 0.306i | 0.306 + 0.306i |
| 14.4 | 0.951 + 0.952i | 0.306 + 0.952i | 0.953 + 0.306i | 0.306 + 0.306i |
| 14.5 | 0.951 + 0.952i | 0.306 + 0.952i | 0.952 + 0.307i | 0.307 + 0.306i |
| 14.6 | 0.951 + 0.952i | 0.306 + 0.952i | 0.952 + 0.307i | 0.307 + 0.306i |
| 14.7 | 0.951 + 0.952i | 0.307 + 0.952i | 0.953 + 0.307i | 0.307 + 0.307i |
| 14.8 | 0.951 + 0.952i | 0.307 + 0.952i | 0.952 + 0.307i | 0.307 + 0.307i |
| 14.9 | 0.951 + 0.951i | 0.307 + 0.952i | 0.952 + 0.307i | 0.307 + 0.307i |
| 15 | 0.951 + 0.951i | 0.308 + 0.952i | 0.952 + 0.308i | 0.308 + 0.307i |

| 64 NUC | | | | | | | | |
|---|---|---|---|---|---|---|---|---|
| | Normalized values | | | | | | | |
| SNR | a1 | a2 | a3 | a4 | a5 | a6 | a7 | a8 |
| 7 | 0.467 + 0.274i | 0.274 + 0.465i | 0.456 + 0.247i | 0.248 + 0.452i | 1.125 + 0.640i | 0.633 + 1.125i | 1.265 + 0.359i | 0.361 + 1.265i |
| 7.1 | 0.473 + 0.277i | 0.277 + 0.471i | 0.464 + 0.247i | 0.250 + 0.458i | 1.106 + 0.638i | 0.625 + 1.105i | 1.245 + 0.347i | 0.348 + 1.242i |
| 7.2 | 0.482 + 0.281i | 0.281 + 0.479i | 0.477 + 0.248i | 0.251 + 0.467i | 1.077 + 0.629i | 0.609 + 1.077i | 1.213 + 0.333i | 0.334 + 1.208i |
| 7.3 | 0.489 + 0.283i | 0.283 + 0.485i | 0.487 + 0.248i | 0.252 + 0.473i | 1.057 + 0.624i | 0.597 + 1.057i | 1.193 + 0.322i | 0.323 + 1.184i |
| 7.4 | 0.495 + 0.286i | 0.285 + 0.489i | 0.498 + 0.247i | 0.252 + 0.479i | 1.041 + 0.621i | 0.586 + 1.040i | 1.175 + 0.315i | 0.315 + 1.164i |
| 7.5 | 0.500 + 0.287i | 0.286 + 0.493i | 0.507 + 0.247i | 0.253 + 0.485i | 1.027 + 0.617i | 0.579 + 1.027i | 1.161 + 0.308i | 0.308 + 1.148i |
| 7.6 | 0.505 + 0.289i | 0.287 + 0.497i | 0.513 + 0.247i | 0.252 + 0.492i | 1.016 + 0.612i | 0.576 + 1.016i | 1.148 + 0.304i | 0.301 + 1.134i |

-continued

| 64 NUC | | | | | | | | |
|---|---|---|---|---|---|---|---|---|
| 7.7 | 0.508 + 0.290i | 0.289 + 0.502i | 0.517 + 0.247i | 0.251 + 0.501i | 1.006 + 0.602i | 0.577 + 1.006i | 1.135 + 0.299i | 0.296 + 1.124i |
| 7.8 | 0.512 + 0.291i | 0.291 + 0.507i | 0.521 + 0.247i | 0.250 + 0.510i | 0.997 + 0.596i | 0.577 + 0.997i | 1.124 + 0.294i | 0.292 + 1.115i |
| 7.9 | 0.515 + 0.292i | 0.292 + 0.512i | 0.525 + 0.248i | 0.249 + 0.519i | 0.988 + 0.588i | 0.579 + 0.988i | 1.113 + 0.291i | 0.289 + 1.107i |
| 8 | 0.519 + 0.294i | 0.293 + 0.517i | 0.530 + 0.247i | 0.248 + 0.526i | 0.981 + 0.584i | 0.577 + 0.981i | 1.104 + 0.288i | 0.286 + 1.099i |
| 8.1 | 0.523 + 0.295i | 0.295 + 0.522i | 0.535 + 0.247i | 0.247 + 0.533i | 0.974 + 0.580i | 0.575 + 0.974i | 1.095 + 0.284i | 0.284 + 1.092i |
| 8.2 | 0.527 + 0.296i | 0.296 + 0.526i | 0.541 + 0.246i | 0.246 + 0.540i | 0.967 + 0.576i | 0.573 + 0.967i | 1.087 + 0.282i | 0.282 + 1.084i |
| 8.3 | 0.532 + 0.297i | 0.297 + 0.531i | 0.547 + 0.245i | 0.245 + 0.546i | 0.961 + 0.573i | 0.570 + 0.961i | 1.081 + 0.279i | 0.279 + 1.078i |
| 8.4 | 0.536 + 0.299i | 0.299 + 0.535i | 0.553 + 0.244i | 0.244 + 0.553i | 0.955 + 0.570i | 0.568 + 0.955i | 1.074 + 0.277i | 0.277 + 1.072i |
| 8.5 | 0.541 + 0.300i | 0.300 + 0.541i | 0.559 + 0.243i | 0.244 + 0.559i | 0.950 + 0.566i | 0.565 + 0.950i | 1.068 + 0.275i | 0.275 + 1.067i |
| 8.6 | 0.545 + 0.302i | 0.302 + 0.545i | 0.566 + 0.242i | 0.242 + 0.566i | 0.945 + 0.564i | 0.563 + 0.945i | 1.062 + 0.273i | 0.273 + 1.062i |
| 8.7 | 0.550 + 0.303i | 0.303 + 0.550i | 0.572 + 0.241i | 0.241 + 0.572i | 0.940 + 0.561i | 0.561 + 0.940i | 1.058 + 0.271i | 0.271 + 1.057i |
| 8.8 | 0.554 + 0.305i | 0.305 + 0.554i | 0.578 + 0.239i | 0.240 + 0.578i | 0.936 + 0.559i | 0.559 + 0.936i | 1.053 + 0.268i | 0.269 + 1.052i |
| 8.9 | 0.559 + 0.306i | 0.306 + 0.559i | 0.584 + 0.238i | 0.238 + 0.584i | 0.932 + 0.556i | 0.557 + 0.932i | 1.048 + 0.267i | 0.267 + 1.048i |
| 9 | 0.563 + 0.307i | 0.307 + 0.563i | 0.590 + 0.236i | 0.237 + 0.590i | 0.929 + 0.554i | 0.554 + 0.929i | 1.045 + 0.265i | 0.265 + 1.045i |
| 9.1 | 0.567 + 0.309i | 0.309 + 0.566i | 0.596 + 0.235i | 0.235 + 0.596i | 0.925 + 0.553i | 0.553 + 0.925i | 1.041 + 0.263i | 0.264 + 1.041i |
| 9.2 | 0.571 + 0.310i | 0.311 + 0.571i | 0.601 + 0.234i | 0.234 + 0.601i | 0.922 + 0.552i | 0.552 + 0.922i | 1.039 + 0.261i | 0.262 + 1.038i |
| 9.3 | 0.574 + 0.313i | 0.312 + 0.574i | 0.607 + 0.232i | 0.232 + 0.607i | 0.919 + 0.550i | 0.550 + 0.919i | 1.035 + 0.259i | 0.260 + 1.035i |
| 9.4 | 0.578 + 0.314i | 0.314 + 0.578i | 0.612 + 0.230i | 0.230 + 0.612i | 0.916 + 0.550i | 0.550 + 0.916i | 1.033 + 0.257i | 0.258 + 1.033i |
| 9.5 | 0.581 + 0.316i | 0.316 + 0.581i | 0.617 + 0.229i | 0.229 + 0.617i | 0.913 + 0.549i | 0.549 + 0.913i | 1.030 + 0.255i | 0.256 + 1.030i |
| 9.6 | 0.584 + 0.317i | 0.317 + 0.584i | 0.622 + 0.226i | 0.227 + 0.622i | 0.911 + 0.548i | 0.549 + 0.911i | 1.028 + 0.253i | 0.254 + 1.028i |
| 9.7 | 0.587 + 0.319i | 0.319 + 0.587i | 0.627 + 0.225i | 0.225 + 0.627i | 0.908 + 0.549i | 0.549 + 0.908i | 1.026 + 0.251i | 0.252 + 1.026i |
| 9.8 | 0.589 + 0.321i | 0.321 + 0.589i | 0.631 + 0.222i | 0.223 + 0.631i | 0.906 + 0.549i | 0.549 + 0.906i | 1.025 + 0.249i | 0.251 + 1.025i |
| 9.9 | 0.592 + 0.323i | 0.322 + 0.592i | 0.636 + 0.221i | 0.221 + 0.635i | 0.904 + 0.550i | 0.549 + 0.904i | 1.024 + 0.247i | 0.248 + 1.024i |
| 10 | 0.594 + 0.325i | 0.324 + 0.594i | 0.640 + 0.219i | 0.219 + 0.639i | 0.902 + 0.550i | 0.549 + 0.902i | 1.023 + 0.245i | 0.246 + 1.023i |
| 10.1 | 0.596 + 0.327i | 0.326 + 0.596i | 0.644 + 0.216i | 0.217 + 0.643i | 0.900 + 0.551i | 0.551 + 0.900i | 1.022 + 0.243i | 0.245 + 1.022i |
| 10.2 | 0.598 + 0.329i | 0.328 + 0.598i | 0.647 + 0.215i | 0.215 + 0.647i | 0.898 + 0.552i | 0.552 + 0.898i | 1.021 + 0.241i | 0.242 + 1.021i |
| 10.3 | 0.600 + 0.331i | 0.330 + 0.600i | 0.651 + 0.213i | 0.213 + 0.651i | 0.896 + 0.553i | 0.552 + 0.896i | 1.020 + 0.240i | 0.240 + 1.020i |
| 10.4 | 0.601 + 0.333i | 0.332 + 0.601i | 0.655 + 0.211i | 0.211 + 0.654i | 0.894 + 0.554i | 0.554 + 0.894i | 1.019 + 0.237i | 0.238 + 1.020i |
| 10.5 | 0.603 + 0.335i | 0.334 + 0.603i | 0.658 + 0.208i | 0.208 + 0.658i | 0.892 + 0.556i | 0.555 + 0.893i | 1.019 + 0.235i | 0.236 + 1.020i |
| 10.6 | 0.604 + 0.337i | 0.337 + 0.604i | 0.661 + 0.206i | 0.206 + 0.661i | 0.891 + 0.557i | 0.556 + 0.891i | 1.019 + 0.233i | 0.234 + 1.019i |
| 10.7 | 0.605 + 0.339i | 0.339 + 0.605i | 0.664 + 0.204i | 0.204 + 0.664i | 0.890 + 0.558i | 0.558 + 0.890i | 1.018 + 0.232i | 0.232 + 1.019i |
| 10.8 | 0.606 + 0.341i | 0.341 + 0.606i | 0.667 + 0.202i | 0.202 + 0.668i | 0.888 + 0.559i | 0.560 + 0.888i | 1.018 + 0.229i | 0.231 + 1.019i |
| 10.9 | 0.608 + 0.344i | 0.343 + 0.608i | 0.670 + 0.200i | 0.200 + 0.670i | 0.886 + 0.561i | 0.561 + 0.887i | 1.018 + 0.227i | 0.229 + 1.019i |
| 11 | 0.608 + 0.346i | 0.345 + 0.608i | 0.673 + 0.198i | 0.198 + 0.673i | 0.885 + 0.563i | 0.563 + 0.886i | 1.019 + 0.226i | 0.226 + 1.019i |
| 11.1 | 0.610 + 0.348i | 0.347 + 0.610i | 0.676 + 0.196i | 0.196 + 0.676i | 0.884 + 0.564i | 0.564 + 0.884i | 1.018 + 0.224i | 0.224 + 1.020i |
| 11.2 | 0.610 + 0.350i | 0.349 + 0.610i | 0.678 + 0.193i | 0.193 + 0.678i | 0.882 + 0.566i | 0.566 + 0.883i | 1.019 + 0.222i | 0.223 + 1.020i |
| 11.3 | 0.611 + 0.352i | 0.352 + 0.611i | 0.681 + 0.191i | 0.191 + 0.681i | 0.882 + 0.567i | 0.567 + 0.882i | 1.020 + 0.220i | 0.221 + 1.020i |
| 11.4 | 0.612 + 0.354i | 0.354 + 0.612i | 0.683 + 0.190i | 0.190 + 0.683i | 0.881 + 0.569i | 0.569 + 0.881i | 1.020 + 0.219i | 0.220 + 1.021i |
| 11.5 | 0.613 + 0.356i | 0.356 + 0.613i | 0.685 + 0.188i | 0.188 + 0.685i | 0.880 + 0.570i | 0.570 + 0.880i | 1.020 + 0.217i | 0.219 + 1.021i |
| 11.6 | 0.613 + 0.358i | 0.358 + 0.613i | 0.687 + 0.186i | 0.186 + 0.687i | 0.879 + 0.571i | 0.571 + 0.879i | 1.021 + 0.216i | 0.216 + 1.022i |
| 11.7 | 0.614 + 0.360i | 0.360 + 0.614i | 0.689 + 0.184i | 0.184 + 0.689i | 0.878 + 0.573i | 0.573 + 0.879i | 1.021 + 0.214i | 0.215 + 1.022i |
| 11.8 | 0.614 + 0.362i | 0.362 + 0.614i | 0.691 + 0.183i | 0.183 + 0.690i | 0.878 + 0.574i | 0.574 + 0.878i | 1.022 + 0.213i | 0.214 + 1.022i |
| 11.9 | 0.615 + 0.364i | 0.364 + 0.615i | 0.693 + 0.181i | 0.181 + 0.692i | 0.878 + 0.576i | 0.575 + 0.878i | 1.023 + 0.212i | 0.213 + 1.023i |
| 12 | 0.616 + 0.366i | 0.365 + 0.616i | 0.694 + 0.180i | 0.179 + 0.694i | 0.877 + 0.577i | 0.576 + 0.877i | 1.023 + 0.211i | 0.212 + 1.024i |
| 12.1 | 0.616 + 0.368i | 0.367 + 0.616i | 0.695 + 0.178i | 0.178 + 0.695i | 0.876 + 0.577i | 0.577 + 0.877i | 1.024 + 0.210i | 0.211 + 1.025i |
| 12.2 | 0.617 + 0.370i | 0.369 + 0.617i | 0.697 + 0.177i | 0.176 + 0.697i | 0.876 + 0.579i | 0.578 + 0.877i | 1.025 + 0.209i | 0.210 + 1.026i |
| 12.3 | 0.617 + 0.371i | 0.371 + 0.617i | 0.698 + 0.175i | 0.175 + 0.698i | 0.876 + 0.580i | 0.579 + 0.876i | 1.026 + 0.208i | 0.209 + 1.026i |
| 12.4 | 0.618 + 0.372i | 0.373 + 0.617i | 0.700 + 0.174i | 0.174 + 0.699i | 0.876 + 0.580i | 0.580 + 0.876i | 1.027 + 0.207i | 0.208 + 1.027i |
| 12.5 | 0.618 + 0.373i | 0.375 + 0.617i | 0.701 + 0.172i | 0.172 + 0.700i | 0.877 + 0.581i | 0.582 + 0.876i | 1.028 + 0.207i | 0.207 + 1.027i |
| 12.6 | 0.618 + 0.375i | 0.377 + 0.618i | 0.701 + 0.171i | 0.171 + 0.701i | 0.876 + 0.581i | 0.582 + 0.876i | 1.029 + 0.206i | 0.207 + 1.028i |
| 12.7 | 0.618 + 0.376i | 0.378 + 0.618i | 0.703 + 0.170i | 0.170 + 0.703i | 0.877 + 0.583i | 0.583 + 0.876i | 1.030 + 0.206i | 0.207 + 1.030i |
| 12.8 | 0.618 + 0.377i | 0.380 + 0.618i | 0.703 + 0.169i | 0.169 + 0.704i | 0.877 + 0.583i | 0.584 + 0.876i | 1.030 + 0.205i | 0.206 + 1.030i |
| 12.9 | 0.618 + 0.379i | 0.382 + 0.618i | 0.704 + 0.167i | 0.168 + 0.705i | 0.877 + 0.584i | 0.585 + 0.877i | 1.031 + 0.204i | 0.206 + 1.031i |
| 13 | 0.615 + 0.355i | 0.403 + 0.618i | 0.684 + 0.158i | 0.176 + 0.726i | 0.886 + 0.564i | 0.606 + 0.865i | 1.028 + 0.198i | 0.214 + 1.038i |
| 13.1 | 0.614 + 0.352i | 0.407 + 0.617i | 0.682 + 0.155i | 0.176 + 0.730i | 0.888 + 0.562i | 0.609 + 0.863i | 1.028 + 0.197i | 0.215 + 1.040i |
| 13.2 | 0.613 + 0.351i | 0.410 + 0.617i | 0.681 + 0.154i | 0.176 + 0.734i | 0.889 + 0.561i | 0.612 + 0.863i | 1.029 + 0.196i | 0.216 + 1.041i |
| 13.3 | 0.613 + 0.350i | 0.412 + 0.617i | 0.680 + 0.152i | 0.175 + 0.737i | 0.889 + 0.560i | 0.614 + 0.862i | 1.029 + 0.195i | 0.217 + 1.042i |
| 13.4 | 0.612 + 0.349i | 0.415 + 0.616i | 0.677 + 0.150i | 0.175 + 0.741i | 0.890 + 0.558i | 0.616 + 0.861i | 1.030 + 0.194i | 0.218 + 1.044i |
| 13.5 | 0.611 + 0.348i | 0.418 + 0.615i | 0.676 + 0.149i | 0.175 + 0.744i | 0.892 + 0.558i | 0.618 + 0.860i | 1.030 + 0.194i | 0.219 + 1.045i |
| 13.6 | 0.611 + 0.348i | 0.420 + 0.615i | 0.676 + 0.147i | 0.175 + 0.747i | 0.892 + 0.557i | 0.620 + 0.860i | 1.030 + 0.193i | 0.220 + 1.047i |
| 13.7 | 0.610 + 0.347i | 0.422 + 0.614i | 0.674 + 0.146i | 0.174 + 0.750i | 0.893 + 0.556i | 0.622 + 0.860i | 1.031 + 0.192i | 0.221 + 1.048i |
| 13.8 | 0.609 + 0.348i | 0.423 + 0.614i | 0.674 + 0.145i | 0.173 + 0.753i | 0.894 + 0.556i | 0.623 + 0.860i | 1.031 + 0.192i | 0.222 + 1.050i |
| 13.9 | 0.609 + 0.347i | 0.426 + 0.613i | 0.674 + 0.143i | 0.173 + 0.755i | 0.894 + 0.555i | 0.624 + 0.859i | 1.031 + 0.191i | 0.222 + 1.051i |
| 14 | 0.609 + 0.347i | 0.427 + 0.613i | 0.674 + 0.142i | 0.172 + 0.757i | 0.895 + 0.555i | 0.625 + 0.859i | 1.032 + 0.191i | 0.224 + 1.052i |
| 14.1 | 0.608 + 0.347i | 0.428 + 0.613i | 0.674 + 0.140i | 0.171 + 0.760i | 0.896 + 0.555i | 0.626 + 0.859i | 1.033 + 0.191i | 0.224 + 1.054i |
| 14.2 | 0.608 + 0.347i | 0.430 + 0.612i | 0.675 + 0.139i | 0.170 + 0.762i | 0.896 + 0.554i | 0.627 + 0.859i | 1.033 + 0.191i | 0.225 + 1.055i |
| 14.3 | 0.607 + 0.344i | 0.431 + 0.611i | 0.678 + 0.138i | 0.168 + 0.764i | 0.896 + 0.555i | 0.627 + 0.858i | 1.035 + 0.191i | 0.226 + 1.056i |
| 14.4 | 0.607 + 0.340i | 0.432 + 0.609i | 0.686 + 0.136i | 0.166 + 0.765i | 0.896 + 0.555i | 0.627 + 0.857i | 1.038 + 0.193i | 0.227 + 1.056i |
| 14.5 | 0.615 + 0.327i | 0.433 + 0.599i | 0.727 + 0.135i | 0.158 + 0.752i | 0.897 + 0.564i | 0.618 + 0.851i | 1.058 + 0.203i | 0.223 + 1.044i |
| 14.6 | 0.622 + 0.322i | 0.434 + 0.594i | 0.748 + 0.135i | 0.154 + 0.743i | 0.897 + 0.569i | 0.614 + 0.850i | 1.068 + 0.208i | 0.221 + 1.037i |
| 14.7 | 0.628 + 0.321i | 0.436 + 0.590i | 0.763 + 0.135i | 0.152 + 0.737i | 0.898 + 0.572i | 0.611 + 0.848i | 1.076 + 0.212i | 0.220 + 1.031i |
| 14.8 | 0.630 + 0.320i | 0.437 + 0.589i | 0.770 + 0.134i | 0.151 + 0.735i | 0.898 + 0.573i | 0.610 + 0.848i | 1.079 + 0.213i | 0.220 + 1.030i |
| 14.9 | 0.634 + 0.320i | 0.439 + 0.587i | 0.778 + 0.134i | 0.150 + 0.731i | 0.898 + 0.574i | 0.609 + 0.848i | 1.084 + 0.214i | 0.219 + 1.027i |
| 15 | 0.637 + 0.322i | 0.440 + 0.586i | 0.783 + 0.133i | 0.149 + 0.729i | 0.899 + 0.576i | 0.607 + 0.849i | 1.087 + 0.216i | 0.218 + 1.026i |
| 15.1 | 0.640 + 0.323i | 0.441 + 0.586i | 0.787 + 0.133i | 0.149 + 0.727i | 0.899 + 0.576i | 0.607 + 0.849i | 1.090 + 0.216i | 0.218 + 1.025i |
| 15.2 | 0.643 + 0.324i | 0.442 + 0.585i | 0.791 + 0.133i | 0.149 + 0.725i | 0.899 + 0.576i | 0.606 + 0.849i | 1.093 + 0.217i | 0.218 + 1.023i |
| 15.3 | 0.645 + 0.326i | 0.443 + 0.586i | 0.794 + 0.133i | 0.148 + 0.725i | 0.900 + 0.577i | 0.605 + 0.850i | 1.095 + 0.218i | 0.217 + 1.023i |

-continued

| 64 NUC | | | | | | | | |
|---|---|---|---|---|---|---|---|---|
| 15.4 | 0.648 + 0.328i | 0.444 + 0.586i | 0.797 + 0.132i | 0.148 + 0.724i | 0.900 + 0.577i | 0.605 + 0.851i | 1.098 + 0.218i | 0.717 + 1.022i |
| 15.5 | 0.650 + 0.330i | 0.445 + 0.586i | 0.799 + 0.132i | 0.148 + 0.723i | 0.901 + 0.578i | 0.605 + 0.851i | 1.100 + 0.218i | 0.217 + 1.021i |
| 15.6 | 0.652 + 0.333i | 0.446 + 0.587i | 0.801 + 0.132i | 0.148 + 0.722i | 0.902 + 0.578i | 0.605 + 0.852i | 1.101 + 0.218i | 0.217 + 1.021i |
| 15.7 | 0.654 + 0.334i | 0.447 + 0.588i | 0.802 + 0.131i | 0.148 + 0.722i | 0.902 + 0.577i | 0.605 + 0.853i | 1.103 + 0.217i | 0.216 + 1.021i |
| 15.8 | 0.656 + 0.337i | 0.448 + 0.588i | 0.804 + 0.131i | 0.148 + 0.721i | 0.904 + 0.577i | 0.605 + 0.854i | 1.105 + 0.215i | 0.216 + 1.020i |
| 15.9 | 0.659 + 0.339i | 0.449 + 0.589i | 0.806 + 0.131i | 0.148 + 0.720i | 0.906 + 0.577i | 0.605 + 0.854i | 1.108 + 0.213i | 0.216 + 1.019i |
| 16 | 0.697 + 0.332i | 0.450 + 0.568i | 0.882 + 0.139i | 0.143 + 0.674i | 0.892 + 0.600i | 0.568 + 0.844i | 1.225 + 0.212i | 0.196 + 0.977i |
| 16.1 | 0.700 + 0.333i | 0.450 + 0.569i | 0.887 + 0.139i | 0.144 + 0.673i | 0.891 + 0.602i | 0.566 + 0.846i | 1.231 + 0.212i | 0.195 + 0.976i |
| 16.2 | 0.702 + 0.334i | 0.451 + 0.569i | 0.892 + 0.141i | 0.144 + 0.671i | 0.889 + 0.605i | 0.564 + 0.847i | 1.238 + 0.212i | 0.194 + 0.975i |
| 16.3 | 0.705 + 0.335i | 0.451 + 0.570i | 0.898 + 0.142i | 0.144 + 0.670i | 0.887 + 0.607i | 0.562 + 0.848i | 1.245 + 0.212i | 0.194 + 0.974i |
| 16.4 | 0.706 + 0.336i | 0.451 + 0.571i | 0.903 + 0.144i | 0.144 + 0.669i | 0.884 + 0.609i | 0.561 + 0.849i | 1.251 + 0.212i | 0.193 + 0.974i |
| 16.5 | 0.708 + 0.338i | 0.452 + 0.572i | 0.906 + 0.145i | 0.145 + 0.669i | 0.883 + 0.612i | 0.560 + 0.851i | 1.255 + 0.211i | 0.192 + 0.973i |
| 16.6 | 0.711 + 0.340i | 0.452 + 0.572i | 0.911 + 0.147i | 0.145 + 0.667i | 0.880 + 0.615i | 0.557 + 0.853i | 1.262 + 0.211i | 0.191 + 0.973i |
| 16.7 | 0.712 + 0.341i | 0.452 + 0.573i | 0.915 + 0.149i | 0.145 + 0.667i | 0.877 + 0.618i | 0.555 + 0.855i | 1.267 + 0.210i | 0.190 + 0.974i |
| 16.8 | 0.715 + 0.343i | 0.452 + 0.575i | 0.920 + 0.151i | 0.145 + 0.666i | 0.873 + 0.622i | 0.554 + 0.857i | 1.274 + 0.209i | 0.190 + 0.973i |
| 16.9 | 0.716 + 0.344i | 0.451 + 0.576i | 0.925 + 0.153i | 0.145 + 0.666i | 0.868 + 0.626i | 0.552 + 0.860i | 1.280 + 0.207i | 0.189 + 0.974i |
| 17 | 0.720 + 0.347i | 0.450 + 0.577i | 0.932 + 0.156i | 0.145 + 0.664i | 0.862 + 0.633i | 0.548 + 0.863i | 1.290 + 0.205i | 0.187 + 0.973i |
| 17.1 | 0.724 + 0.350i | 0.449 + 0.579i | 0.939 + 0.158i | 0.145 + 0.662i | 0.855 + 0.641i | 0.544 + 0.866i | 1.299 + 0.203i | 0.185 + 0.972i |
| 17.2 | 0.726 + 0.353i | 0.449 + 0.581i | 0.941 + 0.159i | 0.145 + 0.662i | 0.850 + 0.646i | 0.541 + 0.870i | 1.303 + 0.201i | 0.184 + 0.972i |
| 17.3 | 0.728 + 0.357i | 0.449 + 0.583i | 0.943 + 0.160i | 0.146 + 0.663i | 0.847 + 0.651i | 0.539 + 0.873i | 1.305 + 0.201i | 0.183 + 0.973i |
| 17.4 | 0.732 + 0.362i | 0.448 + 0.585i | 0.945 + 0.161i | 0.145 + 0.661i | 0.841 + 0.661i | 0.535 + 0.877i | 1.309 + 0.199i | 0.182 + 0.972i |
| 17.5 | 0.734 + 0.366i | 0.448 + 0.587i | 0.945 + 0.161i | 0.146 + 0.662i | 0.838 + 0.666i | 0.534 + 0.880i | 1.309 + 0.199i | 0.181 + 0.973i |
| 17.6 | 0.738 + 0.372i | 0.448 + 0.589i | 0.945 + 0.161i | 0.146 + 0.661i | 0.833 + 0.675i | 0.529 + 0.884i | 1.310 + 0.198i | 0.179 + 0.973i |
| 17.7 | 0.740 + 0.376i | 0.448 + 0.592i | 0.945 + 0.160i | 0.147 + 0.662i | 0.831 + 0.681i | 0.527 + 0.888i | 1.308 + 0.197i | 0.178 + 0.973i |
| 17.8 | 0.743 + 0.381i | 0.448 + 0.594i | 0.944 + 0.160i | 0.147 + 0.663i | 0.827 + 0.688i | 0.524 + 0.891i | 1.308 + 0.197i | 0.177 + 0.974i |
| 17.9 | 0.743 + 0.383i | 0.449 + 0.596i | 0.944 + 0.160i | 0.148 + 0.663i | 0.826 + 0.691i | 0.523 + 0.894i | 1.307 + 0.196i | 0.176 + 0.975i |
| 18 | 0.744 + 0.386i | 0.449 + 0.598i | 0.943 + 0.160i | 0.148 + 0.664i | 0.824 + 0.695i | 0.522 + 0.897i | 1.305 + 0.196i | 0.176 + 0.976i |
| 18.1 | 0.745 + 0.389i | 0.450 + 0.601i | 0.941 + 0.160i | 0.148 + 0.666i | 0.823 + 0.699i | 0.521 + 0.900i | 1.303 + 0.195i | 0.175 + 0.976i |
| 18.2 | 0.746 + 0.391i | 0.450 + 0.603i | 0.940 + 0.159i | 0.148 + 0.667i | 0.821 + 0.703i | 0.520 + 0.903i | 1.300 + 0.195i | 0.174 + 0.978i |
| 18.3 | 0.747 + 0.393i | 0.451 + 0.605i | 0.939 + 0.159i | 0.149 + 0.669i | 0.820 + 0.706i | 0.518 + 0.905i | 1.299 + 0.194i | 0.174 + 0.979i |
| 18.4 | 0.747 + 0.396i | 0.452 + 0.608i | 0.937 + 0.158i | 0.149 + 0.671i | 0.819 + 0.709i | 0.517 + 0.908i | 1.296 + 0.194i | 0.173 + 0.981i |
| 18.5 | 0.747 + 0.397i | 0.452 + 0.610i | 0.936 + 0.158i | 0.150 + 0.673i | 0.817 + 0.710i | 0.517 + 0.910i | 1.294 + 0.193i | 0.173 + 0.983i |
| 18.6 | 0.747 + 0.399i | 0.453 + 0.612i | 0.934 + 0.158i | 0.150 + 0.675i | 0.818 + 0.712i | 0.517 + 0.912i | 1.291 + 0.193i | 0.173 + 0.984i |
| 18.7 | 0.748 + 0.400i | 0.454 + 0.614i | 0.933 + 0.158i | 0.151 + 0.676i | 0.817 + 0.714i | 0.516 + 0.915i | 1.289 + 0.192i | 0.173 + 0.985i |
| 18.8 | 0.748 + 0.402i | 0.454 + 0.617i | 0.931 + 0.158i | 0.151 + 0.679i | 0.816 + 0.717i | 0.515 + 0.917i | 1.287 + 0.192i | 0.173 + 0.987i |
| 18.9 | 0.747 + 0.403i | 0.455 + 0.618i | 0.931 + 0.158i | 0.152 + 0.680i | 0.816 + 0.718i | 0.515 + 0.919i | 1.286 + 0.191i | 0.172 + 0.988i |
| 19 | 0.747 + 0.404i | 0.456 + 0.621i | 0.929 + 0.157i | 0.152 + 0.682i | 0.817 + 0.719i | 0.515 + 0.921i | 1.282 + 0.191i | 0.172 + 0.990i |
| 19.1 | 0.748 + 0.406i | 0.457 + 0.623i | 0.928 + 0.157i | 0.152 + 0.684i | 0.817 + 0.721i | 0.515 + 0.923i | 1.281 + 0.190i | 0.172 + 0.991i |
| 19.2 | 0.747 + 0.408i | 0.458 + 0.624i | 0.927 + 0.157i | 0.153 + 0.686i | 0.818 + 0.723i | 0.515 + 0.924i | 1.278 + 0.189i | 0.172 + 0.993i |
| 19.3 | 0.748 + 0.408i | 0.459 + 0.626i | 0.926 + 0.157i | 0.153 + 0.687i | 0.819 + 0.723i | 0.515 + 0.926i | 1.277 + 0.188i | 0.172 + 0.994i |
| 19.4 | 0.748 + 0.410i | 0.461 + 0.627i | 0.924 + 0.157i | 0.154 + 0.689i | 0.820 + 0.726i | 0.514 + 0.927i | 1.275 + 0.187i | 0.172 + 0.996i |
| 19.5 | 0.747 + 0.411i | 0.462 + 0.629i | 0.924 + 0.157i | 0.154 + 0.691i | 0.821 + 0.727i | 0.514 + 0.928i | 1.273 + 0.187i | 0.172 + 0.998i |
| 19.6 | 0.747 + 0.413i | 0.463 + 0.630i | 0.922 + 0.157i | 0.155 + 0.693i | 0.822 + 0.729i | 0.514 + 0.930i | 1.271 + 0.185i | 0.172 + 0.999i |
| 19.7 | 0.748 + 0.414i | 0.465 + 0.631i | 0.922 + 0.157i | 0.156 + 0.694i | 0.823 + 0.731i | 0.513 + 0.930i | 1.270 + 0.185i | 0.171 + 1.000i |
| 19.8 | 0.747 + 0.415i | 0.467 + 0.633i | 0.920 + 0.157i | 0.157 + 0.696i | 0.824 + 0.732i | 0.512 + 0.932i | 1.268 + 0.183i | 0.171 + 1.002i |
| 19.9 | 0.747 + 0.417i | 0.468 + 0.634i | 0.918 + 0.157i | 0.157 + 0.699i | 0.826 + 0.734i | 0.511 + 0.933i | 1.265 + 0.182i | 0.171 + 1.005i |
| 20 | 0.747 + 0.418i | 0.469 + 0.635i | 0.917 + 0.157i | 0.157 + 0.701i | 0.826 + 0.736i | 0.511 + 0.934i | 1.263 + 0.182i | 0.171 + 1.007i |

| | Normalized values | | | | | | | |
|---|---|---|---|---|---|---|---|---|
| SNR | a9 | a10 | a11 | a12 | a13 | a14 | a15 | a16 |
| 7 | 0.461 + 0.272i | 0.272 + 0.460i | 0.449 + 0.245i | 0.247 + 0.446i | 1.140 + 0.647i | 0.638 + 1.137i | 1.287 + 0.360i | 0.361 + 1.285i |
| 7.1 | 0.455 + 0.269i | 0.269 + 0.453i | 0.445 + 0.241i | 0.244 + 0.438i | 1.153 + 0.672i | 0.655 + 1.150i | 1.311 + 0.354i | 0.354 + 1.308i |
| 7.2 | 0.445 + 0.264i | 0.264 + 0.441i | 0.435 + 0.236i | 0.240 + 0.425i | 1.175 + 0.703i | 0.678 + 1.171i | 1.343 + 0.349i | 0.351 + 1.342i |
| 7.3 | 0.436 + 0.259i | 0.259 + 0.432i | 0.429 + 0.232i | 0.236 + 0.416i | 1.192 + 0.732i | 0.691 + 1.184i | 1.363 + 0.343i | 0.346 + 1.362i |
| 7.4 | 0.428 + 0.254i | 0.254 + 0.422i | 0.424 + 0.228i | 0.233 + 0.406i | 1.208 + 0.758i | 0.701 + 1.195i | 1.379 + 0.338i | 0.341 + 1.377i |
| 7.5 | 0.422 + 0.249i | 0.249 + 0.415i | 0.419 + 0.224i | 0.230 + 0.400i | 1.220 + 0.778i | 0.711 + 1.205i | 1.391 + 0.332i | 0.335 + 1.387i |
| 7.6 | 0.416 + 0.245i | 0.245 + 0.407i | 0.414 + 0.221i | 0.226 + 0.394i | 1.229 + 0.790i | 0.724 + 1.216i | 1.400 + 0.326i | 0.329 + 1.396i |
| 7.7 | 0.408 + 0.240i | 0.241 + 0.401i | 0.406 + 0.218i | 0.222 + 0.391i | 1.235 + 0.792i | 0.745 + 1.227i | 1.407 + 0.322i | 0.324 + 1.404i |
| 7.8 | 0.401 + 0.236i | 0.237 + 0.395i | 0.398 + 0.215i | 0.218 + 0.388i | 1.242 + 0.796i | 0.761 + 1.237i | 1.413 + 0.318i | 0.318 + 1.410i |
| 7.9 | 0.394 + 0.232i | 0.233 + 0.389i | 0.391 + 0.213i | 0.215 + 0.385i | 1.247 + 0.795i | 0.779 + 1.247i | 1.418 + 0.314i | 0.313 + 1.417i |
| 8 | 0.388 + 0.228i | 0.229 + 0.384i | 0.386 + 0.210i | 0.211 + 0.380i | 1.252 + 0.800i | 0.788 + 1.252i | 1.423 + 0.310i | 0.310 + 1.423i |
| 8.1 | 0.382 + 0.224i | 0.225 + 0.379i | 0.379 + 0.207i | 0.208 + 0.376i | 1.256 + 0.805i | 0.796 + 1.256i | 1.430 + 0.307i | 0.307 + 1.430i |
| 8.2 | 0.375 + 0.220i | 0.220 + 0.373i | 0.374 + 0.204i | 0.205 + 0.371i | 1.260 + 0.809i | 0.803 + 1.260i | 1.435 + 0.304i | 0.304 + 1.435i |
| 8.3 | 0.370 + 0.217i | 0.217 + 0.368i | 0.368 + 0.201i | 0.201 + 0.366i | 1.263 + 0.813i | 0.809 + 1.263i | 1.440 + 0.302i | 0.302 + 1.441i |
| 8.4 | 0.364 + 0.213i | 0.213 + 0.363i | 0.362 + 0.198i | 0.199 + 0.362i | 1.265 + 0.817i | 0.815 + 1.265i | 1.445 + 0.300i | 0.301 + 1.446i |
| 8.5 | 0.359 + 0.209i | 0.210 + 0.358i | 0.357 + 0.194i | 0.195 + 0.356i | 1.267 + 0.820i | 0.819 + 1.266i | 1.450 + 0.299i | 0.300 + 1.451i |
| 8.6 | 0.353 + 0.206i | 0.206 + 0.353i | 0.352 + 0.192i | 0.192 + 0.352i | 1.268 + 0.824i | 0.823 + 1.268i | 1.455 + 0.298i | 0.299 + 1.456i |
| 8.7 | 0.348 + 0.202i | 0.203 + 0.348i | 0.347 + 0.189i | 0.189 + 0.347i | 1.269 + 0.827i | 0.826 + 1.269i | 1.459 + 0.297i | 0.297 + 1.460i |
| 8.8 | 0.343 + 0.199i | 0.200 + 0.343i | 0.342 + 0.186i | 0.186 + 0.342i | 1.269 + 0.829i | 0.829 + 1.269i | 1.463 + 0.297i | 0.297 + 1.465i |
| 8.9 | 0.339 + 0.196i | 0.196 + 0.339i | 0.338 + 0.183i | 0.183 + 0.339i | 1.270 + 0.831i | 0.832 + 1.269i | 1.467 + 0.296i | 0.296 + 1.469i |
| 9 | 0.334 + 0.194i | 0.194 + 0.334i | 0.334 + 0.181i | 0.181 + 0.334i | 1.270 + 0.833i | 0.834 + 1.270i | 1.471 + 0.295i | 0.296 + 1.472i |
| 9.1 | 0.331 + 0.191i | 0.191 + 0.330i | 0.330 + 0.178i | 0.178 + 0.330i | 1.270 + 0.836i | 0.836 + 1.269i | 1.474 + 0.295i | 0.296 + 1.475i |
| 9.2 | 0.327 + 0.188i | 0.189 + 0.327i | 0.327 + 0.176i | 0.176 + 0.327i | 1.269 + 0.837i | 0.838 + 1.269i | 1.477 + 0.295i | 0.295 + 1.477i |
| 9.3 | 0.323 + 0.186i | 0.186 + 0.323i | 0.323 + 0.174i | 0.174 + 0.323i | 1.269 + 0.839i | 0.840 + 1.268i | 1.479 + 0.294i | 0.295 + 1.480i |
| 9.4 | 0.320 + 0.184i | 0.184 + 0.321i | 0.320 + 0.171i | 0.171 + 0.321i | 1.269 + 0.840i | 0.841 + 1.269i | 1.481 + 0.294i | 0.295 + 1.482i |

-continued

| 64 NUC | | | | | | | | |
|---|---|---|---|---|---|---|---|---|
| 9.5 | 0.318 + 0.182i | 0.182 + 0.318i | 0.318 + 0.169i | 0.170 + 0.318i | 1.269 + 0.841i | 0.842 + 1.269i | 1.483 + 0.294i | 0.294 + 1.484i |
| 9.6 | 0.315 + 0.180i | 0.180 + 0.315i | 0.315 + 0.168i | 0.168 + 0.316i | 1.268 + 0.842i | 0.843 + 1.267i | 1.485 + 0.293i | 0.294 + 1.485i |
| 9.7 | 0.313 + 0.179i | 0.179 + 0.313i | 0.313 + 0.166i | 0.166 + 0.313i | 1.267 + 0.843i | 0.843 + 1.267i | 1.486 + 0.293i | 0.293 + 1.486i |
| 9.8 | 0.311 + 0.177i | 0.177 + 0.311i | 0.311 + 0.164i | 0.164 + 0.311i | 1.266 + 0.844i | 0.844 + 1.267i | 1.487 + 0.293i | 0.293 + 1.487i |
| 9.9 | 0.309 + 0.176i | 0.176 + 0.308i | 0.310 + 0.163i | 0.163 + 0.309i | 1.266 + 0.844i | 0.845 + 1.266i | 1.488 + 0.293i | 0.293 + 1.488i |
| 10 | 0.307 + 0.175i | 0.175 + 0.307i | 0.308 + 0.162i | 0.162 + 0.307i | 1.265 + 0.845i | 0.845 + 1.266i | 1.489 + 0.293i | 0.293 + 1.489i |
| 10.1 | 0.306 + 0.173i | 0.174 + 0.306i | 0.307 + 0.160i | 0.161 + 0.307i | 1.265 + 0.845i | 0.845 + 1.265i | 1.489 + 0.293i | 0.293 + 1.489i |
| 10.2 | 0.304 + 0.173i | 0.173 + 0.304i | 0.305 + 0.159i | 0.159 + 0.305i | 1.264 + 0.845i | 0.846 + 1.264i | 1.489 + 0.292i | 0.292 + 1.489i |
| 10.3 | 0.304 + 0.172i | 0.172 + 0.304i | 0.304 + 0.158i | 0.158 + 0.304i | 1.263 + 0.845i | 0.846 + 1.264i | 1.489 + 0.292i | 0.292 + 1.490i |
| 10.4 | 0.303 + 0.172i | 0.172 + 0.303i | 0.304 + 0.157i | 0.157 + 0.304i | 1.263 + 0.845i | 0.846 + 1.263i | 1.490 + 0.292i | 0.292 + 1.490i |
| 10.5 | 0.303 + 0.171i | 0.171 + 0.302i | 0.304 + 0.156i | 0.156 + 0.303i | 1.262 + 0.845i | 0.846 + 1.263i | 1.489 + 0.292i | 0.292 + 1.489i |
| 10.6 | 0.302 + 0.170i | 0.170 + 0.302i | 0.303 + 0.155i | 0.155 + 0.303i | 1.262 + 0.845i | 0.846 + 1.262i | 1.489 + 0.292i | 0.292 + 1.489i |
| 10.7 | 0.301 + 0.170i | 0.170 + 0.302i | 0.302 + 0.154i | 0.154 + 0.303i | 1.261 + 0.845i | 0.845 + 1.261i | 1.489 + 0.291i | 0.292 + 1.489i |
| 10.8 | 0.301 + 0.170i | 0.170 + 0.302i | 0.302 + 0.153i | 0.153 + 0.303i | 1.261 + 0.844i | 0.846 + 1.261i | 1.488 + 0.291i | 0.292 + 1.488i |
| 10.9 | 0.302 + 0.169i | 0.169 + 0.301i | 0.302 + 0.152i | 0.152 + 0.302i | 1.260 + 0.843i | 0.845 + 1.260i | 1.488 + 0.291i | 0.292 + 1.488i |
| 11 | 0.302 + 0.170i | 0.170 + 0.301i | 0.302 + 0.151i | 0.151 + 0.302i | 1.260 + 0.843i | 0.845 + 1.260i | 1.486 + 0.291i | 0.292 + 1.487i |
| 11.1 | 0.302 + 0.169i | 0.169 + 0.302i | 0.302 + 0.151i | 0.151 + 0.302i | 1.259 + 0.843i | 0.844 + 1.259i | 1.486 + 0.291i | 0.292 + 1.487i |
| 11.2 | 0.302 + 0.169i | 0.169 + 0.302i | 0.303 + 0.150i | 0.150 + 0.302i | 1.258 + 0.842i | 0.844 + 1.258i | 1.485 + 0.291i | 0.292 + 1.486i |
| 11.3 | 0.302 + 0.169i | 0.169 + 0.302i | 0.303 + 0.149i | 0.149 + 0.302i | 1.257 + 0.842i | 0.843 + 1.258i | 1.485 + 0.292i | 0.292 + 1.485i |
| 11.4 | 0.302 + 0.169i | 0.169 + 0.302i | 0.304 + 0.148i | 0.148 + 0.304i | 1.257 + 0.841i | 0.843 + 1.257i | 1.484 + 0.292i | 0.292 + 1.484i |
| 11.5 | 0.303 + 0.169i | 0.169 + 0.303i | 0.304 + 0.148i | 0.148 + 0.304i | 1.256 + 0.841i | 0.842 + 1.257i | 1.483 + 0.292i | 0.292 + 1.483i |
| 11.6 | 0.304 + 0.169i | 0.169 + 0.304i | 0.305 + 0.146i | 0.147 + 0.304i | 1.256 + 0.840i | 0.841 + 1.256i | 1.482 + 0.292i | 0.292 + 1.482i |
| 11.7 | 0.304 + 0.169i | 0.169 + 0.303i | 0.306 + 0.146i | 0.146 + 0.305i | 1.255 + 0.839i | 0.840 + 1.255i | 1.481 + 0.292i | 0.292 + 1.482i |
| 11.8 | 0.305 + 0.169i | 0.169 + 0.304i | 0.307 + 0.145i | 0.145 + 0.305i | 1.254 + 0.839i | 0.840 + 1.255i | 1.480 + 0.291i | 0.291 + 1.480i |
| 11.9 | 0.306 + 0.168i | 0.168 + 0.305i | 0.308 + 0.144i | 0.145 + 0.306i | 1.254 + 0.838i | 0.839 + 1.254i | 1.479 + 0.291i | 0.291 + 1.479i |
| 12 | 0.307 + 0.168i | 0.168 + 0.305i | 0.309 + 0.143i | 0.143 + 0.307i | 1.253 + 0.837i | 0.839 + 1.254i | 1.478 + 0.291i | 0.291 + 1.478i |
| 12.1 | 0.307 + 0.168i | 0.168 + 0.306i | 0.309 + 0.142i | 0.142 + 0.308i | 1.252 + 0.836i | 0.838 + 1.252i | 1.477 + 0.291i | 0.292 + 1.478i |
| 12.2 | 0.308 + 0.168i | 0.168 + 0.307i | 0.311 + 0.142i | 0.142 + 0.309i | 1.251 + 0.836i | 0.837 + 1.251i | 1.477 + 0.292i | 0.292 + 1.477i |
| 12.3 | 0.309 + 0.168i | 0.168 + 0.308i | 0.311 + 0.141i | 0.141 + 0.311i | 1.250 + 0.836i | 0.836 + 1.251i | 1.475 + 0.292i | 0.291 + 1.475i |
| 12.4 | 0.309 + 0.168i | 0.168 + 0.308i | 0.313 + 0.140i | 0.140 + 0.312i | 1.250 + 0.835i | 0.836 + 1.250i | 1.475 + 0.292i | 0.292 + 1.474i |
| 12.5 | 0.310 + 0.167i | 0.167 + 0.309i | 0.313 + 0.139i | 0.139 + 0.314i | 1.249 + 0.835i | 0.835 + 1.249i | 1.474 + 0.292i | 0.291 + 1.473i |
| 12.6 | 0.310 + 0.166i | 0.167 + 0.310i | 0.314 + 0.138i | 0.138 + 0.316i | 1.248 + 0.834i | 0.834 + 1.248i | 1.473 + 0.292i | 0.291 + 1.472i |
| 12.7 | 0.310 + 0.166i | 0.167 + 0.312i | 0.314 + 0.137i | 0.137 + 0.317i | 1.247 + 0.833i | 0.833 + 1.247i | 1.472 + 0.291i | 0.291 + 1.471i |
| 12.8 | 0.310 + 0.165i | 0.166 + 0.312i | 0.316 + 0.137i | 0.137 + 0.319i | 1.247 + 0.832i | 0.833 + 1.247i | 1.471 + 0.291i | 0.291 + 1.470i |
| 12.9 | 0.311 + 0.165i | 0.166 + 0.314i | 0.316 + 0.136i | 0.136 + 0.321i | 1.246 + 0.831i | 0.833 + 1.246i | 1.470 + 0.291i | 0.291 + 1.469i |
| 13 | 0.275 + 0.157i | 0.176 + 0.357i | 0.270 + 0.134i | 0.134 + 0.377i | 1.252 + 0.820i | 0.842 + 1.236i | 1.469 + 0.285i | 0.297 + 1.466i |
| 13.1 | 0.270 + 0.155i | 0.177 + 0.364i | 0.264 + 0.132i | 0.133 + 0.387i | 1.251 + 0.818i | 0.842 + 1.234i | 1.468 + 0.285i | 0.298 + 1.465i |
| 13.2 | 0.267 + 0.155i | 0.178 + 0.369i | 0.261 + 0.131i | 0.132 + 0.393i | 1.231 + 0.817i | 0.841 + 1.233i | 1.467 + 0.285i | 0.298 + 1.464i |
| 13.3 | 0.265 + 0.154i | 0.180 + 0.373i | 0.257 + 0.130i | 0.131 + 0.399i | 1.250 + 0.815i | 0.842 + 1.231i | 1.466 + 0.285i | 0.299 + 1.463i |
| 13.4 | 0.261 + 0.154i | 0.182 + 0.379i | 0.252 + 0.129i | 0.131 + 0.406i | 1.249 + 0.814i | 0.842 + 1.229i | 1.465 + 0.284i | 0.299 + 1.463i |
| 13.5 | 0.260 + 0.153i | 0.183 + 0.382i | 0.249 + 0.129i | 0.130 + 0.411i | 1.249 + 0.813i | 0.841 + 1.229i | 1.463 + 0.283i | 0.299 + 1.462i |
| 13.6 | 0.259 + 0.154i | 0.184 + 0.386i | 0.247 + 0.128i | 0.129 + 0.415i | 1.248 + 0.811i | 0.841 + 1.228i | 1.462 + 0.283i | 0.299 + 1.461i |
| 13.7 | 0.257 + 0.154i | 0.186 + 0.389i | 0.244 + 0.127i | 0.129 + 0.420i | 1.247 + 0.811i | 0.840 + 1.226i | 1.461 + 0.283i | 0.299 + 1.461i |
| 13.8 | 0.256 + 0.154i | 0.187 + 0.392i | 0.241 + 0.126i | 0.128 + 0.423i | 1.246 + 0.810i | 0.839 + 1.226i | 1.459 + 0.282i | 0.299 + 1.461i |
| 13.9 | 0.256 + 0.154i | 0.189 + 0.395i | 0.238 + 0.126i | 0.127 + 0.426i | 1.244 + 0.809i | 0.838 + 1.225i | 1.458 + 0.282i | 0.299 + 1.460i |
| 14 | 0.256 + 0.154i | 0.191 + 0.398i | 0.235 + 0.125i | 0.126 + 0.429i | 1.244 + 0.808i | 0.838 + 1.224i | 1.457 + 0.282i | 0.299 + 1.459i |
| 14.1 | 0.257 + 0.156i | 0.194 + 0.400i | 0.231 + 0.125i | 0.126 + 0.432i | 1.242 + 0.808i | 0.838 + 1.223i | 1.456 + 0.282i | 0.299 + 1.459i |
| 14.2 | 0.259 + 0.157i | 0.196 + 0.402i | 0.227 + 0.124i | 0.125 + 0.435i | 1.241 + 0.807i | 0.836 + 1.222i | 1.455 + 0.282i | 0.299 + 1.459i |
| 14.3 | 0.264 + 0.159i | 0.201 + 0.405i | 0.219 + 0.124i | 0.124 + 0.436i | 1.239 + 0.807i | 0.835 + 1.221i | 1.453 + 0.282i | 0.298 + 1.458i |
| 14.4 | 0.275 + 0.161i | 0.209 + 0.408i | 0.207 + 0.123i | 0.122 + 0.435i | 1.236 + 0.808i | 0.832 + 1.220i | 1.453 + 0.283i | 0.297 + 1.457i |
| 14.5 | 0.320 + 0.160i | 0.241 + 0.403i | 0.175 + 0.118i | 0.118 + 0.418i | 1.230 + 0.818i | 0.818 + 1.216i | 1.463 + 0.290i | 0.291 + 1.444i |
| 14.6 | 0.339 + 0.158i | 0.258 + 0.400i | 0.162 + 0.116i | 0.117 + 0.411i | 1.225 + 0.823i | 0.810 + 1.214i | 1.466 + 0.294i | 0.287 + 1.436i |
| 14.7 | 0.352 + 0.155i | 0.270 + 0.397i | 0.154 + 0.115i | 0.115 + 0.406i | 1.221 + 0.827i | 0.804 + 1.213i | 1.470 + 0.297i | 0.284 + 1.429i |
| 14.8 | 0.359 + 0.154i | 0.276 + 0.396i | 0.149 + 0.114i | 0.115 + 0.405i | 1.218 + 0.828i | 0.800 + 1.212i | 1.470 + 0.298i | 0.282 + 1.426i |
| 14.9 | 0.366 + 0.152i | 0.282 + 0.394i | 0.146 + 0.113i | 0.114 + 0.403i | 1.215 + 0.830i | 0.796 + 1.211i | 1.471 + 0.300i | 0.281 + 1.423i |
| 15 | 0.371 + 0.151i | 0.286 + 0.393i | 0.143 + 0.112i | 0.114 + 0.402i | 1.213 + 0.831i | 0.793 + 1.210i | 1.472 + 0.301i | 0.279 + 1.420i |
| 15.1 | 0.375 + 0.149i | 0.290 + 0.391i | 0.140 + 0.112i | 0.113 + 0.400i | 1.210 + 0.832i | 0.790 + 1.209i | 1.472 + 0.303i | 0.278 + 1.418i |
| 15.2 | 0.379 + 0.149i | 0.294 + 0.390i | 0.138 + 0.112i | 0.113 + 0.400i | 1.207 + 0.833i | 0.788 + 1.209i | 1.473 + 0.304i | 0.276 + 1.415i |
| 15.3 | 0.382 + 0.148i | 0.296 + 0.390i | 0.137 + 0.111i | 0.113 + 0.400i | 1.204 + 0.835i | 0.785 + 1.209i | 1.472 + 0.305i | 0.275 + 1.414i |
| 15.4 | 0.386 + 0.147i | 0.299 + 0.389i | 0.135 + 0.111i | 0.112 + 0.399i | 1.202 + 0.835i | 0.782 + 1.208i | 1.473 + 0.308i | 0.274 + 1.411i |
| 15.5 | 0.388 + 0.146i | 0.302 + 0.388i | 0.135 + 0.111i | 0.112 + 0.399i | 1.199 + 0.837i | 0.779 + 1.208i | 1.472 + 0.310i | 0.272 + 1.409i |
| 15.6 | 0.391 + 0.146i | 0.304 + 0.388i | 0.133 + 0.111i | 0.112 + 0.398i | 1.196 + 0.839i | 0.776 + 1.208i | 1.471 + 0.312i | 0.271 + 1.408i |
| 15.7 | 0.393 + 0.145i | 0.306 + 0.388i | 0.132 + 0.111i | 0.112 + 0.399i | 1.192 + 0.841i | 0.773 + 1.208i | 1.470 + 0.315i | 0.270 + 1.407i |
| 15.8 | 0.396 + 0.145i | 0.308 + 0.387i | 0.132 + 0.111i | 0.112 + 0.399i | 1.187 + 0.846i | 0.768 + 1.210i | 1.469 + 0.323i | 0.267 + 1.404i |
| 15.9 | 0.398 + 0.144i | 0.311 + 0.386i | 0.131 + 0.111i | 0.112 + 0.398i | 1.180 + 0.852i | 0.762 + 1.211i | 1.466 + 0.334i | 0.264 + 1.402i |
| 16 | 0.444 + 0.132i | 0.340 + 0.360i | 0.137 + 0.101i | 0.120 + 0.366i | 1.071 + 0.959i | 0.676 + 1.224i | 1.400 + 0.583i | 0.232 + 1.365i |
| 16.1 | 0.448 + 0.132i | 0.343 + 0.359i | 0.138 + 0.102i | 0.121 + 0.365i | 1.066 + 0.963i | 0.672 + 1.225i | 1.393 + 0.589i | 0.230 + 1.363i |
| 16.2 | 0.452 + 0.131i | 0.345 + 0.358i | 0.139 + 0.101i | 0.122 + 0.364i | 1.059 + 0.966i | 0.667 + 1.225i | 1.384 + 0.597i | 0.229 + 1.361i |
| 16.3 | 0.457 + 0.130i | 0.347 + 0.358i | 0.140 + 0.100i | 0.122 + 0.363i | 1.054 + 0.969i | 0.664 + 1.225i | 1.377 + 0.601i | 0.227 + 1.359i |
| 16.4 | 0.460 + 0.130i | 0.349 + 0.357i | 0.141 + 0.100i | 0.123 + 0.363i | 1.049 + 0.971i | 0.659 + 1.226i | 1.369 + 0.606i | 0.225 + 1.357i |
| 16.5 | 0.464 + 0.130i | 0.350 + 0.357i | 0.142 + 0.100i | 0.123 + 0.362i | 1.045 + 0.973i | 0.656 + 1.227i | 1.363 + 0.608i | 0.224 + 1.355i |
| 16.6 | 0.469 + 0.130i | 0.353 + 0.356i | 0.143 + 0.100i | 0.124 + 0.362i | 1.040 + 0.976i | 0.652 + 1.227i | 1.354 + 0.611i | 0.223 + 1.354i |
| 16.7 | 0.472 + 0.129i | 0.354 + 0.356i | 0.144 + 0.100i | 0.124 + 0.361i | 1.036 + 0.978i | 0.649 + 1.228i | 1.347 + 0.612i | 0.221 + 1.353i |
| 16.8 | 0.477 + 0.129i | 0.357 + 0.355i | 0.145 + 0.100i | 0.124 + 0.361i | 1.032 + 0.980i | 0.646 + 1.229i | 1.337 + 0.612i | 0.220 + 1.351i |
| 16.9 | 0.480 + 0.129i | 0.358 + 0.355i | 0.146 + 0.100i | 0.124 + 0.361i | 1.028 + 0.982i | 0.644 + 1.230i | 1.328 + 0.612i | 0.219 + 1.350i |
| 17 | 0.487 + 0.129i | 0.361 + 0.353i | 0.148 + 0.099i | 0.125 + 0.360i | 1.025 + 0.984i | 0.640 + 1.230i | 1.316 + 0.610i | 0.217 + 1.348i |
| 17.1 | 0.493 + 0.128i | 0.365 + 0.352i | 0.149 + 0.099i | 0.126 + 0.359i | 1.022 + 0.986i | 0.638 + 1.231i | 1.303 + 0.607i | 0.216 + 1.346i |

-continued

| 64 NUC | | | | | | | | |
|---|---|---|---|---|---|---|---|---|
| 17.2 | 0.496 + 0.128i | 0.367 + 0.352i | 0.150 + 0.100i | 0.126 + 0.359i | 1.019 + 0.988i | 0.636 + 1.233i | 1.294 + 0.604i | 0.215 + 1.345i |
| 17.3 | 0.499 + 0.128i | 0.369 + 0.352i | 0.151 + 0.100i | 0.126 + 0.360i | 1.016 + 0.990i | 0.634 + 1.233i | 1.287 + 0.602i | 0.215 + 1.344i |
| 17.4 | 0.504 + 0.129i | 0.372 + 0.351i | 0.152 + 0.100i | 0.127 + 0.359i | 1.015 + 0.993i | 0.632 + 1.236i | 1.275 + 0.598i | 0.213 + 1.342i |
| 17.5 | 0.507 + 0.129i | 0.374 + 0.351i | 0.153 + 0.101i | 0.128 + 0.361i | 1.014 + 0.995i | 0.630 + 1.236i | 1.268 + 0.595i | 0.213 + 1.341i |
| 17.6 | 0.510 + 0.130i | 0.377 + 0.351i | 0.154 + 0.102i | 0.128 + 0.362i | 1.013 + 0.998i | 0.629 + 1.238i | 1.258 + 0.592i | 0.212 + 1.339i |
| 17.7 | 0.513 + 0.130i | 0.379 + 0.351i | 0.155 + 0.103i | 0.129 + 0.363i | 1.012 + 0.999i | 0.628 + 1.239i | 1.252 + 0.589i | 0.211 + 1.339i |
| 17.8 | 0.516 + 0.131i | 0.382 + 0.351i | 0.156 + 0.104i | 0.129 + 0.364i | 1.011 + 1.002i | 0.627 + 1.240i | 1.244 + 0.587i | 0.211 + 1.338i |
| 17.9 | 0.518 + 0.131i | 0.383 + 0.351i | 0.156 + 0.105i | 0.129 + 0.365i | 1.010 + 1.003i | 0.625 + 1.241i | 1.238 + 0.585i | 0.210 + 1.338i |
| 18 | 0.519 + 0.131i | 0.384 + 0.352i | 0.157 + 0.106i | 0.129 + 0.368i | 1.008 + 1.004i | 0.624 + 1.243i | 1.233 + 0.583i | 0.209 + 1.337i |
| 18.1 | 0.521 + 0.131i | 0.386 + 0.354i | 0.157 + 0.107i | 0.129 + 0.369i | 1.007 + 1.006i | 0.624 + 1.244i | 1.228 + 0.581i | 0.209 + 1.336i |
| 18.2 | 0.522 + 0.132i | 0.387 + 0.354i | 0.158 + 0.108i | 0.129 + 0.371i | 1.005 + 1.008i | 0.622 + 1.246i | 1.223 + 0.579i | 0.209 + 1.336i |
| 18.3 | 0.523 + 0.132i | 0.389 + 0.355i | 0.158 + 0.110i | 0.130 + 0.374i | 1.004 + 1.009i | 0.621 + 1.246i | 1.218 + 0.576i | 0.208 + 1.336i |
| 18.4 | 0.524 + 0.132i | 0.390 + 0.356i | 0.158 + 0.111i | 0.130 + 0.376i | 1.002 + 1.011i | 0.620 + 1.247i | 1.214 + 0.575i | 0.208 + 1.336i |
| 18.5 | 0.525 + 0.132i | 0.390 + 0.357i | 0.158 + 0.113i | 0.130 + 0.379i | 0.999 + 1.012i | 0.618 + 1.248i | 1.210 + 0.572i | 0.207 + 1.337i |
| 18.6 | 0.525 + 0.132i | 0.391 + 0.358i | 0.158 + 0.114i | 0.130 + 0.381i | 0.997 + 1.014i | 0.616 + 1.250i | 1.207 + 0.571i | 0.206 + 1.337i |
| 18.7 | 0.526 + 0.132i | 0.392 + 0.359i | 0.159 + 0.115i | 0.130 + 0.383i | 0.993 + 1.017i | 0.614 + 1.251i | 1.203 + 0.569i | 0.206 + 1.337i |
| 18.8 | 0.527 + 0.133i | 0.392 + 0.360i | 0.159 + 0.116i | 0.130 + 0.385i | 0.989 + 1.019i | 0.612 + 1.253i | 1.198 + 0.567i | 0.204 + 1.337i |
| 18.9 | 0.529 + 0.133i | 0.393 + 0.360i | 0.159 + 0.117i | 0.130 + 0.388i | 0.985 + 1.021i | 0.608 + 1.255i | 1.196 + 0.565i | 0.204 + 1.337i |
| 19 | 0.528 + 0.133i | 0.394 + 0.362i | 0.159 + 0.119i | 0.131 + 0.390i | 0.980 + 1.025i | 0.605 + 1.257i | 1.193 + 0.563i | 0.203 + 1.338i |
| 19.1 | 0.529 + 0.133i | 0.395 + 0.363i | 0.160 + 0.119i | 0.131 + 0.392i | 0.976 + 1.028i | 0.602 + 1.259i | 1.190 + 0.561i | 0.201 + 1.338i |
| 19.2 | 0.530 + 0.134i | 0.395 + 0.364i | 0.160 + 0.121i | 0.131 + 0.394i | 0.970 + 1.033i | 0.597 + 1.260i | 1.187 + 0.558i | 0.200 + 1.339i |
| 19.3 | 0.531 + 0.134i | 0.396 + 0.365i | 0.160 + 0.122i | 0.131 + 0.396i | 0.962 + 1.037i | 0.592 + 1.263i | 1.184 + 0.556i | 0.198 + 1.339i |
| 19.4 | 0.532 + 0.134i | 0.396 + 0.365i | 0.160 + 0.122i | 0.131 + 0.398i | 0.956 + 1.042i | 0.587 + 1.264i | 1.182 + 0.553i | 0.196 + 1.340i |
| 19.5 | 0.534 + 0.134i | 0.397 + 0.365i | 0.160 + 0.123i | 0.131 + 0.399i | 0.949 + 1.046i | 0.583 + 1.265i | 1.179 + 0.551i | 0.194 + 1.341i |
| 19.6 | 0.534 + 0.134i | 0.397 + 0.366i | 0.161 + 0.125i | 0.131 + 0.403i | 0.942 + 1.051i | 0.578 + 1.267i | 1.177 + 0.548i | 0.193 + 1.342i |
| 19.7 | 0.535 + 0.135i | 0.398 + 0.367i | 0.161 + 0.125i | 0.132 + 0.404i | 0.935 + 1.057i | 0.572 + 1.267i | 1.174 + 0.545i | 0.191 + 1.342i |
| 19.8 | 0.535 + 0.135i | 0.398 + 0.368i | 0.161 + 0.126i | 0.132 + 0.406i | 0.930 + 1.060i | 0.569 + 1.269i | 1.171 + 0.541i | 0.191 + 1.344i |
| 19.9 | 0.536 + 0.135i | 0.399 + 0.368i | 0.161 + 0.128i | 0.132 + 0.408i | 0.923 + 1.064i | 0.564 + 1.270i | 1.168 + 0.539i | 0.189 + 1.345i |
| 20 | 0.537 + 0.135i | 0.399 + 0.368i | 0.161 + 0.128i | 0.132 + 0.410i | 0.919 + 1.066i | 0.562 + 1.270i | 1.165 + 0.536i | 0.188 + 1.346i |

| 256NUC | | | | | | | | |
|---|---|---|---|---|---|---|---|---|
| | Normalized values | | | | | | | |
| SNR | a1 | a2 | a3 | a4 | a5 | a6 | a7 | a8 |
| 10 | 1.467 + 0.993i | 1.751 + 0.343i | 0.887 + 0.534i | 1.003 + 0.243i | 1.216 + 0.823i | 1.435 + 0.289i | 0.903 + 0.552i | 1.025 + 0.246i |
| 10.1 | 1.468 + 0.993i | 1.753 + 0.345i | 0.883 + 0.533i | 1.000 + 0.241i | 1.215 + 0.823i | 1.435 + 0.289i | 0.900 + 0.552i | 1.023 + 0.244i |
| 10.2 | 1.472 + 0.994i | 1.754 + 0.345i | 0.879 + 0.533i | 0.997 + 0.240i | 1.214 + 0.823i | 1.434 + 0.287i | 0.897 + 0.552i | 1.021 + 0.243i |
| 10.3 | 1.475 + 0.995i | 1.757 + 0.346i | 0.876 + 0.533i | 0.994 + 0.238i | 1.213 + 0.822i | 1.434 + 0.287i | 0.894 + 0.552i | 1.019 + 0.241i |
| 10.4 | 1.477 + 0.996i | 1.759 + 0.346i | 0.873 + 0.533i | 0.992 + 0.236i | 1.211 + 0.822i | 1.434 + 0.286i | 0.891 + 0.553i | 1.017 + 0.239i |
| 10.5 | 1.481 + 0.997i | 1.760 + 0.347i | 0.870 + 0.532i | 0.990 + 0.235i | 1.209 + 0.821i | 1.433 + 0.286i | 0.889 + 0.553i | 1.015 + 0.237i |
| 10.6 | 1.484 + 0.999i | 1.762 + 0.347i | 0.867 + 0.532i | 0.988 + 0.233i | 1.208 + 0.821i | 1.432 + 0.285i | 0.886 + 0.554i | 1.014 + 0.235i |
| 10.7 | 1.486 + 1.001i | 1.764 + 0.348i | 0.864 + 0.533i | 0.986 + 0.231i | 1.206 + 0.821i | 1.431 + 0.284i | 0.883 + 0.555i | 1.013 + 0.233i |
| 10.8 | 1.488 + 1.002i | 1.765 + 0.349i | 0.862 + 0.533i | 0.985 + 0.229i | 1.204 + 0.820i | 1.431 + 0.284i | 0.881 + 0.555i | 1.012 + 0.231i |
| 10.9 | 1.491 + 1.003i | 1.767 + 0.349i | 0.859 + 0.533i | 0.983 + 0.227i | 1.202 + 0.819i | 1.429 + 0.283i | 0.879 + 0.556i | 1.011 + 0.229i |
| 11 | 1.494 + 1.005i | 1.768 + 0.349i | 0.857 + 0.535i | 0.982 + 0.225i | 1.200 + 0.819i | 1.429 + 0.282i | 0.876 + 0.557i | 1.010 + 0.227i |
| 11.1 | 1.495 + 1.006i | 1.770 + 0.350i | 0.855 + 0.534i | 0.981 + 0.223i | 1.198 + 0.819i | 1.428 + 0.280i | 0.874 + 0.558i | 1.009 + 0.225i |
| 11.2 | 1.497 + 1.007i | 1.771 + 0.350i | 0.853 + 0.536i | 0.980 + 0.221i | 1.195 + 0.820i | 1.427 + 0.277i | 0.873 + 0.560i | 1.009 + 0.222i |
| 11.3 | 1.498 + 1.009i | 1.772 + 0.351i | 0.850 + 0.536i | 0.979 + 0.219i | 1.187 + 0.826i | 1.427 + 0.268i | 0.869 + 0.562i | 1.009 + 0.218i |
| 11.4 | 1.499 + 1.012i | 1.775 + 0.353i | 0.848 + 0.537i | 0.978 + 0.218i | 1.174 + 0.838i | 1.428 + 0.250i | 0.865 + 0.566i | 1.009 + 0.213i |
| 11.5 | 1.501 + 1.016i | 1.778 + 0.354i | 0.846 + 0.536i | 0.976 + 0.216i | 1.162 + 0.850i | 1.429 + 0.233i | 0.862 + 0.569i | 1.009 + 0.208i |
| 11.6 | 1.503 + 1.020i | 1.782 + 0.355i | 0.843 + 0.535i | 0.975 + 0.214i | 1.152 + 0.859i | 1.430 + 0.220i | 0.859 + 0.572i | 1.009 + 0.204i |
| 11.7 | 1.504 + 1.023i | 1.785 + 0.356i | 0.841 + 0.536i | 0.973 + 0.213i | 1.144 + 0.867i | 1.431 + 0.209i | 0.856 + 0.574i | 1.008 + 0.200i |
| 11.8 | 1.505 + 1.028i | 1.789 + 0.357i | 0.839 + 0.535i | 0.971 + 0.211i | 1.137 + 0.872i | 1.432 + 0.199i | 0.853 + 0.576i | 1.008 + 0.196i |
| 11.9 | 1.506 + 1.032i | 1.792 + 0.357i | 0.837 + 0.534i | 0.969 + 0.210i | 1.131 + 0.878i | 1.432 + 0.191i | 0.851 + 0.578i | 1.008 + 0.193i |
| 12 | 1.507 + 1.035i | 1.795 + 0.357i | 0.834 + 0.534i | 0.968 + 0.208i | 1.126 + 0.883i | 1.432 + 0.183i | 0.848 + 0.579i | 1.008 + 0.190i |
| 12.1 | 1.507 + 1.040i | 1.798 + 0.358i | 0.833 + 0.534i | 0.966 + 0.206i | 1.121 + 0.888i | 1.433 + 0.176i | 0.846 + 0.581i | 1.008 + 0.187i |
| 12.2 | 1.507 + 1.043i | 1.800 + 0.358i | 0.831 + 0.534i | 0.965 + 0.205i | 1.117 + 0.892i | 1.434 + 0.171i | 0.844 + 0.581i | 1.008 + 0.185i |
| 12.3 | 1.507 + 1.047i | 1.803 + 0.357i | 0.829 + 0.534i | 0.965 + 0.204i | 1.113 + 0.896i | 1.434 + 0.165i | 0.843 + 0.583i | 1.008 + 0.183i |
| 12.4 | 1.506 + 1.052i | 1.805 + 0.358i | 0.827 + 0.534i | 0.964 + 0.202i | 1.109 + 0.900i | 1.436 + 0.160i | 0.841 + 0.584i | 1.009 + 0.180i |
| 12.5 | 1.505 + 1.057i | 1.808 + 0.355i | 0.826 + 0.535i | 0.963 + 0.201i | 1.105 + 0.903i | 1.434 + 0.156i | 0.840 + 0.585i | 1.009 + 0.179i |
| 12.6 | 1.502 + 1.063i | 1.810 + 0.352i | 0.825 + 0.536i | 0.963 + 0.200i | 1.101 + 0.906i | 1.434 + 0.152i | 0.839 + 0.587i | 1.011 + 0.177i |
| 12.7 | 1.499 + 1.070i | 1.812 + 0.349i | 0.823 + 0.536i | 0.963 + 0.199i | 1.098 + 0.910i | 1.434 + 0.148i | 0.838 + 0.588i | 1.012 + 0.176i |
| 12.8 | 1.342 + 1.283i | 1.791 + 0.241i | 0.814 + 0.553i | 0.982 + 0.199i | 1.083 + 0.931i | 1.409 + 0.158i | 0.855 + 0.616i | 1.047 + 0.187i |
| 12.9 | 1.333 + 1.290i | 1.791 + 0.243i | 0.810 + 0.560i | 0.986 + 0.198i | 1.077 + 0.937i | 1.413 + 0.155i | 0.850 + 0.622i | 1.051 + 0.185i |
| 13 | 1.323 + 1.296i | 1.791 + 0.245i | 0.804 + 0.567i | 0.991 + 0.196i | 1.070 + 0.944i | 1.418 + 0.151i | 0.844 + 0.628i | 1.056 + 0.183i |
| 13.1 | 1.316 + 1.299i | 1.791 + 0.246i | 0.800 + 0.571i | 0.994 + 0.194i | 1.065 + 0.947i | 1.421 + 0.149i | 0.840 + 0.632i | 1.060 + 0.181i |
| 13.2 | 1.308 + 1.303i | 1.791 + 0.249i | 0.795 + 0.576i | 0.999 + 0.192i | 1.060 + 0.951i | 1.424 + 0.146i | 0.835 + 0.637i | 1.065 + 0.178i |
| 13.3 | 1.304 + 1.304i | 1.790 + 0.249i | 0.792 + 0.579i | 1.001 + 0.189i | 1.058 + 0.952i | 1.425 + 0.144i | 0.833 + 0.639i | 1.067 + 0.176i |
| 13.4 | 1.298 + 1.307i | 1.789 + 0.250i | 0.788 + 0.583i | 1.004 + 0.187i | 1.054 + 0.955i | 1.426 + 0.142i | 0.829 + 0.642i | 1.072 + 0.174i |
| 13.5 | 1.290 + 1.310i | 1.788 + 0.251i | 0.784 + 0.587i | 1.008 + 0.184i | 1.050 + 0.958i | 1.427 + 0.140i | 0.825 + 0.646i | 1.076 + 0.172i |
| 13.6 | 1.285 + 1.312i | 1.787 + 0.251i | 0.781 + 0.589i | 1.011 + 0.182i | 1.047 + 0.959i | 1.428 + 0.139i | 0.822 + 0.648i | 1.080 + 0.170i |
| 13.7 | 1.151 + 1.337i | 1.759 + 0.218i | 0.766 + 0.621i | 1.040 + 0.173i | 0.999 + 0.966i | 1.434 + 0.173i | 0.811 + 0.676i | 1.122 + 0.179i |

-continued

| 256NUC | | | | | | | | |
|---|---|---|---|---|---|---|---|---|
| 13.8 | 1.147 + 1.339i | 1.759 + 0.218i | 0.763 + 0.623i | 1.042 + 0.171i | 0.996 + 0.969i | 1.435 + 0.172i | 0.808 + 0.679i | 1.124 + 0.176i |
| 13.9 | 1.142 + 1.340i | 1.759 + 0.219i | 0.761 + 0.627i | 1.046 + 0.169i | 0.991 + 0.972i | 1.436 + 0.173i | 0.806 + 0.684i | 1.129 + 0.174i |
| 14 | 1.139 + 1.341i | 1.760 + 0.220i | 0.759 + 0.629i | 1.048 + 0.168i | 0.988 + 0.975i | 1.436 + 0.172i | 0.803 + 0.687i | 1.132 + 0.171i |
| 14.1 | 1.137 + 1.343i | 1.760 + 0.221i | 0.757 + 0.631i | 1.050 + 0.166i | 0.985 + 0.977i | 1.437 + 0.172i | 0.801 + 0.690i | 1.135 + 0.169i |
| 14.2 | 1.134 + 1.344i | 1.759 + 0.221i | 0.755 + 0.635i | 1.052 + 0.164i | 0.982 + 0.979i | 1.437 + 0.172i | 0.799 + 0.694i | 1.138 + 0.166i |
| 14.3 | 1.132 + 1.345i | 1.760 + 0.221i | 0.753 + 0.636i | 1.054 + 0.162i | 0.979 + 0.981i | 1.437 + 0.173i | 0.797 + 0.697i | 1.141 + 0.165i |
| 14.4 | 1.130 + 1.345i | 1.760 + 0.222i | 0.752 + 0.639i | 1.056 + 0.161i | 0.976 + 0.982i | 1.438 + 0.174i | 0.795 + 0.701i | 1.144 + 0.162i |
| 14.5 | 1.128 + 1.346i | 1.759 + 0.222i | 0.750 + 0.640i | 1.057 + 0.159i | 0.974 + 0.984i | 1.438 + 0.174i | 0.794 + 0.704i | 1.146 + 0.160i |
| 14.6 | 1.127 + 1.346i | 1.759 + 0.222i | 0.749 + 0.643i | 1.059 + 0.158i | 0.971 + 0.985i | 1.438 + 0.175i | 0.792 + 0.707i | 1.149 + 0.159i |
| 14.7 | 1.125 + 1.347i | 1.759 + 0.222i | 0.747 + 0.646i | 1.061 + 0.156i | 0.968 + 0.987i | 1.438 + 0.175i | 0.790 + 0.711i | 1.151 + 0.157i |
| 14.8 | 1.124 + 1.347i | 1.759 + 0.222i | 0.746 + 0.648i | 1.063 + 0.155i | 0.966 + 0.988i | 1.439 + 0.177i | 0.789 + 0.714i | 1.154 + 0.155i |
| 14.9 | 1.123 + 1.346i | 1.759 + 0.223i | 0.745 + 0.649i | 1.064 + 0.153i | 0.964 + 0.989i | 1.439 + 0.177i | 0.788 + 0.716i | 1.156 + 0.154i |
| 15 | 1.123 + 1.346i | 1.758 + 0.222i | 0.744 + 0.651i | 1.065 + 0.152i | 0.961 + 0.990i | 1.439 + 0.178i | 0.787 + 0.720i | 1.158 + 0.153i |
| 15.1 | 1.124 + 1.344i | 1.758 + 0.222i | 0.743 + 0.653i | 1.066 + 0.151i | 0.959 + 0.991i | 1.439 + 0.178i | 0.786 + 0.723i | 1.159 + 0.151i |
| 15.2 | 1.125 + 1.342i | 1.757 + 0.222i | 0.742 + 0.655i | 1.067 + 0.149i | 0.958 + 0.991i | 1.439 + 0.179i | 0.785 + 0.726i | 1.161 + 0.150i |
| 15.3 | 1.126 + 1.340i | 1.757 + 0.222i | 0.740 + 0.657i | 1.068 + 0.147i | 0.956 + 0.992i | 1.438 + 0.179i | 0.784 + 0.728i | 1.162 + 0.148i |
| 15.4 | 1.128 + 1.336i | 1.756 + 0.222i | 0.739 + 0.659i | 1.069 + 0.146i | 0.954 + 0.992i | 1.438 + 0.180i | 0.783 + 0.732i | 1.163 + 0.147i |
| 15.5 | 0.543 + 0.298i | 0.585 + 0.123i | 0.303 + 0.160i | 0.321 + 0.107i | 0.539 + 0.309i | 0.585 + 0.120i | 0.303 + 0.162i | 0.320 + 0.108i |
| 15.6 | 0.543 + 0.297i | 0.587 + 0.123i | 0.311 + 0.160i | 0.331 + 0.105i | 0.539 + 0.308i | 0.587 + 0.119i | 0.311 + 0.163i | 0.330 + 0.106i |
| 15.7 | 0.543 + 0.297i | 0.589 + 0.123i | 0.318 + 0.162i | 0.340 + 0.103i | 0.539 + 0.309i | 0.589 + 0.118i | 0.318 + 0.164i | 0.339 + 0.104i |
| 15.8 | 0.543 + 0.297i | 0.590 + 0.122i | 0.323 + 0.162i | 0.346 + 0.101i | 0.539 + 0.308i | 0.590 + 0.117i | 0.323 + 0.165i | 0.346 + 0.102i |
| 15.9 | 0.543 + 0.297i | 0.591 + 0.122i | 0.328 + 0.164i | 0.353 + 0.100i | 0.538 + 0.308i | 0.591 + 0.116i | 0.328 + 0.166i | 0.352 + 0.101i |
| 16 | 0.542 + 0.297i | 0.591 + 0.121i | 0.332 + 0.165i | 0.358 + 0.099i | 0.537 + 0.309i | 0.592 + 0.115i | 0.332 + 0.168i | 0.358 + 0.100i |
| 16.1 | 0.542 + 0.297i | 0.592 + 0.121i | 0.336 + 0.167i | 0.363 + 0.098i | 0.536 + 0.309i | 0.593 + 0.114i | 0.336 + 0.169i | 0.363 + 0.099i |
| 16.2 | 0.542 + 0.297i | 0.593 + 0.121i | 0.340 + 0.169i | 0.368 + 0.097i | 0.536 + 0.311i | 0.595 + 0.114i | 0.340 + 0.171i | 0.368 + 0.098i |
| 16.3 | 0.541 + 0.298i | 0.594 + 0.121i | 0.343 + 0.171i | 0.373 + 0.096i | 0.534 + 0.311i | 0.595 + 0.113i | 0.343 + 0.173i | 0.373 + 0.096i |
| 16.4 | 0.540 + 0.299i | 0.594 + 0.121i | 0.346 + 0.174i | 0.376 + 0.096i | 0.533 + 0.313i | 0.595 + 0.112i | 0.346 + 0.176i | 0.377 + 0.096i |
| 16.5 | 0.540 + 0.299i | 0.594 + 0.121i | 0.350 + 0.176i | 0.381 + 0.095i | 0.532 + 0.315i | 0.597 + 0.111i | 0.350 + 0.178i | 0.381 + 0.095i |
| 16.6 | 0.538 + 0.301i | 0.595 + 0.122i | 0.353 + 0.179i | 0.385 + 0.094i | 0.530 + 0.317i | 0.597 + 0.110i | 0.353 + 0.182i | 0.386 + 0.094i |
| 16.7 | 0.538 + 0.301i | 0.596 + 0.122i | 0.356 + 0.182i | 0.389 + 0.094i | 0.528 + 0.319i | 0.599 + 0.109i | 0.356 + 0.184i | 0.389 + 0.094i |
| 16.8 | 0.537 + 0.303i | 0.597 + 0.123i | 0.359 + 0.186i | 0.393 + 0.094i | 0.527 + 0.322i | 0.600 + 0.108i | 0.359 + 0.189i | 0.394 + 0.093i |
| 16.9 | 0.535 + 0.305i | 0.596 + 0.123i | 0.362 + 0.190i | 0.396 + 0.094i | 0.525 + 0.325i | 0.600 + 0.108i | 0.362 + 0.192i | 0.397 + 0.093i |
| 17 | 0.534 + 0.306i | 0.597 + 0.123i | 0.364 + 0.193i | 0.400 + 0.093i | 0.523 + 0.327i | 0.600 + 0.106i | 0.364 + 0.196i | 0.401 + 0.092i |
| 17.1 | 0.534 + 0.307i | 0.596 + 0.124i | 0.366 + 0.197i | 0.402 + 0.093i | 0.521 + 0.350i | 0.600 + 0.106i | 0.366 + 0.200i | 0.403 + 0.091i |
| 17.2 | 0.533 + 0.307i | 0.596 + 0.124i | 0.368 + 0.200i | 0.403 + 0.093i | 0.519 + 0.331i | 0.600 + 0.104i | 0.367 + 0.203i | 0.404 + 0.091i |
| 17.3 | 0.532 + 0.306i | 0.595 + 0.124i | 0.368 + 0.201i | 0.404 + 0.092i | 0.519 + 0.332i | 0.600 + 0.103i | 0.367 + 0.205i | 0.405 + 0.091i |
| 17.4 | 0.532 + 0.306i | 0.595 + 0.124i | 0.369 + 0.203i | 0.405 + 0.091i | 0.517 + 0.333i | 0.600 + 0.102i | 0.368 + 0.208i | 0.406 + 0.090i |
| 17.5 | 0.532 + 0.306i | 0.595 + 0.124i | 0.370 + 0.206i | 0.406 + 0.091i | 0.517 + 0.334i | 0.600 + 0.101i | 0.369 + 0.210i | 0.407 + 0.089i |
| 17.6 | 0.532 + 0.306i | 0.595 + 0.124i | 0.370 + 0.206i | 0.406 + 0.091i | 0.516 + 0.335i | 0.600 + 0.100i | 0.369 + 0.211i | 0.408 + 0.089i |
| 17.7 | 0.532 + 0.305i | 0.594 + 0.124i | 0.370 + 0.208i | 0.406 + 0.090i | 0.515 + 0.335i | 0.600 + 0.099i | 0.369 + 0.213i | 0.407 + 0.088i |
| 17.8 | 0.531 + 0.304i | 0.593 + 0.124i | 0.369 + 0.208i | 0.405 + 0.090i | 0.514 + 0.335i | 0.599 + 0.098i | 0.368 + 0.213i | 0.406 + 0.087i |
| 17.9 | 0.429 + 0.284i | 0.456 + 0.099i | 0.247 + 0.251i | 0.269 + 0.085i | 0.427 + 0.296i | 0.456 + 0.095i | 0.248 + 0.256i | 0.268 + 0.085i |
| 18 | 0.428 + 0.283i | 0.456 + 0.100i | 0.248 + 0.251i | 0.269 + 0.084i | 0.426 + 0.296i | 0.456 + 0.095i | 0.248 + 0.255i | 0.269 + 0.084i |
| 18.1 | 0.427 + 0.283i | 0.456 + 0.100i | 0.249 + 0.250i | 0.271 + 0.084i | 0.426 + 0.296i | 0.457 + 0.095i | 0.249 + 0.255i | 0.271 + 0.084i |
| 18.2 | 0.428 + 0.282i | 0.458 + 0.100i | 0.250 + 0.249i | 0.273 + 0.084i | 0.426 + 0.296i | 0.458 + 0.095i | 0.250 + 0.254i | 0.273 + 0.084i |
| 18.3 | 0.428 + 0.281i | 0.459 + 0.100i | 0.252 + 0.248i | 0.274 + 0.084i | 0.426 + 0.296i | 0.460 + 0.094i | 0.252 + 0.252i | 0.274 + 0.083i |
| 18.4 | 0.428 + 0.281i | 0.459 + 0.100i | 0.253 + 0.248i | 0.274 + 0.083i | 0.426 + 0.296i | 0.460 + 0.093i | 0.253 + 0.253i | 0.274 + 0.083i |
| 18.5 | 0.424 + 0.279i | 0.447 + 0.101i | 0.249 + 0.255i | 0.266 + 0.085i | 0.417 + 0.304i | 0.448 + 0.093i | 0.247 + 0.270i | 0.266 + 0.085i |
| 18.6 | 0.424 + 0.278i | 0.447 + 0.101i | 0.250 + 0.254i | 0.267 + 0.085i | 0.417 + 0.305i | 0.449 + 0.092i | 0.248 + 0.270i | 0.267 + 0.084i |
| 18.7 | 0.422 + 0.277i | 0.450 + 0.102i | 0.251 + 0.247i | 0.271 + 0.084i | 0.412 + 0.307i | 0.451 + 0.091i | 0.248 + 0.265i | 0.271 + 0.083i |
| 18.8 | 0.423 + 0.277i | 0.451 + 0.103i | 0.252 + 0.247i | 0.273 + 0.084i | 0.413 + 0.308i | 0.453 + 0.090i | 0.250 + 0.266i | 0.273 + 0.082i |
| 18.9 | 0.424 + 0.276i | 0.452 + 0.104i | 0.254 + 0.246i | 0.274 + 0.084i | 0.413 + 0.310i | 0.454 + 0.089i | 0.251 + 0.267i | 0.274 + 0.081i |
| 19 | 0.425 + 0.275i | 0.452 + 0.104i | 0.254 + 0.246i | 0.274 + 0.084i | 0.413 + 0.311i | 0.454 + 0.088i | 0.251 + 0.267i | 0.274 + 0.081i |
| 19.1 | 0.425 + 0.275i | 0.452 + 0.105i | 0.254 + 0.246i | 0.274 + 0.085i | 0.412 + 0.312i | 0.455 + 0.088i | 0.251 + 0.268i | 0.274 + 0.080i |
| 19.2 | 1.299 + 1.010i | 1.580 + 0.150i | 0.754 + 0.645i | 0.955 + 0.116i | 1.026 + 0.886i | 1.306 + 0.133i | 0.828 + 0.758i | 1.092 + 0.119i |
| 19.3 | 1.298 + 1.007i | 1.580 + 0.150i | 0.754 + 0.645i | 0.954 + 0.115i | 1.027 + 0.886i | 1.308 + 0.133i | 0.833 + 0.759i | 1.096 + 0.119i |
| 19.4 | 1.297 + 1.005i | 1.581 + 0.150i | 0.756 + 0.646i | 0.954 + 0.115i | 1.028 + 0.886i | 1.310 + 0.133i | 0.836 + 0.759i | 1.099 + 0.118i |
| 19.5 | 1.297 + 1.002i | 1.581 + 0.150i | 0.757 + 0.646i | 0.953 + 0.113i | 1.030 + 0.886i | 1.313 + 0.133i | 0.841 + 0.760i | 1.103 + 0.118i |
| 19.6 | 1.297 + 1.000i | 1.580 + 0.149i | 0.757 + 0.647i | 0.953 + 0.113i | 1.032 + 0.886i | 1.313 + 0.133i | 0.845 + 0.760i | 1.105 + 0.117i |
| 19.7 | 1.296 + 0.997i | 1.580 + 0.149i | 0.758 + 0.648i | 0.953 + 0.113i | 1.033 + 0.886i | 1.314 + 0.132i | 0.850 + 0.761i | 1.107 + 0.117i |
| 19.8 | 1.297 + 0.995i | 1.579 + 0.149i | 0.759 + 0.649i | 0.953 + 0.113i | 1.036 + 0.886i | 1.316 + 0.132i | 0.854 + 0.761i | 1.110 + 0.117i |
| 19.9 | 1.297 + 0.993i | 1.579 + 0.148i | 0.759 + 0.650i | 0.953 + 0.112i | 1.037 + 0.886i | 1.317 + 0.132i | 0.858 + 0.761i | 1.112 + 0.116i |
| 20 | 1.297 + 0.990i | 1.579 + 0.148i | 0.760 + 0.651i | 0.954 + 0.112i | 1.039 + 0.886i | 1.319 + 0.133i | 0.862 + 0.762i | 1.114 + 0.116i |
| 20.1 | 1.297 + 0.988i | 1.578 + 0.147i | 0.761 + 0.652i | 0.955 + 0.112i | 1.040 + 0.888i | 1.319 + 0.132i | 0.866 + 0.762i | 1.116 + 0.116i |
| 20.2 | 1.298 + 0.986i | 1.579 + 0.147i | 0.761 + 0.653i | 0.956 + 0.112i | 1.042 + 0.888i | 1.321 + 0.132i | 0.870 + 0.763i | 1.118 + 0.116i |
| 20.3 | 1.298 + 0.984i | 1.578 + 0.146i | 0.762 + 0.655i | 0.957 + 0.112i | 1.043 + 0.889i | 1.322 + 0.132i | 0.874 + 0.764i | 1.121 + 0.116i |
| 20.4 | 1.299 + 0.982i | 1.577 + 0.146i | 0.763 + 0.656i | 0.958 + 0.112i | 1.045 + 0.891i | 1.323 + 0.132i | 0.877 + 0.764i | 1.122 + 0.116i |
| 20.5 | 1.291 + 0.967i | 1.571 + 0.144i | 0.790 + 0.634i | 0.945 + 0.100i | 1.039 + 0.877i | 1.321 + 0.128i | 0.872 + 0.753i | 1.120 + 0.108i |
| 20.6 | 1.290 + 0.965i | 1.569 + 0.144i | 0.792 + 0.635i | 0.945 + 0.100i | 1.039 + 0.878i | 1.321 + 0.128i | 0.873 + 0.755i | 1.121 + 0.108i |
| 20.7 | 1.289 + 0.962i | 1.568 + 0.143i | 0.795 + 0.634i | 0.946 + 0.099i | 1.038 + 0.879i | 1.321 + 0.128i | 0.874 + 0.756i | 1.122 + 0.107i |
| 20.8 | 1.271 + 0.972i | 1.582 + 0.150i | 0.834 + 0.630i | 0.953 + 0.098i | 0.995 + 0.902i | 1.334 + 0.118i | 0.810 + 0.782i | 1.130 + 0.102i |
| 20.9 | 1.268 + 0.972i | 1.581 + 0.150i | 0.838 + 0.631i | 0.954 + 0.097i | 0.993 + 0.904i | 1.335 + 0.117i | 0.808 + 0.785i | 1.131 + 0.102i |
| 21 | 1.266 + 0.970i | 1.579 + 0.150i | 0.841 + 0.632i | 0.956 + 0.097i | 0.991 + 0.905i | 1.335 + 0.117i | 0.806 + 0.787i | 1.133 + 0.102i |
| 21.1 | 1.265 + 0.969i | 1.578 + 0.149i | 0.846 + 0.633i | 0.957 + 0.097i | 0.990 + 0.905i | 1.335 + 0.116i | 0.804 + 0.788i | 1.133 + 0.101i |
| 21.2 | 1.262 + 0.971i | 1.577 + 0.149i | 0.853 + 0.634i | 0.959 + 0.097i | 0.985 + 0.903i | 1.335 + 0.115i | 0.797 + 0.789i | 1.134 + 0.101i |
| 21.3 | 1.259 + 0.972i | 1.575 + 0.148i | 0.857 + 0.636i | 0.961 + 0.097i | 0.983 + 0.903i | 1.335 + 0.115i | 0.795 + 0.790i | 1.135 + 0.101i |
| 21.4 | 1.256 + 0.974i | 1.574 + 0.147i | 0.862 + 0.637i | 0.962 + 0.096i | 0.980 + 0.903i | 1.335 + 0.115i | 0.791 + 0.792i | 1.137 + 0.100i |

-continued

| 256NUC | | | | | | | | |
|---|---|---|---|---|---|---|---|---|
| 21.5 | 1.253 + 0.974i | 1.572 + 0.147i | 0.866 + 0.638i | 0.963 + 0.096i | 0.980 + 0.903i | 1.335 + 0.114i | 0.790 + 0.793i | 1.137 + 0.100i |
| 21.6 | 1.250 + 0.975i | 1.570 + 0.146i | 0.870 + 0.640i | 0.964 + 0.096i | 0.978 + 0.903i | 1.334 + 0.114i | 0.788 + 0.794i | 1.138 + 0.100i |
| 21.7 | 1.248 + 0.975i | 1.568 + 0.145i | 0.874 + 0.641i | 0.965 + 0.096i | 0.977 + 0.902i | 1.334 + 0.113i | 0.788 + 0.795i | 1.138 + 0.099i |
| 21.8 | 1.244 + 0.975i | 1.566 + 0.145i | 0.878 + 0.642i | 0.966 + 0.096i | 0.976 + 0.902i | 1.333 + 0.112i | 0.786 + 0.796i | 1.139 + 0.099i |
| 21.9 | 1.240 + 0.977i | 1.564 + 0.143i | 0.883 + 0.643i | 0.967 + 0.095i | 0.975 + 0.902i | 1.333 + 0.112i | 0.786 + 0.796i | 1.139 + 0.099i |
| 22 | 1.235 + 0.978i | 1.562 + 0.143i | 0.886 + 0.644i | 0.969 + 0.095i | 0.973 + 0.902i | 1.333 + 0.111i | 0.785 + 0.797i | 1.140 + 0.098i |
| 22.1 | 1.231 + 0.979i | 1.561 + 0.142i | 0.890 + 0.645i | 0.970 + 0.095i | 0.972 + 0.902i | 1.332 + 0.111i | 0.785 + 0.798i | 1.140 + 0.098i |
| 22.2 | 1.227 + 0.980i | 1.559 + 0.141i | 0.895 + 0.646i | 0.971 + 0.095i | 0.972 + 0.902i | 1.332 + 0.111i | 0.785 + 0.798i | 1.141 + 0.098i |
| 22.3 | 1.221 + 0.982i | 1.557 + 0.140i | 0.899 + 0.648i | 0.973 + 0.095i | 0.969 + 0.903i | 1.331 + 0.110i | 0.783 + 0.798i | 1.142 + 0.098i |
| 22.4 | 1.201 + 0.994i | 1.556 + 0.140i | 0.907 + 0.649i | 0.975 + 0.094i | 0.959 + 0.901i | 1.332 + 0.110i | 0.773 + 0.789i | 1.143 + 0.097i |
| 22.5 | 1.194 + 0.996i | 1.555 + 0.139i | 0.910 + 0.650i | 0.976 + 0.094i | 0.956 + 0.902i | 1.332 + 0.109i | 0.771 + 0.789i | 1.144 + 0.097i |
| 22.6 | 0.333 + 0.340i | 0.329 + 0.201i | 0.199 + 0.343i | 0.195 + 0.204i | 0.337 + 0.486i | 0.327 + 0.066i | 0.200 + 0.488i | 0.192 + 0.068i |
| 22.7 | 0.334 + 0.341i | 0.330 + 0.202i | 0.199 + 0.344i | 0.195 + 0.204i | 0.338 + 0.487i | 0.327 + 0.066i | 0.201 + 0.490i | 0.192 + 0.068i |
| 22.8 | 0.335 + 0.342i | 0.330 + 0.202i | 0.199 + 0.345i | 0.196 + 0.205i | 0.339 + 0.488i | 0.329 + 0.067i | 0.202 + 0.490i | 0.194 + 0.068i |
| 22.9 | 0.336 + 0.343i | 0.332 + 0.203i | 0.200 + 0.346i | 0.197 + 0.205i | 0.340 + 0.489i | 0.331 + 0.067i | 0.202 + 0.492i | 0.194 + 0.068i |
| 23 | 0.337 + 0.343i | 0.333 + 0.203i | 0.201 + 0.346i | 0.197 + 0.205i | 0.342 + 0.490i | 0.331 + 0.067i | 0.203 + 0.492i | 0.195 + 0.068i |
| 23.1 | 0.338 + 0.344i | 0.334 + 0.203i | 0.202 + 0.347i | 0.198 + 0.206i | 0.343 + 0.491i | 0.333 + 0.067i | 0.204 + 0.493i | 0.196 + 0.068i |
| 23.2 | 0.339 + 0.345i | 0.336 + 0.204i | 0.203 + 0.347i | 0.199 + 0.206i | 0.344 + 0.492i | 0.334 + 0.067i | 0.204 + 0.493i | 0.197 + 0.068i |
| 23.3 | 0.339 + 0.346i | 0.336 + 0.204i | 0.203 + 0.347i | 0.200 + 0.206i | 0.344 + 0.493i | 0.336 + 0.067i | 0.204 + 0.494i | 0.198 + 0.068i |
| 23.4 | 0.346 + 0.344i | 0.343 + 0.204i | 0.207 + 0.342i | 0.204 + 0.204i | 0.349 + 0.488i | 0.343 + 0.067i | 0.207 + 0.486i | 0.203 + 0.067i |
| 23.5 | 0.346 + 0.345i | 0.344 + 0.204i | 0.207 + 0.343i | 0.204 + 0.204i | 0.349 + 0.489i | 0.344 + 0.067i | 0.207 + 0.487i | 0.204 + 0.068i |
| 23.6 | 0.347 + 0.346i | 0.344 + 0.205i | 0.207 + 0.345i | 0.205 + 0.205i | 0.351 + 0.490i | 0.344 + 0.068i | 0.208 + 0.488i | 0.204 + 0.068i |
| 23.7 | 0.347 + 0.347i | 0.344 + 0.206i | 0.207 + 0.346i | 0.205 + 0.206i | 0.351 + 0.491i | 0.344 + 0.068i | 0.208 + 0.490i | 0.204 + 0.068i |
| 23.8 | 0.348 + 0.348i | 0.345 + 0.206i | 0.208 + 0.346i | 0.206 + 0.206i | 0.352 + 0.492i | 0.345 + 0.068i | 0.208 + 0.490i | 0.204 + 0.068i |
| 23.9 | 0.348 + 0.349i | 0.345 + 0.208i | 0.208 + 0.348i | 0.205 + 0.208i | 0.354 + 0.493i | 0.345 + 0.069i | 0.209 + 0.493i | 0.204 + 0.069i |
| 24 | 0.349 + 0.349i | 0.346 + 0.208i | 0.208 + 0.349i | 0.206 + 0.208i | 0.354 + 0.494i | 0.346 + 0.069i | 0.209 + 0.493i | 0.205 + 0.069i |
| 24.1 | 0.350 + 0.350i | 0.347 + 0.208i | 0.209 + 0.349i | 0.207 + 0.208i | 0.355 + 0.495i | 0.347 + 0.069i | 0.210 + 0.493i | 0.205 + 0.069i |
| 24.2 | 0.350 + 0.351i | 0.347 + 0.209i | 0.209 + 0.349i | 0.207 + 0.208i | 0.356 + 0.496i | 0.347 + 0.069i | 0.210 + 0.493i | 0.206 + 0.069i |
| 24.3 | 0.351 + 0.351i | 0.348 + 0.209i | 0.210 + 0.349i | 0.207 + 0.208i | 0.357 + 0.497i | 0.348 + 0.069i | 0.212 + 0.493i | 0.207 + 0.069i |
| 24.4 | 0.352 + 0.352i | 0.349 + 0.209i | 0.210 + 0.349i | 0.208 + 0.208i | 0.358 + 0.497i | 0.349 + 0.069i | 0.212 + 0.493i | 0.207 + 0.069i |
| 24.5 | 0.352 + 0.352i | 0.349 + 0.209i | 0.210 + 0.350i | 0.208 + 0.209i | 0.359 + 0.498i | 0.351 + 0.069i | 0.213 + 0.493i | 0.209 + 0.069i |
| 24.6 | 0.353 + 0.353i | 0.349 + 0.210i | 0.210 + 0.351i | 0.208 + 0.209i | 0.360 + 0.498i | 0.351 + 0.069i | 0.214 + 0.494i | 0.209 + 0.069i |
| 24.7 | 0.353 + 0.354i | 0.349 + 0.210i | 0.210 + 0.351i | 0.208 + 0.209i | 0.361 + 0.499i | 0.351 + 0.069i | 0.214 + 0.494i | 0.209 + 0.069i |
| 24.8 | 0.353 + 0.354i | 0.350 + 0.210i | 0.210 + 0.351i | 0.209 + 0.210i | 0.361 + 0.499i | 0.353 + 0.069i | 0.214 + 0.494i | 0.210 + 0.069i |
| 24.9 | 0.354 + 0.354i | 0.350 + 0.211i | 0.210 + 0.351i | 0.209 + 0.210i | 0.362 + 0.500i | 0.354 + 0.070i | 0.215 + 0.494i | 0.210 + 0.069i |
| 25 | 0.354 + 0.355i | 0.351 + 0.211i | 0.210 + 0.350i | 0.210 + 0.209i | 0.363 + 0.500i | 0.355 + 0.070i | 0.215 + 0.494i | 0.211 + 0.069i |

| | Normalized values | | | | | | | |
|---|---|---|---|---|---|---|---|---|
| SNR | a9 | a10 | a11 | a12 | a13 | a14 | a15 | a16 |
| 10 | 0.969 + 1.486i | 0.340 + 1.742i | 0.532 + 0.884i | 0.243 + 0.996i | 0.802 + 1.214i | 0.275 + 1.422i | 0.547 + 0.902i | 0.243 + 1.017i |
| 10.1 | 0.970 + 1.487i | 0.341 + 1.743i | 0.531 + 0.881i | 0.241 + 0.993i | 0.804 + 1.214i | 0.275 + 1.424i | 0.546 + 0.899i | 0.241 + 1.015i |
| 10.2 | 0.971 + 1.488i | 0.342 + 1.744i | 0.530 + 0.878i | 0.239 + 0.990i | 0.805 + 1.213i | 0.274 + 1.425i | 0.547 + 0.897i | 0.240 + 1.013i |
| 10.3 | 0.972 + 1.489i | 0.343 + 1.746i | 0.529 + 0.875i | 0.237 + 0.988i | 0.807 + 1.213i | 0.273 + 1.426i | 0.546 + 0.894i | 0.238 + 1.011i |
| 10.4 | 0.973 + 1.490i | 0.345 + 1.747i | 0.529 + 0.872i | 0.235 + 0.985i | 0.807 + 1.211i | 0.273 + 1.427i | 0.547 + 0.891i | 0.236 + 1.009i |
| 10.5 | 0.974 + 1.492i | 0.346 + 1.748i | 0.529 + 0.870i | 0.233 + 0.983i | 0.808 + 1.210i | 0.273 + 1.427i | 0.547 + 0.889i | 0.234 + 1.008i |
| 10.6 | 0.975 + 1.493i | 0.347 + 1.750i | 0.529 + 0.867i | 0.231 + 0.981i | 0.809 + 1.209i | 0.271 + 1.427i | 0.548 + 0.886i | 0.231 + 1.007i |
| 10.7 | 0.975 + 1.495i | 0.349 + 1.752i | 0.529 + 0.865i | 0.230 + 0.979i | 0.809 + 1.208i | 0.271 + 1.427i | 0.548 + 0.885i | 0.230 + 1.005i |
| 10.8 | 0.977 + 1.496i | 0.350 + 1.754i | 0.529 + 0.862i | 0.228 + 0.977i | 0.810 + 1.207i | 0.270 + 1.427i | 0.549 + 0.882i | 0.228 + 1.004i |
| 10.9 | 0.978 + 1.497i | 0.352 + 1.755i | 0.529 + 0.860i | 0.226 + 0.976i | 0.810 + 1.205i | 0.270 + 1.428i | 0.549 + 0.880i | 0.226 + 1.003i |
| 11 | 0.978 + 1.498i | 0.352 + 1.756i | 0.530 + 0.858i | 0.225 + 0.975i | 0.811 + 1.204i | 0.269 + 1.427i | 0.550 + 0.878i | 0.224 + 1.003i |
| 11.1 | 0.979 + 1.499i | 0.354 + 1.758i | 0.531 + 0.856i | 0.223 + 0.974i | 0.812 + 1.202i | 0.268 + 1.427i | 0.552 + 0.876i | 0.222 + 1.002i |
| 11.2 | 0.980 + 1.500i | 0.355 + 1.759i | 0.531 + 0.853i | 0.221 + 0.973i | 0.814 + 1.199i | 0.264 + 1.426i | 0.553 + 0.874i | 0.220 + 1.001i |
| 11.3 | 0.980 + 1.501i | 0.356 + 1.760i | 0.531 + 0.852i | 0.219 + 0.971i | 0.820 + 1.193i | 0.257 + 1.427i | 0.556 + 0.871i | 0.216 + 1.001i |
| 11.4 | 0.982 + 1.504i | 0.356 + 1.762i | 0.532 + 0.849i | 0.217 + 0.970i | 0.832 + 1.182i | 0.242 + 1.428i | 0.559 + 0.867i | 0.211 + 1.001i |
| 11.5 | 0.984 + 1.506i | 0.357 + 1.765i | 0.531 + 0.847i | 0.215 + 0.967i | 0.843 + 1.171i | 0.227 + 1.430i | 0.563 + 0.862i | 0.205 + 1.000i |
| 11.6 | 0.986 + 1.509i | 0.357 + 1.768i | 0.531 + 0.843i | 0.213 + 0.965i | 0.852 + 1.163i | 0.214 + 1.432i | 0.566 + 0.859i | 0.201 + 1.000i |
| 11.7 | 0.990 + 1.511i | 0.358 + 1.772i | 0.530 + 0.841i | 0.211 + 0.963i | 0.859 + 1.156i | 0.204 + 1.434i | 0.569 + 0.856i | 0.196 + 1.000i |
| 11.8 | 0.992 + 1.512i | 0.358 + 1.775i | 0.530 + 0.838i | 0.209 + 0.962i | 0.865 + 1.149i | 0.196 + 1.435i | 0.571 + 0.853i | 0.193 + 0.999i |
| 11.9 | 0.995 + 1.514i | 0.359 + 1.777i | 0.530 + 0.836i | 0.208 + 0.960i | 0.870 + 1.144i | 0.188 + 1.435i | 0.573 + 0.850i | 0.190 + 0.998i |
| 12 | 0.998 + 1.515i | 0.360 + 1.780i | 0.530 + 0.834i | 0.206 + 0.958i | 0.875 + 1.139i | 0.181 + 1.437i | 0.574 + 0.848i | 0.187 + 0.998i |
| 12.1 | 1.000 + 1.516i | 0.361 + 1.782i | 0.529 + 0.832i | 0.204 + 0.957i | 0.878 + 1.135i | 0.176 + 1.439i | 0.576 + 0.845i | 0.184 + 0.998i |
| 12.2 | 1.002 + 1.517i | 0.361 + 1.785i | 0.530 + 0.830i | 0.203 + 0.956i | 0.882 + 1.130i | 0.170 + 1.440i | 0.577 + 0.843i | 0.181 + 0.998i |
| 12.3 | 1.003 + 1.517i | 0.362 + 1.786i | 0.529 + 0.828i | 0.201 + 0.955i | 0.884 + 1.127i | 0.166 + 1.440i | 0.578 + 0.841i | 0.179 + 0.997i |
| 12.4 | 1.004 + 1.518i | 0.362 + 1.787i | 0.529 + 0.826i | 0.199 + 0.954i | 0.886 + 1.124i | 0.161 + 1.442i | 0.579 + 0.840i | 0.177 + 0.997i |
| 12.5 | 1.004 + 1.520i | 0.362 + 1.788i | 0.529 + 0.825i | 0.198 + 0.953i | 0.889 + 1.121i | 0.158 + 1.442i | 0.580 + 0.837i | 0.174 + 0.996i |
| 12.6 | 1.003 + 1.520i | 0.362 + 1.789i | 0.529 + 0.823i | 0.196 + 0.952i | 0.889 + 1.119i | 0.154 + 1.443i | 0.581 + 0.836i | 0.172 + 0.996i |
| 12.7 | 1.002 + 1.521i | 0.362 + 1.789i | 0.529 + 0.822i | 0.195 + 0.951i | 0.890 + 1.117i | 0.151 + 1.443i | 0.582 + 0.835i | 0.170 + 0.995i |
| 12.8 | 0.863 + 1.544i | 0.312 + 1.752i | 0.524 + 0.813i | 0.186 + 0.927i | 0.829 + 1.112i | 0.154 + 1.397i | 0.578 + 0.837i | 0.168 + 0.964i |
| 12.9 | 0.856 + 1.547i | 0.308 + 1.751i | 0.519 + 0.813i | 0.184 + 0.924i | 0.826 + 1.113i | 0.151 + 1.395i | 0.573 + 0.838i | 0.166 + 0.962i |
| 13 | 0.850 + 1.551i | 0.304 + 1.749i | 0.513 + 0.813i | 0.181 + 0.921i | 0.821 + 1.114i | 0.148 + 1.391i | 0.567 + 0.838i | 0.164 + 0.959i |
| 13.1 | 0.847 + 1.553i | 0.303 + 1.748i | 0.510 + 0.813i | 0.179 + 0.920i | 0.820 + 1.113i | 0.144 + 1.391i | 0.564 + 0.838i | 0.161 + 0.958i |
| 13.2 | 0.842 + 1.555i | 0.301 + 1.748i | 0.506 + 0.812i | 0.177 + 0.918i | 0.817 + 1.113i | 0.141 + 1.391i | 0.559 + 0.838i | 0.159 + 0.956i |
| 13.3 | 0.841 + 1.556i | 0.302 + 1.747i | 0.506 + 0.812i | 0.176 + 0.917i | 0.818 + 1.111i | 0.138 + 1.394i | 0.558 + 0.837i | 0.158 + 0.955i |
| 13.4 | 0.837 + 1.556i | 0.304 + 1.747i | 0.502 + 0.811i | 0.173 + 0.916i | 0.818 + 1.110i | 0.135 + 1.399i | 0.555 + 0.836i | 0.156 + 0.953i |
| 13.5 | 0.833 + 1.555i | 0.306 + 1.747i | 0.501 + 0.810i | 0.172 + 0.915i | 0.816 + 1.109i | 0.133 + 1.406i | 0.553 + 0.835i | 0.154 + 0.951i |

-continued

| 256NUC | | | | | | | | |
|---|---|---|---|---|---|---|---|---|
| 13.6 | 0.831 + 1.552i | 0.314 + 1.748i | 0.500 + 0.809i | 0.170 + 0.914i | 0.817 + 1.108i | 0.131 + 1.421i | 0.551 + 0.833i | 0.152 + 0.948i |
| 13.7 | 0.735 + 1.301i | 0.633 + 1.698i | 0.480 + 0.811i | 0.145 + 0.870i | 0.729 + 1.116i | 0.215 + 1.767i | 0.515 + 0.832i | 0.143 + 0.870i |
| 13.8 | 0.735 + 1.305i | 0.631 + 1.697i | 0.480 + 0.809i | 0.143 + 0.869i | 0.729 + 1.115i | 0.214 + 1.765i | 0.515 + 0.832i | 0.141 + 0.869i |
| 13.9 | 0.733 + 1.308i | 0.630 + 1.697i | 0.480 + 0.808i | 0.142 + 0.866i | 0.728 + 1.116i | 0.213 + 1.761i | 0.515 + 0.832i | 0.139 + 0.866i |
| 14 | 0.733 + 1.311i | 0.628 + 1.696i | 0.480 + 0.807i | 0.140 + 0.865i | 0.727 + 1.115i | 0.212 + 1.758i | 0.515 + 0.832i | 0.138 + 0.865i |
| 14.1 | 0.733 + 1.315i | 0.626 + 1.696i | 0.480 + 0.806i | 0.139 + 0.864i | 0.727 + 1.114i | 0.211 + 1.754i | 0.516 + 0.832i | 0.136 + 0.863i |
| 14.2 | 0.732 + 1.318i | 0.625 + 1.696i | 0.480 + 0.806i | 0.137 + 0.862i | 0.727 + 1.115i | 0.210 + 1.750i | 0.516 + 0.832i | 0.135 + 0.861i |
| 14.3 | 0.732 + 1.322i | 0.623 + 1.694i | 0.480 + 0.804i | 0.136 + 0.861i | 0.728 + 1.113i | 0.208 + 1.747i | 0.517 + 0.832i | 0.133 + 0.860i |
| 14.4 | 0.732 + 1.325i | 0.622 + 1.694i | 0.481 + 0.804i | 0.135 + 0.859i | 0.728 + 1.113i | 0.208 + 1.744i | 0.517 + 0.832i | 0.132 + 0.858i |
| 14.5 | 0.733 + 1.330i | 0.619 + 1.694i | 0.481 + 0.803i | 0.134 + 0.858i | 0.729 + 1.112i | 0.206 + 1.740i | 0.518 + 0.832i | 0.131 + 0.857i |
| 14.6 | 0.734 + 1.334i | 0.618 + 1.694i | 0.481 + 0.803i | 0.132 + 0.857i | 0.729 + 1.111i | 0.205 + 1.736i | 0.519 + 0.833i | 0.129 + 0.856i |
| 14.7 | 0.733 + 1.338i | 0.615 + 1.693i | 0.482 + 0.802i | 0.132 + 0.855i | 0.729 + 1.111i | 0.204 + 1.732i | 0.520 + 0.832i | 0.129 + 0.853i |
| 14.8 | 0.734 + 1.341i | 0.613 + 1.693i | 0.482 + 0.801i | 0.130 + 0.854i | 0.730 + 1.111i | 0.202 + 1.727i | 0.520 + 0.833i | 0.127 + 0.852i |
| 14.9 | 0.735 + 1.346i | 0.609 + 1.692i | 0.482 + 0.800i | 0.130 + 0.853i | 0.731 + 1.110i | 0.201 + 1.723i | 0.521 + 0.832i | 0.126 + 0.851i |
| 15 | 0.736 + 1.351i | 0.605 + 1.693i | 0.483 + 0.800i | 0.129 + 0.852i | 0.732 + 1.109i | 0.199 + 1.719i | 0.522 + 0.833i | 0.125 + 0.850i |
| 15.1 | 0.738 + 1.356i | 0.600 + 1.692i | 0.483 + 0.799i | 0.128 + 0.851i | 0.733 + 1.108i | 0.197 + 1.715i | 0.523 + 0.832i | 0.124 + 0.849i |
| 15.2 | 0.740 + 1.361i | 0.596 + 1.692i | 0.483 + 0.798i | 0.127 + 0.850i | 0.734 + 1.108i | 0.195 + 1.711i | 0.524 + 0.832i | 0.123 + 0.848i |
| 15.3 | 0.743 + 1.367i | 0.590 + 1.692i | 0.484 + 0.797i | 0.127 + 0.849i | 0.736 + 1.107i | 0.193 + 1.705i | 0.525 + 0.832i | 0.123 + 0.847i |
| 15.4 | 0.747 + 1.375i | 0.582 + 1.693i | 0.484 + 0.796i | 0.127 + 0.847i | 0.737 + 1.108i | 0.190 + 1.700i | 0.526 + 0.832i | 0.122 + 0.845i |
| 15.5 | 0.626 + 0.351i | 0.700 + 0.142i | 0.155 + 0.120i | 0.149 + 0.104i | 0.614 + 0.372i | 0.704 + 0.125i | 0.154 + 0.121i | 0.149 + 0.104i |
| 15.6 | 0.633 + 0.354i | 0.709 + 0.144i | 0.151 + 0.117i | 0.145 + 0.102i | 0.618 + 0.377i | 0.713 + 0.123i | 0.150 + 0.119i | 0.145 + 0.102i |
| 15.7 | 0.638 + 0.357i | 0.716 + 0.146i | 0.148 + 0.115i | 0.142 + 0.100i | 0.621 + 0.381i | 0.721 + 0.123i | 0.148 + 0.116i | 0.142 + 0.100i |
| 15.8 | 0.643 + 0.358i | 0.723 + 0.148i | 0.146 + 0.114i | 0.139 + 0.099i | 0.624 + 0.385i | 0.728 + 0.122i | 0.145 + 0.115i | 0.139 + 0.099i |
| 15.9 | 0.647 + 0.361i | 0.728 + 0.150i | 0.144 + 0.112i | 0.137 + 0.098i | 0.628 + 0.388i | 0.734 + 0.121i | 0.143 + 0.114i | 0.137 + 0.098i |
| 16 | 0.651 + 0.363i | 0.733 + 0.152i | 0.143 + 0.111i | 0.136 + 0.097i | 0.630 + 0.393i | 0.739 + 0.120i | 0.142 + 0.112i | 0.136 + 0.097i |
| 16.1 | 0.654 + 0.364i | 0.737 + 0.154i | 0.142 + 0.111i | 0.134 + 0.096i | 0.631 + 0.396i | 0.743 + 0.119i | 0.141 + 0.111i | 0.134 + 0.096i |
| 16.2 | 0.657 + 0.366i | 0.740 + 0.155i | 0.142 + 0.110i | 0.134 + 0.094i | 0.633 + 0.400i | 0.747 + 0.118i | 0.140 + 0.111i | 0.133 + 0.094i |
| 16.3 | 0.660 + 0.368i | 0.742 + 0.158i | 0.141 + 0.109i | 0.133 + 0.094i | 0.634 + 0.404i | 0.750 + 0.117i | 0.140 + 0.110i | 0.133 + 0.094i |
| 16.4 | 0.662 + 0.369i | 0.744 + 0.160i | 0.142 + 0.109i | 0.133 + 0.093i | 0.634 + 0.407i | 0.752 + 0.116i | 0.140 + 0.110i | 0.133 + 0.093i |
| 16.5 | 0.665 + 0.370i | 0.746 + 0.162i | 0.143 + 0.108i | 0.134 + 0.092i | 0.635 + 0.411i | 0.755 + 0.115i | 0.141 + 0.109i | 0.133 + 0.092i |
| 16.6 | 0.666 + 0.371i | 0.748 + 0.164i | 0.144 + 0.107i | 0.135 + 0.091i | 0.635 + 0.415i | 0.757 + 0.113i | 0.143 + 0.108i | 0.135 + 0.091i |
| 16.7 | 0.668 + 0.372i | 0.750 + 0.167i | 0.145 + 0.107i | 0.136 + 0.090i | 0.635 + 0.419i | 0.759 + 0.113i | 0.143 + 0.107i | 0.135 + 0.089i |
| 16.8 | 0.670 + 0.374i | 0.750 + 0.169i | 0.147 + 0.106i | 0.138 + 0.089i | 0.634 + 0.424i | 0.760 + 0.111i | 0.146 + 0.106i | 0.138 + 0.089i |
| 16.9 | 0.671 + 0.375i | 0.751 + 0.172i | 0.149 + 0.105i | 0.140 + 0.088i | 0.634 + 0.428i | 0.761 + 0.111i | 0.147 + 0.105i | 0.140 + 0.087i |
| 17 | 0.673 + 0.375i | 0.751 + 0.174i | 0.151 + 0.105i | 0.141 + 0.087i | 0.634 + 0.431i | 0.762 + 0.109i | 0.150 + 0.105i | 0.142 + 0.086i |
| 17.1 | 0.673 + 0.376i | 0.751 + 0.176i | 0.152 + 0.104i | 0.143 + 0.086i | 0.633 + 0.435i | 0.762 + 0.108i | 0.150 + 0.104i | 0.144 + 0.086i |
| 17.2 | 0.675 + 0.375i | 0.752 + 0.178i | 0.152 + 0.104i | 0.144 + 0.086i | 0.633 + 0.438i | 0.763 + 0.106i | 0.151 + 0.104i | 0.145 + 0.085i |
| 17.3 | 0.678 + 0.374i | 0.753 + 0.180i | 0.153 + 0.104i | 0.144 + 0.085i | 0.633 + 0.440i | 0.764 + 0.105i | 0.152 + 0.104i | 0.145 + 0.084i |
| 17.4 | 0.679 + 0.374i | 0.753 + 0.181i | 0.153 + 0.104i | 0.144 + 0.084i | 0.633 + 0.442i | 0.765 + 0.103i | 0.152 + 0.104i | 0.145 + 0.084i |
| 17.5 | 0.681 + 0.373i | 0.753 + 0.183i | 0.153 + 0.104i | 0.144 + 0.084i | 0.634 + 0.444i | 0.766 + 0.102i | 0.152 + 0.104i | 0.145 + 0.084i |
| 17.6 | 0.683 + 0.372i | 0.754 + 0.184i | 0.153 + 0.105i | 0.143 + 0.084i | 0.634 + 0.446i | 0.767 + 0.101i | 0.152 + 0.105i | 0.145 + 0.084i |
| 17.7 | 0.684 + 0.371i | 0.754 + 0.186i | 0.152 + 0.105i | 0.142 + 0.084i | 0.634 + 0.447i | 0.768 + 0.099i | 0.152 + 0.105i | 0.145 + 0.083i |
| 17.8 | 0.685 + 0.370i | 0.754 + 0.187i | 0.152 + 0.106i | 0.141 + 0.084i | 0.633 + 0.449i | 0.767 + 0.098i | 0.152 + 0.106i | 0.144 + 0.083i |
| 17.9 | 0.596 + 0.319i | 0.631 + 0.129i | 0.093 + 0.241i | 0.093 + 0.083i | 0.582 + 0.355i | 0.633 + 0.101i | 0.093 + 0.243i | 0.093 + 0.083i |
| 18 | 0.598 + 0.318i | 0.632 + 0.130i | 0.092 + 0.239i | 0.092 + 0.082i | 0.582 + 0.357i | 0.634 + 0.100i | 0.092 + 0.242i | 0.092 + 0.082i |
| 18.1 | 0.599 + 0.318i | 0.633 + 0.132i | 0.092 + 0.239i | 0.092 + 0.082i | 0.582 + 0.359i | 0.635 + 0.099i | 0.092 + 0.241i | 0.092 + 0.082i |
| 18.2 | 0.601 + 0.317i | 0.635 + 0.133i | 0.092 + 0.236i | 0.092 + 0.081i | 0.583 + 0.360i | 0.637 + 0.098i | 0.092 + 0.239i | 0.092 + 0.081i |
| 18.3 | 0.604 + 0.316i | 0.637 + 0.135i | 0.092 + 0.236i | 0.092 + 0.081i | 0.585 + 0.362i | 0.640 + 0.097i | 0.092 + 0.238i | 0.092 + 0.081i |
| 18.4 | 0.605 + 0.316i | 0.638 + 0.135i | 0.092 + 0.236i | 0.092 + 0.081i | 0.585 + 0.363i | 0.641 + 0.095i | 0.092 + 0.238i | 0.092 + 0.081i |
| 18.5 | 0.595 + 0.311i | 0.625 + 0.134i | 0.088 + 0.241i | 0.090 + 0.082i | 0.575 + 0.363i | 0.628 + 0.093i | 0.088 + 0.254i | 0.089 + 0.082i |
| 18.6 | 0.596 + 0.310i | 0.625 + 0.135i | 0.088 + 0.240i | 0.090 + 0.082i | 0.575 + 0.365i | 0.629 + 0.092i | 0.087 + 0.253i | 0.089 + 0.082i |
| 18.7 | 0.591 + 0.312i | 0.623 + 0.140i | 0.088 + 0.230i | 0.091 + 0.079i | 0.567 + 0.371i | 0.629 + 0.091i | 0.088 + 0.243i | 0.091 + 0.080i |
| 18.8 | 0.593 + 0.312i | 0.625 + 0.143i | 0.088 + 0.229i | 0.091 + 0.079i | 0.567 + 0.375i | 0.631 + 0.089i | 0.088 + 0.243i | 0.091 + 0.079i |
| 18.9 | 0.594 + 0.312i | 0.626 + 0.145i | 0.088 + 0.229i | 0.091 + 0.079i | 0.568 + 0.378i | 0.632 + 0.088i | 0.088 + 0.243i | 0.091 + 0.079i |
| 19 | 0.595 + 0.311i | 0.627 + 0.148i | 0.088 + 0.229i | 0.091 + 0.079i | 0.568 + 0.380i | 0.633 + 0.086i | 0.088 + 0.243i | 0.091 + 0.078i |
| 19.1 | 0.596 + 0.311i | 0.627 + 0.149i | 0.088 + 0.229i | 0.091 + 0.079i | 0.567 + 0.381i | 0.634 + 0.085i | 0.087 + 0.244i | 0.091 + 0.078i |
| 19.2 | 0.788 + 1.453i | 0.470 + 1.586i | 0.394 + 0.861i | 0.227 + 0.909i | 0.998 + 1.199i | 0.155 + 1.639i | 0.554 + 0.823i | 0.086 + 0.933i |
| 19.3 | 0.785 + 1.450i | 0.469 + 1.582i | 0.394 + 0.861i | 0.229 + 0.909i | 1.001 + 1.199i | 0.155 + 1.634i | 0.553 + 0.821i | 0.085 + 0.934i |
| 19.4 | 0.784 + 1.447i | 0.469 + 1.579i | 0.393 + 0.861i | 0.230 + 0.909i | 1.002 + 1.199i | 0.155 + 1.631i | 0.553 + 0.819i | 0.085 + 0.934i |
| 19.5 | 0.783 + 1.443i | 0.469 + 1.575i | 0.392 + 0.861i | 0.231 + 0.909i | 1.004 + 1.199i | 0.155 + 1.628i | 0.552 + 0.816i | 0.085 + 0.935i |
| 19.6 | 0.782 + 1.440i | 0.470 + 1.571i | 0.391 + 0.861i | 0.232 + 0.910i | 1.006 + 1.198i | 0.155 + 1.626i | 0.551 + 0.815i | 0.084 + 0.935i |
| 19.7 | 0.781 + 1.436i | 0.470 + 1.568i | 0.391 + 0.861i | 0.232 + 0.910i | 1.008 + 1.197i | 0.156 + 1.623i | 0.550 + 0.812i | 0.084 + 0.936i |
| 19.8 | 0.781 + 1.432i | 0.470 + 1.565i | 0.391 + 0.861i | 0.233 + 0.910i | 1.009 + 1.196i | 0.156 + 1.619i | 0.548 + 0.810i | 0.084 + 0.937i |
| 19.9 | 0.781 + 1.429i | 0.470 + 1.561i | 0.390 + 0.861i | 0.234 + 0.910i | 1.011 + 1.195i | 0.156 + 1.617i | 0.548 + 0.809i | 0.083 + 0.937i |
| 20 | 0.781 + 1.425i | 0.470 + 1.558i | 0.390 + 0.861i | 0.235 + 0.911i | 1.013 + 1.193i | 0.156 + 1.614i | 0.547 + 0.807i | 0.083 + 0.937i |
| 20.1 | 0.781 + 1.422i | 0.470 + 1.554i | 0.390 + 0.861i | 0.235 + 0.910i | 1.015 + 1.192i | 0.156 + 1.611i | 0.546 + 0.806i | 0.083 + 0.938i |
| 20.2 | 0.780 + 1.418i | 0.471 + 1.550i | 0.390 + 0.860i | 0.236 + 0.910i | 1.016 + 1.191i | 0.156 + 1.607i | 0.545 + 0.804i | 0.083 + 0.937i |
| 20.3 | 0.779 + 1.415i | 0.470 + 1.547i | 0.390 + 0.861i | 0.236 + 0.909i | 1.016 + 1.190i | 0.156 + 1.604i | 0.545 + 0.802i | 0.083 + 0.937i |
| 20.4 | 0.779 + 1.411i | 0.471 + 1.543i | 0.390 + 0.860i | 0.237 + 0.909i | 1.017 + 1.189i | 0.157 + 1.601i | 0.544 + 0.801i | 0.083 + 0.936i |
| 20.5 | 0.779 + 1.404i | 0.467 + 1.531i | 0.418 + 0.861i | 0.253 + 0.914i | 1.022 + 1.180i | 0.156 + 1.588i | 0.588 + 0.795i | 0.086 + 0.945i |
| 20.6 | 0.779 + 1.402i | 0.466 + 1.528i | 0.420 + 0.862i | 0.253 + 0.914i | 1.023 + 1.179i | 0.155 + 1.584i | 0.591 + 0.794i | 0.086 + 0.945i |
| 20.7 | 0.778 + 1.399i | 0.466 + 1.525i | 0.421 + 0.862i | 0.254 + 0.915i | 1.024 + 1.178i | 0.156 + 1.580i | 0.593 + 0.792i | 0.086 + 0.945i |
| 20.8 | 0.751 + 1.414i | 0.441 + 1.525i | 0.414 + 0.856i | 0.248 + 0.902i | 1.002 + 1.190i | 0.145 + 1.565i | 0.597 + 0.798i | 0.084 + 0.929i |
| 20.9 | 0.748 + 1.412i | 0.439 + 1.522i | 0.414 + 0.856i | 0.248 + 0.902i | 1.001 + 1.190i | 0.145 + 1.561i | 0.596 + 0.797i | 0.084 + 0.927i |
| 21 | 0.747 + 1.410i | 0.438 + 1.519i | 0.415 + 0.856i | 0.248 + 0.901i | 1.000 + 1.188i | 0.144 + 1.558i | 0.596 + 0.797i | 0.084 + 0.927i |
| 21.1 | 0.745 + 1.408i | 0.436 + 1.516i | 0.415 + 0.856i | 0.248 + 0.901i | 0.999 + 1.187i | 0.144 + 1.554i | 0.596 + 0.797i | 0.084 + 0.926i |
| 21.2 | 0.744 + 1.404i | 0.435 + 1.513i | 0.413 + 0.856i | 0.247 + 0.900i | 0.996 + 1.184i | 0.144 + 1.551i | 0.593 + 0.797i | 0.084 + 0.925i |

-continued

| 256NUC | | | | | | | | |
|---|---|---|---|---|---|---|---|---|
| 21.3 | 0.742 + 1.401i | 0.433 + 1.510i | 0.414 + 0.856i | 0.247 + 0.900i | 0.994 + 1.182i | 0.143 + 1.547i | 0.592 + 0.797i | 0.084 + 0.923i |
| 21.4 | 0.740 + 1.399i | 0.432 + 1.508i | 0.413 + 0.856i | 0.247 + 0.899i | 0.992 + 1.181i | 0.143 + 1.543i | 0.591 + 0.797i | 0.084 + 0.922i |
| 21.5 | 0.738 + 1.396i | 0.430 + 1.504i | 0.414 + 0.856i | 0.247 + 0.899i | 0.991 + 1.179i | 0.142 + 1.540i | 0.591 + 0.797i | 0.083 + 0.922i |
| 21.6 | 0.736 + 1.393i | 0.429 + 1.501i | 0.413 + 0.856i | 0.247 + 0.899i | 0.989 + 1.178i | 0.143 + 1.537i | 0.590 + 0.797i | 0.083 + 0.921i |
| 21.7 | 0.735 + 1.390i | 0.428 + 1.499i | 0.413 + 0.857i | 0.247 + 0.899i | 0.988 + 1.176i | 0.142 + 1.533i | 0.589 + 0.797i | 0.083 + 0.921i |
| 21.8 | 0.733 + 1.388i | 0.427 + 1.496i | 0.413 + 0.857i | 0.246 + 0.899i | 0.986 + 1.174i | 0.142 + 1.531i | 0.589 + 0.797i | 0.083 + 0.920i |
| 21.9 | 0.731 + 1.384i | 0.426 + 1.493i | 0.413 + 0.858i | 0.247 + 0.899i | 0.984 + 1.174i | 0.142 + 1.528i | 0.590 + 0.796i | 0.083 + 0.921i |
| 22 | 0.729 + 1.382i | 0.425 + 1.490i | 0.414 + 0.858i | 0.247 + 0.899i | 0.982 + 1.172i | 0.142 + 1.524i | 0.590 + 0.796i | 0.083 + 0.920i |
| 22.1 | 0.728 + 1.379i | 0.424 + 1.488i | 0.414 + 0.858i | 0.247 + 0.899i | 0.980 + 1.171i | 0.142 + 1.522i | 0.590 + 0.796i | 0.083 + 0.920i |
| 22.2 | 0.726 + 1.376i | 0.423 + 1.484i | 0.414 + 0.858i | 0.247 + 0.898i | 0.978 + 1.171i | 0.141 + 1.517i | 0.590 + 0.796i | 0.083 + 0.918i |
| 22.3 | 0.723 + 1.373i | 0.422 + 1.481i | 0.414 + 0.859i | 0.247 + 0.898i | 0.974 + 1.171i | 0.141 + 1.515i | 0.590 + 0.795i | 0.083 + 0.919i |
| 22.4 | 0.718 + 1.370i | 0.419 + 1.477i | 0.410 + 0.859i | 0.245 + 0.896i | 0.962 + 1.178i | 0.140 + 1.510i | 0.583 + 0.800i | 0.082 + 0.915i |
| 22.5 | 0.716 + 1.367i | 0.419 + 1.475i | 0.411 + 0.859i | 0.245 + 0.896i | 0.959 + 1.179i | 0.140 + 1.507i | 0.582 + 0.801i | 0.082 + 0.916i |
| 22.6 | 0.473 + 0.337i | 0.470 + 0.198i | 0.065 + 0.344i | 0.065 + 0.206i | 0.478 + 0.484i | 0.468 + 0.065i | 0.066 + 0.489i | 0.063 + 0.069i |
| 22.7 | 0.474 + 0.338i | 0.471 + 0.199i | 0.065 + 0.345i | 0.064 + 0.206i | 0.479 + 0.485i | 0.469 + 0.065i | 0.066 + 0.490i | 0.063 + 0.069i |
| 22.8 | 0.474 + 0.339i | 0.472 + 0.199i | 0.065 + 0.346i | 0.065 + 0.207i | 0.480 + 0.487i | 0.470 + 0.065i | 0.066 + 0.490i | 0.064 + 0.069i |
| 22.9 | 0.476 + 0.341i | 0.474 + 0.200i | 0.066 + 0.346i | 0.065 + 0.207i | 0.481 + 0.489i | 0.473 + 0.066i | 0.066 + 0.492i | 0.064 + 0.069i |
| 23 | 0.477 + 0.341i | 0.476 + 0.200i | 0.066 + 0.347i | 0.065 + 0.207i | 0.483 + 0.490i | 0.474 + 0.066i | 0.067 + 0.492i | 0.064 + 0.069i |
| 23.1 | 0.478 + 0.342i | 0.477 + 0.201i | 0.067 + 0.347i | 0.066 + 0.208i | 0.484 + 0.491i | 0.476 + 0.066i | 0.067 + 0.492i | 0.065 + 0.069i |
| 23.2 | 0.479 + 0.344i | 0.478 + 0.202i | 0.067 + 0.347i | 0.066 + 0.208i | 0.485 + 0.492i | 0.477 + 0.066i | 0.067 + 0.492i | 0.065 + 0.069i |
| 23.3 | 0.479 + 0.344i | 0.479 + 0.203i | 0.067 + 0.347i | 0.066 + 0.207i | 0.486 + 0.493i | 0.479 + 0.067i | 0.067 + 0.492i | 0.066 + 0.069i |
| 23.4 | 0.489 + 0.347i | 0.487 + 0.206i | 0.069 + 0.342i | 0.067 + 0.204i | 0.495 + 0.493i | 0.487 + 0.069i | 0.068 + 0.484i | 0.067 + 0.068i |
| 23.5 | 0.489 + 0.348i | 0.488 + 0.207i | 0.069 + 0.343i | 0.067 + 0.204i | 0.496 + 0.494i | 0.488 + 0.069i | 0.068 + 0.486i | 0.068 + 0.068i |
| 23.6 | 0.490 + 0.349i | 0.488 + 0.207i | 0.069 + 0.344i | 0.067 + 0.205i | 0.497 + 0.496i | 0.488 + 0.069i | 0.068 + 0.487i | 0.068 + 0.068i |
| 23.7 | 0.491 + 0.350i | 0.489 + 0.208i | 0.069 + 0.345i | 0.067 + 0.206i | 0.498 + 0.497i | 0.489 + 0.069i | 0.068 + 0.489i | 0.068 + 0.069i |
| 23.8 | 0.492 + 0.350i | 0.490 + 0.208i | 0.069 + 0.346i | 0.067 + 0.206i | 0.499 + 0.498i | 0.490 + 0.069i | 0.068 + 0.490i | 0.068 + 0.069i |
| 23.9 | 0.492 + 0.352i | 0.490 + 0.209i | 0.069 + 0.348i | 0.067 + 0.208i | 0.501 + 0.499i | 0.490 + 0.070i | 0.069 + 0.493i | 0.068 + 0.069i |
| 24 | 0.493 + 0.352i | 0.490 + 0.209i | 0.069 + 0.349i | 0.067 + 0.208i | 0.502 + 0.500i | 0.491 + 0.070i | 0.069 + 0.493i | 0.068 + 0.069i |
| 24.1 | 0.493 + 0.353i | 0.490 + 0.210i | 0.070 + 0.349i | 0.068 + 0.208i | 0.503 + 0.501i | 0.492 + 0.070i | 0.069 + 0.494i | 0.068 + 0.070i |
| 24.2 | 0.493 + 0.354i | 0.490 + 0.210i | 0.070 + 0.349i | 0.068 + 0.208i | 0.504 + 0.502i | 0.492 + 0.070i | 0.069 + 0.494i | 0.069 + 0.069i |
| 24.3 | 0.495 + 0.356i | 0.491 + 0.212i | 0.070 + 0.350i | 0.068 + 0.209i | 0.505 + 0.505i | 0.494 + 0.070i | 0.070 + 0.494i | 0.069 + 0.070i |
| 24.4 | 0.495 + 0.357i | 0.492 + 0.212i | 0.070 + 0.350i | 0.068 + 0.209i | 0.506 + 0.506i | 0.495 + 0.070i | 0.070 + 0.495i | 0.069 + 0.070i |
| 24.5 | 0.496 + 0.358i | 0.492 + 0.213i | 0.070 + 0.351i | 0.068 + 0.209i | 0.507 + 0.508i | 0.496 + 0.070i | 0.070 + 0.496i | 0.070 + 0.070i |
| 24.6 | 0.497 + 0.359i | 0.492 + 0.213i | 0.070 + 0.352i | 0.068 + 0.210i | 0.509 + 0.509i | 0.497 + 0.071i | 0.071 + 0.497i | 0.070 + 0.070i |
| 24.7 | 0.497 + 0.359i | 0.492 + 0.213i | 0.070 + 0.353i | 0.068 + 0.210i | 0.509 + 0.509i | 0.498 + 0.071i | 0.071 + 0.498i | 0.070 + 0.070i |
| 24.8 | 0.498 + 0.360i | 0.493 + 0.214i | 0.070 + 0.353i | 0.069 + 0.210i | 0.510 + 0.510i | 0.499 + 0.071i | 0.071 + 0.498i | 0.070 + 0.070i |
| 24.9 | 0.498 + 0.360i | 0.493 + 0.214i | 0.070 + 0.354i | 0.069 + 0.210i | 0.511 + 0.511i | 0.501 + 0.071i | 0.071 + 0.500i | 0.070 + 0.070i |
| 25 | 0.499 + 0.360i | 0.494 + 0.214i | 0.070 + 0.355i | 0.069 + 0.211i | 0.512 + 0.511i | 0.502 + 0.071i | 0.071 + 0.501i | 0.071 + 0.070i |

| SNR | a17 | a18 | a19 | a20 | a21 | a22 | a23 | a24 |
|---|---|---|---|---|---|---|---|---|
| 10 | 1.215 + 0.820i | 1.435 + 0.288i | 0.903 + 0.548i | 1.025 + 0.244i | 1.151 + 0.775i | 1.360 + 0.272i | 0.917 + 0.564i | 1.047 + 0.245i |
| 10.1 | 1.214 + 0.820i | 1.435 + 0.287i | 0.899 + 0.548i | 1.023 + 0.242i | 1.151 + 0.776i | 1.362 + 0.270i | 0.914 + 0.565i | 1.046 + 0.243i |
| 10.2 | 1.214 + 0.820i | 1.434 + 0.287i | 0.896 + 0.548i | 1.020 + 0.241i | 1.151 + 0.778i | 1.363 + 0.269i | 0.912 + 0.566i | 1.044 + 0.242i |
| 10.3 | 1.213 + 0.819i | 1.434 + 0.287i | 0.894 + 0.549i | 1.018 + 0.239i | 1.150 + 0.779i | 1.364 + 0.268i | 0.910 + 0.566i | 1.043 + 0.240i |
| 10.4 | 1.212 + 0.819i | 1.434 + 0.287i | 0.891 + 0.549i | 1.017 + 0.237i | 1.149 + 0.780i | 1.365 + 0.268i | 0.908 + 0.568i | 1.042 + 0.238i |
| 10.5 | 1.211 + 0.819i | 1.433 + 0.287i | 0.889 + 0.550i | 1.015 + 0.235i | 1.149 + 0.781i | 1.365 + 0.267i | 0.906 + 0.569i | 1.041 + 0.236i |
| 10.6 | 1.210 + 0.818i | 1.432 + 0.287i | 0.886 + 0.550i | 1.014 + 0.234i | 1.149 + 0.781i | 1.366 + 0.266i | 0.905 + 0.570i | 1.041 + 0.235i |
| 10.7 | 1.209 + 0.817i | 1.431 + 0.287i | 0.884 + 0.551i | 1.013 + 0.232i | 1.148 + 0.782i | 1.366 + 0.266i | 0.903 + 0.571i | 1.040 + 0.233i |
| 10.8 | 1.208 + 0.816i | 1.431 + 0.288i | 0.882 + 0.552i | 1.012 + 0.230i | 1.148 + 0.783i | 1.367 + 0.266i | 0.901 + 0.572i | 1.040 + 0.231i |
| 10.9 | 1.207 + 0.815i | 1.431 + 0.288i | 0.880 + 0.552i | 1.010 + 0.228i | 1.147 + 0.783i | 1.367 + 0.266i | 0.899 + 0.573i | 1.039 + 0.230i |
| 11 | 1.207 + 0.814i | 1.429 + 0.290i | 0.878 + 0.553i | 1.010 + 0.227i | 1.147 + 0.784i | 1.367 + 0.266i | 0.898 + 0.574i | 1.038 + 0.228i |
| 11.1 | 1.207 + 0.812i | 1.428 + 0.291i | 0.876 + 0.553i | 1.009 + 0.225i | 1.147 + 0.784i | 1.368 + 0.266i | 0.896 + 0.575i | 1.038 + 0.226i |
| 11.2 | 1.208 + 0.809i | 1.428 + 0.295i | 0.874 + 0.553i | 1.008 + 0.224i | 1.147 + 0.784i | 1.368 + 0.266i | 0.895 + 0.576i | 1.038 + 0.225i |
| 11.3 | 1.214 + 0.803i | 1.427 + 0.304i | 0.873 + 0.553i | 1.006 + 0.224i | 1.146 + 0.784i | 1.368 + 0.266i | 0.893 + 0.577i | 1.038 + 0.223i |
| 11.4 | 1.225 + 0.791i | 1.426 + 0.321i | 0.873 + 0.550i | 1.005 + 0.226i | 1.145 + 0.784i | 1.368 + 0.266i | 0.892 + 0.578i | 1.037 + 0.222i |
| 11.5 | 1.237 + 0.779i | 1.426 + 0.338i | 0.873 + 0.547i | 1.002 + 0.229i | 1.144 + 0.785i | 1.367 + 0.265i | 0.890 + 0.578i | 1.037 + 0.221i |
| 11.6 | 1.246 + 0.769i | 1.425 + 0.352i | 0.872 + 0.544i | 1.000 + 0.229i | 1.143 + 0.785i | 1.367 + 0.264i | 0.889 + 0.578i | 1.036 + 0.219i |
| 11.7 | 1.254 + 0.761i | 1.425 + 0.363i | 0.872 + 0.542i | 0.998 + 0.230i | 1.142 + 0.784i | 1.366 + 0.263i | 0.887 + 0.578i | 1.035 + 0.219i |
| 11.8 | 1.261 + 0.754i | 1.425 + 0.373i | 0.871 + 0.540i | 0.997 + 0.231i | 1.141 + 0.784i | 1.365 + 0.262i | 0.886 + 0.578i | 1.035 + 0.217i |
| 11.9 | 1.267 + 0.747i | 1.425 + 0.383i | 0.870 + 0.538i | 0.995 + 0.231i | 1.140 + 0.783i | 1.364 + 0.262i | 0.885 + 0.578i | 1.034 + 0.216i |
| 12 | 1.272 + 0.742i | 1.425 + 0.391i | 0.869 + 0.537i | 0.993 + 0.231i | 1.139 + 0.782i | 1.363 + 0.262i | 0.883 + 0.578i | 1.034 + 0.215i |
| 12.1 | 1.277 + 0.737i | 1.425 + 0.399i | 0.869 + 0.535i | 0.992 + 0.231i | 1.138 + 0.782i | 1.362 + 0.262i | 0.882 + 0.577i | 1.033 + 0.214i |
| 12.2 | 1.281 + 0.732i | 1.425 + 0.406i | 0.868 + 0.534i | 0.991 + 0.231i | 1.138 + 0.781i | 1.362 + 0.262i | 0.881 + 0.577i | 1.033 + 0.214i |
| 12.3 | 1.286 + 0.729i | 1.426 + 0.413i | 0.867 + 0.533i | 0.990 + 0.231i | 1.137 + 0.781i | 1.361 + 0.262i | 0.880 + 0.577i | 1.033 + 0.213i |
| 12.4 | 1.289 + 0.725i | 1.426 + 0.420i | 0.866 + 0.533i | 0.990 + 0.232i | 1.136 + 0.781i | 1.360 + 0.263i | 0.879 + 0.578i | 1.033 + 0.213i |
| 12.5 | 1.294 + 0.722i | 1.428 + 0.425i | 0.866 + 0.532i | 0.989 + 0.231i | 1.137 + 0.780i | 1.359 + 0.263i | 0.879 + 0.577i | 1.034 + 0.213i |
| 12.6 | 1.299 + 0.721i | 1.430 + 0.432i | 0.865 + 0.531i | 0.988 + 0.281i | 1.136 + 0.780i | 1.358 + 0.265i | 0.878 + 0.578i | 1.034 + 0.212i |
| 12.7 | 1.304 + 0.720i | 1.432 + 0.439i | 0.865 + 0.531i | 0.988 + 0.232i | 1.136 + 0.780i | 1.358 + 0.266i | 0.878 + 0.578i | 1.035 + 0.213i |
| 12.8 | 1.525 + 0.847i | 1.492 + 0.474i | 0.843 + 0.539i | 0.990 + 0.243i | 1.174 + 0.800i | 1.353 + 0.353i | 0.891 + 0.593i | 1.052 + 0.250i |
| 12.9 | 1.527 + 0.854i | 1.488 + 0.482i | 0.840 + 0.544i | 0.993 + 0.248i | 1.171 + 0.804i | 1.352 + 0.366i | 0.889 + 0.598i | 1.054 + 0.256i |
| 13 | 1.528 + 0.863i | 1.483 + 0.491i | 0.837 + 0.550i | 0.997 + 0.254i | 1.167 + 0.807i | 1.350 + 0.382i | 0.885 + 0.603i | 1.057 + 0.264i |
| 13.1 | 1.529 + 0.869i | 1.481 + 0.498i | 0.835 + 0.551i | 0.999 + 0.258i | 1.165 + 0.808i | 1.349 + 0.394i | 0.884 + 0.605i | 1.059 + 0.269i |
| 13.2 | 1.529 + 0.877i | 1.478 + 0.506i | 0.832 + 0.555i | 1.002 + 0.264i | 1.161 + 0.811i | 1.347 + 0.407i | 0.881 + 0.608i | 1.061 + 0.277i |
| 13.3 | 1.532 + 0.881i | 1.478 + 0.509i | 0.830 + 0.556i | 1.002 + 0.266i | 1.161 + 0.810i | 1.345 + 0.415i | 0.881 + 0.608i | 1.062 + 0.281i |
| 13.4 | 1.532 + 0.886i | 1.477 + 0.514i | 0.828 + 0.558i | 1.004 + 0.271i | 1.159 + 0.811i | 1.343 + 0.424i | 0.879 + 0.610i | 1.064 + 0.289i |
| 13.5 | 1.533 + 0.893i | 1.478 + 0.520i | 0.826 + 0.560i | 1.006 + 0.276i | 1.158 + 0.812i | 1.341 + 0.435i | 0.878 + 0.611i | 1.066 + 0.296i |

-continued

256NUC

| | | | | | | | | |
|---|---|---|---|---|---|---|---|---|
| 13.6 | 1.533 + 0.898i | 1.480 + 0.524i | 0.825 + 0.560i | 1.006 + 0.279i | 1.157 + 0.811i | 1.338 + 0.442i | 0.877 + 0.611i | 1.067 + 0.302i |
| 13.7 | 1.459 + 1.021i | 1.628 + 0.627i | 0.817 + 0.576i | 1.009 + 0.293i | 1.160 + 0.818i | 1.348 + 0.506i | 0.882 + 0.621i | 1.086 + 0.345i |
| 13.8 | 1.458 + 1.024i | 1.629 + 0.630i | 0.817 + 0.577i | 1.010 + 0.298i | 1.160 + 0.818i | 1.346 + 0.511i | 0.883 + 0.622i | 1.087 + 0.351i |
| 13.9 | 1.456 + 1.029i | 1.631 + 0.634i | 0.817 + 0.577i | 1.011 + 0.303i | 1.160 + 0.820i | 1.344 + 0.516i | 0.883 + 0.623i | 1.089 + 0.357i |
| 14 | 1.454 + 1.032i | 1.631 + 0.637i | 0.818 + 0.577i | 1.011 + 0.308i | 1.160 + 0.821i | 1.343 + 0.519i | 0.884 + 0.623i | 1.090 + 0.363i |
| 14.1 | 1.452 + 1.034i | 1.632 + 0.640i | 0.819 + 0.577i | 1.012 + 0.312i | 1.159 + 0.821i | 1.342 + 0.522i | 0.885 + 0.623i | 1.091 + 0.367i |
| 14.2 | 1.451 + 1.035i | 1.634 + 0.641i | 0.820 + 0.577i | 1.012 + 0.317i | 1.160 + 0.821i | 1.341 + 0.524i | 0.887 + 0.624i | 1.092 + 0.372i |
| 14.3 | 1.449 + 1.036i | 1.635 + 0.643i | 0.821 + 0.576i | 1.012 + 0.320i | 1.160 + 0.821i | 1.340 + 0.526i | 0.889 + 0.624i | 1.092 + 0.376i |
| 14.4 | 1.447 + 1.038i | 1.635 + 0.645i | 0.823 + 0.576i | 1.012 + 0.324i | 1.160 + 0.822i | 1.339 + 0.528i | 0.890 + 0.624i | 1.093 + 0.380i |
| 14.5 | 1.446 + 1.039i | 1.637 + 0.646i | 0.824 + 0.576i | 1.012 + 0.327i | 1.160 + 0.822i | 1.338 + 0.529i | 0.892 + 0.625i | 1.093 + 0.384i |
| 14.6 | 1.444 + 1.039i | 1.637 + 0.647i | 0.825 + 0.575i | 1.012 + 0.331i | 1.160 + 0.822i | 1.337 + 0.531i | 0.895 + 0.625i | 1.093 + 0.388i |
| 14.7 | 1.441 + 1.040i | 1.637 + 0.649i | 0.828 + 0.575i | 1.012 + 0.334i | 1.160 + 0.822i | 1.337 + 0.532i | 0.897 + 0.625i | 1.094 + 0.390i |
| 14.8 | 1.440 + 1.040i | 1.638 + 0.650i | 0.829 + 0.574i | 1.011 + 0.336i | 1.160 + 0.822i | 1.336 + 0.532i | 0.900 + 0.625i | 1.094 + 0.393i |
| 14.9 | 1.438 + 1.039i | 1.638 + 0.650i | 0.832 + 0.573i | 1.011 + 0.339i | 1.161 + 0.821i | 1.336 + 0.533i | 0.903 + 0.624i | 1.094 + 0.395i |
| 15 | 1.436 + 1.038i | 1.639 + 0.651i | 0.833 + 0.572i | 1.011 + 0.341i | 1.161 + 0.821i | 1.336 + 0.533i | 0.905 + 0.624i | 1.094 + 0.397i |
| 15.1 | 1.435 + 1.037i | 1.638 + 0.651i | 0.836 + 0.571i | 1.010 + 0.343i | 1.161 + 0.820i | 1.336 + 0.533i | 0.908 + 0.624i | 1.095 + 0.400i |
| 15.2 | 1.433 + 1.035i | 1.639 + 0.651i | 0.838 + 0.570i | 1.010 + 0.345i | 1.161 + 0.818i | 1.336 + 0.531i | 0.912 + 0.624i | 1.094 + 0.400i |
| 15.3 | 1.432 + 1.032i | 1.638 + 0.650i | 0.840 + 0.569i | 1.009 + 0.346i | 1.161 + 0.817i | 1.336 + 0.530i | 0.916 + 0.624i | 1.094 + 0.402i |
| 15.4 | 1.431 + 1.029i | 1.638 + 0.649i | 0.843 + 0.568i | 1.008 + 0.348i | 1.162 + 0.816i | 1.335 + 0.529i | 0.919 + 0.623i | 1.094 + 0.403i |
| 15.5 | 0.386 + 0.558i | 0.177 + 0.685i | 0.215 + 0.383i | 0.134 + 0.431i | 0.402 + 0.536i | 0.140 + 0.698i | 0.217 + 0.380i | 0.131 + 0.430i |
| 15.6 | 0.385 + 0.554i | 0.177 + 0.680i | 0.220 + 0.382i | 0.136 + 0.431i | 0.402 + 0.532i | 0.139 + 0.693i | 0.222 + 0.378i | 0.131 + 0.430i |
| 15.7 | 0.384 + 0.550i | 0.176 + 0.675i | 0.223 + 0.379i | 0.136 + 0.431i | 0.402 + 0.528i | 0.138 + 0.687i | 0.226 + 0.376i | 0.132 + 0.430i |
| 15.8 | 0.384 + 0.546i | 0.176 + 0.671i | 0.227 + 0.378i | 0.137 + 0.431i | 0.402 + 0.524i | 0.137 + 0.683i | 0.230 + 0.375i | 0.132 + 0.431i |
| 15.9 | 0.383 + 0.543i | 0.176 + 0.666i | 0.231 + 0.377i | 0.138 + 0.432i | 0.402 + 0.521i | 0.136 + 0.679i | 0.234 + 0.373i | 0.132 + 0.432i |
| 16 | 0.382 + 0.540i | 0.176 + 0.662i | 0.234 + 0.376i | 0.138 + 0.433i | 0.403 + 0.518i | 0.135 + 0.675i | 0.236 + 0.372i | 0.132 + 0.434i |
| 16.1 | 0.381 + 0.537i | 0.175 + 0.659i | 0.236 + 0.376i | 0.138 + 0.434i | 0.402 + 0.515i | 0.133 + 0.672i | 0.240 + 0.371i | 0.131 + 0.435i |
| 16.2 | 0.380 + 0.535i | 0.175 + 0.655i | 0.239 + 0.375i | 0.138 + 0.436i | 0.402 + 0.512i | 0.132 + 0.668i | 0.243 + 0.371i | 0.131 + 0.438i |
| 16.3 | 0.378 + 0.533i | 0.175 + 0.652i | 0.241 + 0.375i | 0.138 + 0.438i | 0.401 + 0.509i | 0.130 + 0.665i | 0.245 + 0.370i | 0.129 + 0.440i |
| 16.4 | 0.377 + 0.531i | 0.174 + 0.649i | 0.243 + 0.376i | 0.137 + 0.441i | 0.400 + 0.507i | 0.128 + 0.662i | 0.247 + 0.371i | 0.128 + 0.443i |
| 16.5 | 0.375 + 0.528i | 0.173 + 0.645i | 0.245 + 0.376i | 0.136 + 0.443i | 0.399 + 0.505i | 0.126 + 0.658i | 0.250 + 0.370i | 0.126 + 0.445i |
| 16.6 | 0.372 + 0.527i | 0.171 + 0.641i | 0.247 + 0.377i | 0.135 + 0.445i | 0.397 + 0.503i | 0.124 + 0.654i | 0.251 + 0.372i | 0.124 + 0.448i |
| 16.7 | 0.369 + 0.525i | 0.170 + 0.638i | 0.248 + 0.378i | 0.133 + 0.448i | 0.396 + 0.501i | 0.122 + 0.650i | 0.253 + 0.372i | 0.121 + 0.451i |
| 16.8 | 0.366 + 0.524i | 0.167 + 0.634i | 0.249 + 0.380i | 0.130 + 0.450i | 0.393 + 0.500i | 0.120 + 0.646i | 0.254 + 0.374i | 0.118 + 0.454i |
| 16.9 | 0.363 + 0.523i | 0.166 + 0.631i | 0.250 + 0.381i | 0.128 + 0.452i | 0.391 + 0.498i | 0.118 + 0.643i | 0.255 + 0.374i | 0.116 + 0.456i |
| 17 | 0.360 + 0.522i | 0.165 + 0.629i | 0.251 + 0.382i | 0.127 + 0.455i | 0.390 + 0.497i | 0.116 + 0.641i | 0.257 + 0.375i | 0.113 + 0.459i |
| 17.1 | 0.358 + 0.523i | 0.164 + 0.627i | 0.251 + 0.384i | 0.125 + 0.458i | 0.388 + 0.497i | 0.113 + 0.640i | 0.257 + 0.376i | 0.111 + 0.461i |
| 17.2 | 0.356 + 0.523i | 0.164 + 0.627i | 0.252 + 0.386i | 0.124 + 0.460i | 0.388 + 0.496i | 0.111 + 0.639i | 0.259 + 0.378i | 0.109 + 0.464i |
| 17.3 | 0.355 + 0.522i | 0.164 + 0.625i | 0.252 + 0.386i | 0.123 + 0.462i | 0.389 + 0.495i | 0.110 + 0.639i | 0.260 + 0.378i | 0.108 + 0.466i |
| 17.4 | 0.354 + 0.523i | 0.164 + 0.624i | 0.253 + 0.387i | 0.123 + 0.464i | 0.389 + 0.494i | 0.108 + 0.638i | 0.262 + 0.378i | 0.106 + 0.468i |
| 17.5 | 0.353 + 0.523i | 0.165 + 0.624i | 0.254 + 0.388i | 0.122 + 0.466i | 0.390 + 0.493i | 0.107 + 0.639i | 0.263 + 0.378i | 0.105 + 0.471i |
| 17.6 | 0.352 + 0.523i | 0.167 + 0.624i | 0.255 + 0.388i | 0.122 + 0.469i | 0.391 + 0.492i | 0.106 + 0.639i | 0.264 + 0.379i | 0.103 + 0.473i |
| 17.7 | 0.352 + 0.524i | 0.168 + 0.624i | 0.256 + 0.390i | 0.122 + 0.471i | 0.392 + 0.491i | 0.104 + 0.640i | 0.265 + 0.379i | 0.102 + 0.475i |
| 17.8 | 0.351 + 0.524i | 0.170 + 0.626i | 0.257 + 0.391i | 0.122 + 0.474i | 0.393 + 0.490i | 0.103 + 0.642i | 0.266 + 0.380i | 0.101 + 0.480i |
| 17.9 | 0.369 + 0.509i | 0.292 + 0.877i | 0.205 + 0.468i | 0.152 + 0.672i | 0.383 + 0.475i | 0.131 + 1.023i | 0.200 + 0.453i | 0.102 + 0.678i |
| 18 | 0.366 + 0.503i | 0.293 + 0.900i | 0.204 + 0.468i | 0.151 + 0.671i | 0.382 + 0.471i | 0.133 + 1.030i | 0.200 + 0.453i | 0.101 + 0.677i |
| 18.1 | 0.365 + 0.501i | 0.294 + 0.918i | 0.204 + 0.468i | 0.152 + 0.668i | 0.381 + 0.469i | 0.134 + 1.036i | 0.199 + 0.453i | 0.100 + 0.674i |
| 18.2 | 0.364 + 0.498i | 0.296 + 0.936i | 0.204 + 0.468i | 0.152 + 0.663i | 0.380 + 0.468i | 0.135 + 1.042i | 0.199 + 0.452i | 0.100 + 0.670i |
| 18.3 | 0.363 + 0.497i | 0.297 + 0.950i | 0.204 + 0.467i | 0.152 + 0.659i | 0.380 + 0.466i | 0.135 + 1.046i | 0.199 + 0.452i | 0.099 + 0.666i |
| 18.4 | 0.363 + 0.497i | 0.298 + 0.956i | 0.206 + 0.468i | 0.153 + 0.657i | 0.381 + 0.465i | 0.135 + 1.048i | 0.201 + 0.451i | 0.098 + 0.664i |
| 18.5 | 0.355 + 0.546i | 0.300 + 0.741i | 0.198 + 0.492i | 0.141 + 0.683i | 0.380 + 0.476i | 0.146 + 1.059i | 0.214 + 0.438i | 0.079 + 0.837i |
| 18.6 | 0.352 + 0.549i | 0.296 + 0.736i | 0.197 + 0.493i | 0.139 + 0.683i | 0.379 + 0.475i | 0.147 + 1.065i | 0.215 + 0.436i | 0.078 + 0.849i |
| 18.7 | 0.335 + 0.547i | 0.270 + 0.713i | 0.179 + 0.492i | 0.118 + 0.672i | 0.367 + 0.472i | 0.203 + 1.081i | 0.205 + 0.428i | 0.080 + 1.034i |
| 18.8 | 0.333 + 0.549i | 0.267 + 0.710i | 0.179 + 0.492i | 0.118 + 0.669i | 0.367 + 0.473i | 0.205 + 1.085i | 0.206 + 0.427i | 0.080 + 1.047i |
| 18.9 | 0.332 + 0.550i | 0.267 + 0.707i | 0.180 + 0.492i | 0.118 + 0.667i | 0.367 + 0.473i | 0.208 + 1.087i | 0.208 + 0.427i | 0.079 + 1.051i |
| 19 | 0.332 + 0.552i | 0.265 + 0.706i | 0.180 + 0.492i | 0.118 + 0.666i | 0.367 + 0.473i | 0.212 + 1.090i | 0.209 + 0.427i | 0.077 + 1.055i |
| 19.1 | 0.331 + 0.554i | 0.265 + 0.705i | 0.180 + 0.494i | 0.119 + 0.666i | 0.367 + 0.473i | 0.215 + 1.092i | 0.210 + 0.427i | 0.076 + 1.059i |
| 19.2 | 1.434 + 0.733i | 1.534 + 0.451i | 0.844 + 0.499i | 0.905 + 0.321i | 1.167 + 0.655i | 1.267 + 0.393i | 0.992 + 0.563i | 1.062 + 0.349i |
| 19.3 | 1.435 + 0.732i | 1.535 + 0.450i | 0.846 + 0.497i | 0.906 + 0.319i | 1.168 + 0.654i | 1.269 + 0.393i | 0.994 + 0.561i | 1.065 + 0.348i |
| 19.4 | 1.435 + 0.730i | 1.535 + 0.449i | 0.849 + 0.495i | 0.908 + 0.317i | 1.169 + 0.653i | 1.271 + 0.393i | 0.997 + 0.561i | 1.069 + 0.347i |
| 19.5 | 1.436 + 0.728i | 1.534 + 0.448i | 0.851 + 0.494i | 0.909 + 0.315i | 1.171 + 0.653i | 1.272 + 0.393i | 0.999 + 0.560i | 1.071 + 0.346i |
| 19.6 | 1.436 + 0.727i | 1.534 + 0.446i | 0.852 + 0.493i | 0.910 + 0.314i | 1.173 + 0.652i | 1.273 + 0.393i | 1.001 + 0.560i | 1.073 + 0.345i |
| 19.7 | 1.436 + 0.725i | 1.534 + 0.445i | 0.854 + 0.492i | 0.911 + 0.312i | 1.174 + 0.652i | 1.275 + 0.392i | 1.002 + 0.559i | 1.076 + 0.344i |
| 19.8 | 1.437 + 0.723i | 1.534 + 0.443i | 0.855 + 0.491i | 0.912 + 0.312i | 1.175 + 0.652i | 1.276 + 0.392i | 1.003 + 0.559i | 1.078 + 0.344i |
| 19.9 | 1.438 + 0.720i | 1.533 + 0.441i | 0.856 + 0.490i | 0.913 + 0.311i | 1.176 + 0.651i | 1.276 + 0.392i | 1.005 + 0.559i | 1.080 + 0.343i |
| 20 | 1.438 + 0.718i | 1.534 + 0.440i | 0.858 + 0.489i | 0.914 + 0.310i | 1.177 + 0.652i | 1.278 + 0.393i | 1.006 + 0.558i | 1.082 + 0.343i |
| 20.1 | 1.439 + 0.716i | 1.533 + 0.438i | 0.859 + 0.489i | 0.915 + 0.309i | 1.179 + 0.652i | 1.279 + 0.392i | 1.008 + 0.558i | 1.084 + 0.343i |
| 20.2 | 1.439 + 0.714i | 1.533 + 0.436i | 0.861 + 0.488i | 0.916 + 0.309i | 1.180 + 0.652i | 1.280 + 0.392i | 1.010 + 0.558i | 1.087 + 0.342i |
| 20.3 | 1.440 + 0.712i | 1.533 + 0.434i | 0.863 + 0.488i | 0.918 + 0.309i | 1.182 + 0.653i | 1.281 + 0.392i | 1.012 + 0.559i | 1.088 + 0.342i |
| 20.4 | 1.440 + 0.710i | 1.533 + 0.432i | 0.865 + 0.488i | 0.919 + 0.309i | 1.182 + 0.654i | 1.282 + 0.393i | 1.013 + 0.559i | 1.090 + 0.342i |
| 20.5 | 1.429 + 0.699i | 1.530 + 0.429i | 0.882 + 0.466i | 0.922 + 0.286i | 1.175 + 0.647i | 1.284 + 0.385i | 1.026 + 0.533i | 1.095 + 0.322i |
| 20.6 | 1.427 + 0.696i | 1.529 + 0.428i | 0.883 + 0.465i | 0.923 + 0.285i | 1.174 + 0.649i | 1.285 + 0.384i | 1.028 + 0.532i | 1.096 + 0.321i |
| 20.7 | 1.424 + 0.693i | 1.529 + 0.426i | 0.885 + 0.464i | 0.925 + 0.284i | 1.172 + 0.651i | 1.285 + 0.384i | 1.030 + 0.531i | 1.098 + 0.320i |
| 20.8 | 1.361 + 0.673i | 1.539 + 0.453i | 0.913 + 0.465i | 0.939 + 0.282i | 1.117 + 0.703i | 1.314 + 0.355i | 1.084 + 0.512i | 1.118 + 0.307i |
| 20.9 | 1.360 + 0.671i | 1.538 + 0.453i | 0.916 + 0.466i | 0.940 + 0.282i | 1.115 + 0.706i | 1.316 + 0.354i | 1.088 + 0.513i | 1.119 + 0.306i |
| 21 | 1.358 + 0.669i | 1.537 + 0.453i | 0.918 + 0.465i | 0.942 + 0.282i | 1.115 + 0.708i | 1.317 + 0.353i | 1.091 + 0.512i | 1.121 + 0.305i |
| 21.1 | 1.357 + 0.667i | 1.536 + 0.453i | 0.921 + 0.464i | 0.943 + 0.282i | 1.115 + 0.710i | 1.318 + 0.351i | 1.095 + 0.512i | 1.122 + 0.304i |
| 21.2 | 1.358 + 0.666i | 1.535 + 0.452i | 0.925 + 0.463i | 0.946 + 0.281i | 1.118 + 0.712i | 1.320 + 0.350i | 1.100 + 0.512i | 1.124 + 0.303i |

-continued

| | | | | 256NUC | | | | |
|---|---|---|---|---|---|---|---|---|
| 21.3 | 1.359 + 0.665i | 1.535 + 0.450i | 0.927 + 0.463i | 0.948 + 0.281i | 1.119 + 0.714i | 1.321 + 0.349i | 1.103 + 0.512i | 1.126 + 0.302i |
| 21.4 | 1.359 + 0.662i | 1.534 + 0.449i | 0.930 + 0.462i | 0.950 + 0.280i | 1.121 + 0.716i | 1.322 + 0.348i | 1.107 + 0.512i | 1.128 + 0.301i |
| 21.5 | 1.359 + 0.661i | 1.533 + 0.448i | 0.932 + 0.462i | 0.951 + 0.281i | 1.123 + 0.717i | 1.322 + 0.346i | 1.109 + 0.512i | 1.128 + 0.300i |
| 21.6 | 1.360 + 0.658i | 1.532 + 0.447i | 0.934 + 0.461i | 0.953 + 0.280i | 1.125 + 0.718i | 1.323 + 0.345i | 1.112 + 0.511i | 1.130 + 0.300i |
| 21.7 | 1.360 + 0.656i | 1.531 + 0.445i | 0.936 + 0.461i | 0.954 + 0.280i | 1.126 + 0.719i | 1.323 + 0.344i | 1.114 + 0.511i | 1.130 + 0.299i |
| 21.8 | 1.360 + 0.655i | 1.530 + 0.444i | 0.938 + 0.461i | 0.955 + 0.280i | 1.129 + 0.720i | 1.324 + 0.342i | 1.117 + 0.511i | 1.131 + 0.298i |
| 21.9 | 1.362 + 0.653i | 1.529 + 0.442i | 0.940 + 0.460i | 0.956 + 0.279i | 1.132 + 0.721i | 1.324 + 0.341i | 1.119 + 0.511i | 1.132 + 0.297i |
| 22 | 1.362 + 0.651i | 1.528 + 0.441i | 0.942 + 0.460i | 0.958 + 0.280i | 1.133 + 0.722i | 1.325 + 0.340i | 1.122 + 0.511i | 1.133 + 0.297i |
| 22.1 | 1.363 + 0.650i | 1.526 + 0.440i | 0.944 + 0.460i | 0.958 + 0.279i | 1.136 + 0.723i | 1.325 + 0.339i | 1.124 + 0.510i | 1.134 + 0.296i |
| 22.2 | 1.363 + 0.648i | 1.526 + 0.438i | 0.946 + 0.460i | 0.961 + 0.279i | 1.139 + 0.724i | 1.326 + 0.338i | 1.126 + 0.511i | 1.135 + 0.296i |
| 22.3 | 1.365 + 0.645i | 1.524 + 0.435i | 0.949 + 0.460i | 0.962 + 0.279i | 1.142 + 0.725i | 1.326 + 0.336i | 1.129 + 0.511i | 1.136 + 0.295i |
| 22.4 | 1.368 + 0.646i | 1.525 + 0.435i | 0.957 + 0.457i | 0.965 + 0.277i | 1.148 + 0.733i | 1.328 + 0.335i | 1.136 + 0.514i | 1.139 + 0.295i |
| 22.5 | 1.368 + 0.645i | 1.523 + 0.435i | 0.959 + 0.457i | 0.967 + 0.277i | 1.149 + 0.735i | 1.328 + 0.334i | 1.138 + 0.514i | 1.140 + 0.295i |
| 22.6 | 0.351 + 0.807i | 0.365 + 0.993i | 0.209 + 0.808i | 0.220 + 0.992i | 0.342 + 0.641i | 0.124 + 1.432i | 0.203 + 0.641i | 0.251 + 1.203i |
| 22.7 | 0.352 + 0.808i | 0.366 + 0.993i | 0.210 + 0.808i | 0.220 + 0.992i | 0.343 + 0.642i | 0.124 + 1.427i | 0.204 + 0.642i | 0.251 + 1.203i |
| 22.8 | 0.354 + 0.810i | 0.367 + 0.994i | 0.211 + 0.809i | 0.221 + 0.991i | 0.344 + 0.643i | 0.123 + 1.425i | 0.204 + 0.643i | 0.251 + 1.201i |
| 22.9 | 0.355 + 0.811i | 0.368 + 0.995i | 0.212 + 0.810i | 0.221 + 0.991i | 0.345 + 0.644i | 0.122 + 1.421i | 0.205 + 0.644i | 0.251 + 1.200i |
| 23 | 0.356 + 0.812i | 0.369 + 0.995i | 0.212 + 0.809i | 0.221 + 0.990i | 0.347 + 0.645i | 0.122 + 1.418i | 0.206 + 0.645i | 0.251 + 1.198i |
| 23.1 | 0.356 + 0.812i | 0.370 + 0.995i | 0.213 + 0.810i | 0.222 + 0.990i | 0.348 + 0.647i | 0.121 + 1.414i | 0.207 + 0.645i | 0.251 + 1.197i |
| 23.2 | 0.357 + 0.813i | 0.371 + 0.996i | 0.213 + 0.811i | 0.222 + 0.990i | 0.349 + 0.648i | 0.120 + 1.412i | 0.207 + 0.646i | 0.252 + 1.195i |
| 23.3 | 0.358 + 0.814i | 0.371 + 0.996i | 0.213 + 0.810i | 0.222 + 0.989i | 0.349 + 0.649i | 0.120 + 1.409i | 0.207 + 0.646i | 0.252 + 1.193i |
| 23.4 | 0.357 + 0.791i | 0.363 + 0.957i | 0.209 + 0.790i | 0.213 + 0.954i | 0.352 + 0.636i | 0.110 + 1.460i | 0.207 + 0.634i | 0.238 + 1.125i |
| 23.5 | 0.359 + 0.792i | 0.364 + 0.958i | 0.210 + 0.791i | 0.215 + 0.954i | 0.353 + 0.638i | 0.110 + 1.456i | 0.207 + 0.635i | 0.237 + 1.124i |
| 23.6 | 0.360 + 0.793i | 0.365 + 0.959i | 0.210 + 0.791i | 0.215 + 0.953i | 0.354 + 0.638i | 0.109 + 1.454i | 0.208 + 0.636i | 0.238 + 1.123i |
| 23.7 | 0.361 + 0.795i | 0.366 + 0.960i | 0.212 + 0.792i | 0.216 + 0.953i | 0.355 + 0.640i | 0.108 + 1.450i | 0.209 + 0.638i | 0.237 + 1.123i |
| 23.8 | 0.362 + 0.795i | 0.367 + 0.961i | 0.213 + 0.792i | 0.217 + 0.953i | 0.356 + 0.640i | 0.108 + 1.447i | 0.210 + 0.638i | 0.237 + 1.122i |
| 23.9 | 0.365 + 0.797i | 0.369 + 0.963i | 0.214 + 0.793i | 0.217 + 0.953i | 0.358 + 0.642i | 0.107 + 1.443i | 0.211 + 0.640i | 0.238 + 1.122i |
| 24 | 0.365 + 0.798i | 0.370 + 0.964i | 0.215 + 0.793i | 0.218 + 0.953i | 0.359 + 0.643i | 0.107 + 1.440i | 0.212 + 0.640i | 0.238 + 1.123i |
| 24.1 | 0.367 + 0.799i | 0.372 + 0.965i | 0.216 + 0.793i | 0.219 + 0.952i | 0.361 + 0.644i | 0.106 + 1.436i | 0.213 + 0.640i | 0.238 + 1.121i |
| 24.2 | 0.368 + 0.800i | 0.372 + 0.966i | 0.216 + 0.792i | 0.219 + 0.951i | 0.361 + 0.645i | 0.106 + 1.434i | 0.213 + 0.640i | 0.238 + 1.122i |
| 24.3 | 0.371 + 0.802i | 0.379 + 0.968i | 0.219 + 0.790i | 0.223 + 0.946i | 0.363 + 0.645i | 0.103 + 1.436i | 0.215 + 0.639i | 0.234 + 1.111i |
| 24.4 | 0.372 + 0.802i | 0.380 + 0.968i | 0.219 + 0.789i | 0.223 + 0.945i | 0.364 + 0.646i | 0.103 + 1.433i | 0.216 + 0.639i | 0.233 + 1.109i |
| 24.5 | 0.374 + 0.803i | 0.382 + 0.969i | 0.220 + 0.789i | 0.225 + 0.944i | 0.366 + 0.647i | 0.102 + 1.429i | 0.217 + 0.639i | 0.234 + 1.108i |
| 24.6 | 0.375 + 0.803i | 0.383 + 0.970i | 0.220 + 0.789i | 0.226 + 0.944i | 0.367 + 0.647i | 0.101 + 1.427i | 0.218 + 0.639i | 0.234 + 1.107i |
| 24.7 | 0.376 + 0.803i | 0.384 + 0.969i | 0.222 + 0.789i | 0.226 + 0.943i | 0.368 + 0.548i | 0.101 + 1.424i | 0.218 + 0.639i | 0.234 + 1.107i |
| 24.8 | 0.376 + 0.804i | 0.385 + 0.970i | 0.222 + 0.788i | 0.226 + 0.943i | 0.368 + 0.648i | 0.101 + 1.421i | 0.218 + 0.639i | 0.235 + 1.106i |
| 24.9 | 0.378 + 0.805i | 0.386 + 0.971i | 0.223 + 0.787i | 0.228 + 0.942i | 0.370 + 0.649i | 0.101 + 1.418i | 0.220 + 0.638i | 0.235 + 1.106i |
| 25 | 0.378 + 0.806i | 0.386 + 0.972i | 0.223 + 0.787i | 0.228 + 0.942i | 0.370 + 0.550i | 0.100 + 1.416i | 0.220 + 0.638i | 0.236 + 1.106i |
| SNR | a25 | a26 | a27 | a28 | a29 | a30 | a31 | a32 |
| 10 | 0.796 + 1.221i | 0.280 + 1.419i | 0.549 + 0.902i | 0.245 + 1.018i | 0.759 + 1.153i | 0.263 + 1.347i | 0.561 + 0.916i | 0.245 + 1.039i |
| 10.1 | 0.797 + 1.221i | 0.280 + 1.421i | 0.548 + 0.899i | 0.244 + 1.015i | 0.762 + 1.153i | 0.262 + 1.351i | 0.561 + 0.914i | 0.243 + 1.038i |
| 10.2 | 0.798 + 1.220i | 0.280 + 1.422i | 0.548 + 0.897i | 0.241 + 1.014i | 0.765 + 1.153i | 0.260 + 1.353i | 0.563 + 0.912i | 0.241 + 1.037i |
| 10.3 | 0.799 + 1.219i | 0.279 + 1.423i | 0.548 + 0.894i | 0.240 + 1.012i | 0.767 + 1.154i | 0.260 + 1.356i | 0.563 + 0.910i | 0.239 + 1.036i |
| 10.4 | 0.799 + 1.219i | 0.279 + 1.424i | 0.548 + 0.892i | 0.238 + 1.010i | 0.768 + 1.153i | 0.259 + 1.358i | 0.564 + 0.909i | 0.237 + 1.035i |
| 10.5 | 0.800 + 1.218i | 0.279 + 1.425i | 0.548 + 0.889i | 0.236 + 1.008i | 0.770 + 1.153i | 0.258 + 1.360i | 0.566 + 0.907i | 0.235 + 1.034i |
| 10.6 | 0.800 + 1.217i | 0.279 + 1.425i | 0.549 + 0.887i | 0.235 + 1.007i | 0.771 + 1.152i | 0.257 + 1.361i | 0.567 + 0.905i | 0.233 + 1.033i |
| 10.7 | 0.800 + 1.217i | 0.279 + 1.425i | 0.549 + 0.885i | 0.233 + 1.005i | 0.772 + 1.152i | 0.256 + 1.362i | 0.567 + 0.904i | 0.231 + 1.032i |
| 10.8 | 0.800 + 1.216i | 0.280 + 1.426i | 0.549 + 0.883i | 0.231 + 1.004i | 0.773 + 1.152i | 0.255 + 1.363i | 0.568 + 0.902i | 0.230 + 1.032i |
| 10.9 | 0.800 + 1.215i | 0.280 + 1.426i | 0.549 + 0.881i | 0.229 + 1.003i | 0.774 + 1.151i | 0.255 + 1.364i | 0.570 + 0.901i | 0.228 + 1.032i |
| 11 | 0.799 + 1.215i | 0.280 + 1.425i | 0.550 + 0.879i | 0.228 + 1.002i | 0.774 + 1.151i | 0.254 + 1.365i | 0.571 + 0.900i | 0.226 + 1.031i |
| 11.1 | 0.798 + 1.214i | 0.282 + 1.425i | 0.551 + 0.877i | 0.226 + 1.001i | 0.775 + 1.151i | 0.254 + 1.366i | 0.572 + 0.898i | 0.225 + 1.031i |
| 11.2 | 0.796 + 1.215i | 0.285 + 1.424i | 0.551 + 0.876i | 0.225 + 1.000i | 0.776 + 1.150i | 0.253 + 1.366i | 0.574 + 0.896i | 0.223 + 1.030i |
| 11.3 | 0.788 + 1.220i | 0.293 + 1.423i | 0.549 + 0.875i | 0.225 + 0.998i | 0.775 + 1.150i | 0.253 + 1.366i | 0.574 + 0.895i | 0.221 + 1.030i |
| 11.4 | 0.774 + 1.230i | 0.309 + 1.420i | 0.546 + 0.874i | 0.226 + 0.997i | 0.774 + 1.150i | 0.253 + 1.366i | 0.575 + 0.894i | 0.220 + 1.029i |
| 11.5 | 0.759 + 1.240i | 0.327 + 1.417i | 0.542 + 0.874i | 0.227 + 0.994i | 0.773 + 1.149i | 0.253 + 1.365i | 0.575 + 0.892i | 0.217 + 1.028i |
| 11.6 | 0.748 + 1.248i | 0.341 + 1.414i | 0.540 + 0.873i | 0.228 + 0.992i | 0.772 + 1.147i | 0.254 + 1.363i | 0.575 + 0.890i | 0.216 + 1.027i |
| 11.7 | 0.738 + 1.255i | 0.353 + 1.413i | 0.537 + 0.872i | 0.228 + 0.990i | 0.771 + 1.146i | 0.254 + 1.363i | 0.575 + 0.889i | 0.214 + 1.026i |
| 11.8 | 0.731 + 1.261i | 0.363 + 1.412i | 0.535 + 0.871i | 0.228 + 0.987i | 0.770 + 1.145i | 0.254 + 1.362i | 0.576 + 0.887i | 0.212 + 1.025i |
| 11.9 | 0.724 + 1.265i | 0.372 + 1.411i | 0.534 + 0.870i | 0.228 + 0.985i | 0.770 + 1.144i | 0.254 + 1.361i | 0.576 + 0.885i | 0.211 + 1.024i |
| 12 | 0.718 + 1.269i | 0.379 + 1.410i | 0.532 + 0.869i | 0.228 + 0.984i | 0.768 + 1.143i | 0.255 + 1.360i | 0.576 + 0.884i | 0.210 + 1.023i |
| 12.1 | 0.712 + 1.272i | 0.386 + 1.408i | 0.530 + 0.868i | 0.227 + 0.983i | 0.767 + 1.142i | 0.255 + 1.359i | 0.576 + 0.883i | 0.208 + 1.022i |
| 12.2 | 0.708 + 1.275i | 0.392 + 1.407i | 0.529 + 0.867i | 0.227 + 0.982i | 0.766 + 1.141i | 0.256 + 1.359i | 0.576 + 0.882i | 0.207 + 1.022i |
| 12.3 | 0.703 + 1.277i | 0.397 + 1.406i | 0.527 + 0.866i | 0.227 + 0.980i | 0.765 + 1.140i | 0.255 + 1.358i | 0.576 + 0.880i | 0.205 + 1.021i |
| 12.4 | 0.698 + 1.278i | 0.401 + 1.404i | 0.526 + 0.865i | 0.226 + 0.979i | 0.763 + 1.139i | 0.256 + 1.356i | 0.575 + 0.879i | 0.204 + 1.021i |
| 12.5 | 0.694 + 1.280i | 0.404 + 1.402i | 0.526 + 0.864i | 0.225 + 0.978i | 0.761 + 1.139i | 0.256 + 1.355i | 0.575 + 0.878i | 0.203 + 1.020i |
| 12.6 | 0.689 + 1.281i | 0.408 + 1.401i | 0.524 + 0.863i | 0.225 + 0.977i | 0.759 + 1.138i | 0.256 + 1.354i | 0.574 + 0.877i | 0.202 + 1.020i |
| 12.7 | 0.685 + 1.282i | 0.410 + 1.398i | 0.523 + 0.863i | 0.224 + 0.976i | 0.757 + 1.138i | 0.256 + 1.352i | 0.574 + 0.877i | 0.201 + 1.019i |
| 12.8 | 0.647 + 1.276i | 0.350 + 1.362i | 0.510 + 0.848i | 0.209 + 0.953i | 0.703 + 1.142i | 0.232 + 1.319i | 0.559 + 0.873i | 0.192 + 0.991i |
| 12.9 | 0.639 + 1.277i | 0.348 + 1.359i | 0.505 + 0.849i | 0.207 + 0.950i | 0.697 + 1.144i | 0.230 + 1.317i | 0.553 + 0.874i | 0.189 + 0.989i |
| 13 | 0.633 + 1.278i | 0.347 + 1.357i | 0.499 + 0.848i | 0.204 + 0.947i | 0.690 + 1.146i | 0.229 + 1.314i | 0.547 + 0.875i | 0.187 + 0.986i |
| 13.1 | 0.628 + 1.278i | 0.348 + 1.356i | 0.496 + 0.848i | 0.202 + 0.945i | 0.687 + 1.146i | 0.228 + 1.313i | 0.543 + 0.875i | 0.185 + 0.985i |
| 13.2 | 0.622 + 1.278i | 0.349 + 1.354i | 0.492 + 0.848i | 0.200 + 0.943i | 0.681 + 1.147i | 0.228 + 1.311i | 0.538 + 0.876i | 0.184 + 0.984i |
| 13.3 | 0.619 + 1.278i | 0.351 + 1.351i | 0.490 + 0.848i | 0.199 + 0.943i | 0.679 + 1.147i | 0.228 + 1.310i | 0.536 + 0.876i | 0.182 + 0.984i |
| 13.4 | 0.614 + 1.276i | 0.352 + 1.347i | 0.487 + 0.849i | 0.198 + 0.943i | 0.676 + 1.146i | 0.227 + 1.309i | 0.533 + 0.876i | 0.181 + 0.983i |
| 13.5 | 0.609 + 1.273i | 0.352 + 1.341i | 0.484 + 0.849i | 0.196 + 0.944i | 0.673 + 1.146i | 0.227 + 1.308i | 0.530 + 0.876i | 0.179 + 0.983i |

-continued

| 256NUC | | | | | | | | |
|---|---|---|---|---|---|---|---|---|
| 13.6 | 0.604 + 1.268i | 0.351 + 1.333i | 0.482 + 0.849i | 0.194 + 0.946i | 0.670 + 1.144i | 0.227 + 1.307i | 0.528 + 0.875i | 0.177 + 0.984i |
| 13.7 | 0.511 + 1.212i | 0.216 + 1.304i | 0.444 + 0.858i | 0.151 + 0.949i | 0.542 + 1.145i | 0.172 + 1.344i | 0.472 + 0.873i | 0.148 + 0.948i |
| 13.8 | 0.506 + 1.213i | 0.213 + 1.302i | 0.443 + 0.858i | 0.150 + 0.948i | 0.538 + 1.146i | 0.171 + 1.342i | 0.470 + 0.874i | 0.147 + 0.946i |
| 13.9 | 0.500 + 1.215i | 0.210 + 1.299i | 0.441 + 0.858i | 0.149 + 0.945i | 0.531 + 1.148i | 0.170 + 1.338i | 0.468 + 0.874i | 0.147 + 0.943i |
| 14 | 0.496 + 1.215i | 0.208 + 1.296i | 0.439 + 0.858i | 0.148 + 0.943i | 0.527 + 1.149i | 0.168 + 1.336i | 0.466 + 0.875i | 0.145 + 0.941i |
| 14.1 | 0.491 + 1.216i | 0.206 + 1.294i | 0.438 + 0.858i | 0.148 + 0.942i | 0.522 + 1.150i | 0.168 + 1.334i | 0.464 + 0.876i | 0.145 + 0.939i |
| 14.2 | 0.486 + 1.217i | 0.202 + 1.291i | 0.436 + 0.859i | 0.147 + 0.940i | 0.516 + 1.152i | 0.166 + 1.332i | 0.462 + 0.878i | 0.145 + 0.937i |
| 14.3 | 0.483 + 1.218i | 0.201 + 1.289i | 0.434 + 0.859i | 0.147 + 0.939i | 0.514 + 1.152i | 0.165 + 1.330i | 0.461 + 0.880i | 0.144 + 0.937i |
| 14.4 | 0.478 + 1.218i | 0.198 + 1.286i | 0.432 + 0.860i | 0.147 + 0.937i | 0.508 + 1.155i | 0.164 + 1.327i | 0.458 + 0.881i | 0.144 + 0.934i |
| 14.5 | 0.475 + 1.219i | 0.196 + 1.283i | 0.431 + 0.860i | 0.147 + 0.937i | 0.505 + 1.155i | 0.163 + 1.325i | 0.457 + 0.883i | 0.144 + 0.933i |
| 14.6 | 0.471 + 1.220i | 0.194 + 1.281i | 0.429 + 0.861i | 0.146 + 0.935i | 0.501 + 1.157i | 0.162 + 1.323i | 0.455 + 0.884i | 0.144 + 0.932i |
| 14.7 | 0.467 + 1.220i | 0.192 + 1.278i | 0.427 + 0.862i | 0.146 + 0.935i | 0.497 + 1.158i | 0.161 + 1.321i | 0.453 + 0.886i | 0.144 + 0.930i |
| 14.8 | 0.464 + 1.221i | 0.190 + 1.276i | 0.425 + 0.863i | 0.146 + 0.934i | 0.495 + 1.159i | 0.160 + 1.319i | 0.452 + 0.888i | 0.144 + 0.930i |
| 14.9 | 0.462 + 1.221i | 0.189 + 1.273i | 0.424 + 0.863i | 0.146 + 0.934i | 0.493 + 1.159i | 0.159 + 1.317i | 0.450 + 0.889i | 0.144 + 0.929i |
| 15 | 0.459 + 1.222i | 0.187 + 1.271i | 0.422 + 0.865i | 0.147 + 0.933i | 0.491 + 1.160i | 0.158 + 1.315i | 0.449 + 0.892i | 0.144 + 0.929i |
| 15.1 | 0.458 + 1.223i | 0.186 + 1.269i | 0.421 + 0.866i | 0.146 + 0.934i | 0.490 + 1.160i | 0.157 + 1.313i | 0.447 + 0.893i | 0.144 + 0.929i |
| 15.2 | 0.456 + 1.224i | 0.186 + 1.267i | 0.419 + 0.867i | 0.147 + 0.934i | 0.489 + 1.161i | 0.156 + 1.311i | 0.446 + 0.896i | 0.144 + 0.929i |
| 15.3 | 0.455 + 1.225i | 0.184 + 1.264i | 0.418 + 0.868i | 0.148 + 0.934i | 0.489 + 1.161i | 0.155 + 1.309i | 0.445 + 0.898i | 0.145 + 0.950i |
| 15.4 | 0.453 + 1.226i | 0.184 + 1.262i | 0.416 + 0.870i | 0.148 + 0.935i | 0.490 + 1.162i | 0.154 + 1.307i | 0.444 + 0.901i | 0.145 + 0.930i |
| 15.5 | 0.419 + 0.597i | 0.183 + 0.717i | 0.156 + 0.355i | 0.108 + 0.396i | 0.445 + 0.573i | 0.138 + 0.729i | 0.155 + 0.355i | 0.106 + 0.395i |
| 15.6 | 0.419 + 0.597i | 0.183 + 0.715i | 0.155 + 0.350i | 0.106 + 0.392i | 0.448 + 0.573i | 0.137 + 0.727i | 0.153 + 0.349i | 0.105 + 0.390i |
| 15.7 | 0.421 + 0.597i | 0.183 + 0.711i | 0.153 + 0.344i | 0.106 + 0.387i | 0.452 + 0.572i | 0.135 + 0.724i | 0.152 + 0.343i | 0.104 + 0.386i |
| 15.8 | 0.421 + 0.598i | 0.183 + 0.710i | 0.151 + 0.340i | 0.104 + 0.384i | 0.456 + 0.573i | 0.134 + 0.722i | 0.150 + 0.339i | 0.103 + 0.383i |
| 15.9 | 0.422 + 0.599i | 0.185 + 0.709i | 0.150 + 0.335i | 0.104 + 0.380i | 0.459 + 0.574i | 0.133 + 0.721i | 0.148 + 0.334i | 0.102 + 0.380i |
| 16 | 0.423 + 0.601i | 0.185 + 0.708i | 0.148 + 0.331i | 0.102 + 0.377i | 0.462 + 0.574i | 0.131 + 0.720i | 0.146 + 0.330i | 0.100 + 0.377i |
| 16.1 | 0.424 + 0.603i | 0.187 + 0.708i | 0.147 + 0.327i | 0.101 + 0.373i | 0.466 + 0.575i | 0.130 + 0.720i | 0.145 + 0.326i | 0.099 + 0.373i |
| 16.2 | 0.424 + 0.606i | 0.188 + 0.710i | 0.145 + 0.322i | 0.100 + 0.369i | 0.468 + 0.577i | 0.128 + 0.722i | 0.143 + 0.321i | 0.098 + 0.369i |
| 16.3 | 0.424 + 0.609i | 0.190 + 0.711i | 0.143 + 0.317i | 0.098 + 0.364i | 0.471 + 0.578i | 0.127 + 0.724i | 0.140 + 0.316i | 0.096 + 0.365i |
| 16.4 | 0.424 + 0.612i | 0.192 + 0.714i | 0.141 + 0.314i | 0.096 + 0.360i | 0.474 + 0.580i | 0.126 + 0.727i | 0.138 + 0.312i | 0.094 + 0.360i |
| 16.5 | 0.423 + 0.616i | 0.194 + 0.716i | 0.139 + 0.308i | 0.095 + 0.353i | 0.477 + 0.582i | 0.124 + 0.729i | 0.136 + 0.306i | 0.093 + 0.354i |
| 16.6 | 0.423 + 0.621i | 0.196 + 0.720i | 0.136 + 0.301i | 0.093 + 0.345i | 0.479 + 0.585i | 0.122 + 0.734i | 0.134 + 0.301i | 0.091 + 0.345i |
| 16.7 | 0.422 + 0.625i | 0.199 + 0.723i | 0.135 + 0.296i | 0.091 + 0.338i | 0.482 + 0.587i | 0.121 + 0.738i | 0.133 + 0.296i | 0.090 + 0.338i |
| 16.8 | 0.420 + 0.632i | 0.201 + 0.729i | 0.132 + 0.290i | 0.089 + 0.327i | 0.483 + 0.590i | 0.119 + 0.744i | 0.130 + 0.289i | 0.088 + 0.328i |
| 16.9 | 0.418 + 0.637i | 0.204 + 0.733i | 0.130 + 0.284i | 0.088 + 0.319i | 0.484 + 0.593i | 0.117 + 0.749i | 0.128 + 0.284i | 0.087 + 0.320i |
| 17 | 0.417 + 0.642i | 0.207 + 0.737i | 0.128 + 0.280i | 0.087 + 0.313i | 0.486 + 0.595i | 0.115 + 0.755i | 0.127 + 0.279i | 0.086 + 0.313i |
| 17.1 | 0.415 + 0.648i | 0.210 + 0.741i | 0.126 + 0.276i | 0.086 + 0.307i | 0.488 + 0.597i | 0.113 + 0.761i | 0.125 + 0.276i | 0.085 + 0.307i |
| 17.2 | 0.414 + 0.652i | 0.213 + 0.745i | 0.125 + 0.274i | 0.085 + 0.303i | 0.490 + 0.598i | 0.111 + 0.765i | 0.125 + 0.274i | 0.084 + 0.303i |
| 17.3 | 0.412 + 0.656i | 0.215 + 0.747i | 0.125 + 0.273i | 0.084 + 0.301i | 0.493 + 0.599i | 0.109 + 0.769i | 0.124 + 0.272i | 0.083 + 0.301i |
| 17.4 | 0.411 + 0.659i | 0.218 + 0.748i | 0.124 + 0.271i | 0.083 + 0.300i | 0.495 + 0.600i | 0.108 + 0.772i | 0.124 + 0.271i | 0.082 + 0.300i |
| 17.5 | 0.410 + 0.662i | 0.220 + 0.751i | 0.124 + 0.271i | 0.083 + 0.299i | 0.497 + 0.600i | 0.106 + 0.775i | 0.123 + 0.271i | 0.082 + 0.299i |
| 17.6 | 0.410 + 0.664i | 0.223 + 0.752i | 0.124 + 0.271i | 0.082 + 0.298i | 0.499 + 0.600i | 0.104 + 0.778i | 0.123 + 0.271i | 0.081 + 0.298i |
| 17.7 | 0.410 + 0.667i | 0.226 + 0.754i | 0.123 + 0.271i | 0.082 + 0.299i | 0.502 + 0.600i | 0.103 + 0.781i | 0.123 + 0.271i | 0.080 + 0.299i |
| 17.8 | 0.410 + 0.669i | 0.230 + 0.756i | 0.123 + 0.273i | 0.081 + 0.300i | 0.504 + 0.599i | 0.101 + 0.785i | 0.123 + 0.273i | 0.079 + 0.301i |
| 17.9 | 0.455 + 0.604i | 0.316 + 0.819i | 0.098 + 0.434i | 0.137 + 0.693i | 0.502 + 0.536i | 0.105 + 0.940i | 0.092 + 0.433i | 0.087 + 0.705i |
| 18 | 0.452 + 0.604i | 0.318 + 0.818i | 0.096 + 0.433i | 0.143 + 0.698i | 0.501 + 0.535i | 0.100 + 0.940i | 0.090 + 0.432i | 0.088 + 0.709i |
| 18.1 | 0.451 + 0.606i | 0.317 + 0.818i | 0.095 + 0.430i | 0.149 + 0.702i | 0.502 + 0.534i | 0.095 + 0.939i | 0.088 + 0.430i | 0.089 + 0.713i |
| 18.2 | 0.450 + 0.607i | 0.316 + 0.819i | 0.092 + 0.426i | 0.155 + 0.705i | 0.503 + 0.534i | 0.092 + 0.936i | 0.087 + 0.426i | 0.089 + 0.717i |
| 18.3 | 0.449 + 0.609i | 0.315 + 0.819i | 0.091 + 0.422i | 0.159 + 0.707i | 0.505 + 0.533i | 0.090 + 0.933i | 0.085 + 0.422i | 0.090 + 0.720i |
| 18.4 | 0.449 + 0.609i | 0.315 + 0.819i | 0.089 + 0.421i | 0.164 + 0.708i | 0.507 + 0.532i | 0.089 + 0.931i | 0.084 + 0.422i | 0.089 + 0.722i |
| 18.5 | 0.462 + 0.616i | 0.339 + 0.797i | 0.085 + 0.474i | 0.098 + 0.677i | 0.514 + 0.527i | 0.190 + 0.976i | 0.083 + 0.423i | 0.082 + 0.841i |
| 18.6 | 0.461 + 0.619i | 0.339 + 0.798i | 0.084 + 0.474i | 0.094 + 0.677i | 0.515 + 0.527i | 0.198 + 0.978i | 0.082 + 0.421i | 0.082 + 0.851i |
| 18.7 | 0.446 + 0.620i | 0.314 + 0.739i | 0.078 + 0.460i | 0.083 + 0.708i | 0.504 + 0.527i | 0.224 + 0.931i | 0.080 + 0.406i | 0.081 + 0.894i |
| 18.8 | 0.445 + 0.623i | 0.312 + 0.789i | 0.077 + 0.457i | 0.081 + 0.708i | 0.504 + 0.528i | 0.221 + 0.929i | 0.080 + 0.403i | 0.080 + 0.896i |
| 18.9 | 0.445 + 0.626i | 0.311 + 0.789i | 0.076 + 0.456i | 0.080 + 0.708i | 0.505 + 0.529i | 0.222 + 0.929i | 0.079 + 0.402i | 0.079 + 0.896i |
| 19 | 0.445 + 0.629i | 0.311 + 0.791i | 0.075 + 0.455i | 0.080 + 0.708i | 0.506 + 0.529i | 0.224 + 0.930i | 0.078 + 0.402i | 0.078 + 0.897i |
| 19.1 | 0.445 + 0.632i | 0.312 + 0.791i | 0.075 + 0.456i | 0.079 + 0.709i | 0.506 + 0.529i | 0.224 + 0.930i | 0.078 + 0.402i | 0.077 + 0.897i |
| 19.2 | 0.578 + 1.246i | 0.351 + 1.324i | 0.459 + 1.047i | 0.283 + 1.100i | 0.766 + 1.097i | 0.116 + 1.359i | 0.631 + 0.955i | 0.096 + 1.129i |
| 19.3 | 0.578 + 1.244i | 0.350 + 1.323i | 0.461 + 1.046i | 0.285 + 1.099i | 0.768 + 1.096i | 0.116 + 1.357i | 0.632 + 0.952i | 0.096 + 1.129i |
| 19.4 | 0.579 + 1.242i | 0.351 + 1.322i | 0.461 + 1.046i | 0.285 + 1.099i | 0.771 + 1.094i | 0.116 + 1.356i | 0.633 + 0.950i | 0.096 + 1.129i |
| 19.5 | 0.581 + 1.240i | 0.351 + 1.320i | 0.463 + 1.045i | 0.286 + 1.099i | 0.772 + 1.091i | 0.116 + 1.355i | 0.635 + 0.947i | 0.096 + 1.129i |
| 19.6 | 0.582 + 1.238i | 0.351 + 1.319i | 0.465 + 1.045i | 0.286 + 1.099i | 0.774 + 1.090i | 0.116 + 1.354i | 0.636 + 0.945i | 0.096 + 1.130i |
| 19.7 | 0.583 + 1.236i | 0.351 + 1.318i | 0.466 + 1.045i | 0.287 + 1.100i | 0.776 + 1.088i | 0.116 + 1.353i | 0.637 + 0.943i | 0.096 + 1.130i |
| 19.8 | 0.584 + 1.235i | 0.352 + 1.316i | 0.467 + 1.044i | 0.287 + 1.099i | 0.779 + 1.086i | 0.116 + 1.352i | 0.639 + 0.940i | 0.097 + 1.130i |
| 19.9 | 0.585 + 1.233i | 0.352 + 1.315i | 0.468 + 1.044i | 0.288 + 1.099i | 0.781 + 1.085i | 0.116 + 1.351i | 0.640 + 0.939i | 0.097 + 1.130i |
| 20 | 0.586 + 1.231i | 0.352 + 1.314i | 0.470 + 1.043i | 0.288 + 1.099i | 0.783 + 1.083i | 0.116 + 1.350i | 0.642 + 0.937i | 0.097 + 1.130i |
| 20.1 | 0.587 + 1.230i | 0.352 + 1.312i | 0.471 + 1.042i | 0.289 + 1.099i | 0.784 + 1.082i | 0.116 + 1.349i | 0.643 + 0.935i | 0.098 + 1.130i |
| 20.2 | 0.587 + 1.228i | 0.352 + 1.311i | 0.472 + 1.041i | 0.289 + 1.098i | 0.786 + 1.080i | 0.116 + 1.347i | 0.644 + 0.933i | 0.098 + 1.129i |
| 20.3 | 0.587 + 1.226i | 0.352 + 1.309i | 0.473 + 1.040i | 0.289 + 1.098i | 0.787 + 1.078i | 0.116 + 1.345i | 0.646 + 0.931i | 0.098 + 1.128i |
| 20.4 | 0.588 + 1.224i | 0.352 + 1.307i | 0.473 + 1.039i | 0.289 + 1.097i | 0.788 + 1.077i | 0.116 + 1.344i | 0.647 + 0.930i | 0.098 + 1.128i |
| 20.5 | 0.591 + 1.218i | 0.354 + 1.298i | 0.488 + 1.033i | 0.297 + 1.093i | 0.797 + 1.076i | 0.116 + 1.335i | 0.667 + 0.929i | 0.101 + 1.125i |
| 20.6 | 0.591 + 1.218i | 0.353 + 1.296i | 0.488 + 1.032i | 0.297 + 1.092i | 0.798 + 1.077i | 0.115 + 1.333i | 0.669 + 0.929i | 0.101 + 1.124i |
| 20.7 | 0.591 + 1.217i | 0.353 + 1.294i | 0.490 + 1.031i | 0.298 + 1.092i | 0.799 + 1.076i | 0.116 + 1.331i | 0.670 + 0.928i | 0.101 + 1.124i |
| 20.8 | 0.564 + 1.228i | 0.336 + 1.287i | 0.469 + 1.032i | 0.286 + 1.082i | 0.771 + 1.102i | 0.110 + 1.317i | 0.640 + 0.955i | 0.097 + 1.109i |
| 20.9 | 0.563 + 1.227i | 0.335 + 1.286i | 0.468 + 1.032i | 0.285 + 1.080i | 0.770 + 1.102i | 0.110 + 1.314i | 0.639 + 0.956i | 0.096 + 1.107i |
| 21 | 0.562 + 1.227i | 0.334 + 1.284i | 0.468 + 1.032i | 0.285 + 1.080i | 0.770 + 1.103i | 0.109 + 1.313i | 0.638 + 0.957i | 0.096 + 1.107i |
| 21.1 | 0.560 + 1.226i | 0.333 + 1.282i | 0.467 + 1.032i | 0.284 + 1.079i | 0.770 + 1.103i | 0.109 + 1.310i | 0.638 + 0.958i | 0.096 + 1.105i |
| 21.2 | 0.559 + 1.225i | 0.332 + 1.281i | 0.464 + 1.032i | 0.282 + 1.079i | 0.768 + 1.102i | 0.108 + 1.308i | 0.635 + 0.958i | 0.096 + 1.104i |

-continued

| 256NUC | | | | | | | | |
|---|---|---|---|---|---|---|---|---|
| 21.3 | 0.558 + 1.224i | 0.330 + 1.279i | 0.463 + 1.032i | 0.281 + 1.078i | 0.767 + 1.101i | 0.108 + 1.306i | 0.634 + 0.959i | 0.095 + 1.103i |
| 21.4 | 0.557 + 1.224i | 0.330 + 1.279i | 0.462 + 1.032i | 0.281 + 1.078i | 0.767 + 1.100i | 0.108 + 1.304i | 0.632 + 0.960i | 0.096 + 1.102i |
| 21.5 | 0.556 + 1.223i | 0.329 + 1.277i | 0.461 + 1.032i | 0.280 + 1.077i | 0.766 + 1.100i | 0.107 + 1.302i | 0.632 + 0.961i | 0.095 + 1.100i |
| 21.6 | 0.555 + 1.222i | 0.328 + 1.275i | 0.460 + 1.032i | 0.279 + 1.077i | 0.766 + 1.099i | 0.107 + 1.301i | 0.631 + 0.961i | 0.094 + 1.100i |
| 21.7 | 0.554 + 1.221i | 0.327 + 1.275i | 0.460 + 1.033i | 0.278 + 1.077i | 0.766 + 1.099i | 0.107 + 1.299i | 0.630 + 0.961i | 0.094 + 1.099i |
| 21.8 | 0.554 + 1.219i | 0.327 + 1.273i | 0.459 + 1.032i | 0.278 + 1.076i | 0.765 + 1.098i | 0.107 + 1.297i | 0.630 + 0.961i | 0.095 + 1.099i |
| 21.9 | 0.553 + 1.218i | 0.326 + 1.272i | 0.459 + 1.032i | 0.278 + 1.077i | 0.765 + 1.096i | 0.106 + 1.297i | 0.629 + 0.961i | 0.094 + 1.099i |
| 22 | 0.552 + 1.218i | 0.325 + 1.271i | 0.457 + 1.032i | 0.277 + 1.076i | 0.764 + 1.096i | 0.106 + 1.294i | 0.628 + 0.962i | 0.094 + 1.097i |
| 22.1 | 0.552 + 1.217i | 0.325 + 1.270i | 0.457 + 1.032i | 0.276 + 1.076i | 0.764 + 1.095i | 0.106 + 1.293i | 0.627 + 0.962i | 0.094 + 1.097i |
| 22.2 | 0.551 + 1.215i | 0.325 + 1.268i | 0.456 + 1.032i | 0.275 + 1.074i | 0.764 + 1.094i | 0.106 + 1.290i | 0.627 + 0.962i | 0.094 + 1.095i |
| 22.3 | 0.549 + 1.213i | 0.324 + 1.266i | 0.455 + 1.031i | 0.274 + 1.074i | 0.763 + 1.092i | 0.106 + 1.289i | 0.626 + 0.961i | 0.094 + 1.095i |
| 22.4 | 0.547 + 1.211i | 0.322 + 1.264i | 0.452 + 1.031i | 0.272 + 1.073i | 0.758 + 1.089i | 0.105 + 1.285i | 0.624 + 0.961i | 0.092 + 1.092i |
| 22.5 | 0.546 + 1.210i | 0.322 + 1.263i | 0.451 + 1.031i | 0.272 + 1.073i | 0.757 + 1.088i | 0.105 + 1.284i | 0.623 + 0.961i | 0.092 + 1.092i |
| 22.6 | 0.498 + 0.806i | 0.516 + 0.997i | 0.069 + 0.807i | 0.073 + 0.985i | 0.485 + 0.638i | 0.375 + 1.444i | 0.068 + 0.642i | 0.079 + 1.179i |
| 22.7 | 0.499 + 0.807i | 0.518 + 0.997i | 0.070 + 0.807i | 0.073 + 0.984i | 0.487 + 0.639i | 0.374 + 1.441i | 0.068 + 0.643i | 0.079 + 1.176i |
| 22.8 | 0.501 + 0.809i | 0.520 + 0.998i | 0.070 + 0.807i | 0.074 + 0.983i | 0.488 + 0.641i | 0.371 + 1.439i | 0.068 + 0.643i | 0.079 + 1.175i |
| 22.9 | 0.502 + 0.809i | 0.521 + 0.998i | 0.070 + 0.808i | 0.074 + 0.982i | 0.489 + 0.642i | 0.369 + 1.436i | 0.068 + 0.644i | 0.079 + 1.173i |
| 23 | 0.504 + 0.811i | 0.523 + 0.999i | 0.070 + 0.806i | 0.074 + 0.981i | 0.491 + 0.644i | 0.367 + 1.433i | 0.068 + 0.644i | 0.079 + 1.171i |
| 23.1 | 0.506 + 0.812i | 0.525 + 0.999i | 0.071 + 0.806i | 0.074 + 0.980i | 0.493 + 0.645i | 0.366 + 1.430i | 0.069 + 0.644i | 0.079 + 1.169i |
| 23.2 | 0.507 + 0.813i | 0.527 + 0.999i | 0.070 + 0.807i | 0.074 + 0.980i | 0.494 + 0.647i | 0.364 + 1.427i | 0.069 + 0.645i | 0.080 + 1.169i |
| 23.3 | 0.508 + 0.814i | 0.528 + 0.999i | 0.070 + 0.807i | 0.074 + 0.980i | 0.495 + 0.648i | 0.362 + 1.423i | 0.069 + 0.645i | 0.080 + 1.168i |
| 23.4 | 0.510 + 0.806i | 0.512 + 0.990i | 0.067 + 0.801i | 0.069 + 0.989i | 0.501 + 0.644i | 0.296 + 1.353i | 0.068 + 0.636i | 0.088 + 1.206i |
| 23.5 | 0.512 + 0.807i | 0.514 + 0.990i | 0.068 + 0.802i | 0.070 + 0.988i | 0.503 + 0.646i | 0.295 + 1.350i | 0.068 + 0.637i | 0.088 + 1.204i |
| 23.6 | 0.514 + 0.808i | 0.515 + 0.990i | 0.068 + 0.803i | 0.070 + 0.989i | 0.505 + 0.647i | 0.294 + 1.349i | 0.069 + 0.639i | 0.088 + 1.203i |
| 23.7 | 0.516 + 0.810i | 0.517 + 0.990i | 0.069 + 0.804i | 0.070 + 0.989i | 0.506 + 0.649i | 0.293 + 1.346i | 0.069 + 0.641i | 0.088 + 1.202i |
| 23.8 | 0.517 + 0.811i | 0.519 + 0.991i | 0.069 + 0.806i | 0.071 + 0.989i | 0.507 + 0.649i | 0.293 + 1.346i | 0.069 + 0.642i | 0.087 + 1.200i |
| 23.9 | 0.519 + 0.813i | 0.521 + 0.992i | 0.070 + 0.807i | 0.072 + 0.990i | 0.509 + 0.651i | 0.292 + 1.344i | 0.070 + 0.644i | 0.087 + 1.198i |
| 24 | 0.521 + 0.814i | 0.523 + 0.992i | 0.070 + 0.808i | 0.072 + 0.991i | 0.510 + 0.652i | 0.292 + 1.343i | 0.070 + 0.644i | 0.087 + 1.198i |
| 24.1 | 0.522 + 0.815i | 0.525 + 0.993i | 0.070 + 0.809i | 0.073 + 0.990i | 0.512 + 0.654i | 0.292 + 1.341i | 0.070 + 0.646i | 0.087 + 1.196i |
| 24.2 | 0.524 + 0.817i | 0.527 + 0.994i | 0.070 + 0.809i | 0.073 + 0.990i | 0.514 + 0.655i | 0.292 + 1.341i | 0.070 + 0.646i | 0.087 + 1.196i |
| 24.3 | 0.527 + 0.823i | 0.538 + 1.005i | 0.071 + 0.808i | 0.073 + 0.986i | 0.516 + 0.659i | 0.273 + 1.327i | 0.071 + 0.645i | 0.087 + 1.193i |
| 24.4 | 0.529 + 0.824i | 0.541 + 1.006i | 0.071 + 0.807i | 0.073 + 0.984i | 0.518 + 0.661i | 0.271 + 1.324i | 0.071 + 0.645i | 0.086 + 1.191i |
| 24.5 | 0.531 + 0.826i | 0.543 + 1.007i | 0.072 + 0.808i | 0.073 + 0.984i | 0.519 + 0.663i | 0.269 + 1.321i | 0.071 + 0.646i | 0.086 + 1.190i |
| 24.6 | 0.532 + 0.827i | 0.544 + 1.008i | 0.072 + 0.809i | 0.073 + 0.985i | 0.520 + 0.664i | 0.269 + 1.320i | 0.072 + 0.647i | 0.086 + 1.189i |
| 24.7 | 0.534 + 0.828i | 0.545 + 1.008i | 0.073 + 0.811i | 0.074 + 0.986i | 0.523 + 0.664i | 0.268 + 1.318i | 0.072 + 0.650i | 0.086 + 1.188i |
| 24.8 | 0.534 + 0.829i | 0.546 + 1.009i | 0.073 + 0.811i | 0.074 + 0.986i | 0.523 + 0.665i | 0.268 + 1.317i | 0.072 + 0.650i | 0.086 + 1.187i |
| 24.9 | 0.536 + 0.830i | 0.548 + 1.009i | 0.074 + 0.812i | 0.075 + 0.987i | 0.524 + 0.667i | 0.268 + 1.315i | 0.073 + 0.651i | 0.086 + 1.186i |
| 25 | 0.536 + 0.831i | 0.548 + 1.010i | 0.074 + 0.814i | 0.075 + 0.988i | 0.525 + 0.667i | 0.269 + 1.315i | 0.073 + 0.653i | 0.087 + 1.186i |

| SNR | a33 | a34 | a35 | a36 | a37 | a38 | a39 | a40 |
|---|---|---|---|---|---|---|---|---|
| 10 | 0.317 + 0.178i | 0.317 + 0.164i | 0.576 + 0.312i | 0.611 + 0.218i | 0.319 + 0.179i | 0.316 + 0.165i | 0.582 + 0.315i | 0.620 + 0.219i |
| 10.1 | 0.315 + 0.176i | 0.316 + 0.162i | 0.579 + 0.314i | 0.616 + 0.217i | 0.316 + 0.178i | 0.315 + 0.163i | 0.584 + 0.317i | 0.624 + 0.217i |
| 10.2 | 0.314 + 0.175i | 0.315 + 0.161i | 0.582 + 0.316i | 0.621 + 0.215i | 0.315 + 0.176i | 0.313 + 0.162i | 0.586 + 0.319i | 0.628 + 0.215i |
| 10.3 | 0.313 + 0.174i | 0.314 + 0.160i | 0.584 + 0.319i | 0.625 + 0.213i | 0.313 + 0.175i | 0.311 + 0.160i | 0.588 + 0.321i | 0.632 + 0.213i |
| 10.4 | 0.311 + 0.173i | 0.313 + 0.158i | 0.586 + 0.321i | 0.630 + 0.211i | 0.311 + 0.174i | 0.310 + 0.158i | 0.590 + 0.323i | 0.636 + 0.211i |
| 10.5 | 0.310 + 0.173i | 0.312 + 0.157i | 0.588 + 0.323i | 0.634 + 0.209i | 0.310 + 0.173i | 0.310 + 0.157i | 0.591 + 0.325i | 0.639 + 0.209i |
| 10.6 | 0.309 + 0.172i | 0.311 + 0.156i | 0.589 + 0.325i | 0.638 + 0.207i | 0.309 + 0.172i | 0.309 + 0.156i | 0.592 + 0.327i | 0.643 + 0.207i |
| 10.7 | 0.309 + 0.171i | 0.311 + 0.155i | 0.591 + 0.327i | 0.641 + 0.205i | 0.308 + 0.171i | 0.308 + 0.155i | 0.594 + 0.329i | 0.646 + 0.205i |
| 10.8 | 0.308 + 0.171i | 0.311 + 0.153i | 0.593 + 0.329i | 0.645 + 0.203i | 0.307 + 0.171i | 0.307 + 0.153i | 0.595 + 0.331i | 0.649 + 0.203i |
| 10.9 | 0.307 + 0.170i | 0.309 + 0.153i | 0.594 + 0.331i | 0.649 + 0.201i | 0.306 + 0.170i | 0.306 + 0.153i | 0.596 + 0.333i | 0.652 + 0.201i |
| 11 | 0.307 + 0.170i | 0.309 + 0.152i | 0.595 + 0.333i | 0.652 + 0.199i | 0.305 + 0.170i | 0.306 + 0.152i | 0.597 + 0.335i | 0.654 + 0.199i |
| 11.1 | 0.307 + 0.169i | 0.309 + 0.151i | 0.596 + 0.335i | 0.655 + 0.197i | 0.304 + 0.169i | 0.306 + 0.151i | 0.597 + 0.337i | 0.657 + 0.197i |
| 11.2 | 0.307 + 0.169i | 0.309 + 0.150i | 0.598 + 0.337i | 0.658 + 0.195i | 0.304 + 0.169i | 0.306 + 0.150i | 0.598 + 0.339i | 0.660 + 0.195i |
| 11.3 | 0.306 + 0.169i | 0.309 + 0.149i | 0.598 + 0.339i | 0.661 + 0.193i | 0.304 + 0.169i | 0.305 + 0.149i | 0.599 + 0.342i | 0.662 + 0.193i |
| 11.4 | 0.306 + 0.169i | 0.309 + 0.148i | 0.599 + 0.342i | 0.663 + 0.191i | 0.304 + 0.168i | 0.305 + 0.148i | 0.599 + 0.344i | 0.664 + 0.191i |
| 11.5 | 0.306 + 0.168i | 0.309 + 0.147i | 0.600 + 0.343i | 0.665 + 0.189i | 0.303 + 0.168i | 0.305 + 0.147i | 0.600 + 0.346i | 0.666 + 0.188i |
| 11.6 | 0.306 + 0.168i | 0.309 + 0.146i | 0.600 + 0.345i | 0.666 + 0.187i | 0.303 + 0.167i | 0.305 + 0.146i | 0.599 + 0.347i | 0.667 + 0.186i |
| 11.7 | 0.305 + 0.167i | 0.308 + 0.145i | 0.600 + 0.346i | 0.668 + 0.185i | 0.302 + 0.167i | 0.305 + 0.145i | 0.599 + 0.350i | 0.668 + 0.184i |
| 11.8 | 0.305 + 0.167i | 0.308 + 0.144i | 0.600 + 0.347i | 0.670 + 0.184i | 0.302 + 0.166i | 0.304 + 0.144i | 0.599 + 0.351i | 0.670 + 0.182i |
| 11.9 | 0.304 + 0.167i | 0.308 + 0.144i | 0.600 + 0.349i | 0.671 + 0.182i | 0.301 + 0.166i | 0.304 + 0.144i | 0.599 + 0.353i | 0.671 + 0.180i |
| 12 | 0.304 + 0.166i | 0.308 + 0.142i | 0.600 + 0.351i | 0.672 + 0.180i | 0.301 + 0.166i | 0.305 + 0.142i | 0.599 + 0.354i | 0.671 + 0.178i |
| 12.1 | 0.304 + 0.166i | 0.308 + 0.142i | 0.601 + 0.352i | 0.673 + 0.178i | 0.301 + 0.165i | 0.305 + 0.142i | 0.598 + 0.356i | 0.672 + 0.176i |
| 12.2 | 0.304 + 0.165i | 0.308 + 0.141i | 0.600 + 0.353i | 0.674 + 0.177i | 0.301 + 0.165i | 0.305 + 0.141i | 0.598 + 0.357i | 0.673 + 0.174i |
| 12.3 | 0.304 + 0.165i | 0.308 + 0.140i | 0.601 + 0.355i | 0.676 + 0.175i | 0.301 + 0.165i | 0.305 + 0.140i | 0.598 + 0.359i | 0.674 + 0.173i |
| 12.4 | 0.304 + 0.165i | 0.310 + 0.139i | 0.601 + 0.356i | 0.677 + 0.173i | 0.301 + 0.165i | 0.306 + 0.139i | 0.598 + 0.361i | 0.675 + 0.171i |
| 12.5 | 0.305 + 0.164i | 0.310 + 0.138i | 0.601 + 0.358i | 0.678 + 0.172i | 0.301 + 0.164i | 0.307 + 0.138i | 0.598 + 0.362i | 0.675 + 0.169i |
| 12.6 | 0.305 + 0.164i | 0.311 + 0.137i | 0.601 + 0.359i | 0.679 + 0.170i | 0.302 + 0.164i | 0.309 + 0.137i | 0.597 + 0.363i | 0.676 + 0.167i |
| 12.7 | 0.305 + 0.163i | 0.312 + 0.136i | 0.601 + 0.361i | 0.680 + 0.169i | 0.302 + 0.163i | 0.310 + 0.136i | 0.597 + 0.365i | 0.677 + 0.166i |
| 12.8 | 0.326 + 0.161i | 0.336 + 0.132i | 0.606 + 0.366i | 0.700 + 0.168i | 0.322 + 0.161i | 0.333 + 0.132i | 0.600 + 0.368i | 0.694 + 0.166i |
| 12.9 | 0.337 + 0.163i | 0.350 + 0.131i | 0.605 + 0.372i | 0.706 + 0.168i | 0.333 + 0.162i | 0.348 + 0.130i | 0.600 + 0.373i | 0.701 + 0.165i |
| 13 | 0.348 + 0.164i | 0.365 + 0.129i | 0.605 + 0.378i | 0.713 + 0.168i | 0.345 + 0.163i | 0.363 + 0.129i | 0.599 + 0.379i | 0.708 + 0.165i |
| 13.1 | 0.354 + 0.164i | 0.373 + 0.128i | 0.605 + 0.381i | 0.718 + 0.167i | 0.351 + 0.164i | 0.371 + 0.127i | 0.599 + 0.382i | 0.711 + 0.164i |
| 13.2 | 0.362 + 0.165i | 0.384 + 0.126i | 0.605 + 0.386i | 0.724 + 0.166i | 0.359 + 0.165i | 0.382 + 0.126i | 0.598 + 0.386i | 0.718 + 0.162i |
| 13.3 | 0.365 + 0.165i | 0.388 + 0.125i | 0.604 + 0.388i | 0.727 + 0.165i | 0.362 + 0.165i | 0.386 + 0.125i | 0.597 + 0.388i | 0.720 + 0.161i |
| 13.4 | 0.371 + 0.167i | 0.396 + 0.124i | 0.603 + 0.391i | 0.733 + 0.164i | 0.369 + 0.166i | 0.394 + 0.124i | 0.596 + 0.391i | 0.726 + 0.160i |
| 13.5 | 0.375 + 0.167i | 0.401 + 0.123i | 0.603 + 0.393i | 0.738 + 0.162i | 0.373 + 0.167i | 0.400 + 0.123i | 0.595 + 0.393i | 0.730 + 0.158i |

-continued

| 256NUC | | | | | | | | |
|---|---|---|---|---|---|---|---|---|
| 13.6 | 0.378 + 0.167i | 0.405 + 0.122i | 0.602 + 0.396i | 0.742 + 0.161i | 0.376 + 0.167i | 0.403 + 0.122i | 0.594 + 0.394i | 0.732 + 0.157i |
| 13.7 | 0.400 + 0.165i | 0.435 + 0.119i | 0.604 + 0.407i | 0.769 + 0.159i | 0.399 + 0.164i | 0.433 + 0.119i | 0.596 + 0.405i | 0.755 + 0.159i |
| 13.8 | 0.402 + 0.165i | 0.437 + 0.118i | 0.604 + 0.409i | 0.773 + 0.158i | 0.400 + 0.165i | 0.436 + 0.118i | 0.595 + 0.407i | 0.758 + 0.157i |
| 13.9 | 0.403 + 0.165i | 0.440 + 0.117i | 0.603 + 0.412i | 0.777 + 0.156i | 0.403 + 0.165i | 0.440 + 0.117i | 0.593 + 0.409i | 0.762 + 0.155i |
| 14 | 0.405 + 0.166i | 0.442 + 0.117i | 0.602 + 0.414i | 0.781 + 0.155i | 0.405 + 0.166i | 0.442 + 0.117i | 0.592 + 0.410i | 0.765 + 0.153i |
| 14.1 | 0.406 + 0.166i | 0.444 + 0.117i | 0.601 + 0.416i | 0.784 + 0.153i | 0.406 + 0.166i | 0.444 + 0.117i | 0.591 + 0.411i | 0.768 + 0.151i |
| 14.2 | 0.407 + 0.166i | 0.446 + 0.116i | 0.600 + 0.418i | 0.788 + 0.152i | 0.408 + 0.166i | 0.448 + 0.116i | 0.589 + 0.413i | 0.771 + 0.150i |
| 14.3 | 0.408 + 0.166i | 0.448 + 0.115i | 0.599 + 0.421i | 0.790 + 0.150i | 0.409 + 0.167i | 0.449 + 0.115i | 0.588 + 0.415i | 0.772 + 0.148i |
| 14.4 | 0.409 + 0.166i | 0.450 + 0.115i | 0.598 + 0.422i | 0.794 + 0.149i | 0.411 + 0.168i | 0.452 + 0.115i | 0.586 + 0.416i | 0.775 + 0.147i |
| 14.5 | 0.410 + 0.167i | 0.452 + 0.115i | 0.598 + 0.425i | 0.796 + 0.148i | 0.412 + 0.168i | 0.455 + 0.115i | 0.585 + 0.418i | 0.777 + 0.145i |
| 14.6 | 0.411 + 0.167i | 0.454 + 0.114i | 0.597 + 0.427i | 0.799 + 0.147i | 0.414 + 0.169i | 0.457 + 0.115i | 0.584 + 0.419i | 0.779 + 0.144i |
| 14.7 | 0.412 + 0.168i | 0.456 + 0.114i | 0.596 + 0.429i | 0.802 + 0.145i | 0.415 + 0.169i | 0.460 + 0.114i | 0.583 + 0.421i | 0.781 + 0.142i |
| 14.8 | 0.413 + 0.168i | 0.458 + 0.113i | 0.595 + 0.432i | 0.804 + 0.144i | 0.416 + 0.170i | 0.463 + 0.114i | 0.581 + 0.422i | 0.783 + 0.141i |
| 14.9 | 0.413 + 0.168i | 0.459 + 0.113i | 0.595 + 0.434i | 0.806 + 0.144i | 0.418 + 0.171i | 0.465 + 0.113i | 0.580 + 0.424i | 0.784 + 0.139i |
| 15 | 0.414 + 0.168i | 0.461 + 0.112i | 0.594 + 0.437i | 0.808 + 0.142i | 0.419 + 0.172i | 0.468 + 0.113i | 0.579 + 0.425i | 0.785 + 0.137i |
| 15.1 | 0.414 + 0.168i | 0.463 + 0.112i | 0.594 + 0.439i | 0.811 + 0.141i | 0.420 + 0.172i | 0.471 + 0.113i | 0.578 + 0.427i | 0.787 + 0.136i |
| 15.2 | 0.415 + 0.168i | 0.465 + 0.111i | 0.593 + 0.441i | 0.812 + 0.139i | 0.422 + 0.173i | 0.474 + 0.112i | 0.576 + 0.428i | 0.788 + 0.134i |
| 15.3 | 0.415 + 0.168i | 0.467 + 0.110i | 0.593 + 0.444i | 0.814 + 0.139i | 0.422 + 0.174i | 0.477 + 0.112i | 0.575 + 0.430i | 0.789 + 0.133i |
| 15.4 | 0.415 + 0.167i | 0.468 + 0.110i | 0.593 + 0.447i | 0.816 + 0.138i | 0.423 + 0.174i | 0.479 + 0.112i | 0.574 + 0.432i | 0.790 + 0.132i |
| 15.5 | 0.963 + 0.512i | 1.064 + 0.265i | 1.210 + 0.626i | 1.313 + 0.378i | 0.878 + 0.629i | 1.094 + 0.136i | 1.074 + 0.831i | 1.354 + 0.140i |
| 15.6 | 0.969 + 0.514i | 1.071 + 0.273i | 1.210 + 0.630i | 1.314 + 0.383i | 0.878 + 0.638i | 1.103 + 0.133i | 1.070 + 0.837i | 1.358 + 0.139i |
| 15.7 | 0.975 + 0.516i | 1.076 + 0.280i | 1.210 + 0.633i | 1.316 + 0.387i | 0.878 + 0.647i | 1.111 + 0.131i | 1.067 + 0.843i | 1.361 + 0.138i |
| 15.8 | 0.980 + 0.518i | 1.081 + 0.287i | 1.210 + 0.636i | 1.317 + 0.390i | 0.878 + 0.654i | 1.117 + 0.128i | 1.064 + 0.848i | 1.365 + 0.138i |
| 15.9 | 0.984 + 0.519i | 1.083 + 0.291i | 1.210 + 0.637i | 1.317 + 0.391i | 0.878 + 0.660i | 1.122 + 0.126i | 1.062 + 0.850i | 1.366 + 0.137i |
| 16 | 0.988 + 0.520i | 1.086 + 0.295i | 1.210 + 0.639i | 1.318 + 0.393i | 0.879 + 0.667i | 1.125 + 0.124i | 1.061 + 0.853i | 1.367 + 0.136i |
| 16.1 | 0.991 + 0.521i | 1.088 + 0.299i | 1.210 + 0.640i | 1.317 + 0.393i | 0.880 + 0.672i | 1.129 + 0.122i | 1.060 + 0.855i | 1.367 + 0.136i |
| 16.2 | 0.993 + 0.521i | 1.089 + 0.302i | 1.209 + 0.639i | 1.317 + 0.394i | 0.880 + 0.676i | 1.130 + 0.121i | 1.059 + 0.855i | 1.367 + 0.136i |
| 16.3 | 0.995 + 0.521i | 1.090 + 0.304i | 1.209 + 0.639i | 1.316 + 0.393i | 0.880 + 0.679i | 1.131 + 0.119i | 1.059 + 0.855i | 1.366 + 0.135i |
| 16.4 | 0.997 + 0.521i | 1.091 + 0.306i | 1.209 + 0.638i | 1.315 + 0.392i | 0.881 + 0.683i | 1.132 + 0.118i | 1.059 + 0.856i | 1.364 + 0.134i |
| 16.5 | 0.998 + 0.521i | 1.091 + 0.308i | 1.208 + 0.638i | 1.314 + 0.393i | 0.880 + 0.685i | 1.133 + 0.116i | 1.059 + 0.855i | 1.364 + 0.134i |
| 16.6 | 0.999 + 0.521i | 1.090 + 0.309i | 1.207 + 0.636i | 1.313 + 0.392i | 0.880 + 0.688i | 1.133 + 0.115i | 1.059 + 0.855i | 1.363 + 0.133i |
| 16.7 | 1.000 + 0.521i | 1.090 + 0.311i | 1.206 + 0.635i | 1.311 + 0.391i | 0.880 + 0.690i | 1.133 + 0.113i | 1.059 + 0.854i | 1.362 + 0.133i |
| 16.8 | 0.999 + 0.520i | 1.089 + 0.312i | 1.205 + 0.634i | 1.309 + 0.390i | 0.880 + 0.692i | 1.131 + 0.113i | 1.059 + 0.853i | 1.359 + 0.133i |
| 16.9 | 1.000 + 0.520i | 1.088 + 0.313i | 1.204 + 0.633i | 1.307 + 0.389i | 0.880 + 0.694i | 1.130 + 0.112i | 1.059 + 0.851i | 1.356 + 0.132i |
| 17 | 0.999 + 0.520i | 1.087 + 0.313i | 1.203 + 0.632i | 1.306 + 0.388i | 0.880 + 0.695i | 1.129 + 0.111i | 1.060 + 0.850i | 1.355 + 0.131i |
| 17.1 | 0.999 + 0.518i | 1.086 + 0.313i | 1.202 + 0.629i | 1.304 + 0.386i | 0.880 + 0.695i | 1.128 + 0.110i | 1.060 + 0.848i | 1.353 + 0.131i |
| 17.2 | 1.000 + 0.517i | 1.086 + 0.314i | 1.202 + 0.629i | 1.303 + 0.386i | 0.880 + 0.697i | 1.128 + 0.109i | 1.060 + 0.847i | 1.352 + 0.130i |
| 17.3 | 1.001 + 0.517i | 1.087 + 0.315i | 1.201 + 0.629i | 1.303 + 0.386i | 0.881 + 0.697i | 1.128 + 0.108i | 1.060 + 0.846i | 1.352 + 0.130i |
| 17.4 | 1.002 + 0.517i | 1.087 + 0.315i | 1.201 + 0.627i | 1.303 + 0.385i | 0.881 + 0.697i | 1.128 + 0.108i | 1.060 + 0.846i | 1.351 + 0.130i |
| 17.5 | 1.002 + 0.517i | 1.087 + 0.315i | 1.201 + 0.627i | 1.303 + 0.384i | 0.882 + 0.698i | 1.129 + 0.108i | 1.061 + 0.845i | 1.351 + 0.130i |
| 17.6 | 1.003 + 0.517i | 1.087 + 0.316i | 1.201 + 0.627i | 1.302 + 0.384i | 0.882 + 0.699i | 1.129 + 0.108i | 1.062 + 0.845i | 1.350 + 0.130i |
| 17.7 | 1.004 + 0.516i | 1.088 + 0.316i | 1.202 + 0.626i | 1.302 + 0.383i | 0.884 + 0.699i | 1.129 + 0.107i | 1.063 + 0.843i | 1.350 + 0.129i |
| 17.8 | 1.005 + 0.516i | 1.088 + 0.316i | 1.202 + 0.626i | 1.302 + 0.383i | 0.885 + 0.699i | 1.130 + 0.107i | 1.063 + 0.843i | 1.351 + 0.129i |
| 17.9 | 0.961 + 0.424i | 0.998 + 0.239i | 1.214 + 0.479i | 1.201 + 0.287i | 0.919 + 0.571i | 1.013 + 0.094i | 1.141 + 0.690i | 1.225 + 0.110i |
| 18 | 0.961 + 0.422i | 0.998 + 0.241i | 1.213 + 0.479i | 1.200 + 0.288i | 0.918 + 0.573i | 1.013 + 0.093i | 1.138 + 0.690i | 1.224 + 0.109i |
| 18.1 | 0.961 + 0.423i | 0.998 + 0.244i | 1.211 + 0.480i | 1.199 + 0.290i | 0.916 + 0.576i | 1.013 + 0.092i | 1.136 + 0.691i | 1.223 + 0.108i |
| 18.2 | 0.961 + 0.423i | 0.998 + 0.245i | 1.210 + 0.481i | 1.200 + 0.290i | 0.915 + 0.577i | 1.014 + 0.091i | 1.133 + 0.691i | 1.224 + 0.108i |
| 18.3 | 0.962 + 0.422i | 0.999 + 0.247i | 1.208 + 0.482i | 1.201 + 0.291i | 0.914 + 0.580i | 1.015 + 0.089i | 1.131 + 0.692i | 1.224 + 0.108i |
| 18.4 | 0.963 + 0.422i | 1.000 + 0.247i | 1.208 + 0.482i | 1.201 + 0.290i | 0.915 + 0.581i | 1.016 + 0.089i | 1.131 + 0.693i | 1.224 + 0.107i |
| 18.5 | 0.959 + 0.410i | 0.991 + 0.239i | 1.211 + 0.463i | 1.191 + 0.278i | 0.924 + 0.563i | 1.002 + 0.087i | 1.142 + 0.672i | 1.212 + 0.102i |
| 18.6 | 0.959 + 0.409i | 0.989 + 0.239i | 1.209 + 0.463i | 1.189 + 0.277i | 0.922 + 0.563i | 1.001 + 0.085i | 1.140 + 0.671i | 1.211 + 0.101i |
| 18.7 | 0.949 + 0.412i | 0.981 + 0.243i | 1.199 + 0.463i | 1.179 + 0.278i | 0.911 + 0.566i | 0.993 + 0.086i | 1.131 + 0.668i | 1.199 + 0.102i |
| 18.8 | 0.948 + 0.412i | 0.980 + 0.245i | 1.197 + 0.463i | 1.178 + 0.279i | 0.910 + 0.568i | 0.993 + 0.085i | 1.129 + 0.669i | 1.198 + 0.102i |
| 18.9 | 0.949 + 0.412i | 0.980 + 0.246i | 1.196 + 0.463i | 1.178 + 0.279i | 0.910 + 0.569i | 0.992 + 0.084i | 1.128 + 0.669i | 1.197 + 0.101i |
| 19 | 0.949 + 0.412i | 0.980 + 0.246i | 1.195 + 0.463i | 1.177 + 0.278i | 0.910 + 0.570i | 0.992 + 0.083i | 1.127 + 0.669i | 1.196 + 0.100i |
| 19.1 | 0.949 + 0.412i | 0.979 + 0.247i | 1.195 + 0.463i | 1.177 + 0.278i | 0.911 + 0.571i | 0.992 + 0.083i | 1.127 + 0.669i | 1.195 + 0.099i |
| 19.2 | 0.336 + 0.092i | 0.505 + 0.073i | 0.617 + 0.560i | 0.786 + 0.094i | 0.331 + 0.090i | 0.531 + 0.072i | 0.528 + 0.570i | 0.729 + 0.083i |
| 19.3 | 0.336 + 0.092i | 0.505 + 0.073i | 0.621 + 0.559i | 0.787 + 0.094i | 0.331 + 0.090i | 0.531 + 0.072i | 0.528 + 0.568i | 0.727 + 0.082i |
| 19.4 | 0.336 + 0.092i | 0.504 + 0.073i | 0.625 + 0.559i | 0.788 + 0.093i | 0.331 + 0.090i | 0.532 + 0.071i | 0.527 + 0.568i | 0.725 + 0.082i |
| 19.5 | 0.337 + 0.093i | 0.504 + 0.073i | 0.630 + 0.558i | 0.789 + 0.093i | 0.331 + 0.090i | 0.533 + 0.071i | 0.527 + 0.566i | 0.724 + 0.081i |
| 19.6 | 0.337 + 0.093i | 0.503 + 0.073i | 0.632 + 0.559i | 0.790 + 0.093i | 0.330 + 0.090i | 0.534 + 0.071i | 0.527 + 0.565i | 0.723 + 0.081i |
| 19.7 | 0.337 + 0.093i | 0.503 + 0.073i | 0.636 + 0.559i | 0.791 + 0.093i | 0.331 + 0.090i | 0.535 + 0.071i | 0.526 + 0.565i | 0.721 + 0.081i |
| 19.8 | 0.338 + 0.093i | 0.502 + 0.073i | 0.638 + 0.560i | 0.793 + 0.093i | 0.331 + 0.089i | 0.536 + 0.071i | 0.527 + 0.564i | 0.720 + 0.080i |
| 19.9 | 0.339 + 0.094i | 0.502 + 0.073i | 0.641 + 0.560i | 0.795 + 0.093i | 0.330 + 0.089i | 0.538 + 0.070i | 0.527 + 0.563i | 0.719 + 0.079i |
| 20 | 0.339 + 0.094i | 0.501 + 0.073i | 0.643 + 0.560i | 0.797 + 0.093i | 0.330 + 0.089i | 0.539 + 0.070i | 0.526 + 0.562i | 0.718 + 0.079i |
| 20.1 | 0.340 + 0.095i | 0.501 + 0.073i | 0.645 + 0.561i | 0.800 + 0.093i | 0.330 + 0.088i | 0.541 + 0.070i | 0.527 + 0.561i | 0.718 + 0.079i |
| 20.2 | 0.341 + 0.095i | 0.500 + 0.073i | 0.647 + 0.561i | 0.802 + 0.094i | 0.330 + 0.087i | 0.543 + 0.070i | 0.527 + 0.561i | 0.717 + 0.078i |
| 20.3 | 0.342 + 0.095i | 0.500 + 0.073i | 0.649 + 0.562i | 0.806 + 0.094i | 0.329 + 0.086i | 0.547 + 0.069i | 0.528 + 0.560i | 0.718 + 0.078i |
| 20.4 | 0.342 + 0.097i | 0.498 + 0.073i | 0.651 + 0.562i | 0.809 + 0.095i | 0.328 + 0.084i | 0.549 + 0.069i | 0.529 + 0.560i | 0.717 + 0.078i |
| 20.5 | 0.288 + 0.115i | 0.423 + 0.069i | 0.680 + 0.548i | 0.793 + 0.094i | 0.236 + 0.059i | 0.537 + 0.064i | 0.565 + 0.550i | 0.675 + 0.076i |
| 20.6 | 0.286 + 0.116i | 0.420 + 0.068i | 0.682 + 0.548i | 0.794 + 0.094i | 0.231 + 0.058i | 0.540 + 0.064i | 0.567 + 0.550i | 0.675 + 0.077i |
| 20.7 | 0.283 + 0.118i | 0.417 + 0.067i | 0.685 + 0.548i | 0.796 + 0.094i | 0.227 + 0.058i | 0.541 + 0.064i | 0.570 + 0.550i | 0.674 + 0.077i |
| 20.8 | 0.282 + 0.120i | 0.415 + 0.066i | 0.708 + 0.550i | 0.804 + 0.094i | 0.220 + 0.056i | 0.550 + 0.064i | 0.593 + 0.560i | 0.680 + 0.077i |
| 20.9 | 0.281 + 0.122i | 0.416 + 0.065i | 0.711 + 0.552i | 0.806 + 0.095i | 0.220 + 0.055i | 0.552 + 0.064i | 0.595 + 0.561i | 0.681 + 0.077i |
| 21 | 0.281 + 0.124i | 0.415 + 0.065i | 0.713 + 0.554i | 0.808 + 0.095i | 0.219 + 0.055i | 0.554 + 0.065i | 0.597 + 0.562i | 0.682 + 0.077i |
| 21.1 | 0.280 + 0.126i | 0.415 + 0.065i | 0.716 + 0.556i | 0.809 + 0.094i | 0.219 + 0.055i | 0.555 + 0.065i | 0.600 + 0.563i | 0.683 + 0.077i |
| 21.2 | 0.280 + 0.128i | 0.415 + 0.064i | 0.720 + 0.557i | 0.811 + 0.094i | 0.218 + 0.054i | 0.557 + 0.065i | 0.605 + 0.565i | 0.684 + 0.078i |

-continued

| 256NUC | | | | | | | | |
|---|---|---|---|---|---|---|---|---|
| 21.3 | 0.280 + 0.130i | 0.415 + 0.064i | 0.724 + 0.559i | 0.814 + 0.094i | 0.218 + 0.054i | 0.558 + 0.065i | 0.607 + 0.567i | 0.685 + 0.078i |
| 21.4 | 0.280 + 0.132i | 0.415 + 0.063i | 0.727 + 0.561i | 0.815 + 0.094i | 0.219 + 0.054i | 0.559 + 0.065i | 0.610 + 0.569i | 0.686 + 0.078i |
| 21.5 | 0.280 + 0.133i | 0.416 + 0.064i | 0.729 + 0.564i | 0.816 + 0.094i | 0.220 + 0.054i | 0.561 + 0.065i | 0.612 + 0.570i | 0.687 + 0.078i |
| 21.6 | 0.280 + 0.135i | 0.416 + 0.064i | 0.733 + 0.565i | 0.818 + 0.094i | 0.221 + 0.054i | 0.562 + 0.065i | 0.615 + 0.572i | 0.689 + 0.078i |
| 21.7 | 0.280 + 0.137i | 0.417 + 0.063i | 0.735 + 0.567i | 0.819 + 0.094i | 0.222 + 0.054i | 0.563 + 0.065i | 0.617 + 0.572i | 0.689 + 0.078i |
| 21.8 | 0.280 + 0.138i | 0.417 + 0.063i | 0.738 + 0.559i | 0.820 + 0.093i | 0.223 + 0.054i | 0.564 + 0.065i | 0.619 + 0.573i | 0.690 + 0.079i |
| 21.9 | 0.280 + 0.140i | 0.417 + 0.063i | 0.741 + 0.570i | 0.821 + 0.093i | 0.223 + 0.054i | 0.564 + 0.065i | 0.621 + 0.574i | 0.690 + 0.079i |
| 22 | 0.280 + 0.142i | 0.418 + 0.063i | 0.744 + 0.572i | 0.823 + 0.093i | 0.225 + 0.054i | 0.565 + 0.065i | 0.622 + 0.575i | 0.692 + 0.079i |
| 22.1 | 0.280 + 0.143i | 0.418 + 0.062i | 0.747 + 0.573i | 0.824 + 0.093i | 0.226 + 0.054i | 0.566 + 0.065i | 0.625 + 0.577i | 0.692 + 0.079i |
| 22.2 | 0.281 + 0.144i | 0.419 + 0.063i | 0.751 + 0.575i | 0.826 + 0.093i | 0.227 + 0.054i | 0.568 + 0.065i | 0.627 + 0.578i | 0.694 + 0.080i |
| 22.3 | 0.282 + 0.146i | 0.420 + 0.063i | 0.754 + 0.575i | 0.828 + 0.093i | 0.229 + 0.055i | 0.569 + 0.065i | 0.631 + 0.579i | 0.696 + 0.080i |
| 22.4 | 0.283 + 0.147i | 0.421 + 0.063i | 0.767 + 0.567i | 0.830 + 0.092i | 0.231 + 0.055i | 0.570 + 0.065i | 0.644 + 0.596i | 0.697 + 0.080i |
| 22.5 | 0.283 + 0.148i | 0.422 + 0.063i | 0.770 + 0.567i | 0.832 + 0.092i | 0.232 + 0.055i | 0.571 + 0.066i | 0.646 + 0.598i | 0.698 + 0.081i |
| 22.6 | 0.776 + 0.335i | 0.782 + 0.192i | 0.937 + 0.338i | 0.965 + 0.205i | 0.791 + 0.484i | 0.796 + 0.063i | 0.980 + 0.473i | 0.993 + 0.068i |
| 22.7 | 0.776 + 0.336i | 0.783 + 0.193i | 0.937 + 0.340i | 0.965 + 0.205i | 0.792 + 0.485i | 0.797 + 0.063i | 0.981 + 0.475i | 0.993 + 0.068i |
| 22.8 | 0.777 + 0.337i | 0.783 + 0.194i | 0.938 + 0.341i | 0.964 + 0.206i | 0.794 + 0.486i | 0.798 + 0.063i | 0.982 + 0.476i | 0.993 + 0.069i |
| 22.9 | 0.778 + 0.339i | 0.784 + 0.195i | 0.939 + 0.341i | 0.964 + 0.206i | 0.795 + 0.487i | 0.799 + 0.063i | 0.982 + 0.477i | 0.993 + 0.069i |
| 23 | 0.779 + 0.339i | 0.785 + 0.196i | 0.939 + 0.342i | 0.965 + 0.207i | 0.796 + 0.488i | 0.801 + 0.064i | 0.982 + 0.479i | 0.994 + 0.069i |
| 23.1 | 0.779 + 0.341i | 0.786 + 0.198i | 0.940 + 0.344i | 0.964 + 0.208i | 0.797 + 0.490i | 0.801 + 0.064i | 0.983 + 0.480i | 0.994 + 0.070i |
| 23.2 | 0.780 + 0.343i | 0.786 + 0.198i | 0.939 + 0.345i | 0.963 + 0.208i | 0.798 + 0.492i | 0.802 + 0.064i | 0.983 + 0.481i | 0.995 + 0.070i |
| 23.3 | 0.780 + 0.344i | 0.787 + 0.199i | 0.940 + 0.346i | 0.963 + 0.208i | 0.799 + 0.492i | 0.803 + 0.065i | 0.983 + 0.482i | 0.995 + 0.070i |
| 23.4 | 0.796 + 0.363i | 0.790 + 0.212i | 0.967 + 0.380i | 0.949 + 0.220i | 0.818 + 0.517i | 0.798 + 0.069i | 1.015 + 0.537i | 0.978 + 0.070i |
| 23.5 | 0.798 + 0.366i | 0.789 + 0.214i | 0.969 + 0.382i | 0.947 + 0.222i | 0.820 + 0.520i | 0.799 + 0.069i | 1.018 + 0.541i | 0.977 + 0.071i |
| 23.6 | 0.798 + 0.367i | 0.790 + 0.215i | 0.970 + 0.383i | 0.947 + 0.222i | 0.822 + 0.522i | 0.800 + 0.069i | 1.020 + 0.543i | 0.978 + 0.071i |
| 23.7 | 0.799 + 0.368i | 0.790 + 0.216i | 0.971 + 0.384i | 0.947 + 0.224i | 0.823 + 0.522i | 0.801 + 0.070i | 1.020 + 0.545i | 0.978 + 0.072i |
| 23.8 | 0.800 + 0.370i | 0.790 + 0.217i | 0.972 + 0.386i | 0.946 + 0.225i | 0.825 + 0.525i | 0.801 + 0.070i | 1.021 + 0.547i | 0.978 + 0.072i |
| 23.9 | 0.800 + 0.370i | 0.789 + 0.217i | 0.972 + 0.386i | 0.945 + 0.225i | 0.826 + 0.526i | 0.802 + 0.071i | 1.021 + 0.549i | 0.978 + 0.072i |
| 24 | 0.801 + 0.371i | 0.789 + 0.217i | 0.972 + 0.387i | 0.945 + 0.226i | 0.827 + 0.526i | 0.803 + 0.071i | 1.021 + 0.550i | 0.979 + 0.072i |
| 24.1 | 0.801 + 0.372i | 0.788 + 0.218i | 0.972 + 0.388i | 0.945 + 0.226i | 0.828 + 0.528i | 0.803 + 0.071i | 1.022 + 0.550i | 0.979 + 0.073i |
| 24.2 | 0.802 + 0.372i | 0.788 + 0.218i | 0.973 + 0.388i | 0.944 + 0.226i | 0.828 + 0.528i | 0.803 + 0.071i | 1.022 + 0.550i | 0.979 + 0.073i |
| 24.3 | 0.800 + 0.374i | 0.787 + 0.220i | 0.969 + 0.385i | 0.941 + 0.226i | 0.827 + 0.530i | 0.803 + 0.072i | 1.017 + 0.544i | 0.978 + 0.073i |
| 24.4 | 0.801 + 0.376i | 0.786 + 0.221i | 0.970 + 0.387i | 0.940 + 0.227i | 0.829 + 0.532i | 0.805 + 0.073i | 1.017 + 0.546i | 0.979 + 0.073i |
| 24.5 | 0.801 + 0.377i | 0.786 + 0.222i | 0.970 + 0.387i | 0.941 + 0.228i | 0.830 + 0.533i | 0.806 + 0.073i | 1.018 + 0.547i | 0.980 + 0.074i |
| 24.6 | 0.803 + 0.377i | 0.786 + 0.222i | 0.971 + 0.388i | 0.941 + 0.228i | 0.830 + 0.534i | 0.808 + 0.073i | 1.018 + 0.548i | 0.981 + 0.074i |
| 24.7 | 0.803 + 0.378i | 0.786 + 0.223i | 0.972 + 0.389i | 0.941 + 0.229i | 0.832 + 0.535i | 0.808 + 0.073i | 1.019 + 0.550i | 0.982 + 0.074i |
| 24.8 | 0.804 + 0.379i | 0.787 + 0.223i | 0.973 + 0.390i | 0.941 + 0.229i | 0.833 + 0.536i | 0.810 + 0.074i | 1.019 + 0.551i | 0.983 + 0.075i |
| 24.9 | 0.804 + 0.379i | 0.787 + 0.224i | 0.973 + 0.390i | 0.941 + 0.230i | 0.834 + 0.537i | 0.811 + 0.074i | 1.019 + 0.552i | 0.984 + 0.076i |
| 25 | 0.806 + 0.381i | 0.787 + 0.225i | 0.973 + 0.391i | 0.941 + 0.231i | 0.835 + 0.538i | 0.814 + 0.074i | 1.020 + 0.552i | 0.985 + 0.076i |

| SNR | a41 | a42 | a43 | a44 | a45 | a46 | a47 | a48 |
|---|---|---|---|---|---|---|---|---|
| 10 | 0.179 + 0.316i | 0.165 + 0.315i | 0.310 + 0.571i | 0.216 + 0.609i | 0.179 + 0.315i | 0.166 + 0.318i | 0.314 + 0.576i | 0.219 + 0.615i |
| 10.1 | 0.178 + 0.315i | 0.164 + 0.313i | 0.311 + 0.574i | 0.215 + 0.613i | 0.178 + 0.312i | 0.164 + 0.316i | 0.316 + 0.579i | 0.217 + 0.619i |
| 10.2 | 0.176 + 0.313i | 0.162 + 0.311i | 0.313 + 0.577i | 0.213 + 0.618i | 0.176 + 0.310i | 0.162 + 0.313i | 0.317 + 0.581i | 0.214 + 0.624i |
| 10.3 | 0.174 + 0.311i | 0.161 + 0.309i | 0.315 + 0.579i | 0.211 + 0.622i | 0.174 + 0.308i | 0.161 + 0.311i | 0.319 + 0.584i | 0.213 + 0.628i |
| 10.4 | 0.174 + 0.310i | 0.160 + 0.308i | 0.316 + 0.581i | 0.208 + 0.627i | 0.173 + 0.306i | 0.160 + 0.310i | 0.321 + 0.585i | 0.210 + 0.632i |
| 10.5 | 0.173 + 0.308i | 0.158 + 0.306i | 0.318 + 0.583i | 0.206 + 0.631i | 0.173 + 0.305i | 0.158 + 0.308i | 0.322 + 0.587i | 0.208 + 0.636i |
| 10.6 | 0.172 + 0.307i | 0.157 + 0.304i | 0.320 + 0.585i | 0.204 + 0.634i | 0.171 + 0.303i | 0.157 + 0.306i | 0.324 + 0.589i | 0.206 + 0.639i |
| 10.7 | 0.171 + 0.306i | 0.156 + 0.304i | 0.322 + 0.586i | 0.203 + 0.637i | 0.171 + 0.302i | 0.156 + 0.305i | 0.326 + 0.590i | 0.204 + 0.642i |
| 10.8 | 0.171 + 0.305i | 0.155 + 0.303i | 0.324 + 0.588i | 0.201 + 0.641i | 0.170 + 0.301i | 0.155 + 0.304i | 0.328 + 0.591i | 0.202 + 0.646i |
| 10.9 | 0.170 + 0.304i | 0.153 + 0.302i | 0.326 + 0.590i | 0.198 + 0.644i | 0.169 + 0.300i | 0.153 + 0.303i | 0.330 + 0.593i | 0.199 + 0.649i |
| 11 | 0.169 + 0.304i | 0.153 + 0.301i | 0.328 + 0.591i | 0.196 + 0.647i | 0.168 + 0.300i | 0.152 + 0.303i | 0.332 + 0.594i | 0.198 + 0.652i |
| 11.1 | 0.169 + 0.304i | 0.152 + 0.301i | 0.330 + 0.591i | 0.195 + 0.650i | 0.168 + 0.299i | 0.152 + 0.302i | 0.334 + 0.595i | 0.196 + 0.655i |
| 11.2 | 0.168 + 0.303i | 0.151 + 0.301i | 0.333 + 0.593i | 0.193 + 0.653i | 0.168 + 0.299i | 0.150 + 0.301i | 0.336 + 0.596i | 0.193 + 0.657i |
| 11.3 | 0.168 + 0.303i | 0.150 + 0.300i | 0.334 + 0.594i | 0.191 + 0.656i | 0.167 + 0.299i | 0.150 + 0.301i | 0.339 + 0.596i | 0.191 + 0.660i |
| 11.4 | 0.167 + 0.302i | 0.148 + 0.299i | 0.336 + 0.594i | 0.189 + 0.658i | 0.166 + 0.298i | 0.148 + 0.300i | 0.340 + 0.597i | 0.189 + 0.662i |
| 11.5 | 0.167 + 0.302i | 0.148 + 0.299i | 0.338 + 0.595i | 0.187 + 0.660i | 0.166 + 0.297i | 0.148 + 0.300i | 0.342 + 0.596i | 0.187 + 0.663i |
| 11.6 | 0.167 + 0.301i | 0.147 + 0.299i | 0.340 + 0.595i | 0.186 + 0.661i | 0.165 + 0.297i | 0.147 + 0.299i | 0.344 + 0.597i | 0.185 + 0.665i |
| 11.7 | 0.166 + 0.301i | 0.146 + 0.298i | 0.342 + 0.595i | 0.184 + 0.662i | 0.165 + 0.296i | 0.146 + 0.299i | 0.346 + 0.596i | 0.183 + 0.665i |
| 11.8 | 0.166 + 0.301i | 0.145 + 0.299i | 0.344 + 0.595i | 0.182 + 0.664i | 0.165 + 0.296i | 0.145 + 0.299i | 0.348 + 0.596i | 0.181 + 0.667i |
| 11.9 | 0.165 + 0.301i | 0.144 + 0.298i | 0.345 + 0.595i | 0.180 + 0.665i | 0.164 + 0.296i | 0.144 + 0.298i | 0.350 + 0.596i | 0.179 + 0.668i |
| 12 | 0.164 + 0.300i | 0.143 + 0.298i | 0.347 + 0.595i | 0.178 + 0.666i | 0.163 + 0.296i | 0.143 + 0.298i | 0.351 + 0.596i | 0.177 + 0.669i |
| 12.1 | 0.164 + 0.300i | 0.142 + 0.298i | 0.349 + 0.595i | 0.177 + 0.667i | 0.163 + 0.295i | 0.142 + 0.298i | 0.353 + 0.596i | 0.175 + 0.670i |
| 12.2 | 0.163 + 0.300i | 0.141 + 0.298i | 0.350 + 0.595i | 0.175 + 0.669i | 0.162 + 0.295i | 0.141 + 0.298i | 0.354 + 0.595i | 0.173 + 0.670i |
| 12.3 | 0.163 + 0.299i | 0.140 + 0.298i | 0.352 + 0.595i | 0.174 + 0.669i | 0.162 + 0.296i | 0.140 + 0.299i | 0.356 + 0.595i | 0.172 + 0.671i |
| 12.4 | 0.162 + 0.299i | 0.139 + 0.299i | 0.353 + 0.595i | 0.172 + 0.670i | 0.161 + 0.296i | 0.139 + 0.299i | 0.358 + 0.595i | 0.170 + 0.671i |
| 12.5 | 0.162 + 0.299i | 0.138 + 0.298i | 0.356 + 0.595i | 0.171 + 0.671i | 0.161 + 0.295i | 0.138 + 0.299i | 0.359 + 0.594i | 0.168 + 0.671i |
| 12.6 | 0.161 + 0.298i | 0.137 + 0.298i | 0.357 + 0.595i | 0.169 + 0.671i | 0.160 + 0.295i | 0.137 + 0.299i | 0.360 + 0.594i | 0.166 + 0.671i |
| 12.7 | 0.161 + 0.298i | 0.136 + 0.298i | 0.358 + 0.595i | 0.168 + 0.671i | 0.160 + 0.295i | 0.136 + 0.299i | 0.361 + 0.593i | 0.165 + 0.671i |
| 12.8 | 0.160 + 0.279i | 0.137 + 0.280i | 0.357 + 0.584i | 0.166 + 0.652i | 0.158 + 0.274i | 0.136 + 0.280i | 0.356 + 0.583i | 0.163 + 0.652i |
| 12.9 | 0.158 + 0.271i | 0.135 + 0.271i | 0.352 + 0.583i | 0.163 + 0.647i | 0.156 + 0.266i | 0.135 + 0.272i | 0.352 + 0.582i | 0.160 + 0.647i |
| 13 | 0.155 + 0.262i | 0.134 + 0.261i | 0.348 + 0.582i | 0.159 + 0.643i | 0.155 + 0.259i | 0.133 + 0.263i | 0.347 + 0.579i | 0.156 + 0.642i |
| 13.1 | 0.154 + 0.258i | 0.133 + 0.256i | 0.346 + 0.581i | 0.158 + 0.641i | 0.153 + 0.255i | 0.132 + 0.258i | 0.344 + 0.578i | 0.155 + 0.639i |
| 13.2 | 0.153 + 0.253i | 0.132 + 0.250i | 0.342 + 0.579i | 0.155 + 0.637i | 0.152 + 0.249i | 0.130 + 0.252i | 0.341 + 0.576i | 0.152 + 0.635i |
| 13.3 | 0.152 + 0.250i | 0.130 + 0.248i | 0.342 + 0.579i | 0.153 + 0.636i | 0.152 + 0.247i | 0.130 + 0.250i | 0.340 + 0.575i | 0.150 + 0.633i |
| 13.4 | 0.152 + 0.245i | 0.130 + 0.242i | 0.341 + 0.578i | 0.151 + 0.633i | 0.151 + 0.243i | 0.128 + 0.245i | 0.338 + 0.573i | 0.148 + 0.630i |
| 13.5 | 0.151 + 0.242i | 0.129 + 0.239i | 0.339 + 0.576i | 0.149 + 0.632i | 0.150 + 0.240i | 0.128 + 0.242i | 0.336 + 0.572i | 0.146 + 0.628i |

-continued

| 256NUC | | | | | | | | |
|---|---|---|---|---|---|---|---|---|
| 13.6 | 0.150 + 0.240i | 0.128 + 0.236i | 0.340 + 0.576i | 0.147 + 0.631i | 0.150 + 0.237i | 0.127 + 0.240i | 0.336 + 0.571i | 0.144 + 0.626i |
| 13.7 | 0.155 + 0.220i | 0.131 + 0.224i | 0.336 + 0.563i | 0.144 + 0.598i | 0.154 + 0.217i | 0.130 + 0.226i | 0.331 + 0.562i | 0.142 + 0.597i |
| 13.8 | 0.155 + 0.218i | 0.130 + 0.222i | 0.337 + 0.563i | 0.143 + 0.596i | 0.154 + 0.215i | 0.129 + 0.225i | 0.332 + 0.561i | 0.141 + 0.596i |
| 13.9 | 0.155 + 0.216i | 0.129 + 0.220i | 0.338 + 0.562i | 0.142 + 0.594i | 0.154 + 0.213i | 0.129 + 0.223i | 0.333 + 0.559i | 0.140 + 0.593i |
| 14 | 0.155 + 0.213i | 0.129 + 0.218i | 0.339 + 0.562i | 0.141 + 0.593i | 0.155 + 0.211i | 0.129 + 0.221i | 0.334 + 0.559i | 0.139 + 0.592i |
| 14.1 | 0.154 + 0.212i | 0.129 + 0.217i | 0.341 + 0.561i | 0.140 + 0.591i | 0.154 + 0.209i | 0.129 + 0.221i | 0.335 + 0.558i | 0.138 + 0.591i |
| 14.2 | 0.155 + 0.209i | 0.128 + 0.216i | 0.342 + 0.561i | 0.139 + 0.590i | 0.154 + 0.207i | 0.128 + 0.219i | 0.336 + 0.557i | 0.137 + 0.589i |
| 14.3 | 0.155 + 0.207i | 0.128 + 0.214i | 0.344 + 0.561i | 0.138 + 0.589i | 0.154 + 0.205i | 0.128 + 0.217i | 0.338 + 0.556i | 0.136 + 0.588i |
| 14.4 | 0.156 + 0.204i | 0.128 + 0.212i | 0.345 + 0.560i | 0.138 + 0.588i | 0.155 + 0.203i | 0.128 + 0.216i | 0.339 + 0.556i | 0.135 + 0.586i |
| 14.5 | 0.156 + 0.202i | 0.127 + 0.211i | 0.347 + 0.560i | 0.136 + 0.586i | 0.155 + 0.201i | 0.127 + 0.214i | 0.340 + 0.555i | 0.134 + 0.585i |
| 14.6 | 0.156 + 0.199i | 0.127 + 0.209i | 0.349 + 0.561i | 0.136 + 0.585i | 0.155 + 0.198i | 0.127 + 0.213i | 0.341 + 0.555i | 0.133 + 0.583i |
| 14.7 | 0.156 + 0.197i | 0.127 + 0.207i | 0.351 + 0.560i | 0.135 + 0.584i | 0.156 + 0.196i | 0.127 + 0.211i | 0.343 + 0.554i | 0.132 + 0.582i |
| 14.8 | 0.156 + 0.194i | 0.127 + 0.205i | 0.352 + 0.560i | 0.134 + 0.583i | 0.156 + 0.194i | 0.127 + 0.210i | 0.344 + 0.554i | 0.132 + 0.581i |
| 14.9 | 0.157 + 0.192i | 0.127 + 0.204i | 0.354 + 0.561i | 0.133 + 0.582i | 0.156 + 0.192i | 0.127 + 0.209i | 0.345 + 0.554i | 0.130 + 0.580i |
| 15 | 0.157 + 0.189i | 0.127 + 0.201i | 0.355 + 0.561i | 0.132 + 0.582i | 0.157 + 0.190i | 0.127 + 0.207i | 0.346 + 0.553i | 0.130 + 0.579i |
| 15.1 | 0.157 + 0.186i | 0.127 + 0.199i | 0.357 + 0.562i | 0.131 + 0.581i | 0.157 + 0.187i | 0.127 + 0.205i | 0.348 + 0.553i | 0.128 + 0.578i |
| 15.2 | 0.158 + 0.182i | 0.127 + 0.196i | 0.358 + 0.563i | 0.130 + 0.581i | 0.157 + 0.184i | 0.127 + 0.204i | 0.349 + 0.553i | 0.128 + 0.577i |
| 15.3 | 0.158 + 0.178i | 0.126 + 0.193i | 0.360 + 0.564i | 0.129 + 0.581i | 0.157 + 0.181i | 0.127 + 0.202i | 0.350 + 0.553i | 0.127 + 0.576i |
| 15.4 | 0.158 + 0.175i | 0.126 + 0.190i | 0.362 + 0.555i | 0.129 + 0.581i | 0.157 + 0.178i | 0.127 + 0.199i | 0.352 + 0.554i | 0.126 + 0.577i |
| 15.5 | 0.833 + 0.453i | 0.921 + 0.201i | 1.518 + 0.797i | 1.643 + 0.482i | 0.787 + 0.530i | 0.934 + 0.127i | 1.324 + 1.073i | 1.689 + 0.157i |
| 15.6 | 0.835 + 0.454i | 0.924 + 0.205i | 1.514 + 0.803i | 1.640 + 0.487i | 0.786 + 0.535i | 0.939 + 0.125i | 1.318 + 1.078i | 1.692 + 0.160i |
| 15.7 | 0.838 + 0.455i | 0.926 + 0.210i | 1.511 + 0.807i | 1.638 + 0.490i | 0.785 + 0.541i | 0.942 + 0.123i | 1.312 + 1.082i | 1.694 + 0.162i |
| 15.8 | 0.839 + 0.456i | 0.929 + 0.214i | 1.507 + 0.810i | 1.636 + 0.494i | 0.783 + 0.544i | 0.946 + 0.122i | 1.307 + 1.086i | 1.696 + 0.163i |
| 15.9 | 0.841 + 0.456i | 0.930 + 0.217i | 1.504 + 0.811i | 1.633 + 0.495i | 0.782 + 0.548i | 0.948 + 0.121i | 1.305 + 1.087i | 1.696 + 0.164i |
| 16 | 0.843 + 0.456i | 0.931 + 0.221i | 1.502 + 0.812i | 1.632 + 0.496i | 0.782 + 0.552i | 0.949 + 0.119i | 1.301 + 1.089i | 1.695 + 0.165i |
| 16.1 | 0.843 + 0.456i | 0.931 + 0.224i | 1.500 + 0.811i | 1.629 + 0.495i | 0.780 + 0.554i | 0.951 + 0.118i | 1.300 + 1.089i | 1.694 + 0.165i |
| 16.2 | 0.844 + 0.456i | 0.932 + 0.226i | 1.498 + 0.810i | 1.627 + 0.495i | 0.779 + 0.557i | 0.952 + 0.117i | 1.299 + 1.088i | 1.692 + 0.165i |
| 16.3 | 0.845 + 0.456i | 0.932 + 0.228i | 1.496 + 0.807i | 1.624 + 0.494i | 0.778 + 0.560i | 0.952 + 0.116i | 1.298 + 1.086i | 1.689 + 0.165i |
| 16.4 | 0.845 + 0.455i | 0.931 + 0.231i | 1.494 + 0.805i | 1.621 + 0.492i | 0.776 + 0.562i | 0.952 + 0.114i | 1.297 + 1.083i | 1.687 + 0.164i |
| 16.5 | 0.846 + 0.455i | 0.931 + 0.233i | 1.492 + 0.803i | 1.619 + 0.491i | 0.775 + 0.564i | 0.953 + 0.113i | 1.296 + 1.082i | 1.685 + 0.164i |
| 16.6 | 0.845 + 0.454i | 0.930 + 0.235i | 1.490 + 0.799i | 1.616 + 0.489i | 0.772 + 0.566i | 0.953 + 0.112i | 1.296 + 1.078i | 1.681 + 0.163i |
| 16.7 | 0.845 + 0.454i | 0.929 + 0.237i | 1.488 + 0.797i | 1.612 + 0.488i | 0.771 + 0.568i | 0.952 + 0.111i | 1.295 + 1.075i | 1.679 + 0.163i |
| 16.8 | 0.845 + 0.454i | 0.928 + 0.239i | 1.486 + 0.793i | 1.608 + 0.485i | 0.768 + 0.571i | 0.952 + 0.109i | 1.295 + 1.072i | 1.674 + 0.162i |
| 16.9 | 0.844 + 0.453i | 0.926 + 0.241i | 1.483 + 0.790i | 1.605 + 0.483i | 0.766 + 0.573i | 0.951 + 0.108i | 1.295 + 1.068i | 1.670 + 0.162i |
| 17 | 0.844 + 0.452i | 0.925 + 0.242i | 1.482 + 0.786i | 1.602 + 0.481i | 0.765 + 0.573i | 0.951 + 0.107i | 1.294 + 1.065i | 1.667 + 0.161i |
| 17.1 | 0.844 + 0.451i | 0.923 + 0.243i | 1.479 + 0.782i | 1.599 + 0.478i | 0.763 + 0.575i | 0.950 + 0.106i | 1.295 + 1.060i | 1.663 + 0.160i |
| 17.2 | 0.845 + 0.449i | 0.923 + 0.245i | 1.478 + 0.780i | 1.597 + 0.476i | 0.762 + 0.575i | 0.949 + 0.104i | 1.293 + 1.057i | 1.661 + 0.159i |
| 17.3 | 0.845 + 0.449i | 0.922 + 0.246i | 1.476 + 0.778i | 1.594 + 0.476i | 0.761 + 0.576i | 0.949 + 0.103i | 1.292 + 1.055i | 1.659 + 0.159i |
| 17.4 | 0.846 + 0.447i | 0.921 + 0.247i | 1.474 + 0.776i | 1.593 + 0.475i | 0.761 + 0.577i | 0.949 + 0.102i | 1.291 + 1.053i | 1.657 + 0.159i |
| 17.5 | 0.846 + 0.446i | 0.921 + 0.248i | 1.472 + 0.775i | 1.590 + 0.474i | 0.760 + 0.578i | 0.950 + 0.101i | 1.290 + 1.051i | 1.655 + 0.159i |
| 17.6 | 0.846 + 0.445i | 0.921 + 0.249i | 1.471 + 0.773i | 1.588 + 0.473i | 0.759 + 0.578i | 0.950 + 0.100i | 1.289 + 1.050i | 1.653 + 0.159i |
| 17.7 | 0.847 + 0.444i | 0.920 + 0.249i | 1.470 + 0.771i | 1.586 + 0.471i | 0.759 + 0.578i | 0.949 + 0.099i | 1.289 + 1.048i | 1.651 + 0.159i |
| 17.8 | 0.848 + 0.442i | 0.920 + 0.250i | 1.468 + 0.770i | 1.585 + 0.471i | 0.759 + 0.578i | 0.949 + 0.098i | 1.288 + 1.046i | 1.650 + 0.159i |
| 17.9 | 0.778 + 0.374i | 0.814 + 0.175i | 1.512 + 0.510i | 1.724 + 0.230i | 0.746 + 0.459i | 0.823 + 0.098i | 1.426 + 0.822i | 1.464 + 0.121i |
| 18 | 0.778 + 0.373i | 0.814 + 0.177i | 1.509 + 0.509i | 1.721 + 0.230i | 0.744 + 0.462i | 0.824 + 0.097i | 1.422 + 0.819i | 1.462 + 0.122i |
| 18.1 | 0.778 + 0.373i | 0.814 + 0.179i | 1.506 + 0.508i | 1.718 + 0.230i | 0.743 + 0.465i | 0.825 + 0.095i | 1.419 + 0.817i | 1.460 + 0.122i |
| 18.2 | 0.779 + 0.372i | 0.814 + 0.180i | 1.503 + 0.508i | 1.716 + 0.232i | 0.743 + 0.467i | 0.826 + 0.095i | 1.414 + 0.815i | 1.460 + 0.123i |
| 18.3 | 0.781 + 0.371i | 0.816 + 0.183i | 1.499 + 0.508i | 1.712 + 0.234i | 0.742 + 0.470i | 0.827 + 0.093i | 1.411 + 0.814i | 1.459 + 0.123i |
| 18.4 | 0.782 + 0.370i | 0.817 + 0.185i | 1.498 + 0.507i | 1.711 + 0.235i | 0.743 + 0.471i | 0.828 + 0.092i | 1.409 + 0.814i | 1.459 + 0.123i |
| 18.5 | 0.775 + 0.361i | 0.803 + 0.179i | 1.498 + 0.487i | 1.707 + 0.216i | 0.741 + 0.457i | 0.814 + 0.091i | 1.418 + 0.790i | 1.448 + 0.120i |
| 18.6 | 0.775 + 0.360i | 0.803 + 0.181i | 1.494 + 0.484i | 1.703 + 0.215i | 0.740 + 0.460i | 0.814 + 0.089i | 1.416 + 0.786i | 1.445 + 0.120i |
| 18.7 | 0.767 + 0.362i | 0.798 + 0.187i | 1.484 + 0.477i | 1.691 + 0.211i | 0.730 + 0.466i | 0.811 + 0.088i | 1.409 + 0.775i | 1.433 + 0.119i |
| 18.8 | 0.768 + 0.362i | 0.799 + 0.190i | 1.481 + 0.475i | 1.686 + 0.209i | 0.729 + 0.470i | 0.811 + 0.086i | 1.406 + 0.772i | 1.429 + 0.119i |
| 18.9 | 0.769 + 0.362i | 0.799 + 0.192i | 1.479 + 0.473i | 1.684 + 0.209i | 0.729 + 0.472i | 0.812 + 0.085i | 1.404 + 0.770i | 1.428 + 0.119i |
| 19 | 0.769 + 0.362i | 0.799 + 0.194i | 1.476 + 0.471i | 1.682 + 0.208i | 0.728 + 0.474i | 0.812 + 0.084i | 1.401 + 0.768i | 1.427 + 0.119i |
| 19.1 | 0.769 + 0.361i | 0.799 + 0.196i | 1.475 + 0.470i | 1.679 + 0.208i | 0.729 + 0.476i | 0.812 + 0.083i | 1.399 + 0.766i | 1.425 + 0.119i |
| 19.2 | 0.191 + 0.115i | 0.069 + 0.122i | 0.339 + 0.693i | 0.166 + 0.735i | 0.189 + 0.109i | 0.069 + 0.120i | 0.409 + 0.648i | 0.084 + 0.745i |
| 19.3 | 0.192 + 0.115i | 0.069 + 0.121i | 0.338 + 0.693i | 0.169 + 0.736i | 0.190 + 0.108i | 0.069 + 0.119i | 0.412 + 0.647i | 0.083 + 0.746i |
| 19.4 | 0.193 + 0.116i | 0.069 + 0.121i | 0.335 + 0.694i | 0.169 + 0.736i | 0.191 + 0.109i | 0.068 + 0.118i | 0.414 + 0.647i | 0.082 + 0.746i |
| 19.5 | 0.194 + 0.116i | 0.068 + 0.121i | 0.333 + 0.694i | 0.171 + 0.736i | 0.191 + 0.109i | 0.068 + 0.118i | 0.416 + 0.646i | 0.080 + 0.747i |
| 19.6 | 0.195 + 0.116i | 0.068 + 0.121i | 0.332 + 0.695i | 0.172 + 0.737i | 0.192 + 0.108i | 0.068 + 0.116i | 0.418 + 0.646i | 0.079 + 0.748i |
| 19.7 | 0.196 + 0.117i | 0.068 + 0.120i | 0.330 + 0.695i | 0.173 + 0.737i | 0.193 + 0.108i | 0.068 + 0.115i | 0.420 + 0.646i | 0.077 + 0.749i |
| 19.8 | 0.197 + 0.118i | 0.068 + 0.120i | 0.328 + 0.696i | 0.174 + 0.737i | 0.193 + 0.107i | 0.068 + 0.114i | 0.421 + 0.646i | 0.076 + 0.749i |
| 19.9 | 0.197 + 0.118i | 0.068 + 0.120i | 0.327 + 0.696i | 0.175 + 0.736i | 0.194 + 0.107i | 0.068 + 0.113i | 0.423 + 0.646i | 0.075 + 0.750i |
| 20 | 0.197 + 0.118i | 0.068 + 0.120i | 0.326 + 0.696i | 0.176 + 0.736i | 0.194 + 0.106i | 0.068 + 0.112i | 0.424 + 0.645i | 0.075 + 0.750i |
| 20.1 | 0.198 + 0.120i | 0.068 + 0.121i | 0.325 + 0.696i | 0.177 + 0.736i | 0.195 + 0.106i | 0.068 + 0.111i | 0.426 + 0.644i | 0.073 + 0.751i |
| 20.2 | 0.199 + 0.121i | 0.068 + 0.122i | 0.324 + 0.696i | 0.178 + 0.736i | 0.196 + 0.105i | 0.068 + 0.109i | 0.427 + 0.644i | 0.072 + 0.750i |
| 20.3 | 0.199 + 0.123i | 0.068 + 0.124i | 0.323 + 0.696i | 0.179 + 0.735i | 0.196 + 0.103i | 0.068 + 0.107i | 0.429 + 0.644i | 0.072 + 0.750i |
| 20.4 | 0.199 + 0.127i | 0.068 + 0.131i | 0.323 + 0.695i | 0.180 + 0.734i | 0.195 + 0.100i | 0.067 + 0.103i | 0.431 + 0.643i | 0.070 + 0.750i |
| 20.5 | 0.164 + 0.204i | 0.067 + 0.240i | 0.360 + 0.710i | 0.207 + 0.758i | 0.117 + 0.084i | 0.048 + 0.100i | 0.476 + 0.642i | 0.071 + 0.775i |
| 20.6 | 0.164 + 0.207i | 0.067 + 0.244i | 0.362 + 0.712i | 0.209 + 0.759i | 0.114 + 0.084i | 0.048 + 0.101i | 0.479 + 0.642i | 0.070 + 0.776i |
| 20.7 | 0.163 + 0.211i | 0.067 + 0.248i | 0.363 + 0.713i | 0.211 + 0.760i | 0.112 + 0.084i | 0.047 + 0.102i | 0.481 + 0.642i | 0.071 + 0.777i |
| 20.8 | 0.166 + 0.217i | 0.071 + 0.255i | 0.367 + 0.709i | 0.213 + 0.748i | 0.106 + 0.084i | 0.046 + 0.109i | 0.496 + 0.642i | 0.071 + 0.761i |
| 20.9 | 0.168 + 0.217i | 0.071 + 0.257i | 0.367 + 0.708i | 0.214 + 0.747i | 0.107 + 0.084i | 0.045 + 0.109i | 0.496 + 0.642i | 0.071 + 0.760i |
| 21 | 0.168 + 0.219i | 0.071 + 0.257i | 0.367 + 0.708i | 0.216 + 0.747i | 0.107 + 0.084i | 0.045 + 0.109i | 0.497 + 0.642i | 0.072 + 0.760i |
| 21.1 | 0.169 + 0.220i | 0.070 + 0.258i | 0.367 + 0.708i | 0.216 + 0.746i | 0.108 + 0.083i | 0.045 + 0.108i | 0.499 + 0.641i | 0.072 + 0.760i |
| 21.2 | 0.169 + 0.221i | 0.071 + 0.260i | 0.366 + 0.707i | 0.217 + 0.745i | 0.108 + 0.082i | 0.044 + 0.109i | 0.500 + 0.642i | 0.072 + 0.758i |

-continued

| 256NUC | | | | | | | | |
|---|---|---|---|---|---|---|---|---|
| 21.3 | 0.170 + 0.222i | 0.071 + 0.260i | 0.366 + 0.707i | 0.217 + 0.744i | 0.108 + 0.082i | 0.044 + 0.108i | 0.500 + 0.642i | 0.073 + 0.758i |
| 21.4 | 0.169 + 0.222i | 0.070 + 0.261i | 0.366 + 0.707i | 0.218 + 0.743i | 0.110 + 0.083i | 0.044 + 0.107i | 0.502 + 0.642i | 0.073 + 0.757i |
| 21.5 | 0.170 + 0.222i | 0.070 + 0.261i | 0.366 + 0.707i | 0.218 + 0.744i | 0.112 + 0.083i | 0.044 + 0.105i | 0.502 + 0.642i | 0.073 + 0.757i |
| 21.6 | 0.170 + 0.222i | 0.069 + 0.262i | 0.366 + 0.707i | 0.218 + 0.743i | 0.113 + 0.082i | 0.044 + 0.104i | 0.503 + 0.643i | 0.073 + 0.756i |
| 21.7 | 0.170 + 0.223i | 0.069 + 0.262i | 0.365 + 0.707i | 0.219 + 0.743i | 0.114 + 0.082i | 0.044 + 0.103i | 0.503 + 0.644i | 0.073 + 0.757i |
| 21.8 | 0.171 + 0.223i | 0.069 + 0.263i | 0.366 + 0.707i | 0.219 + 0.743i | 0.116 + 0.082i | 0.043 + 0.102i | 0.504 + 0.644i | 0.074 + 0.757i |
| 21.9 | 0.171 + 0.224i | 0.068 + 0.263i | 0.366 + 0.708i | 0.219 + 0.743i | 0.116 + 0.082i | 0.043 + 0.101i | 0.505 + 0.645i | 0.074 + 0.757i |
| 22 | 0.171 + 0.224i | 0.068 + 0.263i | 0.366 + 0.708i | 0.220 + 0.742i | 0.118 + 0.082i | 0.043 + 0.100i | 0.505 + 0.645i | 0.074 + 0.757i |
| 22.1 | 0.171 + 0.224i | 0.067 + 0.263i | 0.366 + 0.708i | 0.220 + 0.743i | 0.119 + 0.082i | 0.043 + 0.099i | 0.506 + 0.646i | 0.074 + 0.757i |
| 22.2 | 0.172 + 0.224i | 0.068 + 0.263i | 0.367 + 0.708i | 0.220 + 0.741i | 0.121 + 0.081i | 0.043 + 0.098i | 0.507 + 0.647i | 0.074 + 0.756i |
| 22.3 | 0.173 + 0.224i | 0.067 + 0.263i | 0.367 + 0.708i | 0.221 + 0.741i | 0.122 + 0.081i | 0.043 + 0.098i | 0.508 + 0.648i | 0.074 + 0.756i |
| 22.4 | 0.174 + 0.224i | 0.068 + 0.262i | 0.366 + 0.706i | 0.220 + 0.738i | 0.124 + 0.081i | 0.044 + 0.097i | 0.510 + 0.651i | 0.074 + 0.753i |
| 22.5 | 0.174 + 0.224i | 0.067 + 0.262i | 0.366 + 0.706i | 0.220 + 0.739i | 0.125 + 0.081i | 0.044 + 0.096i | 0.510 + 0.652i | 0.074 + 0.753i |
| 22.6 | 0.621 + 0.336i | 0.620 + 0.195i | 1.470 + 0.117i | 1.145 + 0.263i | 0.629 + 0.484i | 0.621 + 0.063i | 1.377 + 0.326i | 1.206 + 0.094i |
| 22.7 | 0.622 + 0.337i | 0.621 + 0.196i | 1.466 + 0.116i | 1.144 + 0.264i | 0.630 + 0.485i | 0.622 + 0.063i | 1.375 + 0.325i | 1.205 + 0.095i |
| 22.8 | 0.623 + 0.338i | 0.622 + 0.196i | 1.461 + 0.116i | 1.145 + 0.265i | 0.632 + 0.486i | 0.624 + 0.063i | 1.375 + 0.325i | 1.202 + 0.094i |
| 22.9 | 0.624 + 0.339i | 0.624 + 0.198i | 1.458 + 0.116i | 1.144 + 0.266i | 0.633 + 0.487i | 0.626 + 0.064i | 1.373 + 0.325i | 1.201 + 0.094i |
| 23 | 0.625 + 0.340i | 0.625 + 0.198i | 1.454 + 0.115i | 1.144 + 0.267i | 0.634 + 0.489i | 0.627 + 0.064i | 1.372 + 0.325i | 1.200 + 0.094i |
| 23.1 | 0.625 + 0.342i | 0.626 + 0.200i | 1.451 + 0.114i | 1.142 + 0.267i | 0.635 + 0.490i | 0.629 + 0.065i | 1.370 + 0.323i | 1.198 + 0.094i |
| 23.2 | 0.627 + 0.343i | 0.627 + 0.201i | 1.449 + 0.114i | 1.140 + 0.268i | 0.636 + 0.492i | 0.630 + 0.065i | 1.366 + 0.321i | 1.198 + 0.095i |
| 23.3 | 0.627 + 0.344i | 0.628 + 0.201i | 1.447 + 0.113i | 1.139 + 0.268i | 0.637 + 0.493i | 0.632 + 0.066i | 1.365 + 0.320i | 1.197 + 0.095i |
| 23.4 | 0.639 + 0.354i | 0.636 + 0.209i | 1.466 + 0.109i | 1.111 + 0.236i | 0.650 + 0.503i | 0.636 + 0.069i | 1.326 + 0.255i | 1.193 + 0.086i |
| 23.5 | 0.640 + 0.355i | 0.636 + 0.210i | 1.462 + 0.108i | 1.109 + 0.234i | 0.651 + 0.505i | 0.638 + 0.069i | 1.324 + 0.254i | 1.191 + 0.085i |
| 23.6 | 0.640 + 0.355i | 0.637 + 0.210i | 1.459 + 0.107i | 1.109 + 0.235i | 0.653 + 0.505i | 0.638 + 0.069i | 1.324 + 0.254i | 1.191 + 0.086i |
| 23.7 | 0.641 + 0.357i | 0.637 + 0.211i | 1.455 + 0.106i | 1.109 + 0.235i | 0.654 + 0.507i | 0.639 + 0.069i | 1.323 + 0.254i | 1.190 + 0.086i |
| 23.8 | 0.642 + 0.358i | 0.637 + 0.212i | 1.452 + 0.105i | 1.109 + 0.235i | 0.655 + 0.508i | 0.640 + 0.070i | 1.321 + 0.255i | 1.188 + 0.086i |
| 23.9 | 0.642 + 0.359i | 0.638 + 0.213i | 1.447 + 0.105i | 1.107 + 0.235i | 0.657 + 0.509i | 0.640 + 0.070i | 1.319 + 0.255i | 1.187 + 0.086i |
| 24 | 0.643 + 0.359i | 0.637 + 0.213i | 1.444 + 0.104i | 1.106 + 0.236i | 0.658 + 0.510i | 0.641 + 0.070i | 1.318 + 0.255i | 1.186 + 0.086i |
| 24.1 | 0.643 + 0.360i | 0.638 + 0.213i | 1.441 + 0.103i | 1.107 + 0.236i | 0.659 + 0.511i | 0.642 + 0.070i | 1.318 + 0.255i | 1.186 + 0.086i |
| 24.2 | 0.644 + 0.361i | 0.637 + 0.214i | 1.437 + 0.103i | 1.106 + 0.236i | 0.660 + 0.512i | 0.642 + 0.070i | 1.316 + 0.256i | 1.185 + 0.086i |
| 24.3 | 0.644 + 0.365i | 0.637 + 0.216i | 1.433 + 0.103i | 1.102 + 0.235i | 0.661 + 0.518i | 0.643 + 0.071i | 1.311 + 0.254i | 1.182 + 0.085i |
| 24.4 | 0.645 + 0.366i | 0.637 + 0.217i | 1.431 + 0.102i | 1.102 + 0.235i | 0.662 + 0.520i | 0.645 + 0.071i | 1.310 + 0.254i | 1.182 + 0.085i |
| 24.5 | 0.645 + 0.367i | 0.637 + 0.218i | 1.427 + 0.101i | 1.102 + 0.236i | 0.663 + 0.521i | 0.646 + 0.072i | 1.310 + 0.255i | 1.181 + 0.085i |
| 24.6 | 0.646 + 0.367i | 0.638 + 0.218i | 1.425 + 0.101i | 1.102 + 0.236i | 0.664 + 0.522i | 0.647 + 0.072i | 1.310 + 0.255i | 1.181 + 0.085i |
| 24.7 | 0.646 + 0.367i | 0.638 + 0.218i | 1.423 + 0.101i | 1.102 + 0.236i | 0.666 + 0.523i | 0.648 + 0.072i | 1.309 + 0.256i | 1.181 + 0.085i |
| 24.8 | 0.647 + 0.368i | 0.638 + 0.218i | 1.420 + 0.100i | 1.103 + 0.237i | 0.667 + 0.523i | 0.650 + 0.072i | 1.309 + 0.257i | 1.181 + 0.085i |
| 24.9 | 0.648 + 0.370i | 0.638 + 0.220i | 1.417 + 0.099i | 1.103 + 0.237i | 0.668 + 0.525i | 0.651 + 0.073i | 1.308 + 0.257i | 1.180 + 0.086i |
| 25 | 0.649 + 0.370i | 0.639 + 0.220i | 1.415 + 0.099i | 1.103 + 0.238i | 0.669 + 0.525i | 0.654 + 0.073i | 1.307 + 0.257i | 1.180 + 0.086i |

| SNR | a49 | a50 | a51 | a52 | a53 | a54 | a55 | a56 |
|---|---|---|---|---|---|---|---|---|
| 10 | 0.318 + 0.178i | 0.319 + 0.164i | 0.581 + 0.316i | 0.618 + 0.218i | 0.318 + 0.178i | 0.318 + 0.163i | 0.589 + 0.319i | 0.627 + 0.219i |
| 10.1 | 0.316 + 0.177i | 0.318 + 0.162i | 0.583 + 0.318i | 0.622 + 0.216i | 0.315 + 0.176i | 0.315 + 0.152i | 0.590 + 0.321i | 0.631 + 0.217i |
| 10.2 | 0.314 + 0.176i | 0.316 + 0.161i | 0.585 + 0.320i | 0.627 + 0.214i | 0.313 + 0.174i | 0.314 + 0.160i | 0.592 + 0.323i | 0.635 + 0.216i |
| 10.3 | 0.312 + 0.174i | 0.315 + 0.159i | 0.587 + 0.322i | 0.630 + 0.213i | 0.310 + 0.173i | 0.312 + 0.158i | 0.593 + 0.325i | 0.638 + 0.213i |
| 10.4 | 0.311 + 0.173i | 0.313 + 0.158i | 0.589 + 0.324i | 0.634 + 0.211i | 0.308 + 0.172i | 0.310 + 0.157i | 0.595 + 0.327i | 0.641 + 0.211i |
| 10.5 | 0.309 + 0.173i | 0.312 + 0.157i | 0.590 + 0.326i | 0.637 + 0.209i | 0.306 + 0.171i | 0.309 + 0.155i | 0.596 + 0.329i | 0.644 + 0.209i |
| 10.6 | 0.308 + 0.171i | 0.311 + 0.155i | 0.592 + 0.328i | 0.641 + 0.207i | 0.306 + 0.170i | 0.308 + 0.154i | 0.597 + 0.330i | 0.647 + 0.207i |
| 10.7 | 0.308 + 0.171i | 0.311 + 0.154i | 0.594 + 0.330i | 0.645 + 0.204i | 0.304 + 0.169i | 0.307 + 0.153i | 0.598 + 0.332i | 0.650 + 0.206i |
| 10.8 | 0.306 + 0.170i | 0.310 + 0.153i | 0.595 + 0.332i | 0.648 + 0.203i | 0.303 + 0.168i | 0.306 + 0.152i | 0.599 + 0.334i | 0.652 + 0.203i |
| 10.9 | 0.306 + 0.169i | 0.309 + 0.152i | 0.596 + 0.334i | 0.651 + 0.200i | 0.302 + 0.168i | 0.305 + 0.150i | 0.600 + 0.336i | 0.655 + 0.201i |
| 11 | 0.305 + 0.169i | 0.309 + 0.151i | 0.597 + 0.336i | 0.653 + 0.198i | 0.301 + 0.167i | 0.305 + 0.149i | 0.600 + 0.338i | 0.657 + 0.199i |
| 11.1 | 0.304 + 0.169i | 0.308 + 0.150i | 0.598 + 0.338i | 0.655 + 0.196i | 0.301 + 0.167i | 0.304 + 0.148i | 0.601 + 0.339i | 0.659 + 0.197i |
| 11.2 | 0.304 + 0.168i | 0.309 + 0.149i | 0.599 + 0.340i | 0.658 + 0.195i | 0.301 + 0.166i | 0.304 + 0.147i | 0.601 + 0.341i | 0.661 + 0.195i |
| 11.3 | 0.304 + 0.168i | 0.308 + 0.148i | 0.500 + 0.342i | 0.661 + 0.192i | 0.300 + 0.166i | 0.304 + 0.147i | 0.602 + 0.343i | 0.663 + 0.193i |
| 11.4 | 0.304 + 0.167i | 0.308 + 0.147i | 0.600 + 0.343i | 0.663 + 0.191i | 0.300 + 0.166i | 0.304 + 0.145i | 0.602 + 0.345i | 0.665 + 0.191i |
| 11.5 | 0.303 + 0.167i | 0.308 + 0.146i | 0.601 + 0.345i | 0.664 + 0.189i | 0.299 + 0.165i | 0.304 + 0.145i | 0.602 + 0.346i | 0.666 + 0.189i |
| 11.6 | 0.303 + 0.157i | 0.308 + 0.145i | 0.601 + 0.346i | 0.666 + 0.187i | 0.299 + 0.164i | 0.304 + 0.143i | 0.602 + 0.347i | 0.667 + 0.187i |
| 11.7 | 0.302 + 0.166i | 0.308 + 0.144i | 0.602 + 0.347i | 0.667 + 0.185i | 0.299 + 0.164i | 0.304 + 0.143i | 0.602 + 0.348i | 0.668 + 0.185i |
| 11.8 | 0.302 + 0.155i | 0.307 + 0.143i | 0.602 + 0.348i | 0.668 + 0.184i | 0.298 + 0.163i | 0.303 + 0.142i | 0.601 + 0.349i | 0.669 + 0.184i |
| 11.9 | 0.301 + 0.155i | 0.307 + 0.142i | 0.603 + 0.350i | 0.669 + 0.182i | 0.298 + 0.163i | 0.303 + 0.141i | 0.601 + 0.351i | 0.669 + 0.182i |
| 12 | 0.302 + 0.165i | 0.308 + 0.142i | 0.602 + 0.351i | 0.670 + 0.181i | 0.297 + 0.162i | 0.304 + 0.140i | 0.600 + 0.352i | 0.669 + 0.180i |
| 12.1 | 0.302 + 0.154i | 0.308 + 0.140i | 0.602 + 0.352i | 0.671 + 0.179i | 0.298 + 0.162i | 0.305 + 0.135i | 0.600 + 0.353i | 0.670 + 0.178i |
| 12.2 | 0.301 + 0.164i | 0.309 + 0.140i | 0.603 + 0.353i | 0.672 + 0.178i | 0.298 + 0.162i | 0.304 + 0.138i | 0.600 + 0.354i | 0.670 + 0.176i |
| 12.3 | 0.301 + 0.163i | 0.308 + 0.139i | 0.603 + 0.354i | 0.672 + 0.176i | 0.298 + 0.162i | 0.305 + 0.137i | 0.599 + 0.355i | 0.670 + 0.175i |
| 12.4 | 0.302 + 0.163i | 0.310 + 0.138i | 0.603 + 0.355i | 0.674 + 0.174i | 0.298 + 0.161i | 0.306 + 0.136i | 0.599 + 0.356i | 0.670 + 0.173i |
| 12.5 | 0.302 + 0.163i | 0.311 + 0.137i | 0.603 + 0.356i | 0.674 + 0.173i | 0.298 + 0.161i | 0.307 + 0.136i | 0.599 + 0.358i | 0.671 + 0.172i |
| 12.6 | 0.303 + 0.162i | 0.312 + 0.136i | 0.603 + 0.358i | 0.676 + 0.172i | 0.300 + 0.160i | 0.309 + 0.135i | 0.598 + 0.359i | 0.671 + 0.170i |
| 12.7 | 0.303 + 0.162i | 0.313 + 0.135i | 0.604 + 0.359i | 0.677 + 0.170i | 0.300 + 0.160i | 0.310 + 0.134i | 0.598 + 0.350i | 0.671 + 0.169i |
| 12.8 | 0.325 + 0.160i | 0.337 + 0.132i | 0.610 + 0.364i | 0.695 + 0.173i | 0.322 + 0.158i | 0.335 + 0.130i | 0.603 + 0.362i | 0.687 + 0.171i |
| 12.9 | 0.335 + 0.161i | 0.351 + 0.130i | 0.610 + 0.370i | 0.701 + 0.174i | 0.332 + 0.159i | 0.349 + 0.129i | 0.603 + 0.368i | 0.693 + 0.172i |
| 13 | 0.347 + 0.162i | 0.367 + 0.128i | 0.611 + 0.375i | 0.707 + 0.176i | 0.345 + 0.161i | 0.365 + 0.127i | 0.604 + 0.373i | 0.699 + 0.173i |
| 13.1 | 0.353 + 0.163i | 0.375 + 0.127i | 0.611 + 0.378i | 0.711 + 0.176i | 0.351 + 0.161i | 0.373 + 0.125i | 0.603 + 0.375i | 0.702 + 0.173i |
| 13.2 | 0.362 + 0.164i | 0.386 + 0.125i | 0.612 + 0.382i | 0.717 + 0.177i | 0.360 + 0.162i | 0.384 + 0.124i | 0.603 + 0.379i | 0.708 + 0.174i |
| 13.3 | 0.365 + 0.164i | 0.390 + 0.125i | 0.612 + 0.384i | 0.719 + 0.177i | 0.363 + 0.163i | 0.388 + 0.124i | 0.602 + 0.380i | 0.709 + 0.174i |
| 13.4 | 0.372 + 0.165i | 0.398 + 0.124i | 0.612 + 0.386i | 0.724 + 0.178i | 0.370 + 0.164i | 0.396 + 0.122i | 0.602 + 0.382i | 0.713 + 0.174i |
| 13.5 | 0.376 + 0.166i | 0.404 + 0.123i | 0.612 + 0.388i | 0.727 + 0.178i | 0.375 + 0.165i | 0.402 + 0.122i | 0.602 + 0.384i | 0.716 + 0.175i |

-continued

| 256NUC | | | | | | | | |
|---|---|---|---|---|---|---|---|---|
| 13.6 | 0.379 + 0.167i | 0.408 + 0.122i | 0.612 + 0.390i | 0.730 + 0.178i | 0.377 + 0.165i | 0.406 + 0.121i | 0.602 + 0.385i | 0.719 + 0.174i |
| 13.7 | 0.402 + 0.165i | 0.438 + 0.120i | 0.620 + 0.398i | 0.755 + 0.186i | 0.401 + 0.164i | 0.436 + 0.118i | 0.610 + 0.393i | 0.740 + 0.184i |
| 13.8 | 0.403 + 0.165i | 0.441 + 0.119i | 0.620 + 0.399i | 0.757 + 0.187i | 0.403 + 0.164i | 0.439 + 0.118i | 0.609 + 0.394i | 0.741 + 0.184i |
| 13.9 | 0.406 + 0.165i | 0.444 + 0.118i | 0.620 + 0.400i | 0.761 + 0.188i | 0.406 + 0.164i | 0.443 + 0.117i | 0.609 + 0.394i | 0.744 + 0.185i |
| 14 | 0.408 + 0.167i | 0.447 + 0.118i | 0.620 + 0.402i | 0.763 + 0.189i | 0.408 + 0.165i | 0.445 + 0.117i | 0.608 + 0.395i | 0.745 + 0.185i |
| 14.1 | 0.409 + 0.166i | 0.448 + 0.118i | 0.621 + 0.403i | 0.765 + 0.190i | 0.409 + 0.166i | 0.448 + 0.117i | 0.608 + 0.395i | 0.746 + 0.185i |
| 14.2 | 0.410 + 0.167i | 0.452 + 0.118i | 0.621 + 0.404i | 0.767 + 0.192i | 0.412 + 0.166i | 0.451 + 0.117i | 0.607 + 0.396i | 0.749 + 0.185i |
| 14.3 | 0.412 + 0.168i | 0.453 + 0.117i | 0.621 + 0.405i | 0.769 + 0.192i | 0.413 + 0.168i | 0.454 + 0.116i | 0.607 + 0.396i | 0.749 + 0.185i |
| 14.4 | 0.413 + 0.168i | 0.456 + 0.117i | 0.622 + 0.406i | 0.771 + 0.194i | 0.415 + 0.169i | 0.457 + 0.116i | 0.606 + 0.397i | 0.751 + 0.186i |
| 14.5 | 0.414 + 0.169i | 0.458 + 0.117i | 0.622 + 0.407i | 0.773 + 0.195i | 0.416 + 0.169i | 0.460 + 0.116i | 0.606 + 0.397i | 0.752 + 0.186i |
| 14.6 | 0.416 + 0.169i | 0.460 + 0.117i | 0.622 + 0.408i | 0.775 + 0.196i | 0.418 + 0.171i | 0.463 + 0.116i | 0.605 + 0.397i | 0.753 + 0.187i |
| 14.7 | 0.417 + 0.171i | 0.463 + 0.117i | 0.623 + 0.409i | 0.777 + 0.198i | 0.420 + 0.172i | 0.465 + 0.116i | 0.605 + 0.398i | 0.754 + 0.187i |
| 14.8 | 0.417 + 0.171i | 0.464 + 0.117i | 0.623 + 0.410i | 0.778 + 0.199i | 0.421 + 0.173i | 0.468 + 0.117i | 0.604 + 0.398i | 0.755 + 0.188i |
| 14.9 | 0.419 + 0.172i | 0.467 + 0.117i | 0.624 + 0.411i | 0.780 + 0.201i | 0.423 + 0.174i | 0.471 + 0.116i | 0.603 + 0.399i | 0.756 + 0.189i |
| 15 | 0.419 + 0.172i | 0.468 + 0.117i | 0.625 + 0.412i | 0.781 + 0.202i | 0.424 + 0.175i | 0.474 + 0.116i | 0.603 + 0.399i | 0.757 + 0.189i |
| 15.1 | 0.420 + 0.174i | 0.471 + 0.117i | 0.626 + 0.412i | 0.783 + 0.204i | 0.426 + 0.177i | 0.477 + 0.116i | 0.603 + 0.399i | 0.757 + 0.190i |
| 15.2 | 0.422 + 0.175i | 0.473 + 0.117i | 0.626 + 0.413i | 0.784 + 0.206i | 0.427 + 0.179i | 0.480 + 0.117i | 0.602 + 0.399i | 0.758 + 0.191i |
| 15.3 | 0.422 + 0.175i | 0.475 + 0.118i | 0.628 + 0.414i | 0.785 + 0.208i | 0.428 + 0.181i | 0.483 + 0.118i | 0.602 + 0.399i | 0.758 + 0.192i |
| 15.4 | 0.422 + 0.177i | 0.477 + 0.118i | 0.628 + 0.415i | 0.787 + 0.210i | 0.429 + 0.183i | 0.486 + 0.118i | 0.601 + 0.399i | 0.759 + 0.193i |
| 15.5 | 0.558 + 0.914i | 0.311 + 1.023i | 0.660 + 1.169i | 0.409 + 1.283i | 0.697 + 0.817i | 0.137 + 1.062i | 0.877 + 1.026i | 0.141 + 1.341i |
| 15.6 | 0.554 + 0.918i | 0.309 + 1.020i | 0.654 + 1.169i | 0.404 + 1.281i | 0.697 + 0.820i | 0.135 + 1.059i | 0.872 + 1.029i | 0.139 + 1.336i |
| 15.7 | 0.550 + 0.921i | 0.309 + 1.019i | 0.648 + 1.170i | 0.400 + 1.278i | 0.697 + 0.823i | 0.133 + 1.056i | 0.868 + 1.032i | 0.138 + 1.331i |
| 15.8 | 0.546 + 0.925i | 0.307 + 1.017i | 0.642 + 1.171i | 0.396 + 1.276i | 0.698 + 0.825i | 0.131 + 1.054i | 0.864 + 1.035i | 0.136 + 1.327i |
| 15.9 | 0.545 + 0.928i | 0.308 + 1.017i | 0.640 + 1.171i | 0.394 + 1.274i | 0.701 + 0.828i | 0.128 + 1.054i | 0.862 + 1.036i | 0.136 + 1.324i |
| 16 | 0.542 + 0.932i | 0.308 + 1.016i | 0.636 + 1.172i | 0.391 + 1.273i | 0.702 + 0.830i | 0.126 + 1.053i | 0.860 + 1.038i | 0.134 + 1.321i |
| 16.1 | 0.542 + 0.936i | 0.309 + 1.017i | 0.635 + 1.173i | 0.390 + 1.272i | 0.705 + 0.833i | 0.125 + 1.055i | 0.860 + 1.039i | 0.133 + 1.320i |
| 16.2 | 0.541 + 0.939i | 0.310 + 1.019i | 0.633 + 1.173i | 0.389 + 1.272i | 0.707 + 0.835i | 0.123 + 1.057i | 0.859 + 1.039i | 0.133 + 1.318i |
| 16.3 | 0.540 + 0.943i | 0.312 + 1.021i | 0.632 + 1.174i | 0.389 + 1.272i | 0.710 + 0.837i | 0.122 + 1.059i | 0.859 + 1.039i | 0.133 + 1.319i |
| 16.4 | 0.540 + 0.947i | 0.314 + 1.025i | 0.632 + 1.174i | 0.388 + 1.272i | 0.712 + 0.840i | 0.121 + 1.063i | 0.859 + 1.039i | 0.133 + 1.319i |
| 16.5 | 0.540 + 0.951i | 0.316 + 1.028i | 0.632 + 1.175i | 0.388 + 1.273i | 0.714 + 0.842i | 0.119 + 1.066i | 0.860 + 1.039i | 0.133 + 1.319i |
| 16.6 | 0.540 + 0.955i | 0.318 + 1.033i | 0.633 + 1.175i | 0.389 + 1.274i | 0.716 + 0.844i | 0.118 + 1.072i | 0.861 + 1.038i | 0.133 + 1.321i |
| 16.7 | 0.541 + 0.959i | 0.320 + 1.038i | 0.634 + 1.176i | 0.390 + 1.275i | 0.718 + 0.846i | 0.118 + 1.077i | 0.862 + 1.038i | 0.133 + 1.323i |
| 16.8 | 0.542 + 0.964i | 0.322 + 1.043i | 0.636 + 1.177i | 0.391 + 1.277i | 0.720 + 0.848i | 0.117 + 1.083i | 0.863 + 1.038i | 0.134 + 1.326i |
| 16.9 | 0.542 + 0.968i | 0.324 + 1.049i | 0.637 + 1.178i | 0.393 + 1.278i | 0.722 + 0.851i | 0.116 + 1.089i | 0.863 + 1.037i | 0.134 + 1.329i |
| 17 | 0.544 + 0.970i | 0.326 + 1.053i | 0.639 + 1.177i | 0.394 + 1.279i | 0.724 + 0.851i | 0.116 + 1.094i | 0.865 + 1.036i | 0.135 + 1.331i |
| 17.1 | 0.545 + 0.973i | 0.329 + 1.057i | 0.641 + 1.177i | 0.397 + 1.281i | 0.726 + 0.852i | 0.116 + 1.100i | 0.867 + 1.035i | 0.136 + 1.334i |
| 17.2 | 0.546 + 0.975i | 0.330 + 1.060i | 0.642 + 1.177i | 0.397 + 1.281i | 0.727 + 0.853i | 0.116 + 1.103i | 0.867 + 1.034i | 0.136 + 1.335i |
| 17.3 | 0.547 + 0.977i | 0.332 + 1.062i | 0.643 + 1.177i | 0.398 + 1.282i | 0.729 + 0.853i | 0.116 + 1.106i | 0.868 + 1.033i | 0.137 + 1.337i |
| 17.4 | 0.548 + 0.978i | 0.333 + 1.065i | 0.644 + 1.177i | 0.399 + 1.282i | 0.729 + 0.853i | 0.116 + 1.109i | 0.868 + 1.033i | 0.137 + 1.338i |
| 17.5 | 0.549 + 0.979i | 0.335 + 1.066i | 0.645 + 1.177i | 0.400 + 1.282i | 0.731 + 0.854i | 0.116 + 1.111i | 0.869 + 1.033i | 0.137 + 1.338i |
| 17.6 | 0.550 + 0.980i | 0.336 + 1.067i | 0.646 + 1.177i | 0.400 + 1.282i | 0.732 + 0.854i | 0.116 + 1.112i | 0.870 + 1.032i | 0.138 + 1.338i |
| 17.7 | 0.551 + 0.980i | 0.337 + 1.069i | 0.647 + 1.176i | 0.402 + 1.282i | 0.734 + 0.854i | 0.116 + 1.114i | 0.871 + 1.031i | 0.138 + 1.339i |
| 17.8 | 0.553 + 0.981i | 0.339 + 1.069i | 0.648 + 1.176i | 0.402 + 1.282i | 0.736 + 0.855i | 0.116 + 1.115i | 0.872 + 1.030i | 0.138 + 1.339i |
| 17.9 | 0.695 + 0.875i | 0.474 + 0.985i | 0.806 + 1.066i | 0.573 + 1.188i | 0.824 + 0.738i | 0.149 + 1.238i | 1.003 + 0.892i | 0.376 + 1.293i |
| 18 | 0.694 + 0.877i | 0.474 + 0.988i | 0.805 + 1.065i | 0.572 + 1.187i | 0.823 + 0.738i | 0.143 + 1.248i | 1.001 + 0.891i | 0.374 + 1.296i |
| 18.1 | 0.692 + 0.879i | 0.474 + 0.991i | 0.803 + 1.064i | 0.572 + 1.188i | 0.822 + 0.739i | 0.140 + 1.253i | 0.999 + 0.892i | 0.374 + 1.299i |
| 18.2 | 0.690 + 0.881i | 0.474 + 0.994i | 0.801 + 1.064i | 0.573 + 1.189i | 0.819 + 0.740i | 0.137 + 1.257i | 0.995 + 0.891i | 0.374 + 1.304i |
| 18.3 | 0.687 + 0.882i | 0.474 + 0.996i | 0.800 + 1.063i | 0.573 + 1.189i | 0.817 + 0.741i | 0.135 + 1.261i | 0.993 + 0.891i | 0.374 + 1.307i |
| 18.4 | 0.687 + 0.883i | 0.475 + 0.997i | 0.799 + 1.064i | 0.573 + 1.189i | 0.818 + 0.742i | 0.133 + 1.262i | 0.992 + 0.892i | 0.374 + 1.308i |
| 18.5 | 0.708 + 0.863i | 0.520 + 0.984i | 0.830 + 1.048i | 0.600 + 1.180i | 0.835 + 0.724i | 0.127 + 1.276i | 1.011 + 0.873i | 0.383 + 1.285i |
| 18.6 | 0.709 + 0.864i | 0.525 + 0.987i | 0.833 + 1.048i | 0.603 + 1.181i | 0.835 + 0.724i | 0.127 + 1.279i | 1.011 + 0.870i | 0.385 + 1.286i |
| 18.7 | 0.707 + 0.865i | 0.531 + 0.988i | 0.835 + 1.044i | 0.609 + 1.177i | 0.825 + 0.724i | 0.137 + 1.321i | 1.007 + 0.866i | 0.395 + 1.292i |
| 18.8 | 0.704 + 0.867i | 0.528 + 0.991i | 0.832 + 1.044i | 0.609 + 1.177i | 0.823 + 0.726i | 0.137 + 1.329i | 1.004 + 0.867i | 0.396 + 1.294i |
| 18.9 | 0.704 + 0.868i | 0.528 + 0.993i | 0.832 + 1.044i | 0.609 + 1.178i | 0.823 + 0.727i | 0.138 + 1.331i | 1.003 + 0.867i | 0.397 + 1.295i |
| 19 | 0.704 + 0.869i | 0.529 + 0.996i | 0.832 + 1.044i | 0.612 + 1.179i | 0.823 + 0.728i | 0.139 + 1.333i | 1.002 + 0.866i | 0.400 + 1.298i |
| 19.1 | 0.704 + 0.870i | 0.529 + 0.997i | 0.832 + 1.044i | 0.612 + 1.179i | 0.824 + 0.729i | 0.139 + 1.335i | 1.003 + 0.866i | 0.400 + 1.299i |
| 19.2 | 0.392 + 0.267i | 0.525 + 0.207i | 0.644 + 0.439i | 0.720 + 0.283i | 0.405 + 0.293i | 0.534 + 0.209i | 0.497 + 0.440i | 0.675 + 0.247i |
| 19.3 | 0.391 + 0.267i | 0.525 + 0.207i | 0.650 + 0.439i | 0.721 + 0.283i | 0.405 + 0.294i | 0.534 + 0.210i | 0.496 + 0.440i | 0.675 + 0.246i |
| 19.4 | 0.390 + 0.267i | 0.524 + 0.208i | 0.656 + 0.439i | 0.722 + 0.283i | 0.405 + 0.296i | 0.535 + 0.212i | 0.494 + 0.441i | 0.674 + 0.246i |
| 19.5 | 0.390 + 0.266i | 0.524 + 0.209i | 0.661 + 0.438i | 0.724 + 0.283i | 0.406 + 0.297i | 0.536 + 0.213i | 0.494 + 0.441i | 0.674 + 0.245i |
| 19.6 | 0.389 + 0.266i | 0.524 + 0.210i | 0.665 + 0.438i | 0.724 + 0.284i | 0.406 + 0.298i | 0.536 + 0.214i | 0.493 + 0.441i | 0.674 + 0.245i |
| 19.7 | 0.389 + 0.267i | 0.523 + 0.210i | 0.669 + 0.439i | 0.725 + 0.284i | 0.406 + 0.299i | 0.537 + 0.215i | 0.492 + 0.442i | 0.674 + 0.245i |
| 19.8 | 0.389 + 0.266i | 0.524 + 0.211i | 0.673 + 0.438i | 0.727 + 0.284i | 0.407 + 0.301i | 0.538 + 0.217i | 0.491 + 0.442i | 0.674 + 0.244i |
| 19.9 | 0.388 + 0.266i | 0.523 + 0.212i | 0.676 + 0.438i | 0.728 + 0.284i | 0.407 + 0.302i | 0.538 + 0.217i | 0.491 + 0.442i | 0.674 + 0.244i |
| 20 | 0.388 + 0.265i | 0.523 + 0.212i | 0.679 + 0.438i | 0.730 + 0.284i | 0.407 + 0.302i | 0.539 + 0.218i | 0.490 + 0.442i | 0.674 + 0.244i |
| 20.1 | 0.388 + 0.264i | 0.523 + 0.211i | 0.682 + 0.438i | 0.732 + 0.284i | 0.408 + 0.304i | 0.541 + 0.219i | 0.491 + 0.441i | 0.675 + 0.244i |
| 20.2 | 0.388 + 0.263i | 0.523 + 0.212i | 0.685 + 0.438i | 0.735 + 0.284i | 0.409 + 0.305i | 0.542 + 0.220i | 0.491 + 0.441i | 0.675 + 0.243i |
| 20.3 | 0.388 + 0.262i | 0.522 + 0.211i | 0.688 + 0.438i | 0.737 + 0.285i | 0.410 + 0.306i | 0.543 + 0.220i | 0.491 + 0.440i | 0.676 + 0.243i |
| 20.4 | 0.388 + 0.260i | 0.521 + 0.210i | 0.691 + 0.438i | 0.740 + 0.285i | 0.411 + 0.308i | 0.545 + 0.221i | 0.492 + 0.439i | 0.676 + 0.243i |
| 20.5 | 0.351 + 0.240i | 0.439 + 0.174i | 0.721 + 0.415i | 0.754 + 0.268i | 0.430 + 0.328i | 0.519 + 0.207i | 0.529 + 0.415i | 0.633 + 0.240i |
| 20.6 | 0.349 + 0.238i | 0.436 + 0.172i | 0.723 + 0.415i | 0.756 + 0.267i | 0.432 + 0.329i | 0.520 + 0.207i | 0.532 + 0.413i | 0.632 + 0.240i |
| 20.7 | 0.348 + 0.237i | 0.433 + 0.170i | 0.726 + 0.414i | 0.759 + 0.266i | 0.435 + 0.329i | 0.521 + 0.206i | 0.535 + 0.412i | 0.632 + 0.239i |
| 20.8 | 0.348 + 0.232i | 0.431 + 0.164i | 0.744 + 0.413i | 0.772 + 0.267i | 0.448 + 0.327i | 0.527 + 0.205i | 0.555 + 0.410i | 0.639 + 0.240i |
| 20.9 | 0.349 + 0.231i | 0.432 + 0.162i | 0.746 + 0.413i | 0.775 + 0.267i | 0.451 + 0.327i | 0.529 + 0.205i | 0.559 + 0.409i | 0.641 + 0.241i |
| 21 | 0.348 + 0.231i | 0.431 + 0.162i | 0.748 + 0.414i | 0.777 + 0.267i | 0.454 + 0.328i | 0.530 + 0.205i | 0.562 + 0.409i | 0.643 + 0.241i |
| 21.1 | 0.349 + 0.231i | 0.432 + 0.161i | 0.750 + 0.414i | 0.779 + 0.266i | 0.456 + 0.328i | 0.531 + 0.205i | 0.566 + 0.409i | 0.644 + 0.241i |
| 21.2 | 0.349 + 0.231i | 0.432 + 0.161i | 0.754 + 0.414i | 0.782 + 0.266i | 0.460 + 0.328i | 0.533 + 0.204i | 0.571 + 0.409i | 0.647 + 0.241i |

-continued

| 256NUC | | | | | | | | |
|---|---|---|---|---|---|---|---|---|
| 21.3 | 0.349 + 0.232i | 0.432 + 0.161i | 0.756 + 0.415i | 0.785 + 0.266i | 0.462 + 0.329i | 0.535 + 0.205i | 0.574 + 0.410i | 0.648 + 0.241i |
| 21.4 | 0.349 + 0.232i | 0.433 + 0.161i | 0.759 + 0.415i | 0.787 + 0.266i | 0.464 + 0.329i | 0.535 + 0.205i | 0.577 + 0.410i | 0.649 + 0.242i |
| 21.5 | 0.350 + 0.233i | 0.433 + 0.161i | 0.761 + 0.416i | 0.789 + 0.266i | 0.466 + 0.330i | 0.537 + 0.205i | 0.580 + 0.411i | 0.651 + 0.242i |
| 21.6 | 0.350 + 0.234i | 0.434 + 0.162i | 0.764 + 0.416i | 0.791 + 0.266i | 0.469 + 0.331i | 0.539 + 0.206i | 0.584 + 0.412i | 0.653 + 0.243i |
| 21.7 | 0.350 + 0.235i | 0.435 + 0.162i | 0.765 + 0.417i | 0.793 + 0.266i | 0.470 + 0.331i | 0.539 + 0.207i | 0.586 + 0.412i | 0.654 + 0.244i |
| 21.8 | 0.350 + 0.236i | 0.436 + 0.163i | 0.768 + 0.418i | 0.794 + 0.266i | 0.473 + 0.332i | 0.541 + 0.207i | 0.589 + 0.413i | 0.656 + 0.244i |
| 21.9 | 0.350 + 0.237i | 0.436 + 0.164i | 0.770 + 0.418i | 0.796 + 0.266i | 0.474 + 0.333i | 0.541 + 0.208i | 0.591 + 0.414i | 0.658 + 0.245i |
| 22 | 0.351 + 0.238i | 0.437 + 0.165i | 0.772 + 0.419i | 0.799 + 0.265i | 0.476 + 0.333i | 0.543 + 0.208i | 0.594 + 0.414i | 0.659 + 0.245i |
| 22.1 | 0.351 + 0.239i | 0.437 + 0.165i | 0.774 + 0.420i | 0.799 + 0.265i | 0.478 + 0.334i | 0.544 + 0.209i | 0.596 + 0.416i | 0.660 + 0.246i |
| 22.2 | 0.352 + 0.240i | 0.439 + 0.165i | 0.776 + 0.420i | 0.802 + 0.266i | 0.480 + 0.334i | 0.546 + 0.209i | 0.599 + 0.417i | 0.663 + 0.246i |
| 22.3 | 0.353 + 0.242i | 0.440 + 0.167i | 0.779 + 0.420i | 0.804 + 0.265i | 0.482 + 0.335i | 0.547 + 0.209i | 0.601 + 0.418i | 0.664 + 0.247i |
| 22.4 | 0.355 + 0.243i | 0.441 + 0.168i | 0.782 + 0.418i | 0.807 + 0.264i | 0.487 + 0.336i | 0.549 + 0.211i | 0.606 + 0.422i | 0.667 + 0.247i |
| 22.5 | 0.355 + 0.244i | 0.442 + 0.169i | 0.784 + 0.419i | 0.809 + 0.264i | 0.488 + 0.337i | 0.551 + 0.211i | 0.608 + 0.424i | 0.668 + 0.248i |
| 22.6 | 0.831 + 0.794i | 0.733 + 1.147i | 1.016 + 0.827i | 0.923 + 1.022i | 0.822 + 0.633i | 0.695 + 1.379i | 1.035 + 0.634i | 0.980 + 1.252i |
| 22.7 | 0.832 + 0.796i | 0.732 + 1.149i | 1.016 + 0.829i | 0.922 + 1.024i | 0.824 + 0.634i | 0.691 + 1.379i | 1.036 + 0.636i | 0.978 + 1.252i |
| 22.8 | 0.834 + 0.797i | 0.730 + 1.151i | 1.017 + 0.829i | 0.922 + 1.024i | 0.826 + 0.635i | 0.687 + 1.379i | 1.036 + 0.637i | 0.975 + 1.251i |
| 22.9 | 0.835 + 0.799i | 0.728 + 1.152i | 1.018 + 0.830i | 0.922 + 1.025i | 0.828 + 0.637i | 0.683 + 1.379i | 1.037 + 0.638i | 0.971 + 1.252i |
| 23 | 0.837 + 0.801i | 0.727 + 1.153i | 1.020 + 0.831i | 0.922 + 1.026i | 0.829 + 0.638i | 0.679 + 1.378i | 1.037 + 0.639i | 0.969 + 1.251i |
| 23.1 | 0.838 + 0.802i | 0.727 + 1.155i | 1.021 + 0.831i | 0.924 + 1.026i | 0.831 + 0.639i | 0.675 + 1.378i | 1.039 + 0.640i | 0.967 + 1.250i |
| 23.2 | 0.840 + 0.804i | 0.726 + 1.156i | 1.022 + 0.832i | 0.924 + 1.027i | 0.832 + 0.642i | 0.671 + 1.377i | 1.039 + 0.641i | 0.965 + 1.251i |
| 23.3 | 0.840 + 0.806i | 0.726 + 1.159i | 1.023 + 0.832i | 0.926 + 1.027i | 0.835 + 0.643i | 0.667 + 1.378i | 1.040 + 0.642i | 0.964 + 1.250i |
| 23.4 | 0.849 + 0.851i | 0.677 + 1.176i | 1.021 + 0.937i | 0.898 + 1.110i | 0.845 + 0.677i | 0.572 + 1.393i | 1.052 + 0.721i | 0.850 + 1.347i |
| 23.5 | 0.851 + 0.855i | 0.676 + 1.177i | 1.023 + 0.944i | 0.897 + 1.114i | 0.846 + 0.681i | 0.568 + 1.391i | 1.049 + 0.727i | 0.844 + 1.350i |
| 23.6 | 0.854 + 0.858i | 0.672 + 1.176i | 1.026 + 0.949i | 0.894 + 1.115i | 0.848 + 0.683i | 0.565 + 1.389i | 1.049 + 0.729i | 0.838 + 1.348i |
| 23.7 | 0.855 + 0.860i | 0.671 + 1.177i | 1.027 + 0.952i | 0.894 + 1.117i | 0.848 + 0.684i | 0.561 + 1.388i | 1.048 + 0.731i | 0.833 + 1.349i |
| 23.8 | 0.857 + 0.863i | 0.668 + 1.177i | 1.030 + 0.956i | 0.892 + 1.119i | 0.850 + 0.686i | 0.559 + 1.387i | 1.047 + 0.735i | 0.830 + 1.349i |
| 23.9 | 0.859 + 0.864i | 0.667 + 1.178i | 1.031 + 0.958i | 0.892 + 1.120i | 0.851 + 0.687i | 0.556 + 1.386i | 1.047 + 0.736i | 0.826 + 1.348i |
| 24 | 0.860 + 0.866i | 0.666 + 1.178i | 1.032 + 0.959i | 0.893 + 1.120i | 0.852 + 0.689i | 0.555 + 1.384i | 1.046 + 0.737i | 0.824 + 1.347i |
| 24.1 | 0.863 + 0.868i | 0.665 + 1.178i | 1.035 + 0.961i | 0.893 + 1.120i | 0.853 + 0.690i | 0.553 + 1.382i | 1.046 + 0.738i | 0.824 + 1.345i |
| 24.2 | 0.864 + 0.869i | 0.664 + 1.180i | 1.037 + 0.960i | 0.895 + 1.118i | 0.854 + 0.690i | 0.552 + 1.382i | 1.047 + 0.737i | 0.826 + 1.341i |
| 24.3 | 0.865 + 0.868i | 0.648 + 1.212i | 1.049 + 0.926i | 0.938 + 1.097i | 0.853 + 0.693i | 0.516 + 1.397i | 1.046 + 0.724i | 0.859 + 1.299i |
| 24.4 | 0.868 + 0.871i | 0.645 + 1.215i | 1.053 + 0.926i | 0.943 + 1.097i | 0.854 + 0.695i | 0.510 + 1.397i | 1.047 + 0.725i | 0.857 + 1.293i |
| 24.5 | 0.868 + 0.873i | 0.642 + 1.217i | 1.053 + 0.927i | 0.944 + 1.096i | 0.855 + 0.697i | 0.506 + 1.396i | 1.046 + 0.726i | 0.855 + 1.290i |
| 24.6 | 0.869 + 0.875i | 0.639 + 1.217i | 1.055 + 0.927i | 0.944 + 1.096i | 0.855 + 0.698i | 0.503 + 1.395i | 1.046 + 0.728i | 0.852 + 1.287i |
| 24.7 | 0.870 + 0.876i | 0.638 + 1.217i | 1.055 + 0.928i | 0.945 + 1.096i | 0.857 + 0.700i | 0.501 + 1.393i | 1.046 + 0.729i | 0.850 + 1.285i |
| 24.8 | 0.872 + 0.877i | 0.637 + 1.217i | 1.057 + 0.930i | 0.945 + 1.095i | 0.857 + 0.701i | 0.499 + 1.391i | 1.045 + 0.731i | 0.848 + 1.283i |
| 24.9 | 0.872 + 0.879i | 0.636 + 1.217i | 1.057 + 0.930i | 0.946 + 1.096i | 0.858 + 0.702i | 0.498 + 1.390i | 1.046 + 0.732i | 0.846 + 1.280i |
| 25 | 0.873 + 0.879i | 0.636 + 1.217i | 1.058 + 0.931i | 0.945 + 1.095i | 0.858 + 0.703i | 0.497 + 1.388i | 1.045 + 0.732i | 0.845 + 1.278i |

| SNR | a57 | a58 | a59 | a60 | a61 | a62 | a63 | a64 |
|---|---|---|---|---|---|---|---|---|
| 10 | 0.181 + 0.316i | 0.165 + 0.316i | 0.315 + 0.577i | 0.218 + 0.619i | 0.180 + 0.316i | 0.165 + 0.316i | 0.320 + 0.582i | 0.220 + 0.623i |
| 10.1 | 0.179 + 0.313i | 0.164 + 0.314i | 0.317 + 0.580i | 0.216 + 0.623i | 0.178 + 0.313i | 0.163 + 0.313i | 0.321 + 0.584i | 0.218 + 0.627i |
| 10.2 | 0.178 + 0.311i | 0.162 + 0.311i | 0.318 + 0.582i | 0.214 + 0.627i | 0.176 + 0.310i | 0.162 + 0.310i | 0.323 + 0.586i | 0.216 + 0.631i |
| 10.3 | 0.176 + 0.309i | 0.161 + 0.310i | 0.320 + 0.584i | 0.212 + 0.631i | 0.174 + 0.308i | 0.160 + 0.307i | 0.324 + 0.588i | 0.214 + 0.635i |
| 10.4 | 0.175 + 0.307i | 0.159 + 0.308i | 0.321 + 0.586i | 0.209 + 0.634i | 0.173 + 0.306i | 0.158 + 0.305i | 0.325 + 0.589i | 0.211 + 0.638i |
| 10.5 | 0.174 + 0.306i | 0.158 + 0.306i | 0.323 + 0.588i | 0.208 + 0.638i | 0.172 + 0.304i | 0.157 + 0.303i | 0.327 + 0.591i | 0.209 + 0.642i |
| 10.6 | 0.173 + 0.304i | 0.157 + 0.305i | 0.325 + 0.589i | 0.206 + 0.641i | 0.171 + 0.303i | 0.156 + 0.301i | 0.328 + 0.592i | 0.207 + 0.645i |
| 10.7 | 0.172 + 0.303i | 0.155 + 0.304i | 0.327 + 0.591i | 0.203 + 0.645i | 0.170 + 0.301i | 0.155 + 0.300i | 0.330 + 0.593i | 0.205 + 0.648i |
| 10.8 | 0.171 + 0.302i | 0.155 + 0.303i | 0.328 + 0.592i | 0.201 + 0.648i | 0.169 + 0.300i | 0.153 + 0.298i | 0.331 + 0.594i | 0.203 + 0.651i |
| 10.9 | 0.171 + 0.301i | 0.153 + 0.302i | 0.330 + 0.594i | 0.199 + 0.651i | 0.168 + 0.299i | 0.152 + 0.298i | 0.333 + 0.595i | 0.201 + 0.654i |
| 11 | 0.170 + 0.301i | 0.152 + 0.301i | 0.332 + 0.595i | 0.197 + 0.654i | 0.168 + 0.298i | 0.151 + 0.297i | 0.334 + 0.596i | 0.198 + 0.657i |
| 11.1 | 0.169 + 0.301i | 0.151 + 0.301i | 0.334 + 0.595i | 0.195 + 0.656i | 0.167 + 0.298i | 0.150 + 0.296i | 0.336 + 0.596i | 0.196 + 0.659i |
| 11.2 | 0.169 + 0.300i | 0.150 + 0.301i | 0.336 + 0.596i | 0.193 + 0.658i | 0.166 + 0.297i | 0.149 + 0.296i | 0.338 + 0.597i | 0.194 + 0.661i |
| 11.3 | 0.169 + 0.300i | 0.149 + 0.300i | 0.337 + 0.597i | 0.191 + 0.661i | 0.166 + 0.296i | 0.148 + 0.295i | 0.340 + 0.598i | 0.192 + 0.664i |
| 11.4 | 0.168 + 0.299i | 0.148 + 0.299i | 0.339 + 0.598i | 0.189 + 0.662i | 0.165 + 0.296i | 0.147 + 0.294i | 0.341 + 0.598i | 0.190 + 0.655i |
| 11.5 | 0.167 + 0.299i | 0.147 + 0.299i | 0.340 + 0.598i | 0.188 + 0.664i | 0.164 + 0.295i | 0.146 + 0.294i | 0.343 + 0.598i | 0.188 + 0.666i |
| 11.6 | 0.167 + 0.298i | 0.146 + 0.299i | 0.341 + 0.598i | 0.186 + 0.665i | 0.164 + 0.294i | 0.145 + 0.293i | 0.344 + 0.598i | 0.186 + 0.668i |
| 11.7 | 0.167 + 0.298i | 0.146 + 0.298i | 0.342 + 0.599i | 0.184 + 0.666i | 0.163 + 0.294i | 0.144 + 0.293i | 0.345 + 0.597i | 0.184 + 0.668i |
| 11.8 | 0.166 + 0.298i | 0.144 + 0.299i | 0.344 + 0.598i | 0.183 + 0.667i | 0.163 + 0.294i | 0.143 + 0.293i | 0.347 + 0.597i | 0.182 + 0.669i |
| 11.9 | 0.166 + 0.298i | 0.144 + 0.298i | 0.345 + 0.598i | 0.182 + 0.668i | 0.162 + 0.293i | 0.142 + 0.293i | 0.348 + 0.597i | 0.181 + 0.670i |
| 12 | 0.166 + 0.297i | 0.143 + 0.299i | 0.346 + 0.599i | 0.180 + 0.669i | 0.161 + 0.293i | 0.141 + 0.293i | 0.349 + 0.597i | 0.179 + 0.670i |
| 12.1 | 0.165 + 0.297i | 0.142 + 0.298i | 0.347 + 0.599i | 0.178 + 0.670i | 0.161 + 0.293i | 0.140 + 0.293i | 0.351 + 0.596i | 0.177 + 0.671i |
| 12.2 | 0.165 + 0.298i | 0.141 + 0.299i | 0.349 + 0.598i | 0.177 + 0.670i | 0.160 + 0.293i | 0.140 + 0.293i | 0.352 + 0.596i | 0.176 + 0.671i |
| 12.3 | 0.164 + 0.298i | 0.140 + 0.299i | 0.350 + 0.598i | 0.176 + 0.671i | 0.160 + 0.293i | 0.139 + 0.294i | 0.354 + 0.596i | 0.174 + 0.671i |
| 12.4 | 0.163 + 0.297i | 0.139 + 0.299i | 0.351 + 0.598i | 0.174 + 0.671i | 0.160 + 0.293i | 0.138 + 0.294i | 0.355 + 0.595i | 0.172 + 0.671i |
| 12.5 | 0.163 + 0.297i | 0.138 + 0.300i | 0.353 + 0.598i | 0.173 + 0.672i | 0.159 + 0.293i | 0.137 + 0.295i | 0.356 + 0.594i | 0.171 + 0.671i |
| 12.6 | 0.163 + 0.296i | 0.137 + 0.300i | 0.354 + 0.598i | 0.171 + 0.671i | 0.158 + 0.292i | 0.136 + 0.295i | 0.357 + 0.594i | 0.169 + 0.670i |
| 12.7 | 0.162 + 0.296i | 0.136 + 0.299i | 0.355 + 0.598i | 0.170 + 0.671i | 0.158 + 0.292i | 0.135 + 0.295i | 0.358 + 0.593i | 0.168 + 0.669i |
| 12.8 | 0.161 + 0.277i | 0.137 + 0.282i | 0.353 + 0.587i | 0.168 + 0.653i | 0.157 + 0.273i | 0.135 + 0.277i | 0.353 + 0.584i | 0.165 + 0.652i |
| 12.9 | 0.159 + 0.270i | 0.135 + 0.272i | 0.349 + 0.585i | 0.165 + 0.648i | 0.155 + 0.266i | 0.134 + 0.268i | 0.348 + 0.582i | 0.162 + 0.646i |
| 13 | 0.156 + 0.262i | 0.134 + 0.264i | 0.344 + 0.583i | 0.161 + 0.643i | 0.153 + 0.258i | 0.133 + 0.259i | 0.343 + 0.579i | 0.159 + 0.641i |
| 13.1 | 0.155 + 0.258i | 0.132 + 0.259i | 0.341 + 0.582i | 0.159 + 0.640i | 0.152 + 0.255i | 0.132 + 0.255i | 0.340 + 0.578i | 0.156 + 0.637i |
| 13.2 | 0.154 + 0.253i | 0.131 + 0.253i | 0.337 + 0.580i | 0.156 + 0.636i | 0.152 + 0.250i | 0.130 + 0.249i | 0.336 + 0.575i | 0.153 + 0.632i |
| 13.3 | 0.153 + 0.250i | 0.130 + 0.251i | 0.337 + 0.579i | 0.155 + 0.635i | 0.151 + 0.248i | 0.130 + 0.248i | 0.335 + 0.574i | 0.152 + 0.630i |
| 13.4 | 0.152 + 0.247i | 0.129 + 0.246i | 0.335 + 0.577i | 0.153 + 0.631i | 0.150 + 0.245i | 0.128 + 0.244i | 0.332 + 0.572i | 0.150 + 0.626i |
| 13.5 | 0.152 + 0.244i | 0.128 + 0.243i | 0.333 + 0.576i | 0.151 + 0.628i | 0.150 + 0.242i | 0.128 + 0.241i | 0.330 + 0.570i | 0.147 + 0.623i |

-continued

| 256NUC | | | | | | | | |
|---|---|---|---|---|---|---|---|---|
| 13.6 | 0.151 + 0.242i | 0.127 + 0.241i | 0.333 + 0.574i | 0.149 + 0.626i | 0.150 + 0.241i | 0.127 + 0.239i | 0.330 + 0.558i | 0.146 + 0.620i |
| 13.7 | 0.155 + 0.222i | 0.130 + 0.228i | 0.328 + 0.558i | 0.146 + 0.591i | 0.155 + 0.221i | 0.130 + 0.226i | 0.325 + 0.556i | 0.144 + 0.589i |
| 13.8 | 0.155 + 0.220i | 0.129 + 0.227i | 0.328 + 0.557i | 0.145 + 0.588i | 0.155 + 0.219i | 0.129 + 0.224i | 0.325 + 0.554i | 0.143 + 0.586i |
| 13.9 | 0.155 + 0.218i | 0.129 + 0.225i | 0.329 + 0.555i | 0.144 + 0.586i | 0.155 + 0.218i | 0.129 + 0.224i | 0.325 + 0.552i | 0.142 + 0.583i |
| 14 | 0.156 + 0.217i | 0.129 + 0.225i | 0.329 + 0.554i | 0.144 + 0.583i | 0.156 + 0.217i | 0.129 + 0.223i | 0.326 + 0.551i | 0.141 + 0.581i |
| 14.1 | 0.156 + 0.215i | 0.128 + 0.224i | 0.331 + 0.554i | 0.142 + 0.581i | 0.156 + 0.216i | 0.129 + 0.223i | 0.326 + 0.550i | 0.140 + 0.579i |
| 14.2 | 0.156 + 0.214i | 0.128 + 0.224i | 0.331 + 0.552i | 0.142 + 0.579i | 0.156 + 0.215i | 0.128 + 0.222i | 0.327 + 0.549i | 0.139 + 0.577i |
| 14.3 | 0.157 + 0.213i | 0.128 + 0.223i | 0.332 + 0.552i | 0.141 + 0.577i | 0.157 + 0.214i | 0.128 + 0.222i | 0.327 + 0.547i | 0.138 + 0.575i |
| 14.4 | 0.157 + 0.211i | 0.128 + 0.222i | 0.332 + 0.550i | 0.140 + 0.574i | 0.157 + 0.213i | 0.128 + 0.222i | 0.327 + 0.546i | 0.138 + 0.572i |
| 14.5 | 0.158 + 0.210i | 0.128 + 0.222i | 0.333 + 0.550i | 0.139 + 0.573i | 0.158 + 0.211i | 0.128 + 0.222i | 0.328 + 0.544i | 0.137 + 0.570i |
| 14.6 | 0.159 + 0.208i | 0.128 + 0.222i | 0.333 + 0.549i | 0.139 + 0.570i | 0.159 + 0.210i | 0.128 + 0.223i | 0.328 + 0.543i | 0.136 + 0.567i |
| 14.7 | 0.160 + 0.208i | 0.128 + 0.222i | 0.334 + 0.548i | 0.138 + 0.568i | 0.160 + 0.210i | 0.128 + 0.223i | 0.329 + 0.542i | 0.135 + 0.565i |
| 14.8 | 0.160 + 0.206i | 0.128 + 0.222i | 0.335 + 0.547i | 0.137 + 0.565i | 0.160 + 0.209i | 0.128 + 0.223i | 0.329 + 0.541i | 0.135 + 0.562i |
| 14.9 | 0.162 + 0.205i | 0.128 + 0.222i | 0.335 + 0.546i | 0.136 + 0.563i | 0.162 + 0.208i | 0.128 + 0.224i | 0.329 + 0.539i | 0.134 + 0.560i |
| 15 | 0.162 + 0.204i | 0.128 + 0.222i | 0.335 + 0.546i | 0.136 + 0.561i | 0.163 + 0.208i | 0.128 + 0.225i | 0.329 + 0.537i | 0.133 + 0.557i |
| 15.1 | 0.163 + 0.204i | 0.128 + 0.222i | 0.335 + 0.545i | 0.134 + 0.558i | 0.163 + 0.208i | 0.128 + 0.226i | 0.329 + 0.536i | 0.133 + 0.555i |
| 15.2 | 0.165 + 0.203i | 0.128 + 0.223i | 0.336 + 0.544i | 0.134 + 0.555i | 0.165 + 0.208i | 0.128 + 0.227i | 0.329 + 0.534i | 0.132 + 0.552i |
| 15.3 | 0.166 + 0.202i | 0.129 + 0.224i | 0.336 + 0.543i | 0.133 + 0.553i | 0.166 + 0.208i | 0.129 + 0.229i | 0.328 + 0.523i | 0.132 + 0.549i |
| 15.4 | 0.168 + 0.203i | 0.129 + 0.226i | 0.336 + 0.542i | 0.133 + 0.550i | 0.168 + 0.209i | 0.129 + 0.231i | 0.329 + 0.531i | 0.131 + 0.547i |
| 15.5 | 0.525 + 0.807i | 0.275 + 0.934i | 0.812 + 1.473i | 0.500 + 1.612i | 0.618 + 0.735i | 0.138 + 0.964i | 1.080 + 1.290i | 0.173 + 1.674i |
| 15.6 | 0.520 + 0.808i | 0.274 + 0.929i | 0.803 + 1.473i | 0.493 + 1.609i | 0.617 + 0.734i | 0.136 + 0.959i | 1.072 + 1.294i | 0.170 + 1.667i |
| 15.7 | 0.516 + 0.808i | 0.273 + 0.924i | 0.796 + 1.474i | 0.487 + 1.607i | 0.616 + 0.733i | 0.133 + 0.954i | 1.065 + 1.297i | 0.167 + 1.661i |
| 15.8 | 0.512 + 0.809i | 0.272 + 0.921i | 0.788 + 1.473i | 0.483 + 1.604i | 0.615 + 0.733i | 0.131 + 0.951i | 1.059 + 1.301i | 0.165 + 1.657i |
| 15.9 | 0.509 + 0.810i | 0.273 + 0.918i | 0.784 + 1.472i | 0.479 + 1.602i | 0.615 + 0.733i | 0.129 + 0.948i | 1.056 + 1.302i | 0.164 + 1.653i |
| 16 | 0.506 + 0.811i | 0.274 + 0.915i | 0.780 + 1.473i | 0.474 + 1.600i | 0.615 + 0.732i | 0.127 + 0.945i | 1.052 + 1.304i | 0.162 + 1.648i |
| 16.1 | 0.503 + 0.811i | 0.275 + 0.913i | 0.777 + 1.472i | 0.473 + 1.597i | 0.615 + 0.731i | 0.126 + 0.943i | 1.050 + 1.304i | 0.162 + 1.646i |
| 16.2 | 0.500 + 0.812i | 0.275 + 0.911i | 0.776 + 1.470i | 0.472 + 1.596i | 0.615 + 0.731i | 0.123 + 0.942i | 1.049 + 1.303i | 0.161 + 1.643i |
| 16.3 | 0.498 + 0.813i | 0.277 + 0.910i | 0.776 + 1.469i | 0.473 + 1.595i | 0.615 + 0.730i | 0.122 + 0.942i | 1.048 + 1.301i | 0.161 + 1.643i |
| 16.4 | 0.495 + 0.815i | 0.277 + 0.909i | 0.775 + 1.467i | 0.472 + 1.593i | 0.615 + 0.729i | 0.120 + 0.941i | 1.048 + 1.300i | 0.161 + 1.642i |
| 16.5 | 0.493 + 0.815i | 0.278 + 0.908i | 0.775 + 1.466i | 0.472 + 1.592i | 0.615 + 0.729i | 0.118 + 0.940i | 1.048 + 1.298i | 0.161 + 1.641i |
| 16.6 | 0.490 + 0.816i | 0.279 + 0.908i | 0.776 + 1.464i | 0.474 + 1.591i | 0.614 + 0.728i | 0.117 + 0.941i | 1.049 + 1.296i | 0.162 + 1.641i |
| 16.7 | 0.488 + 0.817i | 0.279 + 0.907i | 0.777 + 1.462i | 0.475 + 1.589i | 0.614 + 0.728i | 0.116 + 0.940i | 1.050 + 1.293i | 0.162 + 1.641i |
| 16.8 | 0.485 + 0.819i | 0.280 + 0.908i | 0.779 + 1.461i | 0.476 + 1.588i | 0.613 + 0.729i | 0.114 + 0.941i | 1.050 + 1.290i | 0.163 + 1.642i |
| 16.9 | 0.483 + 0.820i | 0.280 + 0.908i | 0.781 + 1.460i | 0.479 + 1.587i | 0.613 + 0.729i | 0.112 + 0.942i | 1.052 + 1.287i | 0.164 + 1.643i |
| 17 | 0.481 + 0.821i | 0.281 + 0.908i | 0.783 + 1.457i | 0.481 + 1.586i | 0.613 + 0.727i | 0.111 + 0.943i | 1.053 + 1.284i | 0.164 + 1.644i |
| 17.1 | 0.480 + 0.823i | 0.283 + 0.910i | 0.786 + 1.455i | 0.484 + 1.585i | 0.614 + 0.727i | 0.110 + 0.946i | 1.055 + 1.280i | 0.166 + 1.645i |
| 17.2 | 0.478 + 0.824i | 0.284 + 0.910i | 0.785 + 1.453i | 0.484 + 1.583i | 0.614 + 0.726i | 0.108 + 0.947i | 1.055 + 1.279i | 0.166 + 1.644i |
| 17.3 | 0.478 + 0.824i | 0.285 + 0.910i | 0.786 + 1.452i | 0.485 + 1.581i | 0.615 + 0.725i | 0.107 + 0.948i | 1.055 + 1.276i | 0.166 + 1.644i |
| 17.4 | 0.476 + 0.825i | 0.286 + 0.910i | 0.787 + 1.450i | 0.486 + 1.579i | 0.616 + 0.724i | 0.106 + 0.948i | 1.055 + 1.274i | 0.166 + 1.643i |
| 17.5 | 0.476 + 0.826i | 0.287 + 0.910i | 0.786 + 1.449i | 0.485 + 1.577i | 0.617 + 0.724i | 0.106 + 0.949i | 1.055 + 1.272i | 0.166 + 1.641i |
| 17.6 | 0.476 + 0.826i | 0.289 + 0.909i | 0.786 + 1.447i | 0.486 + 1.575i | 0.618 + 0.722i | 0.105 + 0.950i | 1.054 + 1.271i | 0.166 + 1.640i |
| 17.7 | 0.476 + 0.826i | 0.291 + 0.910i | 0.786 + 1.445i | 0.486 + 1.573i | 0.620 + 0.721i | 0.104 + 0.950i | 1.055 + 1.269i | 0.165 + 1.639i |
| 17.8 | 0.477 + 0.826i | 0.293 + 0.910i | 0.786 + 1.443i | 0.486 + 1.571i | 0.621 + 0.720i | 0.103 + 0.952i | 1.054 + 1.267i | 0.165 + 1.637i |
| 17.9 | 0.583 + 0.730i | 0.461 + 0.875i | 0.988 + 1.303i | 0.717 + 1.470i | 0.664 + 0.626i | 0.117 + 1.522i | 1.234 + 1.091i | 0.407 + 1.607i |
| 18 | 0.578 + 0.730i | 0.461 + 0.865i | 0.990 + 1.299i | 0.720 + 1.463i | 0.662 + 0.626i | 0.122 + 1.539i | 1.233 + 1.087i | 0.419 + 1.602i |
| 18.1 | 0.574 + 0.732i | 0.459 + 0.860i | 0.988 + 1.296i | 0.721 + 1.459i | 0.661 + 0.625i | 0.124 + 1.546i | 1.231 + 1.084i | 0.424 + 1.601i |
| 18.2 | 0.570 + 0.733i | 0.457 + 0.855i | 0.988 + 1.292i | 0.723 + 1.456i | 0.660 + 0.625i | 0.126 + 1.552i | 1.228 + 1.082i | 0.427 + 1.600i |
| 18.3 | 0.566 + 0.734i | 0.454 + 0.851i | 0.987 + 1.290i | 0.724 + 1.454i | 0.659 + 0.524i | 0.127 + 1.555i | 1.225 + 1.080i | 0.430 + 1.600i |
| 18.4 | 0.565 + 0.735i | 0.454 + 0.849i | 0.986 + 1.289i | 0.723 + 1.452i | 0.659 + 0.623i | 0.127 + 1.555i | 1.224 + 1.078i | 0.430 + 1.598i |
| 18.5 | 0.595 + 0.730i | 0.463 + 0.891i | 1.007 + 1.278i | 0.738 + 1.438i | 0.673 + 0.611i | 0.138 + 1.564i | 1.242 + 1.058i | 0.444 + 1.571i |
| 18.6 | 0.593 + 0.732i | 0.464 + 0.890i | 1.009 + 1.275i | 0.740 + 1.436i | 0.672 + 0.511i | 0.139 + 1.565i | 1.242 + 1.054i | 0.445 + 1.569i |
| 18.7 | 0.577 + 0.733i | 0.466 + 0.873i | 1.016 + 1.265i | 0.752 + 1.427i | 0.659 + 0.612i | 0.151 + 1.600i | 1.243 + 1.042i | 0.465 + 1.568i |
| 18.8 | 0.574 + 0.737i | 0.463 + 0.875i | 1.016 + 1.261i | 0.754 + 1.424i | 0.658 + 0.614i | 0.153 + 1.606i | 1.241 + 1.039i | 0.468 + 1.567i |
| 18.9 | 0.573 + 0.739i | 0.463 + 0.875i | 1.016 + 1.260i | 0.754 + 1.423i | 0.658 + 0.614i | 0.153 + 1.606i | 1.239 + 1.037i | 0.468 + 1.566i |
| 19 | 0.572 + 0.740i | 0.462 + 0.876i | 1.016 + 1.257i | 0.756 + 1.421i | 0.658 + 0.614i | 0.154 + 1.607i | 1.238 + 1.034i | 0.470 + 1.566i |
| 19.1 | 0.572 + 0.742i | 0.462 + 0.877i | 1.015 + 1.256i | 0.756 + 1.420i | 0.659 + 0.615i | 0.154 + 1.606i | 1.237 + 1.033i | 0.470 + 1.565i |
| 19.2 | 0.235 + 0.324i | 0.081 + 0.342i | 0.267 + 0.515i | 0.105 + 0.544i | 0.242 + 0.330i | 0.077 + 0.341i | 0.305 + 0.503i | 0.085 + 0.547i |
| 19.3 | 0.234 + 0.324i | 0.080 + 0.342i | 0.267 + 0.515i | 0.106 + 0.544i | 0.243 + 0.330i | 0.077 + 0.341i | 0.306 + 0.503i | 0.085 + 0.548i |
| 19.4 | 0.234 + 0.324i | 0.080 + 0.341i | 0.266 + 0.516i | 0.106 + 0.544i | 0.243 + 0.330i | 0.077 + 0.341i | 0.307 + 0.503i | 0.084 + 0.547i |
| 19.5 | 0.234 + 0.323i | 0.080 + 0.341i | 0.265 + 0.517i | 0.107 + 0.544i | 0.243 + 0.330i | 0.076 + 0.341i | 0.307 + 0.502i | 0.082 + 0.547i |
| 19.6 | 0.234 + 0.323i | 0.080 + 0.340i | 0.264 + 0.518i | 0.107 + 0.544i | 0.242 + 0.330i | 0.076 + 0.340i | 0.307 + 0.502i | 0.082 + 0.547i |
| 19.7 | 0.234 + 0.322i | 0.080 + 0.339i | 0.263 + 0.518i | 0.107 + 0.544i | 0.242 + 0.330i | 0.076 + 0.340i | 0.308 + 0.502i | 0.081 + 0.547i |
| 19.8 | 0.234 + 0.321i | 0.080 + 0.338i | 0.262 + 0.519i | 0.107 + 0.544i | 0.242 + 0.330i | 0.076 + 0.340i | 0.309 + 0.502i | 0.080 + 0.547i |
| 19.9 | 0.233 + 0.320i | 0.080 + 0.338i | 0.262 + 0.519i | 0.108 + 0.543i | 0.242 + 0.330i | 0.076 + 0.340i | 0.310 + 0.501i | 0.079 + 0.546i |
| 20 | 0.233 + 0.320i | 0.080 + 0.337i | 0.262 + 0.520i | 0.109 + 0.544i | 0.242 + 0.330i | 0.076 + 0.340i | 0.311 + 0.501i | 0.079 + 0.547i |
| 20.1 | 0.233 + 0.319i | 0.080 + 0.336i | 0.261 + 0.520i | 0.110 + 0.544i | 0.243 + 0.330i | 0.075 + 0.340i | 0.312 + 0.500i | 0.078 + 0.546i |
| 20.2 | 0.233 + 0.318i | 0.081 + 0.336i | 0.262 + 0.520i | 0.111 + 0.543i | 0.243 + 0.330i | 0.075 + 0.341i | 0.314 + 0.500i | 0.077 + 0.546i |
| 20.3 | 0.234 + 0.317i | 0.081 + 0.334i | 0.262 + 0.521i | 0.112 + 0.543i | 0.245 + 0.331i | 0.076 + 0.342i | 0.315 + 0.499i | 0.076 + 0.545i |
| 20.4 | 0.234 + 0.315i | 0.081 + 0.332i | 0.262 + 0.522i | 0.116 + 0.546i | 0.246 + 0.333i | 0.076 + 0.347i | 0.317 + 0.498i | 0.075 + 0.544i |
| 20.5 | 0.235 + 0.337i | 0.097 + 0.384i | 0.289 + 0.566i | 0.165 + 0.600i | 0.294 + 0.394i | 0.076 + 0.445i | 0.359 + 0.510i | 0.075 + 0.594i |
| 20.6 | 0.236 + 0.338i | 0.099 + 0.387i | 0.291 + 0.568i | 0.168 + 0.602i | 0.299 + 0.396i | 0.076 + 0.449i | 0.362 + 0.510i | 0.075 + 0.597i |
| 20.7 | 0.237 + 0.340i | 0.101 + 0.391i | 0.291 + 0.569i | 0.171 + 0.602i | 0.304 + 0.398i | 0.075 + 0.453i | 0.366 + 0.510i | 0.074 + 0.599i |
| 20.8 | 0.246 + 0.344i | 0.115 + 0.396i | 0.299 + 0.563i | 0.183 + 0.591i | 0.334 + 0.398i | 0.069 + 0.456i | 0.391 + 0.507i | 0.074 + 0.596i |
| 20.9 | 0.248 + 0.345i | 0.119 + 0.397i | 0.299 + 0.562i | 0.184 + 0.588i | 0.341 + 0.398i | 0.067 + 0.457i | 0.395 + 0.507i | 0.074 + 0.596i |
| 21 | 0.249 + 0.346i | 0.121 + 0.398i | 0.299 + 0.561i | 0.186 + 0.587i | 0.347 + 0.399i | 0.065 + 0.458i | 0.399 + 0.507i | 0.073 + 0.597i |
| 21.1 | 0.250 + 0.348i | 0.124 + 0.399i | 0.300 + 0.561i | 0.188 + 0.586i | 0.351 + 0.400i | 0.064 + 0.459i | 0.402 + 0.507i | 0.073 + 0.597i |
| 21.2 | 0.253 + 0.349i | 0.127 + 0.400i | 0.300 + 0.560i | 0.189 + 0.584i | 0.359 + 0.400i | 0.062 + 0.459i | 0.408 + 0.507i | 0.072 + 0.597i |

-continued

| 256NUC | | | | | | | | |
|---|---|---|---|---|---|---|---|---|
| 21.3 | 0.254 + 0.350i | 0.130 + 0.401i | 0.300 + 0.559i | 0.190 + 0.583i | 0.363 + 0.401i | 0.061 + 0.459i | 0.411 + 0.508i | 0.071 + 0.598i |
| 21.4 | 0.255 + 0.351i | 0.132 + 0.402i | 0.301 + 0.559i | 0.191 + 0.582i | 0.367 + 0.402i | 0.060 + 0.460i | 0.415 + 0.508i | 0.071 + 0.598i |
| 21.5 | 0.256 + 0.352i | 0.134 + 0.403i | 0.301 + 0.559i | 0.192 + 0.581i | 0.369 + 0.403i | 0.060 + 0.460i | 0.417 + 0.509i | 0.071 + 0.599i |
| 21.6 | 0.258 + 0.353i | 0.136 + 0.404i | 0.302 + 0.559i | 0.192 + 0.580i | 0.373 + 0.403i | 0.059 + 0.460i | 0.421 + 0.510i | 0.070 + 0.598i |
| 21.7 | 0.259 + 0.354i | 0.138 + 0.405i | 0.302 + 0.559i | 0.193 + 0.580i | 0.375 + 0.404i | 0.058 + 0.460i | 0.423 + 0.511i | 0.070 + 0.599i |
| 21.8 | 0.260 + 0.355i | 0.140 + 0.406i | 0.303 + 0.559i | 0.193 + 0.579i | 0.379 + 0.405i | 0.057 + 0.460i | 0.426 + 0.512i | 0.070 + 0.600i |
| 21.9 | 0.261 + 0.356i | 0.142 + 0.407i | 0.303 + 0.559i | 0.193 + 0.579i | 0.380 + 0.406i | 0.057 + 0.460i | 0.428 + 0.513i | 0.070 + 0.600i |
| 22 | 0.263 + 0.358i | 0.144 + 0.408i | 0.304 + 0.559i | 0.194 + 0.579i | 0.384 + 0.407i | 0.057 + 0.460i | 0.431 + 0.514i | 0.070 + 0.600i |
| 22.1 | 0.264 + 0.358i | 0.145 + 0.408i | 0.304 + 0.559i | 0.194 + 0.579i | 0.386 + 0.408i | 0.056 + 0.460i | 0.433 + 0.515i | 0.070 + 0.601i |
| 22.2 | 0.265 + 0.359i | 0.147 + 0.409i | 0.306 + 0.559i | 0.195 + 0.578i | 0.388 + 0.408i | 0.056 + 0.459i | 0.437 + 0.516i | 0.069 + 0.601i |
| 22.3 | 0.266 + 0.361i | 0.149 + 0.409i | 0.307 + 0.559i | 0.195 + 0.578i | 0.390 + 0.409i | 0.056 + 0.459i | 0.439 + 0.517i | 0.069 + 0.601i |
| 22.4 | 0.270 + 0.363i | 0.151 + 0.409i | 0.310 + 0.558i | 0.196 + 0.575i | 0.396 + 0.410i | 0.055 + 0.457i | 0.451 + 0.519i | 0.069 + 0.599i |
| 22.5 | 0.271 + 0.363i | 0.153 + 0.410i | 0.311 + 0.558i | 0.196 + 0.575i | 0.397 + 0.411i | 0.055 + 0.456i | 0.453 + 0.520i | 0.069 + 0.599i |
| 22.6 | 0.657 + 0.796i | 0.681 + 0.968i | 1.439 + 0.592i | 1.279 + 0.792i | 0.641 + 0.636i | 0.502 + 1.245i | 1.219 + 0.516i | 1.198 + 1.044i |
| 22.7 | 0.658 + 0.797i | 0.682 + 0.968i | 1.438 + 0.590i | 1.278 + 0.790i | 0.644 + 0.637i | 0.501 + 1.243i | 1.219 + 0.516i | 1.197 + 1.043i |
| 22.8 | 0.661 + 0.798i | 0.685 + 0.969i | 1.434 + 0.589i | 1.277 + 0.789i | 0.645 + 0.638i | 0.499 + 1.242i | 1.217 + 0.515i | 1.195 + 1.042i |
| 22.9 | 0.662 + 0.798i | 0.687 + 0.969i | 1.432 + 0.587i | 1.276 + 0.787i | 0.647 + 0.639i | 0.497 + 1.241i | 1.216 + 0.514i | 1.194 + 1.041i |
| 23 | 0.664 + 0.799i | 0.688 + 0.970i | 1.429 + 0.586i | 1.276 + 0.785i | 0.649 + 0.641i | 0.496 + 1.240i | 1.215 + 0.514i | 1.193 + 1.040i |
| 23.1 | 0.666 + 0.800i | 0.691 + 0.971i | 1.428 + 0.582i | 1.276 + 0.782i | 0.651 + 0.642i | 0.495 + 1.238i | 1.215 + 0.512i | 1.194 + 1.037i |
| 23.2 | 0.667 + 0.802i | 0.693 + 0.972i | 1.426 + 0.578i | 1.276 + 0.780i | 0.652 + 0.643i | 0.494 + 1.236i | 1.214 + 0.511i | 1.194 + 1.035i |
| 23.3 | 0.668 + 0.804i | 0.695 + 0.975i | 1.423 + 0.575i | 1.275 + 0.777i | 0.654 + 0.646i | 0.493 + 1.234i | 1.212 + 0.509i | 1.195 + 1.032i |
| 23.4 | 0.671 + 0.817i | 0.682 + 0.991i | 1.456 + 0.466i | 1.312 + 0.665i | 0.663 + 0.656i | 0.453 + 1.213i | 1.225 + 0.445i | 1.275 + 0.887i |
| 23.5 | 0.673 + 0.819i | 0.684 + 0.993i | 1.452 + 0.465i | 1.306 + 0.660i | 0.665 + 0.658i | 0.451 + 1.211i | 1.223 + 0.441i | 1.274 + 0.881i |
| 23.6 | 0.676 + 0.819i | 0.685 + 0.993i | 1.449 + 0.466i | 1.302 + 0.657i | 0.667 + 0.659i | 0.449 + 1.210i | 1.222 + 0.439i | 1.273 + 0.876i |
| 23.7 | 0.677 + 0.821i | 0.687 + 0.994i | 1.445 + 0.467i | 1.297 + 0.655i | 0.668 + 0.660i | 0.448 + 1.207i | 1.221 + 0.438i | 1.272 + 0.872i |
| 23.8 | 0.679 + 0.822i | 0.689 + 0.995i | 1.441 + 0.466i | 1.294 + 0.653i | 0.670 + 0.661i | 0.447 + 1.207i | 1.219 + 0.437i | 1.270 + 0.869i |
| 23.9 | 0.681 + 0.823i | 0.691 + 0.996i | 1.437 + 0.466i | 1.290 + 0.651i | 0.671 + 0.662i | 0.447 + 1.206i | 1.217 + 0.436i | 1.269 + 0.866i |
| 24 | 0.683 + 0.824i | 0.693 + 0.997i | 1.434 + 0.466i | 1.288 + 0.649i | 0.672 + 0.663i | 0.446 + 1.205i | 1.215 + 0.435i | 1.267 + 0.862i |
| 24.1 | 0.685 + 0.826i | 0.695 + 0.998i | 1.431 + 0.465i | 1.285 + 0.646i | 0.674 + 0.665i | 0.446 + 1.203i | 1.214 + 0.434i | 1.268 + 0.858i |
| 24.2 | 0.688 + 0.828i | 0.697 + 1.000i | 1.429 + 0.465i | 1.283 + 0.645i | 0.676 + 0.666i | 0.445 + 1.203i | 1.212 + 0.433i | 1.267 + 0.856i |
| 24.3 | 0.690 + 0.844i | 0.717 + 1.030i | 1.424 + 0.461i | 1.279 + 0.637i | 0.678 + 0.676i | 0.433 + 1.204i | 1.207 + 0.430i | 1.281 + 0.845i |
| 24.4 | 0.693 + 0.847i | 0.720 + 1.034i | 1.421 + 0.460i | 1.277 + 0.634i | 0.680 + 0.678i | 0.431 + 1.202i | 1.205 + 0.429i | 1.282 + 0.840i |
| 24.5 | 0.694 + 0.849i | 0.722 + 1.037i | 1.418 + 0.461i | 1.274 + 0.634i | 0.681 + 0.680i | 0.430 + 1.201i | 1.204 + 0.429i | 1.280 + 0.839i |
| 24.6 | 0.695 + 0.850i | 0.722 + 1.038i | 1.415 + 0.462i | 1.271 + 0.633i | 0.682 + 0.681i | 0.428 + 1.199i | 1.203 + 0.428i | 1.279 + 0.836i |
| 24.7 | 0.697 + 0.852i | 0.724 + 1.039i | 1.413 + 0.462i | 1.269 + 0.631i | 0.684 + 0.682i | 0.428 + 1.197i | 1.202 + 0.428i | 1.277 + 0.833i |
| 24.8 | 0.698 + 0.853i | 0.725 + 1.040i | 1.410 + 0.462i | 1.266 + 0.631i | 0.684 + 0.683i | 0.429 + 1.196i | 1.201 + 0.428i | 1.276 + 0.831i |
| 24.9 | 0.699 + 0.854i | 0.726 + 1.040i | 1.407 + 0.463i | 1.265 + 0.630i | 0.686 + 0.684i | 0.428 + 1.196i | 1.199 + 0.428i | 1.274 + 0.829i |
| 25 | 0.700 + 0.855i | 0.726 + 1.041i | 1.405 + 0.463i | 1.262 + 0.629i | 0.686 + 0.685i | 0.428 + 1.195i | 1.198 + 0.427i | 1.273 + 0.827i |

Annex to the Description—Annex 3

| | | | | | | | | | | | | | | | |
|---|---|---|---|---|---|---|---|---|---|---|---|---|---|---|---|
| 245 | 449 | 491 | 980 | 1064 | 1194 | 1277 | 1571 | 2026 | 3186 | 4399 | 4900 | 5283 | 5413 | 5558 | 6570 |
| 1318 | 1584 | 1682 | 1860 | 1954 | 2000 | 2062 | 3387 | 3441 | 3879 | 3981 | 4240 | 4302 | 4446 | 4603 | 5111 |
| 105 | 472 | 785 | 911 | 1168 | 1450 | 2550 | 2851 | 3277 | 3624 | 4128 | 4460 | 4572 | 4669 | 4783 | 5102 |
| 1217 | 5338 | 5737 | 8334 | | | | | | | | | | | | |
| 855 | 994 | 2979 | 9443 | | | | | | | | | | | | |
| 7506 | 7811 | 9212 | 9982 | | | | | | | | | | | | |
| 848 | 3313 | 3380 | 3990 | | | | | | | | | | | | |
| 2095 | 4143 | 4620 | 9946 | | | | | | | | | | | | |
| 1488 | 2396 | 6130 | 7483 | | | | | | | | | | | | |
| 1032 | 2241 | 7067 | 10418 | | | | | | | | | | | | |
| 2008 | 3199 | 7215 | 7502 | | | | | | | | | | | | |
| 1161 | 7705 | 8194 | 8584 | | | | | | | | | | | | |
| 2316 | 4813 | 8649 | 9359 | | | | | | | | | | | | |
| 125 | 1880 | 3177 | | | | | | | | | | | | | |
| 1141 | 8033 | 9072 | | | | | | | | | | | | | |

| | | | | | | | | | | | | | |
|---|---|---|---|---|---|---|---|---|---|---|---|---|---|
| 7492 | 7768 | 7837 | 7984 | 8306 | 8483 | 8685 | 9357 | 9642 | 10045 | 10179 | 10261 | 10338 | 10412 |
| 5588 | 5675 | 5793 | 5955 | 6397 | 6221 | 6449 | 6616 | 7218 | 7394 | 9535 | 9806 | 10009 | 10763 |
| 5133 | 5199 | 5905 | 6647 | 7328 | 7086 | 7703 | 8121 | 8217 | 9149 | 9304 | 9476 | 9736 | 9884 |

ATSC3_QC_CR515_N16200: Code Rate = 5/15, LDPC Length = 16 k

| | | | | | | | | | | | | | | | | |
|---|---|---|---|---|---|---|---|---|---|---|---|---|---|---|---|---|
| 13 | 88 | 136 | 188 | 398 | 794 | 855 | 918 | 954 | 1950 | 2762 | 2837 | 2847 | 4209 | 4342 | 5092 | 5334 |
| 619 | 792 | 1002 | 1148 | 3528 | 1533 | 1925 | 2207 | 2766 | 3021 | 3261 | 8593 | 8947 | 4832 | 4873 | 5109 | 5488 |
| 499 | 717 | 1551 | 1791 | 2535 | 3135 | 3582 | 3813 | 4047 | 4309 | 5126 | 5186 | 5219 | 5716 | 5977 | 6236 | 6406 |
| 658 | 4058 | 7824 | 8512 | | | | | | | | | | | | | |
| 3245 | 4743 | 8117 | 9369 | | | | | | | | | | | | | |
| 465 | 6559 | 8112 | 9461 | | | | | | | | | | | | | |
| 975 | 7368 | 4444 | 6095 | | | | | | | | | | | | | |
| 4128 | 5993 | 9182 | 9473 | | | | | | | | | | | | | |
| 9 | 3822 | 5306 | 5320 | | | | | | | | | | | | | |
| 4 | 8311 | 9571 | 9669 | | | | | | | | | | | | | |
| 13 | 8122 | 8949 | 9656 | | | | | | | | | | | | | |

-continued

| | | | |
|---|---|---|---|
| 3353 | 4449 | 5829 | 8053 |
| 7885 | 9118 | 9674 | |
| 7575 | 9591 | 9670 | |
| 431 | 8123 | 9271 | |
| 4228 | 7967 | 9270 | |
| 8647 | 9146 | 9556 | |
| 11 | 5213 | 7763 | |

| | | | | | | | | | | | | | | |
|---|---|---|---|---|---|---|---|---|---|---|---|---|---|---|
| 5498 | 5731 | 5837 | 6150 | 6942 | 7127 | 7402 | 7935 | 8235 | 8307 | 8600 | 9001 | 9419 | 9442 | 9710 |
| 5882 | 6079 | 6097 | 6276 | 6499 | 6584 | 6738 | 6795 | 7550 | 7723 | 7786 | 8732 | 9060 | 9270 | 9401 |
| 6586 | 6593 | 7085 | 7399 | 7485 | 7726 | 7878 | 8027 | 8066 | 8425 | 8832 | 9309 | 9464 | 9553 | 9671 |

ATSC3_QC_CR615_N16200: Code Rate = 6/15, LDPC Length = 16 k

| | | | | | | | | | | | | | |
|---|---|---|---|---|---|---|---|---|---|---|---|---|---|
| 1606 | 3402 | 4961 | 6751 | 7132 | 11516 | 12300 | 12482 | 12592 | 13342 | 13764 | 14123 | 21576 | 23946 |
| 4621 | 5007 | 6910 | 8732 | 9757 | 11508 | 13099 | 15513 | 16335 | 18052 | 19512 | 21319 | 23663 | 25628 |
| 16 | 1094 | 2020 | 3080 | 4194 | 5098 | 5631 | 6877 | 7889 | 8237 | 9804 | 10067 | 11017 | 11366 |
| 700 | 897 | 1708 | 6017 | 6490 | 7372 | 7825 | 9546 | 10398 | 16605 | 18561 | 18745 | 21625 | 22137 |
| 159 | 2010 | 2573 | 3617 | 4452 | 4958 | 5556 | 5832 | 6481 | 8227 | 9924 | 10836 | 14954 | 15594 |
| 3118 | 3545 | 4768 | 4992 | 5227 | 6732 | 8170 | 9397 | 10522 | 11508 | 15536 | 20218 | 21921 | 28599 |
| 1264 | 4254 | 6936 | 9165 | 9486 | 9950 | 10861 | 11653 | 13697 | 13961 | 15164 | 15665 | 18444 | 19470 |
| 111 | 1307 | 1628 | 2041 | 2524 | 5358 | 7988 | 8191 | 10322 | 11905 | 12919 | 14127 | 15515 | 15711 |
| 961 | 3035 | 7174 | 7948 | 13355 | 13607 | 14971 | 18189 | 18339 | 18665 | 18875 | 19142 | 20615 | 21136 |
| 2990 | 3549 | 4273 | 4808 | 5707 | 6021 | 6509 | 7456 | 8240 | 10044 | 12262 | 12660 | 13085 | 14750 |
| 955 | 4323 | 5145 | 6885 | 8123 | 9730 | 11840 | 12216 | 19194 | 20313 | 23056 | 24248 | 24830 | 25268 |
| 264 | 605 | 4181 | 4483 | 5156 | 7238 | 8863 | 10939 | 11251 | 12964 | 16254 | 17511 | 20017 | 22395 |
| 520 | 2562 | 2794 | 3528 | 3860 | 4402 | 5676 | 6963 | 8655 | 9018 | 9783 | 11933 | 16336 | 17193 |
| 10106 | 10637 | 10906 | 34242 | | | | | | | | | | |
| 1856 | 15100 | 19378 | 21848 | | | | | | | | | | |
| 943 | 11191 | 27806 | 29411 | | | | | | | | | | |
| 4575 | 6359 | 13629 | 19383 | | | | | | | | | | |
| 4476 | 4953 | 18782 | 24313 | | | | | | | | | | |
| 5441 | 6381 | 21840 | 35943 | | | | | | | | | | |
| 9638 | 9763 | 12546 | 30120 | | | | | | | | | | |
| 9587 | 10626 | 11047 | 25700 | | | | | | | | | | |
| 4088 | 15298 | 28768 | 35047 | | | | | | | | | | |
| 2332 | 6363 | 8782 | 28863 | | | | | | | | | | |
| 4625 | 4933 | 28298 | 30289 | | | | | | | | | | |
| 3541 | 4918 | 18257 | 31746 | | | | | | | | | | |
| 1221 | 25233 | 26757 | 34892 | | | | | | | | | | |
| 8150 | 16677 | 27934 | 30021 | | | | | | | | | | |
| 8500 | 25016 | 33043 | 38070 | | | | | | | | | | |
| 7374 | 10207 | 16189 | 35811 | | | | | | | | | | |
| 611 | 18480 | 20064 | 38261 | | | | | | | | | | |
| 25416 | 27352 | 36089 | 38469 | | | | | | | | | | |
| 1667 | 17614 | 25839 | 32776 | | | | | | | | | | |
| 4118 | 12481 | 21912 | 37945 | | | | | | | | | | |
| 5573 | 13222 | 23619 | 31271 | | | | | | | | | | |
| 18271 | 26251 | 27182 | 30587 | | | | | | | | | | |
| 14690 | 26430 | 26799 | 34355 | | | | | | | | | | |
| 13688 | 16040 | 20716 | 34558 | | | | | | | | | | |
| 2740 | 14957 | 23436 | 32540 | | | | | | | | | | |
| 3491 | 14365 | 14681 | 36858 | | | | | | | | | | |
| 4796 | 6238 | 25203 | 27854 | | | | | | | | | | |
| 1731 | 12816 | 17344 | 26025 | | | | | | | | | | |
| 19182 | 21662 | 23742 | 27872 | | | | | | | | | | |
| 6502 | 13641 | 17509 | 34713 | | | | | | | | | | |
| 12246 | 12372 | 16746 | 27452 | | | | | | | | | | |
| 1589 | 21528 | 30621 | 34003 | | | | | | | | | | |
| 12328 | 20515 | 30651 | 31432 | | | | | | | | | | |
| 3415 | 22656 | 23427 | 36395 | | | | | | | | | | |
| 632 | 5209 | 25958 | 31085 | | | | | | | | | | |
| 619 | 3690 | 19648 | 37778 | | | | | | | | | | |
| 9528 | 13581 | 26965 | 36447 | | | | | | | | | | |
| 2147 | 26249 | 26968 | 28776 | | | | | | | | | | |
| 15698 | 18209 | 30683 | | | | | | | | | | | |
| 1132 | 19888 | 34111 | | | | | | | | | | | |
| 4608 | 25513 | 38874 | | | | | | | | | | | |
| 475 | 1729 | 34100 | | | | | | | | | | | |
| 7348 | 32277 | 38587 | | | | | | | | | | | |
| 182 | 16473 | 33082 | | | | | | | | | | | |
| 3865 | 9678 | 21265 | | | | | | | | | | | |
| 4447 | 20151 | 27618 | | | | | | | | | | | |
| 6335 | 14371 | 38711 | | | | | | | | | | | |
| 704 | 9695 | 28858 | | | | | | | | | | | |
| 4856 | 9757 | 30546 | | | | | | | | | | | |
| 1993 | 19361 | 30732 | | | | | | | | | | | |
| 756 | 28000 | 29138 | | | | | | | | | | | |
| 3821 | 24076 | 31813 | | | | | | | | | | | |
| 4611 | 12326 | 32291 | | | | | | | | | | | |

-continued

| | | |
|---|---|---|
| 7628 | 21515 | 34995 |
| 1246 | 13294 | 30068 |
| 6466 | 33233 | 35865 |
| 14484 | 23274 | 38150 |
| 21269 | 36411 | 37450 |
| 23129 | 26195 | 37653 |

| | | | | | | | | | | | | |
|---|---|---|---|---|---|---|---|---|---|---|---|---|
| 24533 | 25376 | 25667 | 26836 | 31799 | 34173 | 35462 | 36153 | 36740 | 37085 | 37452 | 37468 | 37658 |
| 27208 | 31333 | 32219 | 33003 | 33239 | 33447 | 36200 | 36473 | 36938 | 37201 | 37283 | 37495 | 38642 |
| 13136 | 13354 | 15379 | 18934 | 20199 | 24522 | 26172 | 28666 | 30386 | 32714 | 36390 | 37015 | 37162 |
| 23693 | 24340 | 24966 | 25015 | 26995 | 28586 | 28895 | 29687 | 33938 | 34520 | 34858 | 37056 | 38297 |
| 16623 | 18065 | 19249 | 22394 | 22677 | 23408 | 23731 | 24076 | 24776 | 27007 | 28222 | 30343 | 38371 |
| 29445 | 29758 | 29968 | 31014 | 32027 | 33685 | 34378 | 35867 | 36323 | 36728 | 36870 | 38335 | 38623 |
| 20313 | 21189 | 24371 | 26431 | 26999 | 28086 | 28251 | 29261 | 31981 | 34015 | 35850 | 36129 | 37186 |
| 17061 | 19024 | 21195 | 22902 | 23727 | 24401 | 24608 | 25111 | 25228 | 27338 | 35398 | 37794 | 38196 |
| 21309 | 21758 | 23366 | 24745 | 25849 | 25962 | 27583 | 30006 | 31118 | 32106 | 36469 | 36583 | 37920 |
| 15680 | 16049 | 21587 | 23997 | 25803 | 28343 | 28693 | 34393 | 34860 | 35490 | 36021 | 37737 | 38296 |
| 26617 | 26801 | 28557 | 29753 | 30745 | 31450 | 31973 | 32839 | 33025 | 33296 | 35710 | 37366 | 37509 |
| 22818 | 23261 | 23422 | 24064 | 26329 | 27723 | 28186 | 30434 | 31956 | 33971 | 34372 | 36764 | 38123 |
| 17320 | 19035 | 20606 | 23579 | 23769 | 24123 | 24966 | 27866 | 32457 | 34011 | 34499 | 36620 | 37526 |

ATSC3_QC_CR615_N64800: Code Rate = 6/15, LDPC Length = 64 k

| | | | | | | | | | | | | |
|---|---|---|---|---|---|---|---|---|---|---|---|---|
| 432 | 655 | 893 | 942 | 1285 | 1427 | 1738 | 2199 | 2441 | 2565 | 2932 | 3201 | 4144 |
| 220 | 453 | 690 | 826 | 1116 | 1425 | 1488 | 1901 | 3119 | 3182 | 3568 | 3800 | 3953 |
| 300 | 454 | 497 | 930 | 1757 | 2145 | 2314 | 2372 | 2467 | 2819 | 3191 | 3256 | 3699 |
| 1373 | 4668 | 5324 | 7777 | | | | | | | | | |
| 189 | 3930 | 5766 | 6877 | | | | | | | | | |
| 3 | 2961 | 4207 | 5747 | | | | | | | | | |
| 1108 | 4768 | 6743 | 2106 | | | | | | | | | |
| 1282 | 2274 | 2750 | 6204 | | | | | | | | | |
| 2279 | 2587 | 2737 | 6344 | | | | | | | | | |
| 2889 | 3164 | 7275 | 8040 | | | | | | | | | |
| 133 | 2734 | 5081 | 8386 | | | | | | | | | |
| 437 | 3208 | 7121 | | | | | | | | | | |
| 4280 | 7128 | 8490 | | | | | | | | | | |
| 619 | 4563 | 6206 | | | | | | | | | | |
| 2799 | 6814 | 6991 | | | | | | | | | | |
| 244 | 4212 | 5925 | | | | | | | | | | |
| 1719 | 7657 | 8554 | | | | | | | | | | |
| 53 | 1895 | 6685 | | | | | | | | | | |
| 584 | 5420 | 6856 | | | | | | | | | | |
| 2958 | 5834 | 8103 | | | | | | | | | | |

| | | | | | | | | | | |
|---|---|---|---|---|---|---|---|---|---|---|
| 4419 | 4678 | 4963 | 5423 | 5922 | 6433 | 6564 | 6656 | 7478 | 7514 | 7892 |
| 4071 | 4782 | 5038 | 5555 | 6836 | 6871 | 7131 | 7609 | 7850 | 8317 | 8443 |
| 3984 | 4538 | 4965 | 5461 | 5742 | 5912 | 6135 | 6649 | 7636 | 8078 | 8455 |

ATSC3_QC_CR715_N16200: Code Rate = 7/15, LDPC Length = 16 k

| | | | | | | | | | | |
|---|---|---|---|---|---|---|---|---|---|---|
| 2422 | 2919 | 3173 | 3795 | 4428 | 12681 | 13428 | 14654 | 17367 | 17687 | 19587 |
| 34 | 79 | 817 | 17478 | 12769 | 14798 | 15383 | 16588 | 16739 | 17538 | 21654 |
| 88 | 986 | 1907 | 2868 | 3657 | 6826 | 8595 | 11922 | 14704 | 17681 | 19503 |
| 526 | 3853 | 4486 | 6507 | 10616 | 11300 | 11453 | 13885 | 20007 | 21420 | 21441 |
| 43 | 1775 | 4405 | 5644 | 6553 | 8885 | 10337 | 11178 | 14114 | 15108 | 16189 |
| 27 | 624 | 1191 | 1470 | 4277 | 5054 | 5695 | 9632 | 10911 | 11365 | 18339 |
| 14 | 45 | 750 | 1098 | 1567 | 2003 | 6720 | 10195 | 12053 | 13024 | 13337 |
| 30 | 94 | 4493 | 11928 | 14051 | 17759 | 18541 | 20842 | 21277 | 24587 | 24948 |
| 3 | 4245 | 5284 | 7791 | 10196 | 10922 | 13942 | 14897 | 14947 | 16908 | 21032 |
| 78 | 6958 | 897 | 15781 | 23302 | 23386 | 23863 | 25578 | 25734 | 31844 | 31919 |
| 52 | 90 | 775 | 3760 | 4099 | 6945 | 8954 | 11931 | 15578 | 20804 | 23252 |
| 81 | 1162 | 3084 | 3986 | 4494 | 8523 | 10309 | 10934 | 12819 | 16784 | 23113 |
| 0 | 35 | 57 | 1564 | 9062 | 19894 | 24489 | 24737 | 25422 | 27021 | 30630 |
| 58 | 639 | 2340 | 3613 | 19819 | 12917 | 24284 | 29214 | 29430 | 29736 | 32496 |
| 71 | 77 | 88 | 958 | 4233 | 7365 | 8395 | 15176 | 16662 | 18280 | 21969 |
| 163 | 4304 | 4697 | 7470 | 11857 | 12787 | 12837 | 18000 | 18472 | 18489 | 19730 |
| 7 | 29 | 79 | 7321 | 9770 | 11315 | 15354 | 16240 | 18888 | 19559 | 27783 |
| 8 | 24 | 41 | 4491 | 11252 | 14225 | 18290 | 25845 | 30258 | 30801 | 31349 |
| 13 | 13092 | 15747 | 23904 | 29675 | 29732 | 30199 | 31273 | 31928 | 32211 | 32704 |
| 6 | 11188 | 19937 | | | | | | | | |
| 11738 | 14763 | 34508 | | | | | | | | |
| 11 | 4674 | 25431 | | | | | | | | |
| 6346 | 9658 | 31716 | | | | | | | | |
| 18231 | 32283 | 33198 | | | | | | | | |
| 19187 | 31166 | 33846 | | | | | | | | |
| 197 | 27886 | 32712 | | | | | | | | |
| 74 | 8683 | 24435 | | | | | | | | |
| 2200 | 20501 | 21571 | | | | | | | | |
| 25 | 10097 | 29631 | | | | | | | | |
| 4515 | 32145 | 33245 | | | | | | | | |
| 13010 | 26434 | 29967 | | | | | | | | |

-continued

| | | |
|---|---|---|
| 0 | 30598 | 33940 |
| 1342 | 27835 | 33782 |
| 2253 | 7519 | 33030 |
| 9079 | 13091 | 29109 |
| 20124 | 20880 | 27383 |
| 14317 | 16550 | 26394 |
| 84 | 2860 | 33197 |
| 21726 | 28610 | 31525 |
| 12888 | 23822 | 32157 |
| 1221 | 10300 | 34113 |
| 15613 | 22759 | 28517 |
| 4889 | 28647 | 31367 |
| 22184 | 25784 | 30338 |
| 21714 | 26300 | 28577 |
| 1408 | 15983 | 16148 |
| 6569 | 18901 | 23827 |
| 42 | 7606 | 25499 |
| 11193 | 13616 | 31040 |
| 2996 | 28561 | 30145 |
| 6335 | 23176 | 26286 |
| 6236 | 23314 | 24004 |
| 25452 | 90136 | 31684 |
| 3826 | 12150 | 21414 |
| 10711 | 17869 | 29177 |
| 13382 | 34510 | 34532 |
| 14491 | 16483 | 31945 |
| 77 | 16047 | 34221 |
| 17993 | 32178 | 32575 |
| 5508 | 6547 | 13803 |
| 4265 | 19226 | 25358 |
| 10154 | 23746 | 29274 |
| 3421 | 20929 | 34055 |
| 2926 | 9237 | 30748 |
| 17492 | 23256 | 34334 |
| 14069 | 21117 | 34122 |
| 2 | 30 | 34279 |
| 4782 | 18300 | 33735 |
| 153 | 4829 | 34472 |
| 6935 | 20289 | 25347 |
| 94 | 23831 | 34474 |
| 4955 | 13105 | 18305 |
| 3455 | 6361 | 16383 |
| 5195 | 13496 | 34289 |
| 1637 | 5512 | 18417 |
| 14082 | 20496 | 28964 |
| 12268 | 18659 | 23956 |
| 9430 | 22419 | 34549 |
| 6153 | 21548 | 24847 |
| 1995 | 12662 | 13605 |
| 18498 | 29840 | 31922 |
| 14059 | 14662 | 33268 |
| 20722 | 33280 | 34057 |
| 564 | 20975 | 23516 |

| | | | | | | | | | |
|---|---|---|---|---|---|---|---|---|---|
| 20017 | 23588 | 24353 | 25280 | 27167 | 29853 | 32040 | 32473 | 33170 | 33375 |
| 22792 | 25145 | 25588 | 26995 | 27388 | 31655 | 32133 | 32691 | 33452 | 34471 |
| 20604 | 24251 | 28125 | 28612 | 29976 | 30687 | 31208 | 31454 | 33686 | 33909 |
| 22554 | 23794 | 24581 | 24959 | 27083 | 28710 | 30285 | 32852 | 34179 | 34327 |
| 16192 | 18490 | 18801 | 23475 | 22748 | 28289 | 28970 | 80758 | 31968 | 33554 |
| 21097 | 23810 | 26677 | 27822 | 28433 | 29878 | 31026 | 32525 | 33335 | 33873 |
| 19088 | 22647 | 25050 | 25899 | 27035 | 28844 | 29927 | 33915 | 34033 | 34490 |
| 25790 | 27442 | 31120 | 31905 | 31526 | 32107 | 32263 | 33695 | 34393 | 34529 |
| 24585 | 27219 | 30300 | 30981 | 32732 | 33367 | 33558 | 33725 | 34424 | 34537 |
| 32100 | 32815 | 33345 | 33531 | 33561 | 33889 | 34348 | 34504 | 34512 | 34530 |
| 20583 | 29420 | 32461 | 33095 | 33874 | 33964 | 34018 | 34177 | 34483 | 34506 |
| 23883 | 25952 | 29134 | 29930 | 30530 | 32021 | 33343 | 33400 | 33564 | 33685 |
| 31513 | 33317 | 33425 | 33545 | 33624 | 33743 | 33869 | 33875 | 34046 | 34519 |
| 32785 | 32830 | 37835 | 33176 | 33323 | 33711 | 33967 | 34197 | 34438 | 34468 |
| 24348 | 20847 | 27645 | 31090 | 31890 | 34119 | 34223 | 34235 | 34548 | 34551 |
| 27014 | 29653 | 29740 | 30070 | 30252 | 32769 | 33637 | 34382 | 34394 | 34555 |
| 28220 | 28924 | 30659 | 13474 | 39084 | 33310 | 33644 | 34282 | 34452 | 34557 |
| 32655 | 32932 | 32951 | 33058 | 33794 | 33889 | 34150 | 34338 | 34463 | 34494 |
| 32959 | 33056 | 33374 | 33646 | 33931 | 34043 | 34203 | 34426 | 34429 | 34509 |

ATSC3_QC_CR715_N64800: Code Rate = 7/15, LDPC Length = 64 k

| | | | | | | | | | | | | | | | | | | | |
|---|---|---|---|---|---|---|---|---|---|---|---|---|---|---|---|---|---|---|---|
| 32 | 384 | 430 | 591 | 1296 | 1976 | 1999 | 2137 | 2175 | 3638 | 4214 | 4604 | 4486 | 4662 | 4999 | 5174 | 5700 | 6989 | 7115 | 3138 | 7189 |
| 1788 | 1881 | 1910 | 2724 | 4504 | 4928 | 4973 | 5616 | 5686 | 5718 | 5846 | 6523 | 6893 | 6994 | 7074 | 7100 | 7277 | 7399 | 7476 | 2480 | 7537 |
| 2791 | 2724 | 2927 | 4196 | 4298 | 4800 | 4948 | 5361 | 5401 | 5688 | 5818 | 5862 | 5869 | 6029 | 6244 | 6645 | 5962 | 7203 | 7302 | 7454 | 7534 |
| 574 | 1451 | 1826 | 2056 | 2069 | 2387 | 2794 | 3349 | 3366 | 4951 | 5826 | 5834 | 6903 | 6640 | 6762 | 6786 | 6859 | 7043 | 7418 | 7431 | 7554 |

-continued

| | | | | | | | | | | | | | | | | | | | |
|---|---|---|---|---|---|---|---|---|---|---|---|---|---|---|---|---|---|---|---|
| 14 | 178 | 675 | 823 | 890 | 930 | 1209 | 1311 | 2898 | 4339 | 4600 | 5203 | 5485 | 6549 | 8970 | 7208 | 7218 | 7298 | 7454 | 7457 | 7462 |
| 4075 | 4188 | 7313 | 7553 | | | | | | | | | | | | | | | | | |
| 5145 | 6018 | 7148 | 7907 | | | | | | | | | | | | | | | | | |
| 3198 | 4858 | 6983 | 7033 | | | | | | | | | | | | | | | | | |
| 3170 | 5126 | 5625 | 6901 | | | | | | | | | | | | | | | | | |
| 2839 | 6093 | 7071 | 7450 | | | | | | | | | | | | | | | | | |
| 11 | 3735 | 5413 | | | | | | | | | | | | | | | | | | |
| 2497 | 5400 | 7238 | | | | | | | | | | | | | | | | | | |
| 2061 | 5172 | 5714 | | | | | | | | | | | | | | | | | | |
| 1889 | 7173 | 7329 | | | | | | | | | | | | | | | | | | |
| 1795 | 2773 | 3499 | | | | | | | | | | | | | | | | | | |
| 2695 | 2944 | 6735 | | | | | | | | | | | | | | | | | | |
| 3221 | 4625 | 5897 | | | | | | | | | | | | | | | | | | |
| 1690 | 6122 | 6816 | | | | | | | | | | | | | | | | | | |
| 5013 | 6839 | 7358 | | | | | | | | | | | | | | | | | | |
| 1601 | 6849 | 7415 | | | | | | | | | | | | | | | | | | |
| 2180 | 7389 | 7543 | | | | | | | | | | | | | | | | | | |
| 2121 | 6838 | 7054 | | | | | | | | | | | | | | | | | | |
| 1948 | 3109 | 5046 | | | | | | | | | | | | | | | | | | |
| 272 | 3015 | 7464 | | | | | | | | | | | | | | | | | | |

ATSC3_QC_CR815_N16200: Code Rate = 8/15, LDPC Length = 16 k

| | | | | | | | | | |
|---|---|---|---|---|---|---|---|---|---|
| 2768 | 3039 | 4059 | 5856 | 6245 | 7013 | 8157 | 9341 | 9802 | 10470 |
| 2739 | 8244 | 8891 | 9157 | 12624 | 12973 | 15534 | 16622 | 16919 | 18402 |
| 1727 | 2268 | 6246 | 7815 | 9010 | 9556 | 10134 | 10472 | 11389 | 14599 |
| 28 | 1346 | 3721 | 5565 | 7019 | 9240 | 12355 | 13109 | 14800 | 16040 |
| 369 | 2450 | 4366 | 5316 | 5160 | 7107 | 10362 | 11132 | 11271 | 13149 |
| 508 | 4292 | 5831 | 8559 | 10044 | 10412 | 11283 | 14810 | 15888 | 17243 |
| 389 | 2248 | 5840 | 6043 | 2000 | 9054 | 11075 | 11760 | 12217 | 12565 |
| 1015 | 2002 | 5714 | 6777 | 9346 | 9629 | 11039 | 11153 | 12690 | 13068 |
| 1480 | 3084 | 3467 | 4401 | 4798 | 5187 | 7851 | 11368 | 12323 | 14325 |
| 6925 | 8876 | 12392 | 14529 | 15253 | 15437 | 19226 | 19950 | 20321 | 23021 |
| 2547 | 3404 | 3538 | 4666 | 5126 | 5468 | 7695 | 8799 | 14732 | 15072 |
| 888 | 1581 | 2311 | 4611 | 7218 | 9107 | 10454 | 12252 | 13662 | 15714 |
| 1047 | 1494 | 1718 | 4645 | 5030 | 6811 | 7868 | 8146 | 10611 | 15767 |
| 59 | 1781 | 1900 | 3814 | 7121 | 8044 | 8906 | 9175 | 11156 | 14841 |
| 1952 | 3057 | 4399 | 9476 | 10171 | 10769 | 11335 | 11569 | 15002 | 19501 |
| 2895 | 3070 | 3437 | 4764 | 4905 | 6670 | 9244 | 11845 | 13352 | 13573 |
| 612 | 1528 | 2004 | 4244 | 4599 | 4926 | 5843 | 7684 | 10122 | 10443 |
| 1361 | 2195 | 4745 | 6708 | 7158 | 7538 | 9138 | 9998 | 14862 | 15359 |
| 5229 | 6295 | 7134 | 3655 | 9139 | 13527 | 15408 | 16058 | 16705 | 18320 |
| 697 | 2035 | 4887 | 5275 | 6909 | 9166 | 11805 | 15338 | 16381 | 18403 |
| 5379 | 17329 | 22659 | 23062 | | | | | | |
| 11814 | 14759 | 22329 | 22936 | | | | | | |
| 2423 | 2811 | 10296 | 12727 | | | | | | |
| 8460 | 15260 | 16769 | 17290 | | | | | | |
| 14191 | 14608 | 29536 | 30187 | | | | | | |
| 7103 | 10069 | 20111 | 22850 | | | | | | |
| 4285 | 15413 | 26448 | 29069 | | | | | | |
| 548 | 2137 | 9189 | 10928 | | | | | | |
| 4581 | 7077 | 23382 | 23949 | | | | | | |
| 3942 | 17248 | 19486 | 27922 | | | | | | |
| 8668 | 10230 | 16922 | 26678 | | | | | | |
| 6158 | 9980 | 13788 | 28198 | | | | | | |
| 12422 | 16076 | 24206 | 29887 | | | | | | |
| 8778 | 10649 | 18747 | 22111 | | | | | | |
| 21029 | 22677 | 27150 | 28980 | | | | | | |
| 7918 | 15423 | 27672 | 27803 | | | | | | |
| 5927 | 18086 | 23525 | | | | | | | |
| 3397 | 15058 | 30224 | | | | | | | |
| 24016 | 25880 | 26268 | | | | | | | |
| 1096 | 4775 | 7912 | | | | | | | |
| 3259 | 17301 | 20802 | | | | | | | |
| 129 | 8396 | 15132 | | | | | | | |
| 17825 | 28119 | 28676 | | | | | | | |
| 2343 | 8382 | 28840 | | | | | | | |
| 3907 | 18374 | 20939 | | | | | | | |
| 1132 | 1290 | 8786 | | | | | | | |
| 1481 | 4710 | 28846 | | | | | | | |
| 2185 | 3705 | 26834 | | | | | | | |
| 5496 | 15681 | 21854 | | | | | | | |
| 12697 | 13407 | 22178 | | | | | | | |
| 12788 | 21227 | 22894 | | | | | | | |
| 629 | 2854 | 6232 | | | | | | | |
| 2289 | 18227 | 27458 | | | | | | | |
| 7593 | 21935 | 23001 | | | | | | | |
| 3836 | 7081 | 12282 | | | | | | | |
| 7925 | 18440 | 23135 | | | | | | | |
| 497 | 6342 | 9717 | | | | | | | |

-continued

| | | |
|---|---|---|
| 11199 | 22046 | 30067 |
| 12572 | 28045 | 28990 |
| 1240 | 2023 | 10933 |
| 19566 | 20629 | 25186 |
| 6442 | 13303 | 28813 |
| 4765 | 10572 | 16180 |
| 552 | 19301 | 24286 |
| 6782 | 18480 | 21383 |
| 11267 | 12288 | 15758 |
| 771 | 5652 | 15531 |
| 16131 | 20047 | 25649 |
| 13227 | 23035 | 24450 |
| 4839 | 13467 | 27488 |
| 2852 | 4677 | 22993 |
| 2504 | 28116 | 29524 |
| 12518 | 17374 | 24267 |
| 1222 | 11859 | 27922 |
| 9660 | 17286 | 18261 |
| 232 | 11296 | 29978 |
| 9750 | 11165 | 16295 |
| 4894 | 9505 | 23622 |
| 10861 | 11980 | 14110 |
| 2128 | 15883 | 22836 |
| 6274 | 17243 | 21989 |
| 10866 | 13202 | 22517 |
| 11159 | 16111 | 21608 |
| 3719 | 18787 | 22100 |
| 1756 | 2020 | 23901 |
| 20913 | 29473 | 30103 |
| 2729 | 15091 | 26976 |
| 4410 | 8217 | 12963 |
| 5395 | 24564 | 28235 |
| 3859 | 17909 | 23051 |
| 5733 | 26005 | 29797 |
| 1935 | 3492 | 29773 |
| 11903 | 21380 | 29914 |
| 6091 | 10469 | 29997 |
| 2895 | 8930 | 15594 |
| 1827 | 10028 | 20070 |

| | | | | | | | | |
|---|---|---|---|---|---|---|---|---|
| 11521 | 12083 | 16610 | 18361 | 20321 | 24601 | 27420 | 28206 | 29788 |
| 18780 | 19854 | 20220 | 20543 | 22306 | 25540 | 27478 | 27678 | 28053 |
| 15719 | 16204 | 17342 | 17666 | 18850 | 22058 | 25579 | 25860 | 29207 |
| 16839 | 17369 | 17631 | 19357 | 19473 | 19891 | 20381 | 23911 | 29683 |
| 16397 | 16532 | 17113 | 19894 | 22043 | 22784 | 27383 | 28615 | 28804 |
| 17538 | 19903 | 20528 | 22090 | 22652 | 27235 | 27384 | 28208 | 28485 |
| 13587 | 15403 | 19422 | 19528 | 21493 | 25142 | 27777 | 28566 | 28702 |
| 13990 | 16841 | 17702 | 20021 | 24106 | 26300 | 29332 | 30081 | 30196 |
| 14546 | 16360 | 17158 | 18010 | 21333 | 25612 | 26556 | 26906 | 27005 |
| 23651 | 24393 | 24653 | 26668 | 27205 | 28269 | 28529 | 29041 | 29292 |
| 15881 | 17410 | 18971 | 19609 | 19717 | 22150 | 24941 | 27908 | 29018 |
| 15894 | 17025 | 18671 | 24304 | 25316 | 25556 | 28489 | 28977 | 29212 |
| 17682 | 18391 | 22614 | 23021 | 23763 | 25478 | 26491 | 29088 | 29757 |
| 15789 | 16033 | 16755 | 17292 | 18550 | 19310 | 22505 | 29567 | 29850 |
| 20621 | 22642 | 23452 | 24360 | 25109 | 25290 | 25828 | 28505 | 29122 |
| 13975 | 14600 | 15871 | 17996 | 19672 | 20079 | 20579 | 25327 | 27958 |
| 12267 | 14368 | 18413 | 19058 | 22985 | 24257 | 26202 | 26596 | 27899 |
| 16076 | 18925 | 21401 | 21573 | 22503 | 24146 | 24247 | 27778 | 29312 |
| 19909 | 20901 | 22238 | 22437 | 23654 | 25131 | 27550 | 28247 | 29903 |
| 20425 | 20688 | 21547 | 24590 | 25171 | 26726 | 28848 | 29224 | 29412 |

ATSC3_QC_CR815_N16800: Code Rate = 8/15, LDPC Length = 64 k

| | | | | | | | | | | | | | | | | | | | | |
|---|---|---|---|---|---|---|---|---|---|---|---|---|---|---|---|---|---|---|---|---|
| 350 | 462 | 1291 | 1383 | 1821 | 2235 | 2493 | 3328 | 3353 | 3772 | 3872 | 3923 | 4259 | 4426 | 4542 | 4972 | 5347 | 6217 | 6246 | 6332 | 6386 |
| 177 | 869 | 1214 | 1253 | 1398 | 1482 | 1737 | 2014 | 2161 | 2331 | 3108 | 3297 | 3438 | 4388 | 4430 | 4456 | 4522 | 4783 | 5273 | 6037 | 6395 |
| 347 | 501 | 658 | 966 | 1622 | 1659 | 1934 | 2117 | 2527 | 3168 | 3231 | 3379 | 3427 | 3739 | 4218 | 4497 | 4894 | 5000 | 5167 | 5728 | 5975 |
| 319 | 398 | 599 | 1143 | 1796 | 3198 | 3521 | 3886 | 4139 | 4453 | 4556 | 4636 | 4688 | 4753 | 4986 | 5199 | 5224 | 5496 | 5698 | 5724 | 6123 |
| 162 | 257 | 304 | 524 | 945 | 1695 | 1855 | 2527 | 2780 | 2902 | 2958 | 3439 | 3484 | 4224 | 4769 | 4928 | 5156 | 5303 | 5971 | 6358 | 6477 |
| 807 | 1695 | 2941 | 4276 | | | | | | | | | | | | | | | | | |
| 2652 | 2857 | 4660 | 6358 | | | | | | | | | | | | | | | | | |
| 329 | 2100 | 2412 | 3632 | | | | | | | | | | | | | | | | | |
| 1151 | 1231 | 3872 | 4869 | | | | | | | | | | | | | | | | | |
| 1561 | 3565 | 5138 | 5303 | | | | | | | | | | | | | | | | | |
| 407 | 794 | 1455 | | | | | | | | | | | | | | | | | | |
| 3438 | 5683 | 5749 | | | | | | | | | | | | | | | | | | |
| 1504 | 1985 | 3563 | | | | | | | | | | | | | | | | | | |
| 440 | 5021 | 6321 | | | | | | | | | | | | | | | | | | |
| 194 | 3645 | 5923 | | | | | | | | | | | | | | | | | | |
| 1217 | 1462 | 6422 | | | | | | | | | | | | | | | | | | |
| 1212 | 4715 | 5973 | | | | | | | | | | | | | | | | | | |

-continued

| | | |
|---|---|---|
| 4098 | 5100 | 5642 |
| 5512 | 5857 | 6226 |
| 2583 | 5506 | 5933 |
| 784 | 1801 | 4890 |
| 4734 | 4779 | 4875 |
| 938 | 5081 | 5377 |
| 127 | 4125 | 4704 |
| 1244 | 2178 | 3352 |
| 3659 | 6350 | 6465 |
| 1686 | 3464 | 4336 |

ATSC3_QC_CR915_N16200: Code Rate = 9/15, LDPC Length = 16 k

| | | | | | | | | | |
|---|---|---|---|---|---|---|---|---|---|
| 113 | 1557 | 3316 | 5680 | 6241 | 10407 | 13404 | 13947 | 14040 | 14353 |
| 271 | 1361 | 6236 | 7006 | 7307 | 7333 | 12768 | 15441 | 15568 | 17923 |
| 73 | 605 | 872 | 4008 | 6279 | 7653 | 10346 | 10799 | 12482 | 12935 |
| 1445 | 1690 | 4304 | 4851 | 8919 | 9176 | 9252 | 13783 | 16076 | 16675 |
| 1290 | 2337 | 5661 | 6371 | 8996 | 10102 | 10941 | 11360 | 12242 | 14918 |
| 28 | 42 | 1926 | 3421 | 3503 | 8558 | 9453 | 10168 | 15820 | 17473 |
| 0 | 1709 | 4041 | 4932 | 5968 | 7123 | 8430 | 9564 | 10596 | 11026 |
| 29 | 1625 | 6500 | 6609 | 16831 | 18517 | 18568 | 18738 | 19387 | 20159 |
| 55 | 66 | 871 | 3700 | 11426 | 13221 | 15001 | 16367 | 17601 | 18380 |
| 1 | 19 | 5958 | 8548 | 8860 | 11489 | 16845 | 18450 | 18469 | 19496 |
| 7520 | 7690 | 8855 | 9183 | 14654 | 16695 | 17121 | 17854 | 18083 | 18428 |
| 48 | 58 | 410 | 1299 | 3786 | 10668 | 18523 | 18963 | 20864 | 22106 |
| 12 | 51 | 3894 | 6539 | 8276 | 10885 | 11644 | 12777 | 13427 | 14039 |
| 3509 | 8748 | 9581 | 11509 | 15884 | 16230 | 17583 | 19264 | 20900 | 21001 |
| 21 | 29 | 69 | 1448 | 2386 | 4601 | 6626 | 6667 | 10242 | 13141 |
| 18 | 53 | 7890 | 9934 | 10063 | 16728 | 19040 | 19809 | 20825 | 21522 |
| 4096 | 4582 | 5766 | 5894 | 6517 | 10027 | 12182 | 13247 | 15207 | 17041 |
| 0 | 25 | 819 | 5539 | 7076 | 7536 | 7695 | 9532 | 13668 | 15051 |
| 34 | 40 | 44 | 4215 | 6076 | 7427 | 7965 | 8777 | 11017 | 15593 |
| 1595 | 6216 | 22850 | 25439 | | | | | | |
| 1562 | 15172 | 19517 | 22362 | | | | | | |
| 7508 | 12879 | 24324 | 24496 | | | | | | |
| 6298 | 15819 | 16757 | 18721 | | | | | | |
| 11173 | 15175 | 19966 | 21195 | | | | | | |
| 59 | 13505 | 16941 | 23793 | | | | | | |
| 2267 | 4830 | 12023 | 20587 | | | | | | |
| 8827 | 9278 | 13072 | 16664 | | | | | | |
| 14419 | 17463 | 23398 | 25348 | | | | | | |
| 6112 | 16534 | 20423 | 22698 | | | | | | |
| 493 | 8914 | 21103 | 24799 | | | | | | |
| 6896 | 12761 | 13206 | 25873 | | | | | | |
| 2 | 1380 | 12322 | 21701 | | | | | | |
| 11600 | 21306 | 25753 | 25790 | | | | | | |
| 8421 | 13076 | 14271 | 15401 | | | | | | |
| 9630 | 14112 | 19017 | 20955 | | | | | | |
| 212 | 13932 | 21781 | 25824 | | | | | | |
| 5961 | 9110 | 16654 | 19636 | | | | | | |
| 58 | 5434 | 9936 | 12770 | | | | | | |
| 6575 | 11433 | 19798 | | | | | | | |
| 2731 | 7338 | 20926 | | | | | | | |
| 14253 | 18463 | 25404 | | | | | | | |
| 21791 | 24805 | 25869 | | | | | | | |
| 2 | 11646 | 15850 | | | | | | | |
| 6075 | 8586 | 23819 | | | | | | | |
| 18435 | 22093 | 24852 | | | | | | | |
| 2103 | 2368 | 11704 | | | | | | | |
| 10925 | 17402 | 18232 | | | | | | | |
| 9062 | 25061 | 25674 | | | | | | | |
| 18497 | 20853 | 23404 | | | | | | | |
| 18606 | 19364 | 19551 | | | | | | | |
| 7 | 1022 | 25543 | | | | | | | |
| 6744 | 15481 | 25888 | | | | | | | |
| 9081 | 17305 | 25164 | | | | | | | |
| 8 | 23701 | 25883 | | | | | | | |
| 9680 | 19955 | 22848 | | | | | | | |
| 56 | 4564 | 19121 | | | | | | | |
| 5595 | 15086 | 25892 | | | | | | | |
| 3174 | 17127 | 23183 | | | | | | | |
| 19397 | 19817 | 20275 | | | | | | | |
| 12561 | 24571 | 25825 | | | | | | | |
| 7111 | 9889 | 25865 | | | | | | | |
| 19104 | 20189 | 21851 | | | | | | | |
| 549 | 9686 | 25548 | | | | | | | |
| 6586 | 20325 | 25906 | | | | | | | |
| 3224 | 20710 | 21637 | | | | | | | |
| 641 | 15215 | 25754 | | | | | | | |
| 13484 | 23729 | 25818 | | | | | | | |

-continued

| | | |
|---|---|---|
| 2043 | 7493 | 24246 |
| 16860 | 25230 | 25768 |
| 22047 | 24200 | 24902 |
| 9391 | 18040 | 19499 |
| 7855 | 24336 | 25069 |
| 23834 | 25570 | 25852 |
| 1977 | 8800 | 25756 |
| 6671 | 21772 | 25859 |
| 3279 | 6710 | 24444 |
| 24099 | 25117 | 25820 |
| 5553 | 12306 | 25915 |
| 48 | 11107 | 23907 |
| 10832 | 11974 | 25773 |
| 2223 | 17905 | 25484 |
| 16782 | 17135 | 20446 |
| 475 | 2861 | 3457 |
| 16218 | 22449 | 24362 |
| 11716 | 22200 | 25897 |
| 8315 | 15009 | 22633 |
| 13 | 20480 | 25852 |
| 12352 | 18658 | 25687 |
| 3681 | 14794 | 23703 |
| 30 | 24531 | 25846 |
| 4103 | 22077 | 24107 |
| 23837 | 25622 | 25812 |
| 3627 | 13387 | 25839 |
| 908 | 5367 | 19388 |
| 0 | 6894 | 25795 |
| 20322 | 23546 | 25181 |
| 8178 | 25260 | 25437 |
| 2449 | 13244 | 22565 |
| 31 | 18928 | 22741 |
| 1312 | 5134 | 14838 |
| 6085 | 13937 | 24220 |
| 66 | 14633 | 25670 |
| 47 | 22512 | 25422 |
| 8867 | 24704 | 25229 |
| 6742 | 21623 | 22745 |
| 147 | 9948 | 24178 |
| 8522 | 24261 | 24307 |
| 19202 | 22406 | 24609 |

| | | | | | | | | |
|---|---|---|---|---|---|---|---|---|
| 15522 | 15698 | 16079 | 17363 | 19374 | 19543 | 20530 | 22833 | 24339 |
| 18341 | 20321 | 21502 | 22023 | 23938 | 25351 | 25590 | 25876 | 25910 |
| 13604 | 15909 | 16526 | 19782 | 20506 | 22804 | 23629 | 24859 | 25600 |
| 17274 | 18806 | 18882 | 20819 | 21958 | 22451 | 23869 | 23999 | 24177 |
| 16808 | 20571 | 23374 | 24046 | 25045 | 25060 | 25662 | 25783 | 25913 |
| 19571 | 19685 | 22790 | 23336 | 23367 | 23890 | 24061 | 25657 | 25680 |
| 14761 | 19484 | 20762 | 20858 | 23803 | 24016 | 24795 | 25853 | 25863 |
| 20544 | 21603 | 21941 | 24137 | 24269 | 24416 | 24803 | 25154 | 25395 |
| 22796 | 23488 | 23938 | 25476 | 25635 | 25678 | 25807 | 25857 | 25872 |
| 20190 | 23173 | 25262 | 25566 | 25668 | 25679 | 25858 | 25888 | 25915 |
| 19633 | 20470 | 20736 | 21720 | 22335 | 23273 | 25083 | 25293 | 25403 |
| 22308 | 23033 | 23107 | 23128 | 23990 | 24286 | 24409 | 24595 | 25802 |
| 15954 | 17078 | 19053 | 20537 | 22863 | 24521 | 25087 | 25463 | 25838 |
| 21310 | 22547 | 22756 | 22959 | 24768 | 24814 | 25594 | 25626 | 25880 |
| 13852 | 14137 | 18640 | 19951 | 22449 | 23454 | 24431 | 25512 | 25814 |
| 21800 | 23582 | 24556 | 25031 | 25547 | 25562 | 25733 | 25789 | 25906 |
| 18958 | 20133 | 20503 | 22228 | 24332 | 24613 | 25689 | 25855 | 25883 |
| 17683 | 19665 | 20253 | 21996 | 24136 | 24890 | 25758 | 25784 | 25807 |
| 19542 | 22202 | 22973 | 23397 | 23423 | 24418 | 24873 | 25107 | 25644 |

ATSC3_QC_CR915_N64800: Code Rate = 9/15, LDPC Length = 64 k

| | | | | | | | | | | | | | | | | | |
|---|---|---|---|---|---|---|---|---|---|---|---|---|---|---|---|---|---|
| 76 | 545 | 1005 | 1029 | 1990 | 1970 | 2525 | 2971 | 3448 | 3845 | 4088 | 4114 | 4163 | 4373 | 4640 | 34205 | 4970 | 5094 |
| 14 | 463 | 600 | 1675 | 2239 | 2319 | 2326 | 2815 | 2887 | 4278 | 4457 | 4493 | 4597 | 4918 | 4989 | 5038 | 5261 | 5384 |
| 451 | 632 | 829 | 1006 | 1530 | 1723 | 2205 | 2587 | 2801 | 3041 | 3849 | 4382 | 4595 | 4727 | 5006 | 5156 | 5224 | 5286 |
| 211 | 265 | 1293 | 1777 | 1926 | 2214 | 2909 | 2957 | 3178 | 3278 | 3771 | 4547 | 4563 | 4737 | 4879 | 5068 | 5232 | 5344 |
| 6 | 2901 | 3925 | 5384 | | | | | | | | | | | | | | |
| 2858 | 4152 | 5006 | 5202 | | | | | | | | | | | | | | |
| 9 | 1232 | 2063 | 2768 | | | | | | | | | | | | | | |
| 7 | 11 | 2781 | 3871 | | | | | | | | | | | | | | |
| 12 | 2161 | 2820 | 4078 | | | | | | | | | | | | | | |
| 3 | 3510 | 4568 | 5323 | | | | | | | | | | | | | | |
| 253 | 411 | 3215 | 5241 | | | | | | | | | | | | | | |
| 3919 | 4789 | 5040 | 5302 | | | | | | | | | | | | | | |
| 12 | 5113 | 5256 | 5352 | | | | | | | | | | | | | | |
| 9 | 1461 | 4004 | 5241 | | | | | | | | | | | | | | |
| 1688 | 3585 | 4480 | 5394 | | | | | | | | | | | | | | |
| 8 | 2127 | 3469 | 4360 | | | | | | | | | | | | | | |

-continued

| | | | |
|---|---|---|---|
| 2827 | 4049 | 5084 | 5379 |
| 1770 | 3331 | 5315 | 5386 |
| 1885 | 2817 | 4900 | 5088 |
| 2568 | 3854 | 4650 | |
| 1604 | 3565 | 5878 | |
| 2317 | 4636 | 5756 | |
| 2480 | 2816 | 4094 | |
| 14 | 4518 | 4826 | |
| 127 | 1192 | 3872 | |
| 93 | 2282 | 3663 | |
| 2962 | 5085 | 5314 | |
| 2078 | 4277 | 5089 | |
| 9 | 5280 | 5292 | |
| 50 | 2847 | 4742 | |

ATSC3_QC_CR1015_N16200: Code Rate = 10/15, LDPC Length = 16 k

| | | | | | | | | | | | | | | |
|---|---|---|---|---|---|---|---|---|---|---|---|---|---|---|
| 979 | 1423 | 4166 | 4609 | 6341 | 8258 | 10334 | 10548 | 14098 | 14514 | 17051 | 17333 | 17653 | 17830 | 17990 |
| 2559 | 4025 | 6344 | 6510 | 9167 | 9728 | 11312 | 14856 | 17104 | 17721 | 18600 | 18791 | 19079 | 19697 | 19840 |
| 3243 | 6894 | 7950 | 10539 | 12042 | 13233 | 13938 | 14752 | 16449 | 16727 | 17025 | 18297 | 18796 | 19400 | 21577 |
| 3272 | 3574 | 6341 | 6722 | 9191 | 10807 | 10957 | 12531 | 14036 | 15580 | 16651 | 17007 | 17309 | 19415 | 19845 |
| 155 | 4598 | 10201 | 10975 | 11086 | 11296 | 12713 | 15364 | 15978 | 16395 | 17542 | 18164 | 18451 | 18612 | 20617 |
| 1128 | 1999 | 3926 | 4069 | 5558 | 6085 | 6337 | 8386 | 10693 | 12450 | 15438 | 16223 | 16370 | 17308 | 18634 |
| 2408 | 2929 | 3630 | 4357 | 5852 | 7329 | 8536 | 8695 | 10603 | 11003 | 14304 | 14937 | 15767 | 18402 | 21502 |
| 199 | 3066 | 6446 | 6849 | 8973 | 9536 | 10452 | 12857 | 13675 | 15913 | 16717 | 17654 | 19802 | 20115 | 21579 |
| 312 | 870 | 2095 | 2586 | 5517 | 6196 | 6757 | 7311 | 7368 | 13046 | 15384 | 18576 | 20349 | 21424 | 21587 |
| 985 | 1591 | 3248 | 3509 | 3706 | 3847 | 6174 | 6276 | 7864 | 9033 | 13618 | 15675 | 16446 | 18355 | 18843 |
| 975 | 3774 | 4083 | 5825 | 6166 | 7218 | 7633 | 9657 | 10103 | 13052 | 14240 | 17320 | 18126 | 19544 | 20208 |
| 1795 | 2005 | 2544 | 3418 | 6148 | 8051 | 9066 | 9725 | 10676 | 10752 | 11512 | 15171 | 17523 | 20481 | 21059 |
| 167 | 315 | 1824 | 2325 | 2640 | 2868 | 6070 | 6597 | 7016 | 8109 | 9815 | 11608 | 16142 | 17912 | 19625 |
| 1298 | 1896 | 3039 | 4303 | 4690 | 8787 | 12241 | 13600 | 14478 | 15492 | 16602 | 17115 | 17913 | 19466 | 20597 |
| 568 | 3695 | 6045 | 6624 | 8131 | 8404 | 8590 | 9059 | 9246 | 11570 | 14336 | 18657 | 18941 | 19218 | 21506 |
| 228 | 1889 | 1967 | 2299 | 3011 | 5074 | 7044 | 7596 | 7689 | 9534 | 10244 | 10697 | 11691 | 17902 | 21410 |
| 1330 | 1579 | 1739 | 2234 | 3701 | 3865 | 5713 | 6677 | 7263 | 11172 | 12143 | 12765 | 17121 | 20011 | 21436 |
| 303 | 1668 | 2501 | 4925 | 5778 | 5985 | 9635 | 10140 | 10820 | 11779 | 11849 | 12058 | 15650 | 20426 | 20527 |
| 698 | 2484 | 3071 | 3219 | 4054 | 4125 | 5663 | 5939 | 6928 | 7086 | 8054 | 12173 | 16280 | 17945 | 19302 |
| 232 | 1619 | 3040 | 4901 | 7438 | 8135 | 9117 | 9233 | 10131 | 13321 | 17347 | 17436 | 18193 | 18586 | 19929 |
| 12 | 3721 | 6254 | 6609 | 7880 | 8139 | 10437 | 12262 | 13928 | 14065 | 14149 | 15032 | 15694 | 16264 | 18883 |
| 482 | 915 | 1548 | 1637 | 6687 | 9338 | 10163 | 11768 | 11970 | 15524 | 15695 | 17386 | 18787 | 19210 | 19340 |
| 1291 | 2500 | 4109 | 4511 | 5099 | 5194 | 10014 | 13165 | 13256 | 13972 | 15409 | 16113 | 16214 | 18584 | 20998 |
| 1761 | 4778 | 7444 | 7740 | 8129 | 8341 | 8931 | 9136 | 9207 | 10003 | 10678 | 13959 | 17673 | 18194 | 20990 |
| 3060 | 3522 | 5361 | 5692 | 6833 | 8342 | 8792 | 11023 | 11211 | 11548 | 11914 | 13987 | 15442 | 15541 | 19707 |
| 1322 | 2348 | 2970 | 5632 | 6349 | 7577 | 8782 | 9113 | 9267 | 9376 | 12042 | 12943 | 16680 | 16970 | 21321 |
| 6785 | 11960 | 21455 | | | | | | | | | | | | |
| 1223 | 15672 | 19550 | | | | | | | | | | | | |
| 5976 | 11335 | 20385 | | | | | | | | | | | | |
| 2818 | 9387 | 15317 | | | | | | | | | | | | |
| 2763 | 3554 | 18102 | | | | | | | | | | | | |
| 5230 | 11489 | 18997 | | | | | | | | | | | | |
| 5809 | 15779 | 20674 | | | | | | | | | | | | |
| 2620 | 17838 | 18533 | | | | | | | | | | | | |
| 3025 | 9342 | 9931 | | | | | | | | | | | | |
| 3728 | 5337 | 12142 | | | | | | | | | | | | |
| 2520 | 6666 | 9164 | | | | | | | | | | | | |
| 12892 | 15307 | 20912 | | | | | | | | | | | | |
| 10736 | 12393 | 16539 | | | | | | | | | | | | |
| 1075 | 2407 | 12853 | | | | | | | | | | | | |
| 4921 | 5411 | 18206 | | | | | | | | | | | | |
| 5955 | 15647 | 16838 | | | | | | | | | | | | |
| 6384 | 10336 | 19266 | | | | | | | | | | | | |
| 429 | 10421 | 17266 | | | | | | | | | | | | |
| 4880 | 10431 | 12208 | | | | | | | | | | | | |
| 2910 | 11895 | 12442 | | | | | | | | | | | | |
| 7366 | 18362 | 18772 | | | | | | | | | | | | |
| 4341 | 7903 | 14994 | | | | | | | | | | | | |
| 4564 | 6714 | 7378 | | | | | | | | | | | | |
| 4639 | 8652 | 18871 | | | | | | | | | | | | |
| 15787 | 18048 | 20246 | | | | | | | | | | | | |
| 3241 | 11079 | 13640 | | | | | | | | | | | | |
| 1559 | 2936 | 15881 | | | | | | | | | | | | |
| 2737 | 6349 | 10881 | | | | | | | | | | | | |
| 10394 | 16107 | 17073 | | | | | | | | | | | | |
| 8207 | 9043 | 12874 | | | | | | | | | | | | |
| 7805 | 16058 | 17905 | | | | | | | | | | | | |
| 11189 | 15767 | 17764 | | | | | | | | | | | | |
| 5823 | 12923 | 14316 | | | | | | | | | | | | |
| 11080 | 20390 | 20924 | | | | | | | | | | | | |
| 568 | 8263 | 17411 | | | | | | | | | | | | |
| 1845 | 3557 | 6562 | | | | | | | | | | | | |
| 2890 | 10936 | 14756 | | | | | | | | | | | | |

-continued

| | | |
|---|---|---|
| 9031 | 14220 | 21517 |
| 3529 | 12955 | 15902 |
| 413 | 6750 | 8735 |
| 6784 | 12092 | 16421 |
| 12019 | 13794 | 15308 |
| 12588 | 15378 | 17676 |
| 8067 | 14589 | 19304 |
| 1244 | 5877 | 6085 |
| 15897 | 19349 | 19993 |
| 1426 | 2394 | 12264 |
| 3456 | 8931 | 12075 |
| 13342 | 15273 | 20351 |
| 9138 | 13352 | 20798 |
| 7031 | 7626 | 14081 |
| 4280 | 4507 | 15617 |
| 4170 | 10569 | 14335 |
| 3839 | 7514 | 16578 |
| 4688 | 12815 | 18782 |
| 4861 | 7858 | 9435 |
| 605 | 5445 | 12912 |
| 2280 | 4734 | 7311 |
| 6668 | 8128 | 12638 |
| 3733 | 10621 | 19534 |
| 13933 | 18316 | 19341 |
| 1786 | 3037 | 21566 |
| 2202 | 13239 | 16432 |
| 4882 | 5808 | 9300 |
| 4580 | 8484 | 16754 |
| 14630 | 17502 | 18269 |
| 6889 | 11119 | 12447 |
| 8162 | 9078 | 16330 |
| 6538 | 17851 | 18100 |
| 17763 | 19793 | 20816 |
| 2183 | 11907 | 17567 |
| 6640 | 14428 | 15175 |
| 877 | 12035 | 14081 |
| 1336 | 6468 | 12328 |
| 5948 | 9146 | 12003 |
| 3782 | 5699 | 12445 |
| 1770 | 7946 | 8244 |
| 7384 | 12639 | 14989 |
| 1469 | 11586 | 20959 |
| 7943 | 10450 | 15907 |
| 5005 | 8153 | 10035 |
| 17750 | 18826 | 21513 |
| 4725 | 8041 | 10112 |
| 3837 | 16266 | 17376 |
| 11340 | 17361 | 17512 |
| 1269 | 4611 | 4774 |
| 2322 | 10813 | 16157 |
| 16752 | 16843 | 18959 |
| 70 | 4325 | 18753 |
| 3165 | 8153 | 15384 |
| 160 | 8045 | 16823 |
| 14112 | 16724 | 16792 |
| 4291 | 7667 | 18176 |
| 5943 | 19879 | 20721 |

ATSC3_QC_CR1015_N64800: Code Rate = 10/15, LDPC Length = 64 k

| | | | | | | | | | | | | | | | | | | |
|---|---|---|---|---|---|---|---|---|---|---|---|---|---|---|---|---|---|---|
| 8 | 297 | 703 | 742 | 1345 | 1443 | 1495 | 1628 | 1812 | 2341 | 2550 | 2669 | 2810 | 2877 | 3442 | 3690 | 3755 | 3904 | 4264 |
| 180 | 211 | 477 | 788 | 824 | 1090 | 1272 | 1578 | 1685 | 1948 | 2050 | 2195 | 2233 | 2546 | 2757 | 2946 | 3147 | 3299 | 3544 |
| 627 | 741 | 1135 | 1157 | 1226 | 1333 | 1378 | 1427 | 1454 | 1696 | 1757 | 1772 | 2099 | 2208 | 2592 | 3354 | 3580 | 4066 | 4242 |
| 9 | 795 | 959 | 989 | 1006 | 1032 | 1135 | 1209 | 1382 | 1484 | 1703 | 1855 | 1985 | 2043 | 2629 | 2845 | 3136 | 3450 | 3742 |
| 230 | 413 | 801 | 829 | 1108 | 1170 | 1291 | 1759 | 1793 | 1827 | 1976 | 2000 | 2423 | 2466 | 2917 | 3010 | 3600 | 3782 | 4143 |
| 56 | 142 | 236 | 381 | 1050 | 1141 | 1372 | 1627 | 1985 | 2247 | 2340 | 3023 | 3434 | 3519 | 3957 | 4013 | 4142 | 4164 | 4279 |
| 298 | 1211 | 2548 | 3643 | | | | | | | | | | | | | | | |
| 73 | 1070 | 1614 | 1748 | | | | | | | | | | | | | | | |
| 1439 | 2141 | 3614 | | | | | | | | | | | | | | | | |
| 284 | 1564 | 2629 | | | | | | | | | | | | | | | | |
| 607 | 660 | 855 | | | | | | | | | | | | | | | | |
| 1195 | 2037 | 2753 | | | | | | | | | | | | | | | | |
| 49 | 1198 | 2562 | | | | | | | | | | | | | | | | |
| 296 | 1145 | 3540 | | | | | | | | | | | | | | | | |
| 1516 | 2315 | 2382 | | | | | | | | | | | | | | | | |
| 154 | 722 | 4016 | | | | | | | | | | | | | | | | |
| 759 | 2375 | 3825 | | | | | | | | | | | | | | | | |
| 162 | 194 | 1749 | | | | | | | | | | | | | | | | |
| 2885 | 2422 | 2632 | | | | | | | | | | | | | | | | |
| 6 | 1172 | 2583 | | | | | | | | | | | | | | | | |

-continued

| | | |
|---|---|---|
| 726 | 1325 | 1428 |
| 985 | 2708 | 2769 |
| 255 | 2801 | 3181 |
| 2979 | 3720 | 4090 |
| 208 | 1428 | 4094 |
| 199 | 3743 | 3757 |
| 1229 | 2059 | 4282 |
| 458 | 1100 | 1387 |
| 1199 | 2481 | 3284 |
| 1161 | 1467 | 4060 |
| 959 | 3014 | 4144 |
| 2666 | 3960 | 4125 |
| 2809 | 3834 | 4318 |

ATSC3_QC_CR1115_N16200: Code Rate = 11/15, LDPC Length = 16 k

| | | | | | | | | | | | | | | |
|---|---|---|---|---|---|---|---|---|---|---|---|---|---|---|
| 696 | 989 | 1238 | 3091 | 3116 | 3738 | 4269 | 6406 | 7033 | 8048 | 9157 | 10254 | 12033 | 16456 | 16912 |
| 444 | 1488 | 6541 | 8626 | 10735 | 12447 | 13111 | 13706 | 14135 | 15195 | 15947 | 16453 | 16916 | 17137 | 17268 |
| 401 | 460 | 992 | 1145 | 1576 | 1678 | 2238 | 2320 | 4280 | 6770 | 10027 | 12486 | 15363 | 16714 | 17157 |
| 1161 | 3108 | 3727 | 4508 | 5092 | 5348 | 5582 | 7727 | 11793 | 12515 | 12917 | 13362 | 14247 | 16717 | 17205 |
| 542 | 1190 | 6883 | 7911 | 8349 | 8835 | 10489 | 11631 | 14195 | 15009 | 15454 | 15482 | 16632 | 17040 | 17063 |
| 17 | 487 | 776 | 880 | 5077 | 6172 | 9771 | 11446 | 12798 | 16016 | 16109 | 16171 | 17087 | 17132 | 17226 |
| 1337 | 3275 | 3462 | 4229 | 9246 | 10180 | 10845 | 10866 | 12250 | 13633 | 14482 | 16024 | 16812 | 17186 | 17241 |
| 15 | 980 | 2305 | 3674 | 5971 | 8224 | 11499 | 11752 | 11770 | 12897 | 14082 | 14836 | 15311 | 16391 | 17209 |
| 0 | 3926 | 5869 | 8696 | 9351 | 9391 | 11371 | 14052 | 14172 | 14636 | 14974 | 16619 | 16961 | 17033 | 17237 |
| 3033 | 5317 | 6501 | 8579 | 10698 | 12168 | 12966 | 14019 | 15392 | 15806 | 15991 | 16493 | 16690 | 17062 | 17090 |
| 981 | 1205 | 4400 | 6410 | 11003 | 13319 | 13405 | 14695 | 15846 | 16297 | 16492 | 16563 | 16616 | 16862 | 16953 |
| 1725 | 4276 | 8869 | 9588 | 14062 | 14486 | 15474 | 15548 | 16300 | 16432 | 17042 | 17050 | 17060 | 17175 | 17273 |
| 1807 | 5921 | 9960 | 10011 | 14305 | 14490 | 14872 | 15852 | 16054 | 16061 | 16306 | 16799 | 16833 | 17136 | 17262 |
| 2826 | 4752 | 6017 | 6540 | 7016 | 8201 | 14245 | 14419 | 14716 | 15983 | 16569 | 16652 | 17171 | 17179 | 17247 |
| 1662 | 2516 | 3345 | 5229 | 8086 | 9686 | 11456 | 12210 | 14595 | 15808 | 16011 | 16421 | 16825 | 17112 | 17195 |
| 2890 | 4821 | 5987 | 7226 | 8823 | 9869 | 12468 | 14694 | 15352 | 15805 | 16075 | 16462 | 17102 | 17251 | 17263 |
| 3751 | 3890 | 4382 | 5720 | 10281 | 10411 | 11350 | 12721 | 13121 | 14127 | 14980 | 15202 | 15335 | 16735 | 17123 |
| 26 | 30 | 2805 | 5457 | 6630 | 7188 | 7477 | 7556 | 11065 | 16608 | 16859 | 16909 | 16943 | 17030 | 17103 |
| 40 | 4524 | 5043 | 5566 | 9645 | 10204 | 10282 | 11696 | 13080 | 14837 | 15607 | 16274 | 17034 | 17225 | 17266 |
| 904 | 3157 | 6284 | 7151 | 7984 | 11712 | 12887 | 13767 | 15547 | 16099 | 16753 | 16829 | 17044 | 17250 | 17259 |
| 7 | 311 | 4876 | 8334 | 9249 | 11267 | 14072 | 14559 | 15003 | 15235 | 15686 | 16331 | 17177 | 17238 | 17253 |
| 4410 | 8066 | 8596 | 9631 | 10369 | 11249 | 12610 | 15769 | 16791 | 16960 | 17018 | 17037 | 17062 | 17165 | 17204 |
| 24 | 8261 | 9691 | 10138 | 11607 | 12782 | 12786 | 13424 | 13933 | 15262 | 15795 | 16476 | 17084 | 17193 | 17220 |
| 88 | 11622 | 14705 | 15890 | | | | | | | | | | | |
| 304 | 2026 | 2638 | 6018 | | | | | | | | | | | |
| 1163 | 4268 | 11620 | 17232 | | | | | | | | | | | |
| 9701 | 11785 | 14463 | 17260 | | | | | | | | | | | |
| 4118 | 10952 | 12224 | 17006 | | | | | | | | | | | |
| 3647 | 10823 | 11521 | 12060 | | | | | | | | | | | |
| 1717 | 3753 | 9199 | 11642 | | | | | | | | | | | |
| 2187 | 14280 | 17220 | | | | | | | | | | | | |
| 14787 | 16903 | 17061 | | | | | | | | | | | | |
| 381 | 3534 | 4294 | | | | | | | | | | | | |
| 3149 | 6947 | 8323 | | | | | | | | | | | | |
| 12562 | 16724 | 16881 | | | | | | | | | | | | |
| 7289 | 9997 | 15306 | | | | | | | | | | | | |
| 5615 | 13152 | 17260 | | | | | | | | | | | | |
| 5666 | 16926 | 17027 | | | | | | | | | | | | |
| 4190 | 7798 | 16831 | | | | | | | | | | | | |
| 4778 | 10629 | 17180 | | | | | | | | | | | | |
| 10001 | 13884 | 15453 | | | | | | | | | | | | |
| 6 | 2237 | 8203 | | | | | | | | | | | | |
| 7831 | 15144 | 15160 | | | | | | | | | | | | |
| 9186 | 17204 | 17243 | | | | | | | | | | | | |
| 9435 | 17168 | 17237 | | | | | | | | | | | | |
| 42 | 5701 | 17159 | | | | | | | | | | | | |
| 7812 | 14259 | 15715 | | | | | | | | | | | | |
| 39 | 4513 | 6658 | | | | | | | | | | | | |
| 38 | 9368 | 11273 | | | | | | | | | | | | |
| 1119 | 4785 | 17182 | | | | | | | | | | | | |
| 5620 | 16521 | 16729 | | | | | | | | | | | | |
| 16 | 6685 | 17242 | | | | | | | | | | | | |
| 210 | 3452 | 12383 | | | | | | | | | | | | |
| 466 | 14462 | 16250 | | | | | | | | | | | | |
| 10548 | 12633 | 13962 | | | | | | | | | | | | |
| 1452 | 6005 | 16453 | | | | | | | | | | | | |
| 22 | 4120 | 13684 | | | | | | | | | | | | |
| 5195 | 11563 | 16522 | | | | | | | | | | | | |
| 5518 | 16705 | 17201 | | | | | | | | | | | | |
| 12233 | 14552 | 15471 | | | | | | | | | | | | |
| 6067 | 13440 | 17248 | | | | | | | | | | | | |
| 8660 | 8967 | 17061 | | | | | | | | | | | | |
| 8673 | 12176 | 15051 | | | | | | | | | | | | |
| 5959 | 15767 | 16541 | | | | | | | | | | | | |

-continued

| | | |
|---|---|---|
| 3244 | 12109 | 12414 |
| 31 | 15913 | 16323 |
| 3270 | 15686 | 16653 |
| 24 | 7346 | 14675 |
| 12 | 1531 | 8740 |
| 6228 | 7565 | 16667 |
| 16936 | 17122 | 17162 |
| 4868 | 8451 | 13183 |
| 3714 | 4451 | 16919 |
| 11313 | 13801 | 17132 |
| 17070 | 17191 | 17242 |
| 1911 | 11201 | 17186 |
| 14 | 17190 | 17254 |
| 11760 | 16008 | 16832 |
| 14543 | 17033 | 17278 |
| 16129 | 16765 | 17155 |
| 6891 | 15561 | 17007 |
| 12741 | 14744 | 17116 |
| 8992 | 16661 | 17277 |
| 1861 | 11130 | 16742 |
| 4822 | 13331 | 16192 |
| 13281 | 14027 | 14989 |
| 38 | 14887 | 17141 |
| 10698 | 13452 | 15674 |
| 4 | 2539 | 16877 |
| 857 | 17170 | 17249 |
| 11449 | 11906 | 12867 |
| 285 | 14118 | 16831 |
| 15191 | 17214 | 17242 |
| 39 | 728 | 16915 |
| 2469 | 12969 | 15579 |
| 16644 | 17151 | 17164 |
| 2592 | 8280 | 10448 |
| 9236 | 12431 | 17173 |
| 9064 | 16892 | 17233 |
| 4526 | 16146 | 17038 |
| 31 | 2116 | 16083 |
| 15837 | 16951 | 17031 |
| 5362 | 8382 | 16618 |
| 6137 | 13199 | 17221 |
| 2841 | 15068 | 17068 |
| 24 | 3620 | 17003 |
| 9880 | 15718 | 16764 |
| 1784 | 10240 | 17209 |
| 2731 | 10293 | 10846 |
| 3121 | 8723 | 16598 |
| 8563 | 15662 | 17088 |
| 13 | 1167 | 14676 |
| 29 | 13850 | 15963 |
| 3654 | 7553 | 8114 |
| 23 | 4362 | 14865 |
| 4434 | 14741 | 16688 |
| 8362 | 13901 | 17244 |
| 13687 | 16736 | 17232 |
| 46 | 4229 | 13394 |
| 13169 | 16383 | 16972 |
| 16031 | 16681 | 16952 |
| 3384 | 9894 | 12580 |
| 9841 | 14414 | 16165 |
| 5013 | 17099 | 17115 |
| 2130 | 8941 | 17266 |
| 6907 | 15428 | 17241 |
| 16 | 1860 | 17235 |
| 2151 | 16014 | 16643 |
| 14954 | 15958 | 17222 |
| 3969 | 8419 | 15116 |
| 31 | 15593 | 16984 |
| 11514 | 16605 | 17255 |

ATSC3_QC_CR1115_N64800: Code Rate = 11/15, LDPC Length = 64 k

| | | | | | | | | | | | | | |
|---|---|---|---|---|---|---|---|---|---|---|---|---|---|
| 3 | 394 | 1014 | 1214 | 1361 | 1477 | 1534 | 1663 | 1856 | 2745 | 2987 | 2991 | 3124 | 3155 |
| 59 | 136 | 528 | 781 | 803 | 928 | 1293 | 1489 | 1944 | 2041 | 2200 | 2613 | 2690 | 2847 |
| 155 | 245 | 311 | 621 | 1114 | 1269 | 1281 | 1783 | 1995 | 2047 | 2672 | 2803 | 2885 | 3014 |
| 79 | 870 | 974 | 1326 | 1449 | 1530 | 2077 | 2317 | 2467 | 2627 | 2811 | 3083 | 3101 | 3132 |
| 4 | 582 | 660 | 902 | 1048 | 1842 | 1697 | 1744 | 1928 | 2628 | 2699 | 2728 | 3045 | 3104 |
| 176 | 395 | 429 | 1027 | 1061 | 1058 | 1154 | 1168 | 1175 | 2147 | 2359 | 2376 | 2613 | 2682 |
| 1388 | 2241 | 3118 | 3148 | | | | | | | | | | |
| 148 | 506 | 2067 | 3148 | | | | | | | | | | |
| 1594 | 2217 | 2705 | | | | | | | | | | | |

-continued

| | | |
|---|---|---|
| 398 | 988 | 2551 |
| 1149 | 2588 | 2654 |
| 678 | 2844 | 3115 |
| 1508 | 1547 | 1954 |
| 1199 | 1267 | 1710 |
| 2589 | 3163 | 3207 |
| 1 | 2583 | 2974 |
| 2766 | 2697 | 3166 |
| 929 | 1823 | 2742 |
| 1113 | 3007 | 3239 |
| 1753 | 1478 | 3127 |
| 0 | 509 | 1811 |
| 1672 | 2646 | 2984 |
| 965 | 1462 | 3230 |
| 3 | 1077 | 2917 |
| 1183 | 1316 | 1662 |
| 958 | 1593 | 3239 |
| 64 | 1996 | 2226 |
| 1442 | 2058 | 3181 |
| 513 | 973 | 1058 |
| 1263 | 3185 | 8229 |
| 681 | 1394 | 3017 |
| 419 | 2653 | 3217 |
| 3 | 2404 | 3175 |
| 2417 | 2792 | 2854 |
| 1879 | 2940 | 3235 |
| 647 | 1704 | 3060 |

ATSC3_QC_CR1215_N16200: Code Rate = 12/15, LDPC Length = 16 k

| | | | | | | | | | | | | | |
|---|---|---|---|---|---|---|---|---|---|---|---|---|---|
| 584 | 1472 | 1621 | 1867 | 3338 | 3568 | 3723 | 4185 | 5126 | 5889 | 7737 | 8632 | 8940 | 9725 |
| 221 | 445 | 590 | 3779 | 3835 | 6939 | 7743 | 8280 | 8448 | 8491 | 9367 | 10042 | 11242 | 12917 |
| 4662 | 4837 | 4900 | 5029 | 6449 | 6687 | 6751 | 8684 | 9936 | 11681 | 11811 | 11886 | 12089 | 12909 |
| 2418 | 3018 | 3647 | 4210 | 4473 | 7447 | 7502 | 9490 | 10067 | 11092 | 11139 | 11256 | 12201 | 12383 |
| 2591 | 2947 | 3349 | 3406 | 4417 | 4519 | 5176 | 6672 | 8498 | 8863 | 9201 | 11294 | 11376 | 12184 |
| 27 | 101 | 197 | 290 | 871 | 1727 | 3911 | 5411 | 6676 | 8701 | 9350 | 10310 | 10798 | 12439 |
| 1765 | 1897 | 2923 | 3584 | 3901 | 4048 | 6963 | 7054 | 7132 | 9165 | 10184 | 10824 | 11278 | 12669 |
| 2183 | 3740 | 4808 | 5217 | 5660 | 6375 | 6787 | 8219 | 8466 | 9037 | 10353 | 10583 | 11118 | 12762 |
| 73 | 1594 | 2146 | 2715 | 3501 | 3572 | 3639 | 3725 | 6959 | 7187 | 8406 | 10120 | 10507 | 10691 |
| 240 | 732 | 1215 | 2185 | 2788 | 2830 | 3499 | 3881 | 4197 | 4991 | 6425 | 7061 | 9756 | 10491 |
| 831 | 1568 | 1828 | 3424 | 4319 | 4516 | 4639 | 6018 | 9702 | 10203 | 10417 | 11240 | 11518 | 12458 |
| 2024 | 2970 | 3048 | 3638 | 3676 | 4152 | 5284 | 5779 | 5926 | 9426 | 9945 | 10873 | 11787 | 11837 |
| 1049 | 1218 | 1651 | 2328 | 3493 | 4363 | 5750 | 6483 | 7613 | 8782 | 9738 | 9803 | 11744 | 11937 |
| 1193 | 2060 | 2289 | 2964 | 3478 | 4592 | 4756 | 6709 | 7162 | 8231 | 8326 | 11140 | 11908 | 12243 |
| 978 | 2120 | 2439 | 3338 | 3850 | 4589 | 6567 | 8745 | 9656 | 9708 | 10161 | 10542 | 10711 | 12639 |
| 2403 | 2938 | 3117 | 3247 | 3711 | 5593 | 5844 | 5932 | 7801 | 10152 | 10226 | 11498 | 12162 | 12941 |
| 1781 | 2229 | 2276 | 2533 | 3582 | 3951 | 5279 | 5774 | 7930 | 9824 | 10920 | 11038 | 12340 | 12440 |
| 289 | 384 | 1980 | 2230 | 3464 | 3873 | 5958 | 8656 | 8942 | 9006 | 10175 | 11425 | 11745 | 12530 |
| 155 | 354 | 1090 | 1330 | 2002 | 2236 | 3559 | 3705 | 4922 | 5958 | 6576 | 8564 | 9972 | 12760 |
| 303 | 876 | 2059 | 2142 | 5244 | 5330 | 6644 | 7576 | 8614 | 9598 | 10410 | 10718 | 11033 | 12957 |
| 3449 | 3617 | 4408 | 4602 | 4727 | 6182 | 8835 | 8928 | 9372 | 9644 | 10237 | 10747 | 11655 | 12747 |
| 811 | 2565 | 2820 | 8677 | 8974 | 9632 | 11069 | 11548 | 11839 | 12107 | 12411 | 12695 | 12812 | 12890 |
| 972 | 4123 | 4943 | 6385 | 6449 | 7339 | 7477 | 8379 | 9177 | 9359 | 10074 | 11709 | 12552 | 12831 |
| 842 | 973 | 1541 | 2262 | 2905 | 5276 | 6758 | 7099 | 7894 | 8128 | 8325 | 8663 | 8875 | 10050 |
| 474 | 791 | 968 | 3902 | 4924 | 4965 | 5085 | 5908 | 6109 | 6329 | 7931 | 9038 | 9401 | 10568 |
| 1397 | 4461 | 4658 | 5911 | 6037 | 7127 | 7318 | 8678 | 8924 | 9000 | 9473 | 9602 | 10446 | 12692 |
| 1334 | 7571 | 12881 | | | | | | | | | | | |
| 1393 | 1447 | 7972 | | | | | | | | | | | |
| 633 | 1257 | 10597 | | | | | | | | | | | |
| 4843 | 5102 | 11056 | | | | | | | | | | | |
| 3294 | 8015 | 10513 | | | | | | | | | | | |
| 1108 | 10374 | 10546 | | | | | | | | | | | |
| 5353 | 7824 | 10111 | | | | | | | | | | | |
| 3398 | 7674 | 8569 | | | | | | | | | | | |
| 7719 | 9478 | 10503 | | | | | | | | | | | |
| 2997 | 9418 | 9581 | | | | | | | | | | | |
| 5777 | 6519 | 11229 | | | | | | | | | | | |
| 1966 | 5214 | 9899 | | | | | | | | | | | |
| 6 | 4088 | 5827 | | | | | | | | | | | |
| 836 | 9248 | 9612 | | | | | | | | | | | |
| 483 | 7229 | 7548 | | | | | | | | | | | |
| 7865 | 8289 | 9804 | | | | | | | | | | | |
| 2915 | 11098 | 11900 | | | | | | | | | | | |
| 6180 | 7096 | 9481 | | | | | | | | | | | |
| 1431 | 6786 | 8924 | | | | | | | | | | | |
| 748 | 6757 | 8625 | | | | | | | | | | | |
| 3312 | 4475 | 7204 | | | | | | | | | | | |
| 1852 | 8958 | 11020 | | | | | | | | | | | |
| 1915 | 2903 | 4006 | | | | | | | | | | | |
| 6776 | 10886 | 12531 | | | | | | | | | | | |

-continued

| | | |
|---|---|---|
| 2594 | 9998 | 12742 |
| 159 | 2002 | 12079 |
| 853 | 3281 | 3762 |
| 5201 | 5798 | 6413 |
| 3882 | 6062 | 12047 |
| 4133 | 6775 | 9657 |
| 228 | 6874 | 11183 |
| 7433 | 10728 | 10864 |
| 7735 | 8073 | 12734 |
| 2844 | 4621 | 11779 |
| 3909 | 7103 | 12804 |
| 6002 | 9704 | 11060 |
| 5864 | 6856 | 7681 |
| 3652 | 5869 | 7605 |
| 2546 | 2657 | 4461 |
| 2423 | 4203 | 9111 |
| 244 | 1855 | 4691 |
| 1106 | 2178 | 6371 |
| 391 | 1617 | 10126 |
| 250 | 9259 | 10603 |
| 3435 | 4614 | 6924 |
| 1742 | 8045 | 9529 |
| 7667 | 8875 | 11451 |
| 4023 | 6108 | 6911 |
| 8621 | 10184 | 11650 |
| 6726 | 10861 | 12348 |
| 3228 | 6302 | 7388 |
| 1 | 1137 | 5358 |
| 381 | 2424 | 8537 |
| 3256 | 7508 | 10044 |
| 1980 | 2219 | 4569 |
| 2468 | 5699 | 10319 |
| 2803 | 3314 | 12808 |
| 8578 | 9642 | 11533 |
| 829 | 4585 | 7923 |
| 59 | 329 | 5575 |
| 1067 | 5709 | 6867 |
| 1175 | 4744 | 12219 |
| 109 | 2518 | 6756 |
| 2105 | 10626 | 11153 |
| 5192 | 10696 | 10749 |
| 6260 | 7641 | 8233 |
| 2998 | 3094 | 11214 |
| 3398 | 6466 | 11494 |
| 6574 | 10448 | 12160 |
| 2734 | 10755 | 12780 |
| 1028 | 7958 | 10825 |
| 8545 | 8602 | 10793 |
| 392 | 3398 | 11417 |
| 6639 | 9291 | 12571 |
| 1067 | 7919 | 8934 |
| 1064 | 2848 | 12753 |
| 6076 | 8656 | 12690 |
| 5504 | 6193 | 10171 |
| 1951 | 7156 | 7356 |
| 4389 | 4780 | 7889 |
| 526 | 4804 | 9141 |
| 1238 | 3648 | 10464 |
| 2587 | 5624 | 12557 |
| 5560 | 5903 | 11963 |
| 1134 | 2570 | 3297 |
| 10041 | 11583 | 12157 |
| 1263 | 9585 | 12912 |
| 3744 | 7898 | 10646 |
| 45 | 9074 | 10315 |
| 1051 | 6188 | 10038 |
| 2242 | 8394 | 12712 |
| 3598 | 9025 | 12651 |
| 2295 | 3540 | 5610 |
| 1914 | 4378 | 12423 |
| 1766 | 3635 | 12759 |
| 5177 | 9586 | 11143 |
| 943 | 3590 | 11649 |
| 4864 | 6905 | 10454 |
| 5852 | 6042 | 10421 |
| 6095 | 8285 | 12349 |
| 2070 | 7171 | 8563 |
| 718 | 12234 | 12716 |
| 512 | 10667 | 11353 |

-continued

| | | |
|---|---|---|
| 3629 | 6485 | 7040 |
| 2880 | 8865 | 11466 |
| 4490 | 10220 | 11796 |
| 5440 | 8819 | 9103 |
| 5262 | 7543 | 12411 |
| 516 | 7779 | 10940 |
| 2515 | 5843 | 9202 |
| 4684 | 5994 | 10586 |
| 573 | 2270 | 3324 |
| 7870 | 8317 | 10322 |
| 6856 | 7638 | 12909 |
| 1583 | 7669 | 10781 |
| 8141 | 9085 | 12555 |
| 3903 | 5485 | 9992 |
| 4467 | 11998 | 12904 |

ATSC3_QC_CR1215_N64800: Code Rate = 12/15, LDPC Length = 64 k

| | | | | | | | | | | | |
|---|---|---|---|---|---|---|---|---|---|---|---|
| 37 | 144 | 161 | 199 | 220 | 496 | 510 | 589 | 731 | 808 | 834 | 965 |
| 20 | 27 | 165 | 462 | 546 | 583 | 742 | 796 | 1095 | 1110 | 1129 | 1145 |
| 288 | 362 | 463 | 505 | 638 | 691 | 745 | 861 | 1006 | 1083 | 1124 | 1175 |
| 405 | 464 | 478 | 511 | 566 | 574 | 641 | 766 | 785 | 802 | 836 | 996 |
| 86 | 192 | 245 | 357 | 363 | 374 | 700 | 713 | 852 | 903 | 992 | 1174 |
| 101 | 327 | 378 | 550 | | | | | | | | |
| 186 | 723 | 1318 | 1550 | | | | | | | | |
| 118 | 277 | 504 | 1835 | | | | | | | | |
| 199 | 407 | 1776 | 1965 | | | | | | | | |
| 387 | 1253 | 1328 | 1975 | | | | | | | | |
| 62 | 144 | 1163 | 2017 | | | | | | | | |
| 100 | 475 | 572 | 2136 | | | | | | | | |
| 431 | 865 | 1568 | 2055 | | | | | | | | |
| 283 | 640 | 981 | 1172 | | | | | | | | |
| 220 | 1038 | 1903 | 2147 | | | | | | | | |
| 483 | 1318 | 1358 | 2118 | | | | | | | | |
| 92 | 561 | 1709 | 1810 | | | | | | | | |
| 112 | 403 | 1485 | 2042 | | | | | | | | |
| 431 | 1110 | 1130 | 1365 | | | | | | | | |
| 587 | 1005 | 1205 | 1588 | | | | | | | | |
| 704 | 1113 | 1943 | | | | | | | | | |
| 375 | 1487 | 2100 | | | | | | | | | |
| 1507 | 1950 | 2110 | | | | | | | | | |
| 962 | 1613 | 2038 | | | | | | | | | |
| 554 | 1295 | 1501 | | | | | | | | | |
| 488 | 784 | 1446 | | | | | | | | | |
| 871 | 1935 | 1964 | | | | | | | | | |
| 54 | 1475 | 1504 | | | | | | | | | |
| 1579 | 1617 | 2074 | | | | | | | | | |
| 1856 | 1967 | 2131 | | | | | | | | | |
| 330 | 1582 | 2107 | | | | | | | | | |
| 40 | 1056 | 1809 | | | | | | | | | |
| 1310 | 1353 | 1410 | | | | | | | | | |
| 232 | 554 | 1939 | | | | | | | | | |
| 168 | 641 | 1099 | | | | | | | | | |
| 333 | 437 | 1556 | | | | | | | | | |
| 153 | 622 | 745 | | | | | | | | | |
| 719 | 931 | 1188 | | | | | | | | | |
| 237 | 638 | 1607 | | | | | | | | | |

| | | | | | | | | | | | |
|---|---|---|---|---|---|---|---|---|---|---|---|
| 1249 | 1264 | 1311 | 1377 | 1460 | 1520 | 1598 | 1707 | 1958 | 2055 | 2099 | 2154 |
| 1169 | 1190 | 1254 | 1363 | 1383 | 1463 | 1718 | 1835 | 1870 | 1879 | 2108 | 2128 |
| 1247 | 1275 | 1337 | 1353 | 1378 | 1506 | 1588 | 1632 | 1720 | 1868 | 1980 | 2135 |
| 1128 | 1239 | 1247 | 1449 | 1491 | 1537 | 1616 | 1643 | 1668 | 1950 | 1975 | 2149 |
| 1245 | 1277 | 1342 | 1369 | 1381 | 1417 | 1463 | 1712 | 1900 | 1962 | 2053 | 2118 |

ATSC3_QC_CR1315_N16200: Code Rate = 13/15, LDPC Length = 16 k

| | | | | | | | | | | | | |
|---|---|---|---|---|---|---|---|---|---|---|---|---|
| 142 | 2307 | 2598 | 2650 | 4028 | 4434 | 5781 | 5881 | 6016 | 6323 | 6681 | 6698 | 8125 |
| 2932 | 4928 | 5248 | 5256 | 5983 | 6773 | 6828 | 7789 | 8426 | 8494 | 8534 | 8539 | 8583 |
| 899 | 3295 | 3833 | 5399 | 6820 | 7400 | 7753 | 7890 | 8109 | 8451 | 8529 | 8564 | 8602 |
| 21 | 3060 | 4720 | 5429 | 5636 | 5927 | 6966 | 8110 | 8170 | 8247 | 8355 | 8365 | 8616 |
| 20 | 1745 | 2838 | 3799 | 4380 | 4418 | 4646 | 5059 | 7343 | 8161 | 8302 | 8456 | 8631 |
| 9 | 6274 | 6725 | 6792 | 7195 | 7333 | 8027 | 8186 | 8209 | 8273 | 8442 | 8548 | 8632 |
| 494 | 1365 | 2405 | 3799 | 5188 | 5291 | 7644 | 7926 | 8139 | 8458 | 8504 | 8594 | 8625 |
| 192 | 574 | 1179 | 4387 | 4695 | 5089 | 5831 | 7673 | 7789 | 8298 | 8301 | 8612 | 8632 |
| 11 | 20 | 1406 | 6111 | 6176 | 6256 | 6708 | 6834 | 7828 | 8232 | 8457 | 8495 | 8602 |
| 6 | 2654 | 3554 | 4483 | 4966 | 5866 | 6795 | 8069 | 8249 | 8301 | 8497 | 8509 | 8623 |
| 21 | 1144 | 2355 | 3124 | 6773 | 6805 | 6887 | 7742 | 7994 | 8358 | 8374 | 8580 | 8611 |
| 335 | 4473 | 4883 | 5528 | 6096 | 7543 | 7586 | 7921 | 8197 | 8319 | 8394 | 8489 | 8636 |
| 2919 | 4331 | 4419 | 4735 | 6366 | 6393 | 6844 | 7193 | 8165 | 8205 | 8544 | 8586 | 8617 |
| 12 | 19 | 742 | 930 | 3009 | 4330 | 6213 | 6224 | 7292 | 7430 | 7792 | 7922 | 8137 |
| 710 | 1439 | 1588 | 2434 | 3516 | 5239 | 6248 | 6827 | 8230 | 8448 | 8515 | 8581 | 8619 |

-continued

| | | | | | | | | | | | | |
|---|---|---|---|---|---|---|---|---|---|---|---|---|
| 200 | 1075 | 1868 | 5581 | 7349 | 7642 | 7698 | 8037 | 8201 | 8210 | 8320 | 8391 | 8526 |
| 3 | 2501 | 4252 | 5256 | 5292 | 5567 | 6136 | 6321 | 6430 | 6486 | 7571 | 8521 | 8636 |
| 3062 | 4599 | 5885 | 6529 | 6616 | 7314 | 7319 | 7567 | 8024 | 8153 | 8302 | 8372 | 8598 |
| 105 | 381 | 1574 | 4351 | 5452 | 5603 | 5943 | 7467 | 7788 | 7933 | 8362 | 8513 | 8587 |
| 787 | 1857 | 3386 | 3659 | 6550 | 7131 | 7965 | 8015 | 8040 | 8312 | 8484 | 8525 | 8537 |
| 15 | 1118 | 4226 | 5197 | 5575 | 5761 | 6762 | 7038 | 8260 | 8338 | 8444 | 8512 | 8568 |
| 36 | 5216 | 5368 | 5616 | 6029 | 6591 | 8038 | 8067 | 8299 | 8351 | 8565 | 8578 | 8585 |
| 1 | 23 | 4300 | 4530 | 5426 | 5532 | 5817 | 6967 | 7124 | 7979 | 8022 | 8270 | 8437 |
| 629 | 2133 | 4828 | 5475 | 5875 | 5890 | 7194 | 8042 | 8345 | 8385 | 8518 | 8598 | 8612 |
| 11 | 1065 | 3782 | 4237 | 4993 | 7104 | 7863 | 7904 | 8104 | 8228 | 8321 | 8383 | 8565 |
| 2131 | 2274 | 3168 | 3215 | 3220 | 5597 | 6347 | 7812 | 8238 | 8354 | 8527 | 8557 | 8614 |
| 5600 | 6591 | 7491 | 7696 | | | | | | | | | |
| 1766 | 8281 | 8626 | | | | | | | | | | |
| 1725 | 2280 | 5120 | | | | | | | | | | |
| 1650 | 3445 | 7652 | | | | | | | | | | |
| 4312 | 6911 | 8626 | | | | | | | | | | |
| 15 | 1013 | 5892 | | | | | | | | | | |
| 2263 | 2546 | 2979 | | | | | | | | | | |
| 1545 | 5873 | 7406 | | | | | | | | | | |
| 67 | 726 | 3697 | | | | | | | | | | |
| 2860 | 6443 | 8542 | | | | | | | | | | |
| 17 | 911 | 2820 | | | | | | | | | | |
| 1561 | 4580 | 6052 | | | | | | | | | | |
| 79 | 5269 | 7134 | | | | | | | | | | |
| 22 | 2410 | 2424 | | | | | | | | | | |
| 3501 | 5642 | 8627 | | | | | | | | | | |
| 808 | 6950 | 8571 | | | | | | | | | | |
| 4099 | 6389 | 7482 | | | | | | | | | | |
| 4023 | 5000 | 7833 | | | | | | | | | | |
| 5476 | 5765 | 7917 | | | | | | | | | | |
| 1008 | 3194 | 7207 | | | | | | | | | | |
| 20 | 495 | 5411 | | | | | | | | | | |
| 1703 | 8388 | 8635 | | | | | | | | | | |
| 6 | 4395 | 4921 | | | | | | | | | | |
| 200 | 2053 | 8206 | | | | | | | | | | |
| 1089 | 5126 | 5562 | | | | | | | | | | |
| 10 | 4193 | 7720 | | | | | | | | | | |
| 1967 | 2151 | 4608 | | | | | | | | | | |
| 22 | 738 | 3513 | | | | | | | | | | |
| 3385 | 5066 | 8152 | | | | | | | | | | |
| 440 | 1118 | 8537 | | | | | | | | | | |
| 3429 | 6058 | 7716 | | | | | | | | | | |
| 5213 | 7519 | 8382 | | | | | | | | | | |
| 5564 | 8365 | 8620 | | | | | | | | | | |
| 43 | 3219 | 8603 | | | | | | | | | | |
| 4 | 5409 | 5815 | | | | | | | | | | |
| 5 | 6376 | 7654 | | | | | | | | | | |
| 4091 | 5724 | 5953 | | | | | | | | | | |
| 5348 | 6754 | 8613 | | | | | | | | | | |
| 1634 | 6398 | 6632 | | | | | | | | | | |
| 72 | 2058 | 8605 | | | | | | | | | | |
| 3497 | 5811 | 7579 | | | | | | | | | | |
| 3846 | 6743 | 8559 | | | | | | | | | | |
| 15 | 5933 | 8629 | | | | | | | | | | |
| 2133 | 5859 | 7068 | | | | | | | | | | |
| 4151 | 4617 | 8566 | | | | | | | | | | |
| 2960 | 8270 | 8410 | | | | | | | | | | |
| 2059 | 3617 | 8210 | | | | | | | | | | |
| 544 | 1441 | 6895 | | | | | | | | | | |
| 4043 | 7482 | 8592 | | | | | | | | | | |
| 294 | 2180 | 8524 | | | | | | | | | | |
| 3058 | 8227 | 8373 | | | | | | | | | | |
| 364 | 5756 | 8617 | | | | | | | | | | |
| 5383 | 8555 | 8619 | | | | | | | | | | |
| 1704 | 2480 | 4181 | | | | | | | | | | |
| 7338 | 7929 | 7990 | | | | | | | | | | |
| 2615 | 3905 | 7981 | | | | | | | | | | |
| 4298 | 4548 | 8296 | | | | | | | | | | |
| 8262 | 8319 | 8630 | | | | | | | | | | |
| 892 | 1893 | 8028 | | | | | | | | | | |
| 5694 | 7237 | 8595 | | | | | | | | | | |
| 1487 | 5012 | 5810 | | | | | | | | | | |
| 4335 | 8593 | 8624 | | | | | | | | | | |
| 3509 | 4531 | 5273 | | | | | | | | | | |
| 10 | 22 | 830 | | | | | | | | | | |
| 4161 | 5208 | 6280 | | | | | | | | | | |
| 275 | 7063 | 8634 | | | | | | | | | | |
| 4 | 2725 | 3113 | | | | | | | | | | |
| 2279 | 7403 | 8174 | | | | | | | | | | |

-continued

| | | |
|---|---|---|
| 1637 | 3328 | 3930 |
| 2810 | 4939 | 5624 |
| 3 | 1234 | 7687 |
| 2799 | 7740 | 8616 |
| 22 | 7703 | 8636 |
| 4302 | 7857 | 7993 |
| 7477 | 7794 | 8592 |
| 9 | 6111 | 8591 |
| 5 | 8606 | 8628 |
| 347 | 3497 | 4033 |
| 1747 | 2613 | 8636 |
| 1827 | 5600 | 7042 |
| 580 | 1822 | 6842 |
| 232 | 7134 | 7783 |
| 4629 | 5000 | 7231 |
| 951 | 2806 | 4947 |
| 571 | 3474 | 8577 |
| 2437 | 2496 | 7945 |
| 23 | 5873 | 8162 |
| 12 | 1168 | 7686 |
| 8315 | 8540 | 8596 |
| 1766 | 2506 | 4733 |
| 929 | 1516 | 3338 |
| 21 | 1216 | 6555 |
| 782 | 1452 | 8617 |
| 8 | 6083 | 6087 |
| 667 | 3240 | 4583 |
| 4030 | 4661 | 5790 |
| 559 | 7122 | 8553 |
| 3202 | 4388 | 4909 |
| 2533 | 3673 | 8594 |
| 1991 | 3954 | 6206 |
| 6835 | 7900 | 7980 |
| 189 | 5722 | 8573 |
| 2680 | 4928 | 4998 |
| 243 | 2579 | 7735 |
| 4281 | 8132 | 8566 |
| 7656 | 7671 | 8609 |
| 1116 | 2291 | 4166 |
| 21 | 388 | 8021 |
| 6 | 1123 | 8369 |
| 311 | 4918 | 8511 |
| 0 | 3248 | 6290 |
| 13 | 6762 | 7172 |
| 4209 | 5632 | 7563 |
| 49 | 127 | 8074 |
| 581 | 1735 | 4075 |
| 0 | 2235 | 5470 |
| 2178 | 5820 | 6179 |
| 16 | 3575 | 6054 |
| 1095 | 4564 | 6458 |
| 9 | 1581 | 5953 |
| 2537 | 6469 | 8552 |
| 14 | 3874 | 4844 |
| 0 | 3269 | 3551 |
| 2114 | 7372 | 7926 |
| 1875 | 2388 | 4057 |
| 3232 | 4042 | 6663 |
| 9 | 401 | 583 |
| 13 | 4100 | 6584 |
| 2299 | 4190 | 4410 |
| 21 | 3670 | 4979 |

ATSC3_QC_CR1315_N64800: Code Rate = 13/15, LDPC Length = 64 k

Annex to the Description—Annex 4

| 16-QAM | | | | |
|---|---|---|---|---|
| CR | 7/15 | 9/15 | 11/15 | 13/15 |
| | 1.2103 + 0.5026i | 0.4909 + 1.2007i | 0.9583 + 0.9547i | 0.9517 + 0.9511i |
| | 0.5014 + 1.2103i | 1.2007 + 0.4909i | 0.9547 + 0.2909i | 0.9524 + 0.3061i |
| | 0.4634 + 0.2624i | 0.2476 + 0.5065i | 0.2921 + 0.9583i | 0.3067 + 0.9524i |
| | 0.2624 + 0.4627i | 0.5053 + 0.2476i | 0.2909 + 0.2927i | 0.3061 + 0.3067i |

| 64-QAM | | | | |
|---|---|---|---|---|
| CR | 7/15 | 9/15 | 11/15 | 13/15 |
| | 0.1543 + 0.3088i | 0.3547 + 0.6149i | 0.3317 + 0.6970i | 1.4293 + 0.2286i |
| | 0.1719 + 0.3074i | 0.1581 + 0.6842i | 0.1386 + 0.8824i | 0.6234 + 1.1799i |
| | 0.2021 + 0.6601i | 0.1567 + 0.2749i | 0.1323 + 0.4437i | 1.0719 + 0.9247i |
| | 0.3396 + 0.6009i | 0.1336 + 0.2700i | 0.1015 + 0.1372i | 0.6841 + 0.8071i |
| | 0.3080 + 0.1543i | 0.6177 + 0.4030i | 0.5682 + 0.4500i | 1.0440 + 0.1692i |
| | 0.3069 + 0.1716i | 0.7262 + 0.1756i | 0.6739 + 0.1435i | 0.7232 + 0.1541i |
| | 0.6607 + 0.2018i | 0.3568 + 0.1756i | 0.3597 + 0.3401i | 1.0639 + 0.5312i |
| | 0.6011 + 0.3395i | 0.3771 + 0.1336i | 0.3660 + 0.1204i | 0.7147 + 0.4706i |
| | 0.2936 + 1.4847i | 0.5639 + 0.8864i | 0.6004 + 0.8922i | 0.2128 + 1.4368i |
| | 0.8412 + 1.2593i | 0.1980 + 1.0277i | 0.2120 + 1.2253i | 0.1990 + 1.0577i |
| | 0.2321 + 1.0247i | 0.8199 + 1.2515i | 0.9594 + 1.0714i | 0.1176 + 0.6586i |
| | 0.5629 + 0.8926i | 0.2854 + 1.4691i | 0.5829 + 1.3995i | 0.3691 + 0.7533i |
| | 1.4850 + 0.2935i | 0.8654 + 0.6058i | 0.8439 + 0.5675i | 0.1457 + 0.1261i |
| | 1.2599 + 0.8426i | 1.0382 + 0.2141i | 0.9769 + 0.1959i | 0.4329 + 0.1380i |
| | 1.0247 + 0.2320i | 1.2362 + 0.8416i | 1.2239 + 0.6760i | 0.1424 + 0.3819i |
| | 0.8925 + 0.5631i | 1.4663 + 0.2973i | 1.3653 + 0.2323i | 0.4216 + 0.4265i |

| 256-QAM | | | | |
|---|---|---|---|---|
| CR | 7/15 | 9/15 | 11/15 | 13/15 |
| | 0.1256 + 0.2068i | 0.0899 + 0.1337i | 0.0582 + 0.3157i | 1.4685 + 0.3416i |
| | 0.1255 + 0.2077i | 0.0910 + 0.1377i | 0.1170 + 0.3398i | 0.9545 + 1.2710i |
| | 0.1265 + 0.2240i | 0.0873 + 0.3862i | 0.0609 + 0.4922i | 1.2326 + 0.9727i |
| | 0.1264 + 0.2247i | 0.0883 + 0.3873i | 0.1505 + 0.4655i | 0.9928 + 1.0555i |
| | 0.1557 + 0.2325i | 0.1115 + 0.1442i | 0.0809 + 0.2181i | 0.5366 + 1.2142i |
| | 0.1555 + 0.2328i | 0.1135 + 0.1472i | 0.1912 + 0.2702i | 0.7176 + 1.2813i |
| | 0.1594 + 0.2446i | 0.2067 + 0.3591i | 0.3444 + 0.3892i | 0.5970 + 1.0330i |
| | 0.1590 + 0.2447i | 0.1975 + 0.3621i | 0.2678 + 0.3980i | 0.7840 + 1.0563i |
| | 0.1383 + 0.6402i | 0.1048 + 0.7533i | 0.0827 + 0.7889i | 1.3683 + 0.5610i |
| | 0.1417 + 0.6402i | 0.1770 + 0.7412i | 0.2390 + 0.7609i | 0.9738 + 0.6818i |
| | 0.1344 + 0.6027i | 0.1022 + 0.5904i | 0.0692 + 0.6437i | 1.2078 + 0.7474i |
| | 0.1366 + 0.6023i | 0.1191 + 0.5890i | 0.1982 + 0.6202i | 1.0017 + 0.8588i |
| | 0.3330 + 0.5769i | 0.4264 + 0.6230i | 0.5248 + 0.6168i | 0.6323 + 0.6766i |
| | 0.3228 + 0.5787i | 0.3650 + 0.6689i | 0.3946 + 0.7012i | 0.7966 + 0.6886i |
| | 0.3099 + 0.5483i | 0.3254 + 0.5153i | 0.4297 + 0.5004i | 0.6339 + 0.8522i |
| | 0.3017 + 0.5493i | 0.2959 + 0.5302i | 0.3236 + 0.5668i | 0.8022 + 0.8656i |
| | 0.4168 + 0.1173i | 0.3256 + 0.0768i | 0.1081 + 0.0518i | 0.0931 + 1.1992i |
| | 0.4168 + 0.1185i | 0.3266 + 0.0870i | 0.2626 + 0.0685i | 0.1140 + 1.4121i |
| | 0.4205 + 0.1200i | 0.4721 + 0.0994i | 0.4934 + 0.0753i | 0.0730 + 1.0051i |
| | 0.4202 + 0.1215i | 0.4721 + 0.1206i | 0.4151 + 0.0899i | 0.2219 + 0.9648i |
| | 0.3852 + 0.1797i | 0.2927 + 0.1267i | 0.0850 + 0.1018i | 0.4566 + 1.4370i |
| | 0.3860 + 0.1803i | 0.2947 + 0.1296i | 0.2425 + 0.1555i | 0.3039 + 1.2999i |
| | 0.3867 + 0.1760i | 0.3823 + 0.2592i | 0.4222 + 0.2788i | 0.4348 + 0.9883i |
| | 0.3679 + 0.1765i | 0.3944 + 0.2521i | 0.3833 + 0.2175i | 0.3152 + 1.1094i |
| | 0.7366 + 0.1528i | 0.7755 + 0.1118i | 0.8081 + 0.0814i | 0.0615 + 0.6426i |
| | 0.7255 + 0.1884i | 0.7513 + 0.2154i | 0.7874 + 0.2263i | 0.1977 + 0.6403i |
| | 0.7219 + 0.1535i | 0.6591 + 0.1033i | 0.6444 + 0.0779i | 0.0627 + 0.8195i |
| | 0.7117 + 0.1857i | 0.6446 + 0.1737i | 0.6425 + 0.1804i | 0.1944 + 0.7950i |
| | 0.5825 + 0.4149i | 0.5906 + 0.4930i | 0.6442 + 0.4989i | 0.4831 + 0.6579i |
| | 0.6012 + 0.4001i | 0.6538 + 0.4155i | 0.7296 + 0.3793i | 0.3357 + 0.6420i |
| | 0.5715 + 0.3988i | 0.4981 + 0.3921i | 0.5312 + 0.3831i | 0.4793 + 0.8186i |
| | 0.5889 + 0.3864i | 0.5373 + 0.3586i | 0.5938 + 0.3038i | 0.3334 + 0.7968i |
| | 0.1671 + 1.7095i | 0.1630 + 1.6621i | 0.1530 + 1.5695i | 1.1496 + 0.0911i |
| | 0.4420 + 1.6137i | 0.4720 + 1.5898i | 0.4501 + 1.5218i | 0.9665 + 0.0743i |
| | 0.1477 + 1.3374i | 0.1268 + 1.3488i | 0.1272 + 1.3199i | 1.3416 + 0.1182i |
| | 0.3135 + 1.3073i | 0.3752 + 1.2961i | 0.3852 + 1.2808i | 0.9586 + 0.2173i |
| | 1.0214 + 1.3784i | 1.0398 + 1.2991i | 1.0070 + 1.2418i | 0.6270 + 0.0735i |
| | 0.7434 + 1.5169i | 0.7733 + 1.4772i | 0.7407 + 1.4062i | 0.7860 + 0.0714i |
| | 0.7869 + 1.1040i | 0.3380 + 1.0552i | 0.8513 + 1.0461i | 0.6272 + 0.2168i |
| | 0.6252 + 1.2041i | 0.6242 + 1.2081i | 0.6296 + 1.1796i | 0.7881 + 0.2183i |
| | 0.1526 + 0.9140i | 0.1103 + 0.9397i | 0.0974 + 0.9545i | 1.1689 + 0.5018i |
| | 0.1914 + 0.9087i | 0.2415 + 0.9155i | 0.2832 + 0.9168i | 0.9701 + 0.5155i |
| | 0.1539 + 1.0179i | 0.1118 + 1.1163i | 0.1134 + 1.1215i | 1.1870 + 0.3104i |
| | 0.2095 + 1.0084i | 0.3079 + 1.0866i | 0.3306 + 1.0823i | 0.9885 + 0.3629i |
| | 0.5021 + 0.7976i | 0.5647 + 0.7638i | 0.6237 + 0.7456i | 0.6391 + 0.5151i |
| | 0.4537 + 0.8238i | 0.4385 + 0.8433i | 0.4639 + 0.8471i | 0.7973 + 0.5176i |
| | 0.5663 + 0.8802i | 0.6846 + 0.8841i | 0.7263 + 0.8835i | 0.6279 + 0.3616i |
| | 0.5021 + 0.9146i | 0.5165 + 1.0034i | 0.5354 + 1.0001i | 0.7944 + 0.3650i |
| | 1.7030 + 0.1913i | 1.6489 + 0.1630i | 1.5940 + 0.1623i | 0.0581 + 0.0655i |
| | 1.6116 + 0.5458i | 1.5828 + 0.4983i | 1.5379 + 0.2722i | 0.2048 + 0.0670i |
| | 1.3788 + 0.1641i | 1.3437 + 0.1389i | 1.3481 + 0.1336i | 0.0671 + 0.1968i |
| | 1.3121 + 0.4320i | 1.2850 + 0.4025i | 1.2955 + 0.3937i | 0.2016 + 0.2008i |

-continued

| 256-QAM | | | | |
|---|---|---|---|---|
| CR | 7/15 | 9/15 | 11/15 | 13/15 |
| | 1.2722 + 1.1406i | 1.2728 + 1.0661i | 1.2320 + 1.0203i | 0.4809 + 0.0710i |
| | 1.4536 + 0.8623i | 1.4509 + 0.7925i | 1.4100 + 0.7594i | 0.3406 + 0.0684i |
| | 1.0204 + 0.9076i | 1.0249 + 0.8794i | 1.0365 + 0.8610i | 0.4779 + 0.2121i |
| | 1.1634 + 0.7212i | 1.1758 + 0.6545i | 1.1885 + 0.6421i | 0.3377 + 0.2072i |
| | 0.9979 + 0.1554i | 0.9629 + 0.1113i | 0.9785 + 0.0944i | 0.0625 + 0.4797i |
| | 0.9681 + 0.2706i | 0.9225 + 0.2849i | 0.9430 + 0.2764i | 0.2019 + 0.4853i |
| | 1.0796 + 0.1672i | 1.1062 + 0.1118i | 1.1491 + 0.1124i | 0.0550 + 0.3344i |
| | 1.0514 + 0.3095i | 1.0674 + 0.3393i | 1.1051 + 0.3293i | 0.1977 + 0.3399i |
| | 0.7488 + 0.6179i | 0.7234 + 0.6223i | 0.7639 + 0.6120i | 0.4860 + 0.5021i |
| | 0.8017 + 0.5596i | 0.8211 + 0.4860i | 0.8708 + 0.4567i | 0.3403 + 0.4928i |
| | 0.8168 + 0.6803i | 0.8457 + 0.7260i | 0.8915 + 0.7259i | 0.4763 + 0.3547i |
| | 0.8882 + 0.5928i | 0.9640 + 0.5518i | 1.0199 + 0.5389i | 0.3343 + 0.3477i |

| 1K-QAM | | | | |
|---|---|---|---|---|
| CR | 7/15 | 9/15 | 11/15 | 13/15 |
| | 1 | 1 | 1 | 1 |
| | 1 | 1 | 1.275373378 | 2.968204 |
| | 1.04 | 2.753666008 | 3.224572114 | 4.986168 |
| | 1.04 | 2.75465415 | 3.680802355 | 6.996148 |
| | 3 | 4.81041502 | 5.509974926 | 9.073992 |
| | 3.04 | 4.814367589 | 6.346778589 | 11.17465 |
| | 3.28 | 6.79756917 | 8.066608525 | 13.35998 |
| | 3.32 | 6.812391304 | 9.353537556 | 15.60908 |
| | 5.24 | 9.044328063 | 11.04938406 | 17.97794 |
| | 5.32 | 9.195365613 | 12.69977107 | 20.46238 |
| | 6.04 | 11.42332016 | 14.55532541 | 23.10439 |
| | 6.28 | 12.08725296 | 16.56971547 | 25.93383 |
| | 8.24 | 14.46333992 | 18.82535703 | 28.98772 |
| | 8.84 | 16.26146245 | 21.36400305 | 32.30898 |
| | 11.04 | 19.19229249 | 24.2629456 | 36.0013 |
| | 13.68 | 22.97401186 | 27.70587594 | 40.26307 |

Annex to the Description—Annex 5

| 16-QAM |
|---|
| 0.4572 + 0.2733i |
| 0.2734 + 0.4564i |
| 2.1203 + 0.4980i |
| 0.4981 + 1.1203i |

| 64-QAM |
|---|
| 0.4578 + 1.5766i |
| 1.5773 + 0.4553i |
| 0.8529 + 1.1018i |
| 1.1053 + 0.8509i |
| 0.2292 + 0.9581i |
| 0.2130 + 0.7667i |
| 0.3215 + 0.8545i |
| 0.2799 + 0.7372i |
| 0.7652 + 0.2131i |
| 0.9533 + 0.2285i |
| 0.7372 + 0.2800i |
| 0.8536 + 0.3207i |
| 0.2747 + 0.2557i |
| 0.2550 + 0.2755i |
| 0.2986 + 0.2807i |
| 0.2799 + 0.3001i |

| 256-QAM | | | |
|---|---|---|---|
| 0.3404 + 1.7468i | 1.5037 + 0.2970i | 0.1595 + 0.3099i | 0.3316 + 0.1654i |
| 0.2903 + 1.4335i | 1.6873 + 0.3149i | 0.1602 + 0.3142i | 0.3322 + 0.1645i |
| 0.2801 + 1.4147i | 1.3485 + 0.2776i | 0.1585 + 0.3082i | 0.3271 + 0.1653i |
| 0.2701 + 1.3538i | 1.3647 + 0.2939i | 0.1591 + 0.3126i | 0.3276 + 0.1644i |
| 0.9768 + 1.4797i | 1.4559 + 0.9986i | 0.1749 + 0.3119i | 0.3287 + 0.1819i |
| 0.8148 + 1.2312i | 1.2596 + 0.8428i | 0.1750 + 0.3172i | 0.3293 + 0.1809i |
| 0.7869 + 1.2059i | 1.1841 + 0.7752i | 0.1731 + 6.3103i | 0.3247 + 0.1813i |
| 0.7600 + 1.1579i | 1.1524 + 0.7716i | 0.1733 + 0.3156i | 0.3250 + 0.1802i |
| 0.2381 + 1.0015i | 1.0186 + 0.2351i | 0.2110 + 0.6162i | 0.6287 + 0.2124i |
| 0.2418 + 1.0173i | 1.0086 + 0.2516i | 0.2066 + 0.6251i | 0.6265 + 0.2133i |
| 0.2432 + 1.0278i | 1.0382 + 0.2368i | 0.2081 + 0.6236i | 0.6345 + 0.2166i |
| 0.2384 + 1.0433i | 1.0293 + 0.2567i | 0.2122 + 0.6322i | 0.6324 + 0.2273i |
| 0.5401 + 0.8861i | 0.8800 + 0.5494i | 0.3104 + 0.5709i | 0.5748 + 0.3222i |
| 0.5514 + 0.8979i | 0.8878 + 0.5648i | 0.3143 + 0.5796i | 0.5755 + 0.3291i |
| 0.5594 + 0.9005i | 0.9020 + 0.5609i | 0.3128 + 0.5778i | 0.5841 + 0.3298i |
| 0.5663 + 0.9123i | 0.9102 + 0.5835i | 0.3169 + 0.5867i | 0.5849 + 0.3280i |

Annex to the Description—Annex 6

| 16-QAM | | | | |
|---|---|---|---|---|
| CR | 7/15 | 9/15 | 11/15 | 13/15 |
| | 0.502931 + 1.1949i | 0.4967 + 1.19319i | 0.934157 + 0.984668i | 0.951702 + 0.951102i |
| | 1.19618 + 0.504965i | 1.18958 + 0.489612i | 0.986649 + 0.29029i | 0.952402 + 0.306101i |
| | 0.263225 + 0.495916i | 0.245213 + 0.532579i | 0.271571 + 0.932473i | 0.306701 + 0.952402i |
| | 0.499326 + 0.262469i | 0.521031 + 0.243965i | 0.290092 + 0.269491i | 0.306101 + 0.306701i |

| 64-QAM | | | | | |
|---|---|---|---|---|---|
| CR | 5/15 | 7/15 | 9/15 | 11/15 | 13/15 |
| | 0.573871 + 0.976254i | 0.156665 + 0.312527i | 0.347178 + 0.600735i | 1.44428 + 0.26833i | 1.43034 + 0.232863i |
| | 0.782918 + 1.24775i | 0.173303 + 0.309119i | 0.155533 + 0.675551i | 0.747144 + 1.22429i | 0.629713 + 1.18181i |
| | 0.297932 + 1.09229i | 0.205578 + 0.650614i | 0.167734 + 0.285961i | 1.17488 + 0.773395i | 1.08029 + 0.915404i |
| | 0.330876 + 1.43264i | 0.336383 + 0.594283i | 0.135828 + 0.244457i | 0.713766 + 0.820077i | 0.686962 + 0.809461i |
| | 0.976152 + 0.571463i | 0.314733 + 0.156665i | 0.611635 + 0.40079i | 0.163802 + 1.07689i | 0.21138 + 1.43045i |
| | 1.2484 + 0.780259i | 0.311625 + 0.173003i | 0.724262 + 0.175237i | 0.292681 + 1.42171i | 0.202036 + 1.05749i |
| | 1.09086 + 0.297075i | 0.651216 + 0.205278i | 0.377081 + 0.19144i | 0.146222 + 0.745719i | 0.122108 + 0.66125i |
| | 1.43269 + 0.330462i | 0.596488 + 0.33528i | 0.388386 + 0.131329i | 0.413364 + 0.740848i | 0.373454 + 0.755743i |
| | 0.28977 + 0.524646i | 0.294285 + 1.48115i | 0.557425 + 0.890494i | 1.02034 + 0.151686i | 1.04444 + 0.168099i |
| | 0.228711 + 0.395542i | 0.840155 + 1.26023i | 0.203843 + 1.02603i | 0.665303 + 0.13565i | 0.72401 + 0.154845i |
| | 0.247472 + 0.532718i | 0.235648 + 1.02609i | 0.80838 + 1.25317i | 0.963923 + 0.446505i | 1.05528 + 0.524982i |
| | 0.210804 + 0.391137i | 0.563211 + 0.895685i | 0.283362 + 1.46452i | 0.674568 + 0.433914i | 0.71417 + 0.470959i |
| | 0.523642 + 0.289419i | 1.48646 + 0.293182i | 0.87389 + 0.607935i | 0.127098 + 0.142777i | 0.145506 + 0.127531i |
| | 0.394508 + 0.228938i | 1.26184 + 0.844566i | 1.04963 + 0.224547i | 0.378204 + 0.140639i | 0.432198 + 0.138878i |
| | 0.531678 + 0.24753i | 1.02709 + 0.234546i | 1.22957 + 0.849984i | 0.131136 + 0.428806i | 0.143195 + 0.385203i |
| | 0.390066 + 0.211214i | 0.897589 + 0.562409i | 1.46783 + 0.302865i | 0.391865 + 0.427618i | 0.421955 + 0.427778i |

| 256-QAM | | | | | |
|---|---|---|---|---|---|
| CR | 5/15 | 7/15 | 9/15 | 11/15 | 13/15 |
| | 0.345362 + 1.74068i | 0.125601 + 0.206801i | 0.0899 + 0.1337i | 0.0590584 + 0.303971i | 1.53147 + 0.281239i |
| | 0.284829 + 1.42158i | 0.125501 + 0.207701i | 0.091 + 0.1377i | 0.106744 + 0.338987i | 0.998182 + 1.26799i |
| | 0.289957 + 1.41901i | 0.126501 + 0.224001i | 0.0873 + 0.3862i | 0.0687352 + 0.493018i | 1.26233 + 0.982752i |
| | 0.273747 + 1.34924i | 0.126401 + 0.224701i | 0.0883 + 0.3873i | 0.149142 + 0.465384i | 1.01298 + 1.03167i |
| | 0.98746 + 1.47513i | 0.155701 + 0.232501i | 0.1115 + 0.1442i | 0.0886873 + 0.223564i | 0.555086 + 1.22323i |
| | 0.805644 + 1.20959i | 0.155501 + 0.232801i | 0.1135 + 0.1472i | 0.182762 + 0.269554i | 0.750023 + 1.30302i |
| | 0.802362 + 1.21052i | 0.159401 + 0.244601i | 0.2067 + 0.3591i | 0.335595 + 0.305276i | 0.608677 + 1.02272i |
| | 0.76327 + 1.15008i | 0.159001 + 0.244701i | 0.1975 + 0.3621i | 0.270152 + 0.388069i | 0.794765 + 1.05345i |
| | 0.241838 + 1.00583i | 0.138301 + 0.640202i | 0.1048 + 0.7533i | 0.0834998 + 0.78801i | 1.40357 + 0.521545i |
| | 0.242146 + 1.02675i | 0.141701 + 0.640202i | 0.177 + 0.7412i | 0.239426 + 0.75908i | 0.988995 + 0.653429i |
| | 0.242966 + 1.02634i | 0.134401 + 0.602702i | 0.1022 + 0.5904i | 0.0760177 + 0.641163i | 1.25198 + 0.735093i |
| | 0.243479 + 1.04727i | 0.136601 + 0.602302i | 0.1191 + 0.589i | 0.198723 + 0.615724i | 1.02273 + 0.82519i |
| | 0.54657 + 0.883419i | 0.333002 + 0.576902i | 0.4264 + 0.623i | 0.524542 + 0.612332i | 0.640295 + 0.658195i |
| | 0.560011 + 0.898605i | 0.322801 + 0.578702i | 0.365 + 0.6689i | 0.392658 + 0.698525i | 0.805991 + 0.665161i |
| | 0.559601 + 0.899015i | 0.309901 + 0.548302i | 0.3254 + 0.5153i | 0.428672 + 0.494215i | 0.637311 + 0.831949i |
| | 0.573247 + 0.914097i | 0.301701 + 0.549302i | 0.2959 + 0.5302i | 0.331804 + 0.563449i | 0.814845 + 0.846871i |
| | 1.74191 + 0.343827i | 0.416802 + 0.117301i | 0.3256 + 0.0768i | 0.0988629 + 0.0606546i | 0.0862288 + 1.191i |
| | 1.42127 + 0.286983i | 0.416802 + 0.118501i | 0.3266 + 0.087i | 0.262969 + 0.0643457i | 0.123334 + 1.42265i |
| | 1.41973 + 0.287906i | 0.420502 + 0.120001i | 0.4721 + 0.0994i | 0.493217 + 0.0751199i | 0.0754835 + 0.994373i |
| | 1.34944 + 0.274465i | 0.420202 + 0.121501i | 0.4721 + 0.1206i | 0.416102 + 0.0866921i | 0.2181 + 0.962947i |
| | 1.47934 + 0.985506i | 0.385202 + 0.179701i | 0.2927 + 0.1267i | 0.096768 + 0.0985636i | 0.448747 + 1.45498i |
| | 1.21226 + 0.80072i | 0.386002 + 0.180301i | 0.2947 + 0.1296i | 0.239925 + 0.145152i | 0.307432 + 1.27653i |
| | 1.21175 + 0.79877i | 0.386702 + 0.176001i | 0.3823 + 0.2592i | 0.420192 + 0.273145i | 0.445668 + 0.976557i |
| | 1.15214 + 0.759679i | 0.387902 + 0.176501i | 0.3944 + 0.2521i | 0.381385 + 0.213987i | 0.324435 + 1.08178i |
| | 1.00439 + 0.239375i | 0.736602 + 0.152801i | 0.7755 + 0.1118i | 0.808162 + 0.0772148i | 0.0654404 + 0.635422i |
| | 1.02501 + 0.240299i | 0.725502 + 0.188401i | 0.7513 + 0.2154i | 0.788509 + 0.223763i | 0.197117 + 0.63244i |
| | 1.02522 + 0.240812i | 0.721902 + 0.153501i | 0.6591 + 0.1033i | 0.639866 + 0.0777136i | 0.0669322 + 0.803706i |
| | 1.04604 + 0.241837i | 0.711702 + 0.185701i | 0.6446 + 0.1737i | 0.641961 + 0.178971i | 0.201791 + 0.79665i |
| | 0.884548 + 0.542364i | 0.582502 + 0.414902i | 0.5906 + 0.493i | 0.641661 + 0.500699i | 0.485539 + 0.644177i |
| | 0.899733 + 0.556215i | 0.601202 + 0.400102i | 0.6538 + 0.4155i | 0.72985 + 0.377395i | 0.338243 + 0.632243i |
| | 0.90042 + 0.555806i | 0.571502 + 0.398802i | 0.4981 + 0.3921i | 0.530927 + 0.379191i | 0.47569 + 0.808979i |
| | 0.914816 + 0.569041i | 0.588902 + 0.386402i | 0.5373 + 0.3586i | 0.594375 + 0.303073i | 0.336054 + 0.784812i |
| | 0.161704 + 0.325459i | 0.167101 + 1.70951i | 0.163 + 1.6621i | 0.154629 + 1.5857i | 1.12974 + 0.0851328i |
| | 0.162422 + 0.325459i | 0.442002 + 1.61371i | 0.472 + 1.5898i | 0.457004 + 1.52714i | 0.948718 + 0.0716106i |
| | 0.162422 + 0.325459i | 0.147701 + 1.33741i | 0.1268 + 1.3488i | 0.129889 + 1.32373i | 1.32367 + 0.111694i |

-continued

| 256-QAM | | | | | |
|---|---|---|---|---|---|
| CR | 5/15 | 7/15 | 9/15 | 11/15 | 13/15 |
| | 0.162114 + 0.325562i | 0.313501 + 1.30731i | 0.3752 + 1.2961i | 0.384279 + 1.27474i | 0.939265 + 0.20647i |
| | 0.179044 + 0.323715i | 1.0214 + 1.37841i | 1.0398 + 1.2991i | 1.00958 + 1.24481i | 0.619011 + 0.0700174i |
| | 0.178941 + 0.323818i | 0.743402 + 1.51691i | 0.7733 + 1.4772i | 0.746909 + 1.41381i | 0.773768 + 0.068623i |
| | 0.179146 + 0.32392i | 0.786903 + 1.10401i | 0.838 + 1.0552i | 0.849263 + 1.03961i | 0.621994 + 0.208061i |
| | 0.179146 + 0.324023i | 0.625202 + 1.20411i | 0.6242 + 1.2081i | 0.627096 + 1.18077i | 0.775655 + 0.208755i |
| | 0.211262 + 0.618803i | 0.152601 + 0.914003i | 0.1103 + 0.9397i | 0.0961694 + 0.948226i | 1.18136 + 0.488435i |
| | 0.211877 + 0.625677i | 0.191401 + 0.908703i | 0.2415 + 0.9155i | 0.282523 + 0.913609i | 0.982437 + 0.489123i |
| | 0.212185 + 0.625369i | 0.153901 + 1.0179i | 0.1118 + 1.1163i | 0.111134 + 1.11882i | 1.19926 + 0.30086i |
| | 0.212698 + 0.631936i | 0.209501 + 1.0084i | 0.3079 + 1.0866i | 0.327814 + 1.07672i | 0.990087 + 0.335264i |
| | 0.317764 + 0.573453i | 0.502102 + 0.797603i | 0.5647 + 0.7638i | 0.62121 + 0.741821i | 0.635917 + 0.498373i |
| | 0.321766 + 0.578685i | 0.453702 + 0.823803i | 0.4385 + 0.8433i | 0.461793 + 0.843078i | 0.801418 + 0.498567i |
| | 0.321458 + 0.578788i | 0.566302 + 0.880203i | 0.6846 + 0.8841i | 0.724563 + 0.878394i | 0.629056 + 0.351477i |
| | 0.325665 + 0.584226i | 0.502102 + 0.914603i | 0.5165 + 1.0034i | 0.536114 + 0.99671i | 0.789475 + 0.352868i |
| | 0.31879 + 0.162422i | 1.70301 + 0.191301i | 1.6489 + 0.163i | 1.60715 + 0.160914i | 0.0671331 + 0.0678293i |
| | 0.319508 + 0.162319i | 1.61161 + 0.545802i | 1.5848 + 0.4983i | 1.5432 + 0.473066i | 0.199009 + 0.0681277i |
| | 0.319508 + 0.162422i | 1.37881 + 0.164101i | 1.3437 + 0.1389i | 1.34887 + 0.13328i | 0.0672326 + 0.201298i |
| | 0.320124 + 0.162319i | 1.31211 + 0.432002i | 1.285 + 0.4025i | 1.29539 + 0.392758i | 0.200105 + 0.201992i |
| | 0.31838 + 0.178326i | 1.27221 + 1.14061i | 1.2728 + 1.0661i | 1.23903 + 1.02684i | 0.473208 + 0.0691223i |
| | 0.319611 + 0.178531i | 1.45361 + 0.862303i | 1.4509 + 0.7925i | 1.4186 + 0.765564i | 0.335661 + 0.0687244i |
| | 0.318893 + 0.179146i | 1.0204 + 0.907603i | 1.0249 + 0.8794i | 1.041 + 0.855947i | 0.475995 + 0.20647i |
| | 0.320021 + 0.179352i | 1.16341 + 0.721202i | 1.1758 + 0.6545i | 1.19064 + 0.638569i | 0.336857 + 0.203584i |
| | 0.61747 + 0.209928i | 0.997904 + 0.155401i | 0.9629 + 0.1113i | 0.974164 + 0.0931766i | 0.066236 + 0.480565i |
| | 0.623421 + 0.209825i | 0.968103 + 0.270601i | 0.9226 + 0.2849i | 0.940744 + 0.274741i | 0.198611 + 0.481065i |
| | 0.62301 + 0.210954i | 1.07961 + 0.167201i | 1.1062 + 0.1118i | 1.14635 + 0.111134i | 0.0673321 + 0.338445i |
| | 0.629064 + 0.211672i | 1.0514 + 0.309501i | 1.0674 + 0.3393i | 1.10146 + 0.32951i | 0.199606 + 0.340135i |
| | 0.572939 + 0.314583i | 0.748802 + 0.617902i | 0.7234 + 0.6223i | 0.760077 + 0.610536i | 0.482953 + 0.490814i |
| | 0.57807 + 0.318585i | 0.801703 + 0.559602i | 0.8211 + 0.486i | 0.867719 + 0.453612i | 0.338345 + 0.484547i |
| | 0.577865 + 0.31879i | 0.816803 + 0.680302i | 0.8457 + 0.726i | 0.887372 + 0.722168i | 0.478278 + 0.347598i |
| | 0.583097 + 0.322587i | 0.888203 + 0.592802i | 0.964 + 0.5518i | 1.01447 + 0.536613i | 0.33745 + 0.343022i |

| 1K-QAM (1 dimension) | | | | |
|---|---|---|---|---|
| CR | 7/15 | 9/15 | 11/15 | 13/25 |
| | 1 | 1 | 1 | 1 |
| | 0.996303 | 1.001095 | 1.277648 | 2.975413 |
| | 1.192785 | 2.736403 | 3.227798 | 4.997551 |
| | 1.19627 | 2.735308 | 3.684484 | 7.018692 |
| | 3.018669 | 4.797331 | 5.515485 | 9.102872 |
| | 3.030356 | 4.791158 | 6.353133 | 11.22209 |
| | 3.638079 | 6.763776 | 8.075686 | 13.42392 |
| | 3.6181 | 6.779309 | 9.357898 | 15.69921 |
| | 5.52437 | 9.000886 | 11.06547 | 18.09371 |
| | 5.495488 | 9.15358 | 12.70751 | 20.61366 |
| | 6.718191 | 11.36483 | 14.57187 | 23.2898 |
| | 6.939145 | 12.03206 | 16.58128 | 26.15568 |
| | 8.762114 | 14.39301 | 18.84024 | 29.23992 |
| | 9.659293 | 16.1857 | 21.38238 | 32.59361 |
| | 11.71951 | 19.10136 | 24.28619 | 36.30895 |
| | 14.37307 | 22.86637 | 27.73764 | 40.58404 |

| 1K-QAM (2 dimensions) | | | | |
|---|---|---|---|---|
| CR | 7/15 | 9/15 | 11/15 | 13/25 |
| | 0.0864771 + 0.326343i | 0.0708458 + 0.352673i | 1.28964 + 1.3499i | 1.10204 + 1.34377i |
| | 0.0817703 + 0.316929i | 0.0702347 + 0.353312i | 1.0852 + 1.4264i | 0.953265 + 1.36811i |
| | 0.0860157 + 0.324497i | 0.055736 + 0.313019i | 1.38793 + 1.14273i | 1.32268 + 1.08078i |
| | 0.0818626 + 0.313514i | 0.0555415 + 0.314482i | 1.1867 + 1.15858i | 1.16547 + 1.17585i |
| | 0.0891536 + 0.324958i | 0.0876221 + 0.3471i | 0.85008 + 1.50845i | 1.44144 + 0.791386i |
| | 0.084539 + 0.315452i | 0.0870018 + 0.347285i | 0.924481 + 1.34505i | 1.18916 + 0.92377i |
| | 0.0888767 + 0.323943i | 0.0618836 + 0.308946i | 0.922074 + 1.14368i | 1.34929 + 0.926486i |
| | 0.084539 + 0.31333i | 0.0617632 + 0.309446i | 1.03638 + 1.20849i | 1.16871 + 1.042i |
| | 0.108443 + 0.453797i | 0.072966 + 0.489402i | 1.55964 + 0.936532i | 0.698262 + 1.49043i |
| | 0.107612 + 0.454259i | 0.0733363 + 0.48719i | 1.15843 + 0.883156i | 0.815517 + 1.38465i |
| | 0.108812 + 0.454259i | 0.0728456 + 0.498679i | 1.36812 + 0.948148i | 0.881913 + 1.207i |
| | 0.10835 + 0.453705i | 0.0731604 + 0.497633i | 1.20577 + 0.99593i | 1.01215 + 1.19792i |
| | 0.125978 + 0.450383i | 0.139618 + 0.46708i | 0.927125 + 0.889345i | 0.948106 + 0.963032i |
| | 0.126255 + 0.44946i | 0.139386 + 0.465516i | 1.03703 + 0.890237i | 1.05822 + 0.953297i |
| | 0.127455 + 0.449275i | 0.144247 + 0.480051i | 0.934948 + 1.00974i | 0.928638 + 1.07931i |
| | 0.125516 + 0.450567i | 0.143321 + 0.479403i | 1.05218 + 1.02084i | 1.04427 + 1.07315i |
| | 0.139545 + 0.28112i | 0.164801 + 0.268579i | 1.65526 + 0.69515i | 1.54365 + 0.450488i |

-continued

| | | | |
|---|---|---|---|
| 0.127178 + 0.273275i | 0.165078 + 0.268588i | 1.1458 + 0.493874i | 1.15184 + 0.570867i |
| 0.137791 + 0.279736i | 0.0906126 + 0.239248i | 1.35064 + 0.612977i | 1.35351 + 0.622783i |
| 0.126255 + 0.272168i | 0.0897145 + 0.23797i | 1.22547 + 0.555441i | 1.23458 + 0.628624i |
| 0.143236 + 0.279182i | 0.162208 + 0.274902i | 0.900337 + 0.501451i | 1.30451 + 0.770483i |
| 0.130316 + 0.274013i | 0.162671 + 0.275726i | 1.03683 + 0.492339i | 1.18494 + 0.809095i |
| 0.143698 + 0.27669i | 0.0925939 + 0.240813i | 0.915093 + 0.570741i | 1.48881 + 0.621034i |
| 0.129762 + 0.26903i | 0.0924735 + 0.240887i | 1.02158 + 0.563363i | 1.16028 + 0.705397i |
| 0.263861 + 0.36732i | 0.28043 + 0.349146i | 1.2885 + 0.778795i | 0.941292 + 0.585793i |
| 0.265707 + 0.366766i | 0.279744 + 0.349137i | 1.16274 + 0.760772i | 1.05043 + 0.576708i |
| 0.264692 + 0.367412i | 0.310862 + 0.371774i | 1.42224 + 0.752731i | 0.943888 + 0.670156i |
| 0.26543 + 0.368243i | 0.310714 + 0.372857i | 1.16818 + 0.658356i | 1.04167 + 0.66172i |
| 0.250664 + 0.378211i | 0.244053 + 0.386708i | 0.923362 + 0.772457i | 0.952 + 0.860362i |
| 0.254448 + 0.380149i | 0.246831 + 0.385985i | 1.03212 + 0.763198i | 1.06439 + 0.848032i |
| 0.256201 + 0.378303i | 0.261042 + 0.414687i | 0.921133 + 0.672022i | 0.948755 + 0.761855i |
| 0.254355 + 0.380056i | 0.261459 + 0.414501i | 1.03311 + 0.66311i | 1.05595 + 0.750823i |
| 0.0932144 + 0.763343i | 0.0740677 + 0.780322i | 0.635585 + 1.44908i | 0.434913 + 1.51347i |
| 0.0953371 + 0.761682i | 0.075188 + 0.777748i | 0.657985 + 1.31202i | 0.456653 + 1.3707i |
| 0.0943219 + 0.763251i | 0.0901311 + 0.778896i | 0.547994 + 1.17353i | 0.552048 + 1.1447i |
| 0.0907671 + 0.762236i | 0.09027 + 0.775943i | 0.623919 + 1.1667i | 0.540367 + 1.256i |
| 0.228975 + 0.731041i | 0.248756 + 0.742047i | 0.692046 + 1.63302i | 0.578979 + 0.941292i |
| 0.228975 + 0.732795i | 0.250275 + 0.739399i | 0.77318 + 1.30054i | 0.662044 + 0.948755i |
| 0.229344 + 0.729841i | 0.228777 + 0.749843i | 0.815039 + 1.1263i | 0.559186 + 1.0407i |
| 0.227406 + 0.734364i | 0.22998 + 0.746417i | 0.723666 + 1.15274i | 0.643874 + 1.04979i |
| 0.0941373 + 0.640965i | 0.0749102 + 0.639751i | 0.542498 + 0.908606i | 0.67671 + 1.33177i |
| 0.0951525 + 0.64198i | 0.0738177 + 0.63988i | 0.624216 + 0.903506i | 0.570092 + 1.40834i |
| 0.0969061 + 0.640872i | 0.0769563 + 0.63764i | 0.54334 + 1.02331i | 0.767238 + 1.21901i |
| 0.0997671 + 0.644564i | 0.07716 + 0.639214i | 0.616789 + 1.02197i | 0.661593 + 1.19208i |
| 0.183014 + 0.625367i | 0.197668 + 0.612827i | 0.814495 + 0.890187i | 0.841218 + 0.971143i |
| 0.181261 + 0.625552i | 0.198307 + 0.613845i | 0.713416 + 0.899694i | 0.749201 + 0.962383i |
| 0.182368 + 0.626475i | 0.193863 + 0.610679i | 0.813158 + 1.00504i | 0.819478 + 1.08094i |
| 0.183568 + 0.626936i | 0.194057 + 0.611429i | 0.712822 + 1.01717i | 0.724541 + 1.08418i |
| 0.493298 + 0.568516i | 0.514224 + 0.569396i | 0.542646 + 0.537943i | 0.596176 + 0.588065i |
| 0.494129 + 0.570085i | 0.51366 + 0.568007i | 0.611838 + 0.534774i | 0.675997 + 0.59066i |
| 0.493852 + 0.567039i | 0.508104 + 0.581339i | 0.542498 + 0.618324i | 0.597474 + 0.669832i |
| 0.493667 + 0.569715i | 0.507179 + 0.580876i | 0.61877 + 0.6106i | 0.676321 + 0.672752i |
| 0.40396 + 0.63515i | 0.384393 + 0.675766i | 0.798353 + 0.513384i | 0.589362 + 0.843814i |
| 0.40396 + 0.634043i | 0.382736 + 0.674859i | 0.709455 + 0.519375i | 0.671778 + 0.850952i |
| 0.40276 + 0.635058i | 0.401058 + 0.666211i | 0.803156 + 0.591091i | 0.593581 + 0.753744i |
| 0.403591 + 0.634966i | 0.400142 + 0.665156i | 0.711881 + 0.599756i | 0.674374 + 0.75926i |
| 0.399715 + 0.491637i | 0.417649 + 0.47408i | 0.544181 + 0.798056i | 0.847383 + 0.591958i |
| 0.399991 + 0.492283i | 0.41802 + 0.474413i | 0.624216 + 0.795135i | 0.75926 + 0.592607i |
| 0.400084 + 0.492467i | 0.406437 + 0.466997i | 0.543142 + 0.709207i | 0.850628 + 0.675997i |
| 0.400545 + 0.491914i | 0.406419 + 0.46758i | 0.62075 + 0.700988i | 0.760233 + 0.677943i |
| 0.353661 + 0.535291i | 0.326278 + 0.549027i | 0.815138 + 0.783697i | 0.850952 + 0.86458i |
| 0.353384 + 0.534922i | 0.325268 + 0.549508i | 0.715545 + 0.786866i | 0.757962 + 0.862309i |
| 0.352184 + 0.536121i | 0.326444 + 0.539565i | 0.810088 + 0.684946i | 0.853548 + 0.766398i |
| 0.35403 + 0.53566i | 0.325815 + 0.538639i | 0.716387 + 0.69371i | 0.762829 + 0.766722i |
| 0.173416 + 0.0839853i | 0.223666 + 0.0625594i | 0.097345 + 1.67957i | 0.0655435 + 1.44533i |
| 0.121363 + 0.0855542i | 0.224166 + 0.0626798i | 0.0688431 + 1.50458i | 0.0436549 + 1.20847i |
| 0.174062 + 0.0814011i | 0.0837984 + 0.0624854i | 0.0573375 + 1.23384i | 0.0369899 + 1.08857i |
| 0.118502 + 0.0837084i | 0.0847983 + 0.0630316i | 0.0611189 + 1.35198i | 0.105954 + 1.12945i |
| 0.180061 + 0.0820471i | 0.225536 + 0.0642537i | 0.279746 + 1.76087i | 0.0347186 + 0.913387i |
| 0.126624 + 0.0853696i | 0.225064 + 0.0640593i | 0.196352 + 1.4723i | 0.103358 + 0.908196i |
| 0.177753 + 0.0842621i | 0.0850853 + 0.0635131i | 0.183242 + 1.23221i | 0.0405591 + 1.00176i |
| 0.119517 + 0.0826932i | 0.0862796 + 0.0634205i | 0.17521 + 1.33648i | 0.115688 + 1.01474i |
| 0.381995 + 0.0885998i | 0.371663 + 0.068133i | 0.0562977 + 0.902417i | 0.166088 + 1.35675i |
| 0.392977 + 0.0885998i | 0.37107 + 0.0670683i | 0.0514636 + 0.954011i | 0.0628682 + 1.30516i |
| 0.382364 + 0.0876769i | 0.44274 + 0.0679479i | 0.053822 + 1.13096i | 0.223195 + 1.15638i |
| 0.399161 + 0.0862003i | 0.443767 + 0.067022i | 0.0537413 + 1.04465i | 0.158263 + 1.22582i |
| 0.381256 + 0.0908148i | 0.368691 + 0.0835206i | 0.165071 + 0.906477i | 0.230009 + 0.895541i |
| 0.392147 + 0.0914609i | 0.367839 + 0.0826596i | 0.155107 + 0.952476i | 0.171567 + 0.913387i |
| 0.383287 + 0.0917378i | 0.43811 + 0.0938804i | 0.165318 + 1.12105i | 0.22579 + 1.06244i |
| 0.394546 + 0.0899842i | 0.439083 + 0.0988341i | 0.150205 + 1.03911i | 0.182274 + 0.999817i |
| 0.180614 + 0.120071i | 0.208149 + 0.146274i | 0.05402 + 0.546707i | 0.0324473 + 0.576708i |
| 0.14259 + 0.109827i | 0.208149 + 0.145525i | 0.061416 + 0.544825i | 0.0962195 + 0.57541i |
| 0.179784 + 0.119241i | 0.0893257 + 0.116647i | 0.0532773 + 0.61773i | 0.0330962 + 0.654581i |
| 0.139545 + 0.108627i | 0.0901774 + 0.11462i | 0.0617626 + 0.615353i | 0.0971929 + 0.651012i |
| 0.182829 + 0.120717i | 0.211195 + 0.146089i | 0.180321 + 0.545716i | 0.0327717 + 0.817856i |
| 0.142775 + 0.109181i | 0.208964 + 0.145913i | 0.159266 + 0.545419i | 0.0997886 + 0.819478i |
| 0.179692 + 0.11961i | 0.0895293 + 0.116934i | 0.176905 + 0.621394i | 0.0337452 + 0.733626i |
| 0.140745 + 0.107981i | 0.0921032 + 0.117582i | 0.156196 + 0.619859i | 0.0968684 + 0.732653i |
| 0.351908 + 0.198334i | 0.335434 + 0.223009i | 0.060754 + 0.815534i | 0.231631 + 0.574761i |
| 0.356891 + 0.207564i | 0.336915 + 0.224879i | 0.0538898 + 0.795877i | 0.164104 + 0.574437i |
| 0.352461 + 0.203872i | 0.384235 + 0.257293i | 0.0525346 + 0.708019i | 0.230333 + 0.651012i |
| 0.359106 + 0.213009i | 0.383791 + 0.259052i | 0.0542364 + 0.71203i | 0.162806 + 0.650688i |
| 0.350985 + 0.192705i | 0.34347 + 0.195567i | 0.168636 + 0.81192i | 0.229684 + 0.811367i |
| 0.357352 + 0.201842i | 0.342285 + 0.195909i | 0.154315 + 0.791718i | 0.164753 + 0.812665i |
| 0.351446 + 0.194274i | 0.404687 + 0.220814i | 0.183787 + 0.711089i | 0.230009 + 0.729733i |
| 0.350752 + 0.204518i | 0.405336 + 0.219981i | 0.159662 + 0.709455i | 0.164104 + 0.729408i |

-continued

| | | | |
|---|---|---|---|
| 0.7483 + 0.0950603i | 0.759842 + 0.0706421i | 0.487841 + 1.38753i | 0.281292 + 1.58421i |
| 0.747377 + 0.0923838i | 0.751695 + 0.0695311i | 0.471455 + 1.57504i | 0.091304 + 1.6014i |
| 0.749315 + 0.0941373i | 0.777526 + 0.0731326i | 0.45937 + 1.23691i | 0.460401 + 1.13529i |
| 0.743576 + 0.0932144i | 0.768638 + 0.0731604i | 0.410553 + 1.15591i | 0.417723 + 1.23458i |
| 0.732979 + 0.17277i | 0.733733 + 0.196835i | 0.357789 + 1.30531i | 0.499986 + 0.931233i |
| 0.732702 + 0.172677i | 0.728363 + 0.194983i | 0.316979 + 1.13835i | 0.426484 + 0.918579i |
| 0.735286 + 0.1772i | 0.74614 + 0.19915i | 0.316098 + 1.27444i | 0.474678 + 1.03551i |
| 0.733625 + 0.170399i | 0.739381 + 0.197502i | 0.325298 + 1.18249i | 0.402797 + 1.00825i |
| 0.587343 + 0.0996748i | 0.616891 + 0.0655684i | 0.452488 + 0.913706i | 0.230793 + 1.46091i |
| 0.58882 + 0.0991211i | 0.623919 + 0.0642445i | 0.386093 + 0.919054i | 0.318051 + 1.37135i |
| 0.587897 + 0.100136i | 0.575969 + 0.0633279i | 0.457093 + 1.02262i | 0.279789 + 1.24854i |
| 0.589189 + 0.099398i | 0.57458 + 0.0615688i | 0.39862 + 1.04564i | 0.341738 + 1.16579i |
| 0.58559 + 0.123578i | 0.603189 + 0.153598i | 0.258909 + 0.914845i | 0.293741 + 0.914361i |
| 0.586605 + 0.122471i | 0.604207 + 0.153135i | 0.29653 + 0.93475i | 0.35861 + 0.903004i |
| 0.585632 + 0.123117i | 0.569951 + 0.142303i | 0.258562 + 1.07733i | 0.292767 + 1.00241i |
| 0.585774 + 0.123578i | 0.57034 + 0.142784i | 0.297372 + 1.0445i | 0.341738 + 1.07153i |
| 0.520199 + 0.407928i | 0.611151 + 0.455322i | 0.454716 + 0.54428i | 0.517832 + 0.586767i |
| 0.618907 + 0.408482i | 0.605041 + 0.453776i | 0.398026 + 0.546063i | 0.444005 + 0.582548i |
| 0.619737 + 0.410697i | 0.618095 + 0.451628i | 0.455904 + 0.620404i | 0.518481 + 0.665289i |
| 0.61983 + 0.408851i | 0.612253 + 0.451082i | 0.397531 + 0.620008i | 0.444654 + 0.659773i |
| 0.661546 + 0.345447i | 0.68308 + 0.333194i | 0.273416 + 0.549628i | 0.510694 + 0.838298i |
| 0.66293 + 0.343417i | 0.676312 + 0.328324i | 0.310344 + 0.546558i | 0.437516 + 0.824994i |
| 0.665791 + 0.342955i | 0.686163 + 0.339212i | 0.274555 + 0.61976i | 0.51621 + 0.746605i |
| 0.664499 + 0.343601i | 0.68121 + 0.337212i | 0.30975 + 0.621642i | 0.443356 + 0.741738i |
| 0.518863 + 0.320898i | 0.506521 + 0.367283i | 0.452438 + 0.808503i | 0.301204 + 0.57833i |
| 0.520155 + 0.320252i | 0.50641 + 0.367376i | 0.39045 + 0.806077i | 0.371914 + 0.580602i |
| 0.518363 + 0.322005i | 0.492087 + 0.349248i | 0.454815 + 0.71198i | 0.301204 + 0.65231i |
| 0.519324 + 0.321174i | 0.493097 + 0.350701i | 0.394015 + 0.715397i | 0.371589 + 0.656528i |
| 0.533993 + 0.287488i | 0.555137 + 0.279152i | 0.26589 + 0.814693i | 0.297635 + 0.812665i |
| 0.533537 + 0.288411i | 0.559952 + 0.278402i | 0.305492 + 0.803651i | 0.365749 + 0.815909i |
| 0.53326 + 0.287673i | 0.53051 + 0.269051i | 0.268514 + 0.712327i | 0.300555 + 0.729084i |
| 0.533722 + 0.287949i | 0.532547 + 0.269421i | 0.309354 + 0.713466i | 0.370291 + 0.733951i |
| 0.142221 + 1.91348i | 0.130841 + 1.864i | 1.70571 + 0.0911062i | 1.39277 + 0.0616498i |
| 0.348677 + 1.81694i | 0.0939179 + 1.61925i | 1.2482 + 0.0627346i | 1.27806 + 0.0502933i |
| 0.111549 + 1.61805i | 0.360747 + 1.78754i | 1.52137 + 0.0759237i | 1.53261 + 0.0735064i |
| 0.264507 + 1.58852i | 0.276458 + 1.57875i | 1.3705 + 0.0690412i | 1.23426 + 0.134183i |
| 0.671052 + 1.59415i | 0.690635 + 1.56504i | 0.886523 + 0.0563472i | 1.40153 + 0.17712i |
| 0.633397 + 1.81759i | 0.586514 + 1.42598i | 1.12605 + 0.0519405i | 1.12913 + 0.228711i |
| 0.573776 + 1.45691i | 0.600698 + 1.75253i | 0.9398 + 0.0523054i | 1.53229 + 0.225105i |
| 0.460996 + 1.50195i | 0.440064 + 1.5122i | 1.03614 + 0.0484929i | 1.13659 + 0.153396i |
| 0.115549 + 1.30592i | 0.0705958 + 1.29738i | 1.70898 + 0.265188i | 0.897164 + 0.0343941i |
| 0.17923 + 1.29559i | 0.0787155 + 1.43063i | 1.23265 + 0.175172i | 1.16335 + 0.0369899i |
| 0.11195 + 1.38354i | 0.19702 + 1.27917i | 1.51914 + 0.219178i | 0.972117 + 0.0465751i |
| 0.192059 + 1.37237i | 0.224657 + 1.40256i | 1.36184 + 0.194718i | 1.06406 + 0.0462507i |
| 0.433585 + 1.2081i | 0.447175 + 1.18851i | 0.88781 + 0.151157i | 0.938372 + 0.205673i |
| 0.383194 + 1.23089i | 0.499346 + 1.28203i | 1.12041 + 0.155514i | 1.03129 + 0.214758i |
| 0.468841 + 1.27132i | 0.335018 + 1.23979i | 0.938117 + 0.149264i | 0.941616 + 0.129061i |
| 0.407375 + 1.29808i | 0.373219 + 1.34747i | 1.03178 + 0.152928i | 1.04297 + 0.131332i |
| 1.11774 + 1.32115i | 1.07953 + 1.3346i | 1.54633 + 0.553891i | 1.38303 + 0.474353i |
| 1.30353 + 1.49826i | 1.01889 + 1.14064i | 1.17744 + 0.399062i | 1.25081 + 0.494795i |
| 1.00328 + 1.1781i | 1.21524 + 1.52536i | 1.4108 + 0.487349i | 1.42619 + 0.34861i |
| 0.95171 + 1.15152i | 0.907996 + 1.15841i | 1.28845 + 0.435409i | 1.15509 + 0.44725i |
| 0.884153 + 1.49078i | 0.874749 + 1.46598i | 0.898753 + 0.405846i | 1.31976 + 0.252208i |
| 1.01724 + 1.73748i | 0.735585 + 1.32452i | 1.05515 + 0.389852i | 1.21349 + 0.268108i |
| 0.779494 + 1.33601i | 0.951474 + 1.70783i | 0.91232 + 0.363168i | 1.30159 + 0.359584i |
| 0.793984 + 1.26135i | 0.802866 + 1.23315i | 1.00851 + 0.363762i | 1.18332 + 0.357961i |
| 0.84779 + 0.927622i | 0.867685 + 0.889007i | 1.63456 + 0.422157i | 0.937723 + 0.505827i |
| 0.822317 + 0.951064i | 0.931327 + 0.968778i | 1.20611 + 0.289112i | 1.0381 + 0.496417i |
| 0.89652 + 0.981705i | 0.78446 + 0.954372i | 1.46874 + 0.352233i | 0.939021 + 0.427133i |
| 0.863295 + 1.00312i | 0.835984 + 1.02948i | 1.33049 + 0.312969i | 1.03681 + 0.418047i |
| 0.614846 + 1.09725i | 0.368322 + 1.11115i | 0.88786 + 0.252719i | 0.930909 + 0.283033i |
| 0.653516 + 1.07058i | 0.619002 + 1.19276i | 1.10204 + 0.271139i | 1.02026 + 0.296337i |
| 0.651578 + 1.15318i | 0.664952 + 1.04223i | 0.921629 + 0.265881i | 0.925393 + 0.357313i |
| 0.682773 + 1.12651i | 0.716753 + 1.11577i | 1.02257 + 0.259741i | 1.08061 + 0.348227i |
| 0.106043 + 0.947926i | 0.0701699 + 0.926143i | 0.519523 + 0.04689i | 0.580277 + 0.035043i |
| 0.113703 + 0.945526i | 0.0686793 + 0.949992i | 0.593963 + 0.0513463i | 0.653284 + 0.0347186i |
| 0.103828 + 0.945434i | 0.12148 + 0.919838i | 0.519276 + 0.0577024i | 0.578979 + 0.0981663i |
| 0.110842 + 0.943404i | 0.127859 + 0.944548i | 0.593715 + 0.059782i | 0.656853 + 0.0994642i |
| 0.289703 + 0.899288i | 0.306548 + 0.872703i | 0.800086 + 0.0512968i | 0.583846 + 0.230982i |
| 0.281858 + 0.90418i | 0.316639 + 0.887896i | 0.682618 + 0.0501084i | 0.664965 + 0.230333i |
| 0.287949 + 0.898089i | 0.254978 + 0.89084i | 0.775824 + 0.0515131i | 0.583197 + 0.154753i |
| 0.279828 + 0.902057i | 0.258293 + 0.910274i | 0.688808 + 0.0549791i | 0.658151 + 0.164428i |
| 0.107704 + 1.11193i | 0.0680497 + 1.15148i | 0.52393 + 0.178093i | 0.818505 + 0.0343941i |
| 0.142129 + 1.11128i | 0.0689756 + 1.0825i | 0.594211 + 0.172102i | 0.732653 + 0.0330962i |
| 0.100321 + 1.09365i | 0.169041 + 1.14112i | 0.521801 + 0.155552i | 0.817856 + 0.0968684i |
| 0.134746 + 1.08941i | 0.153598 + 1.07435i | 0.593616 + 0.153968i | 0.739467 + 0.0981663i |
| 0.343232 + 1.03791i | 0.388244 + 1.06024i | 0.793798 + 0.161605i | 0.838947 + 0.216705i |
| 0.329112 + 1.04326i | 0.366589 + 1.01065i | 0.684302 + 0.167546i | 0.749525 + 0.224493i |
| 0.34517 + 1.02314i | 0.297697 + 1.10213i | 0.777606 + 0.152928i | 0.845761 + 0.152098i |

-continued

| | | | |
|---|---|---|---|
| 0.32662 + 1.02868i | 0.281467 + 1.0411i | 0.688114 + 0.154265i | 0.740765 + 0.161508i |
| 0.616323 + 0.696709i | 0.628465 + 0.662813i | 0.536705 + 0.449765i | 0.595203 + 0.51037i |
| 0.614335 + 0.698462i | 0.637075 + 0.674933i | 0.608322 + 0.44417i | 0.673725 + 0.511992i |
| 0.615677 + 0.69597i | 0.595967 + 0.696977i | 0.534724 + 0.391936i | 0.593581 + 0.438814i |
| 0.612539 + 0.699108i | 0.604291 + 0.7078i | 0.602777 + 0.38639i | 0.671454 + 0.437516i |
| 0.481485 + 0.802105i | 0.436722 + 0.812856i | 0.799244 + 0.412084i | 0.587416 + 0.299581i |
| 0.486192 + 0.799521i | 0.441258 + 0.826133i | 0.701236 + 0.433128i | 0.667885 + 0.295688i |
| 0.48047 + 0.799521i | 0.487551 + 0.783359i | 0.785875 + 0.372526i | 0.591309 + 0.366073i |
| 0.482039 + 0.798414i | 0.492828 + 0.793543i | 0.697027 + 0.381092i | 0.670805 + 0.366722i |
| 0.714521 + 0.802844i | 0.772341 + 0.793358i | 0.327594 + 0.267475i | 0.846085 + 0.509072i |
| 0.708891 + 0.807828i | 0.736909 + 0.761416i | 0.397231 + 0.266831i | 0.758611 + 0.512641i |
| 0.707045 + 0.794999i | 0.706134 + 0.847427i | 0.53106 + 0.308611i | 0.843489 + 0.433298i |
| 0.703354 + 0.799244i | 0.677812 + 0.312912i | 0.596142 + 0.303264i | 0.756988 + 0.436867i |
| 0.34129 + 0.931314i | 0.310484 + 0.989822i | 0.790084 + 0.25881i | 0.838298 + 0.286278i |
| 0.34978 + 0.925776i | 0.492365 + 0.94752i | 0.687124 + 0.263761i | 0.750823 + 0.293741i |
| 0.537229 + 0.92273i | 0.59781 + 0.934929i | 0.780429 + 0.282914i | 0.838622 + 0.359259i |
| 0.545074 + 0.91867i | 0.568396 + 0.89696i | 0.692125 + 0.290836i | 0.754068 + 0.363478i |
| 1.59304 + 0.098475i | 1.71824 + 0.0896127i | 0.0520395 + 0.0443153i | 0.0324473 + 0.0334207i |
| 1.75483 + 0.133361i | 1.53822 + 0.08203i | 0.0609704 + 0.0442657i | 0.0965439 + 0.0324473i |
| 1.54911 + 0.231744i | 1.92706 + 0.168328i | 0.0457512 + 0.0747848i | 0.0321228 + 0.0971929i |
| 1.58538 + 0.280382i | 1.53087 + 0.228804i | 0.0625548 + 0.0746363i | 0.0962195 + 0.0965439i |
| 1.8581 + 0.586882i | 1.76958 + 0.601819i | 0.174429 + 0.0446123i | 0.0321228 + 0.230982i |
| 1.9899 + 0.275398i | 1.53129 + 0.540204i | 0.156147 + 0.0467415i | 0.0968684 + 0.228386i |
| 1.56748 + 0.320986i | 1.77912 + 0.379801i | 0.179529 + 0.0749829i | 0.0324473 + 0.163779i |
| 1.511 + 0.458873i | 1.54976 + 0.378569i | 0.155751 + 0.0781023i | 0.095895 + 0.164104i |
| 1.34995 + 0.0970907i | 1.27422 + 0.0741788i | 0.0478308 + 0.19369i | 0.22936 + 0.0334207i |
| 1.31645 + 0.108535i | 1.3748 + 0.076836i | 0.0652684 + 0.192105i | 0.163779 + 0.0334207i |
| 1.36065 + 0.185414i | 1.2636 + 0.18953i | 0.0457017 + 0.16293i | 0.231307 + 0.0975173i |
| 1.33398 + 0.193535i | 1.36635 + 0.206741i | 0.0618616 + 0.164019i | 0.162481 + 0.0975173i |
| 1.2284 + 0.391039i | 1.21464 + 0.424028i | 0.177548 + 0.191808i | 0.230658 + 0.227088i |
| 1.2344 + 0.381533i | 1.3413 + 0.475922i | 0.156246 + 0.190669i | 0.165402 + 0.228062i |
| 1.30177 + 0.406175i | 1.23808 + 0.333582i | 0.176063 + 0.161692i | 0.230009 + 0.164104i |
| 1.31949 + 0.40193i | 1.35982 + 0.357108i | 0.157087 + 0.160652i | 0.163779 + 0.162157i |
| 1.27815 + 1.13316i | 1.25502 + 1.20424i | 0.0473356 + 0.455261i | 0.0321228 + 0.501284i |
| 1.4319 + 1.19019i | 1.15464 + 1.04712i | 0.0662684 + 0.456202i | 0.0971929 + 0.50096i |
| 1.2093 + 0.99721i | 1.45737 + 1.27373i | 0.0447609 + 0.403571i | 0.0334207 + 0.430053i |
| 1.26449 + 0.923377i | 1.2591 + 0.943382i | 0.0663179 + 0.405849i | 0.0968684 + 0.431675i |
| 1.69687 + 0.8333i | 1.67727 + 0.824855i | 0.182797 + 0.457538i | 0.0330962 + 0.296012i |
| 1.67666 + 1.08258i | 1.4694 + 0.701143i | 0.158424 + 0.456845i | 0.0984908 + 0.295688i |
| 1.4631 + 0.738517i | 1.54032 + 1.02307i | 0.180172 + 0.40065i | 0.0334207 + 0.364451i |
| 1.38594 + 0.769065i | 1.37922 + 0.841789i | 0.156345 + 0.401442i | 0.0991397 + 0.362504i |
| 1.0057 + 0.783647i | 0.974342 + 0.7957i | 0.0472861 + 0.280893i | 0.231307 + 0.502907i |
| 1.02324 + 0.765097i | 1.04673 + 0.895405i | 0.0694868 + 0.279903i | 0.165077 + 0.501933i |
| 1.06098 + 0.83533i | 1.03891 + 0.732641i | 0.0458007 + 0.317722i | 0.23228 + 0.433298i |
| 1.08498 + 0.815765i | 1.13471 + 0.817032i | 0.0695363 + 0.316633i | 0.165726 + 0.432i |
| 1.14257 + 0.586143i | 1.16159 + 0.55024i | 0.179826 + 0.280447i | 0.230333 + 0.296012i |
| 1.14211 + 0.596295i | 1.29405 + 0.610235i | 0.15476 + 0.280497i | 0.165402 + 0.295363i |
| 1.21659 + 0.619368i | 1.12149 + 0.623196i | 0.183094 + 0.31896i | 0.23228 + 0.362504i |
| 1.21779 + 0.639949i | 1.22932 + 0.7083i | 0.155255 + 0.319901i | 0.164753 + 0.36218i |
| 0.939804 + 0.100967i | 0.922124 + 0.0732344i | 0.432534 + 0.0482764i | 0.504205 + 0.0337452i |
| 0.939066 + 0.101613i | 0.944835 + 0.0777526i | 0.380745 + 0.0506531i | 0.433622 + 0.0343941i |
| 0.938974 + 0.102444i | 0.913523 + 0.0940567i | 0.433128 + 0.0579995i | 0.505178 + 0.0981663i |
| 0.936574 + 0.101982i | 0.935383 + 0.101788i | 0.381686 + 0.0662189i | 0.435244 + 0.0984908i |
| 0.910825 + 0.230544i | 0.874564 + 0.253691i | 0.264207 + 0.0430279i | 0.509721 + 0.230333i |
| 0.910456 + 0.230821i | 0.896877 + 0.263875i | 0.295342 + 0.0475832i | 0.437191 + 0.230982i |
| 0.909256 + 0.23036i | 0.878813 + 0.237406i | 0.264405 + 0.0653276i | 0.505827 + 0.165726i |
| 0.90981 + 0.231559i | 0.902691 + 0.244886i | 0.295243 + 0.07018i | 0.436542 + 0.164428i |
| 1.11331 + 0.111488i | 1.13334 + 0.0757898i | 0.438475 + 0.177647i | 0.29731 + 0.0317983i |
| 1.11728 + 0.109365i | 1.07888 + 0.0761972i | 0.387727 + 0.182846i | 0.364451 + 0.0334207i |
| 1.10325 + 0.11961i | 1.12971 + 0.153987i | 0.438079 + 0.158177i | 0.298284 + 0.0968684i |
| 1.10694 + 0.118964i | 1.07148 + 0.139979i | 0.384954 + 0.155008i | 0.363478 + 0.0991397i |
| 1.06283 + 0.300501i | 1.07944 + 0.354442i | 0.268712 + 0.192947i | 0.297959 + 0.230333i |
| 1.06384 + 0.297825i | 1.01908 + 0.323111i | 0.301382 + 0.189877i | 0.367047 + 0.231307i |
| 1.05692 + 0.290349i | 1.09721 + 0.29691i | 0.268267 + 0.167089i | 0.298284 + 0.165077i |
| 1.0584 + 0.287211i | 1.03573 + 0.2788i | 0.299105 + 0.16293i | 0.366398 + 0.165077i |
| 0.756144 + 0.542028i | 0.721142 + 0.553647i | 0.452141 + 0.457142i | 0.515561 + 0.509396i |
| 0.756513 + 0.540367i | 0.735103 + 0.563303i | 0.395699 + 0.459519i | 0.444005 + 0.506476i |
| 0.753283 + 0.539905i | 0.732909 + 0.531167i | 0.4462 + 0.398768i | 0.514912 + 0.438165i |
| 0.753468 + 0.539352i | 0.749204 + 0.540342i | 0.393867 + 0.400997i | 0.442707 + 0.435893i |
| 0.831823 + 0.42491i | 0.816337 + 0.393948i | 0.27302 + 0.455805i | 0.511992 + 0.299581i |
| 0.832562 + 0.426018i | 0.83503 + 0.403669i | 0.310741 + 0.459172i | 0.439138 + 0.298284i |
| 0.828501 + 0.422234i | 0.809745 + 0.404873i | 0.274852 + 0.401591i | 0.515561 + 0.36802i |
| 0.828778 + 0.423433i | 0.827596 + 0.416909i | 0.310642 + 0.402581i | 0.440111 + 0.366073i |
| 0.870309 + 0.64724i | 0.873536 + 0.691904i | 0.440109 + 0.273763i | 0.302502 + 0.50388i |
| 0.872339 + 0.644472i | 0.834928 + 0.653379i | 0.394461 + 0.278071i | 0.372238 + 0.505178i |
| 0.858496 + 0.639949i | 0.917421 + 0.645583i | 0.444615 + 0.314652i | 0.301204 + 0.435569i |
| 0.859972 + 0.636165i | 0.867703 + 0.612077i | 0.393569 + 0.316385i | 0.369318 + 0.434595i |
| 0.97506 + 0.497174i | 1.02195 + 0.485421i | 0.271188 + 0.280051i | 0.298932 + 0.29731i |
| 0.973399 + 0.500405i | 0.961769 + 0.457831i | 0.304997 + 0.279605i | 0.366722 + 0.298284i |

-continued

| | | | |
|---|---|---|---|
| 0.960478 + 0.489791i | 0.996488 + 0.530232i | 0.272822 + 0.318217i | 0.299906 + 0.364775i |
| 0.958816 + 0.490899i | 0.94178 + 0.493106i | 0.306977 + 0.318217i | 0.36802 + 0.366073i |

Annex to the Description—Annex 7

TABLE 2

| CR = 5/15 SNR = 4 dB |
|---|
| 0.531 + 1.193i |
| 1.193 + 0.530i |
| 0.284 + 0.462i |
| 0.462 + 0.284i |
| −0.531 + 1.193i |
| −1.193 + 0.530i |
| −0.284 + 0.462i |
| −0.462 + 0.284i |
| 0.531 − 1.193i |
| 1.193 − 0.530i |
| 0.284 − 0.462i |
| 0.462 − 0.284i |
| −0.531 − 1.193i |
| −1.193 − 0.530i |
| −0.284 − 0.462i |
| −0.462 − 0.284i |

TABLE 3

| CR = 7/15 SNR = 6.5 dB |
|---|
| 1.2103 + 0.5026i |
| 0.5014 + 1.2103i |
| 0.4634 + 0.2624i |
| 0.2624 + 0.4627i |
| −1.2103 + 0.5026i |
| −0.5014 + 1.2103i |
| −0.4634 + 0.2624i |
| −0.2624 + 0.4627i |
| 1.2103 − 0.5026i |
| 0.5014 − 1.2103i |
| 0.4634 − 0.2624i |
| 0.2624 − 0.4627i |
| −1.2103 − 0.5026i |
| −0.5014 − 1.2103i |
| −0.4634 − 0.2624i |
| −0.2624 − 0.4627i |

TABLE 4

| CR = 9/15 SNR = 8.5 dB |
|---|
| 0.4909 + 1.2007i |
| 1.2007 + 0.4909i |
| 0.2476 + 0.5065i |
| 0.5053 + 0.2476i |
| −0.4909 + 1.2007i |
| −1.2007 + 0.4909i |
| −0.2476 + 0.5065i |
| −0.5053 + 0.2476i |
| 0.4909 − 1.2007i |
| 1.2007 − 0.4909i |
| 0.2476 − 0.5065i |
| 0.5053 − 0.2476i |
| −0.4909 − 1.2007i |
| −1.2007 − 0.4909i |
| −0.2476 − 0.5065i |
| −0.5053 − 0.2476i |

TABLE 5

| CR = 11/15 SNR = 11 dB |
|---|
| 0.9583 + 0.9547i |
| 0.9547 + 0.2909i |
| 0.2921 + 0.9583i |
| 0.2909 + 0.2927i |
| −0.9583 + 0.9547i |
| −0.9547 + 0.2909i |
| −0.2921 + 0.9583i |
| −0.2909 + 0.2927i |
| 0.9583 − 0.9547i |
| 0.9547 − 0.2909i |
| 0.2921 − 0.9583i |
| 0.2909 − 0.2927i |
| −0.9583 − 0.9547i |
| −0.9547 − 0.2909i |
| −0.2921 − 0.9583i |
| −0.2909 − 0.2927i |

TABLE 6

| CR = 13/15 SNR = 14.5 dB |
|---|
| 0.9517 + 0.9511i |
| 0.9524 + 0.3061i |
| 0.3067 + 0.9524i |
| 0.3061 + 0.3067i |
| −0.9517 + 0.9511i |
| −0.9524 + 0.3061i |
| −0.3067 + 0.9524i |
| −0.3061 + 0.3067i |
| 0.9517 − 0.9511i |
| 0.9524 − 0.3061i |
| 0.3067 − 0.9524i |
| 0.3061 − 0.3067i |
| −0.9517 − 0.9511i |
| −0.9524 − 0.3061i |
| −0.3067 − 0.9524i |
| −0.3061 − 0.3067i |

TABLE 7

| CR = 5/15 SNR = 7.5 dB |
|---|
| 0.500 + 0.287i |
| 0.422 + 0.249i |
| 0.507 + 0.247i |
| 0.419 + 0.224i |
| 0.286 + 0.493i |
| 0.249 + 0.415i |
| 0.253 + 0.485i |
| 0.230 + 0.400i |
| 1.027 + 0.617i |
| 1.220 + 0.778i |
| 1.161 + 0.308i |
| 1.391 + 0.332i |
| 0.579 + 1.027i |
| 0.711 + 1.205i |
| 0.308 + 1.148i |
| 0.335 + 1.387i |
| −0.500 + 0.287i |
| −0.422 + 0.249i |
| −0.507 + 0.247i |
| −0.419 + 0.224i |
| −0.286 + 0.493i |
| −0.249 + 0.415i |
| −0.253 + 0.485i |
| −0.230 + 0.400i |

TABLE 7-continued

| CR = 5/15 SNR = 7.5 dB |
|---|
| −1.027 + 0.617i |
| −1.220 + 0.778i |
| −1.161 + 0.308i |
| −1.391 + 0.332i |
| −0.579 + 1.027i |
| −0.711 + 1.205i |
| −0.308 + 1.148i |
| −0.335 + 1.387i |
| 0.500 − 0.287i |
| 0.422 − 0.249i |
| 0.507 − 0.247i |
| 0.419 − 0.224i |
| 0.286 − 0.493i |
| 0.249 − 0.415i |
| 0.253 − 0.485i |
| 0.230 − 0.400i |
| 1.027 − 0.617i |
| 1.220 − 0.778i |
| 1.161 − 0.308i |
| 1.391 − 0.332i |
| 0.579 − 1.027i |
| 0.711 − 1.205i |
| 0.308 − 1.148i |
| 0.335 − 1.387i |
| −0.500 − 0.287i |
| −0.422 − 0.249i |
| −0.507 − 0.247i |
| −0.419 − 0.224i |
| −0.286 − 0.493i |
| −0.249 − 0.415i |
| −0.253 − 0.485i |
| −0.230 − 0.400i |
| −1.027 − 0.617i |
| −1.220 − 0.778i |
| −1.161 − 0.308i |
| −1.391 − 0.332i |
| −0.579 − 1.027i |
| −0.711 − 1.205i |
| −0.308 − 1.148i |
| −0.335 − 1.387i |

TABLE 8

| CR = 7/15 SNR = 10.5 dB |
|---|
| 0.3352 + 0.6028i |
| 0.2077 + 0.6584i |
| 0.1711 + 0.3028i |
| 0.1556 + 0.3035i |
| 0.6028 + 0.3345i |
| 0.6577 + 0.2084i |
| 0.3021 + 0.1711i |
| 0.3028 + 0.1556i |
| 0.5556 + 0.8922i |
| 0.2352 + 1.0190i |
| 0.8450 + 1.2619i |
| 0.2922 + 1.4894i |
| 0.8929 + 0.5549i |
| 1.0197 + 0.2359i |
| 1.2626 + 0.8457i |
| 1.4894 + 0.2922i |
| −0.3352 + 0.6028i |
| −0.2077 + 0.6584i |
| −0.1711 + 0.3028i |
| −0.1556 + 0.3035i |
| −0.6028 + 0.3345i |
| −0.6577 + 0.2084i |
| −0.3021 + 0.1711i |
| −0.3028 + 0.1556i |
| −0.5556 + 0.8922i |
| −0.2352 + 1.0190i |
| −0.8450 + 1.2619i |
| −0.2922 + 1.4894i |
| −0.8929 + 0.5549i |
| −1.0197 + 0.2359i |

TABLE 8-continued

| CR = 7/15 SNR = 10.5 dB |
|---|
| −1.2626 + 0.8457i |
| −1.4894 + 0.2922i |
| 0.3352 − 0.6028i |
| 0.2077 − 0.6584i |
| 0.1711 − 0.30281 |
| 0.1556 − 0.3035i |
| 0.6028 − 0.3345i |
| 0.6577 − 0.2084i |
| 0.3021 − 0.1711i |
| 0.3028 − 0.1556i |
| 0.5556 − 0.8922i |
| 0.2352 − 1.0190i |
| 0.8450 − 1.2619i |
| 0.2922 − 1.4894i |
| 0.8929 − 0.5549i |
| 1.0197 − 0.2359i |
| 1.2626 − 0.8457i |
| 1.4894 − 0.2922i |
| −0.3352 − 0.6028i |
| −0.2077 − 0.6584i |
| −0.1711 − 0.3028i |
| −0.1556 − 0.3035i |
| −0.6028 − 0.3345i |
| −0.6577 − 0.2084i |
| −0.3021 − 0.1711i |
| −0.3028 − 0.1556i |
| −0.5556 − 0.8922i |
| −0.2352 − 1.0190i |
| −0.8450 − 1.2619i |
| −0.2922 − 1.4894i |
| −0.8929 − 0.5549i |
| −1.0197 − 0.2359i |
| −1.2626 − 0.8457i |
| −1.4894 − 0.2922i |

TABLE 9

| CR = 9/15 SNR = 13.5 dB |
|---|
| 0.3547 + 0.6149i |
| 0.1581 + 0.6842i |
| 0.1567 + 0.2749i |
| 0.1336 + 0.2700i |
| 0.6177 + 0.4030i |
| 0.7262 + 0.1756i |
| 0.3568 + 0.1756i |
| 0.3771 + 0.1336i |
| 0.5639 + 0.8864i |
| 0.1980 + 1.0277i |
| 0.8199 + 1.2515i |
| 0.2854 + 1.4691i |
| 0.8654 + 0.6058i |
| 1.0382 + 0.2141i |
| 1.2362 + 0.8416i |
| 1.4663 + 0.2973i |
| −0.3547 + 0.6149i |
| −0.1581 + 0.6842i |
| −0.1567 + 0.2749i |
| −0.1336 + 0.2700i |
| −0.6177 + 0.4030i |
| −0.7262 + 0.1756i |
| −0.3568 + 0.1756i |
| −0.3771 + 0.1336i |
| −0.5639 + 0.8864i |
| −0.1980 + 1.0277i |
| −0.8199 + 1.2515i |
| −0.2854 + 1.4691i |
| −0.8654 + 0.6058i |
| −1.0382 + 0.2141i |
| −1.2362 + 0.8416i |
| −1.4663 + 0.2973i |
| 0.3547 − 0.6149i |
| 0.1581 − 0.6842i |
| 0.1567 − 0.2749i |
| 0.1336 − 0.2700i |

TABLE 9-continued

| CR = 9/15 SNR = 13.5 dB |
|---|
| 0.6177 − 0.4030i |
| 0.7262 − 0.1756i |
| 0.3568 − 0.1756i |
| 0.3771 − 0.1336i |
| 0.5639 − 0.8864i |
| 0.1980 − 1.0277i |
| 0.8199 − 1.2515i |
| 0.2854 − 1.4691i |
| 0.8654 − 0.6058i |
| 1.0382 − 0.2141i |
| 1.2362 − 0.8416i |
| 1.4663 − 0.2973i |
| −0.3547 − 0.6149i |
| −0.1581 − 0.6842i |
| −0.1567 − 0.2749i |
| −0.1336 − 0.2700i |
| −0.5177 − 0.4030i |
| −0.7262 − 0.1756i |
| −0.3568 − 0.1756i |
| −0.3771 − 0.1336i |
| −0.5639 − 0.8864i |
| −0.1980 − 1.0277i |
| −0.8199 − 1.2515i |
| −0.2854 − 1.4691i |
| −0.8654 − 0.6058i |
| −1.0382 − 0.2141i |
| −1.2362 − 0.8416i |
| −1.4663 − 0.2973i |

TABLE 10

| CR = 11/15 SNR = 16 dB |
|---|
| 0.3317 + 0.6970i |
| 0.1386 + 0.8824i |
| 0.1323 + 0.4437i |
| 0.1015 + 0.1372i |
| 0.5682 + 0.4500i |
| 0.6739 + 0.1435i |
| 0.3597 + 0.3401i |
| 0.3660 + 0.1204i |
| 0.6004 + 0.8922i |
| 0.2120 + 1.2253i |
| 0.9594 + 1.0714i |
| 0.5829 + 1.3995i |
| 0.8439 + 0.5675i |
| 0.9769 + 0.1959i |
| 1.2239 + 0.6760i |
| 1.3653 + 0.2323i |
| −0.3317 + 0.6970i |
| −0.1386 + 0.8824i |
| −0.1323 + 0.4437i |
| −0.1015 + 0.1372i |
| −0.5682 + 0.4500i |
| −0.6739 + 0.1435i |
| −0.3597 + 0.3401i |
| −0.3660 + 0.1204i |
| −0.6004 + 0.8922i |
| −0.2120 + 1.2253i |
| −0.9594 + 1.0714i |
| −0.5829 + 1.3995i |
| −0.8439 + 0.5675i |
| −0.9769 + 0.1959i |
| −1.2239 + 0.6760i |
| −1.3653 + 0.2323i |
| 0.3317 − 0.6970i |
| 0.1386 − 0.8824i |
| 0.1323 − 0.4437i |
| 0.1015 − 0.1372i |
| 0.5682 − 0.4500i |
| 0.6739 − 0.1435i |
| 0.3597 − 0.3401i |
| 0.3660 − 0.1204i |
| 0.5004 − 0.8922i |
| 0.2120 − 1.2253i |

TABLE 10-continued

| CR = 11/15 SNR = 16 dB |
|---|
| 0.9594 − 1.0714i |
| 0.5829 − 1.3995i |
| 0.8439 − 0.5675i |
| 0.9769 − 0.1959i |
| 1.2239 − 0.6760i |
| 1.3653 − 0.2323i |
| −0.3317 − 0.6970i |
| −0.1386 − 0.8824i |
| −0.1323 − 0.4437i |
| −0.1015 − 0.1372i |
| −0.5682 − 0.4500i |
| −0.6739 − 0.1435i |
| −0.3597 − 0.3401i |
| −0.3660 − 0.1204i |
| −0.6004 − 0.8922i |
| −0.2120 − 1.2253i |
| −0.9594 − 1.0714i |
| −0.5829 − 1.3995i |
| −0.8439 − 0.5675i |
| −0.9769 − 0.1959i |
| −1.2239 − 0.6760i |
| −1.3653 − 0.2323i |

TABLE 11

| CR = 13/15 SNR = 19.5 dB |
|---|
| 5.9520 + 8.0850i |
| 7.7190 + 5.8400i |
| 1.4580 + 9.5540i |
| 5.2690 + 5.3190i |
| 8.1410 + 1.1460i |
| 7.5190 + 3.3690i |
| 5.5910 + 1.0300i |
| 5.1640 + 3.0900i |
| 1.0520 + 6.8620i |
| 1.0230 + 4.7460i |
| 3.2380 + 7.4900i |
| 3.1000 + 5.0750i |
| 1.0890 + 0.9100i |
| 1.0060 + 2.7780i |
| 3.2870 + 0.9710i |
| 3.0440 + 2.9450i |
| −5.9520 + 8.0850i |
| −7.7190 + 5.8400i |
| −1.4580 + 9.5540i |
| −5.2690 + 5.3190i |
| −8.1410 + 1.1460i |
| −7.5190 + 3.3690i |
| −5.5910 + 1.0300i |
| −5.1640 + 3.0900i |
| −1.0520 + 6.8620i |
| −1.0230 + 4.7460i |
| −3.2380 + 7.4900i |
| −3.1000 + 5.0750i |
| −1.0890 + 0.9100i |
| −1.0060 + 2.7780i |
| −3.2870 + 0.9710i |
| −3.0440 + 2.9450i |
| 5.9520 − 8.0850i |
| 7.7190 − 5.8400i |
| 1.4580 − 9.5540i |
| 5.2690 − 5.3190i |
| 8.1410 − 1.1460i |
| 7.5190 − 3.3690i |
| 5.5910 − 1.0300i |
| 5.1640 − 3.0900i |
| 1.0520 − 6.8620i |
| 1.0230 − 4.7460i |
| 3.2380 − 7.4900i |
| 3.1000 − 5.0750i |
| 1.0890 − 0.9100i |
| 1.0060 − 2.7780i |
| 3.2870 − 0.9710i |
| 3.0440 − 2.9450i |

TABLE 11-continued

| CR = 13/15 SNR = 19.5 dB |
|---|
| −5.9520 − 8.0850i |
| −7.7190 − 5.8400i |
| −1.4580 − 3.5540i |
| −5.2690 − 5.3190i |
| −8.1410 − 1.1460i |
| −7.5190 − 3.3690i |
| −5.5910 − 1.0300i |
| −5.1640 − 3.0900i |
| −1.0520 − 6.8620i |
| −1.0230 − 4.7460i |
| −3.2380 − 7.4900i |
| −3.1000 − 5.0750i |
| −1.0890 − 0.9100i |
| −1.0060 − 2.7780i |
| −3.2870 − 0.9710i |
| −3.0440 − 2.9450i |

TABLE 12

| CR = 5/15 SNR = 10 dB |
|---|
| 1.467 + 0.993i |
| 1.216 + 0.823i |
| 1.215 + 0.820i |
| 1.151 + 0.775i |
| 1.751 + 0.343i |
| 1.435 + 0.289i |
| 1.435 + 0.288i |
| 1.360 + 0.272i |
| 0.887 + 0.534i |
| 0.903 + 0.552i |
| 0.903 + 0.548i |
| 0.917 + 0.564i |
| 1.003 + 0.243i |
| 1.025 + 0 246i |
| 1.025 + 0.244i |
| 1.047 + 0.245i |
| 0.969 + 1.486i |
| 0.802 + 1.214i |
| 0.796 + 1.221i |
| 0.759 + 1.153i |
| 0.340 + 1.742i |
| 0.275 + 1.422i |
| 0.280 + 1.419i |
| 0.263 + 1.347i |
| 0.532 + 0.884i |
| 0.547 + 0.902i |
| 0.549 + 0 902i |
| 0.561 + 0.916i |
| 0.243 + 0.996i |
| 0.243 + 1.017i |
| 0.245 + 1.018i |
| 0.245 + 1.039i |
| 0.317 + 0.178i |
| 0.319 + 0.179i |
| 0.318 + 0.178i |
| 0.318 + 0.178i |
| 0.317 + 0.164i |
| 0.316 + 0.165i |
| 0.319 + 0.164i |
| 0.318 + 0.163i |
| 0.576 + 0.312i |
| 0.582 + 0.315i |
| 0.581 + 0.316i |
| 0.589 + 0.319i |
| 0.611 + 0.218i |
| 0.620 + 0.219i |
| 0.618 + 0.218i |
| 0.627 + 0.219i |
| 0.179 + 0.316i |
| 0.179 + 0.315i |
| 0.181 + 0.316i |
| 0.180 + 0.316i |
| 0.165 + 0.315i |
| 0.156 + 0.313i |

TABLE 12-continued

| CR = 5/15 SNR = 10 dB |
|---|
| 0.165 + 0.316i |
| 0.165 + 0.316i |
| 0.310 + 0.571i |
| 0.314 + 0.576i |
| 0.315 + 0.577i |
| 0.320 + 0.582i |
| 0.216 + 0.609i |
| 0.219 + 0.615i |
| 0.218 + 0.619i |
| 0.220 + 0.623i |
| −1.467 + 0.993i |
| −1.216 + 0.823i |
| −1.215 + 0.820i |
| −1.151 + 0.775i |
| −1.751 + 0.343i |
| −1.435 + 0.289i |
| −1.435 + 0.288i |
| −1.360 + 0.272i |
| −0.887 + 0.534i |
| −0.903 + 0.552i |
| −0.903 + 0.548i |
| −0.917 + 0.564i |
| −1.003 + 0.243i |
| −1.025 + 0.246i |
| −1.025 + 0.244i |
| −1.047 + 0.245i |
| −0.969 + 1.486i |
| −0.802 + 1.214i |
| −0.796 + 1.221i |
| −0.759 + 1.153i |
| −0.340 + 1.742i |
| −0.275 + 1.422i |
| −0.280 + 1.419i |
| −0.263 + 1.347i |
| −0.532 + 0.884i |
| −0.547 + 0.902i |
| −0.549 + 0.902i |
| −0.561 + 0.916i |
| −0.243 + 0.996i |
| −0.243 + 1.017i |
| −0.245 + 1.018i |
| −0.245 + 1.039i |
| −0.317 + 0.178i |
| −0.319 + 0.179i |
| −0.318 + 0.178i |
| −0.318 + 0.178i |
| −0.317 + 0.164i |
| −0.316 + 0.165i |
| −0.319 + 0.164i |
| −0.318 + 0.163i |
| −0.576 + 0.312i |
| −0.582 + 0.315i |
| −0.581 + 0.315i |
| −0.589 + 0.319i |
| −0.611 + 0.218i |
| −0.620 + 0.219i |
| −0.618 + 0.218i |
| −0.627 + 0 219i |
| −0.179 + 0.316i |
| −0.179 + 0.315i |
| −0.181 + 0.316i |
| −0.180 + 0.316i |
| −0.165 + 0.315i |
| −0.166 + 0.318i |
| −0.165 + 0.316i |
| −0.165 + 0.316i |
| −0.310 + 0.571i |
| −0.314 + 0.576i |
| −0.315 + 0.577i |
| −0.320 + 0.582i |
| −0.216 + 0.609i |
| −0.219 + 0.615i |
| −0.218 + 0.619i |
| −0.220 + 0.623i |
| 1.467 − 0.993i |
| 1.216 − 0.823i |
| 1.215 − 0.820i |
| 1.151 − 0.775i |

TABLE 12-continued

| CR = 5/15 SNR = 10 dB |
|---|
| 1.751 − 0.343i |
| 1.435 − 0.289i |
| 1.435 − 0.288i |
| 1.360 − 0.272i |
| 0.887 − 0.534i |
| 0.903 − 0.552i |
| 0.903 − 0.548i |
| 0.917 − 0.564i |
| 1.003 − 0.243i |
| 1.025 − 0.246i |
| 1.025 − 0.244i |
| 1.047 − 0.245i |
| 0.969 − 1.486i |
| 0.802 − 1.214i |
| 0.796 − 1.221i |
| 0.759 − 1.153i |
| 0.340 − 1.742i |
| 0.275 − 1.422i |
| 0.280 − 1.419i |
| 0.263 − 1.347i |
| 0.532 − 0.884i |
| 0.547 − 0.902i |
| 0.549 − 0.902i |
| 0.561 − 0.916i |
| 0.243 − 0.996i |
| 0.243 − 1.017i |
| 0.245 − 1.018i |
| 0.245 − 1.039i |
| 0.317 − 0.178i |
| 0.319 − 0.179i |
| 0.318 − 0.178i |
| 0.318 − 0.178i |
| 0.317 − 0.164i |
| 0.316 − 0.165i |
| 0.319 − 0.164i |
| 0.318 − 0.163i |
| 0.576 − 0.312i |
| 0.582 − 0.315i |
| 0.581 − 0.316i |
| 0.589 − 0.319i |
| 0.611 − 0.218i |
| 0.620 − 0.219i |
| 0.618 − 0.218i |
| 0.627 − 0.219i |
| 0.179 − 0.316i |
| 0.179 − 0.315i |
| 0.181 − 0.316i |
| 0.180 − 0.316i |
| 0.165 − 0.315i |
| 0.166 − 0.318i |
| 0.165 − 0.316i |
| 0.165 − 0.316i |
| 0.310 − 0.571i |
| 0.314 − 0.576i |
| 0.315 − 0.577i |
| 0.320 − 0.582i |
| 0.216 − 0.609i |
| 0.219 − 0.615i |
| 0.218 − 0.619i |
| 0.220 − 0.623i |
| −1.467 − 0.993i |
| −1.216 − 0.823i |
| −1.215 − 0.820i |
| −1.151 − 0.775i |
| −1.751 − 0.343i |
| −1.435 − 0.289i |
| −1.435 − 0.288i |
| −1.360 − 0.272i |
| −0.887 − 0.534i |
| −0.903 − 0.552i |
| −0.903 − 0.548i |
| −0.917 − 0.564i |
| −1.003 − 0.243i |
| −1.025 − 0.246i |
| −1.025 − 0.244i |
| −1.047 − 0.245i |
| −0.969 − 1.486i |
| −0.802 − 1.214i |
| −0.796 − 1.221i |
| −0.759 − 1.153i |
| −0.340 − 1.742i |
| −0.275 − 1.422i |
| −0.280 − 1.419i |
| −0.263 − 1.347i |
| −0.532 − 0.884i |
| −0.547 − 0.902i |
| −0.549 − 0.902i |
| −0.561 − 0.916i |
| −0.243 − 0.996i |
| −0.243 − 1.017i |
| −0.245 − 1.018i |
| −0.245 − 1.039i |
| −0.317 − 0.178i |
| −0.319 − 0.179i |
| −0.318 − 0.178i |
| −0.318 − 0.178i |
| −0.317 − 0.164i |
| −0.316 − 0.165i |
| −0.319 − 0.164i |
| −0.318 − 0.163i |
| −0.576 − 0.312i |
| −0.582 − 0.315i |
| −0.581 − 0.316i |
| −0.589 − 0.319i |
| −0.611 − 0.218i |
| −0.620 − 0.219i |
| −0.618 − 0.218i |
| −0.627 − 0.219i |
| −0.179 − 0.316i |
| −0.179 − 0.315i |
| −0.181 − 0.316i |
| −0.180 − 0.316i |
| −0.165 − 0 315i |
| −0.166 − 0.318i |
| −0.165 − 0.316i |
| −0.165 − 0.316i |
| −0.310 − 0.571i |
| −0.314 − 0.576i |
| −0.315 − 0.577i |
| −0.320 − 0.582i |
| −0.216 − 0.609i |
| −0.219 − 0.615i |
| −0.218 − 0.619i |
| −0.220 − 0.623i |

TABLE 13

| CR = 7/15 SNR = 13.5 dB |
|---|
| 1.2905 + 1.3099i |
| 1.0504 + 0.9577i |
| 1.5329 + 0.8935i |
| 1.1577 + 0.8116i |
| 1.7881 + 0.2509i |
| 1.4275 + 0.1400i |
| 1.4784 + 0.5201i |
| 1.3408 + 0.4346i |
| 0.7837 + 0.5867i |
| 0.8250 + 0.6455i |
| 0.8256 + 0.5601i |
| 0.8777 + 0.6110i |
| 1.0080 + 0.1843i |
| 1.0759 + 0.1721i |
| 1.0056 + 0.2758i |
| 1.0662 + 0.2964i |
| 0.8334 + 1.5554i |
| 0.8165 + 1.1092i |
| 0.6092 + 1.2729i |
| 0.6728 + 1.1456i |
| 0.3061 + 1.7469i |
| 0.1327 + 1.4056i |
| 0.3522 + 1.3414i |
| 0.2273 + 1.3081i |

TABLE 13-continued

| CR = 7/15 SNR = 13.5 dB |
|---|
| 0.5007 + 0.8098i |
| 0.5528 + 0.8347i |
| 0.4843 + 0.8486i |
| 0.5304 + 0.8759i |
| 0.1715 + 0.9147i |
| 0 1540 + 0.9510i |
| 0.1964 + 0.9438i |
| 0.1788 + 0.9832i |
| 0.3752 + 0.1667i |
| 0.3734 + 0.1667i |
| 0.3758 + 0.1661i |
| 0.3746 + 0.1649i |
| 0.4013 + 0.1230i |
| 0.4001 + 0.1230i |
| 0.4037 + 0.1230i |
| 0.4019 + 0.1218i |
| 0.6025 + 0.3934i |
| 0.5946 + 0.3928i |
| 0.6116 + 0.3879i |
| 0.6019 + 0.3837i |
| 0.7377 + 0.1618i |
| 0.7298 + 0.1582i |
| 0.7274 + 0.1782i |
| 0.7165 + 0.1746i |
| 0.1509 + 0.2425i |
| 0.1503 + 0.2400i |
| 0.1515 + 0.2437i |
| 0.1503 + 0.2425i |
| 0.1285 + 0.2388i |
| 0.1279 + 0.2419i |
| 0.1279 + 0.2431i |
| 0.1279 + 0.2406i |
| 0.3394 + 0.5764i |
| 0.3364 + 0.5722i |
| 0.3328 + 0.5758i |
| 0.3303 + 0.5698i |
| 0.1491 + 0.6316i |
| 0.1461 + 0.6280i |
| 0.1509 + 0.6280i |
| 0.1473 + 0.6225i |
| −1.2905 + 1.3099i |
| −1.0504 + 0.9577i |
| −1.5329 + 0.8935i |
| −1.1577 + 0.8116i |
| −1.7881 + 0.2509i |
| −1.4275 + 0.1400i |
| −1.4784 + 0.5201i |
| −1.3408 + 0.4346i |
| −0.7837 + 0.5867i |
| −0.8250 + 0.6455i |
| −0.8256 + 0.5601i |
| −0.8777 + 0.6110i |
| −1.0080 + 0.1843i |
| −1.0759 + 0.1721i |
| −1.0056 + 0.2758i |
| −1.0662 + 0.2964i |
| −0.8334 + 1.5554i |
| −0.8165 + 1.1092i |
| −0.6092 + 1.2729i |
| −0.6728 + 1.1456i |
| −0.3061 + 1.7469i |
| −0.1327 + 1.4056i |
| −0.3522 + 1.3414i |
| −0.2273 + 1.3081i |
| −0.5007 + 0.8098i |
| −0.5528 + 0.8347i |
| −0.4843 + 0.8486i |
| −0.5304 + 0.8759i |
| −0.1715 + 0.9147i |
| −0.1540 + 0.9510i |
| −0.1964 + 0.9438i |
| −0.1788 + 0.9832i |
| −0.3752 + 0.1667i |
| −0.3734 + 0.1667i |
| −0.3758 + 0.1661i |
| −0.3746 + 0.1649i |
| −0.4013 + 0.1230i |
| −0.4001 + 0.1230i |

TABLE 13-continued

| CR = 7/15 SNR = 13.5 dB |
|---|
| −0.4037 + 0.1230i |
| −0.4019 + 0 1218i |
| −0.6025 + 0.3934i |
| −0.5946 + 0.3928i |
| −0.6116 + 0.3879i |
| −0.6019 + 0.3837i |
| −0.7377 + 0.1618i |
| −0.7298 + 0.1582i |
| −0.7274 + 0.1782i |
| −0.7165 + 0.1746i |
| −0.1509 + 0.2425i |
| −0.1503 + 0.2400i |
| −0.1515 + 0.2437i |
| −0.1503 + 0.2425i |
| −0.1285 + 0.2388i |
| −0.1279 + 0.2419i |
| −0.1279 + 0.2431i |
| −0.1279 + 0.2406i |
| −0.3394 + 0.5764i |
| −0.3364 + 0.5722i |
| −0.3328 + 0.5758i |
| −0.3303 + 0.5698i |
| −0.1491 + 0.6316i |
| −0.1461 + 0.6280i |
| −0.1509 + 0.6280i |
| −0.1473 + 0.6225i |
| 1.2905 − 1.3099i |
| 1.0504 − 0.9577i |
| 1.5329 − 0.8935i |
| 1.1577 − 0.8116i |
| 1.7881 − 0.2509i |
| 1.4275 − 0.1400i |
| 1.4784 − 0.5201i |
| 1.3408 − 0.4346i |
| 0.7837 − 0.5867i |
| 0.8250 − 0.6455i |
| 0.8256 − 0.5601i |
| 0.8777 − 0.6110i |
| 1.0080 − 0.1843i |
| 1.0759 − 0.1721i |
| 1.0056 − 0.2758i |
| 1.0662 − 0.2964i |
| 0.8334 − 1.5554i |
| 0.8165 − 1.1092i |
| 0.6092 − 1.2729i |
| 0.6728 − 1.1456i |
| 0.3061 − 1.7469i |
| 0.1327 − 1.4056i |
| 0.3522 − 1.3414i |
| 0.2273 − 1.3081i |
| 0.5007 − 0.8098i |
| 0.5528 − 0.8347i |
| 0.4843 − 0.8486i |
| 0.5304 − 0.8759i |
| 0.1715 − 0.9147i |
| 0.1540 − 0.9510i |
| 0.1964 − 0.9438i |
| 0.1788 − 0.9832i |
| 0.3752 − 0.1667i |
| 0.3734 − 0.1667i |
| 0.3758 − 0.1661i |
| 0.3746 − 0.1649i |
| 0.4013 − 0.1230i |
| 0.4001 − 0.1230i |
| 0.4037 − 0.1230i |
| 0.4019 − 0.1218i |
| 0.6025 − 0.3934i |
| 0.5946 − 0.3928i |
| 0.6116 − 0.3879i |
| 0.6019 − 0.3837i |
| 0.7377 − 0.1618i |
| 0.7298 − 0.1582i |
| 0.7274 − 0.1782i |
| 0.7155 − 0.1746i |
| 0.1509 − 0.2425i |
| 0.1503 − 0.2400i |
| 0.1515 − 0.2437i |
| 0.1503 − 0.2425i |

TABLE 13-continued

| CR = 7/15 SNR = 13.5 dB |
|---|
| 0.1285 − 0.2388i |
| 0.1279 − 0.2419i |
| 0.1279 − 0.2431i |
| 0.1279 − 0.2406i |
| 0.3394 − 0.5764i |
| 0.3364 − 0.5722i |
| 0.3328 − 0.5758i |
| 0.3303 − 0.5698i |
| 0.1491 − 0.6316i |
| 0.1461 − 0.6280i |
| 0.1509 − 0.6280i |
| 0.1473 − 0.6225i |
| −1.2905 − 1.3099i |
| −1.0504 − 0.9577i |
| −1.5329 − 0.8935i |
| −1.1577 − 0.8116i |
| −1.7881 − 0.2509i |
| −1.4275 − 0.1400i |
| −1.4784 − 0.5201i |
| −1.3408 − 0.4346i |
| −0.7837 − 0.5867i |
| −0.8250 − 0.6455i |
| −0.8256 − 0.5601i |
| −0.8777 − 0.6110i |
| −1.0080 − 0.1843i |
| −1.0759 − 0.1721i |
| −1.0056 − 0.2758i |
| −1.0662 − 0.2964i |
| −0.8334 − 1.5554i |
| −0.8165 − 1.1092i |
| −0.6092 − 1.2729i |
| −0.6728 − 1.1456i |
| −0.3061 − 1.7469i |
| −0.1327 − 1.4056i |
| −0.3522 − 1.3414i |
| −0.2273 − 1.3081i |
| −0.5007 − 0.8098i |
| −0.5528 − 0.8347i |
| −0.4843 − 0.8486i |
| −0.5304 − 0.8759i |
| −0.1715 − 0.9147i |
| −0.1540 − 0.9510i |
| −0.1964 − 0.9438i |
| −0.1788 − 0.9832i |
| −0.3752 − 0.1667i |
| −0.3734 − 0.1667i |
| −0.3758 − 0.1661i |
| −0.3746 − 0.1649i |
| −0.4013 − 0.1230i |
| −0.4001 − 0.1230i |
| −0.4037 − 0.1230i |
| −0.4019 − 0.1218i |
| −0.6025 − 0.3934i |
| −0.5946 − 0.3928i |
| −0.6116 − 0.3879i |
| −0.6019 − 0.3837i |
| −0.7377 − 0.1618i |
| −0.7298 − 0.1582i |
| −0.7274 − 0.1782i |
| −0.7165 − 0.1746i |
| −0.1509 − 0.2425i |
| −0.1503 − 0.2400i |
| −0.1515 − 0.2437i |
| −0.1503 − 0.2425i |
| −0.1285 − 0.2388i |
| −0.1279 − 0.2419i |
| −0.1279 − 0.2431i |
| −0.1279 − 0.2406i |
| −0.3394 − 0.5764i |
| −0.3364 − 0.5722i |
| −0.3328 − 0.5758i |
| −0.3303 − 0.5698i |
| −0.1491 − 0.6316i |
| −0.1461 − 0.6280i |
| −0.1509 − 0.6280i |
| −0.1473 − 0.6225i |

TABLE 14

| CR = 9/15 SNR = 17 dB |
|---|
| 1.3231 + 1.1506i |
| 0.9851 + 1.2311i |
| 1.1439 + 0.8974i |
| 0.9343 + 0.9271i |
| 1.5398 + 0.7952i |
| 0.9092 + 0.5599i |
| 1.2222 + 0.6574i |
| 0.9578 + 0.6373i |
| 0.7748 + 1.5867i |
| 0.6876 + 1.2489i |
| 0.5992 + 0.9208i |
| 0.6796 + 0.9743i |
| 0.5836 + 0.5879i |
| 0.6915 + 0.5769i |
| 0.5858 + 0.7058i |
| 0.6868 + 0.6793i |
| 1.6118 + 0.1497i |
| 0.9511 + 0.1140i |
| 1.2970 + 0.1234i |
| 1.0266 + 0.1191i |
| 1.5831 + 0.4496i |
| 0.9328 + 0.3586i |
| 1.2796 + 0.3894i |
| 1.0188 + 0.3447i |
| 0.5940 + 0.1059i |
| 0.7215 + 0.1100i |
| 0.5863 + 0.1138i |
| 0.6909 + 0.1166i |
| 0.5843 + 0.3604i |
| 0.6970 + 0.3592i |
| 0.5808 + 0.3250i |
| 0.6678 + 0.3290i |
| 0.1406 + 1.6182i |
| 0.1272 + 1.2984i |
| 0.1211 + 0.9644i |
| 0.1220 + 1.0393i |
| 0.1124 + 0.6101i |
| 0.1177 + 0.6041i |
| 0.1136 + 0.7455i |
| 0.1185 + 0.7160i |
| 0.4324 + 1.5679i |
| 0.3984 + 1.2825i |
| 0.3766 + 0.9534i |
| 0.3668 + 1.0301i |
| 0.3667 + 0.5995i |
| 0.3328 + 0.5960i |
| 0.3687 + 0.7194i |
| 0.3373 + 0.6964i |
| 0.1065 + 0.1146i |
| 0.1145 + 0.1108i |
| 0.1053 + 0.1274i |
| 0.1134 + 0.1236i |
| 0.1111 + 0.3821i |
| 0.1186 + 0.3867i |
| 0.1080 + 0.3431i |
| 0.1177 + 0.3459i |
| 0.3644 + 0.1080i |
| 0.3262 + 0.1104i |
| 0.3681 + 0.1173i |
| 0.3289 + 0.1196i |
| 0.3665 + 0.3758i |
| 0.3310 + 0.3795i |
| 0.3672 + 0.3353i |
| 0.3336 + 0.3402i |
| −1.3231 + 1.1506i |
| −0.9851 + 1.2311i |
| −1.1439 + 0.8974i |
| −0.9343 + 0.9271i |
| −1.5398 + 0.7962i |
| −0.9092 + 0.5599i |
| −1.2222 + 0.6574i |
| −0.9579 + 0.6373i |
| −0.7748 + 1.5867i |
| −0.6876 + 1.2489i |
| −0.5992 + 0.0208i |
| −0.6796 + 0.9743i |
| −0.5836 + 0.5879i |
| −0.6915 + 0.5769i |

TABLE 14-continued

| CR = 9/15 SNR = 17 dB |
| --- |
| −0.5858 + 0.7058i |
| −0.6868 + 0.6793i |
| −1.6118 + 0.1497i |
| −0.9511 + 0.1140i |
| −1.2970 + 0.1234i |
| −1.0266 + 0.1191i |
| −1.5831 + 0.4496i |
| −0.9328 + 0.3586i |
| −1.2796 + 0.3894i |
| −1.0188 + 0.3447i |
| −0.5940 + 0.1059i |
| −0.7215 + 0.1100i |
| −0.5863 + 0.1138i |
| −0.6909 + 0.1166i |
| −0.5843 + 0.3604i |
| −0.6970 + 0.3592i |
| −0.5808 + 0.3250i |
| −0.6678 + 0.3290i |
| −0.1406 + 1.6182i |
| −0.1272 + 1.2984i |
| −0.1211 + 0.9644i |
| −0.1220 + 1.0393i |
| −0.1124 + 0.6101i |
| −0.1177 + 0.6041i |
| −0.1136 + 0.7455i |
| −0.1185 + 0.7160i |
| −0.4324 + 1.5679i |
| −0.3984 + 1.2825i |
| −0.3766 + 0.9534i |
| −0.3668 + 1.0301i |
| −0.3567 + 0.5995i |
| −0.3328 + 0.5960i |
| −0.3687 + 0.7194i |
| −0.3373 + 0.6964i |
| −0.1065 + 0.1146i |
| −0.1145 + 0.1108i |
| −0.1053 + 0.1274i |
| −0.1134 + 0.1236i |
| −0.1111 + 0.3821i |
| −0.1186 + 0.3867i |
| −0.1080 + 0.3431i |
| −0.1177 + 0.3459i |
| −0.3644 + 0.1080i |
| −0.3262 + 0.1104i |
| −0.3681 + 0.1173i |
| −0.3289 + 0.1196i |
| −0.3665 + 0.3758i |
| −0.3310 + 0.3795i |
| −0.3672 + 0.3353i |
| −0.3336 + 0.3402i |
| 1.3231 − 1.1506i |
| 0.9851 − 1.2311i |
| 1.1439 − 0.8974i |
| 0.9343 − 0.9271i |
| 1.5398 − 0.7962i |
| 0.9092 − 0.5599i |
| 1.2222 − 0.6574i |
| 0.9579 − 0.6373i |
| 0.7748 − 1.5867i |
| 0.6876 − 1.2489i |
| 0.5992 − 0.9208i |
| 0.6796 − 0.9743i |
| 0.5336 − 0.5879i |
| 0.6915 − 0.5769i |
| 0.5858 − 0.7058i |
| 0.6868 − 0.6793i |
| 1.6113 − 0.1497i |
| 0.9511 − 0.1140i |
| 1.2970 − 0.1234i |
| 1.0266 − 0.1191i |
| 1.5881 − 0.4496i |
| 0.9328 − 0.3586i |
| 1.2796 − 0.3894i |
| 1.0188 − 0.3447i |
| 0.5940 − 0.1059i |
| 0.7215 − 0.1100i |
| 0.5863 − 0.1138i |
| 0.6909 − 0.1166i |

TABLE 14-continued

| CR = 9/15 SNR = 17 dB |
| --- |
| 0.5843 − 0.3604i |
| 0.6970 − 0.3592i |
| 0.5808 − 0.3250i |
| 0.6678 − 0.3290i |
| 0.1406 − 1.6182i |
| 0.1272 − 1.2984i |
| 0.1211 − 0.9644i |
| 0.1220 − 1.0393i |
| 0.1124 − 0.6101i |
| 0.1177 − 0.6041i |
| 0.1136 − 0.7455i |
| 0.1185 − 0.7160i |
| 0.4324 − 1.5679i |
| 0.3984 − 1.2825i |
| 0.3766 − 0.9534i |
| 0.3668 − 1.0301i |
| 0.3667 − 0.5995i |
| 0.3328 − 0.5960i |
| 0.3687 − 0.7194i |
| 0.3373 − 0.6964i |
| 0.1065 − 0.1146i |
| 0.1145 − 0.1108i |
| 0.1053 − 0.1274i |
| 0.1134 − 0.1236i |
| 0.1111 − 0.3821i |
| 0.1186 − 0.3867i |
| 0.1080 − 0.3431i |
| 0.1177 − 0.3459i |
| 0:3644 − 0.1080i |
| 0.3262 − 0.1104i |
| 0.3681 − 0.1173i |
| 0.3289 − 0.1196i |
| 0.3665 − 0.3758i |
| 0.3310 − 0.3795i |
| 0.3672 − 0.3353i |
| 0.3336 − 0.3402i |
| −1.3231 − 1.1506i |
| −0.9851 − 1.2311i |
| −1.1439 − 0.8974i |
| −0.9343 − 0.9271i |
| −1.5398 − 0.7962i |
| −0.9092 − 0.5599i |
| −1.2222 − 0.6574i |
| −0.9579 − 0.6373i |
| −0.7748 − 1.5867i |
| −0.6876 − 1.2489i |
| −0.5992 − 0.9208i |
| −0.6796 − 0.9743i |
| −0.5836 − 0.5879i |
| −0.6915 − 0.5769i |
| −0.5858 − 0.7058i |
| −0.6868 − 0.6793i |
| −1.6118 − 0.1497i |
| −0.9511 − 0.1140i |
| −1.2970 − 0.1234i |
| −1.0266 − 0.1191i |
| −1.5831 − 0.4496i |
| −0.9328 − 0.3586i |
| −1.2796 − 0.3894i |
| −1.0188 − 0.3447i |
| −0.5940 − 0.1059i |
| −0.7215 − 0.1100i |
| −0.5863 − 0.1138i |
| −0.6909 − 0.1166i |
| −0.5843 − 0.3604i |
| −0.6970 − 0.3592i |
| −0.5808 − 0.3250i |
| −0.6678 − 0.3290i |
| −0.1406 − 1.6182i |
| −0.1272 − 1.2984i |
| −0.1211 − 0.9644i |
| −0.1220 − 1.0393i |
| −0.1124 − 0.6101i |
| −0.1177 − 0.6041i |
| −0.1136 − 0.7455i |
| −0.1185 − 0.7160i |
| −0.4324 − 1.5679i |
| −0.3984 − 1.2825i |

TABLE 14-continued

| CR = 9/15 SNR = 17 dB |
| --- |
| −0.3766 − 0.9534i |
| −0.3668 − 1.0301i |
| −0.3667 − 0.5995i |
| −0.3328 − 0.5960i |
| −0.3687 − 0.7194i |
| −0.3373 − 0.6964i |
| −0.1065 − 0.1146i |
| −0.1145 − 0.1108i |
| −0.1053 − 0.1274i |
| −0.1134 − 0.1236i |
| −0.1111 − 0.3821i |
| −0.1186 − 0.3867i |
| −0.1080 − 0.3431i |
| −0.1177 − 0.3459i |
| −0.3644 − 0.1080i |
| −0.3262 − 0.1104i |
| −0.3681 − 0.1173i |
| −0.3289 − 0.1196i |
| −0.3665 − 0.3758i |
| −0.3310 − 0.3795i |
| −0.3672 − 0.3353i |
| −0.3336 − 0.3402i |

TABLE 15

| CR = 11/15 SNR = 20.5 dB |
| --- |
| 0.3105 + 0.3382i |
| 0.4342 + 0.3360i |
| 0.3149 + 0.4829i |
| 0.4400 + 0.4807i |
| 0.1811 + 0.3375i |
| 0.0633 + 0.3404i |
| 0.1818 + 0.4851i |
| 0.0633 + 0.4815i |
| 0.3084 + 0.1971i |
| 0.4356 + 0.1993i |
| 0.3098 + 0.0676i |
| 0.4342 + 0.0691i |
| 0.1775 + 0.1985i |
| 0.0640 + 0.1978i |
| 0.1775 + 0.0676i |
| 0.0647 + 0.0669i |
| 0.7455 + 0.3411i |
| 0.5811 + 0.3396i |
| 0.7556 + 0.4669i |
| 0.5862 + 0.4756i |
| 0.9556 + 0.3280i |
| 1.1767 + 0.3091i |
| 0.9673 + 0.4720i |
| 1.2051 + 0.5135i |
| 0.7367 + 0.2015i |
| 0.5811 + 0.2015i |
| 0.7316 + 0.0669i |
| 0.5782 + 0.0669i |
| 0.9062 + 0.1971i |
| 1.2829 + 0.1185i |
| 0.9156 + 0.0735i |
| 1.1011 + 0.0735i |
| 0.3244 + 0.8044i |
| 0.4589 + 0.8218i |
| 0.3207 + 0.6415i |
| 0.4509 + 0.6371i |
| 0.1920 + 0.8196i |
| 0.0633 + 0.8167i |
| 0.1811 + 0.6371i |
| 0.0640 + 0.6415i |
| 0.3331 + 1.0669i |
| 0.4655 + 1.0087i |
| 0.3433 + 1.2865i |
| 0.5004 + 1.5062i |
| 0.1971 + 1.0051i |
| 0.0735 + 1.0298i |
| 0.1498 + 1.5018i |
| 0.0865 + 1.2553i |

TABLE 15-continued

| CR = 11/15 SNR = 20.5 dB |
| --- |
| 0.7811 + 0.8080i |
| 0.6167 + 0.8153i |
| 0.7636 + 0.6255i |
| 0.6000 + 0.6327i |
| 0.9898 + 0.7680i |
| 1.5855 + 0.1498i |
| 0.9476 + 0.6175i |
| 1.4625 + 0.4015i |
| 0.8276 + 1.0225i |
| 0.6313 + 1.0364i |
| 0.8815 + 1.2865i |
| 0.6342 + 1.2705i |
| 1.0422 + 0.9593i |
| 1.2749 + 0.8538i |
| 1.1556 + 1.1847i |
| 1.4771 + 0.6742i |
| −0.3105 + 0.3382i |
| −0.4342 + 0.3360i |
| −0.3149 + 0.4829i |
| −0.4400 + 0.4807i |
| −0.1811 + 0.3375i |
| −0.0633 + 0.3404i |
| −0.1818 + 0.4851i |
| −0.0633 + 0.4815i |
| −0.3084 + 0.1971i |
| −0.4356 + 0.1993i |
| −0.3098 + 0.0676i |
| −0.4342 + 0.0691i |
| −0.1775 + 0.1985i |
| −0.0640 + 0.1978i |
| −0.1775 + 0.0676i |
| −0.0647 + 0.0669i |
| −0.7455 + 0.3411i |
| −0.5811 + 0.3396i |
| −0.7556 + 0.4669i |
| −0.5862 + 0.4756i |
| −0.9556 + 0.3280i |
| −1.1767 + 0.3091i |
| −0.9673 + 0.4720i |
| −1.2051 + 0.5135i |
| −0.7367 + 0.2015i |
| −0.5811 + 0.2015i |
| −0.7316 + 0.0669i |
| −0.5782 + 0.0669i |
| −0.9062 + 0.1971i |
| −1.2829 + 0.1185i |
| −0.9156 + 0.0735i |
| −1.1011 + 0.0735i |
| −0.3244 + 0.8044i |
| −0.4589 + 0.8218i |
| −0.3207 + 0.6415i |
| −0.4509 + 0.6371i |
| −0.1920 + 0.8196i |
| −0.0633 + 0.8167i |
| −0.1811 + 0.6371i |
| −0.0640 + 0.6415i |
| −0.3331 + 1.0669i |
| −0.4655 + 1.0087i |
| −0.3433 + 1.2865i |
| −0.5004 + 1.5062i |
| −0.1971 + 1.0051i |
| −0.0735 + 1.0298i |
| −0.1498 + 1.5018i |
| −0.0865 + 1.2553i |
| −0.7811 + 0.8080i |
| −0.6167 + 0.8153i |
| −0.7636 + 0.6255i |
| −0.6000 + 0.6327i |
| −0.9898 + 0.7680i |
| −1.5855 + 0.1498i |
| −0.9476 + 0.6175i |
| −1.4625 + 0.4015i |
| −0.8276 + 1.0225i |
| −0.6313 + 1.0364i |
| −0.8815 + 1.2865i |
| −0.6342 + 1.2705i |
| −1.0422 + 0.9593i |
| −1.2749 + 0.8538i |

TABLE 15-continued

| CR = 11/15 SNR = 20.5 dB |
|---|
| −1.1556 + 1.1847i |
| −1.4771 + 0.6742i |
| 0.3105 − 0.3382i |
| 0.4342 − 0.3360i |
| 0.3149 − 0.4829i |
| 0.4400 − 0.4807i |
| 0.1811 − 0.3375i |
| 0.0633 − 0.3404i |
| 0.1818 − 0.4851i |
| 0.0633 − 0.4815i |
| 0.3084 − 0.1971i |
| 0.4356 − 0.1993i |
| 0.3098 − 0.0676i |
| 0.4342 − 0.0591i |
| 0.1775 − 0.1985i |
| 0.0640 − 0.1978i |
| 0.1775 − 0.0676i |
| 0.0647 − 0.0069i |
| 0.7455 − 0.3411i |
| 0.5811 − 0.3396i |
| 0.7555 − 0.4669i |
| 0.5862 − 0.4756i |
| 0.9556 − 0.3280i |
| 1.1767 − 0.3091i |
| 0.9673 − 0.4720i |
| 1.2051 − 0.5135i |
| 0.7367 − 0.2015i |
| 0.5811 − 0.2015i |
| 0.7316 − 0.0669i |
| 0.5782 − 0.0669i |
| 0.9062 − 0.1971i |
| 1.2829 − 0.1185i |
| 0.9156 − 0.0735i |
| 1.1011 − 0.0735i |
| 0.3244 − 0.8044i |
| 0.4589 − 0.8218i |
| 0.3207 − 0.6415i |
| 0.4509 − 0.6371i |
| 0.1920 − 0.8196i |
| 0.0633 − 0.8167i |
| 0.1811 − 0.6371i |
| 0.0640 − 0.6415i |
| 0.3331 − 1.0669i |
| 0.4655 − 1.0087i |
| 0.3433 − 1.2865i |
| 0.5004 − 1.5062i |
| 0.1971 − 1.0051i |
| 0.0735 − 1.0298i |
| 0.1498 − 1.5018i |
| 0.0865 − 1.2553i |
| 0.7811 − 0.8080i |
| 0.6167 − 0.8153i |
| 0.7636 − 0.6255i |
| 0.6000 − 0.6327i |
| 0.9898 − 0.7680i |
| 1.5855 − 0.1498i |
| 0.9476 − 0.6175i |
| 1.4625 − 0.4015i |
| 0.8275 − 1.0225i |
| 0.6313 − 1.0364i |
| 0.8815 − 1.2865i |
| 0.6342 − 1.2705i |
| 1.0422 − 0.9593i |
| 1.2749 − 0.8538i |
| 1.1556 − 1.1847i |
| 1.4771 − 0.6742i |
| −0.3105 − 0.3382i |
| −0.4342 − 0.3360i |
| −0.3149 − 0.4829i |
| −0.4400 − 0.4807i |
| −0.1811 − 0.3375i |
| −0.0633 − 0.3404i |
| −0.1818 − 0.4851i |
| −0.0633 − 0.4815i |
| −0.3084 − 0.1971i |
| −0.4356 − 0.1993i |
| −0.3098 − 0.0676i |
| −0.4342 − 0.0691i |

TABLE 15-continued

| CR = 11/15 SNR = 20.5 dB |
|---|
| −0.1775 − 0.1985i |
| −0.0640 − 0.1978i |
| −0.1775 − 0.0676i |
| −0.0647 − 0.0669i |
| −0.7455 − 0.3411i |
| −0.5811 − 0.3396i |
| −0.7556 − 0.4669i |
| −0.5862 − 0.4756i |
| −0.9556 − 0.3280i |
| −1.1767 − 0.3091i |
| −0.9673 − 0.4720i |
| −1.2051 − 0.5135i |
| −0.7367 − 0.2015i |
| −0.5811 − 0.2015i |
| −0.7316 − 0.0669i |
| −0.5782 − 0.0669i |
| −0.9062 − 0.1971i |
| −1.2829 − 0.1185i |
| −0.9156 − 0.0735i |
| −1.1011 − 0.0735i |
| −0.2244 − 0.8044i |
| −0.4589 − 0.8218i |
| −0.3207 − 0.6415i |
| −0.4609 − 0.6371i |
| −0.1920 − 0.8196i |
| −0.0633 − 0.8167i |
| −0.1811 − 0.6371i |
| −0.0640 − 0.6415i |
| −0.3331 − 1.0669i |
| −0.4655 − 1.0087i |
| −0.3433 − 1.2865i |
| −0.5004 − 1.5062i |
| −0.1971 − 1.0051i |
| −0.0735 − 1.0298i |
| −0.1498 − 1.5018i |
| −0.0865 − 1.2553i |
| −0.7811 − 0.8080i |
| −0.6167 − 0.8153i |
| −0.7636 − 0.6255i |
| −0.6000 − 0.6327i |
| −0.9898 − 0.7680i |
| −1.5853 − 0.1498i |
| −0.9476 − 0.6175i |
| −1.4625 − 0.4015i |
| −0.8275 − 1.0225i |
| −0.6313 − 1.0364i |
| −0.8815 − 1.2865i |
| −0.6342 − 1.2705i |
| −1.0422 − 0.9593i |
| −1.2749 − 0.8538i |
| −1.1556 − 1.1847i |
| −1.4771 − 0.6742i |

TABLE 16

| CR = 13/15 SNR = 24.5 dB |
|---|
| 0.3556 + 0.3497i |
| 0.3579 + 0.4945i |
| 0.5049 + 0.3571i |
| 0.5056 + 0.5063i |
| 0.2123 + 0.3497i |
| 0.2116 + 0.4900i |
| 0.0713 + 0.3489i |
| 0.0690 + 0.4960i |
| 0.3527 + 0.2086i |
| 0.3497 + 0.0713i |
| 0.4960 + 0.2123i |
| 0.4974 + 0.0698i |
| 0.2086 + 0.2079i |
| 0.2094 + 0.0690i |
| 0.0676 + 0.2079i |
| 0.0698 + 0.0683i |
| 0.3586 + 0.7959i |
| 0.3571 + 0.6392i |

TABLE 16-continued

| CR = 13/15 SNR = 24.5 dB |
|---|
| 0.5034 + 0.8271i |
| 0.5063 + 0.6600i |
| 0.2146 + 0.7862i |
| 0.2109 + 0.6340i |
| 0.0713 + 0.8093i |
| 0.0698 + 0.6467i |
| 0.2799 + 1.0862i |
| 0.2806 + 1.2755i |
| 0.4328 + 0.9904i |
| 0.4551 + 1.1812i |
| 0.2309 + 0.9414i |
| 0.1077 + 1.3891i |
| 0.0772 + 0.9852i |
| 0.0802 + 1.1753i |
| 0.8301 + 0.3727i |
| 0.8256 + 0.5256i |
| 0.6593 + 0.3668i |
| 0.6623 + 0.5182i |
| 1.0186 + 0.3645i |
| 1.0001 + 0.5242i |
| 1.1857 + 0.2725i |
| 1.3928 + 0.3408i |
| 0.8011 + 0.2227i |
| 0.7981 + 0.0735i |
| 0.6459 + 0.2198i |
| 0.6430 + 0.0713i |
| 0.9681 + 0.2205i |
| 0.9615 + 0.0735i |
| 1.3327 + 0.1039i |
| 1.1359 + 0.0809i |
| 0.8382 + 0.8709i |
| 0.8145 + 0.6934i |
| 0.6645 + 0.8486i |
| 0.6600 + 0.6786i |
| 1.1612 + 0.6949i |
| 0.9785 + 0.6942i |
| 1.3698 + 0.6259i |
| 1.2183 + 0.4841i |
| 0.7989 + 1.0498i |
| 0.4395 + 1.4203i |
| 0.6118 + 1.0246i |
| 0.6303 + 1.2421i |
| 1.0550 + 0.8924i |
| 0.8612 + 1.2800i |
| 1.2696 + 0.8969i |
| 1.0342 + 1.1181i |
| −0.3556 + 0.3497i |
| −0.3579 + 0.4945i |
| −0.5049 + 0.3571i |
| −0.5056 + 0.5063i |
| −0.2123 + 0.3497i |
| −0.2116 + 0.4900i |
| −0.0713 + 0.3489i |
| −0.0690 + 0.4960i |
| −0.3527 + 0.2086i |
| −0.3497 + 0.0713i |
| −0.4960 + 0.2123i |
| −0.4974 + 0.0693i |
| −0.2086 + 0.2079i |
| −0.2094 + 0.0690i |
| −0.0576 + 0.2079i |
| −0.0698 + 0.0683i |
| −0.3586 + 0.7959i |
| −0.3571 + 0.6392i |
| −0.5034 + 0.8271i |
| −0.5063 + 0.6600i |
| −0.2146 + 0.7862i |
| −0.2109 + 0.6340i |
| −0.0713 + 0.8093i |
| −0.0698 + 0.6467i |
| −0.2799 + 1.0862i |
| −0.2806 + 1.2755i |
| −0.4328 + 0.9904i |
| −0.4551 + 1.1812i |
| −0.2309 + 0.9414i |
| −0.1077 + 1.3891i |
| −0.0772 + 0.9852i |
| −0.0802 + 1.1753i |

TABLE 16-continued

| CR = 13/15 SNR = 24.5 dB |
|---|
| −0.8301 + 0.3727i |
| −0.8256 + 0.5256i |
| −0.6593 + 0.3668i |
| −0.6623 + 0.5182i |
| −1.0186 + 0.3645i |
| −1.0001 + 0.5242i |
| −1.1857 + 0.2725i |
| −1.3928 + 0.3408i |
| −0.8011 + 0.2227i |
| −0.7981 + 0.0735i |
| −0.6459 + 0.2198i |
| −0.6430 + 0.0713i |
| −0.9681 + 0.2205i |
| −0.9615 + 0.0735i |
| −1.3327 + 0.1039i |
| −1.1359 + 0.0809i |
| −0.8382 + 0.8709i |
| −0.8145 + 0.6934i |
| −0.6645 + 0.8486i |
| −0.6600 + 0.6786i |
| −1.1612 + 0.6949i |
| −0.9785 + 0.6942i |
| −1.3698 + 0.6259i |
| −1.2183 + 0.4841i |
| −0.7989 + 1.0498i |
| −0.4395 + 1.4203i |
| −0.6118 + 1.0246i |
| −0.6303 + 1.2421i |
| −1.0550 + 0.8924i |
| −0.8612 + 1.2800i |
| −1.2696 + 0.8969i |
| −1.0342 + 1.1181i |
| 0.3556 − 0.3497i |
| 0.3579 − 0.4945i |
| 0.5049 − 0.3571i |
| 0.5056 − 0.5063i |
| 0.2123 − 0.3497i |
| 0.2116 − 0.4900i |
| 0.0713 − 0.3489i |
| 0.0690 − 0.4960i |
| 0.3527 − 0.2086i |
| 0.3497 − 0.0713i |
| 0.4960 − 0.2123i |
| 0.4974 − 0.0698i |
| 0.2086 − 0.2079i |
| 0.2094 − 0.0690i |
| 0.0676 − 0.2079i |
| 0.0698 − 0.0683i |
| 0.3586 − 0.7959i |
| 0.3571 − 0.6392i |
| 0.5034 − 0.8271i |
| 0.5063 − 0.6600i |
| 0.2146 − 0.7862i |
| 0.2109 − 0.6340i |
| 0.0713 − 0.8093i |
| 0.0698 − 0.6467i |
| 0.2799 − 1.0862i |
| 0.2806 − 1.2755i |
| 0.4328 − 0.9904i |
| 0.4551 − 1.1812i |
| 0.2309 − 0.9414i |
| 0.1077 − 1.3891i |
| 0.0772 − 0.9852i |
| 0.0802 − 1.1753i |
| 0.8301 − 0.3727i |
| 0.8256 − 0.5256i |
| 0.6593 − 0.3668i |
| 0.6623 − 0.5182i |
| 1.0156 − 0.3645i |
| 1.0001 − 0.5242i |
| 1.1857 − 0.2725i |
| 1.3928 − 0.3408i |
| 0.8011 − 0.2227i |
| 0.7981 − 0.0735i |
| 0.6459 − 0.2198i |
| 0.6430 − 0.0713i |
| 0.9681 − 0.2205i |
| 0.9615 − 0.0735i |

TABLE 16-continued

| CR = 13/15 SNR = 24.5 dB |
|---|
| 1.3327 − 0.1039i |
| 1.1359 − 0.0809i |
| 0.8382 − 0.8709i |
| 0.8145 − 0.6934i |
| 0.6545 − 0.8486i |
| 0.6600 − 0.6786i |
| 1.1612 − 0.6949i |
| 0.9785 − 0.6942i |
| 1.3698 − 0.6259i |
| 1.2183 − 0.4841i |
| 0.7989 − 1.0498i |
| 0.4395 − 1.4203i |
| 0.6118 − 1.0246i |
| 0.6303 − 1.2421i |
| 1.0550 − 0.8924i |
| 0.8612 − 1.2800i |
| 1.2696 − 0.8969i |
| 1.0342 − 1.1181i |
| −0.3556 − 0.3497i |
| −0.3579 − 0.4945i |
| −0.5049 − 0.3571i |
| −0.5056 − 0.5063i |
| −0.2123 − 0.3497i |
| −0.2116 − 0.4900i |
| −0.0713 − 0.3489i |
| −0.0690 − 0.4960i |
| −0.3527 − 0.2086i |
| −0.3497 − 0.0713i |
| −0.4960 − 0.2123i |
| −0.4974 − 0.0698i |
| −0.2086 − 0.2079i |
| −0.2094 − 0.0690i |
| −0.0676 − 0.2079i |
| −0.0698 − 0.0683i |
| −0.3585 − 0.7959i |
| −0.3571 − 0.6392i |
| −0.5034 − 0.8271i |
| −0.5063 − 0.6600i |
| −0.2145 − 0.7862i |
| −0.2109 − 0.6340i |
| −0.0713 − 0.8093i |
| −0.0698 − 0.6467i |
| −0.2799 − 1.0862i |
| −0.2806 − 1.2755i |
| −0.4328 − 0.9904i |
| −0.4551 − 1.1812i |
| −0.2309 − 0.9414i |
| −0.1077 − 1.3891i |
| −0.0772 − 0.9852i |
| −0.0802 − 1.1753i |
| −0.8301 − 0.3727i |
| −0.8256 − 0.5256i |
| −0.6593 − 0.3668i |
| −0.6623 − 0.5182i |
| −1.0186 − 0.3645i |
| −1.0001 − 0.5242i |
| −1.1857 − 0.2725i |
| −1.3928 − 0.3408i |
| −0.8011 − 0.2227i |
| −0.7981 − 0.0735i |
| −0.6459 − 0.2198i |
| −0.6430 − 0.0713i |
| −0.9681 − 0.2205i |
| −0.9615 − 0.0735i |
| −1.3327 − 0.1039i |
| −1.1359 − 0.0809i |
| −0.8382 − 0.8709i |
| −0.8145 − 0.6934i |
| −0.6645 − 0.8486i |
| −0.6600 − 0.6786i |
| −1.1612 − 0.6949i |
| −0.9785 − 0.6942i |
| −1.3698 − 0.6259i |
| −1.2183 − 0.4841i |
| −0.7989 − 1.0498i |
| −0.4395 − 1.4203i |
| −0.6118 − 1.0246i |
| −0.6303 − 1.2421i |

TABLE 16-continued

| CR = 13/15 SNR = 24.5 dB |
|---|
| −1.0550 − 0.8924i |
| −0.8612 − 1.2800i |
| −1.2696 − 0.8969i |
| −1.0342 − 1.1181i |

TABLE 17

| CR = 5/15 SNR = 13 dB |
|---|
| 1 |
| 1 |
| 1 |
| 1 |
| 2.586207 |
| 2.586207 |
| 2.62069 |
| 2.62069 |
| 4.758621 |
| 4.793103 |
| 5.206897 |
| 5.137931 |
| 7.344828 |
| 7.586207 |
| 8.758621 |
| 11.06897 |

TABLE 18

| CR = 7/15 SNR = 17 dB |
|---|
| 1.000000 |
| 1.000000 |
| 1.040000 |
| 1.040000 |
| 3.000000 |
| 3.040000 |
| 3.280000 |
| 3.320000 |
| 5.240000 |
| 5.320000 |
| 6.040000 |
| 6.280000 |
| 8.240000 |
| 8.840000 |
| 11.040000 |
| 13.680000 |

TABLE 19

| CR = 9/15 SNR = 20.5 dB |
|---|
| 1.000000 |
| 1.000000 |
| 2.785714 |
| 2.785714 |
| 4.857143 |
| 4.857143 |
| 6.857143 |
| 6.857143 |
| 9.142857 |
| 9.285714 |
| 11.571429 |
| 12.214286 |
| 14.642857 |
| 16.428571 |
| 19.428571 |
| 23.285714 |

TABLE 20

| CR = 11/15 SNR = 25 dB |
| --- |
| 1.000000 |
| 1.166667 |
| 3.083333 |
| 3.333333 |
| 5.166667 |
| 5.750000 |
| 7.416667 |
| 8.500000 |
| 10.083333 |
| 11.583333 |
| 13.333333 |
| 15.250000 |
| 17.333333 |
| 19.750000 |
| 22.416667 |
| 25.533333 |

TABLE 21

| CR = 13/15 SNR = 29.5 dB |
| --- |
| 1.000000 |
| 2.857143 |
| 4.857143 |
| 6.857143 |
| 8.857143 |
| 11.000000 |
| 13.285714 |
| 15.714286 |
| 18.142857 |
| 20.714286 |
| 23.428571 |
| 26.285714 |
| 29.285714 |
| 32.428571 |
| 35.714286 |
| 39.428571 |

Annex to the Description—Annex 8

TABLE 22

| CR 7/15 | | CR 9/15 | | CR 11/15 | | CR 13/15 | |
| --- | --- | --- | --- | --- | --- | --- | --- |
| Label | Constellation | Label | Constellation | Label | Constellation | Label | Constellation |
| 0 | 1.5177 + 1.5177i | 0 | 1.4645 + 1.4645i | 0 | 1.3885 + 1.3885i | 0 | 1.3184 + 1.3184i |
| 1 | 1.5177 + 1.2375i | 1 | 1.4645 + 1.2234i | 1 | 1.3885 + 1.2157i | 1 | 1.3184 + 1.1795i |
| 2 | 1.2375 + 1.5177i | 2 | 1.2234 + 1.4645i | 2 | 1.2157 + 1.3885i | 2 | 1.1795 + 1.3184i |
| 3 | 1.2375 + 1.2375i | 3 | 1.2234 + 1.2234i | 3 | 1.2157 + 1.2157i | 3 | 1.1795 + 1.1795i |
| 4 | 1.5177 + 0.9252i | 4 | 1.4645 + 0.9218i | 4 | 1.3885 + 0.9431i | 4 | 1.3184 + 0.9498i |
| 5 | 1.5177 + 1.0200i | 5 | 1.4645 + 1.0366i | 5 | 1.3885 + 1.0703i | 5 | 1.3184 + 1.0588i |
| 6 | 1.2375 + 0.9252i | 6 | 1.2234 + 0.9218i | 6 | 1.2157 + 0.9431i | 6 | 1.1795 + 0.9498i |
| 7 | 1.2375 + 1.0200i | 7 | 1.2234 + 1.0366i | 7 | 1.2157 + 1.0703i | 7 | 1.1795 + 1.0588i |
| 8 | 0.9252 + 1.5177i | 8 | 0.9218 + 1.4645i | 8 | 0.9431 + 1.3885i | 8 | 0.9498 + 1.3184i |
| 9 | 0.9252 + 1.2375i | 9 | 0.9218 + 1.2234i | 9 | 0.9431 + 1.2157i | 9 | 0.9498 + 1.1795i |
| 10 | 1.0200 + 1.5177i | 10 | 1.0366 + 1.4645i | 10 | 1.0703 + 1.3885i | 10 | 1.0588 + 1.3184i |
| 11 | 1.0200 + 1.2375i | 11 | 1.0366 + 1.2234i | 11 | 1.0703 + 1.2157i | 11 | 1.0588 + 1.1795i |
| 12 | 0.9252 + 0.9252i | 12 | 0.9218 + 0.9218i | 12 | 0.9431 + 0.9431i | 12 | 0.9498 + 0.9498i |
| 13 | 0.9252 + 1.0200i | 13 | 0.9218 + 1.0366i | 13 | 0.9431 + 1.0703i | 13 | 0.9498 + 1.0588i |
| 14 | 1.0200 + 0.9252i | 14 | 1.0366 + 0.9218i | 14 | 1.0703 + 0.9431i | 14 | 1.0588 + 0.9498i |
| 15 | 1.0200 + 1.0200i | 15 | 1.0366 + 1.0366i | 15 | 1.0703 + 1.0703i | 15 | 1.0588 + 1.0588i |
| 16 | 1.5177 + 0.5833i | 16 | 1.4645 + 0.5765i | 16 | 1.3885 + 0.5539i | 16 | 1.3184 + 0.5878i |
| 17 | 1.5177 + 0.5803i | 17 | 1.4645 + 0.5863i | 17 | 1.3885 + 0.6361i | 17 | 1.3184 + 0.6696i |
| 18 | 1.2375 + 0.5833i | 18 | 1.2234 + 0.5765i | 18 | 1.2157 + 0.5539i | 18 | 1.1795 + 0.5878i |
| 19 | 1.2375 + 0.5803i | 19 | 1.2234 + 0.5863i | 19 | 1.2157 + 0.6361i | 19 | 1.1795 + 0.6696i |
| 20 | 1.5177 + 0.7327i | 20 | 1.4645 + 0.7706i | 20 | 1.3885 + 0.8300i | 20 | 1.3184 + 0.8497i |
| 21 | 1.5177 + 0.7094i | 21 | 1.4645 + 0.7279i | 21 | 1.3885 + 0.7294i | 21 | 1.3184 + 0.7566i |
| 22 | 1.2375 + 0.7327i | 22 | 1.2234 + 0.7706i | 22 | 1.2157 + 0.8300i | 22 | 1.1795 + 0.8497i |
| 23 | 1.2375 + 0.7094i | 23 | 1.2234 + 0.7279i | 23 | 1.2157 + 0.7294i | 23 | 1.1795 + 0.7566i |
| 24 | 0.9252 + 0.5833i | 24 | 0.9218 + 0.5765i | 24 | 0.9431 + 0.5539i | 24 | 0.9498 + 0.5878i |
| 25 | 0.9252 + 0.5803i | 25 | 0.9218 + 0.5863i | 25 | 0.9431 + 0.6361i | 25 | 0.9498 + 0.6696i |
| 26 | 1.0200 + 0.5833i | 26 | 1.0366 + 0.5765i | 26 | 1.0703 + 0.5539i | 26 | 1.0588 + 0.5878i |
| 27 | 1.0200 + 0.5803i | 27 | 1.0366 + 0.5863i | 27 | 1.0703 + 0.6361i | 27 | 1.0588 + 0.6696i |
| 28 | 0.9252 + 0.7327i | 28 | 0.9218 + 0.7706i | 28 | 0.9431 + 0.8300i | 28 | 0.9498 + 0.8497i |
| 29 | 0.9252 + 0.7094i | 29 | 0.9218 + 0.7279i | 29 | 0.9431 + 0.7294i | 29 | 0.9498 + 0.7566i |
| 30 | 1.0200 + 0.7327i | 30 | 1.0366 + 0.7706i | 30 | 1.0703 + 0.8300i | 30 | 1.0588 + 0.8497i |
| 31 | 1.0200 + 0.7094i | 31 | 1.0366 + 0.7279i | 31 | 1.0703 + 0.7294i | 31 | 1.0588 + 0.7566i |
| 32 | 0.5833 + 1.5177i | 32 | 0.5765 + 1.4645i | 32 | 0.5539 + 1.3885i | 32 | 0.5878 + 1.3184i |
| 33 | 0.5833 + 1.2375i | 33 | 0.5765 + 1.2234i | 33 | 0.5539 + 1.2157i | 33 | 0.5878 + 1.1795i |
| 34 | 0.5803 + 1.5177i | 34 | 0.5863 + 1.4645i | 34 | 0.6361 + 1.3885i | 34 | 0.6596 + 1.3104i |
| 35 | 0.5803 + 1.2375i | 35 | 0.5863 + 1.2234i | 35 | 0.6361 + 1.2157i | 35 | 0.6696 + 1.1795i |
| 36 | 0.5833 + 0.9252i | 36 | 0.5765 + 0.9218i | 36 | 0.5539 + 0.9431i | 36 | 0.5878 + 0.9498i |
| 37 | 0.5833 + 1.0200i | 37 | 0.5765 + 1.0366i | 37 | 0.5539 + 1.0703i | 37 | 0.5878 + 1.0588i |
| 38 | 0.5803 + 0.9252i | 38 | 0.5863 + 0.9218i | 38 | 0.6361 + 0.9431i | 38 | 0.6696 + 0.9498i |
| 39 | 0.5803 + 1.0200i | 39 | 0.5863 + 1.0366i | 39 | 0.6361 + 1.0703i | 39 | 0.6696 + 1.0588i |
| 40 | 0.7327 + 1.5177i | 40 | 0.7706 + 1.4645i | 40 | 0.8300 + 1.3885i | 40 | 0.8497 + 1.3184i |
| 41 | 0.7327 + 1.2375i | 41 | 0.7706 + 1.2234i | 41 | 0.8300 + 1.2157i | 41 | 0.8497 + 1.1795i |
| 42 | 0.7094 + 1.5177i | 42 | 0.7279 + 1.4645i | 42 | 0.7294 + 1.3885i | 42 | 0.7566 + 1.3184i |
| 43 | 0.7094 + 1.2375i | 43 | 0.7279 + 1.2234i | 43 | 0.7294 + 1.2157i | 43 | 0.7566 + 1.1795i |
| 44 | 0.7327 + 0.9252i | 44 | 0.7706 + 0.9218i | 44 | 0.8300 + 0.9431i | 44 | 0.8497 + 0.9498i |
| 45 | 0.7327 + 1.0200i | 45 | 0.7706 + 1.0366i | 45 | 0.8300 + 1.0703i | 45 | 0.8497 + 1.0588i |
| 46 | 0.7094 + 0.9252i | 46 | 0.7279 + 0.9218i | 46 | 0.7294 + 0.9431i | 46 | 0.7566 + 0.9498i |
| 47 | 0.7094 + 1.0200i | 47 | 0.7279 + 1.0366i | 47 | 0.7294 + 1.0703i | 47 | 0.7566 + 1.0588i |
| 48 | 0.5833 + 0.5833i | 48 | 0.5765 + 0.5765i | 48 | 0.5539 + 0.5539i | 48 | 0.5878 + 0.5878i |
| 49 | 0.5833 + 0.5803i | 49 | 0.5765 + 0.5863i | 49 | 0.5539 + 0.6361i | 49 | 0.5878 + 0.6696i |

TABLE 22-continued

| CR 7/15 | | CR 9/15 | | CR 11/15 | | CR 13/15 | |
|---|---|---|---|---|---|---|---|
| Label | Constellation | Label | Constellation | Label | Constellation | Label | Constellation |
| 50 | 0.5803 + 0.5833i | 50 | 0.5863 + 0.5765i | 50 | 0.6361 + 0.5539i | 50 | 0.6696 + 0.5878i |
| 51 | 0.5803 + 0.5803i | 51 | 0.5863 + 0.5863i | 51 | 0.6361 + 0.6361i | 51 | 0 6696 + 0.5696i |
| 52 | 0.5833 + 0.7327i | 52 | 0.5765 + 0.7706i | 52 | 0.5539 + 0.8300i | 52 | 0.5878 + 0.8497i |
| 53 | 0.5833 + 0.7094i | 53 | 0.5765 + 0.7279i | 53 | 0.5539 + 0.7294i | 53 | 0.5878 + 0.7566i |
| 54 | 0.5803 + 0.7327i | 54 | 0.5863 + 0.7706i | 54 | 0.6361 + 0.8300i | 54 | 0.6696 + 0.8497i |
| 55 | 0.5803 + 0.7094i | 55 | 0.5863 + 0.7279i | 55 | 0.6361 + 0.7294i | 55 | 0.6696 + 0.7566i |
| 56 | 0.7327 + 0.5833i | 56 | 0.7706 + 0.5765i | 56 | 0.8300 + 0.5539i | 56 | 0.8497 + 0.5878i |
| 57 | 0.7327 + 0.5803i | 57 | 0.7706 + 0.5863i | 57 | 0.8300 + 0.6361i | 57 | 0.8497 + 0.6696i |
| 58 | 0.7094 + 0.5833i | 58 | 0.7279 + 0.5765i | 58 | 0.7294 + 0.5539i | 58 | 0.7566 + 0.5878i |
| 59 | 0.7094 + 0.5803i | 59 | 0.7279 + 0.5863i | 59 | 0.7294 + 0.6361i | 59 | 0.7566 + 0.6696i |
| 60 | 0.7327 + 0.7327i | 60 | 0.7706 + 0.7706i | 60 | 0.8300 + 0.8300i | 60 | 0.8497 + 0.8497i |
| 61 | 0.7327 + 0.7094i | 61 | 0.7706 + 0.7279i | 61 | 0.8300 + 0.7294i | 61 | 0.8497 + 0.7566i |
| 62 | 0.7094 + 0.7327i | 62 | 0.7279 + 0.7706i | 62 | 0.7294 + 0.8300i | 62 | 0.7566 + 0.8497i |
| 63 | 0.7094 + 0.7094i | 63 | 0.7279 + 0.7279i | 63 | 0.7294 + 0.7294i | 63 | 0.7566 + 0.7566i |
| 64 | 1.5177 + 0.1056i | 64 | 1.4645 + 0.0640i | 64 | 1.3885 + 0.0501i | 64 | 1.3184 + 0.0325i |
| 65 | 1.5177 + 0.1052i | 65 | 1.4645 + 0.0641i | 65 | 1.3885 + 0.0640i | 65 | 1.3184 + 0.0967i |
| 66 | 1.2375 + 0.1056i | 66 | 1.2234 + 0.0640i | 66 | 1.2157 + 0.0501i | 66 | 1.1795 + 0.0325i |
| 67 | 1.2375 + 0.1052i | 67 | 1.2234 + 0.0641i | 67 | 1.2157 + 0.0640i | 67 | 1.1795 + 0.0967i |
| 68 | 1.5177 + 0.1263i | 68 | 1.4645 + 0.1752i | 68 | 1.3885 + 0.1844i | 68 | 1.3184 + 0.2280i |
| 69 | 1.5177 + 0.1260i | 69 | 1.4645 + 0.1753i | 69 | 1.3885 + 0.1616i | 69 | 1.3184 + 0.1623i |
| 70 | 1.2375 + 0.1263i | 70 | 1.2234 + 0.1752i | 70 | 1.2157 + 0.1844i | 70 | 1.1795 + 0.2280i |
| 71 | 1.2375 + 0.1260i | 71 | 1.2234 + 0.1753i | 71 | 1.2157 + 0.1616i | 71 | 1.1795 + 0.1623i |
| 72 | 0.9252 + 0.1056i | 72 | 0.9218 + 0.0640i | 72 | 0.9431 + 0.0501i | 72 | 0.9498 + 0.0325i |
| 73 | 0.9252 + 0.1052i | 73 | 0.9218 + 0.0641i | 73 | 0.9431 + 0.0640i | 73 | 0.9498 + 0.0967i |
| 74 | 1.0200 + 0.1056i | 74 | 1.0366 + 0.0640i | 74 | 1.0703 + 0.0501i | 74 | 1.0588 + 0.0325i |
| 75 | 1.0200 + 0.1052i | 75 | 1.0366 + 0.0641i | 75 | 1.0703 + 0.0640i | 75 | 1.0588 + 0.0967i |
| 76 | 0.9252 + 0.1263i | 76 | 0.9218 + 0.1752i | 76 | 0.9431 + 0.1844i | 76 | 0.9498 + 0.2280i |
| 77 | 0.9252 + 0.1260i | 77 | 0.9218 + 0.1753i | 77 | 0.9431 + 0.1616i | 77 | 0.9498 + 0.1623i |
| 78 | 1.0200 + 0.1263i | 78 | 1.0366 + 0.1752i | 78 | 1.0703 + 0.1844i | 78 | 1.0588 + 0.2280i |
| 79 | 1.0200 + 0.1260i | 79 | 1.0366 + 0.1753i | 79 | 1.0703 + 0.1616i | 79 | 1.0588 + 0.1623i |
| 80 | 1.5177 + 0.3821i | 80 | 1.4645 + 0.4342i | 80 | 1.3885 + 0.4684i | 80 | 1.3184 + 0.5100i |
| 81 | 1.5177 + 0.3842i | 81 | 1.4645 + 0.4332i | 81 | 1.3885 + 0.4042i | 81 | 1.3184 + 0.4361i |
| 82 | 1.2375 + 0.3821i | 82 | 1.2234 + 0.4342i | 82 | 1.2157 + 0.4684i | 82 | 1.1795 + 0.5100i |
| 83 | 1.2375 + 0.3842i | 83 | 1.2234 + 0.4332i | 83 | 1.2157 + 0.4042i | 83 | 1.1795 + 0.4361i |
| 84 | 1.5177 + 0.3188i | 84 | 1.4645 + 0.3073i | 84 | 1.3885 + 0.2761i | 84 | 1.3184 + 0.2957i |
| 85 | 1.5177 + 0.3200i | 85 | 1.4645 + 0.3069i | 85 | 1.3885 + 0.3180i | 85 | 1.3184 + 0.3645i |
| 86 | 1.2375 + 0.3188i | 86 | 1.2234 + 0.3073i | 86 | 1.2157 + 0.2761i | 86 | 1.1795 + 0.2957i |
| 87 | 1.2375 + 0.3200i | 87 | 1.2234 + 0.3069i | 87 | 1.2157 + 0.3180i | 87 | 1.1795 + 0.3645i |
| 88 | 0.9252 + 0.3821i | 88 | 0.9218 + 0.4342i | 88 | 0.9431 + 0.4684i | 88 | 0.9498 + 0.5100i |
| 89 | 0.9252 + 0.3842i | 89 | 0.9218 + 0.4332i | 89 | 0.9431 + 0.4042i | 89 | 0.9498 + 0.4361i |
| 90 | 1.0200 + 0.3821i | 90 | 1.0366 + 0.4342i | 90 | 1.0703 + 0.4684i | 90 | 1.0588 + 0.5100i |
| 91 | 1.0200 + 0.3842i | 91 | 1.0366 + 0.4332i | 91 | 1.0703 + 0.4042i | 91 | 1.0568 + 0.4361i |
| 92 | 0.9252 + 0.3188i | 92 | 0.9218 + 0.3073i | 92 | 0.9431 + 0.2761i | 92 | 0.9498 + 0.2957i |
| 93 | 0.9252 + 0.3200i | 93 | 0.9218 + 0.3069i | 93 | 0.9431 + 0.3180i | 93 | 0.9498 + 0.3645i |
| 94 | 1.0200 + 0.3188i | 94 | 1.0366 + 0.3073i | 94 | 1.0703 + 0.2761i | 94 | 1.0588 + 0.2957i |
| 95 | 1.0200 + 0.3200i | 95 | 1.0366 + 0.3069i | 95 | 1.0703 + 0.3189i | 95 | 1.0588 + 0.2545i |
| 96 | 0.5833 + 0.1056i | 96 | 0.5765 + 0.0640i | 96 | 0.5539 + 0.0501i | 96 | 0.5875 + 0.0325i |
| 97 | 0.5833 + 0.1052i | 97 | 0.5765 + 0.0641i | 97 | 0.5539 + 0.0640i | 97 | 0.5878 + 0.0967i |
| 98 | 0.5803 + 0.1056i | 98 | 0.5863 + 0.0640i | 98 | 0.6361 + 0.0501i | 98 | 0.6696 + 0.0325i |
| 99 | 0.5803 + 0.1052i | 99 | 0.5863 + 0.0641i | 99 | 0.6361 + 0.0640i | 99 | 0.6696 + 0.0967i |
| 100 | 0.5833 + 0.1263i | 100 | 0.5765 + 0.1752i | 100 | 0.5539 + 0.1844i | 100 | 0.5878 + 0.2280i |
| 101 | 0.5833 + 0.1260i | 101 | 0.5765 + 0.1753i | 101 | 0.5539 + 0.1616i | 101 | 0.5878 + 0.1623i |
| 102 | 0.5803 + 0.1263i | 102 | 0.5863 + 0.1752i | 102 | 0.6361 + 0.1844i | 102 | 0.6696 + 0.2280i |
| 103 | 0.5803 + 0.1260i | 103 | 0.5863 + 0.1753i | 103 | 0.6361 + 0.1616i | 103 | 0.6696 + 0.1623i |
| 104 | 0.7327 + 0.1056i | 104 | 0.7706 + 0.0640i | 104 | 0.8300 + 0.0501i | 104 | 0.8497 + 0.0325i |
| 105 | 0.7327 + 0.1052i | 105 | 0.7706 + 0.0641i | 105 | 0.8300 + 0.0640i | 105 | 0.8497 + 0.0967i |
| 106 | 0.7094 + 0.1056i | 106 | 0.7279 + 0.0640i | 106 | 0.7294 + 0.0501i | 106 | 0.7566 + 0.0325i |
| 107 | 0.7094 + 0.1052i | 107 | 0.7279 + 0.0641i | 107 | 0.7294 + 0.0640i | 107 | 0.7566 + 0.0967i |
| 108 | 0.7327 + 0.1263i | 108 | 0.7706 + 0.1752i | 108 | 0.8300 + 0.1844i | 108 | 0.8497 + 0.2280i |
| 109 | 0.7327 + 0.1260i | 109 | 0.7706 + 0.1753i | 109 | 0.8300 + 0.1616i | 109 | 0.8497 + 0.1623i |
| 110 | 0.7094 + 0.1263i | 110 | 0.7279 + 0.1752i | 110 | 0.7294 + 0.1844i | 110 | 0.7566 + 0.2280i |
| 111 | 0.7094 + 0.1260i | 111 | 0.7279 + 0.1753i | 111 | 0.7294 + 0.1616i | 111 | 0.7566 + 0.1623i |
| 112 | 0.5833 + 0.3821i | 112 | 0.5765 + 0.4342i | 112 | 0.5539 + 0.4684i | 112 | 0.5878 + 0.5100i |
| 113 | 0.5833 + 0.3842i | 113 | 0.5765 + 0.4332i | 113 | 0.5539 + 0.4042i | 113 | 0.5878 + 0.4361i |
| 114 | 0.5803 + 0.3821i | 114 | 0.5863 + 0.4342i | 114 | 0.6361 + 0.4684i | 114 | 0.6696 + 0.5100i |
| 115 | 0.5803 + 0.3842i | 115 | 0.5863 + 0.4332i | 115 | 0.6361 + 0.4042i | 115 | 0.6696 + 0.4361i |
| 116 | 0.5833 + 0.3188i | 116 | 0.5765 + 0.3073i | 116 | 0.5539 + 0.2761i | 116 | 0.5878 + 0.2957i |
| 117 | 0.5833 + 0.3200i | 117 | 0.5765 + 0.3069i | 117 | 0.5539 + 0.3180i | 117 | 0.5878 + 0.3645i |
| 118 | 0.5803 + 0.3188i | 118 | 0.5863 + 0.3073i | 118 | 0.6361 + 0.2761i | 118 | 0.6696 + 0.2957i |
| 119 | 0.5803 + 0.3200i | 119 | 0.5863 + 0.3069i | 119 | 0.6361 + 0.3180i | 119 | 0.6696 + 0.3645i |
| 120 | 0.7327 + 0.3821i | 120 | 0.7706 + 0.4342i | 120 | 0.8300 + 0.4684i | 120 | 0.8497 + 0.5100i |
| 121 | 0.7327 + 0.3842i | 121 | 0.7706 + 0.4332i | 121 | 0.8300 + 0.4042i | 121 | 0.8497 + 0.4361i |
| 122 | 0.7094 + 0.3821i | 122 | 0.7279 + 0.4342i | 122 | 0.7294 + 0.4684i | 122 | 0.7566 + 0.5100i |
| 123 | 0.7094 + 0.3842i | 123 | 0.7279 + 0.4332i | 123 | 0.7294 + 0.4042i | 123 | 0.7566 + 0.4361i |
| 124 | 0.7327 + 0.3188i | 124 | 0.7706 + 0.3073i | 124 | 0.8300 + 0.2761i | 124 | 0.8497 + 0.2957i |
| 125 | 0.7327 + 0.3200i | 125 | 0.7706 + 0.3069i | 125 | 0.8300 + 0.3180i | 125 | 0.8497 + 0.3645i |

TABLE 22-continued

| CR 7/15 | | CR 9/15 | | CR 11/15 | | CR 13/15 | |
|---|---|---|---|---|---|---|---|
| Label | Constellation | Label | Constellation | Label | Constellation | Label | Constellation |
| 126 | 0.7094 + 0.3188i | 125 | 0.7279 + 0.3073i | 126 | 0.7294 + 0.2761i | 126 | 0.7566 + 0.2957i |
| 127 | 0.7094 + 0.3200i | 127 | 0.7279 + 0.3069i | 127 | 0.7294 + 0.3180i | 127 | 0.7566 + 0.3645i |
| 128 | 0.1056 + 1.5177i | 128 | 0.0640 + 1.4645i | 128 | 0.0501 + 1.3885i | 128 | 0.0325 + 1.3184i |
| 129 | 0.1056 + 1.2375i | 129 | 0.0640 + 1.2234i | 129 | 0.0501 + 1.2157i | 129 | 0.0325 + 1.1795i |
| 130 | 0.1052 + 1.5177i | 130 | 0.0641 + 1.4645i | 130 | 0.0640 + 1.3885i | 130 | 0.0967 + 1.3184i |
| 131 | 0.1052 + 1.2375i | 131 | 0.0641 + 1.2234i | 131 | 0.0640 + 1.2157i | 131 | 0.0967 + 1.1795i |
| 132 | 0.1056 + 0.9252i | 132 | 0.0640 + 0.9218i | 132 | 0.0501 + 0.9431i | 132 | 0.0325 + 0.9498i |
| 133 | 0.1056 + 1.0200i | 133 | 0.0640 + 1.0366i | 133 | 0.0501 + 1.0703i | 133 | 0.0325 + 1.0588i |
| 134 | 0.1052 + 0.9252i | 134 | 0.0641 + 0.9218i | 134 | 0.0640 + 0.9431i | 134 | 0.0967 + 0.9498i |
| 135 | 0.1052 + 1.0200i | 135 | 0.0641 + 1.0366i | 135 | 0.0640 + 1.0703i | 135 | 0.0967 + 1.0588i |
| 136 | 0.1263 + 1.5177i | 136 | 0.1752 + 1.4645i | 136 | 0.1844 + 1.3885i | 136 | 0.2280 + 1.3184i |
| 137 | 0.1263 + 1.2375i | 137 | 0.1752 + 1.2234i | 137 | 0.1844 + 1.2157i | 137 | 0.2280 + 1.1795i |
| 138 | 0.1260 + 1.5177i | 138 | 0.1753 + 1.4645i | 138 | 0.1616 + 1.3885i | 138 | 0.1623 + 1.3184i |
| 139 | 0.1260 + 1.2375i | 139 | 0.1753 + 1.2234i | 139 | 0.1616 + 1.2157i | 139 | 0.1623 + 1.1795i |
| 140 | 0.1263 + 0.9252i | 140 | 0.1752 + 0.9218i | 140 | 0.1844 + 0.9431i | 140 | 0.2280 + 0.9498i |
| 141 | 0.1263 + 1.0200i | 141 | 0.1752 + 1.0366i | 141 | 0.1844 + 1.0703i | 141 | 0.2280 + 1.0588i |
| 142 | 0.1260 + 0.9252i | 142 | 0.1753 + 0.9218i | 142 | 0.1616 + 0.9431i | 142 | 0.1623 + 0.9498i |
| 143 | 0.1260 + 1.0200i | 143 | 0.1753 + 1.0366i | 143 | 0.1616 + 1.0703i | 143 | 0.1623 + 1.0588i |
| 144 | 0.1056 + 0.5833i | 144 | 0.0640 + 0.5765i | 144 | 0.0501 + 0.5539i | 144 | 0.0325 + 0.5878i |
| 145 | 0.1056 + 0.5803i | 145 | 0.0640 + 0.5863i | 145 | 0.0501 + 0.6361i | 145 | 0.0325 + 0.6696i |
| 146 | 0.1052 + 0.5833i | 146 | 0.0641 + 0.5765i | 146 | 0.0640 + 0.5539i | 146 | 0.0967 + 0.5878i |
| 147 | 0.1052 + 0.5803i | 147 | 0.0641 + 0.5863i | 147 | 0.0640 + 0.6361i | 147 | 0.0967 + 0.6396i |
| 148 | 0.1056 + 0.7327i | 148 | 0.0640 + 0.7706i | 148 | 0.0501 + 0.8300i | 148 | 0.0325 + 0.8497i |
| 149 | 0.1056 + 0.7094i | 149 | 0.0640 + 0.7279i | 149 | 0.0501 + 0.7294i | 149 | 0.0325 + 0.7566i |
| 150 | 0.1052 + 0.7327i | 150 | 0.0641 + 0.7706i | 150 | 0.0640 + 0.8300i | 150 | 0.0967 + 0.8497i |
| 151 | 0.1052 + 0.7094i | 151 | 0.0641 + 0.7279i | 151 | 0.0640 + 0.7294i | 151 | 0.0967 + 0.7566i |
| 152 | 0.1263 + 0.5833i | 152 | 0.1752 + 0.5765i | 152 | 0.1844 + 0.5539i | 152 | 0.2280 + 0.5878i |
| 153 | 0.1263 + 0.5803i | 153 | 0.1752 + 0.5863i | 153 | 0.1844 + 0.6361i | 153 | 0.2280 + 0.6696i |
| 154 | 0.1260 + 0.5833i | 154 | 0.1753 + 0.5765i | 154 | 0.1616 + 0.5539i | 154 | 0.1623 + 0.5878i |
| 155 | 0.1260 + 0.5803i | 155 | 0.1753 + 0.5863i | 155 | 0.1616 + 0.6361i | 155 | 0.1623 + 0.6696i |
| 156 | 0.1263 + 0.7327i | 156 | 0.1752 + 0.7706i | 156 | 0.1844 + 0.8300i | 156 | 0.2280 + 0.8497i |
| 157 | 0.1263 + 0.7094i | 157 | 0.1752 + 0.7279i | 157 | 0.1844 + 0.7294i | 157 | 0.2280 + 0.7566i |
| 158 | 0.1260 + 0.7327i | 158 | 0.1753 + 0.7706i | 158 | 0.1616 + 0.8300i | 158 | 0.1623 + 0.8497i |
| 159 | 0.1260 + 0.7094i | 159 | 0.1753 + 0.7279i | 159 | 0.1616 + 0.7294i | 159 | 0.1623 + 0.7566i |
| 160 | 0.3821 + 1.5177i | 160 | 0.4342 + 1.4645i | 160 | 0.4684 + 1.3885i | 160 | 0.5100 + 0.3184i |
| 161 | 0.3821 + 1.2375i | 161 | 0.4342 + 1.2234i | 161 | 0.4684 + 1.2157i | 161 | 0.5100 + 0.1795i |
| 162 | 0.3842 + 1.5177i | 162 | 0.4332 + 1.4645i | 162 | 0.4042 + 1.3885i | 162 | 0.4361 + 1.3184i |
| 163 | 0.3842 + 1.2375i | 163 | 0.4332 + 1.2234i | 163 | 0.4042 + 1.2157i | 163 | 0.4361 + 1.1795i |
| 164 | 0.3821 + 0.9252i | 164 | 0.4342 + 0.9218i | 164 | 0.4684 + 0.9431i | 164 | 0.5100 + 0.9498i |
| 155 | 0.3821 + 1.0200i | 165 | 0.4342 + 1.0366i | 165 | 0.4684 + 1.0703i | 165 | 0.5100 + 1.0588i |
| 166 | 0.3842 + 0.9252i | 166 | 0.4332 + 0.9218i | 166 | 0.4042 + 0.9431i | 166 | 0.4361 + 0.9498i |
| 167 | 0.3842 + 1.0200i | 167 | 0.4332 + 1.0366i | 167 | 0.4042 + 1.0703i | 167 | 0.4351 + 1.0588i |
| 168 | 0.3188 + 1.5177i | 168 | 0 3073 + 1.4645i | 168 | 0.2761 + 1.3885i | 168 | 0.2957 + 1.3184i |
| 169 | 0.3188 + 1.2375i | 169 | 0.3073 + 1.2234i | 169 | 0.2761 + 1.2157i | 169 | 0.2957 + 1.1795i |
| 170 | 0.3200 + 1.5177i | 170 | 0.3069 + 1.4645i | 170 | 0.3180 + 1.3885i | 170 | 0.3645 + 1.3184i |
| 171 | 0.3200 + 1.2375i | 171 | 0.3069 + 1.2234i | 171 | 0.3180 + 1.2157i | 171 | 0.3645 + 1.1795i |
| 171 | 0.3188 + 0.9252i | 172 | 0.3073 + 0.9218i | 172 | 0.2761 + 0.9431i | 172 | 0.2957 + 0.9498i |
| 173 | 0.3188 + 1.0200i | 173 | 0.3073 + 1.0366i | 173 | 0.2761 + 1.0703i | 173 | 0.2957 + 1.0588i |
| 174 | 0.3200 + 0.9252i | 174 | 0.3069 + 0.9218i | 174 | 0.3180 + 0.9431i | 174 | 0.3645 + 0.9498i |
| 175 | 0.3200 + 1.0200i | 175 | 0.3069 + 1.0366i | 175 | 0.3180 + 1.0703i | 175 | 0.3645 + 1.0588i |
| 176 | 0.3821 + 0.5833i | 176 | 0.4342 + 0.5765i | 176 | 0.4684 + 0.5539i | 176 | 0.5100 + 0.5878i |
| 177 | 0.3821 + 0.5803i | 177 | 0.4342 + 0.5863i | 177 | 0.4684 + 0.6361i | 177 | 0.5100 + 0.6696i |
| 178 | 0.3842 + 0.5833i | 178 | 0.4332 + 0.5765i | 178 | 0.4042 + 0.5539i | 178 | 0.4361 + 0.5878i |
| 179 | 0.3842 + 0.5803i | 179 | 0.4332 + 0.5863i | 179 | 0.4042 + 0.6361i | 179 | 0.4361 + 0.6696i |
| 180 | 0.3821 + 0.7327i | 180 | 0.4342 + 0.7706i | 180 | 0.4684 + 0.8300i | 180 | 0.5100 + 0.8497i |
| 181 | 0.3821 + 0.7094i | 181 | 0.4342 + 0.7279i | 181 | 0.4684 + 0.7294i | 181 | 0.5100 + 0.7566i |
| 182 | 0.3842 + 0.7327i | 182 | 0.4332 + 0.7706i | 182 | 0.4042 + 0.8300i | 182 | 0.4361 + 0.8497i |
| 183 | 0.3842 + 0.7094i | 183 | 0.4332 + 0.7279i | 183 | 0.4042 + 0.7294i | 183 | 0.4361 + 0.7566i |
| 184 | 0.3188 + 0.5833i | 184 | 0.3073 + 0.5765i | 184 | 0.2761 + 0.5539i | 184 | 0.2957 + 0.5878i |
| 185 | 0.3188 + 0.5803i | 185 | 0.3073 + 0.5863i | 185 | 0.2761 + 0.6361i | 185 | 0.2957 + 0.6696i |
| 186 | 0.3200 + 0.5833i | 186 | 0.3069 + 0.5765i | 186 | 0.3180 + 0.5539i | 186 | 0.3645 + 0.5878i |
| 187 | 0.3200 + 0.5803i | 187 | 0.3069 + 0.5863i | 187 | 0.3180 + 0.6361i | 187 | 0.3645 + 0.6696i |
| 188 | 0.3188 + 0.7327i | 188 | 0.3073 + 0.7706i | 188 | 0.2761 + 0.8300i | 188 | 0.2957 + 0.8497i |
| 189 | 0.3188 + 0.7094i | 189 | 0.3073 + 0.7279i | 189 | 0.2761 + 0.7294i | 189 | 0.2957 + 0.7566i |
| 190 | 0.3200 + 0.7327i | 190 | 0.3069 + 0.7706i | 190 | 0.3180 + 0.8300i | 190 | 0.3645 + 0.8497i |
| 191 | 0.3200 + 0.7094i | 191 | 0.3069 + 0.7279i | 191 | 0.3180 + 0.7294i | 191 | 0.3645 + 0.7566i |
| 192 | 0.1056 + 0.1056i | 192 | 0.0640 + 0.0640i | 192 | 0.0501 + 0.0501i | 192 | 0.0325 + 0.0325i |
| 193 | 0.1056 + 0.1052i | 193 | 0.0640 + 0.0641i | 193 | 0.0501 + 0.0640i | 193 | 0.0325 + 0.0967i |
| 194 | 0.1052 + 0.1056i | 194 | 0.0641 + 0.0640i | 194 | 0.0640 + 0.0501i | 194 | 0.0967 + 0.0325i |
| 195 | 0.1052 + 0.1052i | 195 | 0.0641 + 0.0641i | 195 | 0.0640 + 0.0640i | 195 | 0.0967 + 0.0967i |
| 196 | 0.1056 + 0.1263i | 196 | 0.0640 + 0.1752i | 196 | 0.0501 + 0.1844i | 196 | 0.0325 + 0.2280i |
| 197 | 0.1056 + 0.1260i | 197 | 0.0640 + 0.1753i | 197 | 0.0501 + 0.1616i | 197 | 0.0325 + 0.1623i |
| 198 | 0.1052 + 0.1263i | 198 | 0.0641 + 0.1752i | 198 | 0.0640 + 0.1844i | 198 | 0.0967 + 0.2280i |
| 199 | 0.1052 + 0.1260i | 199 | 0.0641 + 0.1753i | 199 | 0.0640 + 0.1616i | 199 | 0.0967 + 0.1623i |
| 200 | 0.1263 + 0.1056i | 200 | 0.1752 + 0.0640i | 200 | 0.1844 + 0.0501i | 200 | 0.2280 + 0.0325i |
| 201 | 0.1263 + 0.1052i | 201 | 0.1752 + 0.0641i | 201 | 0.1844 + 0.0640i | 201 | 0.2280 + 0.0967i |

TABLE 22-continued

| CR 7/15 | | CR 9/15 | | CR 11/15 | | CR 13/15 | |
|---|---|---|---|---|---|---|---|
| Label | Constellation | Label | Constellation | Label | Constellation | Label | Constellation |
| 202 | 0.1260 + 0.1056i | 202 | 0.1753 + 0.0640i | 202 | 0.1616 + 0.0501i | 202 | 0.1623 + 0.0325i |
| 203 | 0.1260 + 0.1052i | 203 | 0.1753 + 0.0641i | 203 | 0.1616 + 0.0640i | 203 | 0.1623 + 0.0967i |
| 204 | 0.1263 + 0.1263i | 204 | 0.1752 + 0.1752i | 204 | 0.1844 + 0.1844i | 204 | 0.2280 + 0.2280i |
| 205 | 0.1263 + 0.1260i | 205 | 0.1752 + 0.1753i | 205 | 0.1844 + 0.1616i | 205 | 0.2280 + 0.1623i |
| 206 | 0.1260 + 0.1263i | 206 | 0.1753 + 0.1752i | 206 | 0.1616 + 0.1844i | 206 | 0.1623 + 0.2280i |
| 207 | 0.1260 + 0.1260i | 207 | 0.1753 + 0.1753i | 207 | 0.1616 + 0.1616i | 207 | 0.1623 + 0.1623i |
| 208 | 0.1056 + 0.3821i | 208 | 0.0640 + 0.4342i | 208 | 0.0501 + 0.4684i | 208 | 0.0325 + 0.5100i |
| 209 | 0.1056 + 0.3842i | 209 | 0.0640 + 0.4332i | 209 | 0.0501 + 0.4042i | 209 | 0.0325 + 0.4361i |
| 210 | 0.1052 + 0.3821i | 210 | 0.0641 + 0.4342i | 210 | 0.0640 + 0.4684i | 210 | 0.0967 + 0.5100i |
| 211 | 0.1052 + 0.3842i | 211 | 0.0641 + 0.4332i | 211 | 0.0640 + 0.4042i | 211 | 0.0967 + 0.4361i |
| 212 | 0.1056 + 0.3188i | 212 | 0.0640 + 0.3073i | 212 | 0.0501 + 0.2761i | 212 | 0.0325 + 0.2957i |
| 213 | 0.1056 + 0.3200i | 213 | 0.0640 + 0.3069i | 213 | 0.0501 + 0.3180i | 213 | 0.0325 + 0.3645i |
| 214 | 0.1052 + 0.3188i | 214 | 0.0641 + 0.3073i | 214 | 0.0640 + 0.2761i | 214 | 0.0967 + 0.2957i |
| 215 | 0.1052 + 0.3200i | 215 | 0.0641 + 0.3069i | 215 | 0.0640 + 0.3180i | 215 | 0.0967 + 0.3645i |
| 216 | 0.1263 + 0.3821i | 216 | 0.1752 + 0.4342i | 216 | 0.1844 + 0.4684i | 216 | 0.2280 + 0.5100i |
| 217 | 0.1263 + 0.3842i | 217 | 0.1752 + 0.4332i | 217 | 0.1844 + 0.4042i | 217 | 0.2280 + 0.4361i |
| 218 | 0.1260 + 0.3821i | 218 | 0.1753 + 0.4342i | 218 | 0.1616 + 0.4684i | 218 | 0.1623 + 0.5100i |
| 219 | 0.1260 + 0.3842i | 219 | 0.1753 + 0.4332i | 219 | 0.1616 + 0.4042i | 219 | 0.1623 + 0.4361i |
| 220 | 0.1263 + 0.3188i | 220 | 0.1752 + 0.3073i | 220 | 0.1844 + 0.2761i | 220 | 0.2280 + 0.2957i |
| 221 | 0.1263 + 0.3200i | 221 | 0.1752 + 0.3069i | 221 | 0.1844 + 0.3180i | 221 | 0.2280 + 0.3645i |
| 222 | 0.1260 + 0.3188i | 222 | 0.1753 + 0.3073i | 222 | 0.1616 + 0.2761i | 222 | 0.1623 + 0.2957i |
| 223 | 0.1260 + 0.3200i | 223 | 0.1753 + 0.3069i | 223 | 0.1616 + 0.3180i | 223 | 0.1623 + 0.3645i |
| 224 | 0.3821 + 0.1056i | 224 | 0.4342 + 0.0640i | 224 | 0.4684 + 0.0501i | 224 | 0.5100 + 0.0325i |
| 225 | 0.3821 + 0.1052i | 225 | 0.4342 + 0.0641i | 225 | 0.4684 + 0.0640i | 225 | 0.5100 + 0.0967i |
| 226 | 0.3842 + 0.1056i | 226 | 0.4332 + 0.0640i | 226 | 0.4042 + 0.0501i | 226 | 0.4361 + 0.0325i |
| 227 | 0.3842 + 0.1052i | 227 | 0.4332 + 0.0641i | 227 | 0.4042 + 0.0640i | 227 | 0.4361 + 0.0967i |
| 228 | 0.3821 + 0.1263i | 228 | 0.4342 + 0.1752i | 228 | 0.4684 + 0.1844i | 228 | 0.5100 + 0.2280i |
| 229 | 0.3821 + 0.1260i | 229 | 0.4342 + 0.1753i | 229 | 0.4684 + 0.1616i | 229 | 0.3100 + 0.1623i |
| 230 | 0.3842 + 0.1263i | 230 | 0.4332 + 0.1752i | 230 | 0.4042 + 0.1844i | 230 | 0.4361 + 0.2280i |
| 231 | 0.3842 + 0.1260i | 231 | 0.4332 + 0.1753i | 231 | 0.4042 + 0.1616i | 231 | 0.4361 + 0.1623i |
| 232 | 0.3188 + 0.1056i | 232 | 0.3073 + 0.0640i | 232 | 0.2761 + 0.0501i | 232 | 0.2957 + 0.0325i |
| 233 | 0.3188 + 0.1052i | 233 | 0.3073 + 0.0641i | 233 | 0.2761 + 0.0640i | 233 | 0.2957 + 0.0967i |
| 234 | 0.3200 + 0.1056i | 234 | 0.3069 + 0.0640i | 234 | 0.3180 + 0.0501i | 234 | 0.3645 + 0.0325i |
| 235 | 0.3200 + 0.1052i | 235 | 0.3069 + 0.0641i | 235 | 0.3180 + 0.0640i | 235 | 0.3645 + 0.0967i |
| 236 | 0.3188 + 0.1263i | 236 | 0.3073 + 0.1752i | 236 | 0.2761 + 0.1844i | 236 | 0.2957 + 0.2280i |
| 237 | 0.3188 + 0.1260i | 237 | 0.3073 + 0.1753i | 237 | 0.2761 + 0.1616i | 237 | 0.2957 + 0.1623i |
| 238 | 0.3200 + 0.1263i | 238 | 0.3069 + 0.1752i | 238 | 0.3180 + 0.1844i | 238 | 0.3645 + 0.2280i |
| 239 | 0.3200 + 0.1260i | 239 | 0.3069 + 0.1753i | 239 | 0.3180 + 0.1616i | 239 | 0.3645 + 0.1623i |
| 240 | 0.3821 + 0.3821i | 240 | 0.4342 + 0.4342i | 240 | 0.4684 + 0.4684i | 240 | 0.5100 + 0.5100i |
| 241 | 0.3821 + 0.3842i | 241 | 0.4342 + 0.4332i | 241 | 0.4684 + 0.4042i | 241 | 0.5100 + 0.4361i |
| 242 | 0.3842 + 0.3821i | 242 | 0.4332 + 0.4342i | 242 | 0.4042 + 0.4684i | 242 | 0.4361 + 0.5100i |
| 243 | 0.3842 + 0.3842i | 243 | 0.4332 + 0.4332i | 243 | 0.4042 + 0.4042i | 243 | 0.4361 + 0.4361i |
| 244 | 0.3821 + 0.3188i | 244 | 0.4342 + 0.3073i | 244 | 0.4684 + 0.2761i | 244 | 0.5100 + 0.2957i |
| 245 | 0.3821 + 0.3200i | 245 | 0.4342 + 0.3069i | 245 | 0.4684 + 0.3180i | 245 | 0.5100 + 0.3645i |
| 246 | 0.3842 + 0.3188i | 246 | 0.4332 + 0.3073i | 246 | 0.4042 + 0.2761i | 246 | 0.4361 + 0.2957i |
| 247 | 0.3842 + 0.3200i | 247 | 0.4332 + 0.3069i | 247 | 0.4042 + 0.3180i | 247 | 0.4361 + 0.3645i |
| 248 | 0.3188 + 0.3821i | 248 | 0.3073 + 0.4342i | 248 | 0.2761 + 0.4684i | 248 | 0.2957 + 0.5100i |
| 249 | 0.3188 + 0.3842i | 249 | 0.3073 + 0.4332i | 249 | 0.2761 + 0.4042i | 249 | 0.2957 + 0.4361i |
| 250 | 0.3200 + 0.3821i | 250 | 0.3069 + 0.4342i | 250 | 0.3180 + 0.4684i | 250 | 0.3645 + 0.5100i |
| 251 | 0.3200 + 0.3842i | 251 | 0.3069 + 0.4332i | 251 | 0.3180 + 0.4042i | 251 | 0.3645 + 0.4361i |
| 252 | 0.3188 + 0.3188i | 252 | 0.3073 + 0.3073i | 252 | 0.2761 + 0.2761i | 252 | 0.2957 + 0.2957i |
| 253 | 0.3188 + 0.3200i | 253 | 0.3073 + 0.3069i | 253 | 0.2761 + 0.3180i | 253 | 0.2957 + 0.3645i |
| 254 | 0.3200 + 0.3188i | 254 | 0.3069 + 0.3073i | 254 | 0.3180 + 0.2761i | 254 | 0.3645 + 0.2957i |
| 255 | 0.3200 + 0.3200i | 255 | 0.3069 + 0.3069i | 255 | 0.3180 + 0.3180i | 255 | 0.3645 + 0.3645i |

Annex to the Description—Annex 9

In certain exemplary embodiments, a two-dimensional constellation may be constructed from a set of one-dimensional levels according to the method described below. The specific example described below is based on the table for the CR 13/15, 1K constellation given in Annex 6, which is reproduced below.

| CR | 13/15 |
|---|---|
| | 1 |
| | 2.975413 |
| | 4.997551 |
| | 7.018692 |
| | 9.102872 |

-continued

| CR | 13/15 |
|---|---|
| | 11.22209 |
| | 13.42392 |
| | 15.69921 |
| | 18.09371 |
| | 20.61366 |
| | 23.2898 |
| | 26.15568 |
| | 29.23992 |
| | 32.59361 |
| | 36.30895 |
| | 40.58404 |

The vector of levels may be denoted $A=\{a_i\}$, $i=0, 1, 2, \ldots, L-1$.

In a first step, the vector A is normalized to obtain a normalised vector $\overline{A}$ using the following formula:

$$\overline{A} = \frac{A}{\sqrt{\frac{2}{L}\sum_i a_i^2}}$$

where L is the number of levels (i.e. the dimensionality of A).

In this example, the resulting normalised vector $\overline{A}$ is indicated below.

| CR | 13/15 |
| --- | --- |
| | 0.0325 |
| | 0.0967 |
| | 0.1623 |
| | 0.228 |
| | 0.2957 |
| | 0.3645 |
| | 0.4361 |
| | 0.51 |
| | 0.5878 |
| | 0.6696 |
| | 0.7566 |
| | 0.8497 |
| | 0.9498 |
| | 1.0588 |
| | 1.1795 |
| | 1.3184 |

In a next step, the full constellation is generated as comprising all the possibilities of combinations of real and imaginary parts equal to one of the entries (i.e. components) of $\overline{A}$, In certain exemplary embodiments, a gray mapping may be used.

In this example, the resulting constellation points of the first quadrant are indicated below.

| Label (int.) | Contellation |
| --- | --- |
| 0 | 1.3184 + 1.3184i |
| 1 | 1.3184 + 1.1795i |
| 2 | 1.1795 + 1.3184i |
| 3 | 1.1795 + 1.1795i |
| 4 | 1.3184 + 0.9498i |
| 5 | 1.3184 + 1.0588i |
| 6 | 1.1795 + 0.9498i |
| 7 | 1.1795 + 1.0588i |
| 8 | 0.9498 + 1.3184i |
| 9 | 0.9498 + 1.1795i |
| 10 | 1.0588 + 1.3184i |
| 11 | 1.0588 + 1.1795i |
| 12 | 0.9498 + 0.9498i |
| 13 | 0.9498 + 1.0588i |
| 14 | 1.0588 + 0.9498i |
| 15 | 1.0588 + 1.0588i |
| 16 | 1.3184 + 0.5878i |
| 17 | 1.3184 + 0.6696i |
| 18 | 1.1795 + 0.5878i |
| 19 | 1.1795 + 0.6696i |
| 20 | 1.3184 + 0.8497i |
| 21 | 1.3184 + 0.7566i |
| 22 | 1.1795 + 0.8497i |
| 23 | 1.1795 + 0.7566i |
| 24 | 0.9498 + 0.5878i |
| 25 | 0.9498 + 0.6696i |
| 26 | 1.0588 + 0.5878i |
| 27 | 1.0588 + 0.6696i |
| 28 | 0.9498 + 0.8497i |
| 29 | 0.9498 + 0.7566i |

-continued

| Label (int.) | Contellation |
| --- | --- |
| 30 | 1.0588 + 0.8497i |
| 31 | 1.0588 + 0.7566i |
| 33 | 0.5878 + 1.1795i |
| 34 | 0.6696 + 1.3184i |
| 35 | 0.6696 + 1.1795i |
| 36 | 0.5878 + 0.9498i |
| 37 | 0.5878 + 1.0588i |
| 38 | 0.6696 + 0.9498i |
| 39 | 0.6696 + 1.0588i |
| 40 | 0.8497 + 1.3184i |
| 41 | 0.8497 + 1.1795i |
| 42 | 0.7566 + 1.3184i |
| 43 | 0.7566 + 1.1795i |
| 44 | 0.8497 + 0.9498i |
| 45 | 0.8497 + 1.0588i |
| 46 | 0.7566 + 0.9498i |
| 47 | 0.7566 + 1.0588i |
| 48 | 0.5878 + 0.5878i |
| 49 | 0.5878 + 0.6696i |
| 50 | 0.6696 + 0.5878i |
| 51 | 0.6696 + 0.6696i |
| 52 | 0.5878 + 0.8497i |
| 53 | 0.5878 + 0.7566i |
| 54 | 0.6696 + 0.8497i |
| 55 | 0.6696 + 0.7566i |
| 56 | 0.8497 + 0.5878i |
| 57 | 0.8497 + 0.6696i |
| 58 | 0.7566 + 0.5878i |
| 59 | 0.7566 + 0.6696i |
| 60 | 0.8497 + 0.8497i |
| 61 | 0.8497 + 0.7566i |
| 62 | 0.7566 + 0.8497i |
| 63 | 0.7566 + 0.7566i |
| 64 | 1.3184 + 0.0325i |
| 65 | 1.3184 + 0.0967i |
| 66 | 1.1795 + 0.0325i |
| 67 | 1.1795 + 0.0967i |
| 68 | 1.3184 + 0.2280i |
| 69 | 1.3184 + 0.1623i |
| 70 | 1.1795 + 0.2280i |
| 71 | 1.1795 + 0.1623i |
| 72 | 0.9498 + 0.0325i |
| 73 | 0.9498 + 0.0967i |
| 74 | 1.0588 + 0.0325i |
| 75 | 1.0588 + 0.0967i |
| 76 | 0.9498 + 0.2280i |
| 77 | 0.9498 + 0.1623i |
| 78 | 1.0588 + 0.2280i |
| 79 | 1.0588 + 0.1623i |
| 80 | 1.3184 + 0.5100i |
| 81 | 1.3184 + 0.4361i |
| 82 | 1.1795 + 0.5100i |
| 83 | 1.1795 + 0.4361i |
| 84 | 1.3184 + 0.2957i |
| 85 | 1.3184 + 0.3645i |
| 86 | 1.1795 + 0.2957i |
| 87 | 1.1795 + 0.3645i |
| 88 | 0.9498 + 0.5100i |
| 89 | 0.9498 + 0.4361i |
| 90 | 1.0588 + 0.5100i |
| 91 | 1.0588 + 0.4361i |
| 92 | 0.9498 + 0.2957i |
| 93 | 0.9498 + 0.3645i |
| 94 | 1.0588 + 0.2957i |
| 95 | 1.0588 + 0.3645i |
| 96 | 0.5878 + 0.0325i |
| 97 | 0.5878 + 0.0967i |
| 98 | 0.6696 + 0.0325i |
| 99 | 0.6696 + 0.0967i |
| 100 | 0.5878 + 0.2280i |
| 101 | 0.5878 + 0.1623i |
| 102 | 0.6696 + 0.2280i |
| 103 | 0.6696 + 0.1623i |
| 104 | 0.8497 + 0.0325i |
| 105 | 0.8497 + 0.0967i |
| 106 | 0.7566 + 0.0325i |

-continued

| Label (int.) | Contellation |
|---|---|
| 107 | 0.7566 + 0.0967i |
| 108 | 0.8497 + 0.2280i |
| 109 | 0.8497 + 0.1623i |
| 110 | 0.7566 + 0.2280i |
| 111 | 0.7566 + 0.1623i |
| 112 | 0.5878 + 0.5100i |
| 113 | 0.5878 + 0.4361i |
| 114 | 0.6696 + 0.5100i |
| 115 | 0.6696 + 0.4361i |
| 116 | 0.5878 + 0.2957i |
| 117 | 0.5878 + 0.3645i |
| 118 | 0.6696 + 0.2957i |
| 119 | 0.6696 + 0.3645i |
| 120 | 0.8497 + 0.5100i |
| 121 | 0.8497 + 0.4361i |
| 122 | 0.7566 + 0.5100i |
| 123 | 0.7566 + 0.4361i |
| 124 | 0.8497 + 0.2957i |
| 125 | 0.8497 + 0.3645i |
| 126 | 0.7566 + 0.2957i |
| 127 | 0.7566 + 0.3645i |
| 128 | 0.0325 + 1.3184i |
| 129 | 0.0325 + 1.1795i |
| 130 | 0.0697 + 1.3184i |
| 131 | 0.0967 + 1.1795i |
| 132 | 0.0325 + 0.9498i |
| 133 | 0.0325 + 1.0588i |
| 134 | 0.0967 + 0.9498i |
| 135 | 0.0967 + 1.0588i |
| 136 | 0.2880 + 1.3184i |
| 137 | 0.2280 + 1.1795i |
| 138 | 0.1623 + 1.3184i |
| 139 | 0.1623 + 1.1795i |
| 140 | 0.2280 + 0.9498i |
| 141 | 0.2280 + 1.0588i |
| 142 | 0.1623 + 0.9498i |
| 143 | 0.1623 + 1.0588i |
| 144 | 0.0325 + 0.5878i |
| 145 | 0.0325 + 0.6696i |
| 146 | 0.0967 + 0.5878i |
| 147 | 0.0967 + 0.6696i |
| 148 | 0.0325 + 0.8497i |
| 149 | 0.0325 + 0.7566i |
| 150 | 0.0967 + 0.8497i |
| 151 | 0.0967 + 0.7566i |
| 152 | 0.2280 + 0.5878i |
| 153 | 0.2280 + 0.6696i |
| 154 | 0.1623 + 0.5878i |
| 155 | 0.1623 + 0.6696i |
| 156 | 0.2280 + 0.8497i |
| 157 | 0.2280 + 0.7566i |
| 158 | 0.1623 + 0.8497i |
| 159 | 0.1623 + 0.7566i |
| 160 | 0.5100 + 1.3184i |
| 161 | 0.5100 + 1.1795i |
| 162 | 0.4361 + 1.3184i |
| 163 | 0.4361 + 1.1795i |
| 164 | 0.5100 + 0.9498i |
| 165 | 0.5100 + 1.0588i |
| 166 | 0.4361 + 0.9498i |
| 167 | 0.4361 + 1.0588i |
| 168 | 0.2957 + 1.3184i |
| 169 | 0.2957 + 1.1795i |
| 170 | 0.3645 + 1.3184i |
| 171 | 0.3645 + 1.1795i |
| 172 | 0.2957 + 0.9498i |
| 173 | 0.2957 + 1.0588i |
| 174 | 0.3645 + 0.9498i |
| 175 | 0.3645 + 1.0588i |
| 176 | 0.5100 + 0.5878i |
| 177 | 0.5100 + 0.6696i |
| 178 | 0.4361 + 0.5878i |
| 179 | 0.4361 + 0.6696i |
| 180 | 0.5100 + 0.8497i |
| 181 | 0.5100 + 0.7566i |
| 182 | 0.4361 + 0.8497i |

-continued

| Label (int.) | Contellation |
|---|---|
| 183 | 0.4361 + 0.7566i |
| 184 | 0.2957 + 0.5878i |
| 185 | 0.2957 + 0.6696i |
| 186 | 0.3645 + 0.5878i |
| 187 | 0.3645 + 0.6696i |
| 188 | 0.2957 + 0.8497i |
| 189 | 0.2957 + 0.7566i |
| 190 | 0.3645 + 0.8497i |
| 191 | 0.3645 + 0.7566i |
| 192 | 0.0325 + 0.0325i |
| 193 | 0.0325 + 0.0967i |
| 194 | 0.0967 + 0.0325i |
| 195 | 0.0967 + 0.0967i |
| 196 | 0.0325 + 0.2280i |
| 197 | 0.0325 + 0.1623i |
| 198 | 0.0967 + 0.2280i |
| 199 | 0.0967 + 0.1623i |
| 200 | 0.2280 + 0.0325i |
| 201 | 0.2280 + 0.0967i |
| 202 | 0.1623 + 0.0325i |
| 203 | 0.1623 + 0.0967i |
| 204 | 0.2280 + 0.2280i |
| 205 | 0.2280 + 0.1623i |
| 206 | 0.1623 + 0.2280i |
| 207 | 0.1623 + 0.1623i |
| 208 | 0.0325 + 0.5100i |
| 209 | 0.0325 + 0.4361i |
| 210 | 0.0967 + 0.5100i |
| 211 | 0.0967 + 0.4361i |
| 212 | 0.0325 + 0.2957i |
| 213 | 0.0325 + 0.3645i |
| 214 | 0.0967 + 0.2957i |
| 215 | 0.0967 + 0.3645i |
| 216 | 0.2280 + 0.5100i |
| 217 | 0.2280 + 0.4361i |
| 218 | 0.1623 + 0.5100i |
| 219 | 0.1623 + 0.4361i |
| 220 | 0.2280 + 0.2957i |
| 221 | 0.2280 + 0.3645i |
| 222 | 0.1623 + 0.2957i |
| 223 | 0.1623 + 0.3645i |
| 224 | 0.5100 + 0.0325i |
| 225 | 0.5100 + 0.0967i |
| 226 | 0.4361 + 0.0325i |
| 227 | 0.4361 + 0.0967i |
| 228 | 0.5100 + 0.2280i |
| 229 | 0.5100 + 0.1623i |
| 230 | 0.4361 + 0.2280i |
| 231 | 0.4361 + 0.1623i |
| 232 | 0.2957 + 0.0325i |
| 233 | 0.2957 + 0.0967i |
| 234 | 0.3645 + 0.0325i |
| 235 | 0.3645 + 0.0967i |
| 236 | 0.2957 + 0.2280i |
| 237 | 0.2957 + 0.1623i |
| 238 | 0.3645 + 0.2280i |
| 239 | 0.3645 + 0.1623i |
| 240 | 0.5100 + 0.5100i |
| 241 | 0.5100 + 0.4361i |
| 242 | 0.4361 + 0.5100i |
| 243 | 0.4361 + 0.4361i |
| 244 | 0.5100 + 0.2957i |
| 245 | 0.5100 + 0.3645i |
| 246 | 0.4361 + 0.2957i |
| 247 | 0.4361 + 0.3645i |
| 248 | 0.2957 + 0.5100i |
| 249 | 0.2957 + 0.4361i |
| 250 | 0.3645 + 0.5100i |
| 251 | 0.3645 + 0.4361i |
| 252 | 0.2957 + 0.2957i |
| 253 | 0.2957 + 0.3645i |
| 254 | 0.3645 + 0.2957i |
| 255 | 0.3645 + 0.3645i |
| 256 | 1.3184 − 1.3184i |

The invention claimed is:

1. A receiving method comprising:

demodulating a signal received from a transmitting apparatus to generate values;

deinterleaving the values; and decoding the deinterleaved values based on a low density parity check (LDPC) code, a code rate of the LDPC code being 11/15, wherein the signal is demodulated based on position vectors for 16-quadrature amplitude modulation (QAM), and wherein the position vectors are represented as below:

| |
|---|
| 0.9342 + 0.9847i |
| 0.9866 + 0.2903i |
| 0.2716 + 0.9325i |
| 0.2901 + 0.2695i |

2. The method as claimed in claim 1, wherein the position vectors comprise the represented position vectors in one quadrant and position vectors in remaining quadrants, and wherein the position vectors in the remaining quadrants are obtained by indicating each represented position vector a as a*, −a*, and −a, respectively, * indicating complex conjugation.

3. A transmitting method comprising:

interleaving a codeword comprising input bits and parity bits;

demultiplexing bits of the interleaved codeword to generate cells;

mapping the cells to constellation points for 16-quadrature amplitude modulation (QAM) using position vectors; and transmitting a signal which is generated based on the constellation points, wherein the parity bits are generated by encoding the input bits based on a low density parity check (LDPC) code, a code rate of the LDPC code being 11/15, and wherein the position vectors are represented as below:

| |
|---|
| 0.9342 + 0.9847i |
| 0.9866 + 0.2903i |
| 0.2716 + 0.9325i |
| 0.2901 + 0.2695i |

4. The method as claimed in claim 3, wherein the position vectors comprise the represented position vectors in one quadrant and position vectors in remaining quadrants, and wherein the position vectors in the remaining quadrants are obtained by indicating each represented position vector a as a*, −a*, and a, respectively, * indicating complex conjugation.

* * * * *